US012639041B2

(12) United States Patent
    Song

(10) Patent No.: US 12,639,041 B2
(45) Date of Patent: May 26, 2026

(54) MULTIPLICATION AND ACCUMULATION(MAC) OPERATOR AND PROCESSING-IN-MEMORY (PIM) DEVICE INCLUDING THE MAC OPERATOR

(71) Applicant: SK hynix Inc., Icheon-si (KR)

(72) Inventor: Choung Ki Song, Yongin-si (KR)

(73) Assignee: SK hynix Inc., Icheon-si (KR)

( * ) Notice: Subject to any disclaimer, the term of this patent is extended or adjusted under 35 U.S.C. 154(b) by 1099 days.

(21) Appl. No.: 17/703,744

(22) Filed: Mar. 24, 2022

(65) Prior Publication Data
    US 2022/0229633 A1    Jul. 21, 2022

Related U.S. Application Data

(63) Continuation-in-part of application No. 17/146,101, filed on Jan. 11, 2021, now Pat. No. 11,663,000, (Continued)

(30) Foreign Application Priority Data

Jan. 17, 2020    (KR) ........................ 10-2020-0006903

(51) Int. Cl.
    *G06F 7/544*    (2006.01)
    *G06F 5/01*    (2006.01)
(52) U.S. Cl.
    CPC ............ *G06F 7/5443* (2013.01); *G06F 5/012* (2013.01)
(58) Field of Classification Search
    CPC ....... G06F 7/5443; G06F 9/3893; G06F 5/012
    See application file for complete search history.

(56) References Cited

U.S. PATENT DOCUMENTS 5,165,009 A    11/1992    Watanabe et al.
8,719,322 B2    5/2014    Bishop
        (Continued)

FOREIGN PATENT DOCUMENTS

CN        110311676 A    10/2019
KR    1020090014292 A    2/2009
        (Continued)

OTHER PUBLICATIONS

Antonio Roldao Lopes et al., A fused hybrid floating-point and fixed-point dot-product for FPGAs, International symposium on applied reconfigurable computing, Reconfigurable Computing: Architectures, Tools and Applications. ARC 2010. Lecture Notes in Computer Science, vol. 5992. Springer, Berlin, Heidelberg, pp. 157-168.
        (Continued)

*Primary Examiner* — Matthew D Sandifer
(74) *Attorney, Agent, or Firm* — WILLIAM PARK AND ASSOCIATES LTD.

(57)        ABSTRACT
A multiplication-accumulation (MAC) includes a multiplication circuit, a pre-processing circuit, and an adder tree. The multiplication circuit performs a multiplication operation on a plurality of weight data and a plurality of vector data each having a floating-point format to output a plurality of multiplication data. The pre-processing circuit performs shifting on mantissa data of the plurality of multiplication data by a difference between first maximum exponent data having a greatest value among the exponent data of the plurality of multiplication data and the remaining exponent data to output a plurality of pre-processed mantissa data. The adder tree adds the plurality of mantissa data to output mantissa addition bits.

24 Claims, 137 Drawing Sheets

6000A

W9[15:0]-W16[15:0]                    V9[15:0]-V16[15:0]

MULTIPLICATION CIRCUIT                    ~6100
        WV9[24:0]-WV16[24:0]

PRE-PROCESSING CIRCUIT                    ~6200A
    E_MAX1[7:0]    PM_WV9[15:0]-PM_WV16[15:0]

ADDER TREE                    ~6300
        M_MA2[18:0]

ACCUMULATOR                    ~6400A

MAC_RD_RST ————→    E_MAC2[7:0]    M_MAC2[6:0]

OUTPUT CIRCUIT                    ~6500A

————→ NO OUTPUT

Related U.S. Application Data which is a continuation-in-part of application No. 17/027,276, filed on Sep. 21, 2020, now Pat. No. 11,513,733.

(60) Provisional application No. 62/959,604, filed on Jan. 10, 2020, provisional application No. 62/958,226, filed on Jan. 7, 2020.

(56) References Cited

U.S. PATENT DOCUMENTS

| | | | |
|---|---|---|---|
| 10,042,639 | B2 | 8/2018 | Gopal et al. |
| 10,558,428 | B2 | 2/2020 | Rovers |
| 11,893,360 | B2 * | 2/2024 | Finch .................. G06F 7/499 |
| 2003/0222879 | A1 | 12/2003 | Lin et al. |
| 2015/0088954 | A1 | 3/2015 | Bakos |
| 2016/0248439 | A1 | 8/2016 | Tanaka |
| 2017/0068717 | A1 | 3/2017 | Crawford, Jr. |
| 2018/0157464 | A1 | 6/2018 | Lutz et al. |
| 2019/0079727 | A1 | 3/2019 | Chen et al. |
| 2019/0114265 | A1 | 4/2019 | Chang et al. |
| 2019/0294415 | A1 | 9/2019 | Kaul et al. |
| 2020/0089472 | A1 | 3/2020 | Pareek et al. |
| 2020/0174749 | A1 | 6/2020 | Kang et al. |
| 2020/0364031 | A1 | 11/2020 | Makino et al. |
| 2020/0409661 | A1 | 12/2020 | Brunie |
| 2021/0042087 | A1 | 2/2021 | Pugh et al. |
| 2021/0072986 | A1 | 3/2021 | Yudanov et al. |
| 2021/0263993 | A1 | 8/2021 | Urbanski et al. |
| 2021/0319079 | A1 * | 10/2021 | Abdelaziz ............. G06F 7/5443 |
| 2022/0269485 | A1 * | 8/2022 | Finch ..................... G06F 7/499 |
| 2023/0053261 | A1 * | 2/2023 | DiBrino ............... G06F 7/5443 |

FOREIGN PATENT DOCUMENTS

| | | |
|---|---|---|
| KR | 1020190079727 A | 7/2019 |
| KR | 1020190139757 A | 12/2019 |

OTHER PUBLICATIONS

Hani H. Saleh et al., A floating-point fused dot-product unit, 2008 IEEE International Conference on Computer Design, pp. 427-431, 2008, doi: 10.1109/ICCD.2008.4751896.

Jongwook Sohn et al., A Fused Floating-Point Four-Term Dot Product Unit, IEEE Transactions on Circuits and Systems I: Regular Papers, vol. 63, No. 3, pp. 370-378, Mar. 2016, doi: 10.1109/TCSI. 2016.2525042.

H. Kaul, M. Anders, S. Mathew, S. Kim and R. Krishnamurthy, "Optimized Fused Floating-Point Many-Term Dot-Product Hardware for Machine Learning Accelerators," 2019 IEEE 26th Symposium on Computer Arithmetic (ARITH), Kyoto, Japan, 2019, pp. 84-87 ( Year: 2019).

* cited by examiner

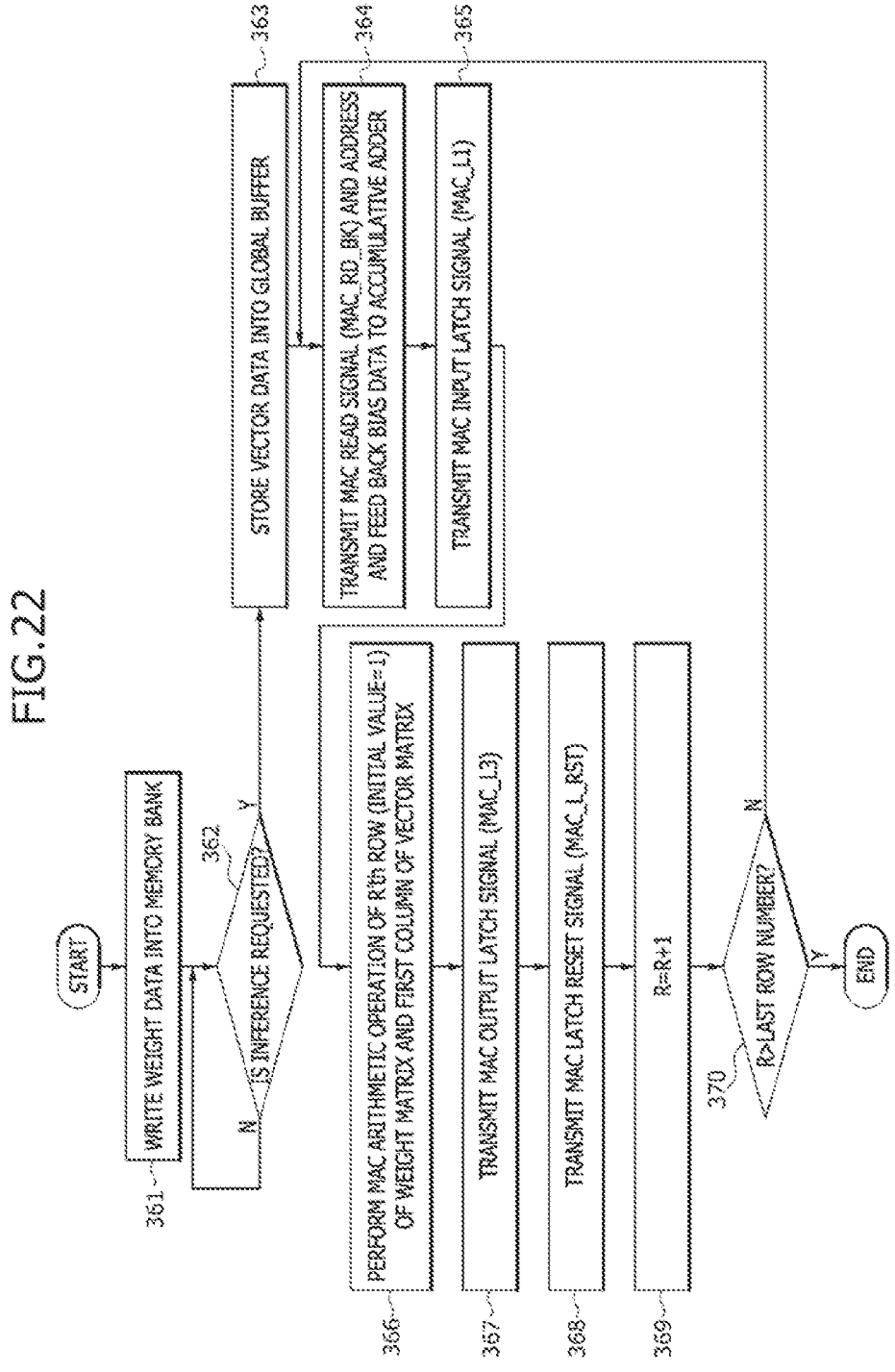

START

361 ~ WRITE WEIGHT DATA INTO MEMORY BANK

362 ~ IS INFERENCE REQUESTED?
N
Y

363 ~ STORE VECTOR DATA INTO GLOBAL BUFFER

364 ~ TRANSMIT MAC READ SIGNAL (MAC_RD_BK) AND ADDRESS AND FEED BACK BIAS DATA TO ACCUMULATIVE ADDER

365 ~ TRANSMIT MAC INPUT LATCH SIGNAL (MAC_L1)

366 ~ PERFORM MAC ARITHMETIC OPERATION OF Rth ROW (INITIAL VALUE=1) OF WEIGHT MATRIX AND FIRST COLUMN OF VECTOR MATRIX

367 ~ TRANSMIT MAC OUTPUT LATCH SIGNAL (MAC_L3)

368 ~ TRANSMIT MAC LATCH RESET SIGNAL (MAC_L_RST)

369 ~ R=R+1

370 ~ R>LAST ROW NUMBER?
N
Y

END

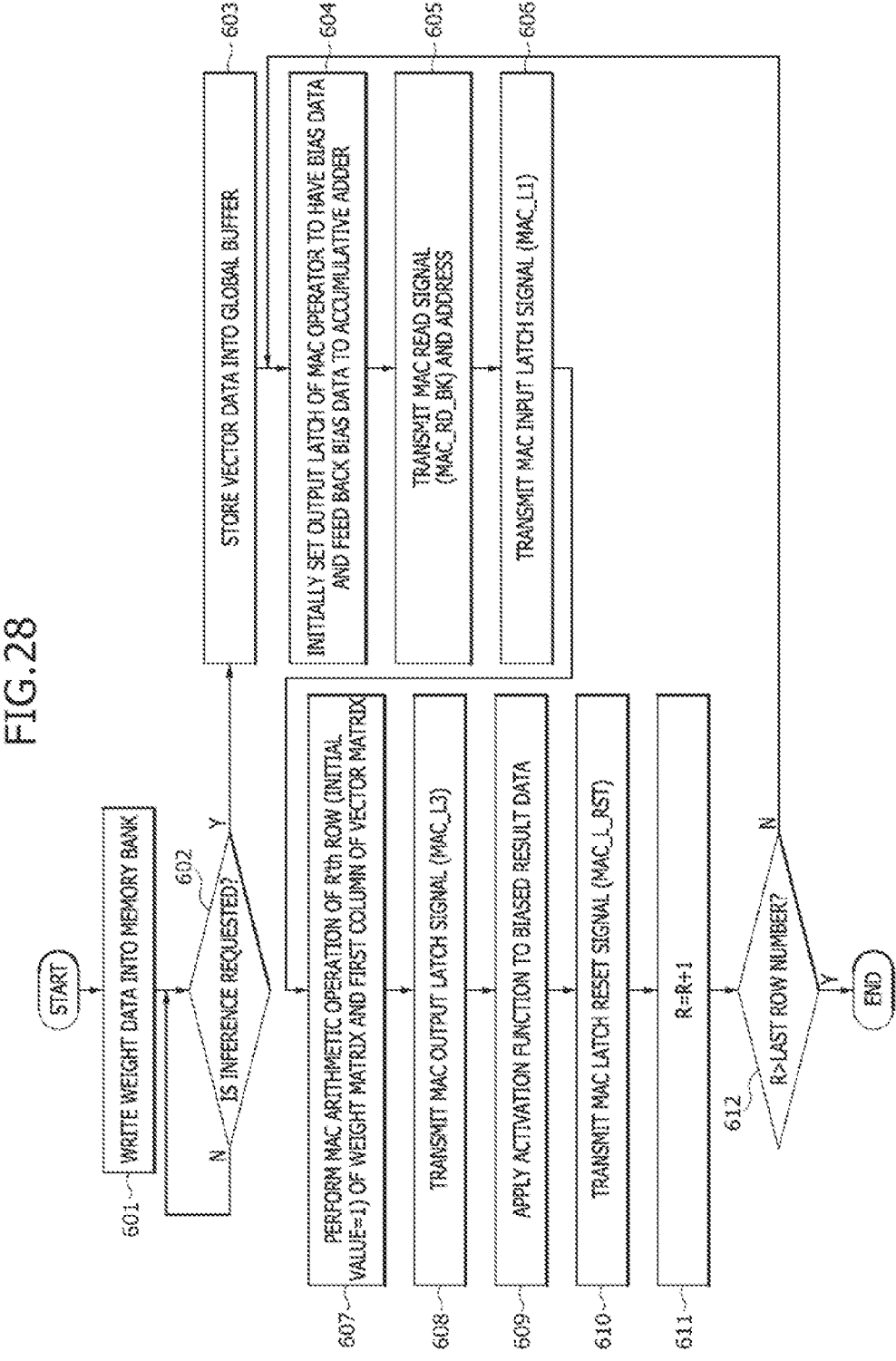

START

601 — WRITE WEIGHT DATA INTO MEMORY BANK

602 — IS INFERENCE REQUESTED?
N
Y

603 — STORE VECTOR DATA INTO GLOBAL BUFFER

604 — INITIALLY SET OUTPUT LATCH OF MAC OPERATOR TO HAVE BIAS DATA AND FEED BACK BIAS DATA TO ACCUMULATIVE ADDER

605 — TRANSMIT MAC READ SIGNAL (MAC_RD_BK) AND ADDRESS

606 — TRANSMIT MAC INPUT LATCH SIGNAL (MAC_L1)

607 — PERFORM MAC ARITHMETIC OPERATION OF Rth ROW (INITIAL VALUE=1) OF WEIGHT MATRIX AND FIRST COLUMN OF VECTOR MATRIX

608 — TRANSMIT MAC OUTPUT LATCH SIGNAL (MAC_L3)

609 — APPLY ACTIVATION FUNCTION TO BIASED RESULT DATA

610 — TRANSMIT MAC LATCH RESET SIGNAL (MAC_L_RST)

611 — R=R+1

612 — R>LAST ROW NUMBER?
N
Y

END

| S (S3) | ROUND UP SIGNAL (RDUP) | 2'S COMPLEMENT | RD[0] |
|---|---|---|---|
| NEGATIVE NUMBER ("1") | 0 | +1 | 1 |
| | 1 (+1) | | 0 |
| POSITIVE NUMBER ("0") | 0 | 0 | 0 |
| | 1 (+1) | | 1 |

| 16 BITS FLOATING-POINT DATA TYPE | SIGN | EXPONENT | MANTISSA | MRS[1:0] |
|---|---|---|---|---|
| FIRST DATA TYPE (FP16) | 1 BIT | 5 BITS | 10 BITS | 00 |
| SECOND DATA TYPE (OF16-1) | 1 BIT | 6 BITS | 9 BITS | 01 |
| THIRD DATA TYPE (OF16-2) | 1 BIT | 7 BITS | 8 BITS | 10 |
| FOURTH DATA TYPE (BF16) | 1 BIT | 8 BITS | 7 BITS | 11 |

Figure 81:
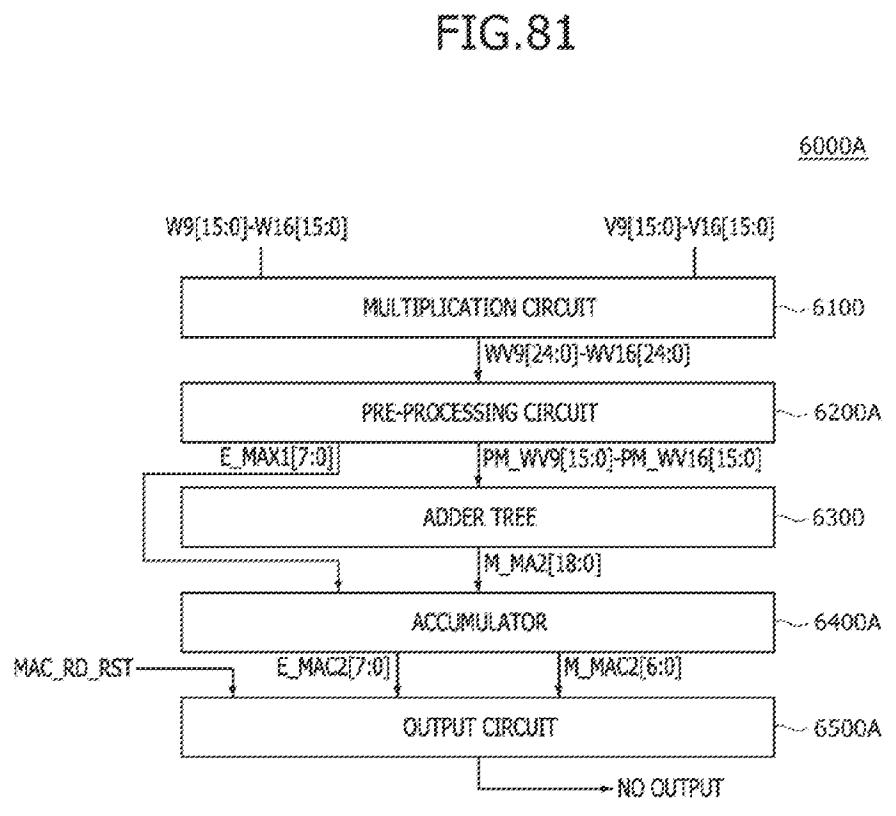

MULTIPLICATION CIRCUIT — 6100

WV9[24:0]-WV16[24:0]

PRE-PROCESSING CIRCUIT — 6200A

E_MAX[7:0]

PM_WV9[15:0]-PM_WV16[15:0]

ADDER TREE — 6300

M_MA2[18:0]

ACCUMULATOR — 6400A

E_MAC2[7:0]

M_MAC2[6:0]

OUTPUT CIRCUIT — 6500A

MAC_RD_RST

NO OUTPUT

| E_W[2:0] | NUMBER OF BITS SHIFTED RIGHT |
|----------|------------------------------|
| 000 | 8 |
| 001 | 7 |
| 010 | 6 |
| 011 | 5 |
| 100 | 4 |
| 101 | 3 |
| 110 | 2 |
| 111 | 1 |

MULTIPLICATION AND ACCUMULATION(MAC) OPERATOR AND PROCESSING-IN-MEMORY (PIM) DEVICE INCLUDING THE MAC OPERATOR

CROSS-REFERENCE TO RELATED APPLICATIONS

This is a continuation-in-part of U.S. patent application Ser. No. 17/146,101, filed on Jan. 11, 2021, which is a continuation-in-part of U.S. patent application Ser. No. 17/027,276, filed on Sep. 21, 2020, which claims the benefit of U.S. Provisional Application No. 62/958,226, filed on Jan. 7, 2020, and claims priority to Korean Application No. 10-2020-0006903, filed on Jan. 17, 2020, which are incorporated herein by reference in their entirety. The U.S. patent application Ser. No. 17/146,101 also claims the benefit of U.S. Provisional Application No. 62/959,604 filed on Jan. 10, 2020, which is incorporated herein by reference in its entirety.

BACKGROUND

1. Technical Field

Various embodiments of the present disclosure relate to processing-in-memory (PIM) systems.

2. Related Art

Recently, interest in artificial intelligence (AI) has been increasing not only in the information technology industry but also in the financial and medical industries. Accordingly, in various fields, artificial intelligence, more precisely, the introduction of deep learning, is considered and prototyped. In general, techniques for effectively learning deep neural networks (DNNs) or deep networks with increased layers as compared with general neural networks to utilize the deep neural networks (DNNs) or the deep networks in pattern recognition or inference are commonly referred to as deep learning.

One cause of this widespread interest may be the improved performance of processors performing arithmetic operations. To improve the performance of artificial intelligence, it may be necessary to increase the number of layers constituting a neural network in the artificial intelligence to educate the artificial intelligence. This trend has continued in recent years, which has led to an exponential increase in the amount of computation required for the hardware that actually does the computation. Moreover, if the artificial intelligence employs a general hardware system including memory and a processor which are separated from each other, the performance of the artificial intelligence may be degraded due to limitation of the amount of data communication between the memory and the processor. In order to solve this problem, a PIM device in which a processor and memory are integrated in one semiconductor chip has been used as a neural network computing device. Because the PIM device directly performs arithmetic operations internally, data processing speed in the neural network may be improved.

SUMMARY

A multiplication-accumulation (MAC) according to an embodiment of the present disclosure may include a multiplication circuit, a pre-processing circuit, and an adder tree.

The multiplication circuit may be configured to perform a multiplication operation on weight data and vector data each having a floating-point format to output multiplication data. The pre-processing circuit may be configured to perform a shifting operation of shifting mantissa data of the multiplication data by a difference between first maximum exponent data having a greatest value among exponent data of the multiplication data and the exponent data of the multiplication data to output pre-processed mantissa data. The adder tree may be configured to add the pre-processed mantissa data to output mantissa data of multiplication addition data.

A multiplication-accumulation (MAC) according to an embodiment of the present disclosure may include a multiplication circuit, a bit separation circuit, an exponent pre-processing circuit, a mantissa pre-processing circuit, and an adder tree. The multiplication circuit may be configured to perform a multiplication operation on weight data and vector data each having a floating-point format to output multiplication data. The bit separation circuit may be configured to receive exponent data of the multiplication data to generate and output exponent upper bits and exponent lower bits. The exponent pre-processing circuit may be configured to receive the exponent upper bits to generate and output first maximum exponent upper data and shift data. The mantissa pre-processing circuit may be configured to perform pre-processing on each of the mantissa data of the multiplication data using the exponent lower bits and the shift data to generate and output pre-processed mantissa data. The adder tree may be configured to add the pre-processed mantissa data to generate and output mantissa data of multiplication addition data.

A multiplication-accumulation (MAC) operator according to an embodiment of the present disclosure may include a left multiplication addition circuit configured to receive left weight data and left vector data to generate and output left maximum exponent data and exponent data of left multiplication addition data, and a right multiplication addition circuit configured to receive right weight data and right vector data to generate and output right maximum exponent data and exponent data of right multiplication addition data. The left multiplication addition circuit may include a left multiplication circuit that performs a multiplication operation on the left weight data and the left vector data to output left multiplication data, a left pre-processing circuit that performs shifting on mantissa data of the left multiplication data by a difference between the left maximum exponent data having a maximum value among the exponent data of the left multiplication data and the exponent data to output left pre-processed mantissa data, and a left adder tree that adds the left pre-processed mantissa data to generate and output mantissa data of the left multiplication addition data. The right multiplication addition circuit may include a right multiplication circuit that performs a multiplication operation on the right weight data and the right vector data to output right multiplication data, a right pre-processing circuit that performs shifting on mantissa data of the right multiplication data by a difference between the right maximum exponent data having a maximum value among the exponent data of the right multiplication data and the exponent data to output right pre-processed mantissa data, and a right adder tree that adds the right pre-processed mantissa data to generate and output mantissa data of the right multiplication addition data.

A multiplication-accumulation (MAC) operator according to an embodiment of the present disclosure may include a left multiplication addition circuit configured to receive left weight data and left vector data to generate and output left maximum exponent data and exponent data of left multiplication addition data, and a right multiplication addition circuit configured to receive right weight data and right vector data to generate and output right maximum exponent data and exponent data of right multiplication addition data. The left multiplication addition circuit may include a left multiplication circuit that performs a multiplication operation on the left weight data and the left vector data to output left multiplication data, a left pre-processing circuit that separates the exponent data of the left multiplication data to generate left exponent upper data and left exponent lower data and performs left exponent pre-processing using the left exponent upper data and left mantissa pre-processing using the left exponent lower data to output left maximum exponent upper data and left pre-processed mantissa data, and a left adder tree that adds each of the left pre-processed mantissa data to generate and output mantissa data of the left multiplication addition data. The right multiplication addition circuit may include a right multiplication circuit that performs a multiplication operation on the right weight data and the right vector data to output right multiplication data, a right pre-processing circuit that separates the exponent data of the right multiplication data to generate right exponent upper data and right exponent lower data and performs right exponent pre-processing using the right exponent upper data and right mantissa pre-processing using the right exponent lower data to output right maximum exponent upper data and right pre-processed mantissa data, and a right adder tree that adds each of the right pre-processed mantissa data to generate and output mantissa data of the right multiplication addition data.

A multiplication-accumulation (MAC) operator according to an embodiment of the present disclosure may include a left multiplication addition circuit configured to receive left weight data and left vector data to generate and output left maximum exponent data and exponent data of left multiplication addition data, and a right multiplication addition circuit configured to receive right weight data and right vector data to generate and output right maximum exponent data and exponent data of right multiplication addition data. The left multiplication addition circuit may include a left multiplication circuit that performs a multiplication operation on the left weight data and the left vector data to output sign data, modified exponent data, and mantissa data of each of left multiplication data, a left pre-processing circuit that separates each of the exponent of the left multiplication data to generate left exponent upper data and left exponent lower data and performs left exponent pre-processing using the left exponent upper data and left mantissa pre-processing using the left exponent lower data to output left maximum exponent upper data and left pre-processed mantissa data, and a left adder tree that adds the left pre-processed mantissa data to generate and output mantissa data of the left multiplication addition data. The right multiplication addition circuit may include a right multiplication circuit that performs a multiplication operation on the right weight data and the right vector data to output sign data, modified exponent data, and mantissa data of each of right multiplication data, a right pre-processing circuit that separates each of the exponent of the right multiplication data to generate right exponent upper data and right exponent lower data and performs right exponent pre-processing using the right exponent upper data and right mantissa pre-processing using the right exponent lower data to output right maximum exponent upper data and right pre-processed mantissa data, and a right adder tree that adds the right pre-processed mantissa data to generate and output mantissa data of the right multiplication addition data.

BRIEF DESCRIPTION OF THE DRAWINGS

Certain features of the disclosed technology are illustrated in various embodiments with reference to the attached drawings.

FIG. 1 is a block diagram illustrating a PIM system according to an embodiment of the present disclosure.

FIG. 2 is a block diagram illustrating a PIM system according to a first embodiment of the present disclosure.

FIG. 4 is a block diagram illustrating an example of a configuration of a MAC operator of a PIM device included in a PIM system according to a first embodiment of the present disclosure.

FIGS. 7 to 13 are block diagrams illustrating processes of the MAC arithmetic operation illustrated in FIG. 5 in a PIM system according to a first embodiment of the present disclosure.

FIG. 16 illustrates an example of a configuration of a MAC operator for performing the MAC arithmetic operation of FIG. 14 in a PIM system according to a first embodiment of the present disclosure.

FIG. 19 illustrates an example of a configuration of a MAC operator for performing the MAC arithmetic operation of FIG. 17 in a PIM system according to a first embodiment of the present disclosure.

FIG. 20 is a block diagram illustrating a PIM system according to a second embodiment of the present disclosure.

FIG. 22 is a flowchart illustrating processes of the MAC arithmetic operation illustrated in FIG. 5 in a PIM system according to a second embodiment of the present disclosure.

FIGS. 23 to 26 are block diagrams illustrating processes of the MAC arithmetic operation illustrated in FIG. 5 in a PIM system according to a second embodiment of the present disclosure.

FIG. 28 is a flowchart illustrating processes of the MAC arithmetic operation illustrated in FIG. 17 in a PIM system according to a second embodiment of the present disclosure.

FIG. 29 is a block diagram illustrating a PIM system according to yet another embodiment of the present disclosure.

FIG. 30 is a block diagram illustrating a PIM system according to still another embodiment of the present disclosure.

FIG. 33 illustrates an embodiment of the first multiplier of a multiplication circuit of FIG. 31.

FIG. 34 illustrates an embodiment of data types of the input data and the output data of a first floating-point-to-fixed-point converter in the MAC operator of FIG. 31.

FIG. 42 illustrates a MAC operator according to another embodiment of the present disclosure.

FIG. 49 is a table illustrating an operation of the round bit generating circuit of FIG. 48.

FIG. 50 illustrates a MAC operator according to another embodiment of the present disclosure.

FIG. 51 illustrates an embodiment of data formats of input data and output data of a first multiplier in the MAC operator of FIG. 50.

FIG. 52 illustrates an embodiment of data formats of the input data and output data of a first floating-point-to-fixed-point converter in the MAC operator of FIG. 50.

FIG. 56 illustrates a process of generating mantissa bits of floating-point format output data in the fixed-point-to-floating-point converter of FIG. 55.

FIG. 57 illustrates an embodiment of a neural network system according to an embodiment of the present disclosure.

FIG. 59 is a table illustrating four 16-bit floating-point data formats according to various embodiments of the present disclosure.

FIG. 62 illustrates setting reference values of the overflow/underfloor checker of FIG. 61.

FIG. 63 illustrates an embodiment of an exponent generator of the data type converter of FIG. 60.

FIG. 66 illustrates an embodiment of the data type modulator of FIG. 65.

FIG. 71 illustrates a MAC operator according to another embodiment of the present disclosure.

FIG. 72 illustrates a MAC operator according to another embodiment of the present disclosure.

FIG. 79 illustrates an example of matrix multiplication performed by a MAC operation of a MAC operator and a floating-point data format of weight data.

FIG. 81 is a block diagram illustrating a MAC operator according to yet another embodiment of the present disclosure.

FIG. 84 is a block diagram illustrating an example of a configuration of a maximum exponent output circuit of the pre-processing circuit of FIG. 83.

FIG. 88 is a block diagram illustrating an example of a configuration of an adder tree of the MAC operator of FIG. 81.

FIG. 89 is a circuit diagram illustrating an example of a configuration of an accumulator of the MAC operator of FIG. 81.

FIGS. 95 and 96 are block diagrams illustrating examples of a configuration and an operation of an accumulator of the MAC operator of FIG. 94, respectively.

FIG. 107 is a table illustrating the number of bits shifted depending on a value of the exponent lower data in the first shifting circuit of FIG. 105.

FIG. 114 illustrates an example of a configuration of a first normalizer of the accumulator of FIG. 111.

FIG. 121 is a diagram illustrating an example of matrix multiplication performed by a MAC operation of a MAC operator separated into a left MAC operator and a right MAC operator according to yet another embodiment of the present disclosure and a floating-point format of weight data.

FIG. 122 illustrates an example of a configuration of a MAC operator for performing matrix multiplication of FIG. 121.

FIG. 133 illustrates yet another example of a MAC operator for performing matrix multiplication of FIG. 121.

FIG. 134 illustrates an example of a configuration of a left multiplication circuit of the MAC operator of FIG. 133.

FIG. 135 illustrates an example of a configuration of a first multiplier of the left multiplication circuit of FIG. 134.

FIG. 136 illustrates an example of a configuration of a left pre-processing circuit of the MAC operator of FIG. 133.

FIG. 137 illustrates an example of a configuration of a left exponent pre-processing circuit of the left pre-processing circuit of FIG. 136.

DETAILED DESCRIPTION

Figure 3:
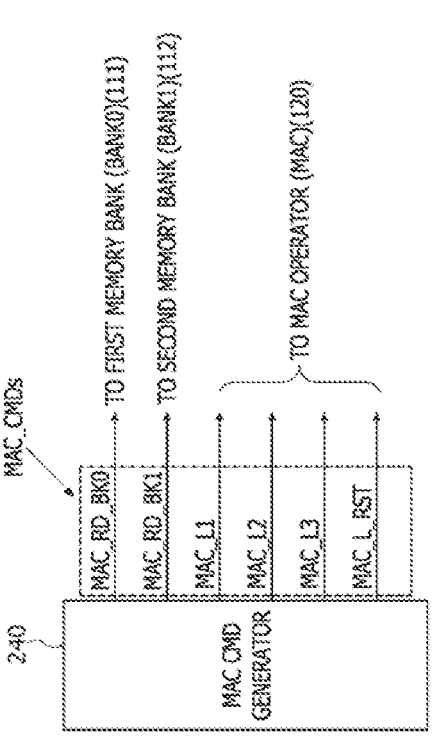
FIG. 3 illustrates MAC commands that are output from a MAC command generator of a PIM controller included in a PIM system according to a first embodiment of the present disclosure.

In the following description of embodiments, it will be understood that the terms "first" and "second" are intended to identify elements, but not used to define a particular number or sequence of elements. In addition, when an element is referred to as being located "on," "over," "above," "under," or "beneath" another element, it is intended to mean a relative positional relationship, but not used to limit certain cases in which the element directly contacts the other element, or at least one intervening element is present therebetween. Accordingly, the terms such as "on," "over," "above," "under," "beneath," "below," and the like that are used herein are for the purpose of describing particular embodiments only and are not intended to limit the scope of the present disclosure. Further, when an element is referred to as being "connected" or "coupled" to another element, the element may be electrically or mechanically connected or coupled to the other element directly, or may be electrically or mechanically connected or coupled to the other element indirectly with one or more addition elements therebetween.

Various embodiments are directed to PIM systems and methods of operating the PIM systems.

Figure 1:
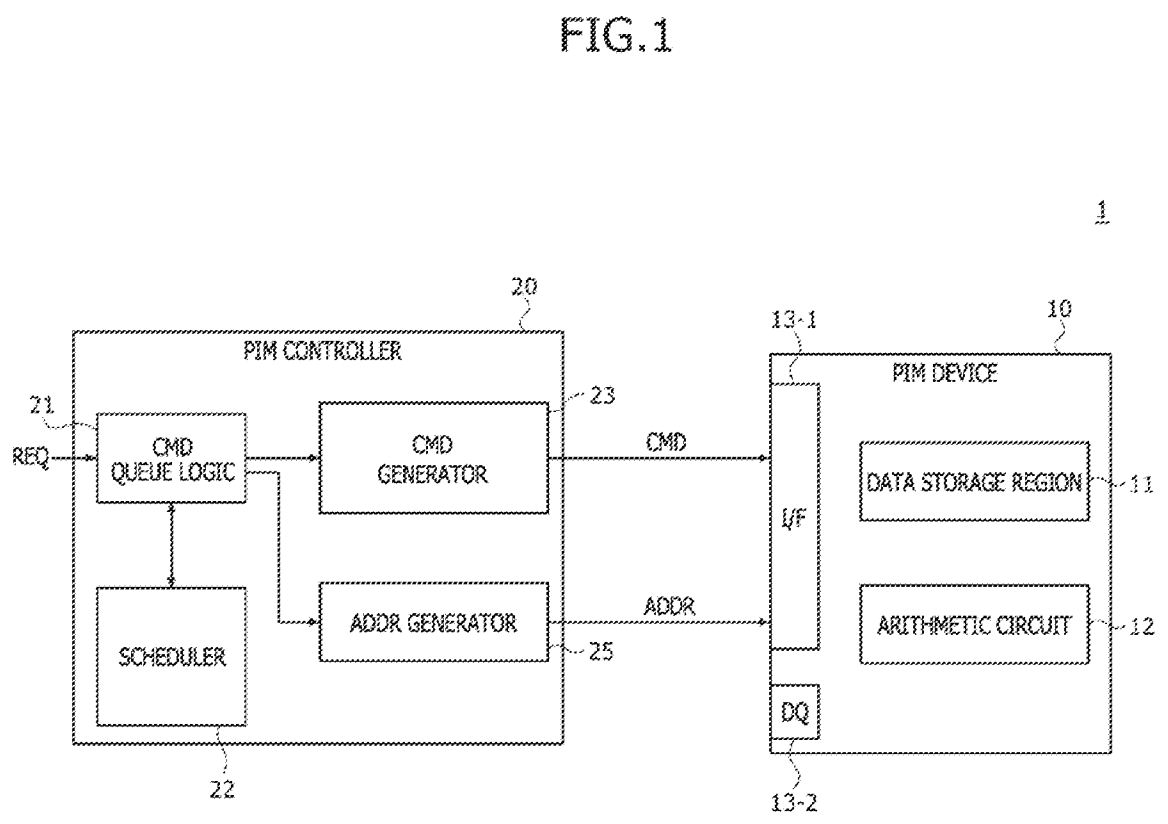

FIG. 1 is a block diagram illustrating a PIM system according to an embodiment of the present disclosure. As illustrated in FIG. 1, the PIM system 1 may include a PIM device 10 and a PIM controller 20. The PIM device 10 may include a data storage region 11, an arithmetic circuit 12, an interface (I/F) 13-1, and a data (DQ) input/output (I/O) pad 13-2. The data storage region 11 may include a first storage region and a second storage region. In an embodiment, the first storage region and the second storage region may be a first memory bank and a second memory bank, respectively. In another embodiment, the first data storage region and the second storage region may be a memory bank and buffer memory, respectively. The data storage region 11 may include a volatile memory element or a non-volatile memory element. For an embodiment, the data storage region 11 may include both a volatile memory element and a non-volatile memory element.

The arithmetic circuit 12 may perform an arithmetic operation on the data transferred from the data storage region 11. In an embodiment, the arithmetic circuit 12 may include a multiplying-and-accumulating (MAC) operator. The MAC operator may perform a multiplying calculation on the data transferred from the data storage region 11 and perform an accumulating calculation on the multiplication result data. After MAC operations, the MAC operator may output MAC result data. The MAC result data may be stored in the data storage region 11 or output from the PIM device 10 through the data I/O pad 13-2.

The interface 13-1 of the PIM device 10 may receive a command CMD and address ADDR the PIM controller 20. The interface 13-1 may output the command CMD to the data storage region 11 or the arithmetic circuit 12 in the PIM device 10. The interface 13-1 may output the address ADDR the data storage region 11 in the PIM device 10. The data I/O pad 13-2 of the PIM device 10 may function as a data communication terminal between a device external to the PIM device 10, for example the PIM controller 20, and the data storage region 11 included in the PIM device 10. The external device to the PIM device 10 may correspond to the PIM controller 20 of the PIM system 1 or a host located outside the PIM system 1. Accordingly, data that is output from the host or the PIM controller 20 may be inputted into the PIM device 10 through the data I/O pad 13-2.

The PIM controller 20 may control operations of the PIM device 10. In an embodiment, the PIM controller 20 may control the PIM device 10 such that the PIM device 10 operates in a memory mode or an arithmetic mode. In the event that the PIM controller 20 controls the PIM device 10 such that the PIM device 10 operates in the memory mode, the PIM device 10 may perform a data read operation or a data write operation for the data storage region 11. In the event that the PIM controller 20 controls the PIM device 10 such that the PIM device 10 operates in the arithmetic mode, the arithmetic circuit 12 of the PIM device 10 may receive first data and second data from the data storage region 11 to perform an arithmetic operation. In the event that the PIM controller 20 controls the PIM device 10 such that the PIM device 10 operates in the arithmetic mode, the PIM device 10 may also perform the data read operation and the data write operation for the data storage region 11 to execute the arithmetic operation. The arithmetic operation may be a deterministic arithmetic operation performed during a predetermined fixed time. The word "predetermined" as used herein with respect to a parameter, such as a predetermined fixed time or time period, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

The PIM controller 20 may be configured to include command queue logic 21, a scheduler 22, a command (CMD) generator 23, and an address (ADDR) generator 25. The command queue logic 21 may receive a request REQ from an external device (e.g., a host of the PIM system 1) and store the command queue corresponding to the request REQ in the command queue logic 21. The command queue logic 21 may transmit information on a storage status of the command queue to the scheduler 22 whenever the command queue logic 21 stores the command queue. The command queue stored in the command queue logic 21 may be transmitted to the command generator 23 according to a sequence determined by the scheduler 22. The command queue logic 21, and also the command queue logic 210 of FIGS. 2 and 20, may be implemented as hardware, software, or a combination of hardware and software. For example, the command queue logic 21 and/or 210 may be a command queue logic circuit operating in accordance with an algorithm and/or a processor executing command queue logic code.

The scheduler 22 may adjust a sequence of the command queue when the command queue stored in the command queue logic 21 is output from the command queue logic 21. In order to adjust the output sequence of the command queue stored in the command queue logic 21, the scheduler 22 may analyze the information on the storage status of the command queue provided by the command queue logic 21 and may readjust a process sequence of the command queue so that the command queue is processed according to a proper sequence.

The command generator 23 may receive the command queue related to the memory mode of the PIM device 10 and the MAC mode of the PIM device 10 from the command queue logic 21. The command generator 23 may decode the command queue to generate and output the command CMD. The command CMD may include a memory command for the memory mode or an arithmetic command for the arithmetic mode. The command CMD that is output from the command generator 23 may be transmitted to the PIM device 10.

The command generator 23 may be configured to generate and transmit the memory command to the PIM device 10 in the memory mode. The command generator 23 may be configured to generate and transmit a plurality of arithmetic commands to the PIM device 10 in the arithmetic mode. In one example, the command generator 23 may be configured to generate and output first to fifth arithmetic commands with predetermined time intervals in the arithmetic mode. The first arithmetic command may be a control signal for reading the first data out of the data storage region 11. The second arithmetic command may be a control signal for reading the second data out of the data storage region 11. The third arithmetic command may be a control signal for latching the first data in the arithmetic circuit 12. The fourth arithmetic command may be a control signal for latching the second data in the arithmetic circuit 12. And the fifth MAC command may be a control signal for latching arithmetic result data of the arithmetic circuit 12.

The address generator 25 may receive address information from the command queue logic 21 and generate the address ADDR accessing a region in the data storage region 11. In an embodiment, the address ADDR include a bank address, a row address, and a column address. The address ADDR that is output from the address generator 25 may be inputted to the data storage region 11 through the interface (I/F) 13-1.

Figure 2:
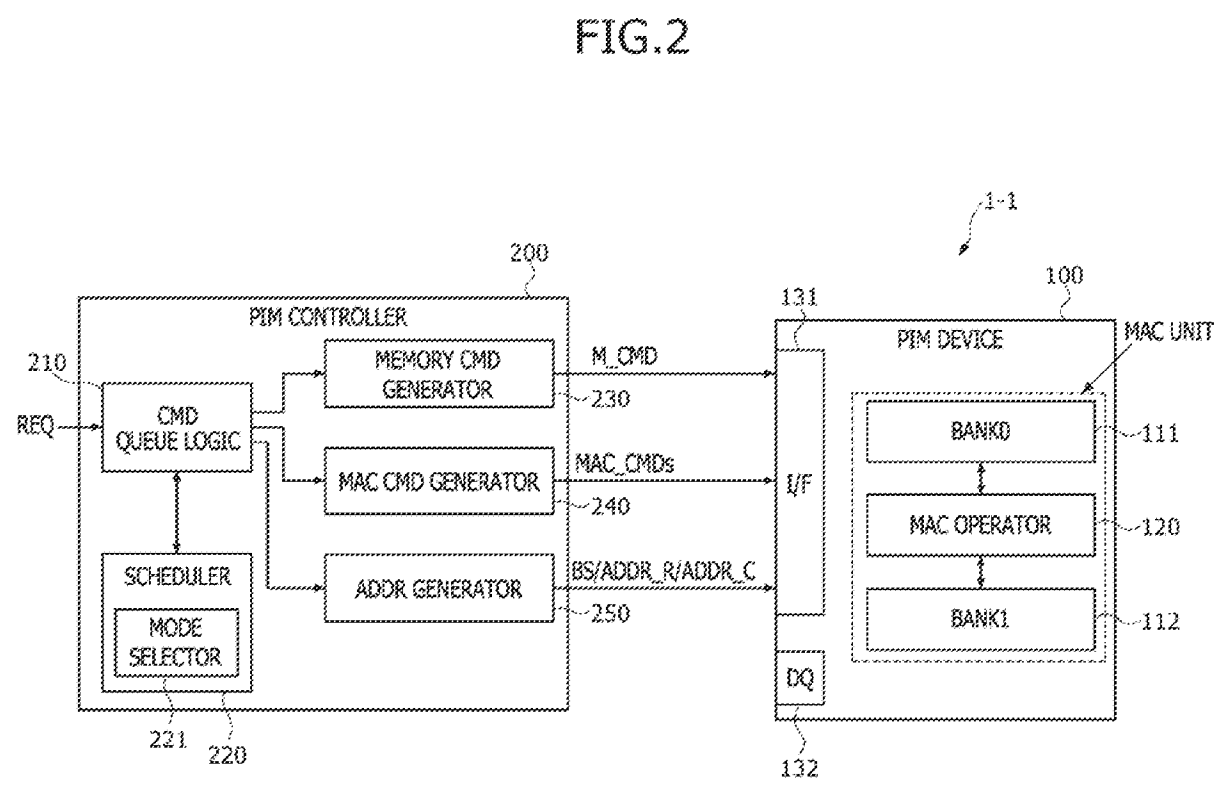

FIG. 2 is a block diagram illustrating a PIM system 1-1 according to a first embodiment of the present disclosure. As illustrated in FIG. 2, the PIM system 1-1 may include a PIM device 100 and a PIM controller 200. The PIM device 100 may include a first memory bank (BANK0) 111, a second memory bank (BANK1) 112, a MAC operator 120, an interface (I/F) 131, and a data input/output (I/O) pad 132. For an embodiment, the MAC operator 120 represents a MAC operator circuit. The first memory bank (BANK0) 111, the second memory bank (BANK1) 112, and the MAC operator 120 included in the PIM device 100 may constitute one MAC unit. In another embodiment, the PIM device 100 may include a plurality of MAC units. The first memory bank (BANK0) 111 and the second memory bank (BANK1) 112 may represent a memory region for storing data, for example, a DRAM device. Each of the first memory bank (BANK0) 111 and the second memory bank (BANK1) 112 may be a component unit which is independently activated and may be configured to have the same data bus width as data I/O lines in the PIM device 100. In an embodiment, the first and second memory banks 111 and 112 may operate through interleaving such that an active operation of the first and second memory banks 111 and 112 is performed in parallel while another memory bank is selected. Each of the first and second memory banks 111 and 112 may include at least one cell array which includes memory unit cells located at cross points of a plurality of rows and a plurality of columns.

Although not shown in the drawings, a core circuit may be disposed adjacent to the first and second memory banks 111 and 112. The core circuit may include X-decoders XDECs and Y-decoders/IO circuits YDEC/IOs. An X-decoder XDEC may also be referred to as a word line decoder or a row decoder. The X-decoder XDEC may receive a row address ADD_R from the PIM controller 200 and may decode the row address ADD_R to select and enable one of the rows (i.e., word lines) coupled to the selected memory bank. Each of the Y-decoders/IO circuits YDEC/IOs may include a Y-decoder YDEC and an I/O circuit IO. The Y-decoder YDEC may also be referred to as a bit line decoder or a column decoder. The Y-decoder YDEC may receive a column address ADDR_C from the PIM controller 200 and may decode the column address ADDR_C to select and enable at least one of the columns (i.e., bit lines) coupled to the selected memory bank. Each of the I/O circuits may include an I/O sense amplifier for sensing and amplifying a level of a read datum that is output from the corresponding memory bank during a read operation for the first and second memory banks 111 and 112. In addition, the I/O circuit may include a write driver for driving a write datum during a write operation for the first and second memory banks 111 and 112.

The interface 131 of the PIM device 100 may receive a memory command M_CMD, MAC commands MAC_CMDs, a bank selection signal BS, and the row/column addresses ADDR_R/ADDR_C from the PIM controller 200. The interface 131 may output the memory command M_CMD, together with the bank selection signal BS and the row/column addresses ADDR_R/ADDR_C, to the first memory bank 111 or the second memory bank 112. The interface 131 may output the MAC commands MAC_CMDs to the first memory bank 111, the second memory bank 112, and the MAC operator 120. In such a case, the interface 131 may output the bank selection signal BS and the row/column addresses ADDR_R/ADDR_C to both of the first memory bank 111 and the second memory bank 112. The data I/O pad 132 of the PIM device 100 may function as a data communication terminal between a device external to the PIM device 100 and the MAC unit (which includes the first and second memory banks 111 and 112 and the MAC operator 120) included in the PIM device 100. The external device to the PIM device 100 may correspond to the PIM controller 200 of the PIM system 1-1 or a host located outside the PIM system 1-1. Accordingly, data that is output from the host or the PIM controller 200 may be inputted into the PIM device 100 through the data I/O pad 132.

The PIM controller 200 may control operations of the PIM device 100. In an embodiment, the PIM controller 200 may control the PIM device 100 such that the PIM device 100 operates in a memory mode or a MAC mode. In the event that the PIM controller 200 controls the PIM device 100 such that the PIM device 100 operates in the memory mode, the PIM device 100 may perform a data read operation or a data write operation for the first memory bank 111 and the second memory bank 112. In the event that the PIM controller 200 controls the PIM device 100 such that the PIM device 100 operates in the MAC mode, the PIM device 100 may perform a MAC arithmetic operation for the MAC operator 120. In the event that the PIM controller 200 controls the PIM device 100 such that the PIM device 100 operates in the MAC mode, the PIM device 100 may also perform the data read operation and the data write operation for the first and second memory banks 111 and 112 to execute the MAC arithmetic operation.

The PIM controller 200 may be configured to include command queue logic 210, a scheduler 220, a memory command generator 230, a MAC command generator 240, and an address generator 250. The command queue logic 210 may receive a request REQ from an external device (e.g., a host of the PIM system 1-1) and store a command queue corresponding to the request REQ in the command queue logic 210. The command queue logic 210 may transmit information on a storage status of the command queue to the scheduler 220 whenever the command queue logic 210 stores the command queue. The command queue stored in the command queue logic 210 may be transmitted to the memory command generator 230 or the MAC command generator 240 according to a sequence determined by the scheduler 220. When the command queue that is output from the command queue logic 210 includes command information requesting an operation in the memory mode of the PIM device 100, the command queue logic 210 may transmit the command queue to the memory command generator 230. On the other hand, when the command queue that is output from the command queue logic 210 is command information requesting an operation in the MAC mode of the PIM device 100, the command queue logic 210 may transmit the command queue to the MAC command generator 240. Information on whether the command queue relates to the memory mode or the MAC mode may be provided by the scheduler 220.

The scheduler 220 may adjust a timing of the command queue when the command queue stored in the command queue logic 210 is output from the command queue logic 210. In order to adjust the output timing of the command queue stored in the command queue logic 210, the scheduler 220 may analyze the information on the storage status of the command queue provided by the command queue logic 210 and may readjust a process sequence of the command queue such that the command queue is processed according to a proper sequence. The scheduler 220 may output and transmit to the command queue logic 210 information on whether the command queue that is output from the command queue logic 210 relates to the memory mode of the PIM device 100 or relates to the MAC mode of the PIM device 100. In order to obtain the information on whether the command queue that is output from the command queue logic 210 relates to the memory mode or the MAC mode, the scheduler 220 may include a mode selector 221. The mode selector 221 may generate a mode selection signal with information on whether the command queue stored in the command queue logic 210 relates to the memory mode or the MAC mode, and the scheduler 220 may transmit the mode selection signal to the command queue logic 210.

The memory command generator 230 may receive the command queue related to the memory mode of the PIM device 100 from the command queue logic 210. The memory command generator 230 may decode the command queue to generate and output the memory command M_CMD. The memory command M_CMD that is output from the memory command generator 230 may be transmitted to the PIM device 100. In an embodiment, the memory command M_CMD may include a memory read command and a memory write command. When the memory read command is output from the memory command generator 230, the PIM device 100 may perform the data read operation for the first memory bank 111 or the second memory bank 112. Data which are read out of the PIM device 100 may be transmitted to an external device through the data I/O pad 132. The read data that is output from the PIM device 100 may be transmitted to a host through the PIM controller 200. When the memory write command is output from the memory command generator 230, the PIM device 100 may perform the data write operation for the first memory bank 111 or the second memory bank 112. In such a case, data to be written into the PIM device 100 may be transmitted from the host to the PIM device 100 through the PIM controller 200. The write data inputted to the PIM device 100 may be transmitted to the first memory bank 111 or the second memory bank 112 through the data I/O pad 132.

The MAC command generator 240 may receive the command queue related to the MAC mode of the PIM device 100 from the command queue logic 210. The MAC command generator 240 may decode the command queue to generate and output the MAC commands MAC_CMDs. The MAC commands MAC_CMDs that are output from the MAC command generator 240 may be transmitted to the PIM device 100. The data read operation for the first memory bank 111 and the second memory bank 112 of the PIM device 100 may be performed by the MAC commands MAC_CMDs that are output from the MAC command generator 240, and the MAC arithmetic operation of the MAC operator 120 may also be performed by the MAC commands MAC_CMDs that are output from the MAC command generator 240. The MAC commands MAC_CMDs and the MAC arithmetic operation of the PIM device 100 according to the MAC commands MAC_CMDs will be described in detail with reference to FIG. 3.

The address generator 250 may receive address information from the command queue logic 210. The address generator 250 may generate the bank selection signal BS for selecting one of the first and second memory banks 111 and 112 and may transmit the bank selection signal BS to the PIM device 100. In addition, the address generator 250 may generate the row address ADDR_R and the column address ADDR_C for accessing a region (e.g., memory cells) in the first or second memory bank 111 or 112 and may transmit the row address ADDR_R and the column address ADDR_C to the PIM device 100.

FIG. 3 illustrates the MAC commands MAC_CMDs that are output from the MAC command generator 240 included in the PIM system 1-1 according to the first embodiment of the present disclosure. As illustrated in FIG. 3, the MAC commands MAC_CMDs may include first to sixth MAC command signals. In an embodiment, the first MAC command signal may be a first MAC read signal MAC_RD_BK0, the second MAC command signal may be a second MAC read signal MAC_RD_BK1, the third MAC command signal may be a first MAC input latch signal MAC_L1, the fourth MAC command signal may be a second MAC input latch signal MAC_L2, the fifth MAC command signal may be a MAC output latch signal MAC_L3, and the sixth MAC command signal may be a MAC latch reset signal MAC_L_RST.

The first MAC read signal MAC_RD_BK0 may control an operation for reading first data (e.g., weight data) out of the first memory bank 111 to transmit the first data to the MAC operator 120. The second MAC read signal MAC_RD_BK1 may control an operation for reading second data (e.g., vector data) out of the second memory bank 112 to transmit the second data to the MAC operator 120. The first MAC input latch signal MAC_L1 may control an input latch operation of the weight data that is transmitted from the first memory bank 111 to the MAC operator 120. The second MAC input latch signal MAC_L2 may control an input latch operation of the vector data that is transmitted from the second memory bank 112 to the MAC operator 120. If the input latch operations of the weight data and the vector data are performed, the MAC operator 120 may perform the MAC arithmetic operation to generate MAC result data corresponding to the result of the MAC arithmetic operation. The MAC output latch signal MAC_L3 may
control an output latch operation of the MAC result data
generated by the MAC operator 120. And, the MAC latch
reset signal MAC_L_RST may control an output operation
of the MAC result data generated by the MAC operator 120
and a reset operation of an output latch included in the MAC
operator 120.

The PIM system 1-1 according to the present embodiment
may be configured to perform a deterministic MAC arith-
metic operation. The term "deterministic MAC arithmetic
operation" used in the present disclosure may be defined as
the MAC arithmetic operation performed in the PIM system
1-1 during a predetermined fixed time. Thus, the MAC
commands MAC_CMDs transmitted from the PIM control-
ler 200 to the PIM device 100 may be sequentially generated
with fixed time intervals. Accordingly, the PIM controller
200 does not require any extra end signals of various
operations executed for the MAC arithmetic operation to
generate the MAC commands MAC_CMDs for controlling
the MAC arithmetic operation. In an embodiment, latencies
of the various operations executed by MAC commands
MAC_CMDs for controlling the MAC arithmetic operation
may be set to have fixed values in order to perform the
deterministic MAC arithmetic operation. In such a case, the
MAC commands MAC_CMDs may be sequentially output
from the PIM controller 200 with fixed time intervals
corresponding to the fixed latencies.

For example, the MAC command generator 240 is to
configured to output the first MAC command at a first point
in time. The MAC command generator 240 is configured to
output the second MAC command at a second point in time
when a first latency elapses from the first point in time. The
first latency is set as the time it takes to read the first data out
of the first storage region based on the first MAC command
and to output the first data to the MAC operator. The MAC
command generator 240 is configured to output the third
MAC command at a third point in time when a second
latency elapses from the second point in time. The second
latency is set as the time it takes to read the second data out
of the second storage region based on the second MAC
command and to output the second data to the MAC
operator. The MAC command generator 240 is configured to
output the fourth MAC command at a fourth point in time
when a third latency elapses from the third point in time. The
third latency is set as the time it takes to latch the first data
in the MAC operator based on the third MAC command. The
MAC command generator 240 is configured to output the
fifth MAC command at a fifth point in time when a fourth
latency elapses from the fourth point in time. The fourth
latency is set as the time it takes to latch the second data in
the MAC operator based on the fourth MAC command and
to perform the MAC arithmetic operation of the first and
second data which are latched in the MAC operator. The
MAC command generator 240 is configured to output the
sixth MAC command at a sixth point in time when a fifth
latency elapses from the fifth point in time. The fifth latency
is set as the time it takes to perform an output latch operation
of MAC result data generated by the MAC arithmetic
operation.

Figure 4:
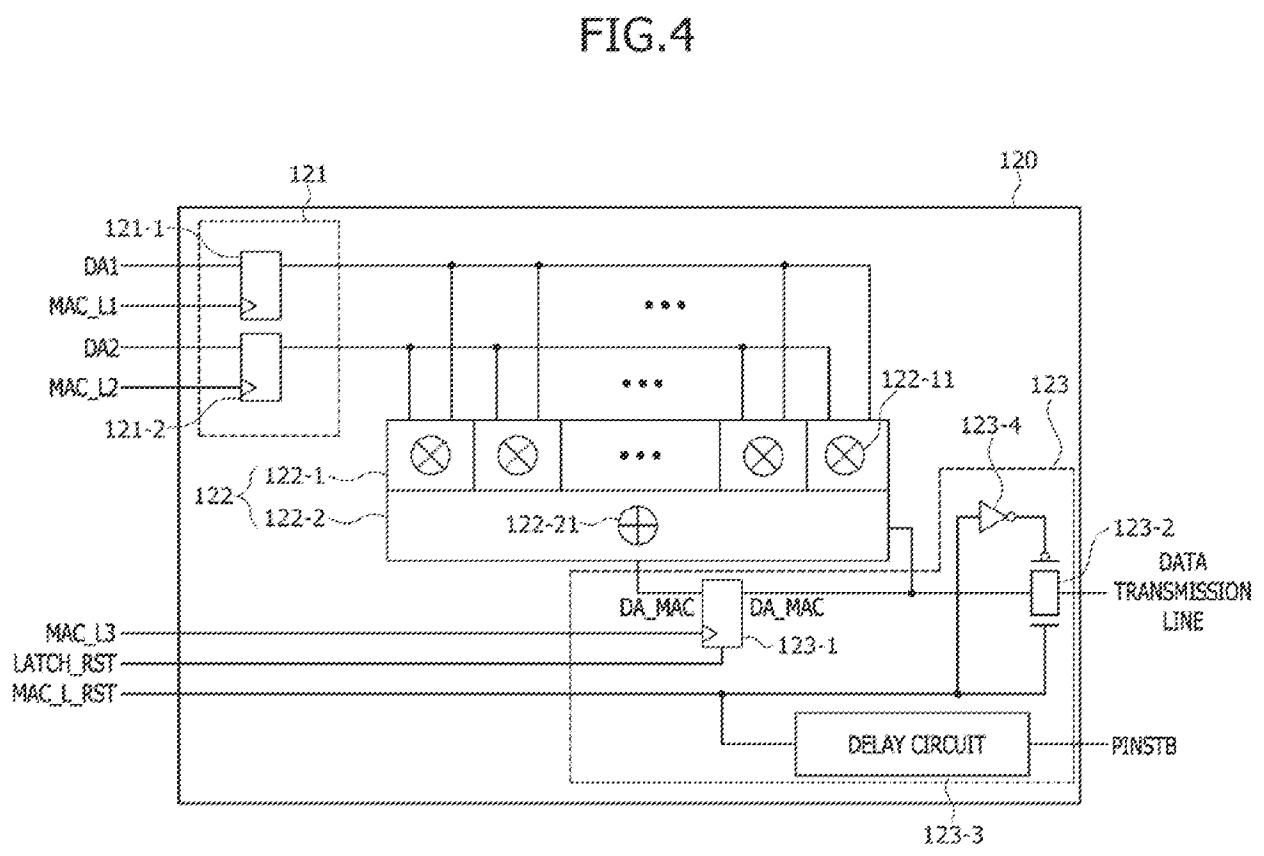

FIG. 4 illustrates an example of the MAC operator 120 of
the PIM device 100 included in the PIM system 1-1 accord-
ing to the first embodiment of the present disclosure. Refer-
ring to FIG. 4, MAC operator 120 may be configured to
include a data input circuit 121, a MAC circuit 122, and a
data output circuit 123. The data input circuit 121 may
include a first input latch 121-1 and a second input latch
121-2. The MAC circuit 122 may include a multiplication logic circuit 122-1 and an addition logic circuit 122-2. The
data output circuit 123 may include an output latch 123-1, a
transfer gate 123-2, a delay circuit 123-3, and an inverter
123-4. In an embodiment, the first input latch 121-1, the
second input latch 121-2, and the output latch 123-1 may be
realized by using flip-flops.

The data input circuit 121 of the MAC operator 120 may
be synchronized with the first MAC input latch signal
MAC_L1 to latch first data DA1 transferred from the first
memory bank 111 to the MAC circuit 122 through an
internal data transmission line. In addition, the data input
circuit 121 of the MAC operator 120 may be synchronized
with the second MAC input latch signal MAC_L2 to latch
second data DA2 transferred from the second memory bank
112 to the MAC circuit 122 through another internal data
transmission line. Because the first MAC input latch signal
MAC_L1 and the second MAC input latch signal MAC_L2
are sequentially transmitted from the MAC command gen-
erator 240 of the PIM controller 200 to the MAC operator
120 of the PIM device 100 with a predetermined time
interval, the second data DA2 may be inputted to the MAC
circuit 122 of the MAC operator 120 after the first data DA1
is inputted to the MAC circuit 122 of the MAC operator 120.

The MAC circuit 122 may perform the MAC arithmetic
operation of the first data DA1 and the second data DA2
inputted through the data input circuit 121. The multiplica-
tion logic circuit 122-1 of the MAC circuit 122 may include
a plurality of multipliers 122-11. Each of the multipliers
122-11 may perform a multiplying calculation of the first
data DA1 that is output from the first input latch 121-1 and
the second data DA2 that is output from the second input
latch 121-2 and may output the result of the multiplying
calculation. Bit values constituting the first data DA1 may be
separately inputted to the multipliers 122-11. Similarly, bit
values constituting the second data DA2 may also be sepa-
rately inputted to the multipliers 122-11. For example, if the
first data DA1 is represented by an 'N'-bit binary stream, the
second data DA2 is represented by an 'N'-bit binary stream,
and the number of the multipliers 122-11 is then 'M'-bit
portions of the first data DA1 and 'N/M'-bit portions of the
second data DA2 may be inputted to each of the multipliers
122-11.

The addition logic circuit 122-2 of the MAC circuit 122
may include a plurality of adders 122-21. Although not
shown in the drawings, the plurality of adders 122-21 may
be disposed to provide a tree structure with a plurality of
stages. Each of the adders 122-21 disposed at a first stage
may receive two sets of multiplication result data from two
of the multipliers 122-11 included in the multiplication logic
circuit 122-1 and may perform an adding calculation of the
two sets of multiplication result data to output the addition
result data. Each of the adders 122-21 disposed at a second
stage may receive two sets of addition result data from two
of the adders 122-21 disposed at the first stage and may
perform an adding calculation of the two sets of addition
result data to output the addition result data. The adder
122-21 disposed at a last stage may receive two sets of
addition result data from two adders 122-21 disposed at the
previous stage and may perform an adding calculation of the
two sets of addition result data to output the addition result
data. Although not shown in the drawings, the addition logic
circuit 122-2 may further include an additional adder for
performing an accumulative adding calculation of MAC
result data DA_MAC that is output from the adder 122-21
disposed at the last stage and previous MAC result data
DA_MAC stored in the output latch 123-1 of the data output
circuit 123.

The data output circuit 123 may output the MAC result data DA_MAC that is output from the MAC circuit 122 to a data transmission line. Specifically, the output latch 123-1 of the data output circuit 123 may be synchronized with the MAC output latch signal MAC_L3 to latch the MAC result data DA_MAC that is output from the MAC circuit 122 and to output the latched data of the MAC result data DA_MAC. The MAC result data DA_MAC that is output from the output latch 123-1 may be fed back to the MAC circuit 122 for the accumulative adding calculation. In addition, the MAC result data DA_MAC may be inputted to the transfer gate 123-2. The output latch 123-1 may be initialized if a latch reset signal LATCH_RST is inputted to the output latch 123-1. In such a case, all of data latched by the output latch 123-1 may be removed. In an embodiment, the latch reset signal LATCH_RST may be activated by generation of the MAC latch reset signal MAC_L_RST and may be inputted to the output latch 123-1.

The MAC latch reset signal MAC_L_RST that is output from the MAC command generator 240 may be inputted to the transfer gate 123-2, the delay circuit 123-3, and the inverter 123-4. The inverter 123-4 may inversely buffer the MAC latch reset signal MAC_L_RST to output the inversely buffered signal of the MAC latch reset signal MAC_L_RST to the transfer gate 123-2. The transfer gate 123-2 may transfer the MAC result data DA_MAC from the output latch 123-1 to the data transmission line in response to the MAC latch reset signal MAC_L_RST. The delay circuit 123-3 may delay the MAC latch reset signal MAC_L_RST by a certain time to generate and output a latch control signal PIMSTB.

Figure 5:
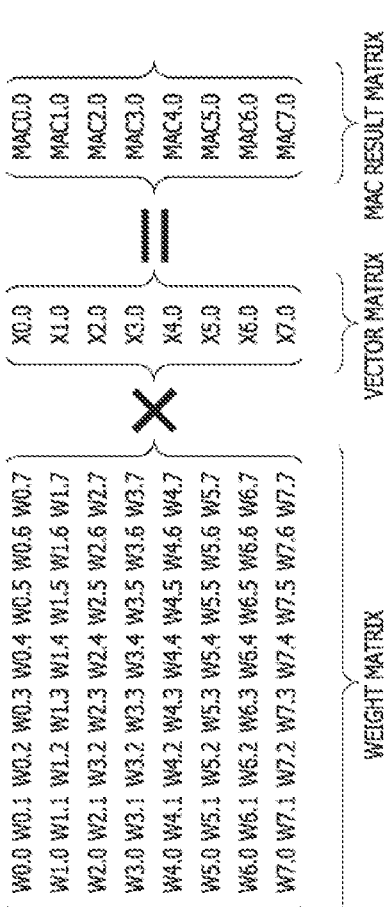
FIG. 5 illustrates an example of a MAC arithmetic operation performed in a PIM system according to a first embodiment of the present disclosure.

FIG. 5 illustrates an example of the MAC arithmetic operation performed in the PIM system 1-1 according to the first embodiment of the present disclosure. As illustrated in FIG. 5, the MAC arithmetic operation performed by the PIM system 1-1 may be executed though a matrix calculation. Specifically, the PIM device 100 may execute a matrix multiplying calculation of an 'M×N' weight matrix (e.g., '8×8' weight matrix) and a 'N×1' vector matrix (e.g., '8×1' vector matrix) according to control of the PIM controller 200 (where, 'M' and 'N' are natural numbers). Elements W0.0, . . . , and W7.7 constituting the weight matrix may correspond to the first data DA1 inputted to the MAC operator 120 from the first memory bank 111. Elements X0.0, . . . , and X7.0 constituting the vector matrix may correspond to the second data DA2 inputted to the MAC operator 120 from the second memory bank 112. Each of the elements W0.0, . . . , and W7.7 constituting the weight matrix may be represented by a binary stream with a plurality of bit values. In addition, each of the elements X0.0, . . . , and X7.0 constituting the vector matrix may also be represented by a binary stream with a plurality of bit values. The number of bits included in each of the elements W0.0, . . . , and W7.7 constituting the weight matrix may be equal to the number of bits included in each of the elements X0.0, . . . , and X7.0 constituting the vector matrix.

The matrix multiplying calculation of the weight matrix and the vector matrix may be appropriate for a multilayer perceptron-type neural network structure (hereinafter, referred to as an 'MLP-type neural network'). In general, the MLP-type neural network for executing deep learning may include an input layer, a plurality of hidden layers (e.g., at least three hidden layers), and an output layer. The matrix multiplying calculation (i.e., the MAC arithmetic operation) of the weight matrix and the vector matrix illustrated in FIG. 5 may be performed in one of the hidden layers. In a first hidden layer of the plurality of hidden layers, the MAC arithmetic operation may be performed by using vector data inputted to the first hidden layer. However, in each of second to last hidden layers among the plurality of hidden layers, the MAC arithmetic operation may be performed by using a calculation result of the previous hidden layer as the vector data.

Figure 6:
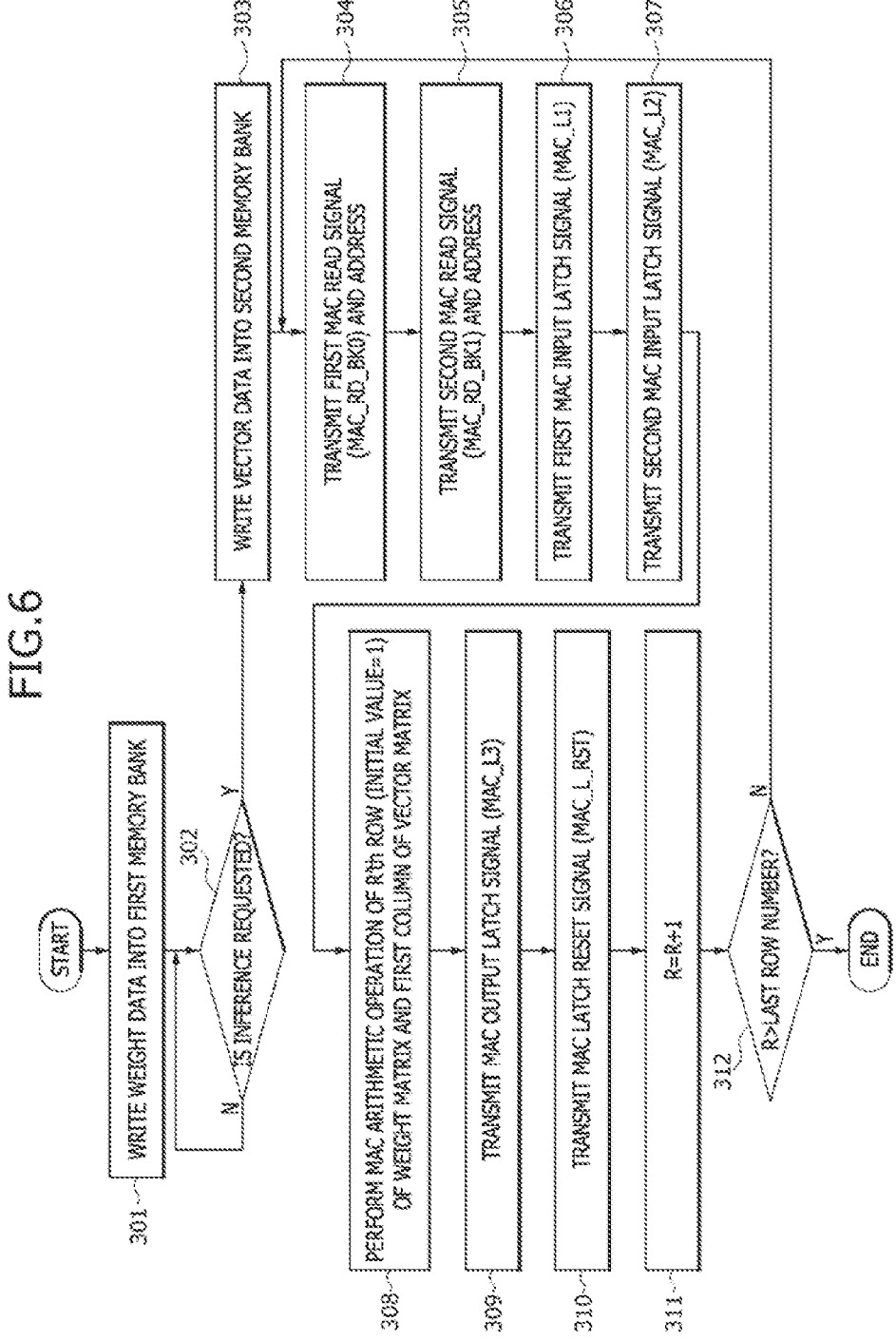
FIG. 6 is a flowchart illustrating processes of the MAC arithmetic operation illustrated in FIG. 5 in a PIM system according to a first embodiment of the present disclosure.

FIG. 6 is a flowchart illustrating processes of the MAC arithmetic operation described with reference to FIG. 5, which are performed in the PIM system 1-1 according to the first embodiment of the present disclosure. In addition, FIGS. 7 to 13 are block diagrams illustrating the processes of the MAC arithmetic operation illustrated in FIG. 5, which are performed in the PIM system 1-1 according to the first embodiment of the present disclosure. Referring to FIGS. 6 to 13, before the MAC arithmetic operation is performed, the first data (i.e., the weight data) may be written into the first memory bank 111 at a step 301. Thus, the weight data may be stored in the first memory bank 111 of the PIM device 100. In the present embodiment, it may be assumed that the weight data are the elements W0.0, . . . , and W7.7 constituting the weight matrix of FIG. 5. The integer before the decimal point is one less than a row number, and the integer after the decimal point is one less than a column number. Thus, for example, the weight W0.0 represents the element of the first row and the first column of the weight matrix.

At a step 302, whether an inference is requested may be determined. An inference request signal may be transmitted from an external device located outside of the PIM system 1-1 to the PIM controller 200 of the PIM system 1-1. An inference request, in some instances, may be based on user input. An inference request may initiate a calculation performed by the PIM system 1-1 to reach a determination based on input data. In an embodiment, if no inference request signal is transmitted to the PIM controller 200, the PIM system 1-1 may be in a standby mode until the inference request signal is transmitted to the PIM controller 200. Alternatively, if no inference request signal is transmitted to the PIM controller 200, the PIM system 1-1 may perform operations (e.g., data read/write operations) other than the MAC arithmetic operation in the memory mode until the inference request signal is transmitted to the PIM controller 200. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 5. If the inference request signal is transmitted to the PIM controller 200 at the step 302, then the PIM controller 200 may write the vector data that is transmitted with the inference request signal into the second memory bank 112 at a step 303. Accordingly, the vector data may be stored in the second memory bank 112 of the PIM device 100.

Figure 7:
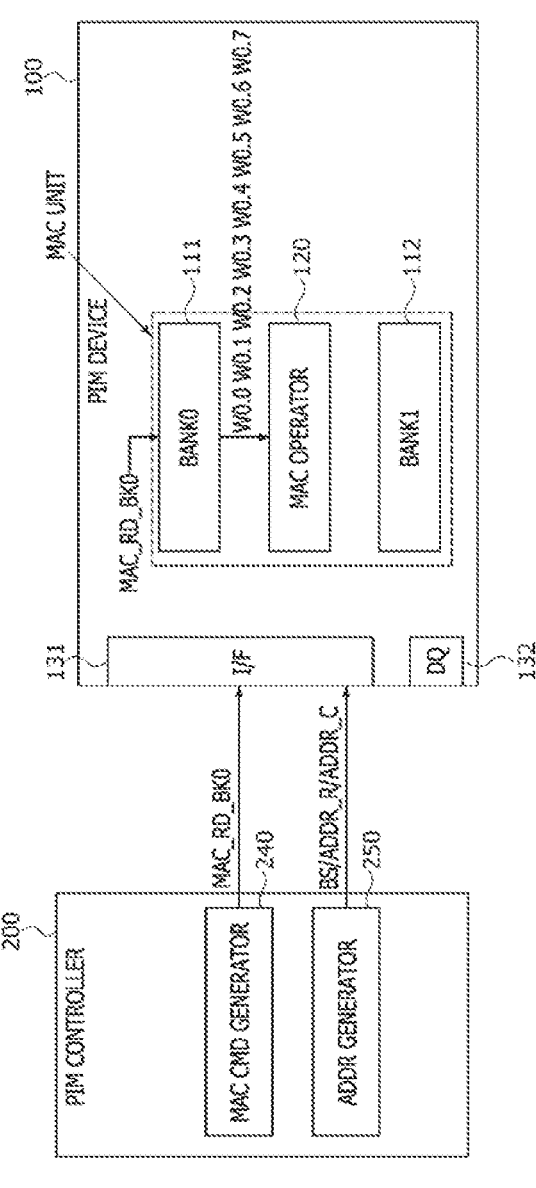

At a step 304, the MAC command generator 240 of the PIM controller 200 may generate and transmit the first MAC read signal MAC_RD_BK0 to the PIM device 100, as illustrated in FIG. 7. In such a case, the address generator 250 of the PIM controller 200 may generate and transmit the bank selection signal BS and the row/column address ADDR_R/ADDR_C to the PIM device 100. The bank selection signal BS may be generated to select the first memory bank 111 of the first and second memory banks 111 and 112. Thus, the first MAC read signal MAC_RD_BK0 may control the data read operation for the first memory bank 111 of the PIM device 100. The first memory bank 111 may output and transmit the elements W0.0, . . . , and W0.7 in the first row of the weight matrix of the weight data stored in a region of the first memory bank 111, which is selected by the row/column address ADDR_R/ADDR_C, to the MAC operator 120 in response to the first MAC read signal MAC_RD_BK0. In an embodiment, the data transmission from the first memory bank 111 to the MAC operator 120 may be executed through a global input/output (hereinafter, referred to as 'GIO') line which is provided as a data transmission path in the PIM device 100. Alternatively, the data transmission from the first memory bank 111 to the MAC operator 120 may be executed through a first bank input/output (hereinafter, referred to as 'BIO') line which is provided specifically for data transmission between the first memory bank 111 and the MAC operator 120.

Figure 8:
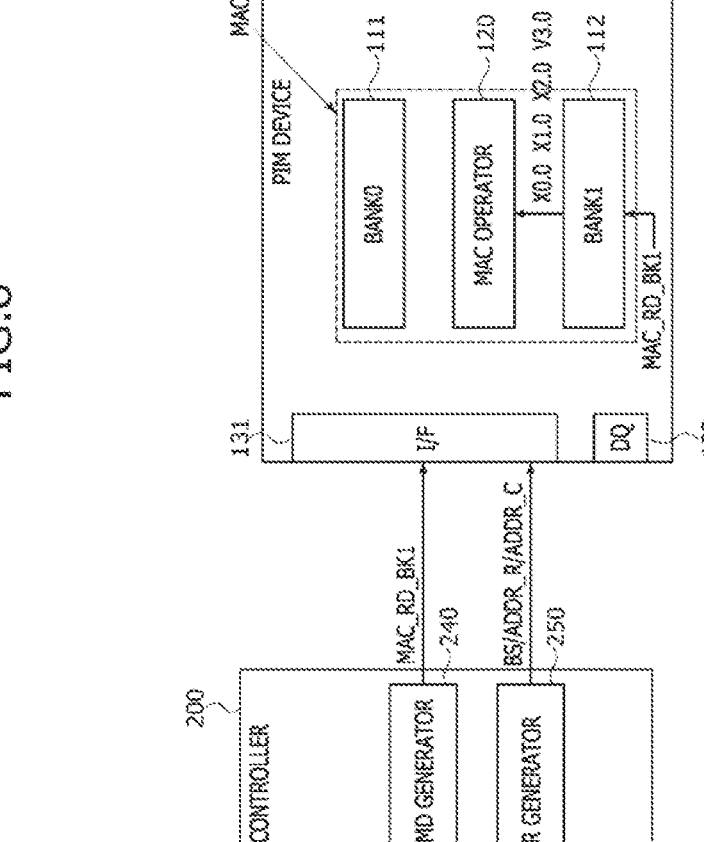

At a step 305, the MAC command generator 240 of the PIM controller 200 may generate and transmit the second MAC read signal MAC_RD_BK1 to the PIM device 100, as illustrated in FIG. 8. In such a case, the address generator 250 of the PIM controller 200 may generate and transmit the bank selection signal BS for selecting the second memory bank 112 and the row/column address ADDR_R/ADDR_C to the PIM device 100. The second MAC read signal MAC_RD_BK1 may control the data read operation for the second memory bank 112 of the PIM device 100. The second memory bank 112 may output and transmit the elements X0.0, and X7.0 in the first column of the vector matrix corresponding to the vector data stored in a region of the second memory bank 112, which is selected by the row/column address ADDR_R/ADDR_C, to the MAC operator 120 in response to the second MAC read signal MAC_RD_BK1. In an embodiment, the data transmission from the second memory bank 112 to the MAC operator 120 may be executed through the GIO line in the PIM device 100. Alternatively, the data transmission from the second memory bank 112 to the MAC operator 120 may be executed through a second BIO line which is provided specifically for data transmission between the second memory bank 112 and the MAC operator 120.

Figure 9:
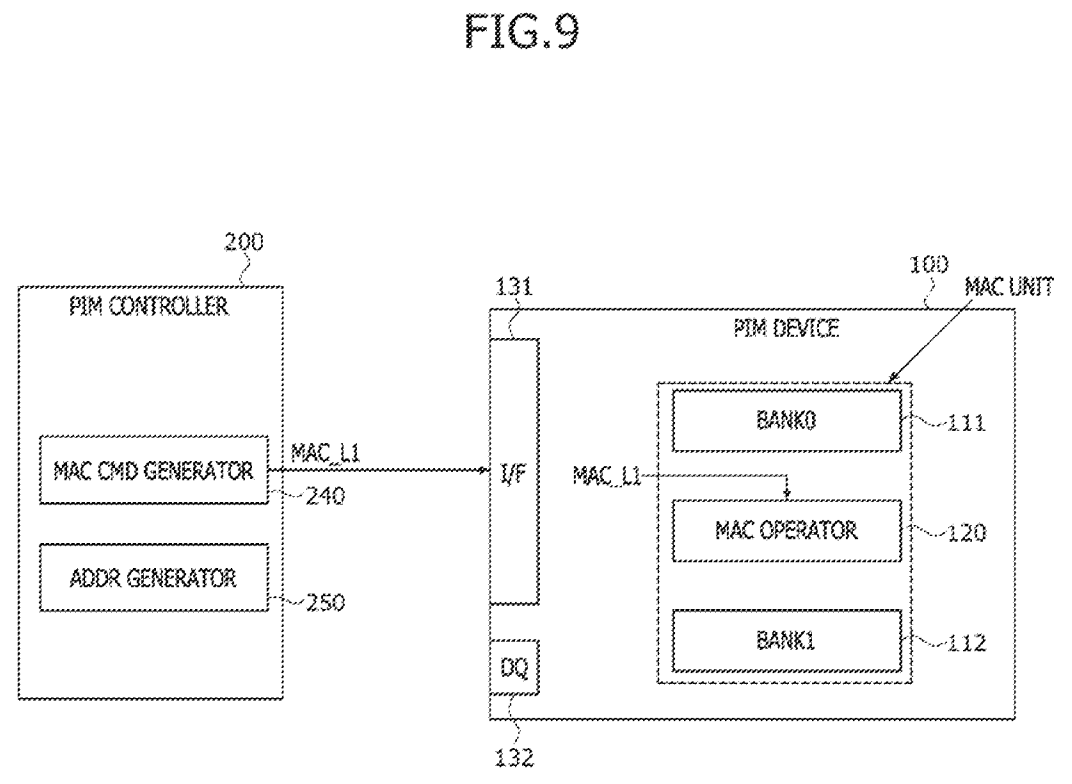
Figure 11:
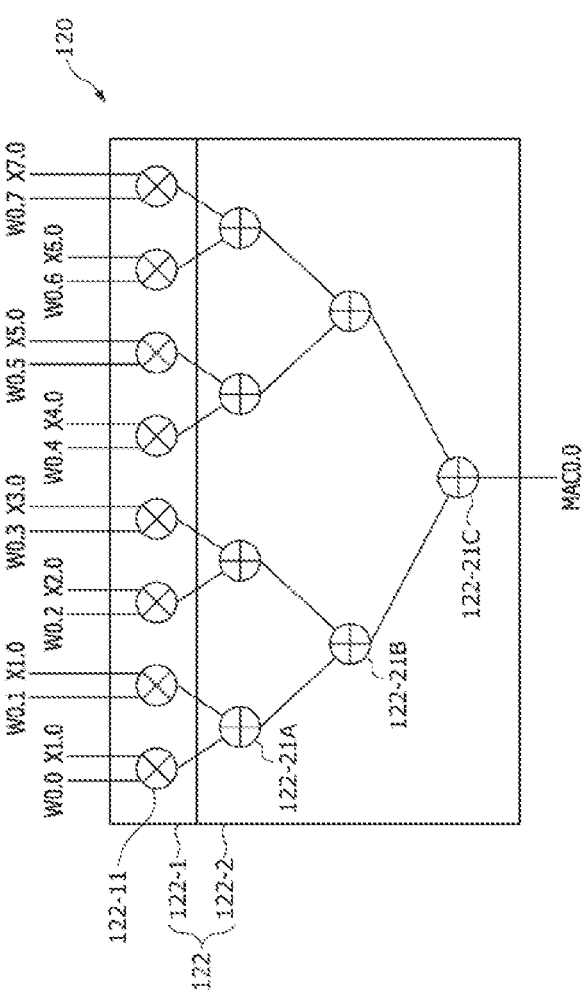

At a step 306, the MAC command generator 240 of the PIM controller 200 may generate and transmit the first MAC input latch signal MAC_L1 to the PIM device 100, as illustrated in FIG. 9. The first MAC input latch signal MAC_L1 may control the input latch operation of the first data for the MAC operator 120 of the PIM device 100. The elements W0.0, . . . , and W0.7 in the first row of the weight matrix may be inputted to the MAC circuit 122 of the MAC operator 120 by the input latch operation, as illustrated in FIG. 11. The MAC circuit 122 may include the plurality of multipliers 122-11 (e.g., eight multipliers 122-11), the number of which is equal to the number of columns of the weight matrix. In such a case, the elements W0.0, . . . , and W0.7 in the first row of the weight matrix may be inputted to the eight multipliers 122-11, respectively.

Figure 10:
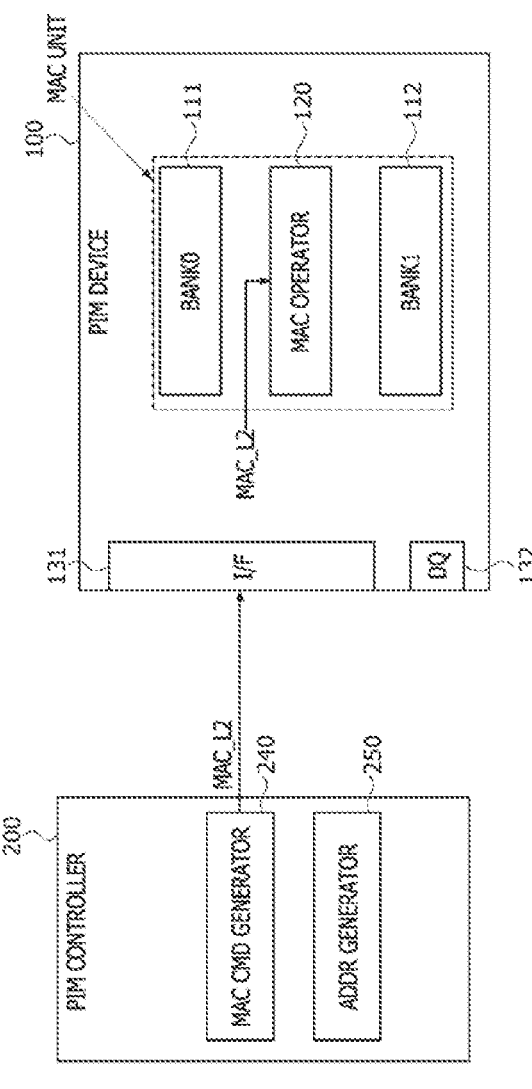

At a step 307, the MAC command generator 240 of the PIM controller 200 may generate and transmit the second MAC input latch signal MAC_L2 to the PIM device 100, as illustrated in FIG. 10. The second MAC input latch signal MAC_L2 may control the input latch operation of the second data for the MAC operator 120 of the PIM device 100. The elements X0.0, . . . , and X7.0 in the first column of the vector matrix may be inputted to the MAC circuit 122 of the MAC operator 120 by the input latch operation, as illustrated in FIG. 11. In such a case, the elements X0.0, . . . , and X7.0 in the first column of the vector matrix may be inputted to the eight multipliers 122-11, respectively.

At a step 308, the MAC circuit 122 of the MAC operator 120 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. For example, the scalar product is calculated of the Rth '1×N' row vector of the 'M×N' weight matrix and the 'N×1' vector matrix as an 'R×1' element of the 'M×1' MAC result matrix. For R=1, the scalar product of the first row of the weight matrix and the first column of the vector matrix shown in FIG. 5 is W0.0*X0.0+W0.1*X1.0+W0.2*X2.0+ W0.3*X3.0+W0.4*X4.0+W0.5*X5.0+W0.6*X6.0+ W0.7*X7.0. Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2, as illustrated in FIG. 11, may include four adders 122-21A disposed at a first stage, two adders 122-21B disposed at a second stage, and an adder 122-21C disposed at a third stage.

Each of the adders 122-21A disposed at the first stage may receive output data of two of the multipliers 122-11 and may perform an adding calculation of the output data of the two multipliers 122-11 to output the result of the adding calculation. Each of the adders 122-21B disposed at the second stage may receive output data of two of the adders 122-21A disposed at the first stage and may perform an adding calculation of the output data of the two adders 122-21A to output the result of the adding calculation. The adder 122-21C disposed at the third stage may receive output data of two of the adders 122-21B disposed at the second stage and may perform an adding calculation of the output data of the two adders 122-21B to output the result of the adding calculation. The output data of the addition logic circuit 122-2 may correspond to result data (i.e., MAC result data) of the MAC arithmetic operation of the first row included in the weight matrix and the column included in the vector matrix. Thus, the output data of the addition logic circuit 122-2 may correspond to an element MAC0.0 located at a first row of an '8×1' MAC result matrix with eight elements of MAC0.0, . . . , and MAC7.0, as illustrated in FIG. 5. The output data MAC0.0 of the addition logic circuit 122-2 may be inputted to the output latch 123-1 disposed in the data output circuit 123 of the MAC operator 120, as described with reference to FIG. 4.

Figure 12:
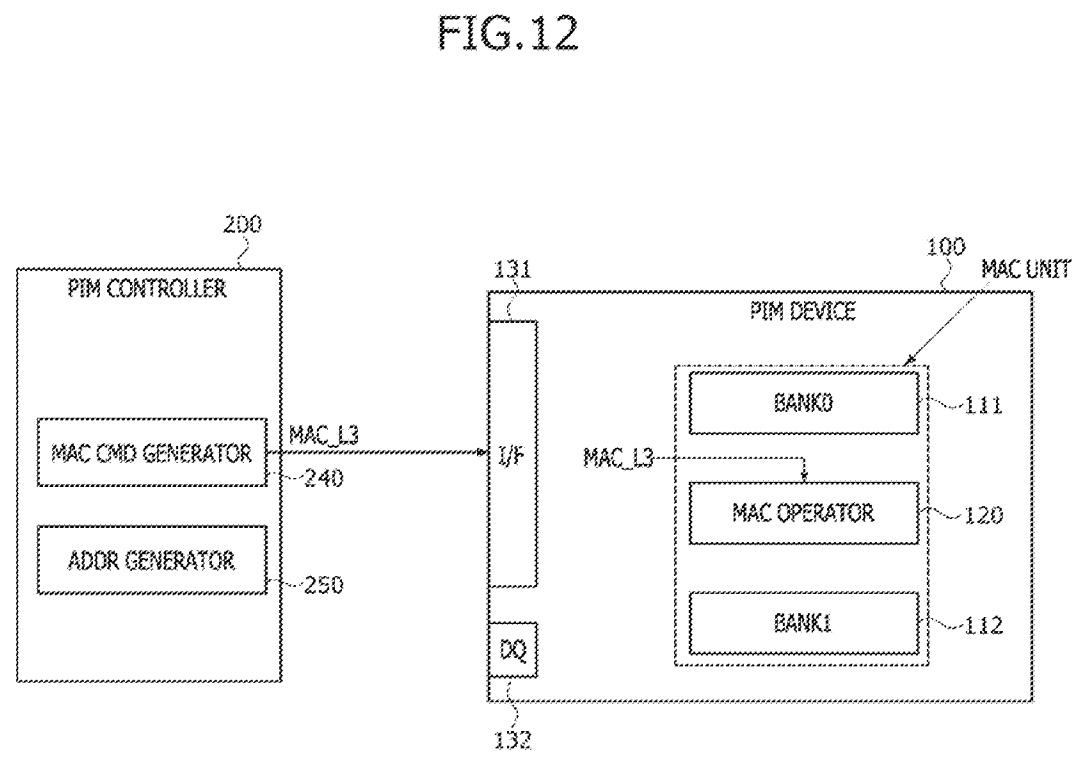

At a step 309, the MAC command generator 240 of the PIM controller 200 may generate and transmit the MAC output latch signal MAC_L3 to the PIM device 100, as illustrated in FIG. 12. The MAC output latch signal MAC_L3 may control the output latch operation of the MAC result data MAC0.0 performed by the MAC operator 120 of the PIM device 100. The MAC result data MAC0.0 inputted from the MAC circuit 122 of the MAC operator 120 may be output from the output latch 123-1 in synchronization with the MAC output latch signal MAC_L3, as described with reference to FIG. 4. The MAC result data MAC0.0 that is output from the output latch 123-1 may be inputted to the transfer gate 123-2 of the data output circuit 123.

Figure 13:
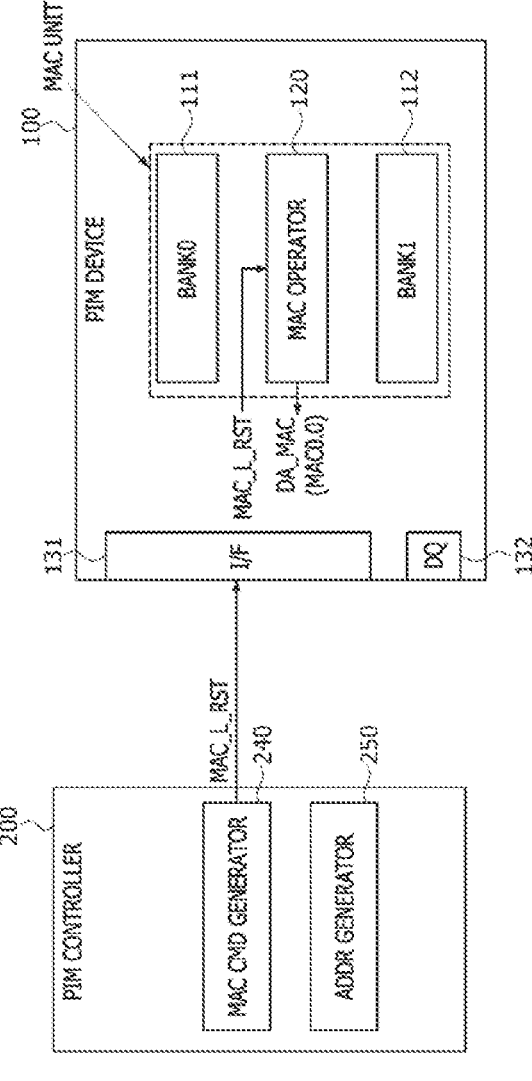

At a step 310, the MAC command generator 240 of the PIM controller 200 may generate and transmit the MAC latch reset signal MAC_L_RST to the PIM device 100, as illustrated in FIG. 13. The MAC latch reset signal MAC_L_RST may control an output operation of the MAC result data MAC0.0 generated by the MAC operator 120 and a reset operation of the output latch included in the MAC operator 120. As described with reference to FIG. 4, the transfer gate 123-2 receiving the MAC result data MAC0.0 from the output latch 123-1 of the MAC operator 120 may be synchronized with the MAC latch reset signal MAC_L_RST to output the MAC result data MAC0.0. In an embodiment, the MAC result data MAC0.0 that is output from the MAC operator 120 may be stored into the first memory bank 111 or the second memory bank 112 through the first BIO line or the second BIO line in the PIM device 100.

At a step 311, the row number 'R' of the weight matrix for which the MAC arithmetic operation is performed may be increased by '1'. Because the MAC arithmetic operation for the first row among the first to eight rows of the weight matrix has been performed during the previous steps, the row number of the weight matrix may change from '1' to '2' at the step 311. At a step 312, whether the row number changed at the step 311 is greater than the row number of the last row (i.e., the eighth row of the current example) of the weight matrix may be determined. Because the row number of the weight matrix is changed to '2' at the step 311, a process of the MAC arithmetic operation may be fed back to the step 304.

If the process of the MAC arithmetic operation is fed back to the step 304 from the step 312, then the same processes as described with reference to the steps 304 to 310 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix. If the process of the MAC arithmetic operation is fed back to the step 304 at the step 312, then the processes from the step 304 to the step 311 may be iteratively performed until the MAC arithmetic operation is performed for all of the rows of the weight matrix with the vector matrix. If the MAC arithmetic operation for the eighth row of the weight matrix terminates and the row number of the weight matrix changes from '8' to '9' at the step 311, the MAC arithmetic operation may terminate because the row number of '9' is greater than the last row number of '8' at the step 312.

Figure 14:
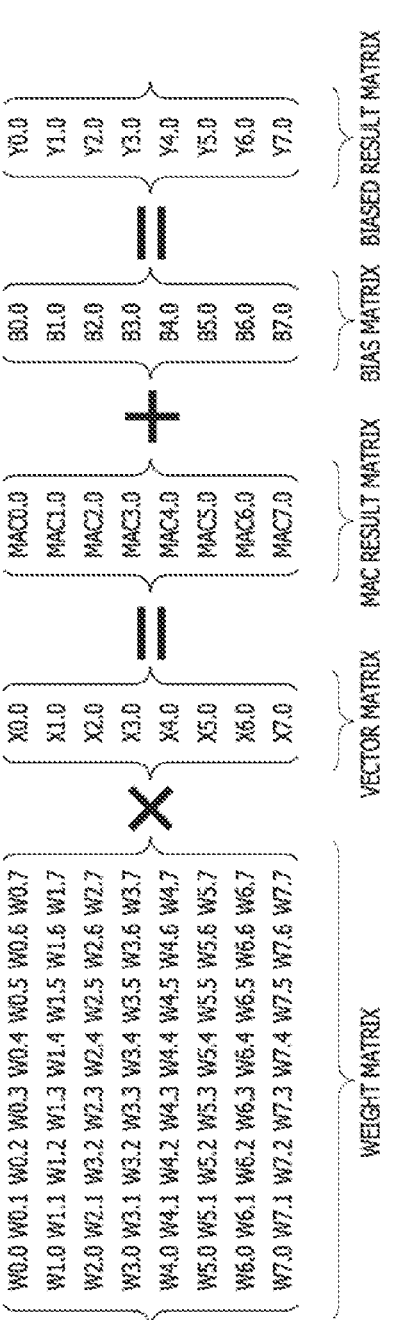
FIG. 14 illustrates another example of a MAC arithmetic operation performed in a PIM system according to a first embodiment of the present disclosure.

FIG. 14 illustrates another example of a MAC arithmetic operation performed in the PIM system 1-1 according to the first embodiment of the present disclosure. As illustrated in FIG. 14, the MAC arithmetic operation performed by the PIM system 1-1 may further include an adding calculation of the MAC result matrix and a bias matrix. Specifically, as described with reference to FIG. 5, the PIM device 100 may execute the matrix multiplying calculation of the '8×8' weight matrix and the '8×1' vector matrix according to control of the PIM controller 200. As a result of the matrix multiplying calculation of the '8×8' weight matrix and the '8×1' vector matrix, the '8×1' MAC result matrix with the eight elements MAC0.0, . . . , and MAC7.0 may be generated. The '8×1' MAC result matrix may be added to a '8×1' bias matrix. The '8×1' bias matrix may have elements B0.0, . . . , and B7.0 corresponding to bias data. The bias data may be set to reduce an error of the MAC result matrix. As a result of the adding calculation of the MAC result matrix and the bias matrix, a '8×1' biased result matrix with eight elements Y0.0, . . . , and Y7.0 may be generated.

Figure 15:
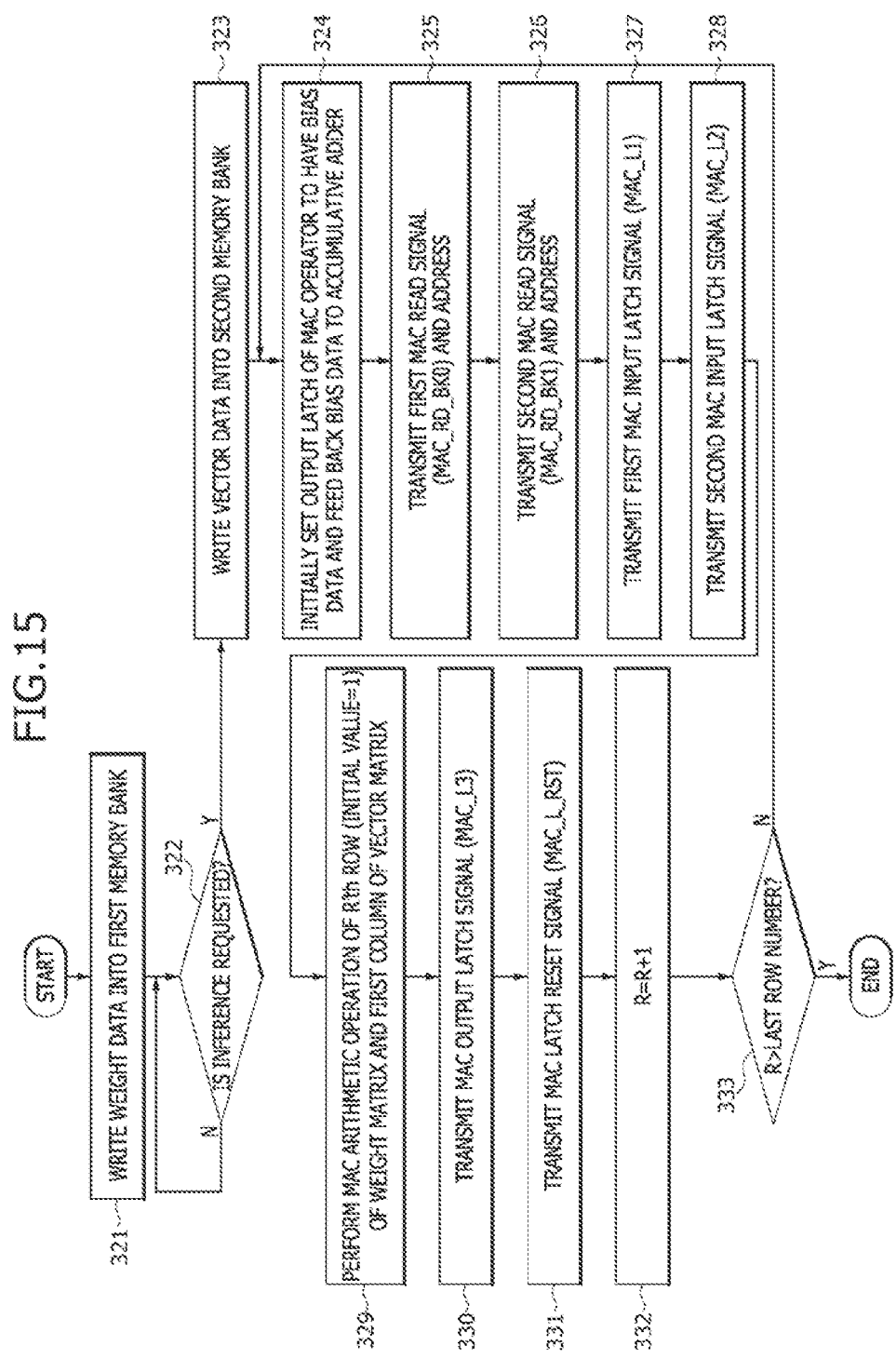
FIG. 15 is a flowchart illustrating processes of the MAC arithmetic operation illustrated in FIG. 14 in a PIM system according to a first embodiment of the present disclosure.
Figure 16:
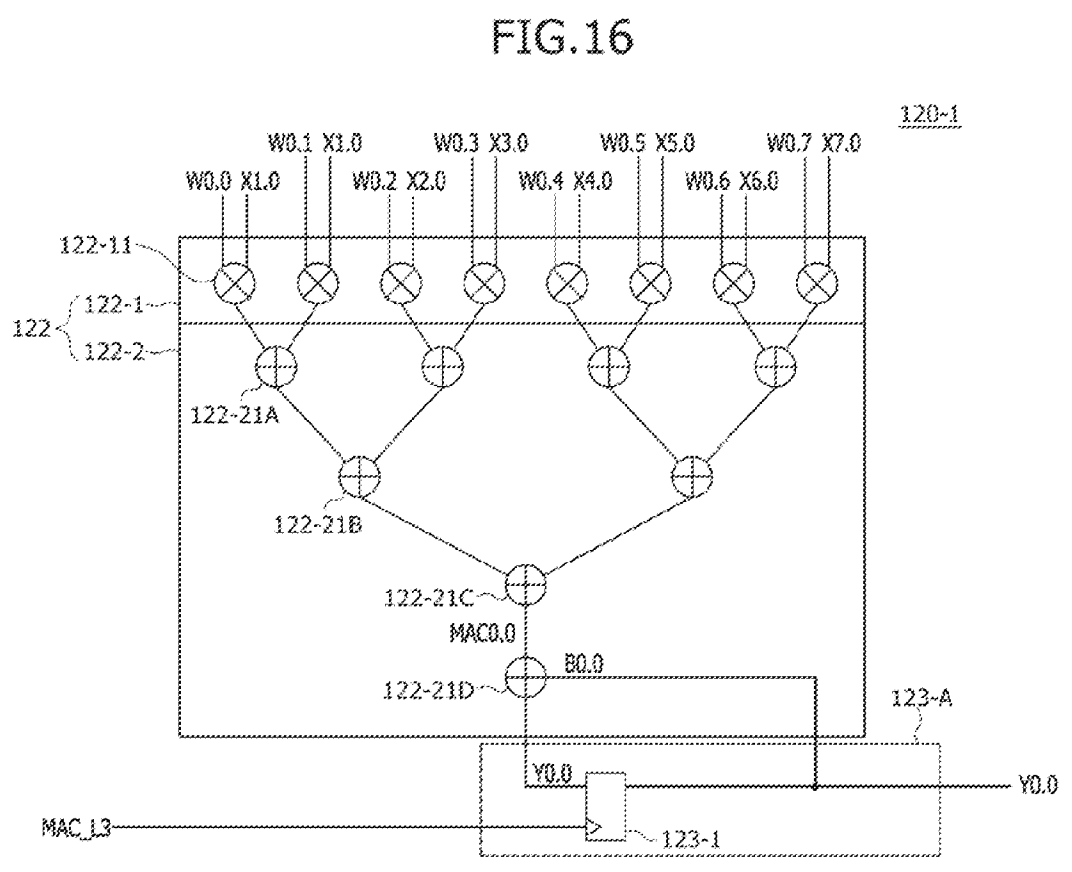

FIG. 15 is a flowchart illustrating processes of the MAC arithmetic operation described with reference to FIG. 14 in the PIM system 1-1 according to the first embodiment of the present disclosure. Moreover, FIG. 16 illustrates an example of a configuration of a MAC operator 1204 for performing the MAC arithmetic operation of FIG. 14 in the PIM system 1-1 according to the first embodiment of the present disclosure. In FIG. 16, the same reference numerals or the same reference symbols as used in FIG. 4 denote the same elements, and the detailed descriptions of the same elements as indicated in the previous embodiment will be omitted hereinafter. Referring to FIG. 15, the first data (i.e., the weight data) may be written into the first memory bank 111 at a step 321 to perform the MAC arithmetic operation in the PIM device 100. Thus, the weight data may be stored in the first memory bank 111 of the PIM device 100. In the present embodiment, it may be assumed that the weight data are the elements W0.0, . . . , and W7.7 constituting the weight matrix of FIG. 14.

At a step 322, whether an inference is requested may be determined. An inference request signal may be transmitted from an external device located outside of the PIM system 1-1 to the PIM controller 200 of the PIM system 1-1. In an embodiment, if no inference request signal is transmitted to the PIM controller 200, the PIM system 1-1 may be in a standby mode until the inference request signal is transmitted to the PIM controller 200. Alternatively, if no inference request signal is transmitted to the PIM controller 200, the PIM system 1-1 may perform operations (e.g., data read/write operations) other than the MAC arithmetic operation in the memory mode until the inference request signal is transmitted to the PIM controller 200. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 14. If the inference request signal is transmitted to the PIM controller 200 at the step 322, the PIM controller 200 may write the vector data that is transmitted with the inference request signal into the second memory bank 112 at a step 323. Accordingly, the vector data may be stored in the second memory bank 112 of the PIM device 100.

At a step 324, the output latch of the MAC operator may be initially set to have the bias data and the initially set bias data may be fed back to an accumulative adder of the MAC operator. This process is executed to perform the matrix adding calculation of the MAC result matrix and the bias matrix, which is described with reference to FIG. 14. In other words, the output latch 123-1 in the data output circuit 123-A of the MAC operator (120-1) is set to have the bias data. Because the matrix multiplying calculation is executed for the first row of the weight matrix, the output latch 123-1 may be initially set to have the element B0.0 located at a cross point of the first row and the first column of the bias matrix as the bias data. The output latch 123-1 may output the bias data B0.0, and the bias data B0.0 that is output from the output latch 123-1 may be inputted to the accumulative adder 122-21D of the addition logic circuit 122-2, as illustrated in FIG. 16.

In an embodiment, in order to output the bias data B0.0 out of the output latch 123-1 and to feed back the bias data B0.0 to the accumulative adder 122-21D, the MAC command generator 240 of the PIM controller 200 may transmit the MAC output latch signal MAC_L3 to the MAC operator 120-1 of the PIM device 100. When a subsequent MAC arithmetic operation is performed, the accumulative adder 122-21D of the MAC operator 120-1 may add the MAC result data MAC0.0 that is output from the adder 122-21C disposed at the last stage to the bias data B0.0 which is fed back from the output latch 123-1 to generate the biased result data Y0.0 and may output the biased result data Y0.0 to the output latch 123-1. The biased result data Y0.0 may be output from the output latch 123-1 in synchronization with the MAC output latch signal MAC_L3 transmitted in a subsequent process.

In a step 325, the MAC command generator 240 of the PIM controller 200 may generate and transmit the first MAC read signal MAC_RD_BK0 to the PIM device 100. In addition, the address generator 250 of the PIM controller 200 may generate and transmit the bank selection signal BS and the row/column address ADDR_R/ADDR_C to the PIM device 100. The step 325 may be executed in the same way as described with reference to FIG. 7. In a step 326, the MAC command generator 240 of the PIM controller 200 may generate and transmit the second MAC read signal MAC_RD_BK1 to the PIM device 100. In addition, the address generator 250 of the PIM controller 200 may generate and transmit the bank selection signal BS for selecting the second memory bank 112 and the row/column address ADDR_R/ADDR_C to the PIM device 100. The step 326 may be executed in the same way as described with reference to FIG. 8.

At a step 327, the MAC command generator 240 of the PIM controller 200 may generate and transmit the first MAC input latch signal MAC_L1 to the PIM device 100. The step 327 may be executed in the same way as described with reference to FIG. 9. The first MAC input latch signal MAC_L1 may control the input latch operation of the first data for the MAC operator 120 of the PIM device 100. The input latch operation of the first data may be performed in the same way as described with reference to FIG. 11. At a step 328, the MAC command generator 240 of the PIM controller 200 may generate and transmit the second MAC input latch signal MAC_L2 to the PIM device 100. The step 328 may be executed in the same way as described with reference to FIG. 10. The second MAC input latch signal MAC_L2 may control the input latch operation of the second data for the MAC operator 120 of the PIM device 100. The input latch operation of the second data may be performed in the same way as described with reference to FIG. 11.

At a step 329, the MAC circuit 122 of the MAC operator 120 may perform the MAC arithmetic operation of an Rth row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may include the four adders 122-21A disposed at the first stage, the two adders 122-21B disposed at the second stage, the adder 122-21C disposed at the third stage, and the accumulative adder 122-21D, as illustrated in FIG. 16. The accumulative adder 122-21D may add output data of the adder 122-21C to feedback data fed back from the output latch 123-1 to output the result of the adding calculation. The output data of the adder 122-21C may be the matrix multiplying result MAC0.0, which corresponds to the result of the matrix multiplying calculation of the first row of the weight matrix and the first column of the vector matrix. The accumulative adder 122-21D may add the output data MAC0.0 of the adder 122-21C to the bias data B0.0 fed back from the output latch 123-1 to output the result of the adding calculation. The output data Y0.0 of the accumulative adder 122-21D may be inputted to the output latch 123 disposed in a data output circuit 123-A of the MAC operator 120-1.

At a step 330, the MAC command generator 240 of the PIM controller 200 may generate and transmit the MAC output latch signal MAC_L3 to the PIM device 100. The step 330 may be executed in the same way as described with reference to FIG. 12. The MAC output latch signal MAC_L3 may control the output latch operation of the MAC result data MAC0.0, which is performed by the MAC operator 120-1 of the PIM device 100. The biased result data Y0.0 transmitted from the MAC circuit 122 of the MAC operator 120 to the output latch 123-1 may be output from the output latch 123-1 in synchronization with the MAC output latch signal MAC_L3. The biased result data Y0.0 that is output from the output latch 123 may be inputted to the transfer gate 123-2.

At a step 331, the MAC command generator 240 of the PIM controller 200 may generate and transmit the MAC latch reset signal MAC_L_RST to the PIM device 100. The step 331 may be executed in the same way as described with reference to FIG. 13. The MAC latch reset signal MAC_L_RST may control an output operation of the biased result data Y0.0 generated by the MAC operator 120 and a reset operation of the output latch 123-1 included in the MAC operator 120. The transfer gate 123-2 receiving the biased result data Y0.0 from the output latch 123-1 of the data output circuit 123-A included in the MAC operator 120 may be synchronized with the MAC latch reset signal MAC_L_RST to output the biased result data Y0.0. In an embodiment, the biased result data Y0.0 that is output from the MAC operator 120 may be stored into the first memory bank 111 or the second memory bank 112 through the first BIO line or the second BIO line in the PIM device 100.

At a step 332, the row number 'R' of the weight matrix for which the MAC arithmetic operation is performed may be increased by '1'. Because the MAC arithmetic operation for the first row among the first to eight rows of the weight matrix has been performed during the previous steps, the row number of the weight matrix may change from '1' to '2' at the step 332. At a step 333, whether the row number changed at the step 332 is greater than the row number of the last row (i.e., the eighth row of the current example) of the weight matrix may be determined. Because the row number of the weight matrix is changed to '2' at the step 332, a process of the MAC arithmetic operation may be fed back to the step 324.

If the process of the MAC arithmetic operation is fed back to the step 324 from the step 333, then the same processes as described with reference to the steps 324 to 331 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix and the bias data B0.0 in the output latch 123-1 initially set at the step 324 may be changed into the bias data B1.0. If the process of the MAC arithmetic operation is fed back to the step 324 at the step 333, the processes from the step 324 to the step 332 may be iteratively performed until the MAC arithmetic operation is performed for all of the rows of the weight matrix with the vector matrix. If the MAC arithmetic operation for the eighth row of the weight matrix terminates and the row number of the weight matrix changes from '8' to '9' at the step 332, the MAC arithmetic operation may terminate because the row number of '9' is greater than the last row number of '8' at the step 333.

Figure 17:
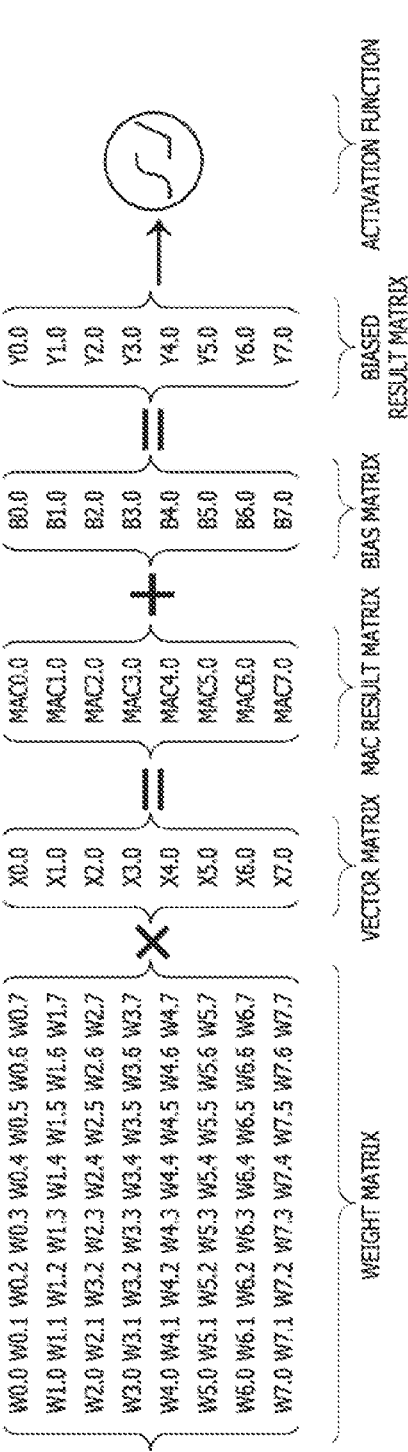
FIG. 17 illustrates yet another example of a MAC arithmetic operation performed in a PIM system according to a first embodiment of the present disclosure.

FIG. 17 illustrates yet another example of a MAC arithmetic operation performed in the PIM system 1-1 according to the first embodiment of the present disclosure. As illustrated in FIG. 17, the MAC arithmetic operation performed by the PIM system 1-1 may further include a process for applying the biased result matrix to an activation function. Specifically, as described with reference to FIG. 14, the PIM device 100 may execute the matrix multiplying calculation of the '8×8' weight matrix and the '8×1' vector matrix according to control of the PIM controller 200 to generate the MAC result matrix. In addition, the MAC result matrix may be added to the bias matrix to generate biased result matrix.

The biased result matrix may be applied to the activation function. The activation function means a function which is used to calculate a unique output value by comparing a MAC calculation value with a critical value in an MLP-type neural network. In an embodiment, the activation function may be a unipolar activation function which generates only positive output values or a bipolar activation function which generates negative output values as well as positive output values. In different embodiments, the activation function may include a sigmoid function, a hyperbolic tangent (Tanh) function, a rectified linear unit (ReLU) function, a leaky ReLU function, an identity function, and a maxout function.

Figure 18:
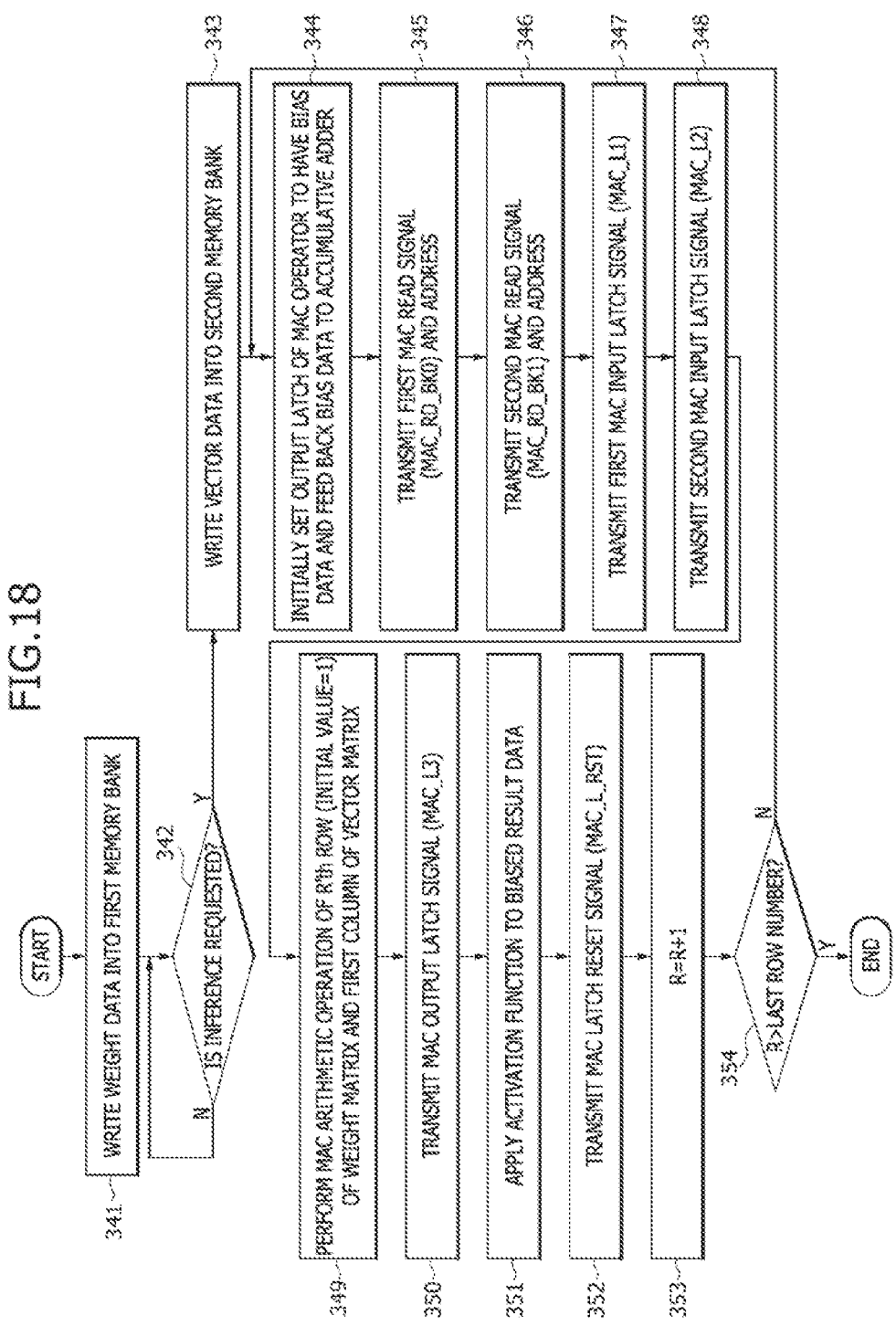
FIG. 18 is a flowchart illustrating processes of the MAC arithmetic operation illustrated in FIG. 17 in a PIM system according to a first embodiment of the present disclosure.
Figure 19:
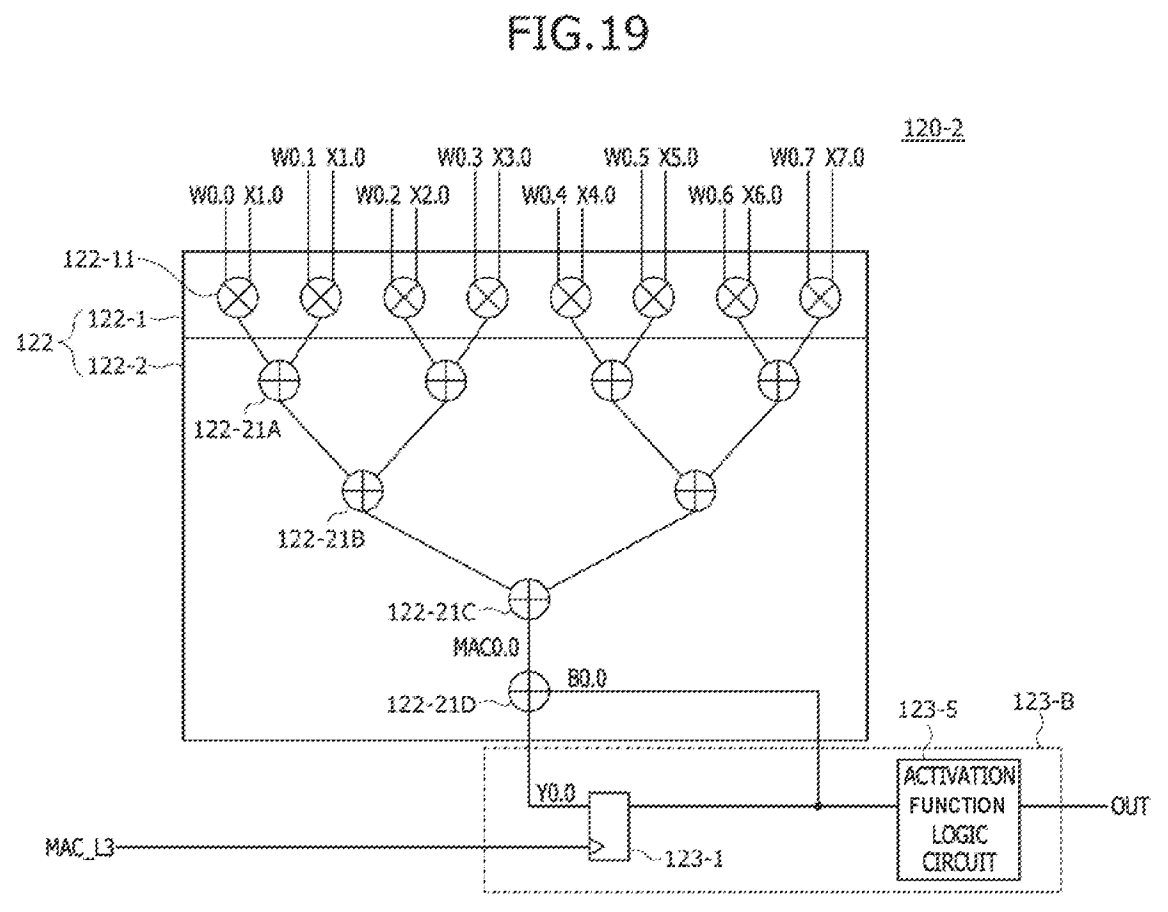

FIG. 18 is a flowchart illustrating processes of the MAC arithmetic operation described with reference to FIG. 17 in the PIM system 1-1 according to the first embodiment of the present disclosure. Moreover, FIG. 19 illustrates an example of a configuration of a MAC operator 120-2 for performing the MAC arithmetic operation of FIG. 17 in the PIM system 1-1 according to the first embodiment of the present disclosure. In FIG. 19, the same reference numerals or the same reference symbols as used in FIG. 4 denote the same elements, and the detailed descriptions of the same elements as mentioned in the previous embodiment will be omitted hereinafter. Referring to FIG. 18, the first data (i.e., the weight data) may be written into the first memory bank 111 at a step 341 to perform the MAC arithmetic operation in the PIM device 100. Thus, the weight data may be stored in the first memory bank 111 of the PIM device 100. In the present embodiment, it may be assumed that the weight data are the elements W0.0, . . . , and W7.7 constituting the weight matrix of FIG. 17.

At a step 342, whether an inference is requested may be determined. An inference request signal may be transmitted from an external device located outside of the PIM system 1-1 to the PIM controller 200 of the PIM system 1-1. In an embodiment, if no inference request signal is transmitted to the PIM controller 200, the PIM system 1-1 may be in a standby mode until the inference request signal is transmitted to the PIM controller 200. Alternatively, if no inference request signal is transmitted to the PIM controller 200, the PIM system 1-1 may perform operations (e.g., the data read/write operations) other than the MAC arithmetic operation in the memory mode until the inference request signal is transmitted to the PIM controller 200. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 17. If the inference request signal is transmitted to the PIM controller 200 at the step 342, then the PIM controller 200 may write the vector data that is transmitted with the inference request signal into the second memory bank 112 at a step 343. Accordingly, the vector data may be stored in the second memory bank 112 of the PIM device 100.

At a step 344, an output latch of a MAC operator may be initially set to have bias data and the initially set bias data may be fed back to an accumulative adder of the MAC operator. This process is executed to perform the matrix adding calculation of the MAC result matrix and the bias matrix, which is described with reference to FIG. 17. That is, as illustrated in FIG. 19, the output latch 123-1 of the MAC operator (120-2 of FIG. 19) may be initially set to have the bias data of the bias matrix. Because the matrix multiplying calculation is executed for the first row of the weight matrix, the element B0.0 located at first row and the first column of the bias matrix may be initially set as the bias data in the output latch 123-1. The output latch 123-1 may output the bias data B0.0, and the bias data B0.0 that is output from the output latch 123-1 may be inputted to the accumulative adder 122-21D of the MAC operator 120-2.

In an embodiment, in order to output the bias data B0.0 out of the output latch 123-1 and to feed back the bias data B0.0 to the accumulative adder 122-21D, the MAC command generator 240 of the PIM controller 200 may transmit the MAC output latch signal MAC_L3 to the MAC operator 120-2 of the PIM device 100. When a subsequent MAC arithmetic operation is performed, the accumulative adder 122-21D of the MAC operator 120-2 may add the MAC result data MAC0.0 that is output from the adder 122-21C disposed at the last stage to the bias data B0.0 which is fed back from the output latch 123-1 to generate the biased result data Y0.0 and may output the biased result data Y0.0 to the output latch 123-1. As illustrated in FIG. 19, the biased result data Y0.0 may be transmitted from the output latch 123-1 to an activation function logic circuit 123-5 disposed in a data output circuit 123-B of the MAC operator 120-2 in synchronization with the MAC output latch signal MAC_L3 transmitted in a subsequent process.

In a step 345, the MAC command generator 240 of the PIM controller 200 may generate and transmit the first MAC read signal MAC_RD_BK0 to the PIM device 100. In addition, the address generator 250 of the PIM controller 200 may generate and transmit the bank selection signal BS and the row/column address ADDR_R/ADDR_C to the PIM device 100. The step 345 may be executed in the same way as described with reference to FIG. 7. In a step 346, the MAC command generator 240 of the PIM controller 200 may generate and transmit the second MAC read signal MAC_RD_BK1 to the PIM device 100. In addition, the address generator 250 of the PIM controller 200 may generate and transmit the bank selection signal BS for selecting the second memory bank 112 and the row/column address ADDR_R/ADDR_C to the PIM device 100. The step 346 may be executed in the same way as described with reference to FIG. 8.

At a step 347, the MAC command generator 240 of the PIM controller 200 may generate and transmit the first MAC input latch signal MAC_L1 to the PIM device 100. The step 347 may be executed in the same way as described with reference to FIG. 9. The first MAC input latch signal MAC_L1 may control the input latch operation of the first data for the MAC operator 120 of the PIM device 100. The input latch operation of the first data may be performed in the same way as described with reference to FIG. 11. At a step 348, the MAC command generator 240 of the PIM controller 200 may generate and transmit the second MAC input latch signal MAC_L2 to the PIM device 100. The step 348 may be executed in the same way as described with reference to FIG. 10. The second MAC input latch signal MAC_L2 may control the input latch operation of the second data for the MAC operator 120 of the PIM device 100. The input latch operation of the second data may be performed in the same way as described with reference to FIG. 11.

At a step 349, the MAC circuit 122 of the MAC operator 120 may perform the MAC arithmetic operation of an R$^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may include the four adders 122-21A disposed at the first stage, the two adders 122-21B disposed at the second stage, the adder 122-21C disposed at the third stage, and the accumulative adder 122-21D, as illustrated in FIG. 19. The accumulative adder 122-21D may add output data of the adder 122-21C to feedback data fed back from the output latch 123-1 to output the result of the adding calculation. The output data of the adder 122-21C may be the element MAC0.0 of the '8×1' MAC result matrix, which corresponds to the result of the matrix multiplying calculation of the first row of the weight matrix and the first column of the vector matrix. The accumulative adder 122-21D may add the output data MAC0.0 of the adder 122-21C to the bias data B0.0 fed back from the output latch 123-1 to output the result of the adding calculation. The output data Y0.0 of the accumulative adder 122-21D may be inputted to the output latch 123-1 disposed in the data output circuit 123-A of the MAC operator 120.

At a step 350, the MAC command generator 240 of the PIM controller 200 may generate and transmit the MAC output latch signal MAC_L3 to the PIM device 100. The step 350 may be executed in the same way as described with reference to FIG. 12. The MAC output latch signal MAC_L3 may control the output latch operation of the output latch 123-1 included in the MAC operator 120 of the PIM device 100. The biased result data Y0.0 transmitted from the MAC circuit 122 of the MAC operator 120 to the output latch 123-1 may be output from the output latch 123-1 in synchronization with the MAC output latch signal MAC_L3. The biased result data Y0.0 that is output from the output latch 123-1 may be inputted to the activation function logic circuit 123-5. At a step 351, the activation function logic circuit 123-5 may apply an activation function to the biased result data Y0.0 to generate a final output value, and the final output value may be inputted to the transfer gate (123-2 of FIG. 4). This, for example, is the final output value for the current of R which is incremented in step 354.

At a step 352, the MAC command generator 240 of the PIM controller 200 may generate and transmit the MAC latch reset signal MAC_L_RST to the PIM device 100. The step 352 may be executed in the same way as described with reference to FIG. 13. The MAC latch reset signal MAC_L_RST may control an output operation of the final output value generated by the MAC operator 120 and a reset operation of the output latch 123-1 included in the MAC operator 120. The transfer gate 123-2 receiving the final output value from the activation function logic circuit 123-5 of the data output circuit 123-B included in the MAC operator 120 may be synchronized with the MAC latch reset signal MAC_L_RST to output the final output value. In an embodiment, the final output value that is output from the MAC operator 120 may be stored into the first memory bank 111 or the second memory bank 112 through the first BIO line or the second BIO line in the PIM device 100.

At a step 353, the row number 'R' of the weight matrix for which the MAC arithmetic operation is performed may be increased by '1'. Because the MAC arithmetic operation for the first row among the first to eight rows of the weight matrix has been performed during the previous steps, the row number of the weight matrix may change from '1' to '2' at the step 353. At a step 354, whether the row number changed at the step 353 is greater than the row number of the last row (i.e., the eighth row) of the weight matrix may be determined. Because the row number of the weight matrix is changed to '2' at the step 353, a process of the MAC arithmetic operation may be fed back to the step 344.

If the process of the MAC arithmetic operation is fed back to the step 344 from the step 354, the same processes as described with reference to the steps 344 to 354 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix, and the bias data B0.0 in the output latch 123-1 initially set at the step 344 may be changed to the bias data B1.0. If the process of the MAC arithmetic operation is fed back to the step 344 from the step 354, the processes from the step 344 to the step 354 may be iteratively performed until the MAC arithmetic operation is performed for all of the rows of the weight matrix with the vector matrix. For an embodiment, a plurality of final output values, namely, one final output value for each incremented value of R, represents an 'N×1' final result matrix. If the MAC arithmetic operation for the eighth row of the weight matrix terminates and the row number of the weight matrix changes from '8' to '9' at the step 354, the MAC arithmetic operation may terminate because the row number of '9' is greater than the last row number of '8' at the step 354.

Figure 20:
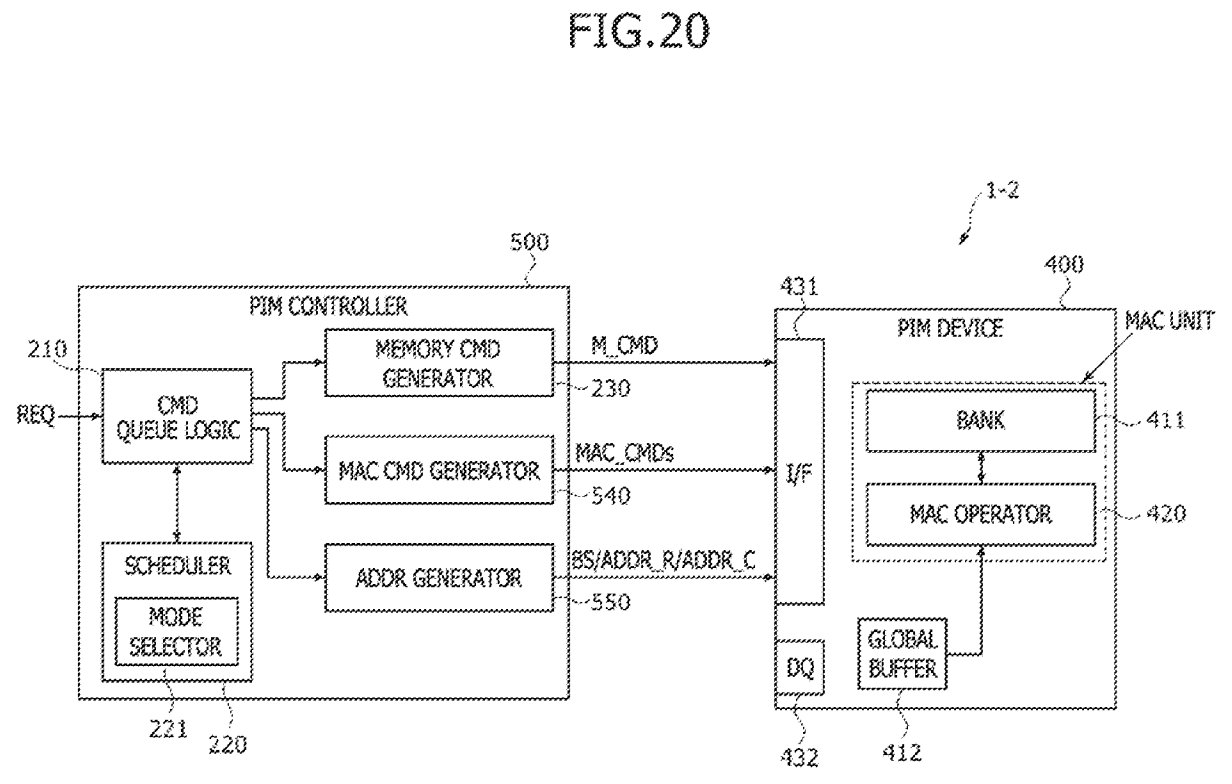

FIG. 20 is a block diagram illustrating a PIM system 1-2 according to a second embodiment of the present disclosure. In FIG. 20, the same reference numerals or the same reference symbols as used in FIG. 2 denote the same elements. As illustrated in FIG. 20, the PIM system 1-2 may be configured to include a PIM device 400 and a PIM controller 500. The PIM device 400 may be configured to include a memory bank (BANK) 411 corresponding to a storage region, a global buffer 412, a MAC operator 420, an interface (I/F) 431, and a data input/output (I/O) pad 432. For an embodiment, the MAC operator 420 represents a MAC operator circuit. The memory bank (BANK) 411 and the MAC operator 420 included in the PIM device 400 may constitute one MAC unit. In another embodiment, the PIM device 400 may include a plurality of MAC units. The memory bank (BANK) 411 may represent a memory region for storing data, for example, a DRAM device. The global buffer 412 may also represent a memory region for storing data, for example, a DRAM device or an SRAM device. The memory bank (BANK) 411 may be a component unit which is independently activated and may be configured to have the same data bus width as data I/O lines in the PIM device 400. In an embodiment, the memory bank 411 may operate through interleaving such that an active operation of the memory bank 411 is performed in parallel while another memory bank is selected. The memory bank 411 may include at least one cell array which includes memory unit cells located at cross points of a plurality of rows and a plurality of columns.

Although not shown in the drawings, a core circuit may be disposed adjacent to the memory bank 411. The core circuit may include X-decoders XDECs and Y-decoders/IO circuits YDEC/IOs. An X-decoder XDEC may also be referred to as a word line decoder or a row decoder. The X-decoder XDEC may receive a row address ADDR_R from the PIM controller 500 and may decode the row address ADDR_R to select and enable one of the rows (i.e., word lines) coupled to the selected memory bank. Each of the Y-decoders/IO circuits YDEC/IOs may include a Y-decoder YDEC and an I/O circuit 10. The Y-decoder YDEC may also be referred to as a bit line decoder or a column decoder. The Y-decoder YDEC may receive a column address ADD_C from the PIM controller 500 and may decode the column address ADD_C to select and enable at least one of the columns (i.e., bit lines) coupled to the selected memory bank. Each of the I/O circuits may include an I/O sense amplifier for sensing and amplifying a level of a read datum that is output from the corresponding memory bank during a read operation for the memory bank 411. In addition, the I/O circuit may include a write driver for driving a write datum during a write operation for the memory bank 411.

The MAC operator 420 of the PIM device 400 may have mostly the same configuration as the MAC operator 120 described with reference to FIG. 4. That is, the MAC operator 420 may be configured to include the data input circuit 121, the MAC circuit 122, and the data output circuit 123, as described with reference to FIG. 4. The data input circuit 121 may be configured to include the first input latch 121-1 and the second input latch 121-2. The MAC circuit 122 may be configured to include the multiplication logic circuit 122-1 and the addition logic circuit 122-2. The data output circuit 123 may be configured to include the output latch 123-1, the transfer gate 123-2, the delay circuit 123-3, and the inverter 123-4. In an embodiment, the first input latch 121-1, the second input latch 121-2, and the output latch 123-1 may be realized by using flip-flops.

The MAC operator 420 may be different from the MAC operator 120 in that a MAC input latch signal MAC_L1 is simultaneously inputted to both of clock terminals of the first and second input latches 121-1 and 121-2. As indicated in the following descriptions, the weight data and the vector data may be simultaneously transmitted to the MAC operator 420 of the PIM device 400 included in the PIM system 1-2 according to the present embodiment. That is, the first data DA1 (i.e., the weight data) and the second data DA2 (i.e., the vector data) may be simultaneously inputted to both of the first input latch 121-1 and the second input latch 121-2 constituting the data input circuit 121, respectively. Accordingly, it may be unnecessary to apply an extra control signal to the clock terminals of the first and second input latches 121-1 and 121-2, and thus the MAC input latch signal MAC_L1 may be simultaneously inputted to both of the clock terminals of the first and second input latches 121-1 and 121-2 included in the MAC operator 420.

In another embodiment, the MAC operator 420 may be realized to have the same configuration as the MAC operator 120-1 described with reference to FIG. 16 to perform the operation illustrated in FIG. 14. Even in such a case, the MAC operator 420 may have the same configuration as described with reference to FIG. 16 except that the MAC input latch signal MAC_L1 is simultaneously inputted to both of the clock terminals of the first and second input latches 121-1 and 121-2 constituting the data input circuit 121. In yet another embodiment, the MAC operator 420 may be realized to have the same configuration as the MAC operator 120-2 described with reference to FIG. 19 to perform the operation illustrated in FIG. 17. Even in such a case, the MAC operator 420 may have the same configuration as described with reference to FIG. 19 except that the MAC input latch signal MAC_L1 is simultaneously inputted to both of the clock terminals of the first and second input latches 121-1 and 121-2 constituting the data input circuit 121.

The interface 431 of the PIM device 400 may receive the memory command M_CMD, the MAC commands MAC_CMDs, the bank selection signal BS, and the row/column addresses ADDR_R/ADDR_C from the PIM controller 500. The interface 431 may output the memory command M_CMD, together with the bank selection signal BS and the row/column addresses ADDR_R/ADDR_C, to the memory bank 411. The interface 431 may output the MAC commands MAC_CMDs to the memory bank 411 and the MAC operator 420. In such a case, the interface 431 may output the bank selection signal BS and the row/column addresses ADDR_R/ADDR_C to the memory bank 411. The data I/O pad 432 of the PIM device 400 may function as a data communication terminal between a device external to the PIM device 400, the global buffer 412, and the MAC unit (which includes the memory bank 411 and the MAC operator 420) included in the PIM device 400. The external device to the PIM device 400 may correspond to the PIM controller 500 of the PIM system 1-2 or a host located outside the PIM system 1-2. Accordingly, data that is output from the host or the PIM controller 500 may be inputted into the PIM device 400 through the data I/O pad 432. In addition, data generated by the PIM device 400 may be transmitted to the external device to the PIM device 400 through the data I/O pad 432.

The PIM controller 500 may control operations of the PIM device 400. In an embodiment, the PIM controller 500 may control the PIM device 400 such that the PIM device 400 operates in the memory mode or the MAC mode. In the event that the PIM controller 500 controls the PIM device 500 such that the PIM device 400 operates in the memory mode, the PIM device 400 may perform a data read operation or a data write operation for the memory bank 411. In the event that the PIM controller 500 controls the PIM device 400 such that the PIM device 400 operates in the MAC mode, the PIM device 400 may perform the MAC arithmetic operation for the MAC operator 420. In the event that the PIM controller 500 controls the PIM device 400 such that the PIM device 400 operates in the MAC mode, the PIM device 400 may also perform the data read operation and the data write operation for the memory bank 411 and the global buffer 412 to execute the MAC arithmetic operation.

The PIM controller 500 may be configured to include the command queue logic 210, the scheduler 220, the memory command generator 230, a MAC command generator 540, and an address generator 550. The scheduler 220 may include the mode selector 221. The command queue logic 210 may receive the request REQ from an external device (e.g., a host of the PIM system 1-2) and store a command queue corresponding the request REQ in the command queue logic 210. The command queue stored in the command queue logic 210 may be transmitted to the memory command generator 230 or the MAC command generator 540 according to a sequence determined by the scheduler 220. The scheduler 220 may adjust a timing of the command queue when the command queue stored in the command queue logic 210 is output from the command queue logic 210. The scheduler 210 may include the mode selector 221 that generates a mode selection signal with information on whether command queue stored in the command queue logic 210 relates to the memory mode or the MAC mode. The memory command generator 230 may receive the command queue related to the memory mode of the PIM device 400 from the command queue logic 210 to generate and output the memory command M_CMD. The command queue logic 210, the scheduler 220, the mode selector 221, and the memory command generator 230 may have the same function as described with reference to FIG. 2.

The MAC command generator 540 may receive the command queue related to the MAC mode of the PIM device 400 from the command queue logic 210. The MAC command generator 540 may decode the command queue to generate and output the MAC commands MAC_CMDs. The MAC commands MAC_CMDs that are output from the MAC command generator 540 may be transmitted to the PIM device 400. The data read operation for the memory bank 411 of the PIM device 400 may be performed by the MAC commands MAC_CMDs that are output from the MAC command generator 540, and the MAC arithmetic operation of the MAC operator 420 may also be performed by the MAC commands MAC_CMDs that are output from the MAC command generator 540. The MAC commands MAC_CMDs and the MAC arithmetic operation of the PIM device 400 according to the MAC commands MAC_CMDs will be described in detail with reference to FIG. 21.

The address generator 550 may receive address information from the command queue logic 210. The address generator 550 may generate the bank selection signal BS for selecting a memory bank where, for example, the memory bank 411 represents multiple memory banks. The address generator 550 may transmit the bank selection signal BS to the PIM device 400. In addition, the address generator 550 may generate the row address ADDR_R and the column address ADDR_C for accessing a region (e.g., memory cells) in the memory bank 411 and may transmit the row address ADDR_R and the column address ADDR_C to the PIM device 400.

Figure 21:
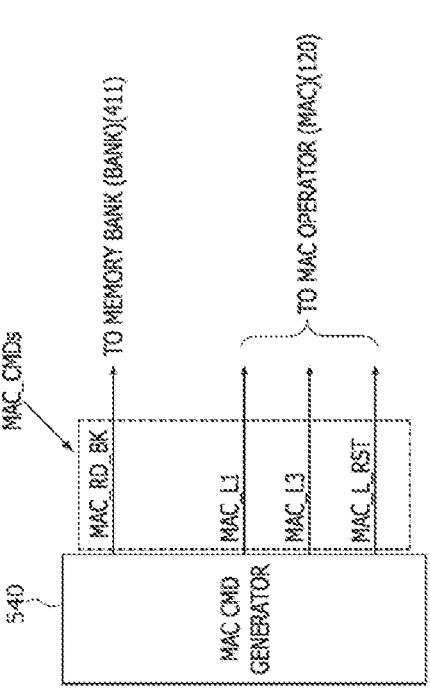
FIG. 21 illustrates MAC commands that are output from a MAC command generator of a PIM controller included in a PIM system according to a second embodiment of the present disclosure.

FIG. 21 illustrates the MAC commands MAC_CMDs that are output from the MAC command generator 540 included in the PIM system 1-2 according to the second embodiment of the present disclosure. As illustrated in FIG. 21, the MAC commands MAC_CMDs may include first to fourth MAC command signals. In an embodiment, the first MAC command signal may be a MAC read signal MAC_RD_BK, the second MAC command signal may be a MAC input latch signal MAC_L1, the third MAC command signal may be a MAC output latch signal MAC_L3, and the fourth MAC command signal may be a MAC latch reset signal MAC_L_RST.

The MAC read signal MAC_RD_BK may control an operation for reading the first data (e.g., the weight data) out of the memory bank 411 to transmit the first data to the MAC operator 420. The MAC input latch signal MAC_L1 may control an input latch operation of the weight data that is transmitted from the first memory bank 411 to the MAC operator 420. The MAC output latch signal MAC_L3 may control an output latch operation of the MAC result data generated by the MAC operator 420. And, the MAC latch reset signal MAC_L_RST may control an output operation of the MAC result data generated by the MAC operator 420 and a reset operation of an output latch included in the MAC operator 420.

The PIM system 1-2 according to the present embodiment may also be configured to perform the deterministic MAC arithmetic operation. Thus, the MAC commands MAC_CMDs transmitted from the PIM controller 500 to the PIM device 400 may be sequentially generated with fixed time intervals. Accordingly, the PIM controller 500 does not require any extra end signals of various operations executed for the MAC arithmetic operation to generate the MAC commands MAC_CMDs for controlling the MAC arithmetic operation. In an embodiment, latencies of the various operations executed by MAC commands MAC_CMDs for controlling the MAC arithmetic operation may be set to have fixed values in order to perform the deterministic MAC arithmetic operation. In such a case, the MAC commands MAC_CMDs may be sequentially output from the PIM controller 500 with fixed time intervals corresponding to the fixed latencies.

FIG. 22 is a flowchart illustrating processes of the MAC arithmetic operation described with reference to FIG. 5, which are performed in the PIM system 1-2 according to the second embodiment of the present disclosure. In addition, FIGS. 23 to 26 are block diagrams illustrating the processes of the MAC arithmetic operation illustrated in FIG. 5, which are performed in the PIM system 1-2 according to the second embodiment of the present disclosure. Referring to FIGS. 22 to 26, the first data (i.e., the weight data) may be written into the memory bank 411 at a step 361 to perform the MAC arithmetic operation. Thus, the weight data may be stored in the memory bank 411 of the PIM device 400. In the present embodiment, it may be assumed that the weight data are the elements W0.0, . . . , and W7.7 constituting the weight matrix of FIG. 5.

At a step 362, whether an inference is requested may be determined. An inference request signal may be transmitted from an external device located outside of the PIM system 1-2 to the PIM controller 500 of the PIM system 1-2. In an embodiment, if no inference request signal is transmitted to the PIM controller 500, the PIM system 1-2 may be in a standby mode until the inference request signal is transmitted to the PIM controller 500. Alternatively, if no inference request signal is transmitted to the PIM controller 500, the PIM system 1-2 may perform operations (e.g., data read/ write operations) other than the MAC arithmetic operation in the memory mode until the inference request signal is transmitted to the PIM controller 500. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 5. If the inference request signal is transmitted to the PIM controller 500 at the step 362, then the PIM controller 500 may write the vector data that is transmitted with the inference request signal into the global buffer 412 at a step 363. Accordingly, the vector data may be stored in the global buffer 412 of the PIM device 400.

Figure 23:
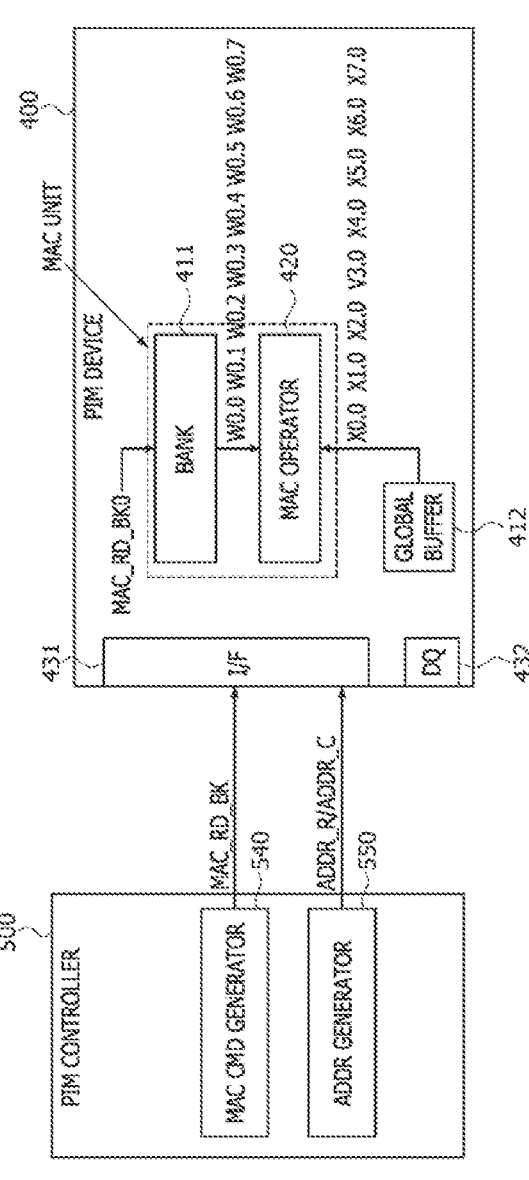

At a step 364, the MAC command generator 540 of the PIM controller 500 may generate and transmit the MAC read signal MAC_RD_BK to the PIM device 400, as illustrated in FIG. 23. In such a case, the address generator 550 of the PIM controller 500 may generate and transmit the row/column address ADDR_R/ADDR_C to the PIM device 400. Although not shown in the drawings, if a plurality of memory banks are disposed in the PIM device 400, the address generator 550 may transmit a bank selection signal for selecting the memory bank 411 among the plurality of memory banks as well as the row/column address ADDR_R/ ADDR_C to the PIM device 400. The MAC read signal MAC_RD_BK inputted to the PIM device 400 may control the data read operation for the memory bank 411 of the PIM device 400. The memory bank 411 may output and transmit the elements W0.0, . . . , and W0.7 in the first row of the weight matrix of the weight data stored in a region of the memory bank 411, which is designated by the row/column address ADDR_R/ADDR_C, to the MAC operator 420 in response to the MAC read signal MAC_RD_BK. In an embodiment, the data transmission from the memory bank 411 to the MAC operator 420 may be executed through a BIO line which is provided specifically for data transmission between the memory bank 411 and the MAC operator 420.

Meanwhile, the vector data X0.0, . . . , and X7.0 stored in the global buffer 412 may also be transmitted to the MAC operator 420 in synchronization with a point in time when the weight data are transmitted from the memory bank 411 to the MAC operator 420. In order to transmit the vector data X0.0, . . . , and X7.0 from the global buffer 412 to the MAC operator 420, a control signal for controlling the read operation for the global buffer 412 may be generated in synchronization with the MAC read signal MAC_RD_BK that is output from the MAC command generator 540 of the PIM controller 500. The data transmission between the global buffer 412 and the MAC operator 420 may be executed through a GIO line. Thus, the weight data and the vector data may be independently transmitted to the MAC operator 420 through two separate transmission lines, respectively. In an embodiment, the weight data and the vector data may be simultaneously transmitted to the MAC operator 420 through the BIO line and the GIO line, respectively.

Figure 24:
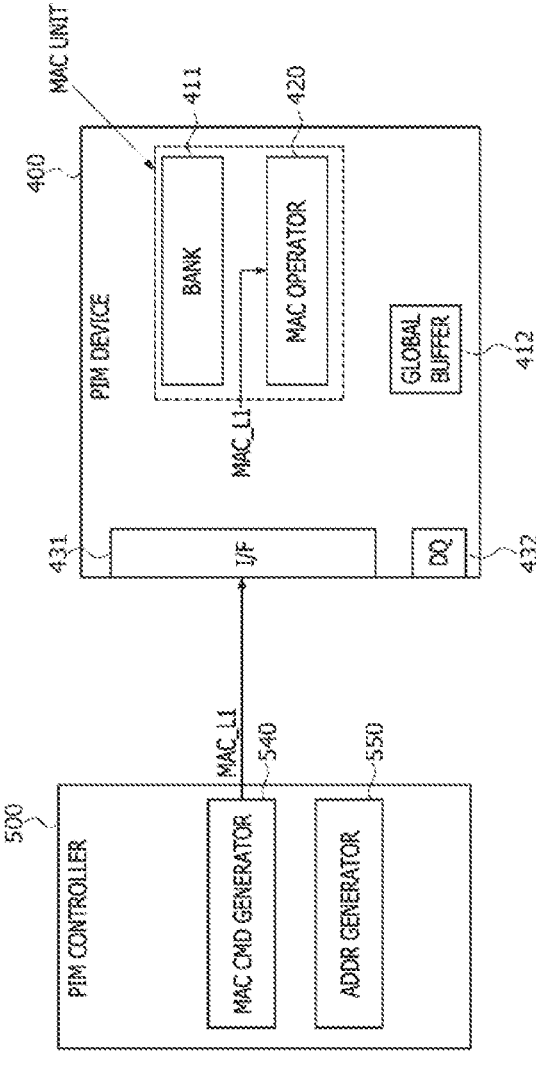

At a step 365, the MAC command generator 540 of the PIM controller 500 may generate and transmit the MAC input latch signal MAC_L1 to the PIM device 400, as illustrated in FIG. 24. The MAC input latch signal MAC_L1 may control the input latch operation of the weight data and the vector data for the MAC operator 420 of the PIM device 400. The elements W0.0, . . . , and W0.7 in the first row of the weight matrix and the elements X0.0, . . . , and X7.0 in the first column of the vector matrix may be inputted to the MAC circuit 122 of the MAC operator 420 by the input latch operation. The MAC circuit 122 may include the plurality of multipliers (e.g., the eight multipliers 122-11), the number of which is equal to the number of columns of the weight matrix and the number of rows of the vector matrix. The elements W0.0, . . . , and W0.7 in the first row of the weight matrix may be inputted to the first to eighth multipliers 122-11, respectively, and the elements X0.0, . . . , and X7.0 in the first column of the vector matrix may also be inputted to the first to eighth multipliers 122-11, respectively.

At a step 366, the MAC circuit 122 of the MAC operator 420 may perform the MAC arithmetic operation of an Rth row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. Specifically, as described with reference to FIG. 4, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may receive output data from the multipliers 122-11 and may perform the adding calculation of the output data of the multipliers 122-11 to output the result data of the adding calculation. The output data of the addition logic circuit 122-2 may correspond to result data (i.e., MAC result data) of the MAC arithmetic operation of the first row included in the weight matrix and the column included in the vector matrix. Thus, the output data of the addition logic circuit 122-2 may correspond to the element MAC0.0 located at the first row of the '8×1' MAC result matrix with the eight elements of MAC0.0, . . . , and MAC7.0 illustrated in FIG. 5. The output data MAC0.0 of the addition logic circuit 122-2 may be inputted to the output latch 123-1 disposed in the data output circuit 123 of the MAC operator 420, as described with reference to FIG. 4.

Figure 25:
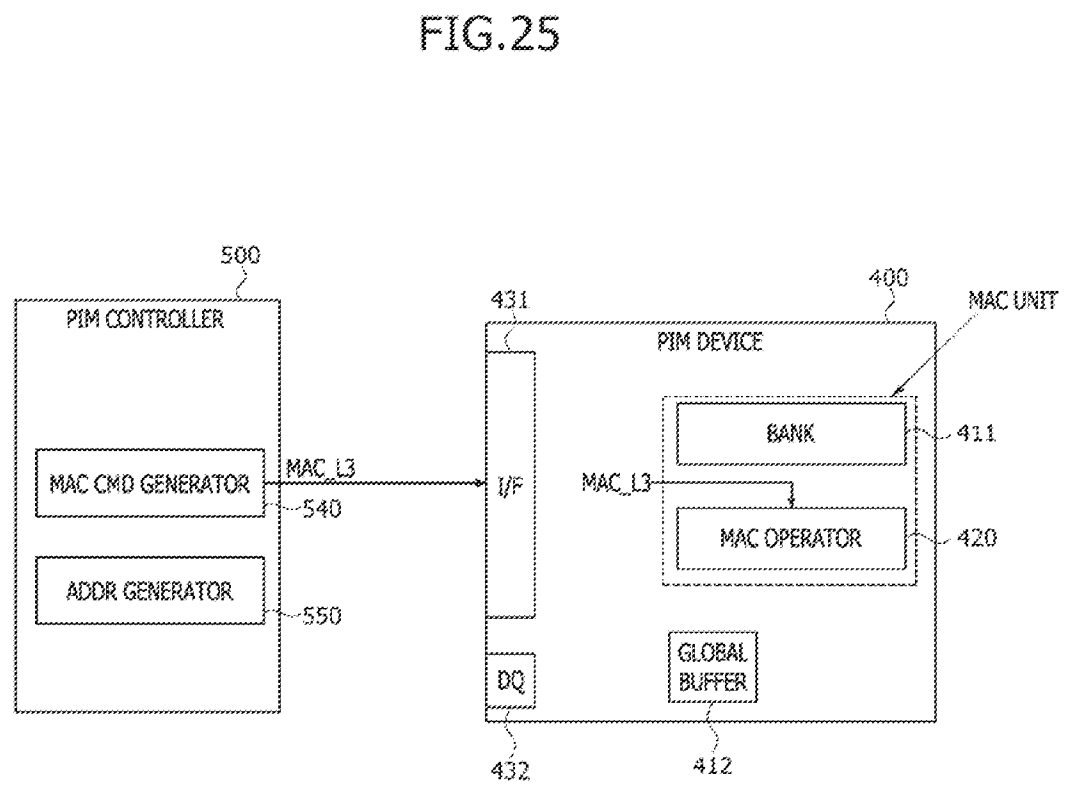

At a step 367, the MAC command generator 540 of the PIM controller 500 may generate and transmit the MAC output latch signal MAC_L3 to the PIM device 400, as illustrated in FIG. 25. The MAC output latch signal MAC_L3 may control the output latch operation of the MAC result data MAC0.0 performed by the MAC operator 420 of the PIM device 400. The MAC result data MAC0.0 transmitted from the MAC circuit 122 of the MAC operator 420 to the output latch 123-1 may be output from the output latch 123-1 by the output latch operation performed in synchronization with the MAC output latch signal MAC_L3, as described with reference to FIG. 4. The MAC result data MAC0.0 that is output from the output latch 123-1 may be inputted to the transfer gate 123-2 of the data output circuit 123.

Figure 26:
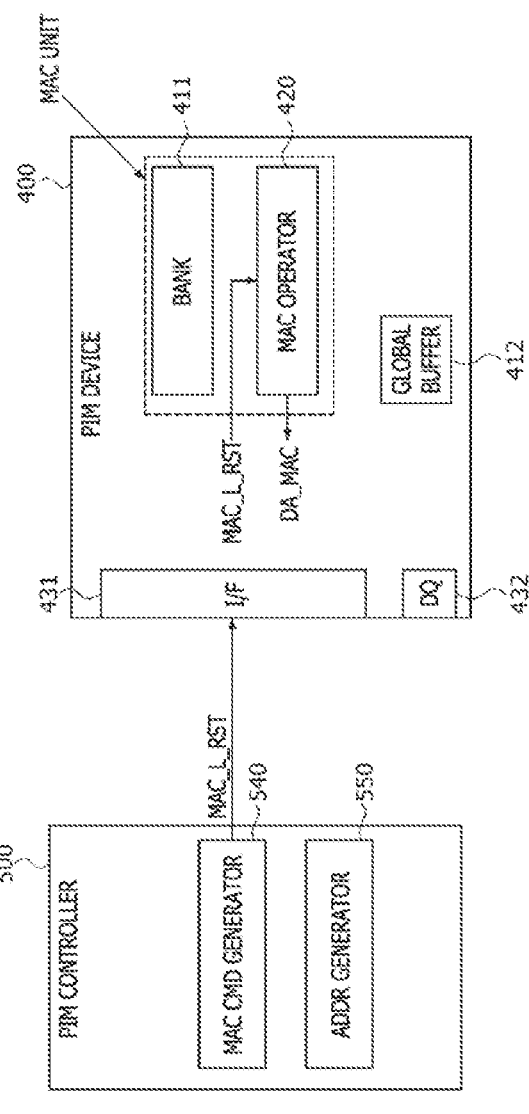

At a step 368, the MAC command generator 540 of the PIM controller 500 may generate and transmit the MAC latch reset signal MAC_L_RST to the PIM device 400, as illustrated in FIG. 26. The MAC latch reset signal MAC_L_RST may control an output operation of the MAC result data MAC0.0 generated by the MAC operator 420 and a reset operation of the output latch 123-1 included in the MAC operator 420. As described with reference to FIG. 4, the transfer gate 123-2 receiving the MAC result data MAC0.0 from the output latch 123-1 of the MAC operator 420 may be synchronized with the MAC latch reset signal MAC_L_RST to output the MAC result data MAC0.0. In an embodiment, the MAC result data MAC0.0 that is output from the MAC operator 420 may be stored into the memory bank 411 through the BIO line in the PIM device 400.

At a step 369, the row number 'R' of the weight matrix for which the MAC arithmetic operation is performed may be increased by '1'. Because the MAC arithmetic operation for the first row among the first to eight rows of the weight matrix has been performed during the previous steps, the row number of the weight matrix may change from '1' to '2' at the step 369. At a step 370, whether the row number changed at the step 369 is greater than the row number of the last row the eighth row) of the weight matrix may be determined. Because the row number of the weight matrix is changed to '2' at the step 370, a process of the MAC arithmetic operation may be fed back to the step 364.

If the process of the MAC arithmetic operation is fed back to the step 364 from the step 370, the same processes as described with reference to the steps 364 to 370 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix. If the process of the MAC arithmetic operation is fed back to the step 364 from the step 370, the processes from the step 364 to the step 370 may be iteratively performed until the MAC arithmetic operation is performed for all of the rows of the weight matrix with the vector matrix. If the MAC arithmetic operation for the eighth row of the weight matrix terminates and the row number of the weight matrix changes from '8' to '9' at the step 369, the MAC arithmetic operation may terminate because the row number of '9' is greater than the last row number of '8' at the step 370.

Figure 27:
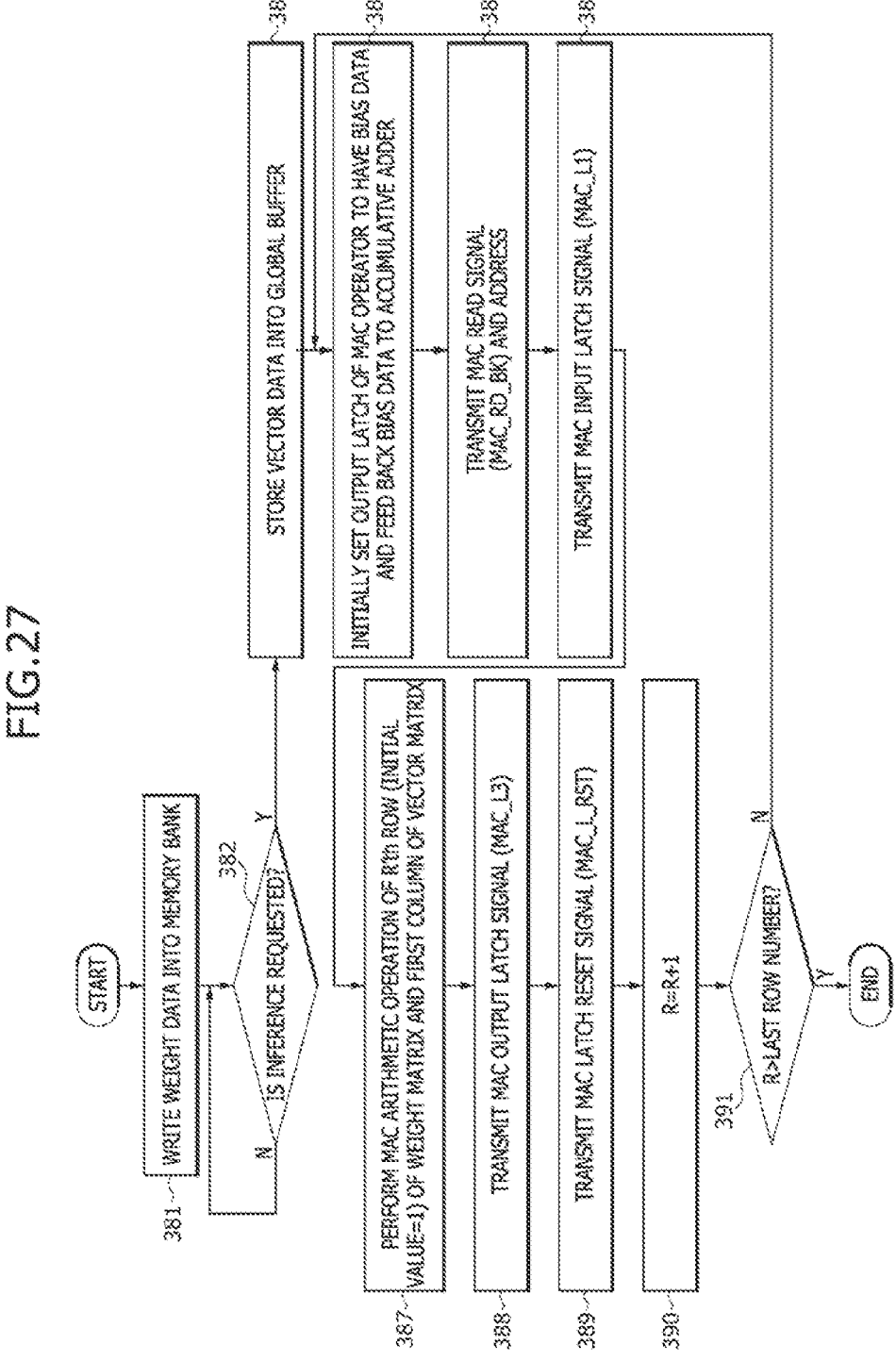
FIG. 27 is a flowchart illustrating processes of the MAC arithmetic operation illustrated in FIG. 14 in a PIM system according to a second embodiment of the present disclosure.

FIG. 27 is a flowchart illustrating processes of the MAC arithmetic operation described with reference to FIG. 14, which are performed in the PIM system 1-2 according to the second embodiment of the present disclosure. In order to perform the MAC arithmetic operation according to the present embodiment, the MAC operator 420 of the PIM device 400 may have the same configuration as the MAC operator 120-1 illustrated in FIG. 16. Referring to FIGS. 20 and 27, the first data (i.e., the weight data) may be written into the memory bank 411 at a step 381 to perform the MAC arithmetic operation. Thus, the weight data may be stored in the memory bank 411 of the PIM device 400. In the present embodiment, it may be assumed that the weight data are the elements W0.0, . . . , and W7.7 constituting the weight matrix of FIG. 14.

At a step 382, whether an inference is requested may be determined. An inference request signal may be transmitted from an external device located outside of the PIM system 1-2 to the PIM controller 500 of the PIM system 1-2. In an embodiment, if no inference request signal is transmitted to the PIM controller 500, the PIM system 1-2 may be in a standby mode until the inference request signal is transmitted to the PIM controller 500. Alternatively, if no inference request signal is transmitted to the PIM controller 500, the PIM system 1-2 may perform operations (e.g., data read/write operations) other than the MAC arithmetic operation in the memory mode until the inference request signal is transmitted to the PIM controller 500. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 14. If the inference request signal is transmitted to the PIM controller 500 at the step 382, then the PIM controller 500 may write the vector data that is transmitted with the inference request signal into the global buffer 412 at a step 383. Accordingly, the vector data may be stored in the global buffer 412 of the PIM device 400.

At a step 384, an output latch of a MAC operator 420 may be initially set to have bias data and the initially set bias data may be fed back to an accumulative adder of the MAC operator 420. This process is executed to perform the matrix adding calculation of the MAC result matrix and the bias matrix, which is described with reference to FIG. 14. That is, as illustrated in FIG. 16, the output latch 123-1 of the data output circuit 123-A included in the MAC operator 420 may be initially set to have the bias data of the bias matrix. Because the matrix multiplying calculation is executed for the first row of the weight matrix, the element B0.0 located at first row of the bias matrix may be initially set as the bias data in the output latch 123-1. The output latch 123-1 may output the bias data B0.0, and the bias data B0.0 that is output from the output latch 123-1 may be inputted to the accumulative adder 122-21D of the addition logic circuit 122-2 included in the MAC operator 420.

In an embodiment, in order to output the bias data B0.0 out of the output latch 123-1 and to feed back the bias data B0.0 to the accumulative adder 122-21D, the MAC command generator 540 of the PIM controller 500 may transmit the MAC output latch signal MAC_L3 to the MAC operator 420 of the PIM device 400. When a subsequent MAC arithmetic operation is performed, the accumulative adder 122-21D of the MAC operator 420 may add the MAC result data MAC0.0 that is output from the adder 122-21C disposed at the last stage to the bias data B0.0 which is fed back from the output latch 123-1 to generate the biased result data Y0.0 and may output the biased result data Y0.0 to the output latch 123-1. The biased result data Y0.0 may be output from the output latch 123-1 in synchronization with the MAC output latch signal MAC_L3 transmitted in a subsequent process.

At a step 385, the MAC command generator 540 of the PIM controller 500 may generate and transmit the MAC read signal MAC_RD_BK to the PIM device 400, as illustrated in FIG. 23. In such a case, the address generator 550 of the PIM controller 500 may generate and transmit the row/column address ADDR_R/ADDR_C to the PIM device 400. The MAC read signal MAC_RD_BK inputted to the PIM device 400 may control the data read operation for the memory bank 411 of the PIM device 400. The memory bank 411 may output and transmit the elements W0.0, . . . , and W0.7 in the first row of the weight matrix of the weight data stored in a region of the memory bank 411, which is designated by the row/column address ADDR_R/ADDR_C, to the MAC operator 420 in response to the MAC read signal MAC_RD_BK. In an embodiment, the data transmission from the memory bank 411 to the MAC operator 420 may be executed through a BIO line which is provided specifically for data transmission between the memory bank 411 and the MAC operator 420.

Meanwhile, the vector data X0.0, . . . , and X7.0 stored in the global buffer 412 may also be transmitted to the MAC operator 420 in synchronization with a point in time when the weight data are transmitted from the memory bank 411 to the MAC operator 420. In order to transmit the vector data X0.0, . . . , and X7.0 from the global buffer 412 to the MAC operator 420, a control signal for controlling the read operation for the global buffer 412 may be generated in synchronization with the MAC read signal MAC_RD_BK that is output from the MAC command generator 540 of the PIM controller 500. The data transmission between the global buffer 412 and the MAC operator 420 may be executed through a GIO line. Thus, the weight data and the vector data may be independently transmitted to the MAC operator 420 through two separate transmission lines, respectively. In an embodiment, the weight data and the vector data may be simultaneously transmitted to the MAC operator 420 through the BIO line and the GIO line, respectively.

At a step 386, the MAC command generator 540 of the PIM controller 500 may generate and transmit the MAC input latch signal MAC_L1 to the PIM device 400, as illustrated in FIG. 24. The MAC input latch signal MAC_L1 may control the input latch operation of the weight data and the vector data for the MAC operator 420 of the PIM device 400. The elements W0.0, . . . , and W0.7 in the first row of the weight matrix and the elements X0.0, . . . , and X7.0 in the first column of the vector matrix may be inputted to the MAC circuit 122 of the MAC operator 420 by the input latch operation. The MAC circuit 122 may include the plurality of multipliers (e.g., the eight multipliers 122-11), the number of which is equal to the number of columns of the weight matrix and the number of rows of the vector matrix. The elements W0.0, . . . , and W0.7 in the first row of the weight matrix may be inputted to the first to eighth multipliers 122-11, respectively, and the elements X0.0, . . . , and X7.0 in the first column of the vector matrix may also be inputted to the first to eighth multipliers 122-11, respectively.

At a step 387, the MAC circuit 122 of the MAC operator 420 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may receive output data of the multipliers 122-11 and may perform the adding calculation of the output data of the multipliers 122-11 to output the result data of the adding calculation to the accumulative adder 122-21D. The output data of the adder 122-21C included in the addition logic circuit 122-2 may correspond to result data (i.e., MAC result data) of the MAC arithmetic operation of the first row included in the weight matrix and the column included in the vector matrix. The accumulative adder 122-21D may add the output data MAC0.0 of the adder 122-21C to the bias data B0.0 fed back from the output latch 123-1 and may output the result data of the adding calculation. The output data (i.e., the biased result data Y0.0) of the accumulative adder 122-21D may be inputted to the output latch 123-1 disposed in the data output circuit 123-A of the MAC operator 420.

At a step 388, the MAC command generator 540 of the PIM controller 500 may generate and transmit the MAC output latch signal MAC_L3 to the PIM device 400, as described with reference to FIG. 25. The MAC output latch signal MAC_L3 may control the output latch operation for the output latch 123-1 of the MAC operator 420 included in the PIM device 400. The output latch 123-1 of the MAC operator 420 may output the biased result data Y0.0 according to the output latch operation performed in synchronization with the MAC output latch signal MAC_L3. The biased result data Y0.0 that is output from the output latch 123-1 may be inputted to the transfer gate 123-2 of the data output circuit 123-A.

At a step 389, the MAC command generator 540 of the PIM controller 500 may generate and transmit the MAC latch reset signal MAC_L_RST to the PIM device 400, as illustrated in FIG. 26. The MAC latch reset signal MAC_L_RST may control an output operation of the biased result data Y0.0 generated by the MAC operator 420 and a reset operation of the output latch 123-1 included in the MAC operator 420. The transfer gate 123-2 receiving the biased result data Y0.0 from the output latch 123-1 of the MAC operator 420 may be synchronized with the MAC latch reset signal MAC_L_RST to output the biased result data Y0.0. In an embodiment, the biased result data Y0.0 that is output from the MAC operator 120 may be stored into the memory bank 411 through the BIO line in the PIM device 400.

At a step 390, the row number 'R' of the weight matrix for which the MAC arithmetic operation is performed may be increased by '1'. Because the MAC arithmetic operation for the first row among the first to eight rows of the weight matrix has been performed at the previous steps, the row number of the weight matrix may change from '1' to '2' at the step 390. At a step 391, whether the row number changed at the step 390 is greater than the row number of the last row (i.e., the eighth row) of the weight matrix may be determined. Because the row number of the weight matrix is changed to '2' at the step 390, a process of the MAC arithmetic operation may be fed back to the step 384.

If the process of the MAC arithmetic operation is fed back to the step 384 at the step 391, the same processes as described with reference to the steps 384 to 391 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix. If the process of the MAC arithmetic operation is fed back to the step 384 at the step 391, then the processes from the step 384 to the step 390 may be iteratively performed until the MAC arithmetic operation is performed for all of the rows of the weight matrix with the vector matrix. If the MAC arithmetic operation for the eighth row of the weight matrix terminates and the row number of the weight matrix changes from '8' to '9' at the step 390, then the MAC arithmetic operation may terminate because the row number of '9' is greater than the last row number of '8' at the step 391.

FIG. 28 is a flowchart illustrating processes of the MAC arithmetic operation described with reference to FIG. 17, which are performed in the PIM system 1-2 according to the second embodiment of the present disclosure. In order to perform the MAC arithmetic operation according to the present embodiment, the MAC operator 420 of the PIM device 400 may have the same configuration as the MAC operator 120-2 illustrated in FIG. 19. Referring to FIGS. 19 and 28, the first data (i.e., the weight data) may be written into the memory bank 411 at a step 601 to perform the MAC arithmetic operation. Thus, the weight data may be stored in the memory bank 411 of the PIM device 400. In the present embodiment, it may be assumed that the weight data are the elements W0.0, . . . , and W7.7 constituting the weight matrix of FIG. 17.

At a step 602, whether an inference is requested may be determined. An inference request signal may be transmitted from an external device located outside of the PIM system 1-2 to the PIM controller 500 of the PIM system 1-2. In an embodiment, if no inference request signal is transmitted to the PIM controller 500, the PIM system 1-2 may be in a standby mode until the inference request signal is transmitted to the PIM controller 500. Alternatively, if no inference request signal is transmitted to the PIM controller 500, the PIM system 1-2 may perform operations (e.g., data read/ write operations) other than the MAC arithmetic operation in the memory mode until the inference request signal is transmitted to the PIM controller 500. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 17. If the inference request signal is transmitted to the PIM controller 500 at the step 602, then the PIM controller 500 may write the vector data that is transmitted with the inference request signal into the global buffer 412 at a step 603. Accordingly, the vector data may be stored in the global buffer 412 of the PIM device 400.

At a step 604, an output latch of a MAC operator 420 may be initially set to have bias data and the initially set bias data may be fed back to an accumulative adder of the MAC operator 420. This process is executed to perform the matrix adding calculation of the MAC result matrix and the bias matrix, which is described with reference to FIG. 17. That is, as described with reference to FIG. 19, the output latch 123-1 of the data output circuit 123-B included in the MAC operator 420 may be initially set to have the bias data of the bias matrix. Because the matrix multiplying calculation is executed for the first row of the weight matrix, the element B0.0 located at first row of the bias matrix may be initially set as the bias data in the output latch 123-1. The output latch 123-1 may output the bias data B0.0, and the bias data B0.0 that is output from the output latch 123-1 may be inputted to the accumulative adder 122-21D of the addition logic circuit 122-2 included in the MAC operator 420.

In an embodiment, in order to output the bias data B0.0 out of the output latch 123-1 and to feed back the bias data B0.0 to the accumulative adder 122-21D, the MAC command generator 540 of the PIM controller 500 may transmit the MAC output latch signal MAC_L3 to the MAC operator 420 of the PIM device 400. When a subsequent MAC arithmetic operation is performed, the accumulative adder 122-21D of the MAC operator 420 may add the MAC result data MAC0.0 that is output from the adder 122-21C disposed at the last stage of the addition logic circuit 122-2 to the bias data B0.0 which is fed back from the output latch 123-1 to generate the biased result data Y0.0 and may output the biased result data Y0.0 to the output latch 123-1. The biased result data Y0.0 may be output from the output latch 123-1 in synchronization with the MAC output latch signal MAC_L3 transmitted in a subsequent process.

At a step 605, the MAC command generator 540 of the PIM controller 500 may generate and transmit the MAC read signal MAC_RD_BK to the PIM device 400, as illustrated in FIG. 23. In such a case, the address generator 550 of the PIM controller 500 may generate and transmit the row/column address ADDR_R/ADDR_C to the PIM device 400. The MAC read signal MAC_RD_BK inputted to the PIM device 400 may control the data read operation for the memory bank 411 of the PIM device 400. The memory bank 411 may output and transmit the elements W0.0, . . . , and W0.7 in the first row of the weight matrix of the weight data stored in a region of the memory bank 411, which is designated by the row/column address ADDR_R/ADDR_C, to the MAC operator 420 in response to the MAC read signal MAC_RD_BK. In an embodiment, the data transmission from the memory bank 411 to the MAC operator 420 may be executed through a BIO line which is provided specifically for data transmission between the memory bank 411 and the MAC operator 420.

Meanwhile, the vector data X0.0, . . . , and X7.0 stored in the global buffer 412 may also be transmitted to the MAC operator 420 in synchronization with a point in time when the weight data are transmitted from the memory bank 411 to the MAC operator 420. In order to transmit the vector data X0.0, . . . , and X7.0 from the global buffer 412 to the MAC operator 420, a control signal for controlling the read operation for the global buffer 412 may be generated in synchronization with the MAC read signal MAC_RD_BK that is output from the MAC command generator 540 of the PIM controller 500. The data transmission between the global buffer 412 and the MAC operator 420 may be executed through a GIO line. Thus, the weight data and the vector data may be independently transmitted to the MAC operator 420 through two separate transmission lines, respectively. In an embodiment, the weight data and the vector data may be simultaneously transmitted to the MAC operator 420 through the BIO line and the GIO line, respectively.

At a step 606, the MAC command generator 540 of the PIM controller 500 may generate and transmit the MAC input latch signal MAC_L1 to the PIM device 400, as described with reference to FIG. 24. The MAC input latch signal MAC_L1 may control the input latch operation of the weight data and the vector data for the MAC operator 420 of the PIM device 400. The elements W0.0, . . . , and W0.7 in the first row of the weight matrix and the elements X0.0, . . . , and X7.0 in the first column of the vector matrix may be inputted to the MAC circuit 122 of the MAC operator 420 by the input latch operation. The MAC circuit 122 may include the plurality of multipliers (e.g., the eight multipliers 122-11), the number of which is equal to the number of columns of the weight matrix and the number of rows of the vector matrix. The elements W0.0, . . . , and W0.7 in the first row of the weight matrix may be inputted to the first to eighth multipliers 122-11, respectively, and the elements X0.0, . . . , and X7.0 in the first column of the vector matrix may also be inputted to the first to eighth multipliers 122-11, respectively.

At a step 607, the MAC circuit 122 of the MAC operator 420 may perform the MAC arithmetic operation of an Rth row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may receive output data of the multipliers 122-11 and may perform the adding calculation of the output data of the multipliers 122-11 to output the result data of the adding calculation to the accumulative adder 122-21D. The output data of the adder 122-21C included in the addition logic circuit 122-2 may correspond to result data (i.e., the MAC result data MAC0.0) of the MAC arithmetic operation of the first row included in the weight matrix and the column included in the vector matrix. The accumulative adder 122-21D may add the output data MAC0.0 of the adder 122-21C to the bias data B0.0 fed back from the output latch 123-1 and may output the result data of the adding calculation. The output data (i.e., the biased result data Y0.0) of the accumulative adder 122-21D may be inputted to the output latch 123-1 disposed in the data output circuit 123-A of the MAC operator 420.

At a step 608, the MAC command generator 540 of the PIM controller 500 may generate and transmit the MAC output latch signal MAC_L3 to the PIM device 400, as described with reference to FIG. 25. The MAC output latch signal MAC_L3 may control the output latch operation for the output latch 123-1 of the MAC operator 420 included in the PIM device 400. The output latch 123-1 of the MAC operator 420 may output the biased result data Y0.0 according to the output latch operation performed in synchronization with the MAC output latch signal MAC_L3. The biased result data Y0.0 that is output from the output latch 123-1 may be inputted to the activation function logic circuit 123-5, which is illustrated in FIG. 19. At a step 610, the activation function logic circuit 123-5 may apply an activation function to the biased result data Y0.0 to generate a final output value, and the final output value may be inputted to the transfer gate (123-2 of FIG. 4).

At a step 610, the MAC command generator 540 of the PIM controller 500 may generate and transmit the MAC latch reset signal MAC_L_RST to the PIM device 400, as described with reference to FIG. 26. The MAC latch reset signal MAC_L_RST may control an output operation of the final output value generated by the MAC operator 420 and a reset operation of the output latch 123-1 included in the MAC operator 420. The transfer gate 123-2 receiving the final output value from the activation function logic circuit 123-5 of the data output circuit 123-B included in the MAC operator 420 may be synchronized with the MAC latch reset signal MAC_L_RST to output the final output value. In an embodiment, the final output value that is output from the MAC operator 420 may be stored into the memory bank 411 through the BIO line in the PIM device 400.

At a step 611, the row number of the weight matrix for which the MAC arithmetic operation is performed may be increased by '1'. Because the MAC arithmetic operation for the first row among the first to eight rows of the weight matrix has been performed at the previous steps, the row number of the weight matrix may change from '1' to '2' at the step 611. At a step 612, whether the row number changed at the step 611 is greater than the row number of the last row (i.e., the eighth row) of the weight matrix may be determined. Because the row number of the weight matrix is changed to '2' at the step 611, a process of the MAC arithmetic operation may be fed back to the step 604.

If the process of the MAC arithmetic operation is fed back to the step 604 from the step 612, the same processes as described with reference to the steps 604 to 612 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix to generate the MAC result data (corresponding to the element MAC1.0 located in the second row of the MAC result matrix) and the bias data (corresponding to the element B1.0 located in the second row of the bias matrix). If the process of the MAC arithmetic operation is fed back to the step 604 from the step 612, the processes from the step 604 to the step 612 may be iteratively performed until the MAC arithmetic operation is performed for all of the rows (i.e., first to eighth rows) of the weight matrix with the vector matrix. If the MAC arithmetic operation for the eighth row of the weight matrix terminates and the row number of the weight matrix changes from '8' to '9' at the step 611, the MAC arithmetic operation may terminate because the row number of '9' is greater than the last row number of '8' at the step 612.

Figure 29:
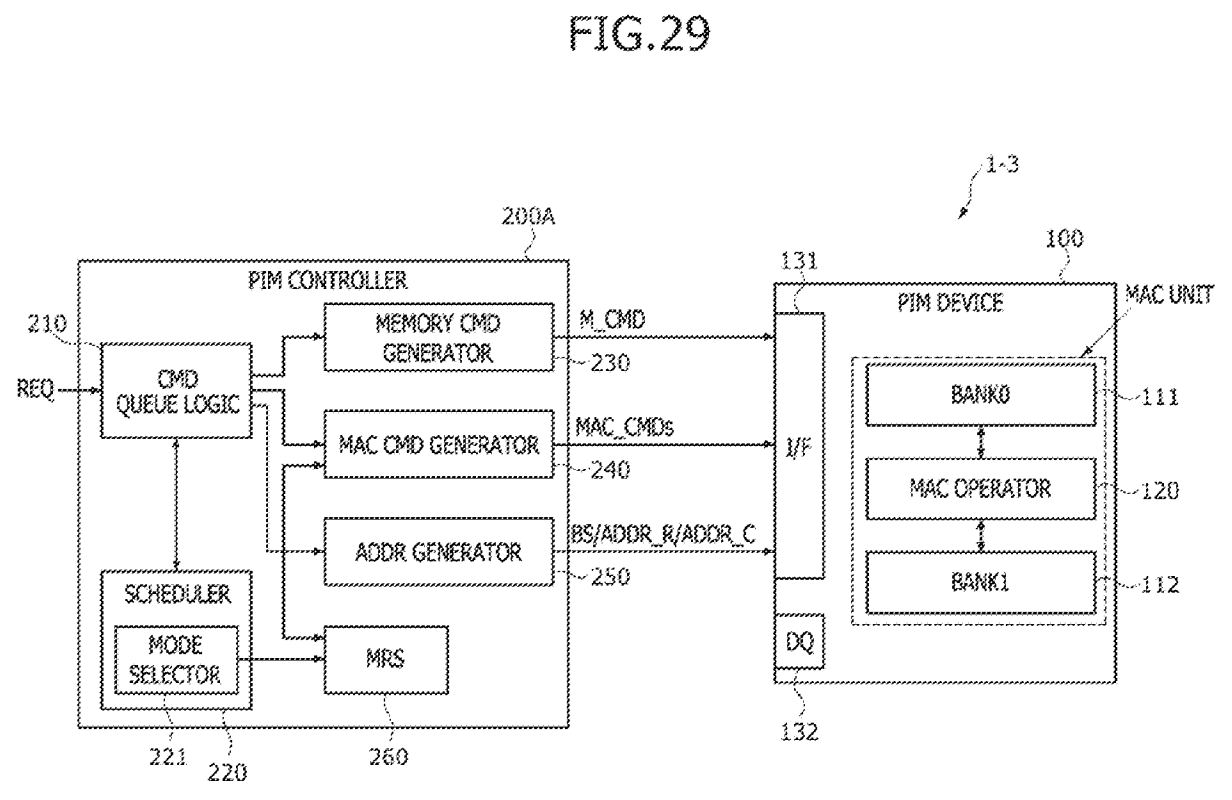

FIG. 29 is a block diagram illustrating a PIM system 1-3 according to a third embodiment of the present disclosure. As illustrated in FIG. 29, the PIM system 1-3 may have substantially the same configuration as the PIM system 1-1 illustrated in FIG. 2 except that a PIM controller 200A of the PIM system 1-3 further includes a mode register set (MRS) 260 as compared with the PIM controller 200 of the PIM system 1-1. Thus, the same explanation as described with reference to FIG. 2 will be omitted hereinafter. The mode register set 260 in the PIM controller 200A may receive an MRS signal instructing arrangement of various signals necessary for the MAC arithmetic operation of the PIM system 1-3. In an embodiment, the mode register set 260 may receive the MRS signal from the mode selector 221 included in the scheduler 220. However, in another embodiment, the MRS signal may be provided by an extra logic circuit other than the mode selector 221. The mode register set 260 receiving the MRS signal may transmit the MRS signal to the MAC command generator 240. For an embodiment, the MRS 260 represents a MRS circuit.

In an embodiment, the MRS signal may include timing information on when the MAC commands MAC_CMDs are generated. In such a case, the deterministic operation of the PIM system 1-3 may be performed by the MRS signal provided by the MRS 260. In another embodiment, the MRS signal may include information on the timing related to an interval between the MAC modes or information on a mode change between the MAC mode and the memory mode. In an embodiment, generation of the MRS signal in the MRS

260 may be executed before the vector data are stored in the second memory bank 112 of the PIM device 100 by the inference request signal transmitted from an external device to the PIM controller 200A. Alternatively, the generation of the MRS signal in the MRS 260 may be executed after the vector data are stored in the second memory bank 112 of the PIM device 100 by the inference request signal transmitted from an external device to the PIM controller 200A.

Figure 30:
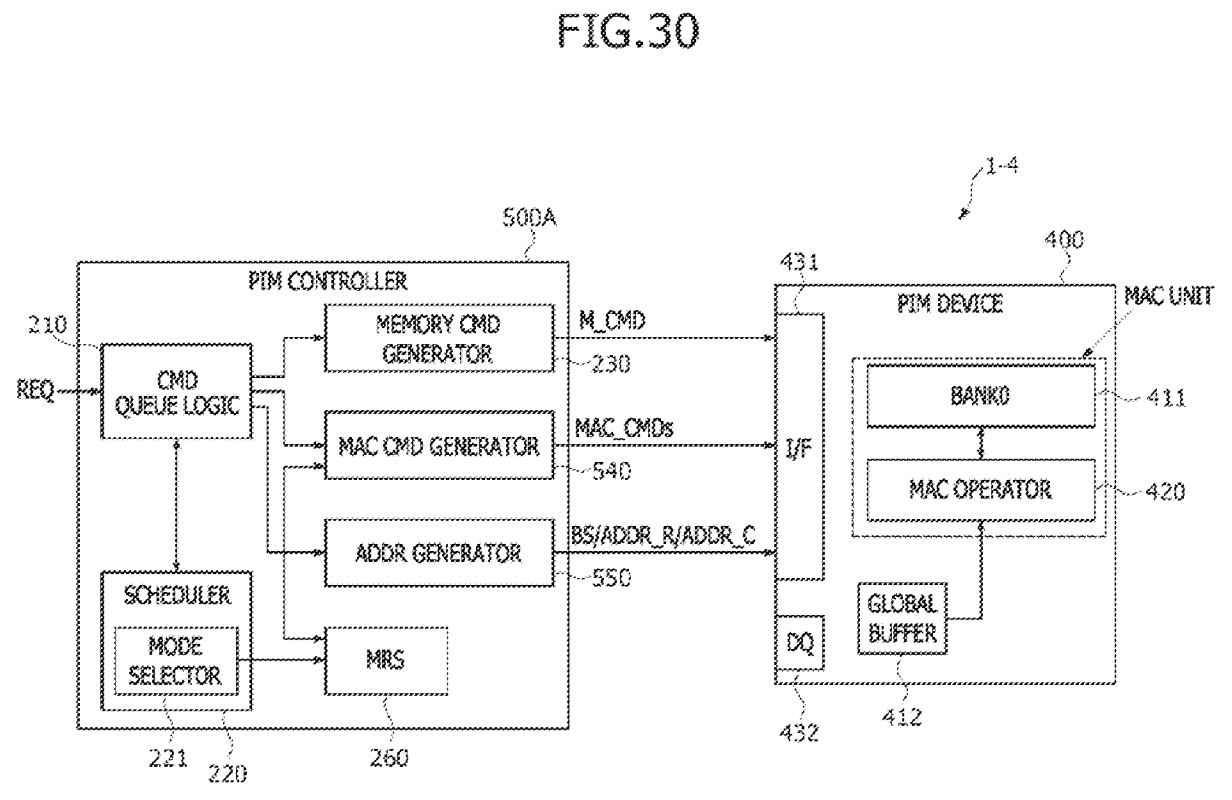

FIG. 30 is a block diagram illustrating a PIM system 1-4 according to a fourth embodiment of the present disclosure. As illustrated in FIG. 30, the PIM system 1-4 may have substantially the same configuration as the PIM system 1-2 illustrated in FIG. 20 except that a PIM controller 500A of the PIM system 1-4 further includes the mode register set (MRS) 260 as compared with the PIM controller 500 of the PIM system 1-2. Thus, the same explanation as described with reference to FIG. 20 will be omitted hereinafter. The mode register set 260 in the PIM controller 500A may receive an MRS signal instructing arrangement of various signals necessary for the MAC arithmetic operation of the PIM system 1-4. In an embodiment, the mode register set 260 may receive the MRS signal from the mode selector 221 included in the scheduler 220. However, in another embodiment, the MRS signal may be provided by an extra logic circuit other than the mode selector 221. The mode register set 260 receiving the MRS signal may transmit the MRS signal to the MAC command generator 540.

In an embodiment, the MRS signal may include timing information on when the MAC commands MAC_CMDs are generated. In such a case, the deterministic operation of the PIM system 1-4 may be performed by the MRS signal provided by the MRS 260. In another embodiment, the MRS signal may include information on the timing related to an interval between the MAC modes or information on a mode change between the MAC mode and the memory mode. In an embodiment, generation of the MRS signal in the MRS 260 may be executed before the vector data are stored in the global buffer 412 of the PIM device 400 by the inference request signal transmitted from an external device to the PIM controller 500A. Alternatively, the generation of the MRS signal in the MRS 260 may be executed after the vector data are stored in the global buffer 412 of the PIM device 400 by the inference request signal transmitted from an external device to the PIM controller 500A.

Figure 31:
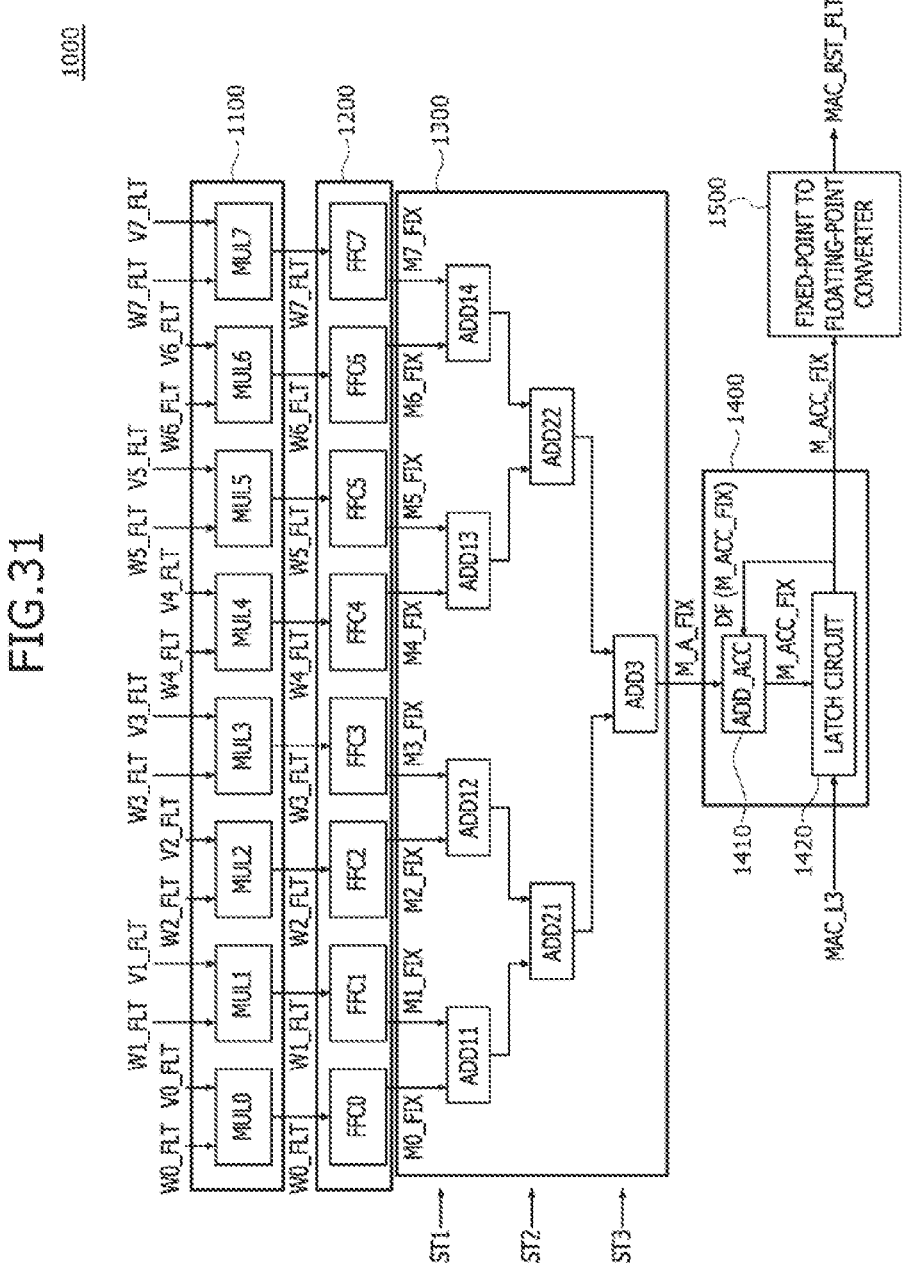
FIG. 31 illustrates a MAC operator according to an embodiment of the present disclosure.

FIG. 31 illustrates a MAC operator 1000 according to an embodiment of the present disclosure. The MAC operator 1000 according to the present embodiment may be applied to the PIM devices 10, 100, and 400, described with reference to FIGS. 1, 2, and 20. Referring to FIG. 31, the MAC operator 1000 of the present embodiment may include a multiplying circuit 1100, a floating-point-to-fixed-point converting circuit 1200, an adder tree 1300, an accumulator 1400, and a fixed-point-to-floating-point converter 1500. In the MAC operator 1000 according to the present embodiment, a floating-point operation may be performed in the multiplying circuit 1100, but a fixed-point operation may be performed in the adder tree 1300 and the accumulator 1400.

Specifically, the multiplying circuit 1100 may include a plurality of multipliers, for example, first to eighth multipliers MUL0-MUL7 arranged in parallel with each other. Here, the parallel arrangement may mean an arrangement structure in which data input/output and arithmetic operations are independently performed, and this may be applied in the same manner hereinafter. Each of the multipliers MUL0-MUL7 may receive weight data W0_FLT-W7_FLT and vector data V0_FLT-V7_FLT. Here, the weight data W0_FLT-W7_FLT may be some of the elements of the weight matrix described with reference to FIGS. 4, 14, and 17. In addition, the vector data V0_FLT-V7_FLT may be some of the elements of the vector matrix described with reference to FIGS. 4, 14, and 17.

Each of the multipliers MUL0-MUL7 may perform a multiplication operation on each of the weight data W0_FLT-W7_FLT and each of the vector data V0_FLT-V7_FLT to output multiplication result data M0_FLT-M7_FLT, respectively, as a result. In this embodiment, each of the weight data W0_FLT-W7_FLT and each of the vector data VQ_FLT-V7_FLT may have a floating-point format. Accordingly, each of the multipliers MUL0-MUL7 may be configured to perform floating-point multiplication. Each of the multiplication result data M0_FLT-M7_FLT that is output from the multipliers MUL0-MUL7 may have a floating-point data format.

In the floating-point multiplication process, because a mantissas of input data are multiplied, the mantissa of data generated as a result of the multiplication may be composed of more bits than the mantissa of the input data. Accordingly, it is common to perform a normalization process in which a binary point is moved so that only '1' remains to the left of the binary point in the multiplication result data for a floating-point format data and so that the number of bits of the mantissa of the multiplication result data becomes equal to the number of bits of each of the mantissas of the input data. This normalization process may be performed in a normalizer.

In this embodiment, each of the multipliers MUL0-MUL7 may be configured to omit the normalization process. Accordingly, power consumption in the normalization process in the multipliers MUL0-MUL7 may be reduced. Hereinafter, a case where each of the weight data W0_FLT-W7_FLT and each of the vector data V0_FLT-V7_FLT has a mantissa of 'K' bits ('K' is a natural number) will be described as an example. In this case, in the case of the first multiplier MUL0, in the process of performing multiplication on the first weight data W0_FLT and the first vector data V0_FLT, multiplication may be performed on the mantissa of the first weight data W0_FLT of 'K+1' bits with an implied bit (or also called a "hidden bit") and the mantissa of the first vector data V0_FLT. The data generated as a result of the multiplication on the mantissas may constitute a mantissa of the first multiplication result data M0_FLT. As described above, as a normalization process is omitted, the mantissa of the multiplication result data M0_FLT that is output from the first multiplier MUL0 may have the number of '2*(K+1)' bits. Such an operation process in the first multiplier MUL0 may be equally applied to the remaining multipliers MUL1-MUL7.

The floating-point-to-fixed-point converting circuit 1200 may be configured by arranging a plurality of floating-point-to-fixed-point converters, for example, first to eighth floating-point-to-fixed-point converters FFC0-FFC7 in parallel with each other. The floating-point-to-fixed-point converters FFC0-FFC7 may receive a floating-point format multiplication result data M0_FLT-M7_FLT from the multipliers MUL0-MUL7, respectively. For example, the first floating-point-to-fixed-point converter FFC0 may receive the first multiplication result data M0_FLT from the first multiplier MUL0. The second floating-point-to-fixed-point converter FFC1 may receive the second multiplication result data M1_FLT from the second multiplier MUL1. Similarly, the eighth floating-point-to-fixed-point converter FFC7 may receive the eighth multiplication result data M7_FLT from the eighth multiplier MUL7.

Each of the floating-point-to-fixed-point converters FFC0-FFC7 may convert the data format of each of the floating-point format multiplication result data M0_FLT-M7_FLT into a fixed-point format to output a fixed-point format multiplication result data M0_FIX-M7_FIX. For example, the first floating-point-to-fixed-point converter FFC0 may convert the data format of the floating-point format first multiplication result data M0-FLT transmitted from the first multiplier MUL0 into a fixed-point format to output fixed-point format first multiplication result data M0_FIX. The second floating-point-to-fixed-point converter FFC1 may convert the data format of the floating-point format second multiplication result data M1_FLT transmitted from the second multiplier MUL1 into a fixed-point format to output fixed-point format second multiplication result data M1_FIX. Similarly, the eighth floating-point-to-fixed-point converter FFC7 may convert the data format of the floating-point format eighth multiplication result data M7_FLT transmitted from the eighth multiplier MUL7 into a fixed-point format to output the fixed-point format eighth multiplication result data M7_FIX.

The adder tree 1300 may perform adding operations on the floating-point format multiplication result data M0_FIX-M7_FIX that is output from the floating-point-to-fixed-point converters FFC0-FFC7. Because the multiplication result data M0_FIX-M7_FIX have fixed-point formats in which the position of a binary point is fixed, the adder tree 1300 may be configured as a fixed-point adder tree. Accordingly, overhead of energy and latency due to alignment, normalization, and rounding in the floating-point adder tree may be reduced, and circuit area may also be reduced.

The adder tree 1300 may be configured in a tree structure with a plurality of stages. Each of the plurality of stages may include at least one or more adders. In the present embodiment, the adder tree 1300 may have first to third stages ST1, ST2, and ST3. Four first adders ADD11-ADD14 may be disposed in parallel with each other in the uppermost stage of the adder tree 1300, that is, the first stage ST1. Two second adders ADD21-ADD22 may be disposed in parallel with each other in the second stage ST2 of the adder tree 1300. One third adder ADD3 may be disposed in the third stage ST3 which is the lowermost stage of the adder tree 1300.

When the adders constituting the adder tree 1300 are composed of half adders, the number of the adders of the first stage, which is the uppermost stage of the adder tree 1300, may be half of the number of the multipliers. The number of the adders in the second stage of the adder tree 1300 may be half of the number of the adders in the first stage. That is, the number of the adders of the lower stage may be half of the number of the adders of the upper stage directly adjacent thereto. The lowermost stage of the adder tree 1300 may be composed of one adder.

Each of the first adders ADD11-ADD14 of the first stage ST1 may perform an addition operation on the two floating-point format multiplication result data that is transmitted through the two floating-point-to-fixed-point converters FFCs to output fixed-point format result data. For example, the first adder ADD11 among the first adders ADD11-ADD14 may receive fixed-point format first multiplication result data M0_FIX and fixed-point format second multiplication result data M1_FIX from the first floating-point-to-fixed-point converter FFC0 and the second floating-point-to-fixed-point converter FFC1, respectively. The first adder ADD11 may perform an addition operation on the fixed-point format first multiplication result data M0_FIX and the fixed-point format second multiplication result data and input an adding result to the second adder ADD21 of the second stage ST2. The remaining first adders ADD12-ADD14 may operate similarly.

Each of the second adders ADD21-ADD22 of the second stage ST2 may perform an addition operation on the output data of the two first adders of the first stage ST1, and output fixed-point format result data. For example, the second adder ADD21 may perform an addition operation on the output data that is output from the first adders ADD11-ADD12, and input an addition result data to the third adder ADD3 of the third stage ST3. Similarly, the second adder ADD22 may perform an addition operation on the output data that is output from the first adders ADD13-ADD14, and input an addition result to the third adder ADD3 of the third stage ST3. The third adder ADD3 of the third stage ST3 may perform an addition operation on the output data of the second adders ADD21-ADD22 of the second stage ST2, and output fixed-point format multiplication-addition data M_A_FIX as a result.

As described above, each of the first adders ADD11-ADD14 of the first stage ST1, which is the uppermost stage of the adder tree 1300, may receive fixed-point format data and perform an addition operation on the fixed-point format data. Accordingly, each of the adders ADD11-ADD14, ADD21-ADD22, and ADD3 constituting the adder tree 1300 may be configured for the fixed-point operation rather than the floating-point operation. The MAC operator 1000 according to the present embodiment performs MAC operations on weight data and vector data of a floating-point format, but the adders ADD11-ADD14, ADD21-ADD22, and ADD3 constituting the adder tree 1300 may be configured for the fixed-point operation, thereby reducing the circuit region compared to the case where the adder tree is composed of floating-point operation adders and improving the MAC operation performance.

The accumulator 1400 may include an accumulating adder 1410 and a latch circuit 1420. The accumulating adder 1410 may receive fixed-point format multiplication-addition data M_A_FIX that is output from the third adder ADD3 of the third stage ST3, which is the lowermost stage of the adder tree 1300. In addition, the accumulating adder 1410 may receive feedback data DF that is output from the latch circuit 1420. The accumulating adder 1410 may add the multiplication-addition data and the feedback data DF to output fixed-point format multiplication-accumulation data M_ACC_FIX.

The latch circuit 1420 may latch the fixed-point format multiplication-accumulation data M_ACC_FIX that is output from the accumulating adder 1410. The latch circuit 1420 may output fixed-point format multiplication-accumulation data M_ACC_FIX in response to a first logic level, for example, a 'logic high' of the MAC output latch signal MAC_L3. The latch circuit 1420 may feedback the fixed-point format multiplication-accumulation data M_ACC_FIX as the feedback data DF to the accumulating adder 1410. Further, the latch circuit 1420 may transmit the fixed-point format multiplication-accumulation data M_ACC_FIX to the fixed-point-to-floating-point converter 1500.

The fixed-point-to-floating-point converter 1500 may receive the fixed-point format multiplication-addition data M_ACC_FIX from the latch circuit 1420 of the accumulator 1400. The fixed-point-to-floating-point converter 1500 may convert the fixed-point format multiplication-addition data M_ACC_FIX into the floating-point format data to output floating-point format MAC result data MAC_RST_FLT.

Figure 32:
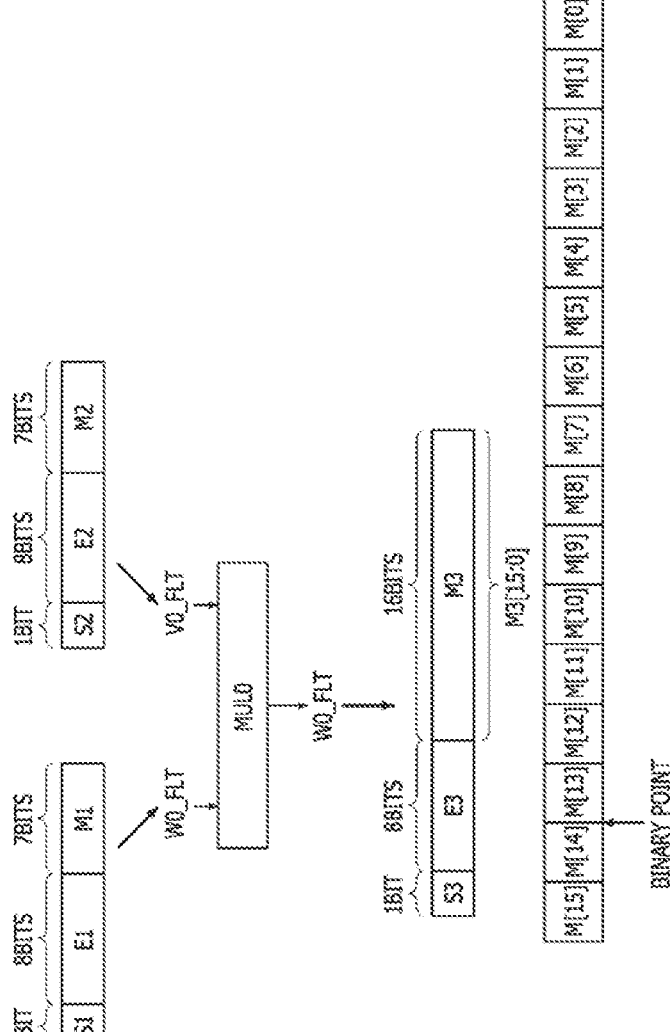
FIG. 32 illustrates an embodiment of data types of input data and output data of a first multiplier in the MAC operator of FIG. 31.

FIG. 32 illustrates an embodiment of data formats of input data and output data of the first multiplier in the MAC operator of FIG. 31. The following description may be equally applied to the remaining multipliers MUL1-MUL7 constituting the multiplying circuit 1100 in the MAC operator 1000 of FIG. 31. In the present embodiment, it is premised that the input data, that is, the first weight data W0_FLT and the first vector data V0_FLT are in 16-bit brain floating-point (BF16) type. However, this is only an example, and the types of the first weight data W0_FLT and the first vector data V0_FLT may be types other than the 16-bit brain floating-point (BF16) type, such as 16-bit floating-point (FP16) type, 32-bit floating-point (FP32) type, a 32-bit floating-point (FP32) type, or various other floating-point types.

Referring to FIG. 32, the floating-point format first weight data W0_FLT inputted to the first multiplier MUL0 may be composed of a 1-bit sign S1, an 8-bit exponent E1, and a 7-bit mantissa M1. Likewise, the floating-point format first vector inputted to the first multiplier MUL0 may be composed of a 1-bit sign S2, an 8-bit exponent E2, and a 7-bit mantissa M2. The first floating-point format multiplication result data M0_FLT that is output from the first multiplier MUL0 may be composed of a 1-bit sign S3, an 8-bit exponent E3, and a 16-bit mantissa M3. The mantissa M3 of the first multiplication result data M0_FLT may be generated by multiplication on the mantissa M1 of the first weight data W0_FLT and the mantissa M2 of the first vector data V0_FLT.

The multiplication on the mantissa M1 of the first weight data W0_FLT and the mantissa M2 of the first vector data V0_FLT may be performed while a 1-bit implied bit (or also referred to as a "hidden bit") is included in the mantissa M1 of the first weight data W0_FLT and the mantissa M2 of the first vector data V0_FLT. Accordingly, 16-bit data may be generated as a result of the multiplication on the mantissa M1 of the first weight data W0_FLT and the mantissa M2 of the first vector data V0_FLT. As described with reference to FIG. 31, because the first multiplier MUL0 omits the normalization process, the 16-bit data, which is the multiplication result of the mantissa M1 of the first weight data W0_FLT and the mantissa M2 of the first vector data V0_FLT, may be output from the first multiplier MUL0 as it is to form the mantissa M3 of the first multiplication result data M0_FLT. That is, the mantissa M3 of the first multiplication result data M0_FLT is not in a normalized format, and accordingly, the binary point in the mantissa bits M3[15:0] of the first multiplication result data M0_FLT may be positioned between the 14th bit M[13] and the 15th bit M[14]. That is, there may be two bits M[15:14] with an MSB prior to the binary point.

Figure 33:
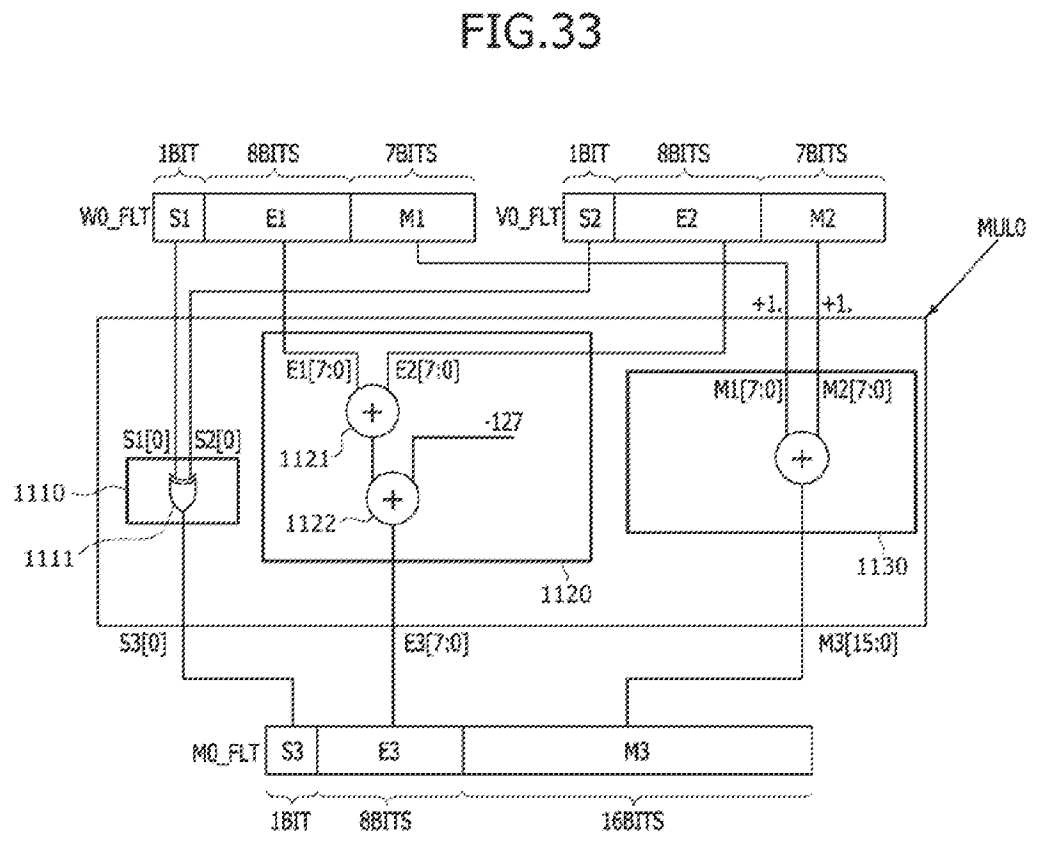

FIG. 33 illustrates an embodiment of a configuration and an operation of the first multiplier MUL0 of the multiplying circuit 1100 of FIG. 31. In the present embodiment, it is premised that each of the first weight data W0_FLT and the first vector data V0_FLT has a 16-bit brain floating-point (BF16) type. Accordingly, as described with reference to FIG. 32, the floating-point format first weight data W0_FLT inputted to the first multiplier MUL0 may include a 1-bit sign S1, an 8-bit exponent E1, and a 7-bit mantissa M1. Similarly, the floating-point format first vector data V0_FLT inputted to the first multiplier MUL0 may include a 1-bit sign S2, an 8-bit exponent E2, and a 7-bit mantissa M2. The description of the configuration and operation of the first multiplier MUL0 according to the present embodiment may be equally applied to the remaining multipliers MUL1-MUL7 constituting the multiplying circuit 1100.

Referring to FIG. 33, the first multiplier MUL0 may include a sign processing circuit 1110, an exponent processing circuit 1120, and a mantissa processing circuit 1130. The sign processing circuit 1110 may include an exclusive OR (hereinafter, referred to as "XOR") gate 1111. The XOR gate 1111 may receive a sign bit S1[0] of the first weight data W0_FLT and a sign bit S2[0] of the first vector data V0_FLT. When only one of the sign bit S1[0] of the first weight data W0_FLT and the sign bit S2[0] of the first vector data V0_FLT represents '1' representing a negative number, the XOR gate 1111 may output '1' representing a positive number. On the other hand, when the sign bit S1[0] of the first weight data W0_FLT and the sign bit S2[0] of the first vector data V0_FLT all represent '0' representing a positive number, or all represent '1', the XOR gate 1111 may output '0' representing a negative number. The 1-bit output data S3[0] that is output from the XOR gate 1111 may constitute the sign S3 of the floating-point format first multiplication result data M0_FLT.

The exponent processing circuit 1120 may include a first exponent adder 1121 and a second exponent adder 1122. The first exponent adder 1121 may receive exponent bits E1[7:0] of the first weight data W0_FLT and exponent bits E2[7:0] of the first vector data V0_FLT. The first exponent adder 1121 may add the exponent bits E1[7:0] of the first weight data W0_FLT and the exponent bits E2[7:0] of the first vector data V0_FLT, and output addition result data. The exponent bits E1[7:0] of the first weight data W0_FLT and the exponent bits E2[7:0] of the first vector data V0_FLT may each include an added exponential bias value, for example, 127. Therefore, in order to obtain an exponent with the exponential bias value, the second exponent adder 1122 may perform an operation of subtracting an exponential bias value, for example 127, from the addition result data that is output from the first adder 1121, that is, addition on the addition result data and '−127'. The second exponent adder 1122 may output 8-bit data E[7:0] as the addition result data. The 8-bit data E[7:0] that is output from the second exponent adder 1122 may constitute the exponent E3 of the floating-point format first multiplication result data M0_FLT.

The mantissa processing circuit 1130 may include a mantissa multiplier 1131. The mantissa multiplier 1131 may receive the mantissa bits M1[7:0] of the first weight data W0_FLT and the mantissa bits M2[7:0] of the first vector data V0_FLT. The mantissa bits M1[7:0] of the first weight data W0_FLT may be inputted to the mantissa multiplier 1131 in in the format of '1.M1' by including an implicit bit '1.' to the bits (7 bits) of the mantissa M1 of the first weight data W0_FLT. Similarly, the mantissa bit is M2[7:0] of the first vector data V0_FLT may also be inputted to the mantissa multiplier 1131 in the format of '1.M2' by including an implicit bit '1.' to the bits (7 bits) of the mantissa M2 of the first vector data V0_FLT. The mantissa multiplier 1131 may perform a multiplication operation on the mantissa bits M1[7:0] of the first weight data W0_FLT and the mantissa bits M2[7:0] of the first vector data V0_FLT. The mantissa multiplier 1131 may output 16-bit mantissa bits M3[15:0] as multiplication result data. The 16-bit mantissa bits 3M[15:0] that are output from the mantissa multiplier 1131 may constitute the mantissa M3 of the floating-point format first multiplication result data M0_FLT. The configuration of the mantissa M3 of the first multiplication result data M0_FLT may be the same as described with reference to FIG. 32.

Figure 34:
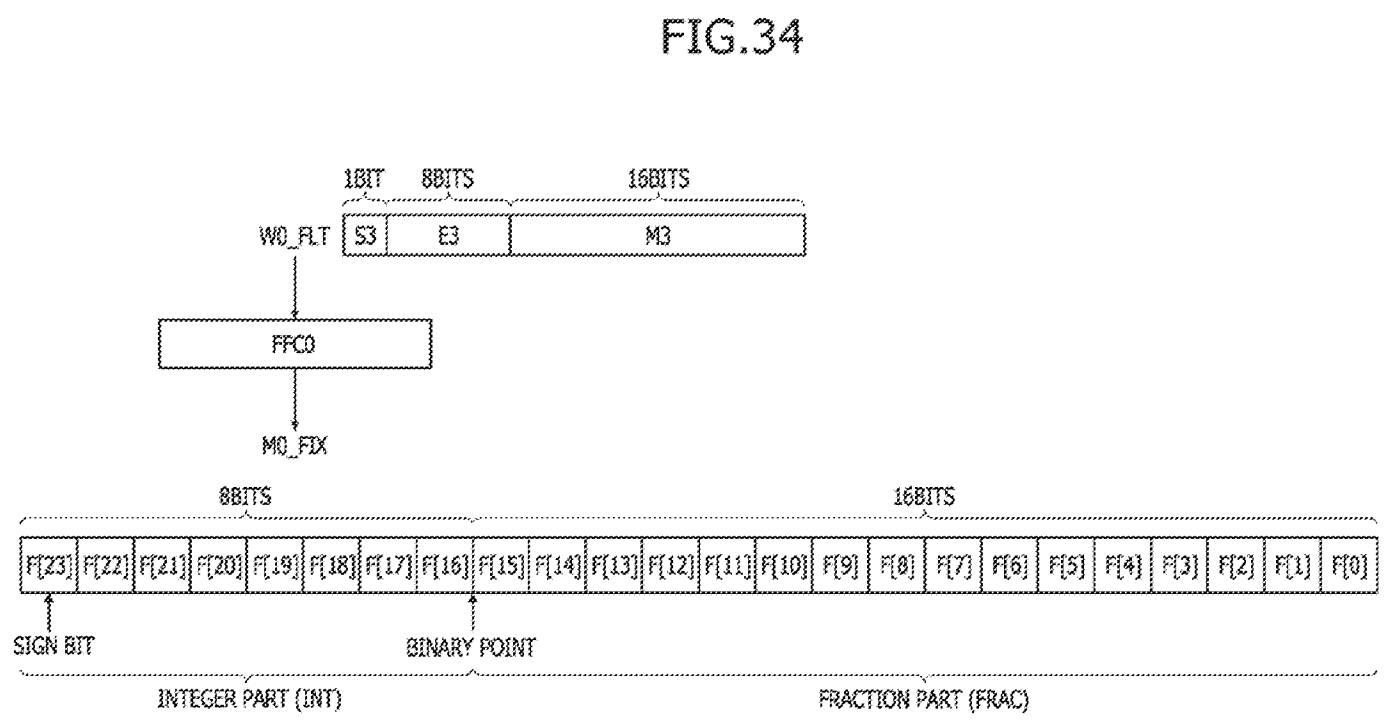

FIG. 34 illustrates an embodiment of data formats of input data and output data of a first floating-point-to-fixed-point converter FFC0 in the MAC operator 1000 of FIG. 31. The following description may be equally applied to each of the remaining second to eighth floating-point-to-fixed-point converters FFC1-FFC7 constituting the floating-point-to-fixed-point converting circuit 1200 in the MAC operator 1000 of FIG. 31.

Referring to FIG. 34, the first floating-point-to-fixed-point converter FFC0 may perform a data format conversion on the floating-point format first multiplication result data M0_FLT, and output the fixed-point format first multiplication result data M0_FIX, In the present embodiment, it is premised that the fixed-point format first multiplication result data M0_FIX is composed of an integer part INT of upper 8 bits and a fraction part FRAC of lower 16 bits. However, this is only an example, and the number of bits of the integer part INT and the number of bits of the fraction part FRAC may be variously set. A most significant bit (MSB) F[23] of the first fixed-point format multiplication result data M0_FIX may constitute a sign bit. In the fixed-point format first multiplication result data M0_FIX, the binary point may be positioned between the 17th bit F[16], which is the lowest order of the integer part INT, and the 16th bit F[15], which is the highest order of the fraction part FRAC.

Figure 35:
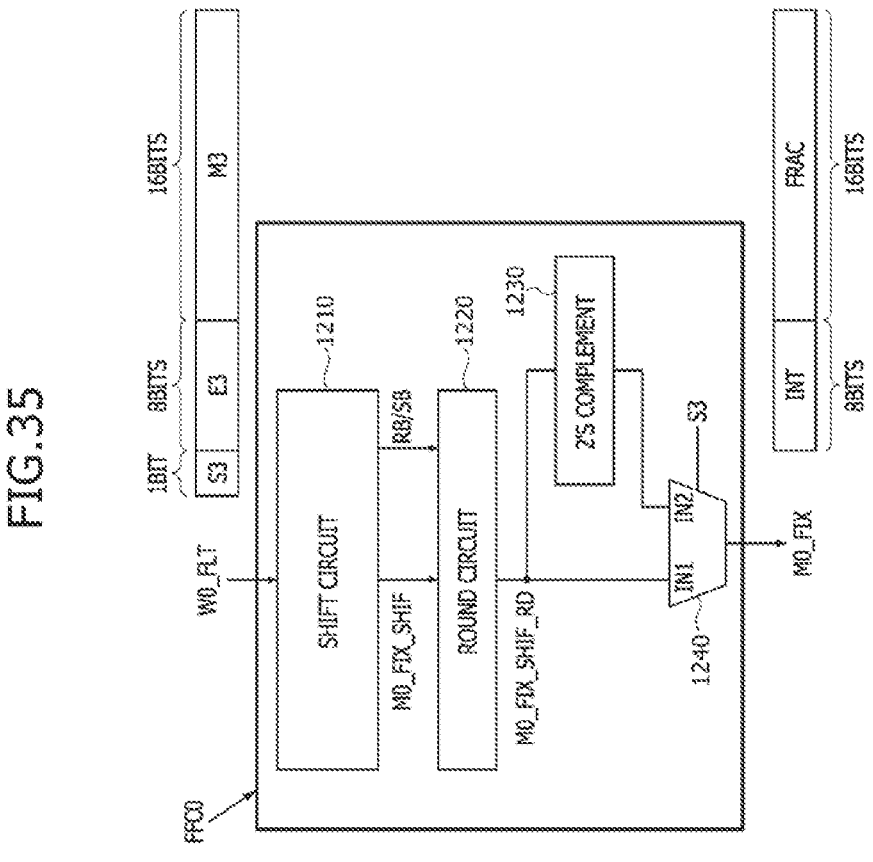
FIG. 35 illustrates an embodiment of the first floating-point-to-fixed-point converter of a floating-point-to-fixed-point converting circuit of FIG. 31.

FIG. 35 illustrates an embodiment of a first floating-point-to-fixed-point converter FFC0 of the floating-point-to-fixed-point converting circuit 1200 of FIG. 31. A description of the configuration and operation of the first floating-point-to-fixed-point converter FFC0 according to the present embodiment may be equally applied to the remaining floating-point-to-fixed-point converters FFC1-FFC7 constituting the floating-point-to-fixed-point converting circuit 1200.

Referring to FIG. 35, the first floating-point-to-fixed-point converter FFC0 may receive the floating-point format first multiplication result data M0_FLT that is output from the first multiplier MUL0, and output the fixed-point format first multiplication result data M0_FIX. The first floating-point-to-fixed-point converter FFC0 may include a shift circuit 1210, a round circuit 1220, a 2's complement circuit 1230, and a multiplexer 1240. The shift circuit 1210 may perform a shifting operation on the mantissa M3 of the floating-point format first multiplication result data M0_FLT. The shifting operation of the shift circuit 1210 may be performed by shifting the mantissa M3 of the floating-point format first multiplication result data M0_FLT to the left or right by the number of bits determined by the result of a subtraction on the exponent E3 of the floating-point format first multiplication result data M0_FLT and the bias value '127'. The shift circuit 1210 may output fixed-point format shifted first multiplication result data M0_FIX_SHIF. The shift circuit 1210 may also output a round bit RB and a sticky bit SB for rounding process in the round circuit 1220. The configuration and operation of the shift circuit 1210 will be described in more detail below.

The round circuit 1220 may perform rounding processing on the fixed-point format shifted first multiplication result data M0_FIX_SHIF transmitted from the shift circuit 1210, by using the round bit RB and the sticky bit SB that is output from the shift circuit 1210. The round processing in the round circuit 1220 may be performed in a number of ways that are already well known. In an embodiment, if the round bit RB is '0', the shifted first multiplication result data M0_FIX_SHIF might not be changed. On the other hand, if the round bit RB and the sticky bit SB are both '1', or the round bit RB is '1' and the sticky bit SB is '0' and a least significant bit (LSB) of the shifted first multiplication result data M0_FIX_SHIF is '1', the round circuit 1220 may perform round processing, that is, a '+1' operation on the LSB of the shifted first multiplication result data M0_FIX_SHIF. The round circuit 1220 may output fixed-point format shifted and rounded first multiplication result data M0_FIX_SHIF_RD. The shifted and rounded first multiplication result data M0_FIX_SHIF_RD may be the same as the shifted first multiplication result data M0_FIX_SHIF, or may be in a state in which a '+1' operation according to roundup is performed on the shifted first multiplication result data M0_FIX_SHIF.

The 2's complement circuit 1230 may receive the fixed-point format shifted and rounded first multiplication result data M0_FIX_SHIF_RD that is output from the round circuit 1220. The 2's complement circuit 1230 may output the 2's complement for the shifted and rounded first multiplication result data M0_FIX_SHIF_RD. As is well known, the 2's complement may be obtained by inverting each of the bit values of the shifted and rounded first multiplication result data M0_FIX_SHIF_RD, and performing a '+1' operation on the LSB of the inverted data.

The multiplexer 1240 may have a first input terminal IN1, a second input terminal IN2, and an output terminal. The multiplexer 1240 may receive the shifted and rounded first multiplication result data M0_FIX_SHIF_RD that is output from the round circuit 1220 through the first input terminal IN1. The multiplexer 1240 may receive the 2's complement of the shifted and rounded first multiplication result data M0_FIX_SHIF_RD that is output from the 2's complement circuit 1230 through the second input terminal IN2. The multiplexer 1240 may combine a selected input terminal of the first input terminal IN1 and the second input terminal IN2 with the output terminal according to the sign S3 of the floating-point format first multiplication result data M0_FLT. For example, if the sign S3 has a bit value of '0' representing a positive number, the multiplexer 1240 may output the shifted and rounded first multiplication result data M0_FIX_SHIF_RD inputted through the first input terminal IN1. If the sign S3 has a bit value of '1' representing a negative number, the multiplexer 1240 may output the 2's complement of the shifted and rounded first multiplication result data M0_FIX_SHIF_RD inputted through the second input terminal IN2. The data that is output from the multiplexer 1240 may constitute the fixed-point format first multiplication result data M0_FIX that is output from the first floating-point-to-fixed-point converter FFC0. The configuration of the fixed-point format first multiplication result data M0_FIX may be the same as described with reference to FIG. 34.

Figure 36:
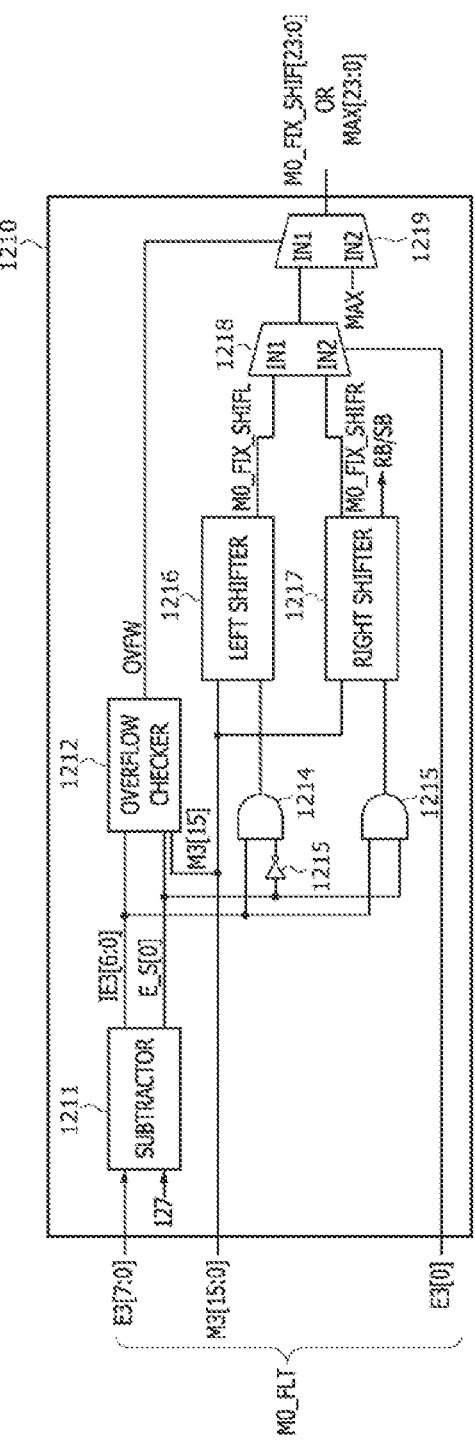
FIG. 36 illustrates an embodiment of a shift circuit of the first floating-point-to-fixed-point converter of FIG. 35.

FIG. 36 illustrates an embodiment of a configuration and an operation of the shift circuit 1210 of the first floating-point-to-fixed-point converter FFC0 of FIG. 35. Referring to FIG. 36, the shift circuit 1210 may include a subtractor 1211, an overflow checker 1212, an inverter 1213, a first AND gate 1214, a second AND gate 1215, a left shifter 1216, a right shifter 1217, a first multiplexer 1218, and a second multiplexer 1219.

The subtractor 1211 may receive an exponent bias value, for example '127' and exponent bits E3[7:0] of the floating-point format first multiplication result data M0_FLT. As described with reference to FIG. 33, an exponential bias value has been included in the exponent bits E3[7:0] of the floating-point format first multiplication result data M0_FLT that is output from the first multiplier MUL0. Accordingly, a real exponent value may be obtained by subtracting the bias value from the exponent bits E3[7:0]. The subtractor 1211 may perform subtraction on the exponent bits E3[7:0] of the floating-point format first multiplication result data M0_FLT and '127' to output 7-bit integer exponent bits IE[6:0] and 1-bit exponent sign bit E_S[0]. The integer exponent bits IE[6:0] may be bits generated as a result of subtracting '127' from the exponent bits E3[7:0]. The exponent sign bit E_S[0] may represent the sign of bits generated as a result of subtracting 127 from the exponent bit E3[7:0]. The exponent sign bit E_S[0] may correspond to the MSB of bits generated as a result of subtracting '127' from the exponent bits E3[7:0]. The exponent sign bit E_S[0] may have a bit value of '0' representing a positive number or a bit value of '1' representing a negative number. The integer exponent bits IE[6:0] may provide the number of bits to shift (hereinafter, referred to as "shift bits") the mantissa bits M3[15:0] of the floating point format first multiplication result data M0_FLT. In addition, the integer exponent bits IE[6:0] may be used together with the exponent sign bits E_S[0] to determine whether an overflow has occurred. The exponent sign bit E_S[0] may be used to determine whether the shifting operation for the mantissa bits M3[15:0] is performed to the left or right.

The overflow checker 1212 may determine whether an overflow has occurred by using the integer exponent bits IE[6:0] and exponent sign bits E_S[0] that are output and transmitted from the subtractor 1211, and the MSB M[15] of the mantissa bits M3[15:0] of the floating-point format first multiplication result data M0_FLT. If overflow has occurred, that is, when the result of shifting the mantissa bits M3[15:0] by the shift bit is out of a range of the fixed-point format, the overflow checker 1212 may output an overflow signal OVFW of, for example, '1'. On the other hand, if no overflow has occurred, that is, when the result of shifting the mantissa bits M3[15:0] by the shift bit does not exceed the range of the fixed-point format, the overflow checker 1212 may output an overflow signal OVFW of "0", for example. The overflow signal OVFW that is output from the overflow checker 1212 may be transmitted to a control terminal of the second multiplexer 1219. The overflow checker 1212 will be described in more detail below.

The inverter 1213 may invert and output the exponent sign bit E_S[0] that is output from the subtractor 1211. If the exponent sign bit E_S[0] is '0' representing a positive number, the inverter 1213 may output '1'. If the exponent sign bit E_S[0] is '1' representing a negative number, the inverter 1213 may output '0'. The output signal from the inverter 1213 may be transmitted to the first AND gate 1214.

The first AND gate 1214 may receive integer exponent bits IE[6:0] and an output signal of the inverter 1213, that is, a signal in which the exponent sign bit E_S[0] has been inverted, and perform an AND operation. The first AND gate 1214 may transmit a signal generated as a result of the AND operation to the left shifter 1216. The second AND gate 1215 may receive integer exponent bits IE[6:0] and an exponent sign bit E_S[0], and perform an AND operation. The second AND gate 1215 may transmit a signal generated as a result of the AND operation to the right shifter 1217.

Because the exponent sign bit E_S[0] has a value of one of '0' and '1' representing positive and negative numbers, respectively, one of the first AND gate 1214 and the second AND gate 1215 may output integer exponent bits IE[6:0], and the other may output a signal of '0'. For example, when the exponent sign bit E_S[0] is '0' representing a positive number, the first AND gate 1214 may transmit the integer exponent bits IE[6:0] to the left shifter 1216. On the other hand, the second AND gate 1215 may transmit a signal of '0' to the right shifter 1217. In this case, a shifting operation for the mantissa bits M3[15:0] of the floating-point format first multiplication result data M0_FLT may be performed by the left shifter 1216. When the exponent sign bit E_S[0] is '1' representing a negative number, the first AND gate 1214 may transmit a signal of '0' to the right shifter 1217. On the other hand, the second AND gate 1215 may transmit the integer exponent bits IE[6:0] to the right shifter 1217. In this case, the shifting operation for the mantissa bits M3[15:0] of the floating-point format first multiplication result data M0_FLT may be performed by the right shifter 1217.

When the exponent sign bit E_S[0] is '0' representing a positive number, the left shifter 1216 may receive mantissa bits M3[15:0] of the floating-point format first multiplication result data M0_FLT and integer exponent bits IE[6:0] from the first AND gate 1214. The left shifter 1216 may shift the mantissa bits M3[15:0] to the left by a shift bit determined by the integer exponent bits IE[6:0] to output fixed-point format left-shifted first multiplication result data M0_FIX_SHIFL. The fixed-point format left-shifted first multiplication result data M0_FIX_SHIFL that is output from the left shifter 1216 may be transmitted to the first input terminal IN1 of the first multiplexer 1218.

When the exponent sign bit E_S[0] is '1' representing a negative number, the right shifter 1217 may receive the mantissa bits M3[15:0] of the floating-point format first multiplication result data M0_FLT and the integer exponent bits IE[6:0] from the second AND gate 1215. The right shifter 1217 may shift the mantissa bits M3[15:0] to the right by a shift bit determined by the integer exponent bits IE[6:0] to output fixed-point format right-shifted first multiplication result data M0_FIX_SHIFR. The fixed-point format right-shifted first multiplication result data M0_FIX_SHIFR that is output from the right shifter 1217 may be transmitted to the second input terminal IN2 of the first multiplexer 1218. The right shifter 1217 may output a round bit RB and a sticky bit SB together for subsequent round processing during a right shift operation.

The first multiplexer 1218 may receive the fixed-point format left-shifted first multiplication result data M0_FIX_SHIFL and the fixed-point format right-shifted first multiplication result data M0_FIX_SHIFR through a first input terminal IN1 and a second input terminal IN2, respectively. The first multiplexer 1218 may receive a sign bit S3[0] of the floating-point format first multiplication result data M0_FLT through a control terminal. When the sign bit S3[0] is '0' representing a positive number, the first multiplexer 1218 may output the fixed-point format left-shifted first multiplication result data M0_FIX_SHIFL inputted through the first input terminal IN1. On the other hand, when the sign bit S3[0] is '1' representing a negative number, the first multiplexer 1218 may output the fixed-point format right-shifted first multiplication result data M0_FIX_SHIFR inputted through the second input terminal IN2.

The second multiplexer 1219 may receive the left-shifted first multiplication result data M0_FIX_SHIFL or the right-shifted first multiplication result data M0_FIX_SHIFR (hereinafter collectively referred to as "shifted first multiplication result data M0_FIX_SHIF") transmitted from the first multiplexer 1218 through a first input terminal IN1. The second multiplexer 1219 may receive a maximum value MAX through a second input terminal IN2. Here, the maximum value MAX may represent an absolute maximum value of a positive number or an absolute maximum value of a negative number that the fixed-point format first multiplication result data M0_FIX may have. The second multiplexer 1219 may receive the overflow signal OVFW that is output from the overflow checker 1212 through a control terminal. The second multiplexer 1219 may output the shifted first multiplication result data M0_FIX_SHIF inputted to the first input terminal IN1 in response to the overflow signal OVFW, or may selectively output the maximum value MAX inputted to the second input terminal IN2. For example, when an overflow signal OVFW of '0' is inputted, because no overflow has occurred, the second multiplexer 1218 may output the fixed-point format shifted first multiplication result data M0_FIX_SHIF[23:0]. On the other hand, when an overflow has occurred and an overflow signal OVFW of '1' is inputted, the second multiplexer 1218 may output the fixed-point format maximum value MAX[23.0].

Figure 37:
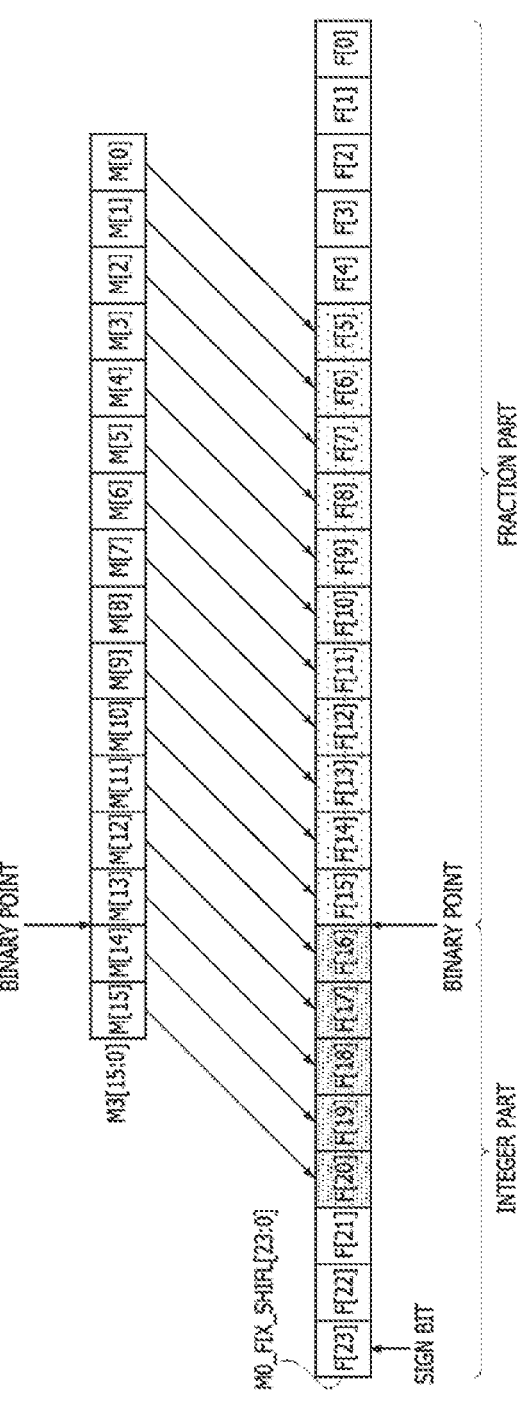
FIGS. 37 and 38 illustrate embodiments of a left shifting operation of a left shifter of a shift circuit of FIG. 36.
Figure 38:
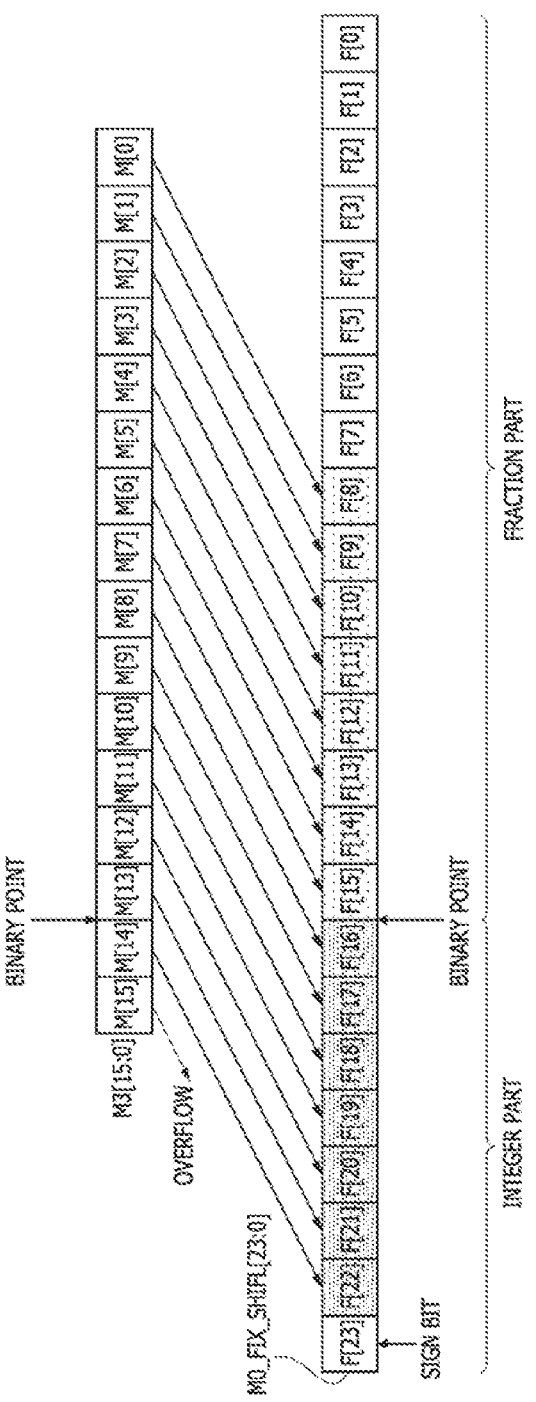

FIGS. 37 and 38 illustrate embodiments of a left shifting operation of the left shifter 1216 of the shift circuit 1210 of FIG. 36. As described with reference to FIG. 32, the mantissa bits M3[15:0] of the floating-point format first multiplication result data M0_FLT shifted by the left shifter 1216 may have a format in which normalization has not been performed. That is, in the mantissa bits M3[15:0], the binary point may be positioned between the 14th bit M[13] and the 15th bit M[14] among 16 bits M3[15:0]. The left-shifted first multiplication result data M0_FIX_SHIFL that is output from the left shifter 1216 may be composed of an 8-bit integer part F[23:16] and a 16-bit fraction part F[15:0]. The MSB F[23] thereof may correspond to the sign bit.

First, referring to FIG. 37, a case where the number of shift bits determined by the integer exponent bits IE3[6:0] is 3 will be described as an example. In this case, as indicated by arrows in FIG. 37, the left shifter 1216 may perform a shifting operation to the left by 3 bits on the mantissa bits M3[15:0] of the floating-point format first multiplication result data M0_FLT to generate fixed-point format left-shifted first multiplication result data bits M0_FIX_SHIFL[23:0]. The 5 bits of high order M[15:11] with an MSB M[15] of mantissa bits M3[15:0] may constitute the 5 bits of low order of the fixed-point format integer part F[20:16]. In addition, the 11 bits of a lower order M[10:0] with an LSB M[0] of the mantissa bits M3[15:0] of the floating-point format first multiplication result data M0_FLT may constitute the 11 bits of the high order of the fixed-point format fraction part F[15:5]. In this case, because all bits of the mantissa bits M3[15:0] are shifted within the range of the fixed-point format, overflow does not occur.

Next, referring to FIG. 38, a case where the number of shift bits determined by the integer exponent bits IE3[6:0] is '6', and the MSB M[15] is '1' in the mantissa bits M3[15:0] of the floating-point format first multiplication result data M0_FLT will be described as an example. In this case, as indicated by the arrows in FIG. 38, the left shifter 1216 may perform a shifting operation to the left by 6 bits for the mantissa bits M3[15:0] to generate fixed-point format left shifted first multiplication result data bit M0_FIX_SHIFL[23:0]. As a result, the remaining 15 bits M[14:0] excluding the MSB M[15] in the mantissa bits M3[15:0] of the floating-point format first multiplication result data M0_FLT may constitute 7 bits of the fixed-point format integer part F[22:16] and 8 bits of high order of fraction part F[15:8]. However, the MSB M[15] in the mantissa bits M3[15:0] exceeds the range of the fixed-point format. Therefore, overflow occurs in this case.

Figure 39:
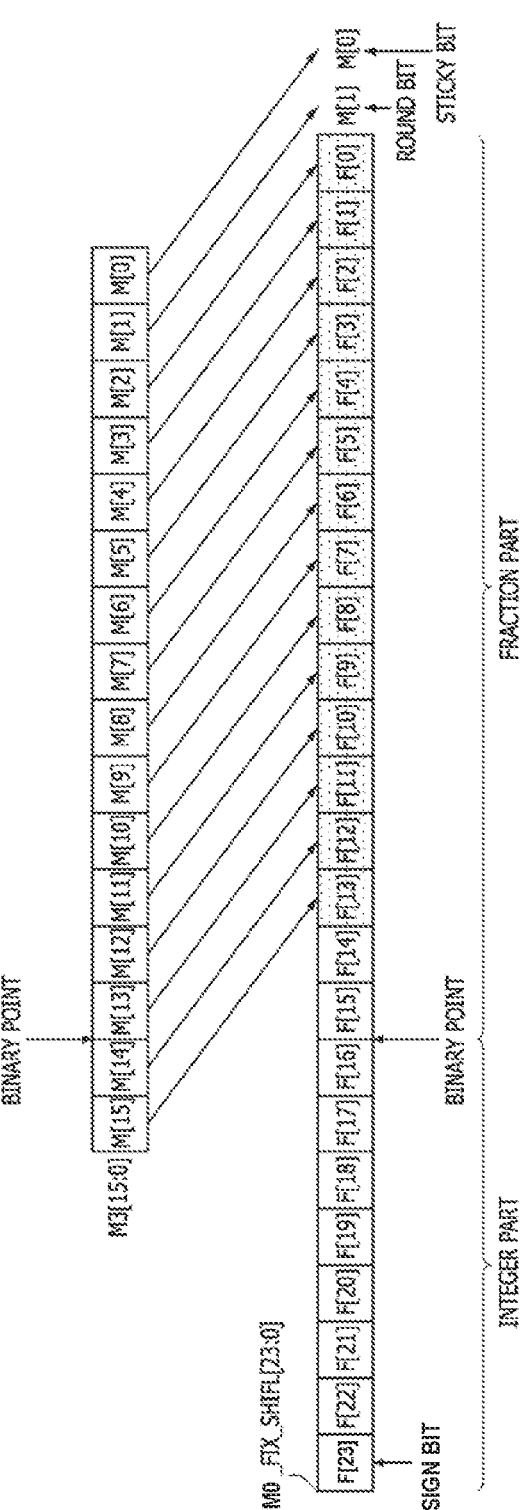
FIG. 39 illustrates an embodiment of a right shifting operation of a right shifter of the shift circuit of FIG. 36.

FIG. 39 illustrates an embodiment of a right shifting operation of the right shifter 1217 of the shift circuit 1210 of FIG. 36. Referring to FIG. 39, a case where the number of shift bits determined by the integer exponent bits IE [6:0] is 4 bits will be described as an example. The right shifter 1217 may perform a shifting operation to the right by 4 bits on the mantissa bits M3[15:0] of the floating-point format first multiplication result data M0_FLT, as indicated by arrows in FIG. 39, to generate fixed-point format right-shifted first multiplication result data M0_FIX_SHIFR[23:0]. The remaining 14 bits M[15:2] except for the two low-order bits M[1:0], with the LSB M[0] of the mantissa bits M3[15:0] may constitute 14 bits F[13:0] of the fixed-point format fraction part. However, 2 bits of lower order M[1:0] with the LSB M[0] of the mantissa bits M3[15:0] exceeds the range of the fixed-point format. In this case, the right shifter 1217 may provide the second bit M[1] of the mantissa bits M3[15:0] positioned adjacent to the fixed-point format LSB F[0] as a round bit RB. In addition, the right shifter 1217 may provide the LSB M[0] adjacent to the second bit M[1] of the mantissa bits M3[15:0] as a sticky bit SB to the round circuit 1220. The round operation by using the round bit RB and the sticky bit SB may be the same as described with reference to FIG. 35.

Figure 40:
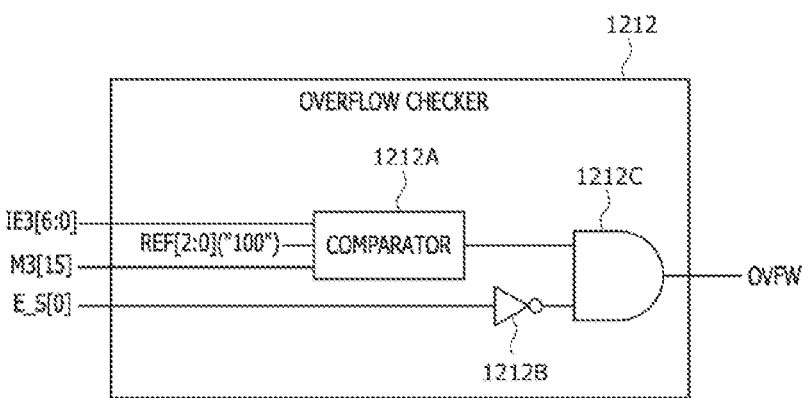
FIG. 40 illustrates an embodiment of an overflow checker of the shift circuit of FIG. 36.

FIG. 40 illustrates an embodiment of a configuration of the overflow checker 1212 of the shift circuit 1210 of FIG. 36. As shown in FIG. 40, the overflow checker 1212 may include a comparator 1212A, an inverter 1212B, and an AND gate 1212C. The comparator 1212A may receive integer exponent bits IE[6:0] that are output from the subtractor (1211 in FIG. 36) and the MSB M[15] of the mantissa M3 of the floating-point format first multiplication result data M0_FLT. Further, the comparator 1212A may receive a preset reference bits REF[2:0]. When the MSB M[15] of the third mantissa M3 is '1', the reference bits REF[2:0] may be set to a maximum value of a shift bit in which overflow does not occur. Accordingly, when the MSB M[15] of the mantissa M3 of the floating-point format first multiplication result data M0_FLT is '0', the maximum value of the shift bit in which overflow does not occur is REF[2:0]+1.

The comparator 1212A may compare the integer exponent bits IE[6:0] and the reference bits REF[2:0] to output a signal of '0' or '1'. The MSB M[15] of the mantissa M3 of the floating-point format first multiplication result data M0_FLT is '1', and the integer exponent bits IE[6:0] are less than or equal to the reference bits REF[2:0], the comparator 1212A may output a signal of '0'. On the other hand, the MSB M[15] of the mantissa M3 of the floating-point format first multiplication result data M0_FLT is '1', and the integer exponent bits IE[6:0] are greater than the reference bits REF[2:0], the comparator 1212A may output a signal of '1'. The MSB M[15] of the mantissa M3 of the floating-point format first multiplication result data M0_FLT is '0', and the integer exponent bits IE[6:0] are equal to or less than the (reference bit+1) REF[2:0]+1, the comparator 1212A may output a signal of '0'. On the other hand, the MSB M[15] of the mantissa M3 of the floating-point format first multiplication result data M0_FLT is '0', and the integer exponent bits IE[6:0] are greater than (reference bit+1) REF[2:0]+1, the comparator 1212A may output a signal of '1'. The output signal from the comparator 1212A may be transmitted to a first input terminal of the AND gate 1212C.

The inverter 1212B may receive an exponent sign bit E_S[0] that is output from the subtractor (1211 of FIG. 36). The inverter 1212B may invert and output the exponent sign bit E_S[0]. When the exponent sign bit E_S[0] is '0' representing a positive number, the inverter 1212B may output '1'. When the exponent sign bit E_S[0] is '1' representing a negative number, the inverter 1212B may output '0'. The output signal from the inverter 1212B may be transmitted to a second input terminal of the AND gate 1212C. The AND gate 1212C may perform an AND operation on the output signal of the comparator 1212A inputted to the first input terminal and the output signal of the inverter 1212B inputted to the second input terminal, and output an operation result as an overflow signal OVFW.

If overflow occurs, that is, when the overflow signal OVFW of '1' is output from the overflow checker 1212, a signal of '1' is output from the comparator 1212A because the exponent bits IE[6:0] are greater than the reference bits REF[2:0] or (reference bit+1) REF[2:0]+1 and the exponent sign bit E_S[0] is '0' representing a positive number, thus the inverter 1212E outputs '1'. On the other hand, when no overflow occurs, that is, when the overflow signal OVFW of '0' is output from the overflow checker 1212, the signal of '0' is output from the comparator 1212A because the exponent bits IE[6:0] are less than or equal to the reference bit REF[2:0] or (reference bit+1) REF[2:0]+1. In addition, even when the exponent sign bit E_S[0] is '1' representing a negative number and the inverter 1212B outputs '0', an overflow signal OVFW of '0' may be output.

In this embodiment, when the exponent sign bit E_S[0] that is output from the subtractor 1211 is '0', that is, when the exponent sign bit E_S[0] represents a positive number, as described with reference to FIGS. 36 to 38, left shifting may be performed on the mantissa bits M3[15:0] of the floating-point format first multiplication result data M0_FLT. As described with reference to FIG. 32, the 16-bit mantissa bits M3[15:0] in the floating-point format first multiplication result data M0_FLT may have a format in which 2 bits M[15:14] with MSB are positioned to the left of the binary point. On the other hand, as described with reference to FIG. 34, in the fixed-point format, the integer part INT may be composed of 8 bits (including a sign bit). In this case, when the shift bit includes 5 bits, that is, when the mantissa bits M3[15:0] of the floating-point format first multiplication result data M0_FLT is shifted to the left by 5 bits, the MSB M[15] of the mantissa bits M3[15:0] constitutes the 7th bit F[22] of the fixed-point format integer part INT, so overflow does not occur. However, when the shift bit includes 6 bits, the MSB M[15] of the mantissa bits M3[15:0] constitutes the MSB F[23], which is a sign bit of the fixed-point format. Even if the MSB F[23] of the fixed-point format is a sign bit, overflow does not occur when the MSB M[15] is '0'. However, when the MSB M[15] of the mantissa bits M3[15:0] is '1', overflow may occur. Meanwhile, when the shift bit includes more than 7 bits, overflow may occur regardless of the bit value of the MSB M[15] of the mantissa bits M[15:0].

As mentioned above, when the MSB M[15] of the mantissa bits M3[15:0] of the floating-point format first multiplication result data M0_FLT is '1', the reference bits REF[2:0] inputted to the comparator 1212A may be set to a maximum value of a shift bit in which overflow does not occur. According to this embodiment, when the MSB M[15] of the mantissa bits M3[15:0] is '1', the maximum value of the shift bit in which overflow does not occur is 5, and thus, the reference bits REF[2:0] inputted to the comparator 1212A may be set to '100'. That is, when the MSB M[15] of the mantissa bits M3[15:0] is '1' and the integer exponent bits IE[6:0] are less than or equal to the reference bits REF[2:0], '100', which is, the comparator 1212A may output a signal of '0', and when the MSB M[15] of the third mantissa bits M3[15:0] is '1' and the exponent bits IE[6:0] are greater than the reference bits REF[2:0], '100', the comparator 1212A may output a signal of '1'. In addition, the MSB M[15] of the mantissa bits M3[15:0] is '0' and the integer exponent bits IE[6:0] are greater than the reference bits REF[2:0], '101', the comparator 1212A may output a signal of '0'. Further, when the MSB M[15] of the mantissa bits M3[15:0] is '0' and the exponent bits IE[6:0] are greater than the reference bits REF[2:0], '101', the comparator 1212A may output a signal of '1'.

Meanwhile, the exponent sign bit E_S[0] that is output from the subtractor 1211 is '1', that is, represents a negative number, right shifting may be performed on the mantissa bits M3[15:0] of the floating-point format first multiplication result data M0_FLT. As described with reference to FIG. 34, when the fixed-point format is composed of an 8-bit integer part INT and a 16-bit fraction part FRAC, if right shifting by 18 bits is performed, the MSB M[15] of the mantissa bits M3[15:0] may exceed the range of the fixed-point format. However, as described with reference to FIG. 39, in this case, round processing is possible. Therefore, even if the exponent sign bit E_S[0] is '1' and the shift bit determined by the integer exponent bits IE[6:0] is greater than 17 bits, the overflow checker 1212 may generate an overflow signal OVFW of '0'.

As described so far, in the MAC operator 1000 according to the present embodiment, a normalization process may be omitted in the multiplier MUL. Accordingly, the mantissa M of the floating-point format multiplication result data M_FLT that is output from the multiplier MUL may be configured in a format different from the normalized floating-point format. That is, the number of bits of the mantissa M becomes twice the number of input data bits with an implicit bit, and the position of the binary point might not be moved. However, as described with reference to FIGS. 36 to 39, data may be normally converted to fixed-point format data through a conversion operation in the in floating-point-to-fixed-point converter (FFC), particularly, through a left shift operation or a right shift operation. Accordingly, the adder tree (1300 in FIG. 31) may be configured with fixed-point adders.

Figure 41:
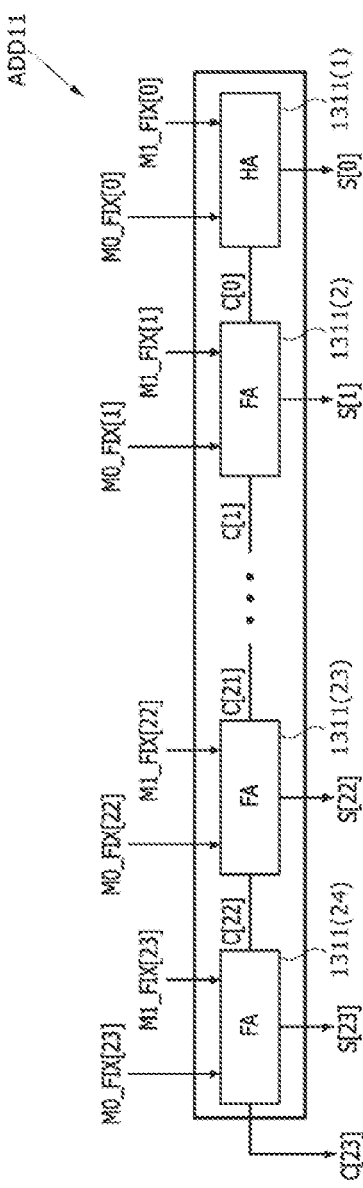
FIG. 41 illustrates an embodiment of a first adder of a first stage constituting an adder tree of FIG. 31.

FIG. 41 illustrates an embodiment of the first adder ADD11 of the first stage constituting the adder tree 1300 of FIG. 31. The following description may be applied equally to each of the remaining adders ADD12-ADD14, ADD21-ADD22, and ADD3 constituting the adder tree 1300 of FIG. 31. Also, the same can be applied to the accumulator 1410 constituting the accumulator 1400 of FIG. 31.

Referring to FIG. 41, the first adder ADD11 may include a half adder (HA) 1311(1) and a plurality of full adders FAs, for example, first to 23rd full adders 1311(2)-1311(24). The number of the full adders 1311(2)-1311(24) is one less than the number of bits of the fixed-point format. The half adder 1311(1) may receive the LSB M0_FIX[0] of the fixed-point format first multiplication result data M0_FIX and the LSB M1_FIX[0] of the fixed-point format second multiplication result data M1_FIX. The half adder 1311(1) may perform an addition operation on the two input data, and output a first carry bit C[0] and a first sum bit S[0]. The first carry bit C[0] may be inputted to the first full adder 1311(2).

The full adders 1311(2)-1311(24) may be arranged in series with each other so that the carry bit C that is output from the previous full adder is inputted to the next full adder. For example, a second carry bit C[1] that is output from the first full adder 1311(2) may be inputted to the next second full adder. Similarly, a 23rd carry bit C[22] that is output from the 22nd full adder 1311(23) may be inputted to the 23rd full adder 1311(24). The 1st to 23rd full adders 1311(2)-4311(24) may perform an addition operation on each of the 2nd to 24th bits M1_FIX[23:1] excluding the LSB among the bits of the first multiplication result data M0_FIX, each of the 2nd to 24th bits M1_FIX[23:1] excluding the LSB among the bits of the second multiplication result data M1_FIX, and the carry bit C to output sum bits S and carry bits C. The sum bits S[23:0]) and the carry bits C[23] that are output from the half adder 1311(1) and the full adders 1311(2)-1311(24), and the carry bit C[23] that are output from the 23rd full carrier 1311(24) may constitute the output data of the first adder ADD11.

Figure 42:
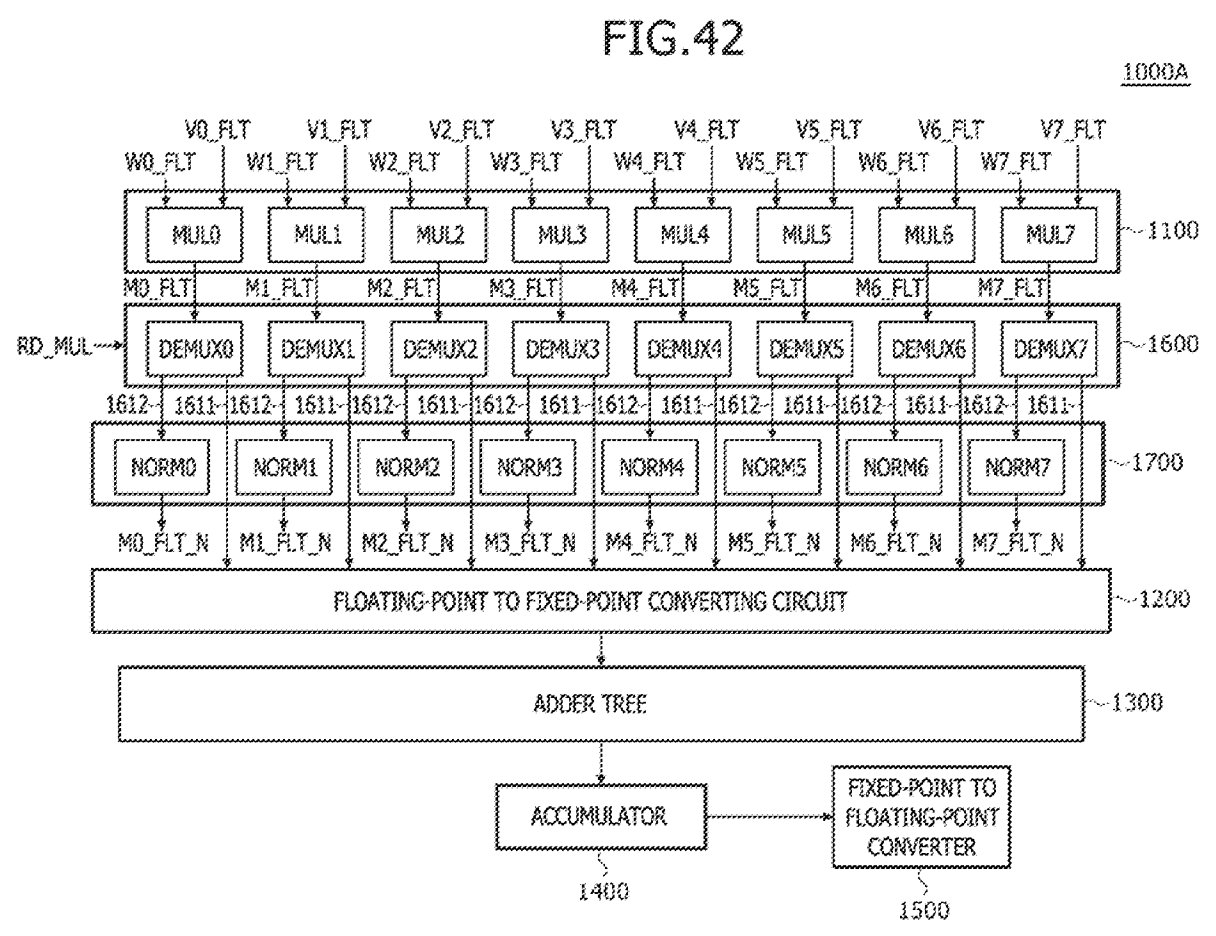

FIG. 42 illustrates a MAC operator 1000A according to another embodiment of the present disclosure. In FIG. 42, the same reference numerals as in FIG. 31 denote the same components. The MAC operator 1000A according to the present embodiment may be applied to the PIM devices 10, 100, and 400 described with reference to FIGS. 1, 2, and 20. The MAC operator 1000A according to the present embodiment may differ from the MAC operator 1000A described with reference to FIG. 31 in that the MAC operator 1000A according to the present embodiment is configured to perform both the MAC arithmetic operation and an element-wise multiplication (EWM) operation. Because in the MAC arithmetic operation, all of the multiplication, addition, and accumulation is performed, in order for the MAC operator 1000A according to the present embodiment to perform the MAC arithmetic operation, the multiplying circuit 1100, the floating-point-to-fixed-point converting circuit 1200, the adder tree 1300, the accumulator 1400, and the fixed-point-to-floating-point converter 1500 all operate. On the other hand, because in the EWM operation, only multiplication is performed, in the process of the MAC operator 1000A performing the EWM operation according to the present embodiment, only the multiplying circuit 1100 operates, and the floating-point-to-fixed-point converting circuit 1200, the adder tree 1300, the accumulator 1400, and the fixed-point-to-floating-point converter 1500 does not operate.

When the MAC operator 1000A according to the present embodiment performs the EWM operation, the multiplication result data M_FLTs that is output from the multiplying circuit 1100 may be data to which normalization has not been performed, as described with reference to FIG. 32. In order for the multiplication result data M_FLTs to which normalization processing has been omitted, as described above to be output from the MAC operator 1000A and used for other operations, the normalization processing is preceded. Accordingly, when the floating-point format multiplication result data M_FLT that is output from the multiplier is to be output from the MAC operator 1000A, in the MAC operator 1000A according to the present embodiment, the multiplication result data M_FLTs may be transmitted to the normalizing circuit 1700 by the data output selecting circuit 1600, normalization processing may be performed by the normalizing circuit 1700, and then, normalized multiplication result data M_FLT_N may be output.

Referring to FIG. 42, the MAC operator 1000A according to the present embodiment may include the multiplying circuit 1100, a floating-point-to-fixed-point converting circuit 1200, an adder tree 1300, an accumulator 1400, a fixed-point-to-floating-point converter 1500, a data output selecting circuit 1600, and a normalizing circuit 1700. The multiplying circuit 1100, the floating-point-to-fixed-point converting circuit 1200, the adder tree 1300, the accumulator 1400, and the fixed-point-to-floating-point converter 1500 are the same as those described with reference to FIG. 31, so that redundant descriptions will be omitted.

The data output selecting circuit 1600 may output the multiplication result data M0_FLT-M7_FLT that is output from the multiplying circuit 1100 through selected one of first output lines 1611 and second output lines 1612. The data output selecting circuit 1600 may be configured by arranging a plurality of demultiplexers each with one input terminal and two output terminals, for example, first to eighth demultiplexers DEMUX0-DEMUX7 in parallel with each other. The input terminal of each of the demultiplexers DEMUX0-DEMUX7 may be coupled to the output terminal of each of the multipliers MUL0-MUL7. For example, the input terminal of the first demultiplexer DEMUX0 may be coupled to the output terminal of the first multiplier MUL0. The input terminal of the second demultiplexer DEMUX1 may be coupled to the output terminal of the second multiplier MUL1. The same coupling method may be applied to the remaining third to eighth demultiplexers DEMUX2-DEMUX7.

The first output lines 1611 of each of the first to eighth demultiplexers DEMUX0-DEMUX7 may be coupled to the floating-point-to-fixed-point converting circuit 1200. The second output lines 1612 of each of the first to eighth demultiplexers DEMUX0-DEMUX7 may be coupled to the normalizing circuit 1700. The selection of an output line in the first to eighth demultiplexers DEMUX0-DEMUX7 may be performed by a multiplication result read signal RD_MUL. For example, if a multiplication result read signal RD_MUL of a first logic level, for example, logic low is transmitted to the first to eighth demultiplexers DEMUX0-DEMUX7, the first to eighth demultiplexers DEMUX0-DEMUX7 may transmit the multiplication result data M0_FLT-M7_FLT to the floating-point-to-fixed-point converting circuit 1200 through the first output lines 1611. On the other hand, if a multiplication result read signal RD_MUL of a second level, for example, logic high is transmitted to the first to eighth demultiplexers DEMUX0-DEMUX7, the first to eighth demultiplexers DEMUX0-DEMUX7 may transmit the multiplication result data M0_FLT-M7_FLT to the normalizing circuit 1700 through the second output lines 1612.

The normalizing circuit 1700 may include a plurality of normalizers, for example, first to eighth normalizers NORM0-NORM7. The first to eighth normalizers NORM0-NORM7 may receive the multiplication result data M0_FLT-M7_FLT from the first to eighth multipliers MUL0-MUL7 of the multiplying circuit 1100 through the second output lines 1612 of the data output selecting circuit 1600. The first to eighth normalizers NORM0-NORM7 may perform a normalizing process on the floating-point format multiplication result data M0_FLT-M7_FLT transmitted from each of the first to eighth first to eighth multipliers MUL0-MUL7 through the data output selecting circuit 1600. The first to eighth normalizers NORM0-NORM7 may output normalized multiplication result data M0_FLT_N-M7_FLT_N as a result of the normalizing process. For example, the first normalizer NORM0 may perform a normalizing process on the floating-point format first multiplication result data 111 transmitted from the first multiplier MUL0 through the first demultiplexer DEMUX0 in response to a multiplication result read data RD_MUL of logic high, and output normalized first multiplication result data M1_FLT_N as a result. The same operation may be applied to the remaining second to eighth normalizers NORM1-NORM7.

Figure 43:
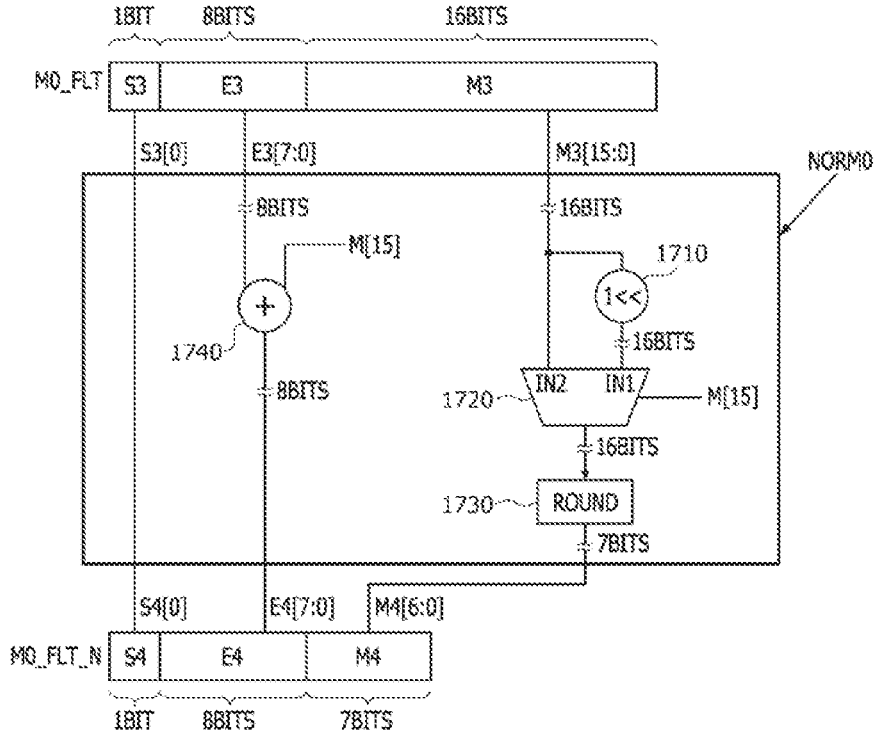
FIG. 43 illustrates an embodiment of a first normalizer of a normalizing circuit of FIG. 42.

FIG. 43 illustrates a configuration and an operation of the first normalizer NORM0 of the normalizing circuit of FIG. 42. The description of the configuration and operation of the first normalizer NORM0 below may be equally applied to the remaining second to eighth normalizers NORM1-NORM7.

Referring to FIG. 43, the first normalizer NORM0 may include a floating-point moving unit 1710, a multiplexer 1720, a round processing unit 1730, and an adder 1740. A sign bit S3[0] of the floating-point format first multiplication result data M0_FLT may be excluded from the object of the normalizing process. Accordingly, the sign bit S3[0] of the first multiplication result data M0_FLT may be output from the first normalizer NORM0 as it is. That is, a sign bit S4[0] that is output from the first normalizer NORM0 is always the same as the sign bit S3[0] inputted to the first normalizer NORM0. The sign bit S4[0] that is output from the first normalizer NORM0 may constitute the sign S4 of the floating-point format normalized first multiplication result data M0_FLT_N.

The floating-point moving unit 1710 may receive a mantissa M3 of the first multiplication result data M0_FLT, move a binary point toward the MSB of the mantissa M3 by 1 bit, and output a result. As described with reference to FIG. 32, the binary point of the mantissa M3 of the first multiplication result data M0_FLT may be positioned between the 14th bit M[13] and the 15th bit M[14]. Therefore, two bits with the MSB, namely, the 15th bit M[14] and the MSB M[15] may be positioned at the left of the binary point. The floating-point moving unit 1710 may move the binary point to be positioned between the 15th bit M[14] and the MSB M[15]. When the MSB M[15] of the mantissa M3 is '1', the data generated by the floating-point moving unit 1710 may have a normalized form (including implicit bit). However, when the MSB M[15] of the mantissa M3 is '0', the data generated by the floating-point moving unit 1710 may still have a non-normalized format. Accordingly, when the MSB M[15] of the mantissa M3 is '0', the data generated by the floating-point moving unit 1710 may be discarded by the multiplexer 1720. Data whose binary point has been moved by the floating-point moving unit 1710 may be transmitted to a first input terminal IN1 of the multiplexer 1720.

The multiplexer 1720 may receive the data whose binary point has been moved by the floating-point moving unit 1710 through the first input terminal IN1. The multiplexer 1720 may receive a mantissa M3 of the first multiplication result data M0_FLT through a second input terminal IN2. The multiplexer 1720 may receive the MSB M[15] of the mantissa M3 through a control terminal. When the MSB M[15] is '1', the multiplexer 1720 may output data with a format (including implicit bit) in which the binary point has been moved and normalized by the floating-point moving unit 1710, transmitted through the first input terminal IN1. When the MSB M[15] is '0', the multiplexer 1720 may output the mantissa M3 inputted through the second input terminal IN2. Because the MSB M[15] is '0', the mantissa M3 that is output from the multiplexer 1720 may also have a normalized format (including implicit bit).

The round processing unit 1730 may receive the data with a normalized format (including implicit bit), output from the multiplexer 1720. The round processing unit 1730 may remove 9 bits (including an implicit bit) from the transmitted 16-bit data so that the data size becomes '7'. In this process, the round processing unit 1730 may perform round processing. During the round processing, '+1' addition may be performed. The 7-bit mantissa bits M4[6:0] that are output from the round processing unit 1730 may constitute the mantissa M4 of the floating-point format normalized first multiplication result data M0_FLT_N.

The adder 1740 may receive an 8-bit exponent E3 of the first multiplication result data M0_FLT and an MSB M[15] of the mantissa M3. The adder 1740 may perform an addition operation on the received exponent E3 and MSB M[15]. When the MSB M[15] of the mantissa M3 is '0', the 8-bit data E4[7:0] that is output from the adder 1740 may be the same as the exponent bits E3[7:0]. When the MSB M[15] of the mantissa M3 is '1', the 8-bit data E4[7:0] that is output from the adder 1740 may be configured by performing a '+1' operation on the exponent bits E3[7:0] inputted to the adder 1740. As described above, when the MSB M[15] of the mantissa M3 is '1', data in which the binary point has been moved to the left by 1 bit by the floating-point moving unit 1710 may be output from the multiplexer 1720. Therefore, in this case, by performing a '+1' operation on the exponent bits E3[7:0] inputted to the adder 1740, the exponent change according to the movement of the binary point in the mantissa M may be reflected in the exponent bits E3[7:0].

Figure 44:
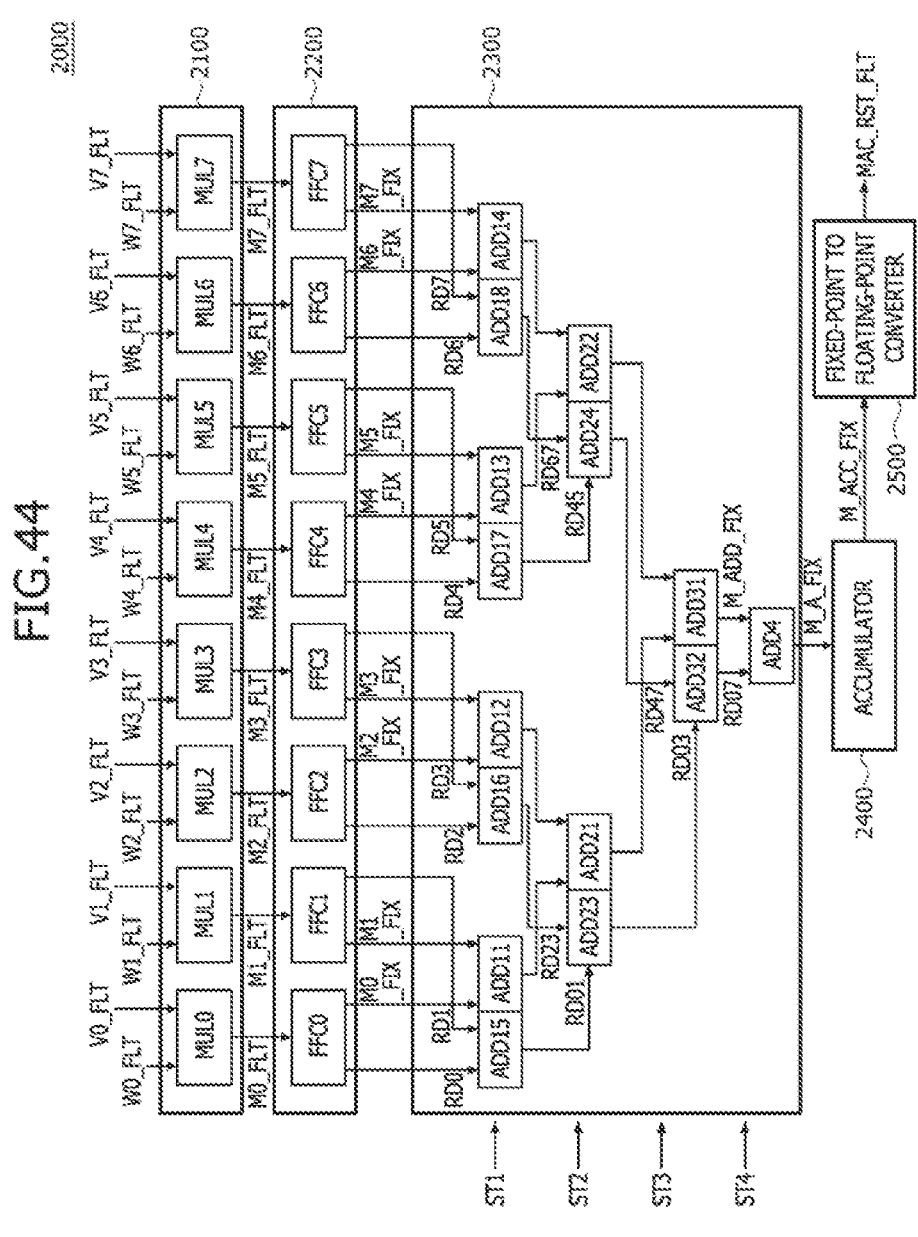
FIG. 44 illustrates a MAC operator according to another embodiment of the present disclosure.

FIG. 44 illustrates a MAC operator 2000 according to another embodiment of the present disclosure. The MAC operator 2000 according to the present embodiment may be applied to the PIM devices 10, 100, and 400 described with reference to FIGS. 1, 2, and 20. Referring to FIG. 44, the MAC operator 2000 according to the present embodiment may include a multiplying circuit 2100, a floating-point-to-fixed-point converting circuit 2200, an adder tree 2300, an accumulator 2400, and a fixed-point-to-floating-point converter 2500.

The multiplying circuit 2100 may include a plurality of multipliers, for example, first to eighth multipliers MUL0-MUL7. Each of the first to eighth multipliers MUL0-MUL7 may receive each of floating-point format weight data W0_FLT-W7_FLT, and each of floating-point format vector data V0_FLT-V7_FLT. Each of the first to eighth multipliers MUL0-MUL7 may perform a multiplication operation on the each of the weight data W0_FLT-W7_FLT and each of the vector data V0_FLT-V7_FLT, and output multiplication result data M0_FLT-M7_FLT as a result. In the MAC operator 2000 according to the present embodiment, each of the floating-point format multiplication result data M0_FLT-M7_FLT that is output from each of the first to eighth multipliers MUL0-MUL7 may be output in a normalized state.

The floating-point-to-fixed-point converting circuit 2200 may include a plurality of a floating-point-to-fixed-point converters, for example, first to eighth floating-point-to-fixed-point converters FFC0-FFC7. Each of the first to eighth floating-point-to-fixed-point converters FFC0-FFC7 may receive each of the floating-point format first to eighth multiplication result data M0_FLT-M7_FLT from the first to eighth multipliers MUL0-MUL7. Each of the first to eighth floating-point-to-fixed-point converters FFC0-FFC7 may output each of the fixed-point format first to eighth multiplication result data M0_FIX-M7_FIX and each of first to eighth round bits RD0-RD7.

The fixed-point format first to eighth multiplication result data M0_FIX-M7_FIX may be data generated by performing data format converting into a fixed-point format on the floating-point first to eighth multiplication result data M0_FLT-M7_FLT. As described with reference FIG. 34, in the process of data format conversion from the floating-point format to the fixed-point format, round processing and 2's complement processing may be performed. In the round processing, when roundup is performed, a '+1' operation may be performed, and when a sign bit represents a negative number, a '+1' operation may be performed according to the 2's complement processing. However, each of the first to eighth floating-point-to-fixed-point converters FFC0-FFC7 according to the present embodiment might not perform both the '+1' operation of the case of roundup, and the operation according to the 2's complement processing of the case where the sign bit is negative in the conversion process from the floating-point format to the fixed-point format. Accordingly, each of the fixed-point format first to eighth multiplication result data M0_FIX-M7_FIX may correspond to the data before '+1' operation is performed even when roundup and when the sign bit is negative.

Each of the first to eighth round bits RD0-RD7 that is output from each of the first to eighth floating-point-to-fixed-point converters FFC0-FFC7 may represent a bit value that has not been added by the '+1' operation omitted in the conversion process from the floating-point format to the fixed-point format. In an embodiment, each of the first to eighth round bits RD0-RD7 may have a value of '0' or '1'. The bit value of each of the first to eighth round bits RD0-RD7 that is output from each of the first to eighth floating-point-to-fixed-point converters FFC0-FFC7 may be determined according to whether a sign bit is a negative number or a positive number and according to whether to correspond to roundup as a result of round processing.

The adder tree 2300 may perform a first addition operation on the fixed-point format first to eighth multiplication result data M0_FIX-M7_FIX that are output from the first to eight floating-point-to-fixed-point converters FFC0-FFC7. In addition, the adder tree 2300 may perform a second addition operation on the first to eight round bits RD0-RD7 that are output from the first to eighth floating-point-to-fixed-point converters FFC0-FFC7. Further, the adder tree 2300 may perform third addition on a first addition result and a second addition result.

In an embodiment, the adder tree 2300 may include adders ADD11-ADD14, ADD21-ADD22, and ADD31 (hereinafter, a first group of adders) performing the first addition, adders ADD15-ADD18, ADD23-ADD24, and ADD32 (hereinafter, a second group of adders) performing the second addition, and an adder ADD4 performing the third addition. Each of the first to eighth multiplication result data M0_FIX-M7_FIX transmitted to the adder tree 2300 has a fixed-point format, and each of the first to eighth round bits RD0-RD7 has a binary value of '1', so that the adder tree 2300 may be composed of fixed-point adders.

The adder tree 2300 may be configured in a tree structure with a plurality of stages. When 8 multiplication result data M0_FIX-M7_FIX and round bits RD0-RD7 are transmitted to the adder tree 2300 as in this embodiment, the adder tree 2300 may have first to fourth stages ST1 to ST4. In the uppermost stage of the adder tree 2300, that is, the first stage ST1, four first adders ADD11-ADD14 of the first group may be disposed in parallel with each other. Also, in the first stage ST1, four first adders ADD15-ADD18 of the second group may be disposed in parallel with each other. In the second stage ST2 of the adder tree 2300, two second adders ADD21-ADD22 of the first group may be disposed in parallel with each other. In addition, in the second stage ST2, two second adders ADD23-ADD24 of the second group may be disposed in parallel with each other. In the third stage ST3 of the adder tree 2300, one third adder ADD31 of the first group may be disposed. In addition, in the third stage ST3, one third adder ADD32 of the second group may be disposed. One fourth adder ADD4 may be disposed in the fourth stage ST4, which is the lowermost stage of the adder tree 2300.

Each of the first adders ADD11-ADD14 of the first group of the first stage ST1 may perform an addition operation on two floating-point format multiplication result data M_FIXs transmitted through the two floating-point-to-fixed-point converters FFCs, and output fix-point format result data. As an example, the first adder ADD11 among the first adders ADD11-ADD14 of the first group may receive fixed-point format first multiplication result data M0-FIX and fixed-point format second multiplication result data M1-FIX from the first floating-point-to-fixed-point converter FFC0 and the second floating-point-to-fixed-point converter FFC1, respectively. The first adder ADD11 may perform an addition operation on the fixed-point format first multiplication result data M0-FIX and fixed-point format second multiplication result data M1-FIX, and transmit a calculation result to the second adder ADD21 of the first group of the second stage ST2. The remaining first adders ADD12-ADD14 of the first group may operate in the same manner.

Each of the first adders ADD15-ADD18 of the second group of the first stage ST1 may perform an addition operation on two round bits RDs transmitted through the two floating-point-to-fixed-point converters FFCs, and output result data RD01, RD23, RD45, and RD67, respectively. As an example, the first adder ADD15 among the first adders ADD15-ADD18 of the second group may receive the first round bit RD0 and the second round bit RD1 from the first floating-point-to-fixed-point converter FFC1 and the second floating-point-to-fixed-point converter FFC2, respectively. The first adder ADD15 may perform an addition operation on the first round bit RD0 and the second round bit RD1, and output result data RD01 to the second adder ADD23 of the second group of the second stage ST2. The remaining first adders ADD16-ADD18 of the second group may operate in the same manner.

Each of the second adders ADD21-ADD22 of the first group of the second stage ST2 may perform an addition operation on the output data of the first adders of the first group of the first stage ST1, and output fixed-point format result data. For example, the second adder ADD21 of the first group may perform an addition operation on the output data that is output from the first adders ADD11 and ADD12 of the first group of the first stage ST1, and transmit result data to the third adder ADD31 of the first group of the third stage ST3. The remaining second adder ADD22 of the first group may operate in the same manner.

Each of the second adders ADD23-ADD24 of the second group of the second stage ST2 may perform an addition operation on the output data of the first adders of the second group of the first stage ST1, and output result data RD03 and RD047, respectively. For example, the second adder ADD23 of the second group may perform an addition operation on the output data RD01 and RD23 that are output from the first adders ADD15 and ADD16 of the second group of the first stage ST1, and transmit result data RD03 to the third adder ADD32 of the second group of the third stage ST3. In a similar manner, the second adder ADD24 of the second group may perform an addition operation on the output data RD45 and RD67 that are output from the first adders ADD17 and ADD18 of the second group, and transmit result data RD47 to the third adder ADD32 of the second group of the third stage ST3.

The third adder ADD31 of the first group of the third stage ST3 may perform an addition operation on the output data of the second adders ADD21-ADD22 of the first group of the second stage ST2, and output result data. The third adder ADD32 of the second group of the third stage ST3 may perform an addition operation on the output data RD03 and RD47 of the second adders ADD23-ADD24 of the second group of the second stage ST2, and transmit result data RD07 to the fourth adder ADD4 of the fourth stage ST4.

The fourth adder ADD4 of the fourth stage ST4 may perform an addition operation on the fixed-point format output data M_ADD_FIX from the third adder ADD31 of the first group of the third stage ST3 and the output data RD07 from the third adder ADD32 of the second group of the third stage ST3. The fourth adder ADD4 may transmit multiplication data M_A_FIX generated as a result of the addition to the accumulator 2400.

The result data M_A_FIX that is output from the fourth adder ADD4 may be data in which data that is obtained by summing round bits RD0-RD7 to data that is obtained by summing the fixed-point format first to eighth multiplication result data M0_FLT-M7_FLT that are output from the first to eighth floating-point-to-fixed-point converters FFC0-FFC7. That is, in the process of generating the fixed-point format first to eighth multiplication result data M0_FLT-M7_FLT by the first to eighth floating-point-to-fixed-point converters FFC0-FFC7, the '+1' operation, which was omitted in the roundup and 2's complement processing, may be performed by the third addition by the fourth adder ADD4 of the fourth stage ST4.

The accumulator 2400 may perform an accumulating addition operation on the fixed-point format multiplication-addition data M_A_FIX that is output from the fourth adder ADD4 of the fourth stage ST4, which is the lowermost state of the adder tree 2300, and output fixed-point format multiplication-accumulation data M_ACC_FIX. After the accumulation in the MAC operator 2000 is completed, the fixed-point format multiplication-accumulation data M_ACC_FIX that is output from the accumulator 2400 may be transmitted to the fixed-point-to-floating-point converter 2500. The fixed-point-to-floating-point converter 2500 may convert the fixed-point format multiplication-accumulation data M_ACC_FIX transmitted from the accumulator 2400 into the floating-point format data to output the floating-point format MAC result data MAC_RST_FLT. The accumulator 2400 and the fixed-point-to-floating-point converter 2500 may have the same configuration as the accumulator 1400 and the fixed-point-to-floating-point converter 1500 described with reference to FIG. 31.

Figure 45:
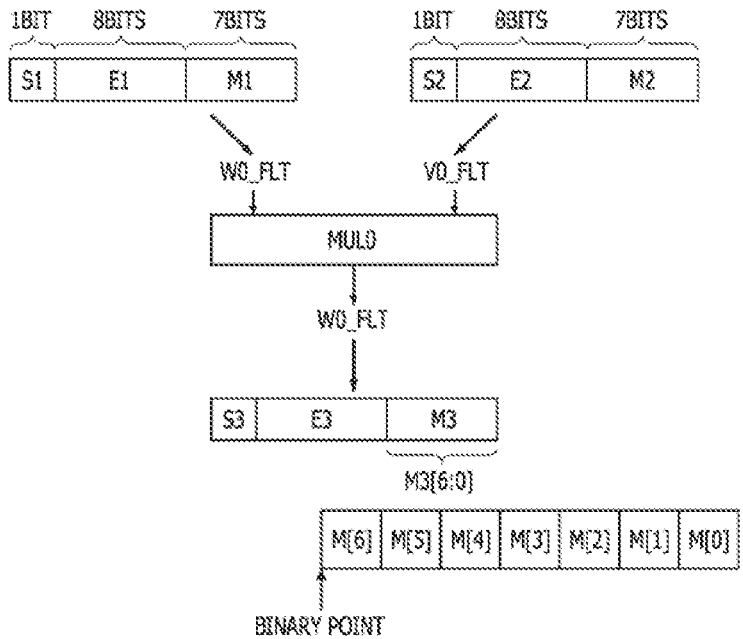
FIG. 45 illustrates an embodiment of data formats of input data and output data of a first multiplier in a MAC operator of FIG. 44.

FIG. 45 illustrates an embodiment of data formats of the input data and the output data of the first multiplier MUL0 in the MAC operator 2000 of FIG. 44. The following description may be applied equally to the remaining multipliers MUL1-MUL7 constituting the multiplication circuit 2100 in the MAC operator 2000 of FIG. 44. In this embodiment, it is premised that the input data, that is, the first weight data W0_FLT and the first vector data V0_FLT are in a 16-bit brain floating point BF16 type.

Referring to FIG. 45, the floating-point format first weight data W0_FLT inputted to the first multiplier MUL0 may be composed of a 1-bit sign S1, an 8-bit exponent E1, and a 7-bit mantissa M1. Similarly, the floating-point format first vector data V0_FLT inputted to the first multiplier MUL0 may be composed of a 1-bit signal S2, an 8-bit exponent E2, and a 7-bit mantissa M2. The multiplier MUL0 may generate a sign S3 of the first multiplication result data M0_FLT that is output from the first multiplier MUL0 through an XOR operation on the sign S1 of the first weight data W0_FLT and the sign S2 of the first vector data V0_FLT.

The first multiplier MUL0 may perform a multiplication operation on the first weight data W0_FLT and the first vector data V0_FLT. In the multiplication performed by the first multiplier MUL0, addition 'E1+E2' on the exponent E2 of the first weight data W0_FLT and the exponent E2 of the first vector data V0_FLT may be performed, and the result may constitute the exponent E3 of the floating-point format first multiplication result data M0_FLT that is output from the first multiplier MUL0. In addition, multiplication 'M1*M2' may be performed on the mantissa M1 of the first weight data W0_FLT and the mantissa M2 of the first vector data W0_FLT, and the result may constitute the mantissa M3 of the floating-point format first multiplication result data M0_FLT that is output from the first multiplier MUL0.

The multiplication on the mantissa M1 of the first weight data W0_FLT and the mantissa M2 of the first vector data W0_FLT may be performed in a state in which a 1-bit implicit bit has been included in each of the mantissa M1 of the first weight data W0_FLT and the mantissa M2 of the first vector data W0_FLT. Accordingly, 16-bit data may be generated as a result of the multiplication on the mantissa 1.M1 of the first weight data W0_FLT and the mantissa 1.M2 of the first vector data W0_FLT. The 16-bit data may be normalized and the implicit bit may be removed to form the mantissa M3 of the 7-bit first multiplication result data M0_FLT. Because the implicit bit has been removed, the binary point in the mantissa M3 of the first multiplication result data M0_FLT may be positioned to the left of the MSB M[6].

Figure 46:
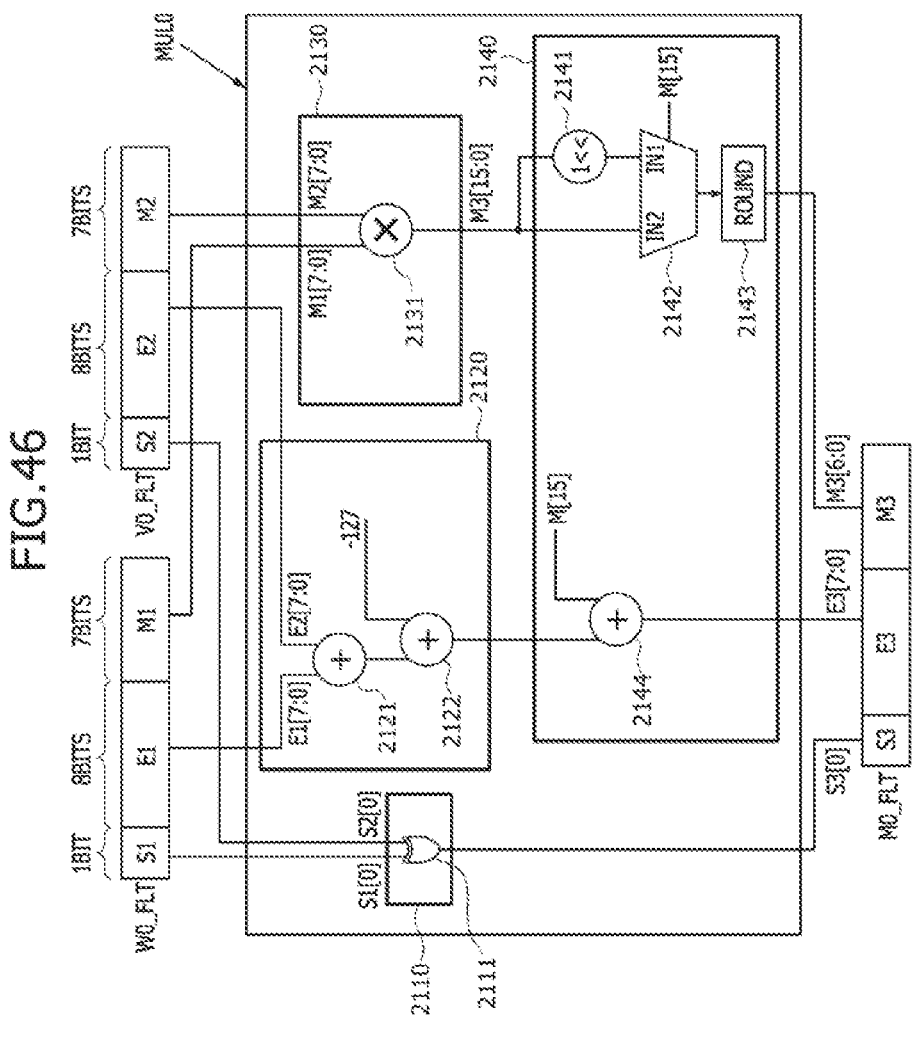
FIG. 46 illustrates an embodiment of the first multiplier of the multiplying circuit of FIG. 44.

FIG. 46 illustrates an embodiment of the first multiplier MUL0 of the multiplication circuit 2100 of FIG. 44. In the present embodiment, it is premised that the first weight data W0_FLT and the first vector data V0_FLT are in a 16-bit brain floating-point BF16 format. The description for a configuration and an operation of the first multiplier MUL0 according to the present embodiment may be equally applied to the remaining multipliers MUL1-MUL7 constituting the multiplying circuit 2100.

Referring to FIG. 46, the first multiplier MUL0 lay include a sign processing circuit 2110, an exponent processing circuit 2120, a mantissa processing circuit 2130, and a normalizer 2140. The sign processing circuit 2110 may include an XOR gate 2111. The XOR gate 2111 may perform an XOR operation on the sign bit S1[0] of the first weight data W0_FLT and the sign bit S2[0] of the first vector data V0_FLT. The XOR gate 2111 may output a 1-bit sign bit S3[0] constituting the sign S3 of the floating-point format first multiplication result data M0_FLT.

The exponent processing circuit 2120 may include a first exponent adder 2121 and a second exponent adder 2122. The first exponent adder 2121 may perform an addition operation on exponent bits E1[7:0] of the first weight data W0_FLT and the exponent bits E2[7:0] of the first vector data V0_FLT, and output result data. The second exponent adder 2122 may perform an addition operation on the result data and '−127' in order to subtract the exponential bias value, for example, '127' from the result data that is output from the first adder 2121. The output data from the second exponent adder 2122 may be transmitted to the normalizer 2140.

The mantissa processing circuit 2130 may include a mantissa multiplier 2131. The mantissa multiplier 2131 may perform a multiplication operation on the mantissa bits M1[7:0] of the first weight data W0_FLT with an explicit bit and the mantissa bits M2[7:0] of the first vector data V0_FLT with an explicit data, The mantissa multiplier 2131 may output 16-bit mantissa bits M3[15:0] as a multiplication result data. The mantissa bits M3[15:0] that are output from the mantissa multiplier 2131 may be transmitted to the normalizer 2140.

The normalizer 2140 may include a floating-point moving unit 2141, a multiplexer 2142, a round processing unit 2143, and a third exponent adder 2144. The floating-point moving unit 2141 may receive 16-bit mantissa bits M3[15:0] transmitted from the mantissa multiplier 2131, and output the mantissa bits M3[15:0] after shifting the binary point toward the MSB of the mantissa bit M3[15:0] by 1-bit. Accordingly, the binary point of the mantissa bits M3[15:0] may be positioned between the 15th bit M[14] and the MSB M[15]

of the mantissa bit M3[15:0]. The data of which binary point has been moved by the floating-point moving unit 2141 may be transmitted to a first input terminal IN1 of the multiplexer 2142.

The multiplexer 2142 may receive the data of which binary point has been moved by the floating-point moving unit 2141 through first input terminal IN1, and receive mantissa bits M4[15:0] that are output from the mantissa multiplier 2131 through a second input terminal IN2. The multiplexer 2142 may determine output data in response to the MSB M[15] of the mantissa bits M3[15:0]. When the MSB M[15] of the mantissa bits M3[15:0] is the multiplexer 2142 may output the data of which binary point has been moved by the floating-point moving unit 2141, transmitted through the first input terminal IN1. When the MSB M[15] of the mantissa bits M3[15:0] is '0', the multiplexer 2142 may output the mantissa data M3[15:0] inputted through the second input terminal IN2.

The round processing unit 2143 may remove 9 bits (including an implicit bit) from the 16-bit data that is output from the multiplexer 2142 so that the data size becomes '7'. In this process, the round processing unit 2143 may perform round processing. During round processing, '+1' addition according to roundup may be performed. The round processing unit 2143 may output the round-processed 7-bit mantissa bits M3[6:0]. The mantissa bits M3[6:0] that are output from the round processing unit 2143 may constitute the mantissa M3 of the floating point format first multiplication result data M0_FLT.

The third exponent adder 2144 may perform an addition operation on the 8-bit data that is transmitted from the second exponent adder 2144 and the MSB M[15] of the mantissa bits M3[15:0] from the mantissa multiplier 2131. When the MSB M[15] of the mantissa bits M3[15:0] is '0', the 8-bit exponent E3[7:0] that is output from the third exponent adder 2144 may be the same as the data that is transmitted from the second exponent adder 2142. When the MSB M[15] of the mantissa bits M3[15:0] is '1', the 8-bit exponent E3[7:0] that is output from the second exponent adder 2122 may have a value greater by '1' than the data that is output from the second exponent adder 2122. The exponent bits that are output from the third exponent adder 2144 may constitute the exponent E3 of the floating-point format first multiplication result data M0_FLT.

Figure 47:
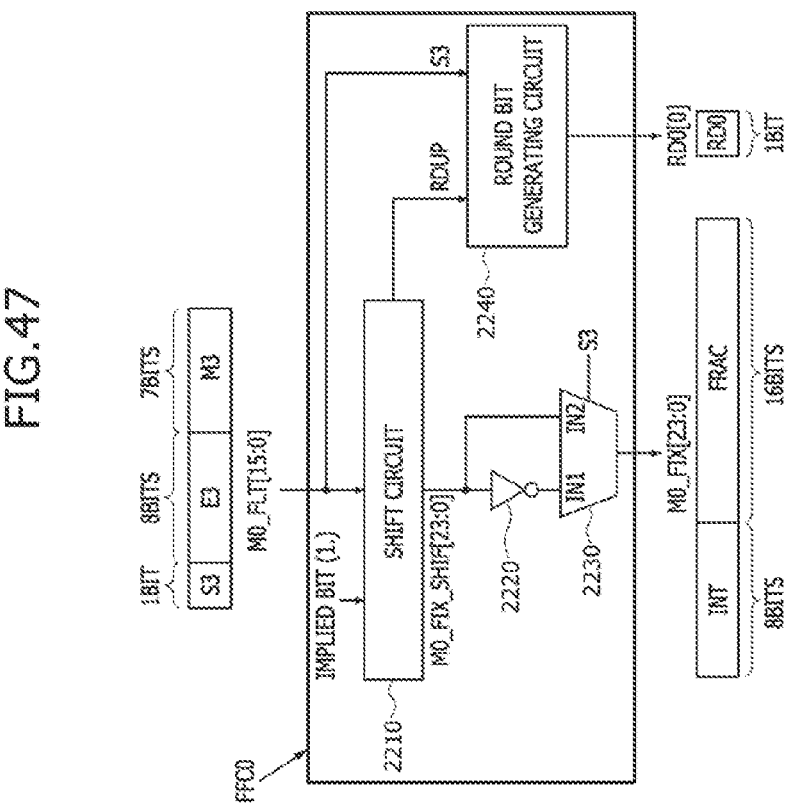
FIG. 47 illustrates an embodiment of a first floating-point-to-fixed-point converter of the floating-point-to-fixed-point converting circuit of FIG. 44.

FIG. 47 illustrates an embodiment of the first floating-point-to-fixed-point converter FFC0 of the floating-point-to-fixed-point converting circuit 2200 of FIG. 44. As described with reference to FIG. 44, the first floating-point-to-fixed-point converter FFC0 may receive the floating-point format first multiplication result data M0_FLT [15:0] from the first multiplier MUL0. The floating-point format first multiplication result data M0_FLT may have a format of BF16 type, and thus be composed of a 1-bit sign S3, an 8-bit exponent E3, and a 7-bit mantissa M3. Hereinafter, it is premised that the fixed-point format first multiplication result data M0_FIX[23:0] that is output from the first floating-point-to-fixed-point converter FFC0 is configured in a 24-bit signed fixed-point format. Accordingly, the fixed-point format first multiplication result data M0_FIX [23:0] may be composed of an 8-bit integer part INT and a 16-bit fraction part FRA1. The MSB of the fixed-point format first multiplication result data M0_FIX[23:0] may represent a sign bit. Hereinafter, a description of the first floating-point-to-fixed-point converter FFC0 may be equally applied to the remaining second to eighth floating-point-to-fixed-point converters FFC1-FFC7 constituting the floating-point-to-fixed-point converting circuit 2200.

Referring to FIG. 47, the first floating-point-to-fixed-point converter FFC0 of the floating-point-to-fixed-point converting circuit 2200 may include a shift circuit 2210, an inverter 2220, a multiplexer 2230, and a round bit generating circuit 2240. The shift circuit 2210 may perform a shifting operation of the third mantissa M3 of the floating-point format first multiplication result data M0_FLT[15:0] transmitted from the first multiplier MUL0 to generate fixed-point format output data. The configuration and operation of the shift circuit 2210 according to the present embodiment may be similar to the configuration and operation of the shift circuit 1210 described with reference to FIG. 35. However, there is a difference in that the shift circuit 1210 described with reference to FIG. 35 receives 25-bit first multiplication result data from which the normalization process has been omitted from the first multiplier MUL0, whereas the shift circuit 2210 according to the present embodiment receives the BF16 type first multiplication result data M0_FLT[15:0] from the first multiplier MUL0. Accordingly, in the shift circuit 2210 according to the present embodiment, the mantissa bits M3[7:0] with an implicit bit may become a shift target.

The shift circuit 2210 may shift the mantissa bits M3[7:0] to the left or right by a shift bit determined as a result of subtraction on the exponent E3 of the first multiplication result data M0_FLT[15:0] and a bias value to output fixed-point format shifted first multiplication result data M0_FIXT_SHIFT[15:0]. The shifted first multiplication result data M0_FIXT_SHIFT[15:0] that is output from the shift circuit 2210 may be transmitted to an input terminal of the inverter 2220 and the first input terminal IN1 of the multiplexer 2230. When performing a right shift operation on the mantissa hits M3[7:0], the shift circuit 2210 according to the present embodiment may generate and output a roundup signal RDUP according to whether a roundup occurs according to round processing. In an embodiment, the shift circuit 2210 may output a roundup signal RDUP of '1' when roundup occurs. When no roundup occurs, the shift circuit 2210 may output a roundup signal RDUP of '0'. The roundup signal RDUP that is output from the shift circuit 2210 may be transmitted to the round bit generating circuit 2240.

The inverter 2220 may invert the fixed-point format shifted first multiplication result data M0_FIX_SHIF[23:0] transmitted from the shift circuit 2210, and transmit the inverted first data to the second input terminal IN2 of the multiplexer 2230. The data that is transmitted from the inverter 2220 to the second input terminal IN2 of the multiplexer 2230 may be correspond to 1's complement of the fixed-point format shifted first multiplication result data M0_FIX_SHIF[23:0].

The multiplexer 2230 may receive the fixed-point format shifted first multiplication result data M0_FIX_SHIF[23:0] through the first input terminal IN1. The multiplexer 2230 may receive the 1's complement of the fixed-point format shifted first multiplication result data M0_FIX_SHIF[23:0] through the second input terminal IN2. The multiplexer 2230 may receive a sign S3 of the floating-point format first multiplication result data M0_FLT[15:0] through a control terminal. When the sign S3 has a bit value of '0' representing a positive number, the multiplexer 2230 may output the fixed-point format shifted first multiplication result data M0_FIX_SHIF[23:0] inputted to the first input terminal IN1. When the sign S3 has a bit value of '1' representing a negative number, the multiplexer 2230 may output the 1's complement of the shifted first multiplication result data M0_FIX_SHIF inputted to the second input terminal IN2. In the fixed-point format first multiplication result data M0_FIX[23:0] that is output from the multiplexer 2230, the '+1' operation according to roundup and the '+1' operation according to the 2's complement processing in negative number processing have been skipped. The first multiplication result data M0_FIX[23:0] as described above may be transmitted to the first adder ADD11 of the first group of the first stage ST1 of the adder tree 2300 as described with reference to FIG. 44.

The round bit generating circuit 2240 may receive the sign S3 of the floating-point format first multiplication result data M0_FLT[15:0] from the first multiplier MUL0. In addition, the round bit generating circuit 2240 may receive a roundup signal RDUP from the shift circuit 2210. The round bit generating circuit 2240 may perform a logic operation by using the sign S3 and the roundup signal RDUP to generate a first round bit RD0[0]. The first round bit RD0[0] generated from the round bit generating circuit 2240 may be transmitted to the first adder ADD15 of the second group of the first stage ST1 of the adder tree 2300, as described with reference to FIG. 44.

Figure 48:
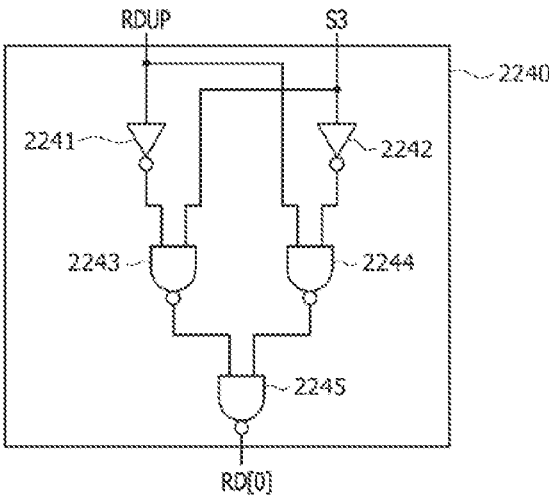
FIG. 48 illustrates an embodiment of a round bit generating circuit of the first floating-point-to-fixed-point converter of FIG. 47.

FIG. 48 illustrates an embodiment of the round bit generating circuit 2240 of the first floating-point-to-fixed-point converter FFC0 of FIG. 47. FIG. 49 is a table illustrating an operation of the round bit generating circuit 2240 of FIG. 48. Referring to FIGS. 48 and 49, the round bit generating circuit 2240 may include a first inverter 2241, a second inverter 2242, a first NAND gate 2243, a second NAND gate 2244, and a third NAND gate 2245. The first inverter 2241 may receive a roundup signal RDUP. The second inverter 2242 may receive a sign S3. The first NAND gate 2243 may receive an output signal of the first inverter 2241 and the roundup signal RDUP. The second NAND gate 2244 may receive an output signal of the second inverter 2242 and the roundup signal RDUP. The third NAND gate 2245 may receive an output signal of the first NAND gate 2243 and an output signal of the second NAND gate 2244, and output a round bit RD[0].

When the sign S3 is '1' representing a negative number and the roundup signal RDUP is '0', the first NAND gate 2243 and the second NAND gate 2244 of the round bit generating circuit 2240 may output '0' and '1', respectively. Accordingly, the round bit RD[0] that is output from the third NAND gate 2245 may have a value of '1. When the sign S3 is '1' representing a negative number, as described with reference to FIG. 47, a 1's complement of the shifted first multiplication result data M0_FIX_SHIFT[23:0] may be output from the multiplexer 2230. That is, the fixed-point format first multiplication result data M0_FIX_SHIFT[23:0] that is output form the first floating-point-to-fixed-point converter FFC0 may be data in a state in which the '+1' operation has been skipped. If the roundup signal RDUP is '0', the roundup does not occur during the rounding process and thus the '+1' operation does not occur. As a result, when the sign S3 is '1' representing a negative number and the roundup signal RDUP is '0', a '+1' operation is additionally performed on the first multiplication result data M0_FIX[23:0] that is output from the first floating-point-to-fixed-point converter FFC0. Such an additional '+1' operation may be performed through addition in the adder tree 2300 for the first round bit RD0[0] with a value of '1'.

When the sign S3 is '1' representing a negative number and the roundup signal RDUP is '1', the first NAND gate 2243 and the second NAND gate 2244 of the round bit generating circuit 2240 may respectively output '1'. Accordingly, the round bit RD[0] that is output from the third NAND gate 2245 may have a value of '0'. As described above, when the sign S3 is '1' representing a negative number, the fixed-point format first multiplication result data M0_FIX[23:0] that is output from the first floating-point-to-fixed-point converter FFC0 may be data in a state in which the '+1' operation in the 2's complement process has been skipped. If the roundup signal RDUP is '1', the roundup has occurred during the rounding process, so that the first multiplication result data M0_FIX[23:0] may be in a state in which the '+1' operation in the roundup process has been skipped. As a result, if the sign S3 is '1' representing a negative number and the roundup signal RDUP is '1', two '+1' operations are additionally performed on the first multiplication result data M0_FIX[23:0] that is output from the first floating-point-to-fixed-point converter FFC0.

However, the 2's complement of the result data that is obtained by performing a '+1' operation due to roundup on the shifted first multiplication result data M0_FIX_SHIFT [23:0] may be the same as the complement of the shifted first multiplication result data M0_FIX_SHIFT[23:0]. This may mean that when the sign S3 is '1' representing a negative number and the roundup signal RDUP is '1', the result data that is obtained by additionally performing a '+1' operation for a 2's complement process and a '+1' operation according to a roundup process to the shifted first multiplication result data M0_FIX_SH F[23:0] may be the same as the 1's complement of the shifted first multiplication result data M0_FIX_SHIF[23:0]. As described with reference to FIG. 47, the first multiplication result data M0_FIX[23:0] that is output from the first floating-point-to-fixed-point converter FFC0 may be the 1's complement of the shifted first multiplication result data M0_FIX_SHIF[23:0]. Accordingly, in this case, an additional '+1' operation by the first round bit RD0[0] may be unnecessary, and therefore, the first round bit RD0[0] has a value of '0'.

When the sign S3 is '0' representing a positive number, the 2's complement process is not performed, so that whether to perform an additional '+1' operation may be determined by the roundup signal RDUP. First, when the roundup signal RDUP is "0", the first NAND gate 2243 and the second NAND gate 2244 of the round bit generating circuit 2240 may each output '1'. Accordingly, the round bit RD[0] that is output from the third NAND gate 2245 may have a value of '0'. When the roundup signal RDUP is '0', the roundup has not occurred during the round process, so that an additional '+1' operation on the first multiplication result data M0_FIX[23:0] that is output from the first floating-point-to-fixed-point converter FFC0 is unnecessary, and therefore, the first round bit RD0[0] has a value of "0".

Next, when the roundup signal RDUP is '1', the first NAND gate 2243 and the second NAND gate 2244 of the round bit generating circuit 2240 may output '1' and '0', respectively. Accordingly, the round bit RD[0] that is output from the third NAND gate 2245 may have a value of "1". When the roundup signal RDUP is 1, because the roundup has occurred during the round process, a '+1' operation is additionally performed on the first multiplication result data M0_FIX[23:0] that is output from the first floating-point-to-fixed-point converter FFC0. Such an additional '+1' operation may be performed through an addition in the adder tree 2300 for the first round bit RD0[0] with a value of "1".

Figure 50:
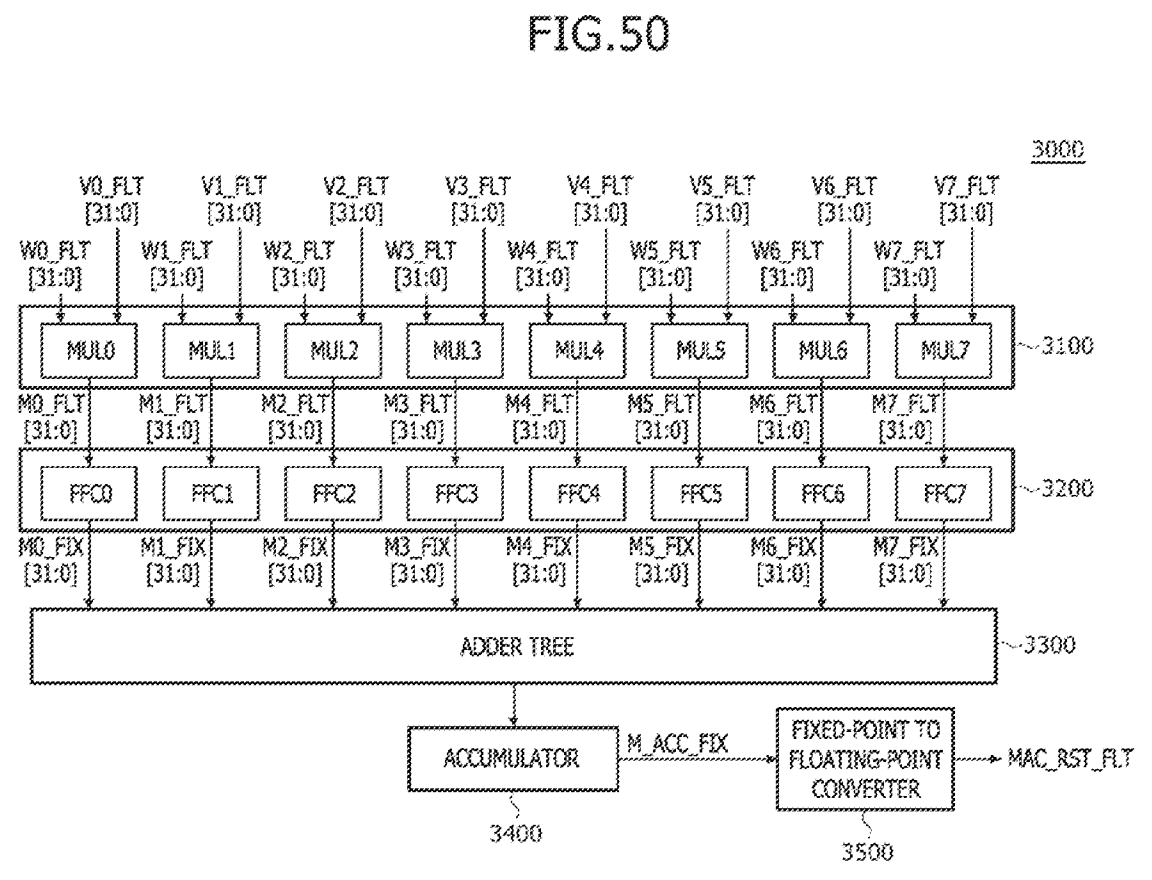

FIG. 50 illustrates a MAC operator 3000 according to another embodiment of the present disclosure. The MAC operator 3000 according to the present embodiment may be applied to the PIM devices 10, 100, and 400 described with reference to FIGS. 1, 2, and 20. Referring to FIG. 50, the MAC operator 3000 according to the present embodiment may include a multiplying circuit 3100 with a plurality of multipliers, for example, first to eighth multipliers MUL0-MUL7, a floating-point-to-fixed-point converting circuit 3200 with a plurality of floating-point-to-fixed-point converters, for example, first to eighth floating-point-to-fixed-point converters FFC0-FFC7, an adder tree 3300, an accumulator 3400, and a fixed-point-to-floating-point converter 3500. The multiplying circuit 3100 of the MAC operator 3000 according to the present embodiment may be substantially the same as the multiplying circuit 2100 described with reference to FIG. 44. In addition, the adder tree 3300 and the accumulator 3400 of the MAC operator 3000 according to the present embodiment may be substantially the same as the adder tree 1300 and the accumulator 1400 of the MAC operator 1000 described with reference to FIG. 31. Hereinafter, descriptions overlapping with those already described will be omitted.

Hereinafter, it is premised that each of the first to eighth weight data W0_FLT[31:0]-W7_FLT[31:0] and each of the first to eighth vector data V0_FLT[31:0]-V7_FLT[31:0] are in single-precision floating-point format determined in IEEE754, that is FP32. The first multiplier MUL0 may perform a multiplication operation on the floating-point format 32-bit first weight data W0_FLT[31:0] and the floating-point format 32-bit first vector data V0_FLT[31:0]. The first multiplier MUL0 may output floating-point format 32-bit first multiplication result data M0_FLT[31:0] generated by the multiplication. The first multiplication result data M0_FLT[31:0] that is output from the first multiplier MUL0 may be transmitted to the first floating-point-to-fixed-point converter FFC0. Each of the remaining multipliers MUL1-MUL7 constituting the multiplying circuit 3100 may perform a multiplication operation in the same manner.

The first floating-point-to-fixed-point converter FFC0 may convert the floating-point format first multiplication result data M0_FLT[31:0] into fixed-point format data and output the same. Hereinafter, it is premised that the first multiplication result data M0_FIX[31:0] that is output from the first floating-point-to-fixed-point converter FFC0 is fixed-point format 32-bit data. The fixed-point format first multiplication result data M0_FIX[31:0] that is output from the first floating-point-to-fixed-point converter FFC0 may be transmitted to the adder tree 3300. The first floating-point-to-fixed-point converter FFC0 may be configured in the same manner as the first floating-point-to-fixed-point converter described with reference to FIG. 35, and redundant descriptions will be omitted below. Each of the remaining first floating-point-to-fixed-point converters FFC0-FFC7 constituting the first floating-point-to-fixed-point converting circuit 3200 may perform a data format change operation in the same manner.

The fixed-point-to-floating-point converter 3500 may receive fixed-point format multiplication-accumulation data M_ACC_FIX from the accumulator 3400. The fixed-point-to-floating-point converter 3500 may convert the fixed-point format multiplication-accumulation data M_ACC_FIX into the floating-point format data to output floating-point format MAC result data MAC_RST_FLT.

Figure 51:
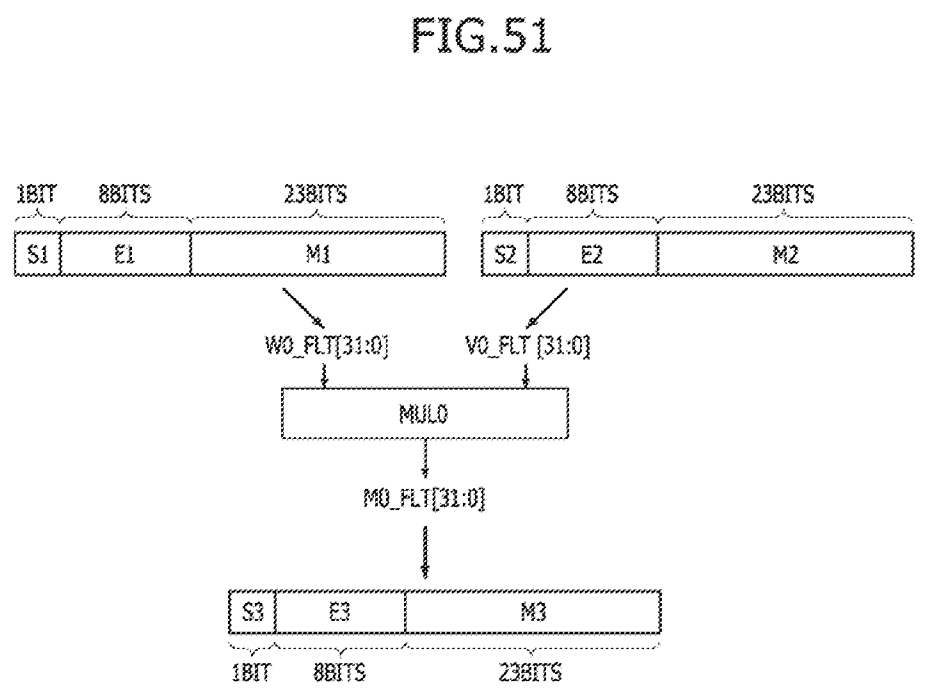

FIG. 51 illustrates an embodiment of the data formats of the input data and output data of the first multiplier MUL0 in the MAC operator 3000 of FIG. 50. Referring to FIG. 51, each of the first to eighth weight data W0_F T[31:0]-W7_FLT[31:0] and each of the first to eighth vector data V0_FLT[31:0]-V7_FLT[31:0] may have a format of FP32 type, as described with reference FIG. 50. Accordingly, the first weight data W0_FLT[31:0] may be composed of a 1-bit sign S1, an 8-bit exponent E1, and a 23-bit mantissa M1. The first vector data V0_FLT[31:0] may also be composed of a 1-bit sign S2, an 8-bit exponent E2, and a 23-bit mantissa M2. Each of the second to eighth weight data W1_FLT[31:0]-W7_FLT[31:0] and each of the second to eighth vector data V1 FLT[31:0]-V7_FLT[31:0] may have the same structured floating point format.

The floating-point format first multiplication result data M0_FLT[31:0] that is output from the first multiplier MUL0 may also be composed of a 1-bit sign S3, an 8-bit exponent E3, and a 23-bit mantissa M3. The multiplication performed by the first multiplier MUL0 may differ only in the floating-point format, and may be performed in the same manner as the multiplication method described with reference to FIG. 46. Accordingly, an XOR operation may be performed on the sign S1 of the first weight data W0_FLT[31:0] and the sign S2 of the first vector data V0_FLT[31:0], and a result of the XOR operation may constitute the sign S3 of the first multiplication result data M0_FLT[31:0].

For the exponent E1 of the first weight data W0_FLT[31:0] and the exponent E2 of the first vector data V0_FLT[31:0], addition for two data and an operation for subtracting an exponential bias may be performed, and then a normalization processing may be performed. The results of these operations and normalization processing may constitute the exponent E3 of the first multiplication result data M0_FLT[31:0]. For the mantissa M1 of the first weight data W0_FLT[31:0] and the mantissa M2 of the first vector data V0_FLT[31:0], multiplication on the two data with an implicit bit may be performed, and then a normalization processing may be performed. The results of these operations and normalization processing may constitute the mantissa M3 of the first multiplication result data M0_FLT[31:0].

Figure 52:
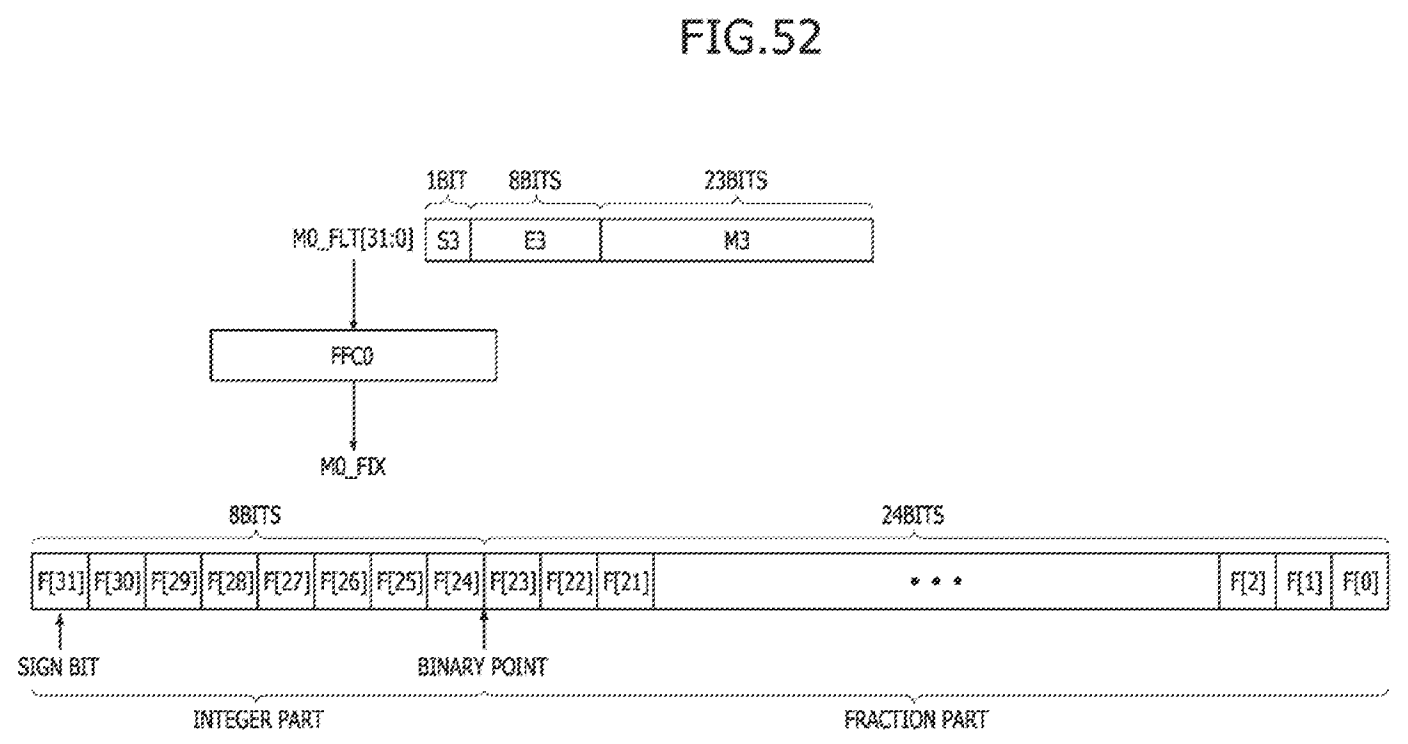

FIG. 52 illustrates an embodiment of data formats of the input data and the output data of the first floating-point-to-fixed-point converter FFC0 in the MAC operator 3000 of FIG. 50. Referring to FIG. 52, the first floating-point-to-fixed-point converter FFC0 may convert the floating-point format first multiplication result data M0_FLT[31:] into fixed-point format data to output the fixed-point format 32-bit first multiplication result data M0_FIX[31:0]. The fixed-point format first multiplication result data M0_FIX[31:0] may be composed of 8-bit integer part I[31:24] with a sign bit, and 24-bit fraction part F[23:0]. The MSB F[31] of the fixed-point format first multiplication result data M0_FIX[31:0] may constitute the sign bit. A binary point may be positioned between the 24th bit F[23] and the 25th bit F[24]. A process of converting the floating-point format first multiplication result data M0_FLT[31:0] to the fixed-point format first multiplication result data M0_FIX[31:0] will be described in detail below.

Figure 53:
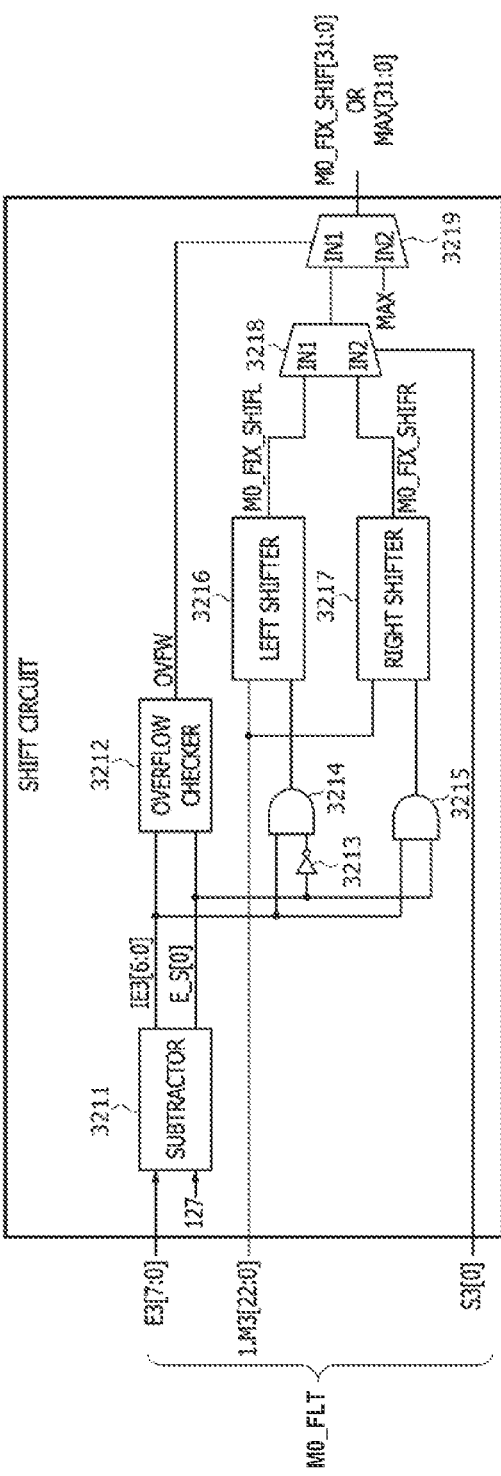
FIG. 53 illustrates an embodiment of a shift circuit constituting the first floating-point-to-fixed-point converter of FIG. 51.
Figure 54:
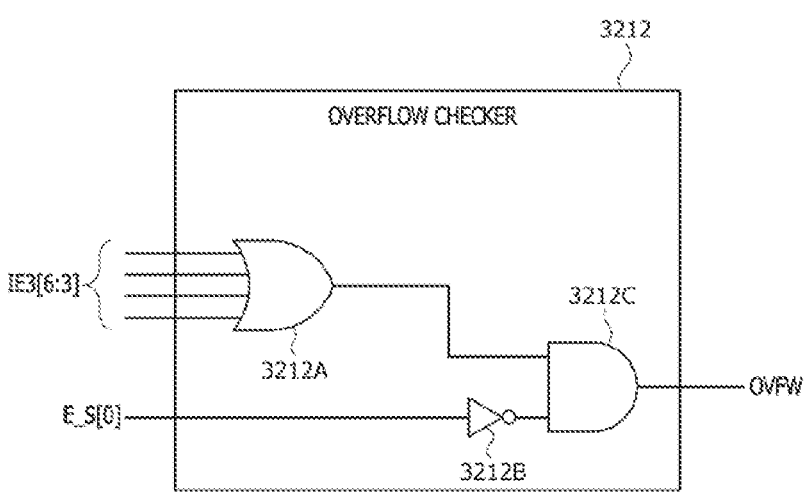
FIG. 54 illustrates an embodiment of an overflow checker of the shift circuit of FIG. 53.

FIG. 53 illustrates an embodiment of a shift circuit constituting the first floating-point-to-fixed-point converter FFC0 of FIG. 51. FIG. 54 illustrates an embodiment of an overflow checker 3212 of the shift circuit of FIG. 53. The first floating-point-to-fixed-point converter FFC0 according to the present embodiment may perform data format converting operation through a shifting operation in the shift circuit. Referring to FIG. 53, shift circuit may include a subtractor 3211, an overflow checker 3212, an inverter 3213, a first AND gate 3214, a second AND gate 3215, a left shifter 3216, a right shifter 3217, a first multiplexer 3218, and a second multiplexer 3219.

The subtractor 3211 may receive an exponent bias value, for example, '127' and exponent bits E3[7:0] of the floating-point format first multiplication result data M0_FLT. The subtractor 3211 may perform subtraction on the exponent bits E3[7:0] and '127', that is, an addition on the exponent bits E3[7:0] and '−127' to generate and output a 1-bit exponent sign bit E_S[0] and 7-bit integer bits IE[6:0]. The exponent sign bit E_S[0] is an MSB of result data of the subtraction on the exponent bits E3[7:0] and '127', and may represent a sign of the result data. When the result data is positive, the exponent sign bit E_S[0] may be '0', and when the result data is negative, the exponent sign bit E_S[0] may be '1'. The integer exponent bits IE[6:0] may be bits excluding the MSB from the result data of the subtracting operation for the exponent bits E3[7:0] and 127.

The overflow checker 3212 may determine whether overflow occurs by using some bits of the exponent sign bits E_S[0] and the integer exponent bits IE[6:0] that are output and transmitted from the subtractor 3211. When overflow occurs, that is, when the result of shifting the mantissa bits 1.M3[22:0](including an implicit bit) by shift bits is out of the range of the fixed-point format, the overflow checker 3212 may output an overflow signal OVFW of "1", for example. On the other hand, when no overflow occurs, that is, when the result of shifting the mantissa bits 1.M3[22:0] (including an implicit bit) by the shift bit does not exceed the range of the fixed-point format, the overflow checker 3212 may output an overflow signal OVFW of "0", for example.

When two conditions are satisfied, overflow occurs in this embodiment. First, because the integer part I[31:24] includes 8 bits with 1-bit of sign bit in the fixed-point format first multiplication result data M0_FIX[31:0] according to the present embodiment, if the value of the integer exponent bit IE[6:0] is greater than the integer value '127', overflow occurs. Second, because overflow occurs only when a left shift is made, the third sign bit S3[0] has a value of '0' representing a positive number. Therefore, the overflow checker 3212 may output an overflow signal OVFW of '1' when both of the above conditions are satisfied.

As shown in FIG. 54, the overflow checker 3212 may include an OR gate 3212A, an inverter 3212B, and an AND gate 3212C. The OR gate 3212A may perform an OR operation on four bits IE[6:3] of higher order among the integer exponent bits IE[6:0] that are output from the subtractor 3211 of the shift circuit. When at least one bit of the 4 bits IE[6:3] of higher order among the integer exponent bits IE[6:0] is '1', that is, when the integer value is greater than '127', the OR gate 3212A may output '1'. The inverter 3212B may invert and output the exponent sign bit E_S[0]. When the exponent sign bit E_S[0] is '0' representing a positive number, the inverter 3212B may output '1'. The AND gate 2212C may generate an overflow signal OVFW by performing an AND operation on the output value of the OR gate 2212A and the output value of the inverter 3212B. When the exponent sign bit E_S[0] is '0' representing positive and at least one of the 4 bits IE[6:3] of higher order among the integer exponent bits IE[6:0] is '1', the AND gate 3212C may output an overflow signal OVFW of '1' representing occurrence of overflow.

Returning to FIG. 53 again, the inverter 3213 may invert and output the exponent sign bit E_S[0] that is output from the subtractor 3211. The first AND gate 3214 may receive integer exponent bits IE[6:0] and an output signal of the inverter 3213, and perform an AND operation. The first AND gate 3214 may transmit the signal generated as a result of the AND operation to the left shifter 3216. The second AND gate 3215 may receive an integer exponent bit IE[6:0] and an exponent sign bit E_S[0], and perform an AND operation. The second AND gate 3215 may transmit the signal generated as a result of the AND operation to the right shifter 3217.

The left shifter 3216 may receive mantissa bits 1.M3[22:0](including an implicit bit) of the fixed-point format first multiplication result data M0_FLT and an output signal of the first AND gate 3214. The left shift 3216 may shift the mantissa bits 1.M3[22:0] to the left by the shift bit determined by the integer exponent bit IE[6:0] to output fixed-point format left-shifted 32-bit first multiplication result data M0_FIX_SHIFL. The fixed-point format left-shifted first multiplication result data M0_FIX_SHIFIL may be transmitted to a first input terminal IN1 of the first multiplexer 3218.

The right shifter 3217 may receive the mantissa bits 1.M3[22:0] with the implicit bit of the floating-point format first multiplication result data M0_FLT and the output signal of the second AND gate 3215. The right shifter 3217 may shift the mantissa bits 1.M3[22:0] with the implicit bit to the right by the shift bit determined by the integer exponent bit IE[6:0] to output fixed-point format right-shifted first multiplication result data M0_FIX_SHIFR. The fixed-point format right-shifted first multiplication result data M0_FIX_SHIFR may be transmitted to a second input terminal IN2 of the first multiplexer 3218.

The first multiplexer 3218 may receive the fixed-point format left-shifted first multiplication result data M0_FIX_SHIFL and the fixed-point format right-shifted first multiplication result data M0_FIX_SHIFR through the first input terminal IN1 and the second input terminal IN2, respectively. The first multiplexer 3218 may an exponent bit S3[0] of the first multiplication result data M0_FIX of the fixed-point format through a control terminal. When the exponent bit is '0' representing positive, the first multiplexer 3218 may output the fixed-point format left-shifted first multiplication result data M0_FIX_SHIFL transmitted through the first input terminal IN1. On the other hand, when the exponent bit is '1' representing negative, the first multiplexer 3218 may output the fixed-point format right-shifted first multiplication result data M0_FIX_SHIFR transmitted through the second input terminal IN2.

The second multiplexer 3219 may receive the shifted first multiplication result data M0_FIX_SHIF transmitted from the first multiplexer 3218 through a first input terminal IN1. The second multiplexer 3219 may receive a maximum value MAX through a second input terminal IN2. Here, the maximum value may represent a positive maximum value or a negative maximum value that fixed-point format the first multiplication result data M0_FIX may have. The second multiplexer 3219 may receive the overflow signal OVFW that is output from the overflow checker 3212. When the overflow signal of '0' is inputted, the second multiplexer 3219 may output the fixed-point format shifted first multiplication result data M0_FIX_SHIF[31:0]. On the other hand, when the overflow signal of '1' is inputted, the second multiplexer 3219 may output the fixed-point format maximum value MAX[31:0].

Figure 55:
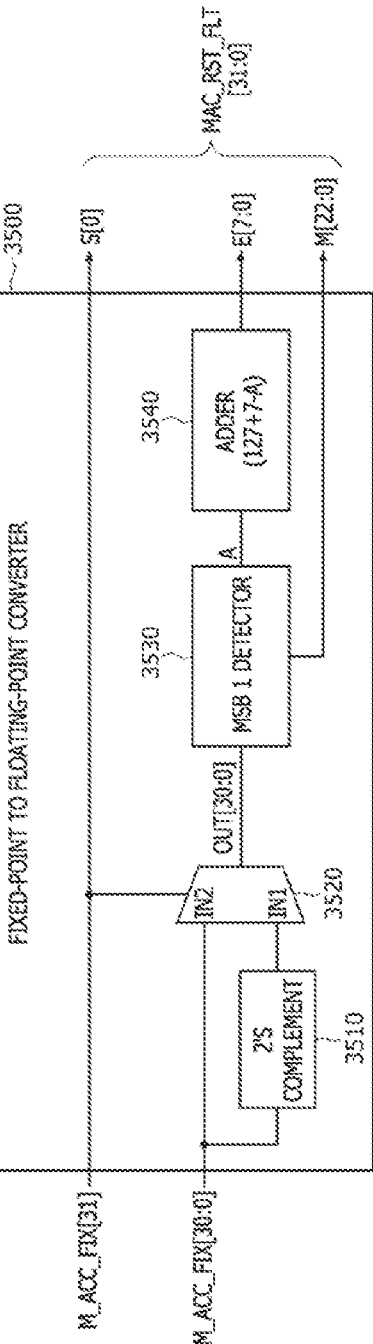
FIG. 55 illustrates an embodiment of a fixed-point-to-floating-point converter in the MAC operator of FIG. 50.

FIG. 55 illustrates an embodiment of the fixed-point-to-floating-point converter 3500 in the MAC operator 3000 of FIG. 50. As described with reference to FIG. 50, the fixed-point-to-floating-point converter 3500 may convert the fixed-point format first multiplication-accumulation data M_ACC_FIX[31:0] transmitted from the accumulator (3400 of FIG. 50) into floating-point format to output floating-point format MAC result data MAC_RST_FLT[31:0]. To this end, the fixed-point-to-floating-point converter 3500 may include a 2's complement circuit 3510, a multiplexer 3520, an MSB 1 detector 3530, and an adder 3540, as shown in FIG. 55.

The fixed-point-to-floating-point converter 3500 may output an MSB M_ACC_FIX[31], which is a sign bit in the fixed-point format multiplication-accumulation data M_ACC_FIX[31:0] transmitted from the accumulator (3400 of FIG. 50) as it is. The MSB M_ACC_FIX[31] that is output from the fixed-point-to-floating-point converter 3500 may constitute a sign bit S[0] of the floating-point format MAC result data MAC_RST_FLT[31:0].

The 2's complement circuit 3510 may receive the remaining 31-bit data M_ACC_FIX[30:0] of the fixed-point format multiplication-accumulation data M_ACC_FIX[31:0] transmitted from the accumulator (3400 of FIG. 50) except for the MSB, which is the sign bit, and generate and output 2's complement of the 31-bit data M_ACC_FIX[30:0]. The 2's complement of the 31-bit data M_ACC_FIX[30:0] that is output from the 2's complement circuit 3510 may be transmitted to a first input terminal IN1 of the multiplexer 3520.

The multiplexer 3520 may receive the remaining 31-bit data M_ACC_FIX[30:0] excluding MSB, which is a sign bit, from the fixed-point format multiplication and accumulation data M_ACC_FIX[31:0] through the second input terminal IN2. The multiplexer 3520 may output 31-bit output data OUT[30:0] in response to the MSB M_ACC_FIX[31:0], which is a sign bit of the fixed-point format multiplication and accumulation data M_ACC_FIX [31:0]. When the MSB M_ACC_FIX[31:0], which is a sign bit, is '1' representing positive, the multiplexer 3520 may output 2's complement of the 31-bit data M_ACC_FIX[31: 0] inputted to the first input terminal IN1 as the output data OUT[30:0]. When the MSB M_ACC_FIX[31:0], which is a sign bit, is '0' representing negative, the multiplexer 3520 may output the 31-bit data M_ACC_FIX[31:0] inputted to the second input terminal IN2 as the output data OUT[30:0].

The MSB 1 detector 3530 may detect a position of the MSB 1 in the output data OUT[30:0] transmitted from the multiplexer 3520. Here, "MSB 1" may be defined as a most significant bit among the bits with a binary value of "1" in the output data OUT[30:0]. "MSB 1" may opposed to the implicit bit of the floating point format. In an embodiment, "MSB 1" may be the MSB OUT[30] of the output data OUT[30:0] or the 30th bit OUT[29] of the output data OUT[30:0]. The MSB 1 detector 3530 may output 23 bits from the upper bit among the lower bits of the MSB 1. The 23-bit data that is output from the MSB 1 detector 3530 may constitute the 23-bit mantissa bits M[22:0] of the floating-point format MAC result data MAC_RST_FLT[31:0].

The MSB 1 detector 3530 may count from the MSB of the output data OUT[30:0], output a digit A where the MSB 1 is located, and transmit the digit A to the adder 3540. For example, the MSB 1 is the MSB OUT[39] of the output data OUT[30:0], the MSB 1 detector 3530 may output '1' as a digit A. As another example, in the case of the 30th bit OUT[29], the MSB 1 detector 3530 may output '2' as a digit (A). As another example, when MSB 1 is the 28th bit OUT[27] of the output data OUT[30:0], the MSB 1 detector 3530 may output '4' as a digit (A).

The adder 3540 may perform an addition on '127', (binary value '01111111'), which is an exponent bias, 7 (binary value '00000111'), which is the number of bits in the integer part excluding the sign bit in fixed-point format, and a negative number (−A) of digits transmitted from MSB 1 detector 3530 to output an operation result. The 8-bit data that is output from the adder 3540 may constitute the 8-bit exponent bit E[7:0] of the floating-point format MAC result data MAC_RST_FLT[31:0].

Figure 56:
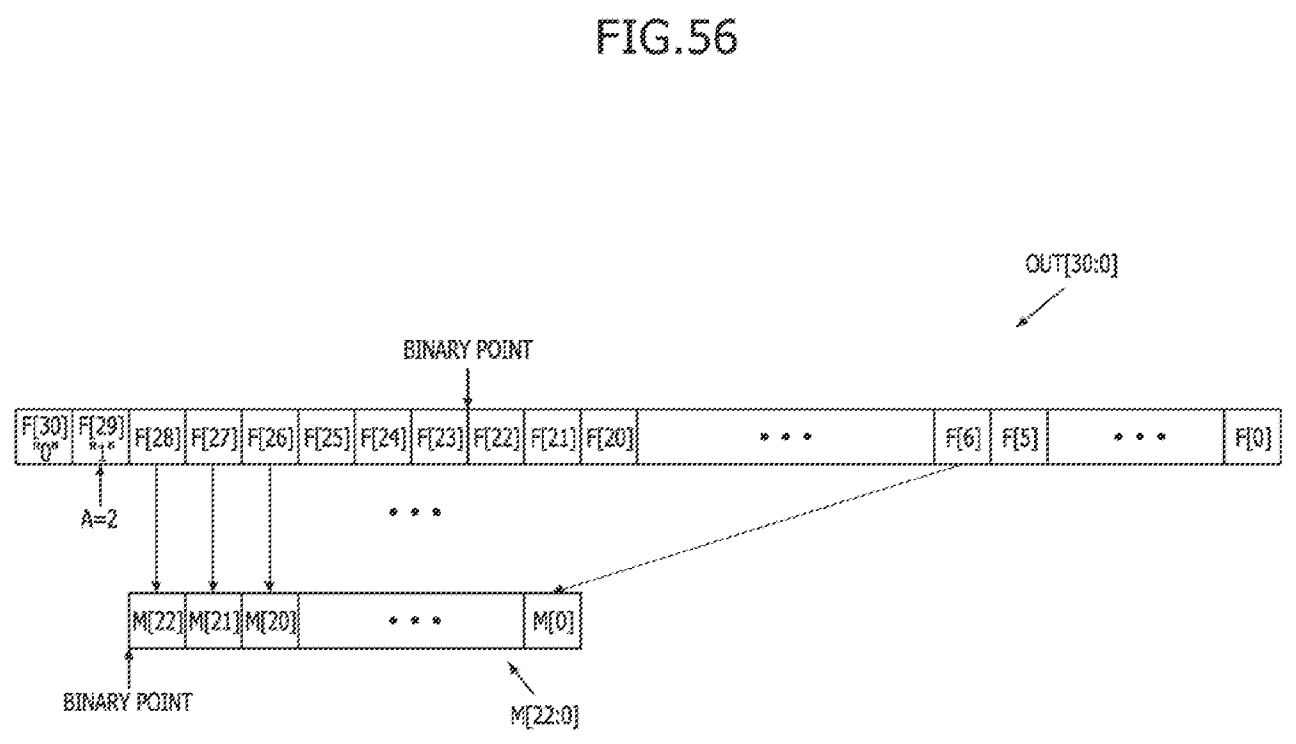

FIG. 56 illustrates a process of generating mantissa bits of output data in a floating-point format in the fixed-point-to-floating-point converter 3500 of FIG. 55. In this embodiment, the MSB F[30] of the output data OUT[30:0] from the multiplexer 3520 is '0' and the 30th bit F[29] is '1', as an example. Referring to FIG. 56 together with FIG. 55, the MSB 1 detector 3530 may detect the position of MSB 1, that is, the 30th bit F[29] in the output data OUT[30:0] transmitted from the multiplexer 3520. Because a digit (A) of MSB 1 counted from the MSB is '2', the MSB 1 detector 3530 may transmit the digit A 2 to the adder 3540. In addition, the MSB 1 detector 3530 may output 23 bits F[28:6] from the upper bit among the lower bits F[28:0] of MSB 1. As indicated by the arrows in FIG. 56, each of the 23 bits F[28:6] may constitute each of the 23-bit mantissa bits M[22:0] of the floating-point format MAC result data MAC_RST_FLT[31:0].

Figure 57:
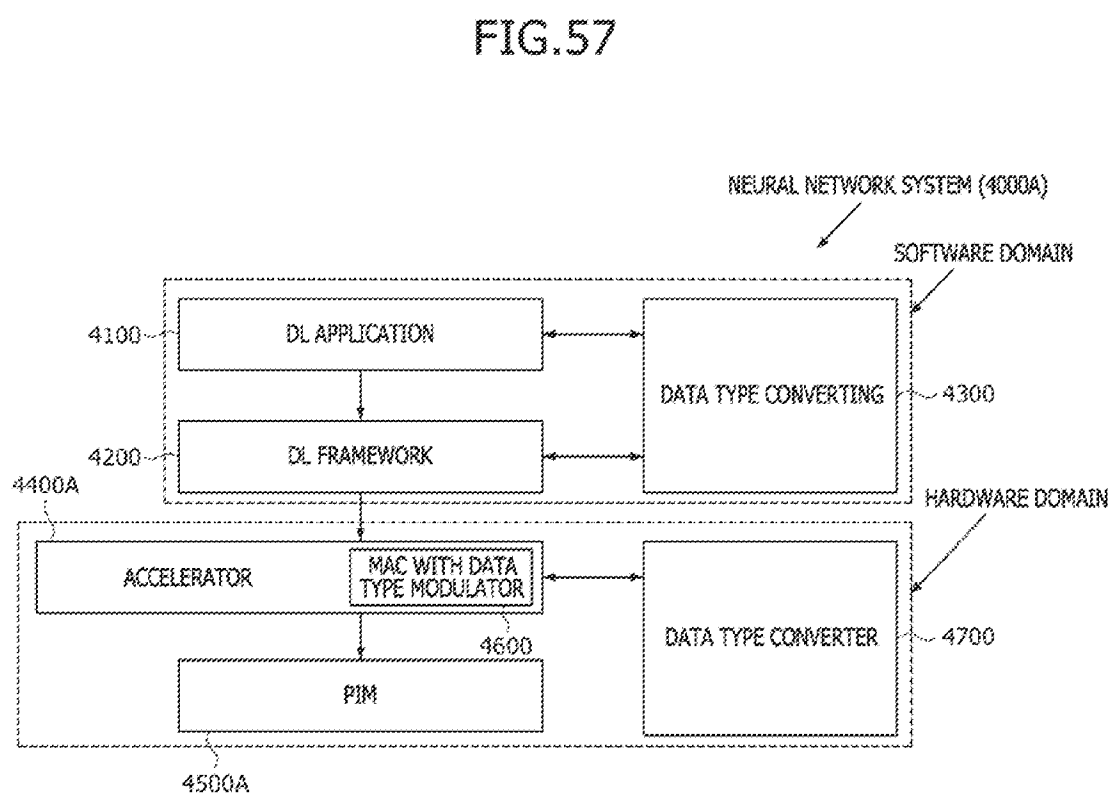

FIG. 57 illustrates an embodiment of a neural network system 4000A according to an embodiment of the present disclosure. Referring to FIG. 57, the neural network system 4000A according to the present embodiment may include a deep learning application 4100, a deep learning framework 4200, a data type converting 4300, an accelerator 4400A, a PIM 4500A, and a data type converter 4700. The deep learning application 4100, the deep learning framework 4200, and the data type converting 4300 may be included in a software domain. That is, the execution of the deep learning application 4100, the establishment of the deep learning framework 4200, and the data format conversion 4300 are performed by software. The accelerator 4400A, the PIM 4500A, and the data type converter 4700 may be included in a hardware domain. The accelerator 4400A or the PIM 4500A may use data that is transmitted from the data type converter 4700 during an operation for acceleration. Although both the data type converting 4300 and the data type converter 4700 are shown in FIG. 57, this is for convenience of description and any one may be removed or omitted. Specifically, the process of the data type converting 4300 performed by software may be the same as the operation of the data type converter 4700 which is hardware. That is, the data type converter 4700 may perform the same process as the data type converting 4300 process by hardware. Therefore, when the data type converting 4300 is performed by software, the data type converter 4700 may be removed. Conversely, when the data type converter 4700 is used, the data format converting 4300 performed by software may be omitted.

The deep learning application 4100 may correspond to a variety of software that is executed by applying deep learning. Deep learning may be described as performing machine learning by using an artificial neural network with multiple layers. As the deep learning technique, there are a deep neural network, a convolutional neural network, a recurrent neural network, and the like. In an embodiment, the deep learning application 4100 may be divided into training and inference. Training is a process of learning a model through input data. Inference is a process of performing services such as recognition with a learned model. The deep learning framework 4200 may correspond to a software establishment that provides a number of libraries that have already been verified and various deep learning algorithms that have been completed with prior learning. By establishing the deep learning framework 4200, developers may quickly and easily use libraries and deep learning algorithms. As the deep learning framework 4200, tensorflow, kerns, theano, pytorch, and the like are known.

The data type converting 4300 may represent a software process for converting 32-bit floating-point format FP32 data into a 16-bit floating-point format data. In an embodiment, when a learning result is generated by using FP32 in a training process in the deep learning application 4100, the data type converting 4300 may be performed in the process of performing an inference in the deep learning application 4100. In another embodiment, the data format converting 4300 may be performed in the process of establishing the deep learning framework 4200.

The accelerator 4400A may correspond to hardware specialized for mathematical operations required in inference phase of deep learning. The mathematical operations may include convolutions, activations, pooling, and normalization. As an example of the accelerator 4400A, a graphics processing unit (GPU) with a general-purpose graphics processing unit (GPGPU) may be presented. In this embodiment, the accelerator 4400A may include a MAC operator 4600 with a data format modulator. The MAC operator 4600 according to this embodiment may be similar to the MAC operators 1000, 1000A, 2000, and 3000 described with reference to FIGS. 31, 42, 44, and 50.

In an embodiment, when the data format converting 4300 is performed by software, the MAC operator 4600 of the accelerator 4400A may perform a MAC operation on 16-bit floating-point data generated by the data format converting 4300. In another embodiment, when the data format converting 4300 is omitted by software, the MAC operator 4600 of the accelerator 4400A may perform a MAC operation on the 16-bit floating-point format data that is provided by the data type converter 4700. The PIM 4500A may include a data storage region and an arithmetic circuit performing operations by using data stored in the data storage region. The PIM 4500A in this embodiment may be configured in the same manner as the PIM devices 10, 100, and 400 described with reference to FIGS. 1, 2, 20, 29, and 30. Accordingly, the PIM 4500A may perform a memory mode operation and an MAC arithmetic mode operation.

The data type converter 4700 may perform of converting FP32 data into the 16-bit floating-point format data. As described above, when the data format is already converted by software, the operation of the data type converter 4700 might not be required. The data format converting operation performed by the data type converter 4700 may be substantially the same as the data type converting 4300 process above. However, when the data type converting is performed in hardware by the data type converter 4700, as the data size decreases from 32 bits to 16 bits, the address size may also be reduced by half. Hereinafter, it is premised that the address size is appropriately reduced according to the data size reduction. The data type converter 4700 may transmit the converted the 16-bit floating-point format data to the accelerator 4400A or PIM 4500A.

Figure 58:
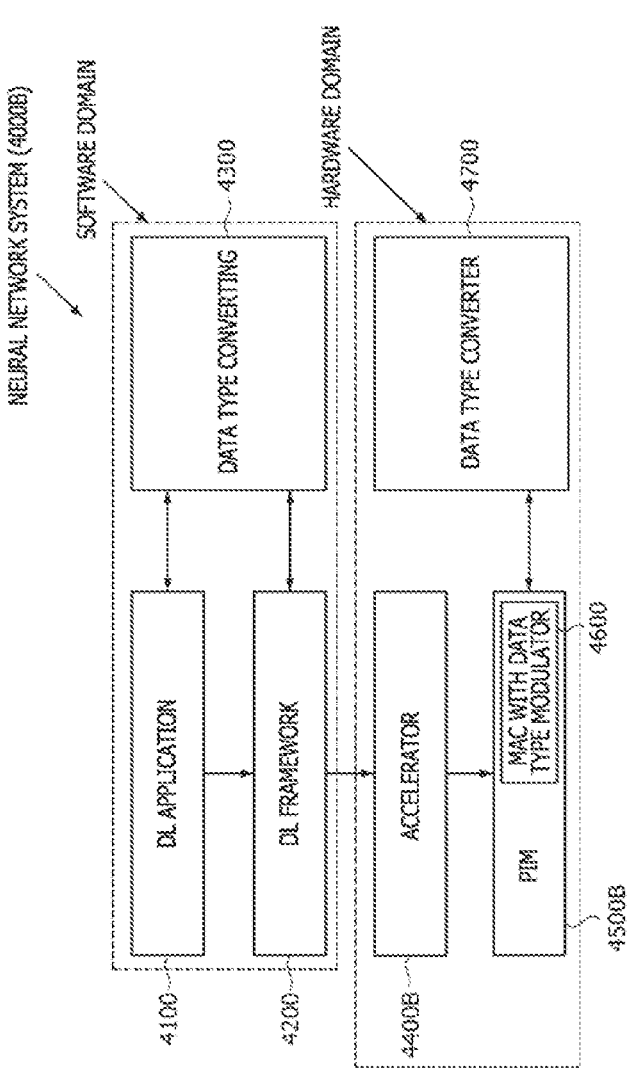
FIG. 58 illustrates another embodiment of a neural network system according to another embodiment of the present disclosure.

FIG. 58 illustrates another embodiment of a neural network system 4000B according to another embodiment of the present disclosure. In FIG. 58, the same reference numerals as in FIG. 57 denote the same elements. Hereinafter, descriptions overlapping with those described with reference to FIG. 57 will be omitted. Referring to FIG. 58, in the neural network system 4000B according to the present embodiment, an accelerator 4400B might not include a MAC operator 4600 with a data type modulator, unlike the accelerator 4400A described with reference to FIG. 57. In this case, the operation for the acceleration operation in the accelerator 4400B may be performed on the data in a state in which data type converting is not performed, for example, data of FP32.

A PIM 45003 may include the MAC operator 4600 with a data format modulator. The MAC operator 4600 according to the present embodiment may be the same as described with reference to FIG. 57. That is, when the data format conversion 4300 is performed by software, the MAC operator 4600 of the PIM 4500B may perform a MAC operation on data in a 16-bit floating point format generated by the data type converting 4300. In another embodiment, when the data type converting 4300 is omitted by software, the MAC operator 4600 of the PIM 4500B may perform a MAC operation on the 16-bit floating-point format data that is provided by the data type converter 4700.

FIG. 59 is a table illustrating four 16-bit floating-point data types in a neural network systems 4000A and 4000B according to various embodiments of the present disclosure. Referring to FIG. 59, the 16-bit floating-point formats used in the neural network systems 4000A and 4000B described with reference to FIGS. 57 and 58 may include first to fourth data types FP16, OF16-1, OF16-2, and BF16. The first data type FP16 is a 16-bit floating point format according to the IEEE754 standard, and may be composed of a 1-bit sign, a 5-bit exponent, and a 10-bit mantissa. The second data type OF16-1 may be composed of a 1-bit sign, a 6-bit exponent, and a 9-bit mantissa. The third data type OF16-2 may be composed of a 1-bit sign, a 7-bit exponent, and an 8-bit mantissa. The fourth data type BF16 may be composed of a 1-bit sign, an 8-bit exponent, and a 7-bit mantissa.

The first data type FP16 and the fourth data type BF16 may be well-known 16-bit floating-point data formats. On the other hand, the second data type OF16-1 and the third data type OF16-2 may be 16-bit floating-point data formats newly proposed in the present embodiment. In a floating-point format, it is well known that the more exponent bits, the wider the range of the number is, and the more gas bits, the higher the accuracy. Therefore, as for the representation range of numbers, the fourth data type BP16 may be the widest, followed by the third data type OF16-2, followed by the first data type OF16-1, and the first data type BF16 may be narrowest. On the other hand, the accuracy of the first data type FP16 may be highest, followed by the second data type OF16-1, followed by the third data type OF16-2, and the fourth data type BF16 may be the lowest. In the neural network system according to the present embodiment, one of four 16-bit floating-point data formats in which a number expression range and accuracy are variously distributed may be selected and applied to data for operation.

In the present embodiment, one of the four data types may be selected by a mode register setting signal MRS[1:0]. In an embodiment, the mode register setting signal MRS[1:0] may be generated by the mode register (MRS) 260 in PIM controllers 200A and 500A in the PIM systems 20 and 40 of FIGS. 29 and 30, respectively. In an embodiment, when the mode register setting signal MRS[1:0] is '00', the first data type FP16 may be selected. When the mode register setting signal MRS[1:0] is '01', the second data type OF16-1 may be selected. When the mode register setting signal MRS[1:0] is '10', the third data type OF16-2 may be selected. When the mode register setting signal MRS[1:0] is '11', the fourth data type BF16 may be selected. However, this is only an example, and the method of selecting one of the four data types may be variously set.

Figure 60:
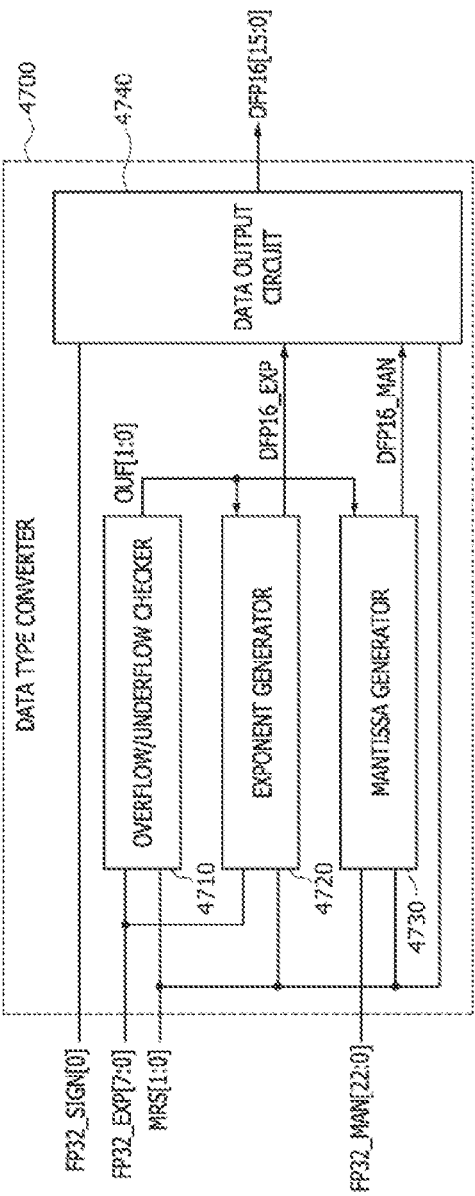
FIG. 60 illustrates an embodiment of a data type converter in neural network systems according to various embodiments of the present disclosure.

FIG. 60 illustrates an embodiment of a data type converter 4700 in neural network systems 4000A and 4000B according to various embodiments of the present disclosure. Referring to FIG. 60, the data type converter 4700 may receive 1-bit sign bit FP32_SIGN[0] of a 32-bit floating-point FP32 type, 8-bit exponent bits FP32_EXP[7:0], and 23-bit mantissa bits FP32_MAN[22:0]. In addition, the data type converter 4700 may receive 2-bit mode register setting signal MRS[1:0]. The data type converter 4700 may output 16-bit floating-point data DFP16[15:0]. The 16-bit floating-point data DFP16[15:0] that is output from the data type converter 4700 may correspond to one of the first to fourth data types FP16, OF16-1, OF16-2, and BF16 as long as overflow and underfloor do not occur.

In an embodiment, the data type converter 4700 may include an overflow/underfloor checker 4710, an exponent generator 4720, a mantissa generator 4730, and a data output circuit 4740. The overflow/underflow checker 4710 may receive 8-bit exponent bits FP32_EXP[7:0] of the 32-bit floating-point FP32 and the mode register setting signal MRS[1:0], and check whether overflow or underflow occurs. The overflow/underflow checker 4710 may output a 2-bit overflow/underflow signal OUF[1:0]. In an embodiment, when overflow and underflow do not occur, the overflow/underflow checker 4710 may output an overflow/underflow signal OUF[1:0] of '00'. When overflow occurs, the overflow/underflow checker 4710 may output an overflow/underflow signal OUF[1:0] of '01'. When underflow occurs, the overflow/underflow checker 4710 may output an overflow/underflow signal OUF[1:0] of '10'. The overflow/underflow signal OUF[1:0] that is output from the overflow/underflow checker 4710 may be transmitted to the exponent generator 4720 and the mantissa generator 4730.

The exponent generator 4720 may receive 32-bit floating-point (FP32) 8-bit exponent bits FP32_EXP[7:0] and a mode register setting signal MRS[1:0], and output a 16-bit floating-point exponent DFP16_EXP. In an embodiment, when a mode register setting signal MRS[1:0] of '00' is transmitted, the exponent generator 4720 may generate 5-bit exponents of the first data type FP16 to output as a 16-bit floating-point exponent DFP16_EXP. When a mode register setting signal MRS[1:0] of '01' is transmitted, the exponent generator 4720 may generate 6-bit exponents of the second data type OF16-1 to output as a 16-bit floating-point exponent DFP16_EXP. When a mode register setting signal MRS[1:0] of '10' is transmitted, the exponent generator 4720 may generate 7-bit exponents of the third data type OF16-2 to output as a 16-bit floating-point exponent DFP16_EXP. When a mode register setting signal MRS[1:0] of '11' is transmitted, the exponent generator 4720 may output 8-bit exponents FP32_EXP[7:0] of the 32-bit floating-point FP32 as a 16-bit floating-point exponent DFP16_EXR.

The mantissa generator 4730 may receive 23-bit mantissa bits FP32_MAN[22:0] of 32-bit floating-point FP32, and output a 16-bit floating-point mantissa DFP16_MAN. In an embodiment, when a mode register setting signal MRS[1:0] of '00' is transmitted, the mantissa generator 4730 may generate 10-bit mantissa bits of the first data type FP16 to output as a 16-bit floating-point mantissa DFP16_MAN. When a mode register setting signal MRS[1:0] of '01' is transmitted, the mantissa generator 4730 may generate 9-bit mantissa bits of the second data type OF16-1 to output as a 16-bit floating-point mantissa DFP16_MAN. When a mode register setting signal MRS[1:0] of '10' is transmitted, the mantissa generator 4730 may generate 8-bit mantissa bits of the third data type OF16-2 to output as a 16-bit floating-point mantissa DFP16_MAN. When a mode register setting signal MRS[1:0] of '11' is transmitted, the mantissa generator 4730 may generate 7-bit mantissa bits of the fourth data type BF16 to output as a 16-bit floating-point mantissa DFP16_MAN.

The data output circuit 4740 may receive a 32-bit floating-point (FP32) 1-bit sign bit FP32_SIGN[0], the 16-bit floating-point exponent DFP16_EXP that is output from the exponent generator 4720, and the 16-bit floating-point mantissa DFP16_MAN that is output from the mantissa generator 4730. The data output circuit 4740 may combine the received data in an appropriate order and output them as 16-bit floating point data DFP16[15:9]. The 16-bit floating point data DFP16[15:9] that is output from the data output circuit 4740 may have any one of the first to fourth data types FP16, OF16-1, OF16-2, and BF16.

Figure 61:
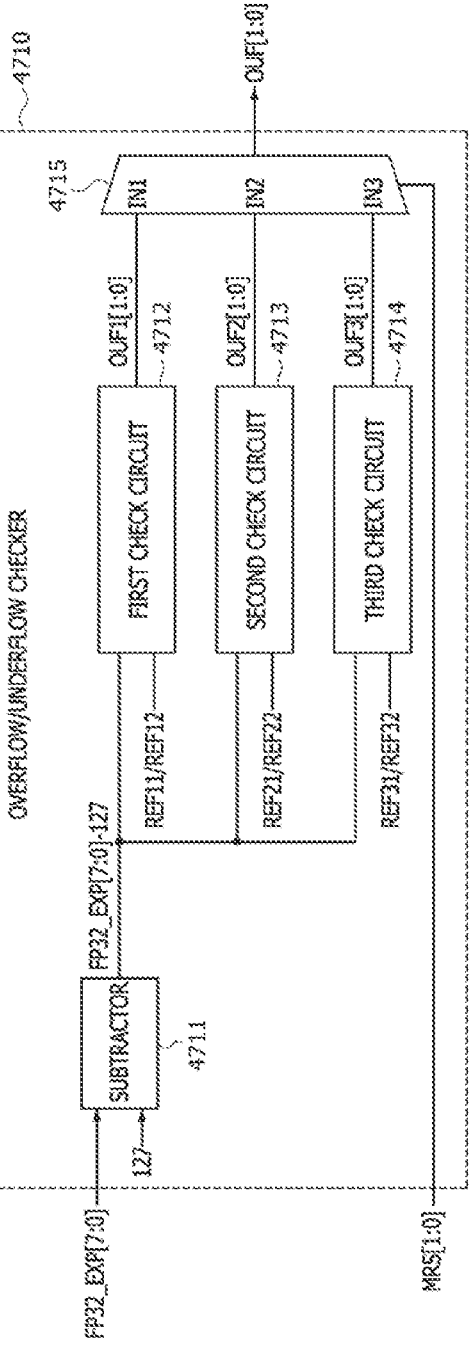
FIG. 61 illustrates an embodiment of an overflow/underflow checker of the data type converter of FIG. 60.
Figure 62:
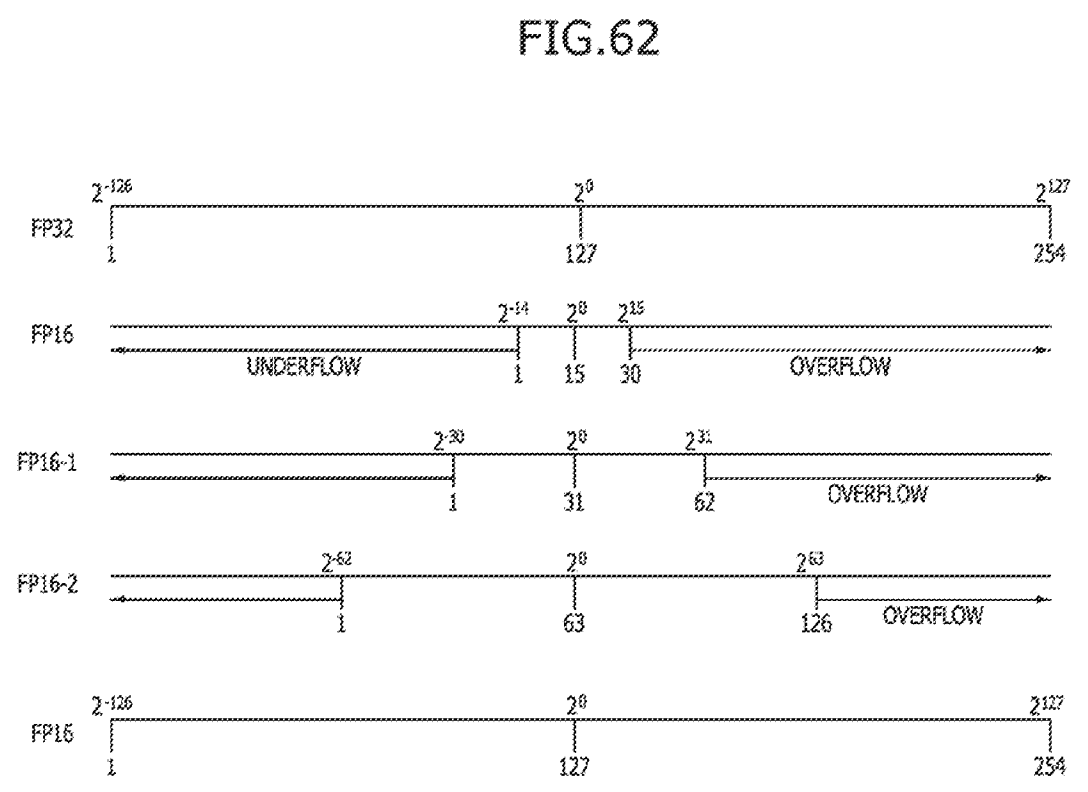

FIG. 61 illustrates an embodiment of the overflow/underflow checker 4710 of the data type converter 4700 of FIG. 60, and FIG. 62 illustrates setting reference values REF11/REF12, REF21/REF22, and REF31/REF32 of the overflow/underfloor checker 4710 of FIG. 61. First, referring to FIG. 61, the overflow/underflow checker 4710 may include a subtractor 4711, a first check circuit 4712, a second check circuit 4713, a third check circuit 4714, and a multiplexer 4715. The subtractor 4711 may receive 32-bit floating-point FP32 8-bit exponent bits FP32_EXP[7:0] and an exponent bias '127'. The overflow/underflow checker 4710 may subtract the exponent bias '127' from the 8-bit exponent bits FP32_EXP[7:0], and output a subtraction result FP32_EXP[7:0]−127.

The first check circuit 4712, the second check circuit 4713, and the third check circuit 4714 may commonly receive the subtraction result FP32_EXP[7:0]−127 that is output from the subtractor 4711. The first check circuit 4712 may receive first reference values REF11 and REF12, and check whether overflow/underflow of the first data type FP16 occurs. The second check circuit 4713 may receive second reference values REF21 and REF22, and check whether overflow/underflow of the second data type OP16-1 occurs. The third check circuit 4714 may receive third reference values REF31 and REF32, and check whether overflow/underfloor of the third data type OP16-2 occurs.

The 32-bit floating-point FP32 exponent bits FP32_EXP[7:0] transmitted from the overflow/underflow checker 4710 may have a size of 8-bits. Accordingly, as shown in FIG. 62, in the 32-bit floating point FP32 format, the number may be represented by an integer value of '−126' to '127', and the exponent bits FP32._EXP[7:0] to which the exponential bias '127' has been added may have an integer value of '1' to '254'.

In the first data type FP16, the exponent consists of 5 bits. Accordingly, in the first data type FP16, the number may be represented by an integer value of '−14' to '15', and the first data type FP16 5-bit exponent to which the exponential bias '15' has been added has an integer value of '1' to '30'. That is, if the subtraction result FP32_EXP[7:0]−127 obtained by subtracting the exponential bias '127' from the 8-bit exponent bits FP32_EXP[7:0] is greater than 015, overflow occurs, and the subtraction result FP32_EXP[7:0]−127 is less than '−14', underflow occurs. Therefore, in the case of the first data type FP16, the first reference values REF11 and REF12 may be set to '15' and '−14', respectively.

In the second data type OF16-1, the exponent consists of 6 bits. Accordingly, in the second data type OF16-1, the number may be represented by an integer value of '−30' to '31', and the second data type OF16-1 6-bit exponent to which the exponential bias '31' has been added has an integer value of '1' to '62'. That is, if the subtraction result FP32_EXP[7:0]−127 obtained by subtracting the exponential bias '127' from the 8-bit exponent bits FP32_EXP[7:0] is greater than '31', overflow occurs, and the subtraction result FP32_EXP[7:0]−127 is less than underflow occurs. Therefore, in the case of the second data type OF16-1, the second reference values REF21 and REF22 may be set to '31' and '−30', respectively.

In the third data type OF16-2, the exponent consists of 7 bits. Accordingly, in the third data type OF16-2, the number may be represented by an integer value of to '−62' to '63', and the third data type OF16-2 exponent to which the exponential bias '63' has been added has an integer value of '1' to '126'. That is, if the subtraction result FP32_EXP[7:0]−127 obtained by subtracting the exponential bias '127' from the 8-bit exponent bits FP32_EXP[7:0] is greater than '63', overflow occurs, and the subtraction result FP32_EXP[7:0]−127 s less than '−62', underflow occurs. Therefore, in the case of the third data type OF16-2, the third reference values REF31 and REF32 may be set to '63' and '−62', respectively.

In the case of the fourth data type BF16, the size of the exponent bits is 8 bits, which is the same as the exponent bits FP32_EXP[7:0] of the 32-bit floating point FP32. Accordingly, the expression range of the number in the fourth data type BF16 is the same as that of the 32-bit floating point FP32. That is, in the case of the fourth data type BF16, neither overflow nor underflow occurs. Therefore, the overflow/underflow checker 4710 might not perform overflow and underflow checks in the fourth data type BF16.

Referring back to FIG. 61, the first check circuit 4712 may compare the subtraction result FP32_EXP[7:0]−127 transmitted from the subtractor 4711 with the first reference values REF11 and REF12. The first check circuit 4712 may output the comparison result as a 2-bit first overflow/underflow signal OUF1[1:0]. As a result of the comparison, when the subtraction result FP32_EXP[7:0]−127 is equal to or less than '15', which is the first reference value REF11, and is equal to or greater than '−14', which is the first reference value REF12, the first the check circuit 4712 may output a first overflow/underflow signal OUF1[1:0] of '00' representing no occurrence of overflow and underflow. As a result of the comparison, when the subtraction result FP32_EXP[7:0]−127 is greater than '15' which is the first reference value REF11, the first check circuit 4712 may output a first overflow/underflow signal OUF1[1:0] of '01' representing occurrence of overflow. As a result of the comparison, when the subtraction result FP32_EXP[7:0]−127 is less than '−14', which is the first reference value REF12, the first check circuit 4712 may output a first overflow/underflow signal OUF1[1:0] of '10' representing occurrence of underflow.

The second check circuit 4713 may compare the subtraction result FP32_EXP[7:0]−127 transmitted from the subtractor 4711 with the second reference values REF21 and REF22. The second check circuit 4713 may output the comparison result as a 2-bit second overflow/underflow signal OUF2[1:0]. As a result of the comparison, when the subtraction result FP32_EXP[7:0]−127 is equal to or less than '31', which is the second reference value REF21, and is equal to or greater than '−30', which is the second reference value REF22, the second the check circuit 4713 may output a second overflow/underflow signal OUF2[1:0] of '00' representing no occurrence of overflow and underflow. As a result of the comparison, when the subtraction result FP32_EXP[7:0]−127 is greater than '31' which is the second reference value REF21, the second check circuit 4713 may output a second overflow/underflow signal OUF2[1:0] of '01' representing occurrence of overflow. As a result of the comparison, when the subtraction result FP32_EXP[7:0]−127 is less than '−30', which is the second reference value REF22, the second check circuit 4713 may output a second overflow/underflow signal OUF2[1:0] of '10' representing occurrence of underflow.

The third check circuit 4714 may compare the subtraction result FP32_EXP[7:0]−127 transmitted from the subtractor 4711 with the third reference values REF31 and REF32. The third check circuit 4714 may output the comparison result as a 2-bit third overflow/underflow signal OUF3[1:0]. As a result of the comparison, when the subtraction result FP32_EXP[7:0]−127 is equal to or less than '63' which is the third reference value REF31, and is equal to or greater than '−62', which is the third reference value REF32, the third the check circuit 4714 may output a third overflow/underflow signal OUF3[1:0] of '00' representing no occurrence of overflow and underflow. As a result of the comparison, when the subtraction result FP32_EXP[7:0]−127 is greater than '63', which is the third reference value REF31, the third check circuit 4714 may output a third overflow/underflow signal OUF3[1:0] of '01' representing occurrence of overflow. As a result of the comparison, when the subtraction result FP32_EXP[7:0]−127 is less than '−62', which is the third reference value REF32, the third check circuit 4714 may output a third overflow/underflow signal OUF3[1:0] of '10' representing occurrence of underflow.

The multiplexer 4715 may receive the first overflow/underflow signal OUF1[1:0] that is output from the first check circuit 4712 through a first input terminal IN1. The multiplexer 4715 may receive the second overflow/underflow signal OUF2[1:0] that is output from the second check circuit 4713 through a second input terminal IN2. The multiplexer 4715 may receive the third overflow/underflow signal OUF3[1:0] that is output from the third check circuit 4714 through a third input terminal IN3. The multiplexer 4715 may receive a mode register setting signal MRS[1:0] through a control terminal. When a register setting signal MRS[1:0] of '00' is transmitted, the multiplexer 4715 may output the first overflow/underflow signal OUF1[1:0]. When a register setting signal MRS[1:0] of '01' is transmitted, the multiplexer 4715 may output the second overflow/underflow signal OUF2[1:0]. When a register setting signal MRS[1:0] of '10' is transmitted, the multiplexer 4715 may output the third overflow/underflow signal OUF3[1:0].

Figure 63:
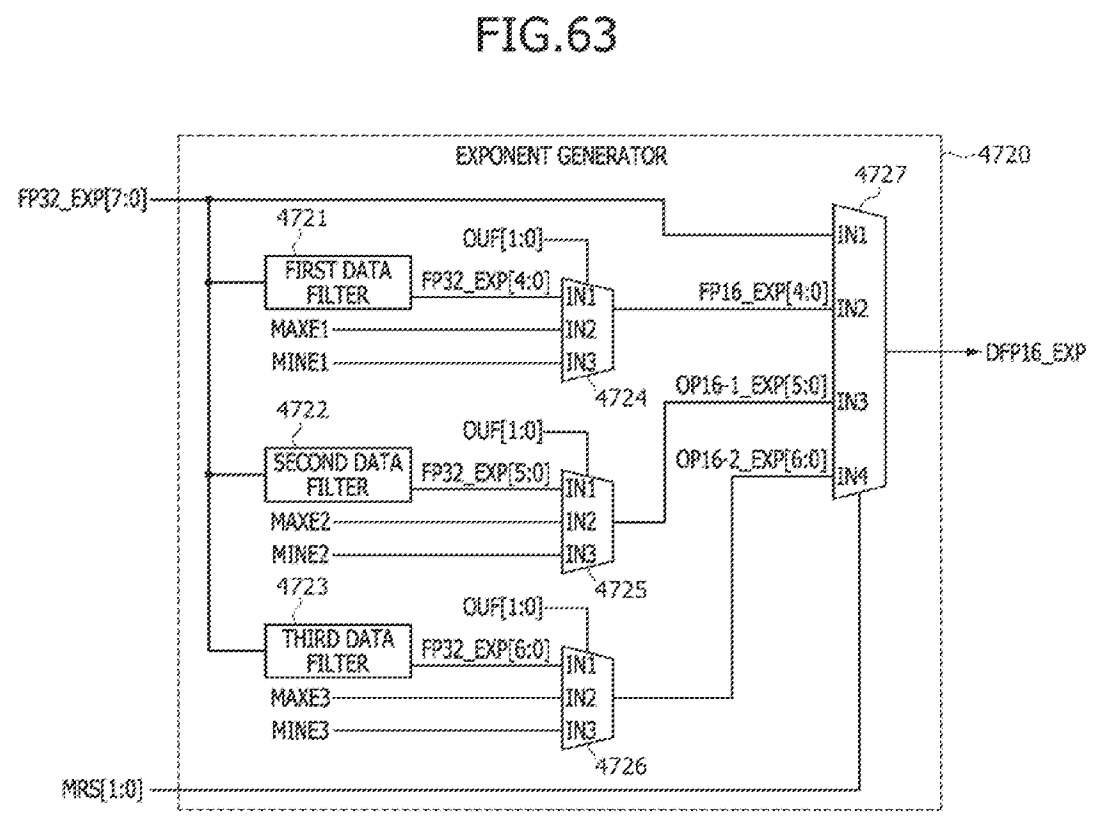

FIG. 63 illustrates an embodiment of the exponent generator 4720 of the data type converter 4700 of FIG. 60. Referring to FIG. 63, the exponent generator 4720 may include first to third data filters 4721, 4722, and 4723, and first to fourth multiplexers 4724, 4725, 4726, and 4727. The first to third data filters 4721, 4722, and 4723 may commonly receive the 32-bit floating-point exponent bits FP32_EXP[7:0]. The first data filter 4721 may output 5-bit exponent bits FP32_EXP[4:0] obtained by removing 3 higher order bits of the exponent bits FP32_EXP[7:0]. The 5-bit exponent bits FP32_EXP[4:0] that are output from the first data filter 4721 may be transmitted to a first input terminal IN1 of the first multiplexer 4724. The second data filter 4722 may output 6-bit exponent bits FP32_EXP[5:0] obtained by removing 2 higher order bits of the exponent bits FP32_EXP[7:0]. The 6-bit exponent bits FP32_EXP[5:0] that are output from the second data filter 4722 may be transmitted to a first input terminal IN1 of the second multiplexer 4725. The third data filter 4723 may output 7-bit exponent bits FP32_EXP[6:0] obtained by removing 2 higher order bits from the exponent bits FP32_EXP[7:0]. The 7-bit exponent bits FP32_EXP[6:0] that are output from the third data filter 4723 may be transmitted to a first input terminal IN1 of the third multiplexer 4726.

The first multiplexer 4724 may receive a first exponent maximum value MAXE1 and a first exponent minimum value MINE1 through a second input terminal IN2 and a third input terminal IN3 respectively. The first multiplexer 4724 may output the 5-bit exponent bits FP32_EXP[4:0] transmitted through the first input terminal IN1 in response to the overflow/underflow signal OUF[1:0] of '00'. The first multiplexer 4724 may output the first exponent maximum value MAXE1 transmitted through the second input terminal IN2 in response to the overflow/underflow signal OUF[1:0]

of '01'. The first multiplexer 4724 may output the first exponent minimum value MINE1 transmitted through the third input terminal IN3 in response to the overflow/underflow signal OUF[1:0] of '10'.

The second multiplexer 4725 may receive a second exponent maximum value MAXE2 and a second exponent minimum value MINE2 through a second input terminal IN2 and a third input terminal IN3, respectively. The second multiplexer 4725 may output the 6-bit exponent bits FP32_EXP[5:0] transmitted through the first input terminal IN1 in response to the overflow/underflow signal OUF[1:0] of '00'. The second multiplexer 4725 may output the second exponent maximum value MAXE2 transmitted through the second input terminal IN2 in response to the overflow/underflow signal OUF[1:0] of '01'. The second multiplexer 4725 may output the second exponent minimum value MINE2 transmitted through the third input terminal IN3 in response to the overflow/underflow signal OUF[1:0] of '10'.

The third multiplexer 4726 may receive a third exponent maximum value MAXE3 and a third exponent minimum value MINE3 through a second input terminal IN2 and a third input terminal IN3, respectively. The third multiplexer 4726 may output the 7-bit exponent bits FP32_EXP[6:0] transmitted through the first input terminal IN1 in response to the overflow/underflow signal OUF[1:0] of '00'. The third multiplexer 4726 may output the third exponent maximum value MAXE3 transmitted through the second input terminal IN2 in response to the overflow/underflow signal OUF[1:0] of '01'. The third multiplexer 4726 may output the third exponent minimum value MINE3 transmitted through the third input terminal IN3 in response to the overflow/underflow signal OUF[1:0] of '10'.

The fourth multiplexer 4727 may receive 32-bit floating-point type FP32 exponent bits FP32_EXP[7:0] through a first input terminal IN1. The fourth multiplexer 4727 may receive first data type FP16 exponent bits FP32_EXP[4:0] that are output from the first multiplexer 4724 through a second input terminal IN2. The fourth multiplexer 4727 may receive second data type OF16-1 exponent bits FP32_EXP [5:0] transmitted from the second multiplexer 4725 through a third input terminal IN3. The fourth multiplexer 4727 may receive third data type OF16-2 exponent bits FP32_EXP[6:0] transmitted from the third multiplexer 4726 through a fourth input terminal IN4. The fourth multiplexer 4727 may receive a mode register setting signal MRS[1:0] through a control terminal.

If a mode register setting signal MRS[1:0] of '11' is transmitted, the fourth multiplexer 4727 may output 32-bit floating-point format exponent bits FP32_EXP[7:0], that is, fourth data type exponent bits BF16_EXP[7:0] as a 16-bit floating-point format exponent DFP16_EXP. If a mode register setting signal MRS[1:0] of '00' is transmitted, the fourth multiplexer 4727 may output first data type FP16 exponent bits FP16_EXP[4:0] inputted through the second input terminal IN2 as a 16-bit floating-point format exponent DFP16_EXP. If a mode register setting signal MRS[1:0] of '01' is transmitted, the fourth multiplexer 4727 may output second data type OF16-1 exponent bits OF16-1_EXP[5:0] inputted through the third input terminal IN3 as a 16-bit floating-point format exponent DFP16_EXP. In addition, if a mode register setting signal MRS[1:0] of '10' is transmitted, the fourth multiplexer 4727 may output third data type OF16-2 exponent bits OF16-2_EXP[6:0] inputted through the fourth input terminal IN4 as a 16-bit floating-point format exponent DFP16_EXP.

Figure 64:
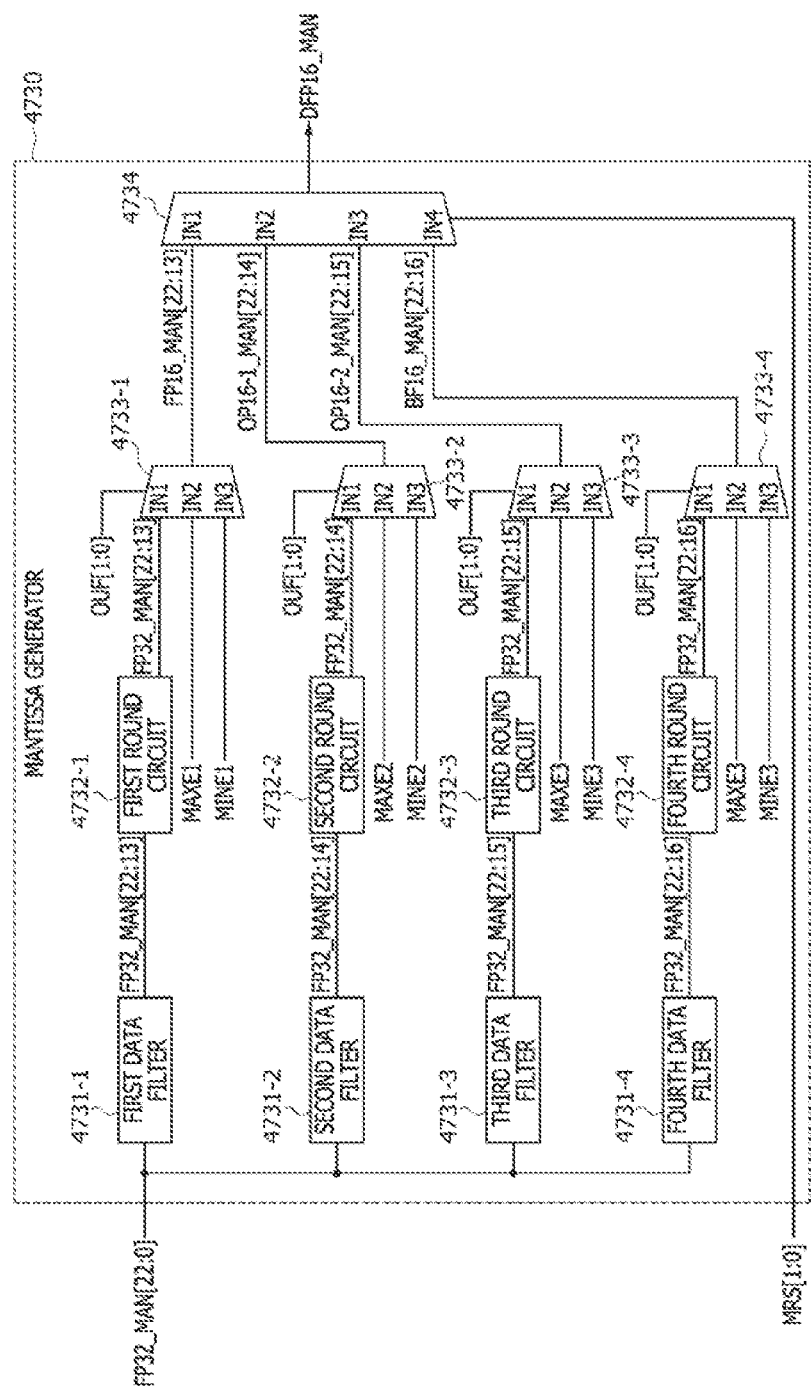
FIG. 64 illustrates an embodiment of a mantissa generator of the data type converter of FIG. 60.

FIG. 64 illustrates an embodiment of the mantissa generator 4730 of the data type converter 4700 of FIG. 60.

Referring to FIG. 64, the mantissa generator 4730 may include first to fourth data filters 4731-1, 4731-2, 4731-3, and 4731-4, first to fourth round circuits 4732-1, 4732-2, 4732-3, and 4732-4, first to fourth multiplexers 4733-1, 4733-2, 4733-3, first to fourth 3:1 multiplexers 4733-1, 4733-2, 4733-3, and 4733-4, and 4733-4, and a 4:1 multiplexer 4734.

The first to fourth data filters 4731-1, 4731-2, 4731-3, and 4731-4 may commonly receive 32-bit floating-point format FP32 mantissa bits FP32_MAN[22:0]. The first data filter 4731-1 may output 10-bit mantissa bits FP32_MAN[22:13] obtained by removing 13 lower order bits of the 32-bit floating-point format FP32 mantissa bits FP32_MAN[22:0]. The 10-bit mantissa bits FP32_MAN[22:13] that are output from the first filter 4713-1 may be transmitted to the first round circuit 4732-1. The second data filter 4731-2 may output 9-bit mantissa bits FP32_MAN[22:14] obtained by removing 14 lower order bits of the 32-bit floating-point format FP32 mantissa bits FP32_MAN[22:0]. The 9-bit mantissa bits FP32_MAN[22:14] that are output from the second filter 4713-2 may be transmitted to the second round circuit 4732-2.

The third data filter 4731-3 may output 8-bit mantissa bits FP32_MAN[22:15] obtained by removing 15 lower order bits of the 32-bit floating-point format FP32 mantissa bits FP32_MAN[22:0]. The 8-bit mantissa bits FP32_MAN[22:15] that are output from the third filter 4713-3 may be transmitted to the third round circuit 4732-3. The fourth data filter 4731-4 may output 7-bit mantissa bits FP32_MAN[22:16] obtained by removing 16 lower order bits of the 32-bit floating-point format FP32 mantissa bits FP32_MAN[22:0]. The 7-bit mantissa bits FP32_MAN[22:16] that are output from the fourth filter 4713-4 may be transmitted to the fourth round circuit 4732-4. Although not shown in FIG. 64, a round bit and a sticky bit may be transmitted from each of the first to fourth data filters 4731-1, 4731-2, 4731-3, and 4731-4 to each of the round circuits 4732-1, 4732-2, 4732-3, and 4732-4. As the round bit and the sticky bit, the most significant bit and the next higher bit may be selected among bits removed from the 32-bit floating-point FP32 mantissa bits FP32_MAN[22:0], respectively.

The first round circuit 4732-1 may perform a rounding process on the 10-bit mantissa bits FP32_MAN[22:13] transmitted from the first data filter 4731-1 and output a result. The second round circuit 4732-2 may perform a rounding process on the 9-bit mantissa bits FP32_MAN[22:14] transmitted from the second data filter 4731-2 and output a result. The third round circuit 4732-3 may perform a rounding process on the 8-bit mantissa bits FP32_MAN[22:15] transmitted from the third data filter 4731-3 and output a result. The fourth round circuit 4732-4 may perform a rounding process on the 7-bit mantissa bits FP32_MAN[22:16] transmitted from the fourth data filter 4731-4 and output a result. Each of the first to fourth round circuits 4732-1, 4732-2, 4732-3, and 4732-4 may perform a '+1' operation in the event that a roundup occurs in the rounding process.

The first 3:1 multiplexer 4733-1 may receive a first maximum mantissa value MAXM1 and a first mantissa minimum value MINM1 through a second input terminal IN2 and a third input terminal IN3, respectively. The first maximum value MAXM1 and the first minimum value MINM1 may be set to a maximum value and a minimum value that can be represented by the first data type FP16 10-bit mantissas, respectively. The first 3:1 multiplexer 4733-1 may output the 10-bit mantissa bits FP32_MAN[22:13] inputted through a first input terminal IN1 as first data type FP16 10-bit mantissa bits FP16_MAN[22:13] in response to an overflow/underfloor signal OUF[1:0] of '00'. The first 3:1 multiplexer 4733-1 may output the first maximum mantissa value MAXM1 inputted through the second input terminal IN2 as the first data type FP16 10-bit mantissa bits FP16_MAN[22:13] in response to an overflow/underfloor signal OUF[1:0] of '01'. The first 3:1 multiplexer 4733-1 may output the first mantissa minimum value MINM1 inputted through the third input terminal IN3 as the first data type FP16 10-bit mantissa bits FP16_MAN[22:13] in response to an overflow/underflow signal OUF[1:0] of '10'.

The second 3:1 multiplexer 4733-2 may receive a second maximum mantissa value MAXM2 and a second mantissa minimum value MINM2 through a second input terminal IN2 and a third input terminal IN3, respectively. The second maximum value MAXM2 and the second minimum value MINM2 may be set to a maximum value and a minimum value that can be represented by the second data type OF16-1 9-bit mantissas, respectively. The second 3:1 multiplexer 4733-2 may output the 9-bit mantissa bits FP32_MAN[22:14] inputted through a first input terminal IN1 as second data type OF16-1 9-bit mantissa bits OF16-1_MAN[22:14] in response to an overflow/underfloor signal OUF[1:0] of '00'. The second 3:1 multiplexer 4733-2 may output the second maximum mantissa value MAXM2 inputted through the second input terminal IN2 as the second data type OF16-1 9-bit mantissa bits FP16_MAN[22:14] in response to an overflow/underfloor signal OUF[1:0] of '01'. The second 3:1 multiplexer 4733-2 may output the second mantissa minimum value MINM2 inputted through the third input terminal IN3 as the second data type OFP16-1 9-bit mantissa bits OF16-1_MAN[22:14] in response to an overflow/underflow signal OUF[1:0] of '10'.

The third 3:1 multiplexer 4733-3 may receive a third maximum mantissa value MAXM3 and a third mantissa minimum value MINM3 through a second input terminal IN2 and a third input terminal IN3, respectively. The third maximum value MAXM3 and the third minimum value MINM3 may be set to a maximum value and a minimum value that can be represented by the third data type OF16-2 8-bit mantissas, respectively. The third 3:1 multiplexer 4733-3 may output the 8-bit mantissa bits FP32_MAN[22:15] inputted through a first input terminal IN1 as third data type OF16-2 8-bit mantissa bits OF16-2_MAN[22:14] in response to an overflow/underfloor signal OUF[1:0] of '00'. The third 3:1 multiplexer 4733-3 may output the third maximum mantissa value MAXM3 inputted through the second input terminal IN2 as the third data type OF16-2 8-bit mantissa bits FP16_MAN[22:15] in response to an overflow/underflow signal OUF[1:0] of '01'. The third 3:1 multiplexer 4733-3 may output the third mantissa minimum value MINM3 inputted through the third input terminal IN3 as the third data type OFP16-2 8-bit mantissa bits OF16-2_MAN[22:15] in response to an overflow/underflow signal OUF[1:0] of '10'.

The fourth 3:1 multiplexer 4733-4 may receive a fourth maximum mantissa value MAXM4 and a fourth mantissa minimum value MINM4 through a second input terminal IN2 and a third input terminal IN3, respectively. The fourth maximum value MAXM4 and the fourth minimum value MINM4 may be set to a maximum value and a minimum value that can be represented by the fourth data type BF16 7-bit mantissas, respectively. The fourth 3:1 multiplexer 4733-4 may output the 7-bit mantissa bits FP32_MAN[22:16] inputted through a first input terminal IN1 as fourth data type BF16 7-bit mantissa bits BF16_MAN[22:16] in response to an overflow/underflow signal OUF[1:0] of '00'.

The fourth 3:1 multiplexer 4733-4 may output the fourth maximum mantissa value MAXM4 inputted through the second input terminal IN2 as the fourth data type BF16 7-bit mantissa bits BF16_MAN[22:16] in response to an overflow/underflow signal OUF[1:0] of '01'. The fourth 3:1 multiplexer 4733-4 may output the fourth mantissa minimum value MINM4 inputted through the third input terminal IN3 as the fourth data type BF16 7-bit mantissa bits BF16_MAN[22:16] in response to an overflow/underflow signal OUF[1:0] of '10'.

The fourth multiplexer 4734 lay receive first data type FP16 10-bit mantissa bits FP16_MAN[22:13] that are output from the first 3:1 multiplexer 4733-1 through a first input terminal IN1. The fourth multiplexer 4734 may receive second type OF16-1 9-bit mantissa bits OF16-1_MAN[22: 14] that are output from the second 3:1 multiplexer 4733-2 through a second input terminal IN2. The fourth multiplexer 4734 may receive third type OF16-2 8-bit mantissa bits OF16-2_MAN[22:15] that are output from the third 3:1 multiplexer 4733-3 through a third input terminal IN3. The fourth multiplexer 4734 may receive fourth type BF16 7-bit mantissa bits BF16_MAN[22:16] that are output from the fourth 3:1 multiplexer 4733-4 through a fourth input terminal IN4.

If a mode register setting signal MRS[1:0] of '00' is transmitted, the fourth multiplexer 4734 may output first data type FP16 10-bit mantissa bits FP16_MAN[22:13] inputted through the first input terminal IN1 as a 16-bit floating-point format FP16 exponent DFP16_EXP. If a mode register setting signal MRS[1:0] of '01' is transmitted, the fourth multiplexer 4734 may output second data type OF16-1 9-bit mantissa bits OF16-1_MAN[22:14] inputted through the second input terminal IN2 as a 16-bit floating-point format FP16 exponent DFP16_EXP. If a mode register setting signal MRS[1:0] of '10' is transmitted, the fourth multiplexer 4734 may output third data type OF16-2 8-bit mantissa bits OF16-2_MAN[22:15] inputted through the third input terminal IN3 as a 16-bit floating-point format FP16 exponent DFP16_EXP. In addition, if a mode register setting signal MRS[1:0] of '11' is transmitted, the fourth multiplexer 4734 may output fourth data type BF16 7-bit mantissa bits BF16_MAN[22:16] inputted through the fourth input terminal IN4 as a 16-bit floating-point format FP16 exponent DFP16_EXP.

Figure 65:
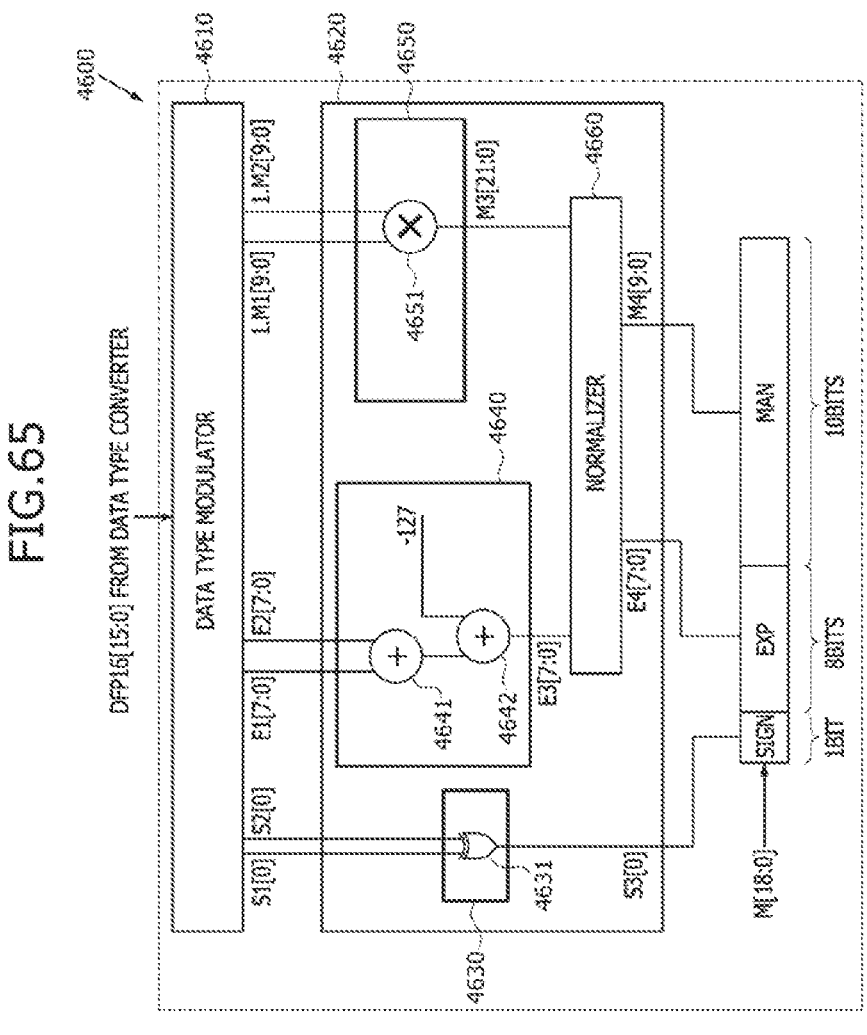
FIG. 65 illustrates an embodiment of a data type modulator and a multiplier in a neural network system according to various embodiments of the present disclosure.

FIG. 65 illustrates an embodiment of a MAC operator 4600 in a neural network circuits 4000A and 4000B according to various embodiments of the present disclosure. Although not shown in FIG. 65, the MAC operator 4600 may further include an adder tree and an accumulator. The adder tree and accumulator of the MAC operator 4600 may operate in the same manner as the adder tree 1300 and accumulator 1400 of the MAC operator 1000 described with reference to FIG. 31 except that the adder tree and accumulator of the MAC operator 4600 perform floating point operations.

Referring to FIG. 65, the MAC operator 4600 may include a data type modulator 4610 and a floating-point multiplier 4620. The data type modulator 4610 may receive 16-bit floating-point data DFP16[15:0] configured in any one of the first to fourth data types FP16, OF16-1, OF16-2, and BF16 from the data type converter 4700. The data format modulator 4610 may modulate the 16-bit floating-point data DFP16[15:0] and transmit the floating-point data whose number of bits is modulated to the multiplier 4620 so that the multiplication in the multiplier 4620 may be performed for all data types FP16, OF16-1, OF16-2, and BF16.

The number of modulated bits of the floating-point format generated by the data type modulator 4610 may be a number of bits obtained by adding all of the maximum number of bits of the exponent, the maximum number of bits of the mantissa bits, the number of sign bits, and the number of implicit bit among the first to fourth data types FP16, OF16-1, OF16-2, and BF16. In the present embodiment, among the first to fourth data types FP16, OF16-1, OF16-2, and BF16, the maximum number of bits of the exponent is 8 bits, the maximum number of mantissa bits is 10 bits, and the number of sign bits and implicit bit are 1 bit each, the floating-point format generated by the data type modulator 4610 consists of 20 bits. Accordingly, the data type modulator 4610 may transmit first data consisting of a 1-bit exponent bit S1[0], 8-bit exponent bits E1[7:0], 11-bit mantissa bits 1.M1[9:0](including 1-bit implicit bit), and second data consisting of a 1-bit exponent bit S2[0], 8-bit exponent bits E2[7:0], 11-bit mantissa bits 1.M2[9:0](including 1-bit implicit bit) to the multiplier 4620. The data type modulator 4610 will be described in more detail below.

The multiplier 4620 may include a sign processing circuit 4630, an exponent processing circuit 4640, a mantissa processing circuit 4650, and a normalizer 4660. The sign processing circuit 4630 may include an XOR gate 4631. The XOR gate 4631 may perform an XOR operation on the sign bit S1[0] of the first data and the sign bit S2[0] of the second data to output 1-bit signal bit S3[0]. The 1-bit signal bit S3[0] that is output from the XOR gate 4631 may constitute a sign SIGN of a 19-bit floating-point format multiplication data M[18:0] without an implicit bit.

The exponent processing circuit 4640 may include a first exponent adder 4641 and a second exponent adder 4642. The first exponent adder 4641 may perform an addition operation on the exponent bits E1[7:0] of the first data and the exponent bits E2[7:0] of the second data to output result data. The second exponent adder 4642 may perform an addition operation on the result data and '−127' in order to subtract an exponent bias value, for example, '127' from the result data that is output from the first exponent adder 4641 to output 8-bit exponent bits E3[7:0]. The 8-bit exponent bits E3[7:0] that are output from the second exponent adder 4642 may be transmitted to the normalizer 4660.

The mantissa processing circuit 4650 may include a mantissa multiplier 4651. In this embodiment, the mantissa multiplier 4651 may be configured to perform a multiplication operation on the sum of the maximum number of bits of the mantissa bits and the number of implicit bit among the first to fourth data types FP16, OF16-1, OF16-2, and BF16, that is, 11-bit data in the case of this embodiment. The mantissa multiplier 4651 may perform a multiplication operation on the mantissa bits 1.M1[9:0] with the implicit bit of the first data and the mantissa bits 1.M2[7:0] with the implicit bit of the second data. The mantissa multiplier 4651 may output 22-bit mantissa bits M3[21:0] as multiplication result data. The 22-bit mantissa bits M3[21:0] that are output from the mantissa multiplier 4651 may be transmitted to the normalizer 4660.

The normalizer 4660 may receive 8-bit exponent bits E3[7:0] from the second exponent 4642 of the exponent processing circuit 4640, and receive 22-bit mantissa bits M3[21:0] from the mantissa multiplier 4651 of the mantissa processing circuit 4650. If the MSB of the 22-bit mantissa bits M3[21:0] is '1' the normalizer 4660 may output data that is obtained by shifting a binary binary point in the 22-bit mantissa bits M3[21:0] toward the MSB by 1 bit. In addition, the normalizer 4660 may adjust the number of bits to output 10-bit mantissa bits M4[9:0] obtained by removing the implicit bit. If the MSB of the 22-bit mantissa bits M3[21:0] is '0', the normalizer 4660 may adjust the number of bits while maintaining the binary point in the 22-bit mantissa bits M3[21:0] to output 10-bit mantissa bits M4[9:0] obtained by removing the implicit bit. The normalizer 4660 may perform a rounding process in the process of adjusting the number of bits.

If an MSB of the 22-bit mantissa bits M3[21:0] is '1', the normalizer 4660 may perform an operation of adding the MSB of the 22-bit mantissa bits M3[21:0] to 8-bit exponent bits E3[7:0] transmitted from the second exponent adder 4462, that is, a '+1' operation. The normalizer 4660 may output the data that is obtained by performing the '+1' operation as 8-bit exponential bits E4[7:0]. If the MSB of the 22-bit mantissa bits M3[21:0] is '0', the normalizer 4660 may output the 8-bit exponent bits E3[7:0] transmitted from the second exponent adder 4462 as 8-bit exponent bits E4[7:0]. The 1-bit sign bit S3[0] that is output from the XOR gate 4631, an 8-bit exponent bit E4[7:0] and the 10-bit mantissa bits M4[9:0] that are output from the normalizer 4660 may constitute the 19-bit multiplication data M[18:0] that is output from the multiplier 4620. The 19-bit multiplication data M[18:0] may be transmitted to the adder tree.

Figure 66:
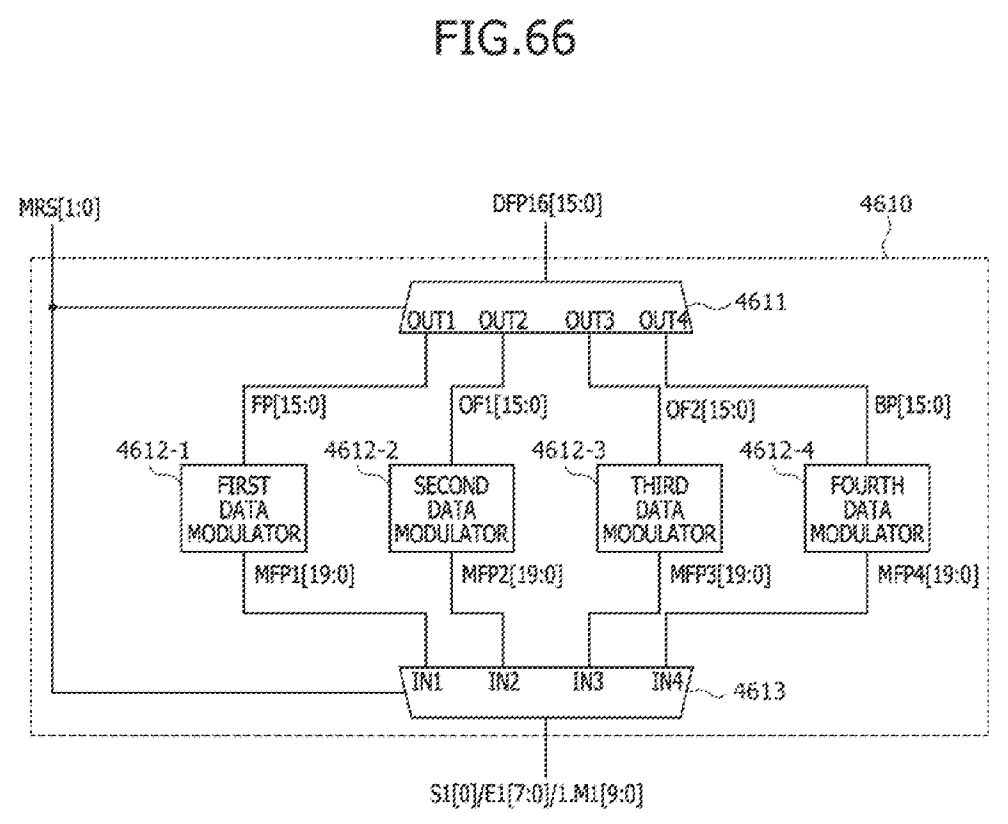

FIG. 66 illustrates an embodiment of the data type modulator 4610 of FIG. 65, and FIGS. 67 to 70 illustrate a data type modulation process in each of the first to fourth data modulators 4612-1, 4612-2, 4612-3, and 4612-4 of the data type modulator 4610 of FIG. 66. Referring to FIG. 66, the data type modulator 4610 may include a 1:4 demultiplexer 4611, and first to fourth data modulators 4612-1, 4612-2, 4612-3, and 4612-4. The 1:4 demultiplexer 4611 may receive 16-bit floating-point data DFP16[15:0] configured in any one of the first to fourth data formats FP16, OF16-1, OF16-2, and BF16 from the data type converter 4700. The 1:4 demultiplexer 4611 may output 16-bit floating-point data DFP16[15:0] to one of first to fourth output terminals OUT1, OUT2, OUT3, and OUT4 according to a mode register setting signal MRS[1:0] transmitted through a control terminal.

If a mode register setting signal MRS[1:0] of '00' is transmitted, that is, the 16-bit floating-point data DFP16[15:0] is first type FP16 data, the 1:4 demultiplexer 4611 may transmit 16-bit first floating-point data FP[15:0] to the first data modulator 4612-1 through the first output terminal OUT1. If a mode register setting signal MRS[1:0] of '01' is transmitted, that is, the 16-bit floating-point data DFP16[15:0] is second type OF16-1 data, the 1:4 demultiplexer 4611 may transmit 16-bit second floating-point data OF1[15:0] to the second data modulator 4612-2 through the second output terminal OUT2. If a mode register setting signal MRS[1:0] of '10' is transmitted, that is, the 16-bit floating-point data DFP16[15:0] is third type OF16-2 data, the 1:4 demultiplexer 4611 may transmit 16-bit third floating-point data OF2[15:0] to the third data modulator 4612-3 through the third output terminal OUT3. In addition, if a mode register setting signal MRS[1:0] of '11' is transmitted, that is, the 16-bit floating-point data DFP16[15:0] is fourth type BF16 data, the 1:4 demultiplexer 4611 may transmit 16-bit fourth floating-point data BF[15:0] to the fourth data modulator 4612-4 through the fourth output terminal OUT4.

The first data modulator 4612-1 may perform a modulation operation on the first data type FP16 16-bit floating-point data FP[15:0] transmitted from the 1:4 demultiplexer 4611 to output 20-bit first modulated floating-point data MFP1[19:0]. The 20-bit first modulated floating-point data MFP1[19:0] may be composed of a 1-bit sign bit S1[0], 8-bit exponent bits E1[7:0], and mantissa bits 1.M1[9:0] with 11-bit explicit bits.

Figure 67:
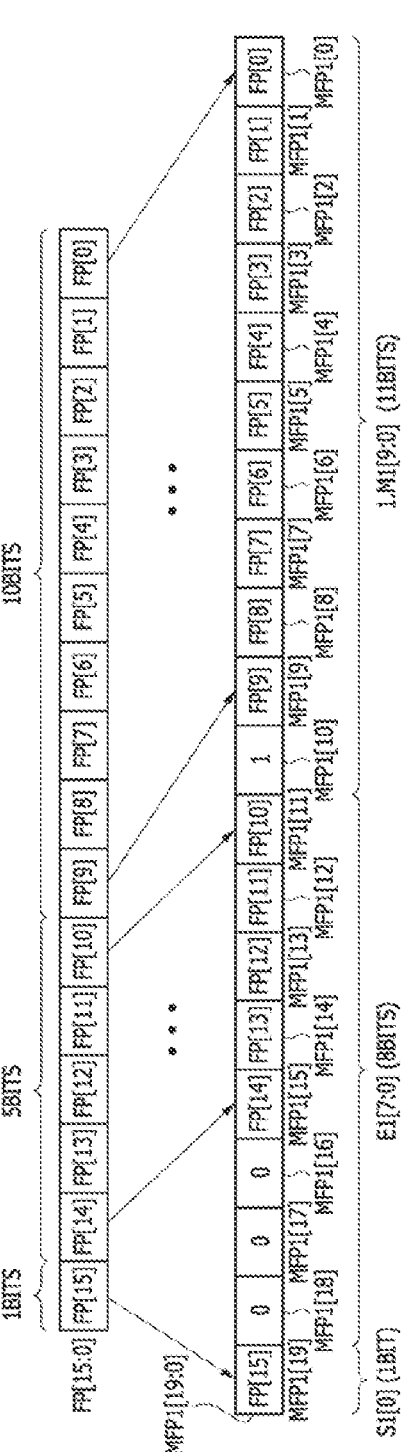
FIGS. 67 to 70 illustrate a data type modulating process in each of first to fourth data modulators of the data type modulator of FIG. 66.
Figure 68:
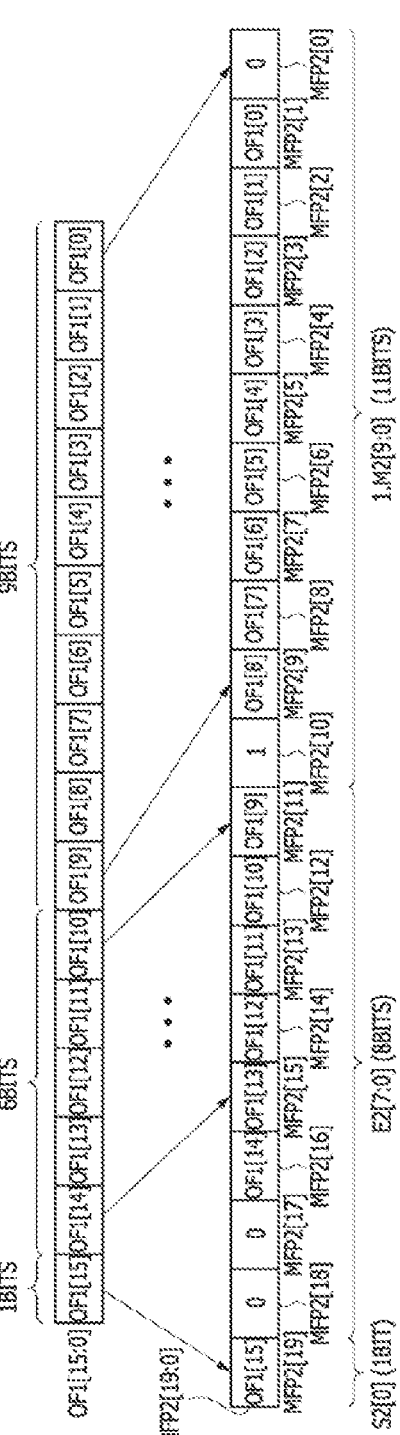

By the modulation operation by the first data modulator 4612-1, as shown in FIG. 67, an MSB MFP[19] of the 20-bit first modulated floating-point data MFP1[19:0], that is, the sign bit S1[0] may be composed of the MSB FP[15] which is the sign bit of the first data type FP16 16-bit floating point data FP[15:0]. The lower five bits MFP1[15:11] of the exponent bit E1[7:0] of the 20-bit first modulated floating-point data MFP1[19:0] may be composed of 5-bit exponential bits FP[14:10] in first data format FP16 16-bit floating-point data FP[15:0]. In the exponent bit E1[7:0] of the 20-bit first modulated floating point data MFP1[19:0], the remaining upper 3 bits MFP1[18:16] may all be filled with '0'. An uppermost mantissa bit MFP1[10] of the 20-bit first modulated floating point data MFP1[19:0] may be composed of an implicit bit '1' In the 20-bit first modulated floating point data MFP1[19:0], the remaining 10 bits MFP1[9:0] may be composed of 10-bit mantissa bits FP[9:0] constituting a mantissa in the first data type FP16 16-bit floating-point data FP[15:0].

The second data modulator 4612-2 may perform a modulation operation on the second data type OF16-1 16-bit floating-point data OF1[15:0] transmitted from the 1:4 multiplexer 4611 to output 20-bit second modulated floating-point data MFP2[19:0]. The second modulated floating-point data MFP2[19:0] may be composed of a 1-bit sign bit S2[0], 8-bit exponent bits E2[7:0], and 11-bit mantissa bits 1.M2[9:0](including 1-bit implicit bit).

By the modulation operation by the second data modulator 4612-2, as shown in FIG. 63, an MSB MFP2[19] of the 20-bit second modulated floating-point data MFP2[19:0], that is, the sign bit S2[0] may be composed of an MSB OF1[15], which is a sign bit of the second data type OF16-1 16-bit floating-point data OF1[15:0]. Next, in the exponent bits E2[7:0] of the 20-bit second modulated floating-point data MFP2[19:0], the lower 6 bits MFP2[16:11] may be composed of 6-bit exponent bits OF1[14:9] in second data type OF16-1 16-bit floating-point data OF1[15:0]. In the exponent bits E2[7:0] of the 20-bit second modulated floating-point data MFP2[19:0], the remaining upper 2 bits MFP2[18:17] may all be filled with '0'. An uppermost mantissa bit MFP2[10] of the 20-bit second modulated floating-point data MFP2[19:0] may be composed of an implicit bit '1'. In the mantissa bits MFP2[10:0] of the 20-bit second modulated floating-point data MFP2[19:0], the remaining 9 bits MFP2[9:1] may be composed of 9-bit mantissa bits OF1[8:0] constituting a mantissa in the second data type OF16-1 16-bit floating-point data OF1[15:0]. An LSB MFP2[0] in the mantissa bit MFP2[10:0] of the 20-bit second modulated floating-point data MFP2[19:0] may be filled with '0'.

The third data modulator 4612-3 may perform a modulation operation on the third data type OF16-2 16-bit floating-point data OF2[15:0] transmitted from the 1:4 multiplexer 4611 to output 20-bit third modulated floating-point data MFP3[19:0]. The third modulated floating-point data MFP3[19:0] may be composed of a 1-bit sign bit S3[0], 8-bit exponent bits E3[7:0], and 11-bit mantissa bits 1.M3[9:0] (including 1-bit implicit bit).

Figure 69:
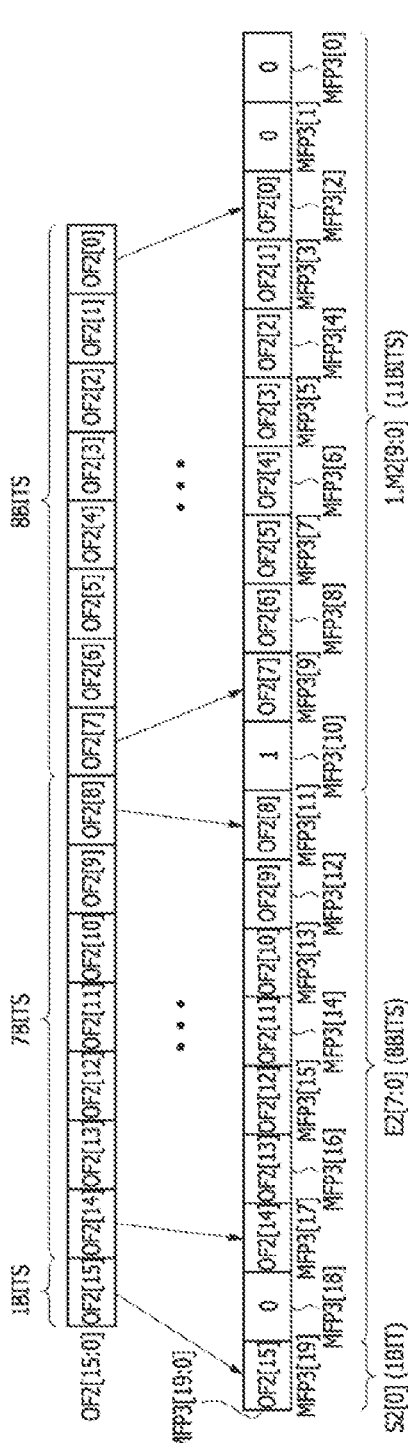

By the modulation operation by the third data modulator 4612-3, as shown in FIG. 69, an MSB MFP3[19] of the 20-bit third modulated floating-point data MFP3[19:0], that is, the sign bit S3[0] may be composed of an MSB OF2[15], which is a sign bit of the third data type OF16-2 16-bit floating-point data OF2[15:0]. Next, in the exponent bits E3[7:0] of the 20-bit third modulated floating-point data MFP3[19:0], the lower 7 bits MFP3[17:11] may be composed of 7-bit exponent bits OF2[14:8] in third data type OF16-2 16-bit floating-point data OF2[15:0]. In the exponent bits E3[7:0] of the 20-bit third modulated floating-point data MFP3[19:0], the remaining upper 1 bit MFP3[18] may be filled with '0'. An uppermost mantissa bit MFP3[10] of the 20-bit third modulated floating-point data MFP3[19:0] may be composed of an implicit bit '1'. In the mantissa bits MFP3[10:0] of the 20-bit third modulated floating-point data MFP3[19:0], the remaining 8 bits MFP3[9:2] may be composed of 8-bit mantissa bits OF2[7:0] constituting a mantissa in the third data type OF16-2 16-bit floating-point data OF2[15:0]. The lowermost 2 bits in the mantissa bits MFP3[10:0] of the 20-bit third modulated floating-point data MFP3[19:0] may all be filled with '0'.

The fourth data modulator 4612-4 may perform a modulation operation on the fourth data type BF16 16-bit floating-point data BF[15:0] transmitted from the 1:4 multiplexer 4611 to output 20-bit fourth modulated floating-point data MFP4[19:0]. The fourth modulated floating-point data MFP4[19:0] may be composed of a 1-bit sign bit S4[0], 8-bit exponent bits E4[7:0], and 11-bit mantissa bits 1.M4[9:0] (including 1-bit implicit bit).

Figure 70:
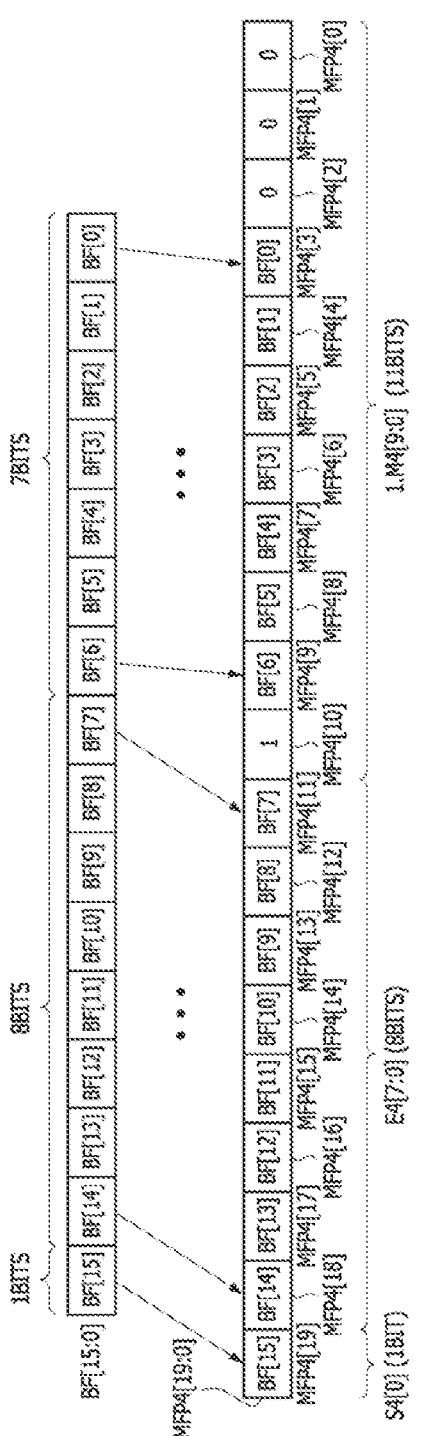

By the modulation operation by the fourth data modulator 4612-4, as shown in FIG. 70, an MSB MFP4[19] of the 20-bit fourth modulated floating-point data MFP4[19:0], that is, the sign bit S4[0] may be composed of an MSB BF[15], which is a sign bit of the fourth data type BF16 16-bit floating-point data BF[15:0]. Next, all bits MFP4[18:11] of the exponent bits E4[7:0] of the 20-bit fourth modulated floating-point data MFP4[19:0] may be composed of 8-bit exponent bits BF[14:7] in the fourth data type BF16 16-bit floating-point data BF[15:0]. An uppermost mantissa bit MFP4[10] of the 20-bit fourth modulated floating-point data MFP4[19:0] may be composed of an implicit bit '1'. In the mantissa bits MFP4[10:0] of the 20-bit fourth modulated floating-point data MFP4[19:0], the 7 bits MFP4[9:3] may be composed of 8-bit mantissa bits BF[6:0] constituting a mantissa in the fourth data type BF16 16-bit floating-point data BF[15:0]. The lowermost 3 bits in the mantissa bits MFP4[10:0] of the 20-bit fourth modulated floating-point data MFP4[19:0] may all be filled with '0'.

Figure 71:
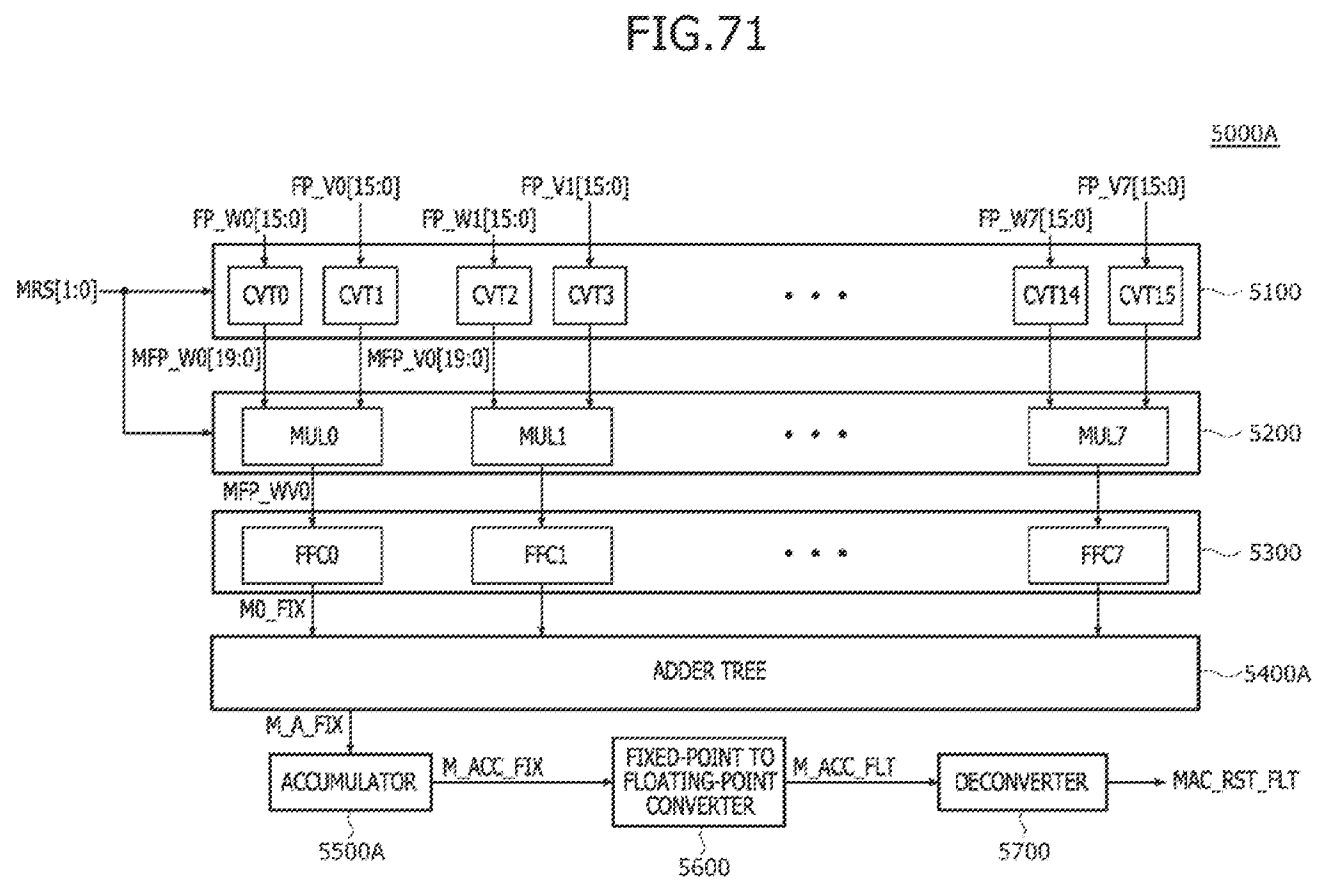

FIG. 71 illustrates a MAC operator 5000A according to another embodiment of the present disclosure. The MAC operator 5000A according to the present embodiment may be applied to the PIM devices 10, 100, and 400 described with reference to FIGS. 1, 2, and 20. Referring to FIG. 71, the MAC operator 5000A according to the present embodiment may include a data type converting circuit 5100 with a plurality of data type converters, for example, first to sixth data type converters CVT0-CVT15, a multiplying circuit 5200 with plurality of multipliers, for example, first to eighth multipliers MUL0-MUL7, a floating-point-to-fixed-point converting circuit 5300 with a plurality of floating-point-to-fixed-point converters, for example, first to eighth floating-point-to-fixed-point converters FFC0-FFC7, an adder tree 5400A, an accumulator 5500A, a fixed-point-to-floating-point converter 5600, and a data type de-converter 5700.

The floating-point-to-fixed-point converting circuit 5300 of the MAC operator 5000A according to the present embodiment may be substantially the same as the floating-point-to-fixed-point converting circuit 1200 of the MAC operator 1000 described with reference to FIG. 31. The adder tree 5400A and the accumulator 5500A of the MAC operator 5000A according to the present embodiment may be substantially the same as the adder tree 1300 and the accumulator 1400 of the MAC operator 1000 described with reference to FIG. 31. The fixed-point-to-floating-point converter 5600 of the MAC operator 5000A according to the present embodiment may be substantially the same as the floating-point-to-fixed-point converter 3500 described with reference to FIG. 55. Hereinafter, descriptions of contents overlapping with those already described will be omitted.

A pair of adjacent data format converters among the first to sixteenth data format converters CVT0-CVT15 may each receive floating-point format first to eighth weight data FP_W0[15:0]-FP_W7[15:0] and floating-point format first to eighth vector data FP_V0[15:0]-FP_V7[15:0]. For example, the first data type converter CVT0 and the second data type converter CVT1 may receive the floating-point format first weight data FP_W0[15:0] and the floating-point format first vector data FP_V0[15:0], respectively. The third data type converter CVT2 and the fourth data type converter CVT3 may receive the floating-point format second weight data FP_W1[15:0] and the floating-point format second vector data FP_V1[15:0], respectively. Each of the pairs of the remaining data type converters may also receive weight data and vector data in the same manner.

In the present embodiment, each of the first to eighth weight data FP_W0[15:0]-FP_W7[15:0] and each of the first to eighth vector data FP_V0[15:0]-FP_V7[15:0] may have a plurality of floating-point format 16-bit data types. Hereinafter, Hereinafter, as described with reference to FIG. 59, the first to eighth weight data FP_W0[15:0]-FP_W7[15:0] and the first to eighth vector data FP_V0[15:0]-FP_V7[15:0] may each have a first data format FP16, a second data format OF16-1, a third data format OF16-2, and a fourth data format BF16, for example. As described with reference to FIG. 59, the first data format FP16 may be composed of a 1-bit sign, a 5-bit exponent, and a 10-bit mantissa. The second data format OF16-1 may be composed of a 1-bit sign, a 6-bit exponent, and a 9-bit mantissa. The third data format OF16-1 may be composed of a 1-bit sign, a 7-bit exponent, and an 8-bit mantissa. The fourth data format BF16 may be composed of a 1-bit sign, a 8-bit exponent, and a 7-bit mantissa. In addition, the first to fourth data types FP16, OF16-1, OF16-2, and BF16 may be identified by a mode register setting signal MRS[1:0].

Each of the first to sixteenth data type converters CVT0-CVT15 may perform a converting operation of converting a data type of inputted data into a modulated data type. The modulated data type may be variously set in consideration of computational performance or hardware area. Hereinafter, a case in which the modulated data type is a 20-bit floating-point format consisting of a 1-bit sign, an 8-bit exponent, and an 11-bit (including implicit bit) mantissa will be described as an example. Accordingly, the first data type converter CVT0 may convert a data type of the 16-bit weight data FP_W0[15:0] to output 20-bit first modulated weight data MFP_W0[19:0]. Similarly, the second data type converter CVT1 may convert a data type of the 16-bit first vector data FP_V0[15:0] to output 20-bit first modulated vector data MFP_V0[19:0]. The data type converting operation performed by each of the first to sixteenth data format converters CVT0-CVT15 may be performed in response to a mode register setting signal MRS[1:0].

Among the first to sixteenth data format converters CVT0 to CVT15, a pair of adjacent data format converters may be coupled with corresponding one of the first to eighth multipliers MUL0-MUL7. For example, the first and second data type converters CVT0 and CVT1 may be coupled to the first multiplier MUL0. Accordingly, the first modulated weight data MFP_W0[19:0] that is output from the first data type converter CVT0 and the first modulated vector data MFP_V0[19:0] that is output from the second data type converter CVT1 may be transmitted to the first multiplier MUL0.

Each of the first to eighth multipliers MUL0-MUL7 may perform a multiplication operation on the modulated weight data MFP_W[19:0] and the modulated vector data MFP_V [19:0] transmitted from a pair of data type converters and output the result, modulated multiplication result data MFP_WV. For example, the first multiplier mul0 may perform a multiplication operation on the first modulated weight data MFP_W0[19:0] transmitted from the first data type converter CVT0 and the first modulated vector data MFP_V0[19:0] transmitted from the second data type converter CVT1, and output the first modulated multiplication result data MFP_WV0, which is multiplication result. The remaining second to eighth multipliers MUL1-MUL7 may also operate in the same manner. Each of the first to eighth multipliers MUL0-MUL7 may perform a process of adjusting an exponential bias in response to a mode register setting signal MRS[1:0] in a process of performing multiplication. The modulated multiplication result data MFP_WV that is output from each of the first to eighth multipliers MUL0-MUL7 may have various data types based on the configuration of the multiplier MUL, which will be described in more detail below.

The first to eighth floating-point-to-fixed-point converters FFC0_FFC7 may perform a converting operation of converting a floating-point format to a fixed-point format for the modulated multiplication result data MFP_WV0 transmitted from each of the first to eighth multipliers MUL0-MUL7, respectively. Each of first to eighth floating-point-to-fixed-point converters FFC0_FFC7 may transmit the floating-point format multiplication result data M_FIX generated as a result of conversion to the adder tree 5400A. In an embodiment, each of the first to eighth floating-point-to-fixed-point converters FFC0_FFC7 may have substantially the same configuration as the first floating-point-to-fixed-point converter FFC0 included in the floating-point-to-fixed-point converting circuit 1200 described with reference to FIG. 35, and accordingly, a duplicate description will be omitted.

The data type deconverter 5700 may perform an operation of restoring the data type of the modulated floating-point multiplication-accumulation data M_ACC_FLT transmitted from the fixed-point-to-floating-point converter 5600 back to the original data type. For example, when the data type of the weight data and vector data inputted to the MAC operation is the fourth data type BF16 among the first to fourth data types FP16, OF16-1, OF16-2, and BF16, the data type deconverter 5700 may restore the data type of the floating-point type multiplication-accumulation data M_ACC_FLT to the fourth data type BF16. The data type deconverter 5700 may output floating-point type data restored in the fourth data type BF16 as MAC result data MAC_RST_FLT. Although the fixed-point-to-floating-point converter 5600 and the data type deconverter 5700 are classified in this embodiment, this is only for convenience of explanation. The data type deconverter 5700 may be disposed in the fixed-point-to-floating-point converter 5600 to operate in a process of converting from a fixed-point format to a floating-point format.

Figure 72:
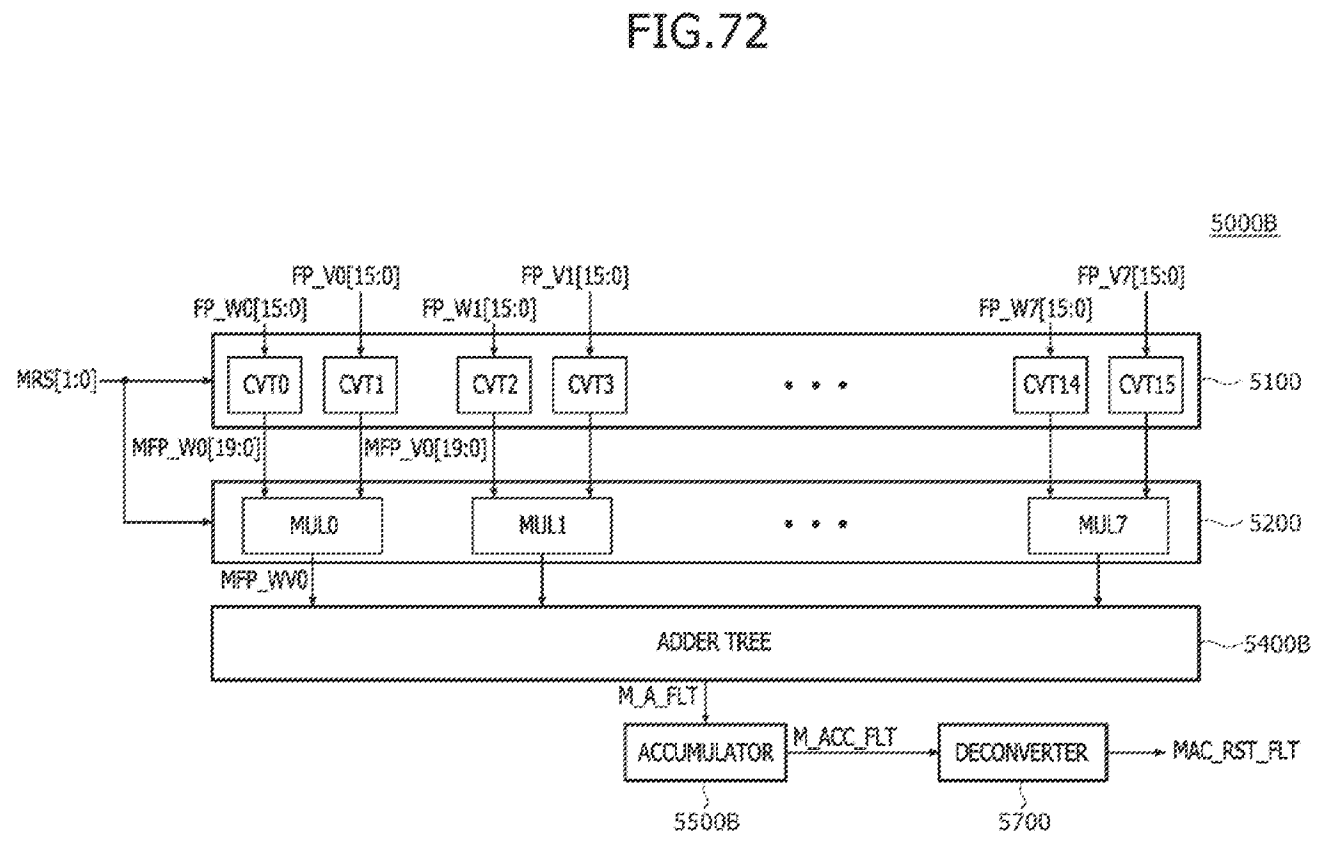

FIG. 72 illustrates a MAC operator 5000B according to another embodiment of the present disclosure. The MAC operator 5000B according to the present embodiment may be applied to the PIM devices 10, 100, and 400 described with reference to FIGS. 1, 2, and 20. Referring to FIG. 72, the MAC operator 5000B according to the present embodiment may include a data type converting circuit 5100 with a plurality of data type converters, for example, first to sixteenth data type converters CVT0-CVT15, a multiplying circuit 5200 with a plurality of multipliers, for example, first to eighth multipliers MUL0-MUL7, an adder tree 5400B, an accumulator 5500B, and a data type deconverter 5700.

The data type converting circuit 5100 of the MAC operator 5000B according to the present embodiment and the first to sixteenth data type converters CVT0-CVT15 included therein may be configured in the same manner as described with reference to FIG. 71. The multiplying circuit 5200, and the first to eighth multipliers MUL0-MUL7 included therein may also be configured in the same manner as described with reference to FIG. 71. The MAC operator 5000A described with reference to FIG. 71 includes the floating-point-to-fixed-point converting circuit 5300, and accordingly, the adder tree 5400A and the accumulator 5500A are configured to be able to perform multiplying and accumulating operations on the fixed-point format. On the other hand, in the case of the MAC operator 5000B according to the present embodiment, the floating-point format modulated multiplication result data MFP_MVs that is output from the first to eighth multipliers MUL0-MUL7 are transmitted to the adder tree 5400B. Except for performing addition and accumulation on the floating-point format data as described above, the adder tree 5400B and the accumulator 5500B may be configured in substantially the same manner as the adder tree 1300 and the accumulator 1400 of the MAC operator 1000 described with reference to FIG. 31.

The MAC operator 5000B according to the present embodiment might not include the floating-point multiplying circuit 5300 included in the MAC operator 5000A described with reference to FIG. 71. Accordingly, as described above, the adder tree 5400B and the accumulator 5500B may perform an addition operation and accumulation on the floating-point format data. Accordingly, the MAC operator 5000B according to the present embodiment might not require the converting process from the floating-point format to the fixed-point format during data output. That is, the floating point multiplication-accumulation data M_ACC_FLT transmitted from the accumulator 5500B may be restored to the original data type by the data type deconverter 5700, and then output from the MAC operator 5000B as MAC result data MAC_RST_FLT.

Figure 73:
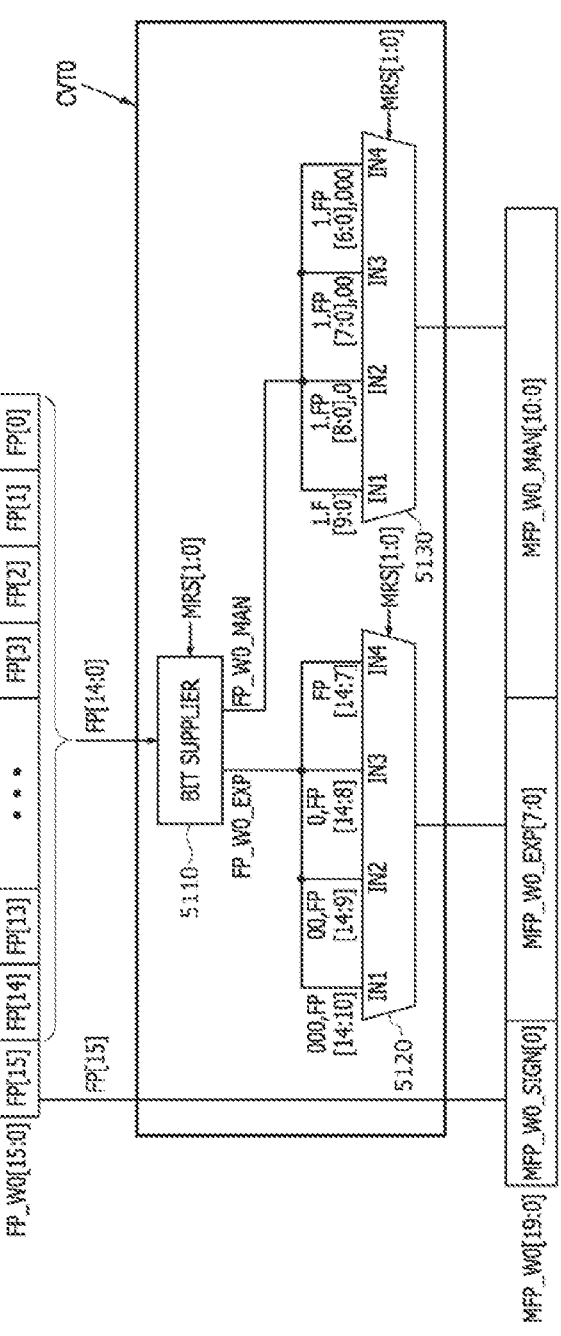
FIG. 73 illustrates an embodiment of a first data type converter of the MAC operators of FIGS. 71 and 72.

FIG. 73 illustrates an embodiment of a first data type converter CVT0 of the MAC operators 5000A and 5000B of FIGS. 71 and 72. The description of the first data type converter CVT0 below may also be applied to the second to sixteenth data type converters CVT1-CVT15 of the MAC operators 5000A and 5000B of FIGS. 71 and 72. Referring to FIG. 73, the first data type converter CVT0 may perform data type converting on the transmitted 16-bit floating-point format first weight data FP_W0[15:0] to output 20-bit floating-point format first modulated weight data MFP_W0 [19:0]. All of the first to fourth data types FP16, OF16-1, OF16-2, and BF16 that the first weight data FP_W0[15:0] may have include a 1-bit sign bit. The first modulated weight data MFP_W0[19:0] that is output from the first data type converter CVT0 may also include a 1-bit sign bit. Accordingly, the MSB FP[15] that is the sign bit of the first weight data FP_W0[15:0] may constitute the sign bit MFP_W0_SIGN[0] of the first modulated weight data MFP_W0[19:0] without converting in the first data type converter CVT0.

In an embodiment, the first data type converter CVT0 may include a bit supplier 5110, a first 4:1 demultiplexer 5120, and a second 4:1 demultiplexer 5130. The first 4:1 demultiplexer 5120 may have first to fourth input terminal IN1-IN4, a control terminal, and an output terminal. The second 4:1 demultiplexer 5130 may also include first to fourth input terminals IN1-IN4, a control terminal, and an output terminal. The bit supplier 5110 may supply an exponent FP_W0_EXP and a mantissa FP_W0_MAN in the received floating-point format 16-bit first weight data FP_W0[15:0] to the first 4:1 demultiplexer 5120 and the second 4:1 demultiplexer 5130, respectively.

As described with reference to FIG. 59, in the first to fourth data types FP16, OF16-1, OF16-2, and BF16, the number of bits constituting the exponent and the number of bits constituting the mantissa may be different. Accordingly, the exponent FP_W0_EXP that is output from the bit supplier 5110 may have a different number of bits according to the data type of the first weight data FP_W0[15:0]. Similarly, the mantissa FP_W0_MAN that is output from the bit supplier 5110 may also have a different number of bits according to the data type of the first weight data FP_W0 [15:0]. The bit supply 5110 may transmit the exponent FP_W0_EXP of the first weight data FP_W0[15:0] to an input terminal selected by a mode register setting signal MRS[1:0] among the first to fourth input terminals IN1-IN4 of the first 4:1 demultiplexer 5120. In addition, the bit supply 5110 may transmit the mantissa FP_W0_MAN of the first weight data FP_W0[15:0] to an input terminal selected by the mode register setting signal MRS[1:0] among the first to fourth input terminals IN1-IN4 of the second 4:1 demultiplexer 5130.

If the first weight data FP_W0[15:0] is in the first data type FP16, the first weight data FP_W0[15:0] may include a 5-bit exponent FP_W0_EXP and a 10-bit mantissa FP_W0_MAN. The bit supply 5110 may transmit 5 bits FP[14:10] in the first weight data FP_W0[15:0] constituting the exponent FP_W0_EXP to the first input terminal IN1 of the first 4:1 demultiplexer 5120 in response to the mode register setting signal MRS[1:0] of "00". In addition, the bit supplier 5110 may transmit 10 bits FP[9:0] constituting the mantissa FP_W0_MAN in the first weight data FP_W0[15: 0] to the first input IN1 of the second 4:1 demultiplexer 5130.

If the first weight data FP_W0[15:0] is in the second data type OP16-1, the first weight data FP_W0[15:0] may include a 6-bit exponent FP_W0_EXP and a 9-bit mantissa FP_W0_MAN. The bit supply 5110 may transmit 6 bits FP[14:9] constituting the exponent FP_W0_EXP in the first weight data FP_W0[15:0] to the first input terminal IN1 of the first 4:1 demultiplexer 5120 in response to the mode register setting signal MRS[1:0] of "01". In addition, the bit supplier 5110 may transmit 9 bits FP[8:0] constituting the mantissa FP_W0_MAN in the first weight data FP_W0[15: 0] to the first input IN1 of the second 4:1 demultiplexer 5130.

If the first weight data FP_W0[15:0] is in the third data type OP16-2, the first weight data FP_W0[15:0] may include a 7-bit exponent FP_W0_EXP and an 8-bit mantissa FP_W0_MAN. The bit supply 5110 may transmit 7 bits FP[14:8] constituting the exponent FP_W0_EXP in the first weight data FP_W0[15:0] to the first input terminal IN1 of the first 4:1 demultiplexer 5120 in response to the mode register setting signal MRS[1:0] of "10". In addition, the bit supplier 5110 may transmit 8 bits FP[7:0] constituting the mantissa FP_W0_MAN in the first weight data FP_W0[15: 0] to the first input IN1 of the second 4:1 demultiplexer 5130.

If the first weight data FP_W0[15:0] is in the fourth data type BP16, the first weight data FP_W0[15:0] may include an 8-bit exponent FP_W0_EXP and a 7-bit mantissa FP_W0_MAN. The bit supply 5110 may transmit 8 bits FP[14:7] constituting the exponent FP_W0_EXP in the first weight data FP_W0[15:0] to the first input terminal IN1 of the first 4:1 demultiplexer 5120 in response to the mode register setting signal MRS[1:0] of "11". In addition, the bit supplier 5110 may transmit 7 bits FP[6:0] constituting the mantissa FP_W0_MAN in the first weight data FP_W0[15: 0] to the first input IN1 of the second 4:1 demultiplexer 5130.

The first 4:1 demultiplexer 5120 may output data of one input terminal selected among the first to fourth input terminals IN1-IN4 in response to the mode register setting signal MRS[1:0]. To match the 8-bit exponent MFP_W0_EXP[7:0] of the first modulated weight data MFP_W0[19:0], the first 4:1 demultiplexer 5120 may be configured to include an appropriate number of "0s" in the exponents FP_W0_EXP transmitted to each of the first to third input terminals IN1-IN3. The second 4:1 demultiplexer 5130 may output data of an input terminal selected among the first to fourth input terminals IN1-IN4 in response to the mode register setting signal MRS[1:0]. To match the 11-bit exponent MFP_W0_EXP[10:0] of the first modulated weight data MFP_W0[19:0], the second 4:1 demultiplexer 5130 may be configured to include an implicit bit in an exponent FP_W0_EXP transmitted to each of the first to fourth input terminals IN1-IN4, and so that in the exponent FP_W0_EXP transmitted to each of the second to fourth input terminals IN2-IN4, an appropriate number of "0s" is included in the lower bits.

If the first weight data FP_W0[15:0] is in the first data type FP1, the first 4:1 demultiplexer 5120 may output 8-bit data 000,FP[14:10] in which "000" is added to the upper 5 bits FP[14:10] of the first weight data FP_W0[15:0] transmitted to the first input terminal IN1 in response to the mode register setting signal MRS[1:0] of "00". The second 4:1 demultiplexer 5130 may output 11-bit data 1.FP[9:0] in which an implicit bit is added to 10 bits FP[9:0] of the first weight data FP_W0[15:0] transmitted to the first input terminal IN1 in response to the mode register setting signal MRS[1:0] of "00". The 8-bit data 000,FP[14:10] and the 11-bit data 1.FP[9:0] that is output from the first 4:1 demultiplexer 5120 and the second 4:1 demultiplexer 5130, respectively, may constitute 8-bit exponent bits MFP_W0_EXP[7:0] and 11-bit mantissa bits MFP_W0_MAN[10:0] of the first modulated weight data MFP_W0[19:0], respectively.

If the first weight data FP_W0[15:0] is in the second data type OF16-1, the first 4:1 demultiplexer 5120 may output 8-bit data 000,FP[14:9] in which "00" is added to the upper 6 bits FP[14:9] of the first weight data FP_W0[15:0] transmitted to the second input terminal IN2 in response to the mode register setting signal MRS[1:0] of "01". The second 4:1 demultiplexer 5130 may output 11-bit data 1.FP[8:0],0 in which an implicit bit and '0' are added to 9 bits FP[8:0] of the first weight data FP_W0[15:0] transmitted to the second input terminal IN2 in response to the mode register setting signal MRS[1:0] of "01". The 8-bit data 00,FP[14:9] and the 11-bit data 1.FP[8:0],0 that are output from the first 4:1 demultiplexer 5120 and the second 4:1 demultiplexer 5130, respectively, may constitute 8-bit exponent bits MFP_W0_EXP[7:0] and 11-bit mantissa bits MFP_W0_MAN[10:0] of the first modulated weight data MFP_W0[19:0], respectively.

If the first weight data FP_W0[15:0] is in the third data type OF16-2, the first 4:1 demultiplexer 5120 may output 8-bit data 000,FP[14:8] in which "0" is added to the upper 7 bits FP[14:8] of the first weight data FP_W0[15:0] transmitted to the third input terminal IN3 in response to the mode register setting signal MRS[1:0] of "10". The second 4:1 demultiplexer 5130 may output 11-bit data 1.FP[7:0] in which an implicit bit and '00' are added to 8 bits FP[7:0] of the first weight data FP_W0[15:0] transmitted to the third input terminal IN3 in response to the mode register setting signal MRS[1:0] of "10". The 8-bit data 0,FP[14:8] and the 11-bit data 1.FP[7:0],00 that are output from the first 4:1 demultiplexer 5120 and the second 4:1 demultiplexer 5130, respectively, may constitute 8-bit exponent bits MFP_W0_EXP[7:0] and 11-bit mantissa bits MFP_W0_MAN[10:0] of the first modulated weight data MFP_W0[19:0], respectively.

If the first weight data FP_W0[15:0] is in the fourth data type BF16, the first 4:1 demultiplexer 5120 may output 8 bits FP[14:7] transmitted to the fourth input terminal IN4 as it is in response to the mode register setting signal MRS[1:0] of "11". The second 4:1 demultiplexer 5130 may output 11-bit data 1.FP[6:0],000 in which an implicit bit and '000' are added to 7 bits FP[6:0] of the first weight data FP_W0[15:0] transmitted to the fourth input terminal IN4 in response to the mode register setting signal MRS[1:0] of "11". The 8-bit data FP[14:7] and the 11-bit data 1.FP[6:0],000 that are output from the first 4:1 demultiplexer 5120 and the second 4:1 demultiplexer 5130, respectively, may constitute 8-bit exponent bits MFP_W0_EXP[7:0] and 11-bit mantissa bits MFP_W0_MAN[10:0] of the first modulated weight data MFP_W0[19:0], respectively.

Figure 74:
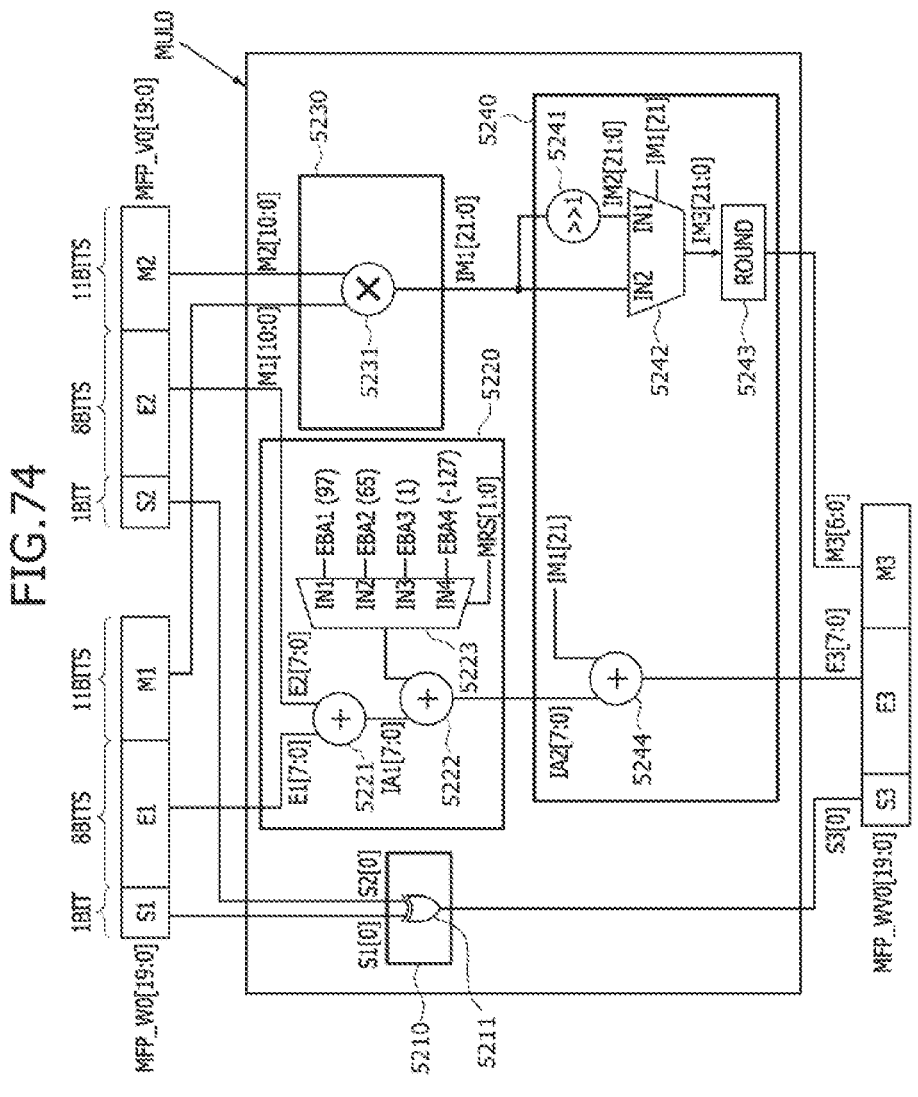
FIG. 74 illustrates an embodiment of a first multiplier of the MAC operators of FIGS. 71 and 72.

FIG. 74 illustrates an embodiment of the first multiplier MUL0 of the MAC operators 5000A and 5000B of FIGS. 71 and 72. The description of the configuration and operation of the first multiplier MUL0 according to the present embodiment may be equally applied to the remaining second to eighth multipliers MUL1-MUL7 constituting the multiplication circuit 5200. Referring to FIG. 74, the first multiplier MUL0 may include a code processing circuit 5210, an exponent processing circuit 5220, a mantissa processing circuit 5230, and a normalizer 5240.

The code processing circuit 5210 includes an XOR gate 5211. The XOR gate 5211 may perform an XOR operation on a sign bit S1[0] of the first modulated weight data MFP_W0[19:0] and a sign bit S2[0] of the first modulated vector data MFP_V0[19:0] to output a result. The sign bit S3[0] that is output from the XOR gate 5211 may constitute a sign S3 of the first modulated multiplication result data MFP_WV0[19:0].

The exponent processing circuit 5220 may include a first exponent adder 5221, a second exponent adder 5222, and a 4:1 multiplexer 5223. The first exponent adder 5221 may perform an addition operation on exponent bits E1[7:0] of the first modulated weight data MFP_W0[19:0] and exponent bits E2[7:0] of the first modulated vector data MFP_V0[19:0], and output 8-bit first intermediate addition data IA1[7:0] as an addition result. The second exponential adder 5222 may perform an addition operation on the 8-bit intermediate addition data IA1[7:0] that is output from the first exponent adder 5221 and an exponent bias adjust value that is output from the 4:1 multiplexer 5223, and output 8-bit second intermediate addition data IA2[7:0] as addition result. The 8-bit second intermediate addition data IA2[7:0]

that is output from the second exponent adder 5222 may be transmitted to the normalizer 5240.

The first weight data FP_W0[15:0] and the first vector data FP_V0[15:0] inputted to the MAC operators 5000A and 5000B according to the present embodiment may include an exponent obtained by adding an exponential bias. Accordingly, both of the exponent bits E1[7:0] of the first modulated weight data MFP_W0[19:0] and exponent bits E2[7:0] of the first modulated vector data MFP_V0[19:0] include an exponential bias. Further, the first intermediate addition data IA1 that is output from the first exponent adder 5221 may include an exponent obtained by adding (exponential bias*2). However, the exponential bias may represent different values based on the data type.

As described with reference to FIG. 62, the first to fourth data types FP16, OF16-1, OF16-2, and BF16 may have exponential biases of '15,' '31,' '63,' and '127', respectively. According to this, if the first weight data FP_W0[15:0] and the first vector data FP_V0[15:0] are in the first data type FP16, the exponent of the first intermediate addition data IA1[7:0] that is output from the first exponent adder 5221 may be in a state in which an exponential bias of '30' has been added. If the first weight data FP M0[15:0] and the first vector data FP_V0[15:0] are in the second data type OF16-1, the exponent of the first intermediate addition data IA1[7:0] that is output from the first exponent adder 5221 may be in a state in which an exponential bias of '62' has been added. If the first weight data FP_W0[15:0] and the first vector data FP_V0[15:0] are in the third data type OF16-1, the exponent of the first intermediate addition data IA1[7:0] that is output from the first exponent adder 5221 may be in a state in which an exponential bias of '126' has been added. Further, if the first weight data FP_W0[15:0] and the first vector data FP_V0[15:0] are in the fourth data type BF16, the exponent of the first intermediate addition data IA1[7:0] that is output from the first exponent adder 5221 may be in a state in which an exponential bias of '254' has been added.

As described above, if the state in which exponential biases of different values are applied according to the data type is maintained, it may be a cumbersome to consider this in several subsequent calculation processes. Accordingly, in this embodiment, in order to use the largest number that can be expressed regardless of the data format when performing the addition operation in the second exponent adder 5222, the exponential bias of the fourth data type BF16 with the largest value may be applied to other data types FP16, OF16-1, and OF16-2. To this end, the 4:1 multiplexer 5223 may be configured so that each of the first to fourth exponential bias adjustment values EBA1-EBA4 is inputted to each of the first to fourth input terminals IN1-IN4. For example, if the mode register setting signal MRS[1:0] of '00' is transmitted, the 4:1 multiplexer 5223 may transmit a first exponential bias adjustment value EBA1 to the second exponential adder 5222. If the mode register setting signal MRS[1:0] of '01' is transmitted, the 4:1 multiplexer 5223 may transmit a second exponential bias adjustment value EBA2 to the second exponential adder 5222. If the mode register setting signal MRS[1:0] of '10' is transmitted, the 4:1 multiplexer 5223 may transmit a third exponential bias adjustment value EBA3 to the second exponential adder 5222. If the mode register setting signal MRS[1:0] of '11' is transmitted, the 4:1 multiplexer 5223 may transmit a fourth exponential bias adjustment value EBA4 to the second exponential adder 5222.

In the case of the first data type FP16, because the first intermediate data IA1[7:0] is in a state to which the exponential bias of '30' has been added, in order to have an exponential bias of '127', '97' is added. That is, the first exponential bias adjusting value EBA1 may be set to '97'. In the case of the second data type OF16-1, because the first intermediate data IA1[7:0] is in a state to which the exponential bias of '62' has been added, in order to have an exponential bias of '127', '65' is added. That is, the second exponential bias adjusting value EBA2 may be set to '65'. In the case of the third data type OF16-2, because the first intermediate data IA1[7:0] is in a state to which the exponential bias of '127' has been added, in order to have an exponential bias of '127', '1' is added. That is, the third exponential bias adjusting value EBA3 may be set to '1'. In the case of the fourth data type BF16, because the first intermediate data IA1[7:0] is in a state to which the exponential bias of '254' has been added, in order to have an exponential bias of '127', '−127' is added. That is, the fourth exponential bias adjusting value EBA4 may be set to '−27'. The second intermediate addition data IA2[7:0] that is output from the second exponential adder 5222 has a state to which the exponential bias '127' has been added regardless of the data type.

The mantissa processing circuit 5230 may include a mantissa multiplier 5231. The mantissa multiplier 5231 may perform a multiplication operation on mantissa bits M1[10:0] of the first modulated weight data MFP_W0[19:0] and mantissa bits M2[7:0] of the first modulated vector data MFP_V0[19:0]. As described with reference to FIG. 73, because the mantissa bits of the first modulated weight data MFP_W0[19:0] and the first modulated vector data MFP_V0[19:0] already contain an implicit bit, the mantissa bits M1[10:0] and M2[10:0] may be inputted to the mantissa multiplier 5231 as it is without adding implicit bits. The mantissa multiplier 5231 may output 22-bit first intermediate multiplication data IM1[21:0] as multiplication result data. The first intermediate multiplication data IM1[21:0] that is output from the mantissa multiplier 5231 may be transmitted to the normalizer 5240.

The normalizer 5240 may include a floating-point moving unit 5241, a multiplexer 5242, a round processing unit 5443, and a third exponential adder 5244. The floating-point moving unit 5241 may receive 22-bit first intermediate multiplication data IM1[21:0] transmitted from the mantissa multiplier 5231, and output second intermediate multiplication data IM2[21:0] in which the binary point has been shifted by one bit toward the MSB of the first intermediate multiplication data IM1[21:0]. Accordingly, the binary point of the second intermediate multiplication data IM2[21:0] may be positioned between a 22nd bit IM2[20] and an MSB IM2[21] of the second intermediate multiplication data IN12[21:0]. The second intermediate multiplication data IM2[21:0] that is output from the floating-point moving unit 5241 may be transmitted to a first input terminal IN1 of the multiplexer 5242.

The multiplexer 5242 may receive the second intermediate multiplication data IM2[21:0] by the floating-point moving unit 5241 through the first input terminal IN1, and receive the first intermediate multiplication data IM1[21:0] that is output from the mantissa multiplier 5231 through a second input terminal IN2. The multiplexer 5242 may output third intermediate multiplication data IM3[21:0] in response to the MSB IM1[21] of the first intermediate multiplication data IM1[21:0]. If the MSB IM1[21] of the first intermediate multiplication data IM1[21:0] is '1', the multiplexer 5242 may output the second intermediate multiplication data IM2[21:0] inputted through the first input terminal IN1 as the third intermediate multiplication data IM3[21:0]. If the MSB IM1[21] of the first intermediate multiplication data IM1[21:0] is '0', the multiplexer 5242 may output the first intermediate multiplication data IM1[21:0] inputted through the second input terminal IN2 as the third intermediate multiplication data IM3[21:0].

The round processing unit 5243 may remove an implicit bit and lower 10 bits from the 22-bit third intermediate multiplication data IM3[21:0] that is output from the multiplexer 5242 to make the data size become 11 bits. In this process, the round processing unit 5443 may perform round processing. During round processing, a '+1' adding operation according to roundup may be performed. The round processing unit 5443 may output 11-bit mantissa bits M3[10:0]. The mantissa bits M3[10:0] that are output from the round processing unit 5443 may constitute the mantissa M3 of the first modulated multiplication result data MFP_WV0[19:0].

The third exponent adder 5244 may perform an addition operation on the 8-bit second intermediate multiplication data IM2[7:0] that is output from the second exponent adder 5222 and the MSB IM1[21] of the first intermediate multiplication data IM1[21:0] that is output from the mantissa multiplier 5231. If the MSB IM1[21] of the first intermediate multiplication data IM1[21:0] is '0', the 8-bit exponent bits E3[7:0] that are output from the third exponent adder 5244 may be the same as the second intermediate multiplication data IM2[7:0] that is output from the second exponent adder 5222. If the MSB IM1[21] of the first intermediate multiplication data IM1[21:0] is '1', the 8-bit exponent bits E3[7:0] that are output from the third exponent adder 5244 may have a value greater by '1' than the second intermediate addition data IM2[7:0] that is output from the second exponent adder 5222. The exponent bits E3[7:0] that are output from the third exponent adder 5244 may constitute the exponent E3 of the first modulated multiplication result data MFP_WV0[19:0].

Figure 75:
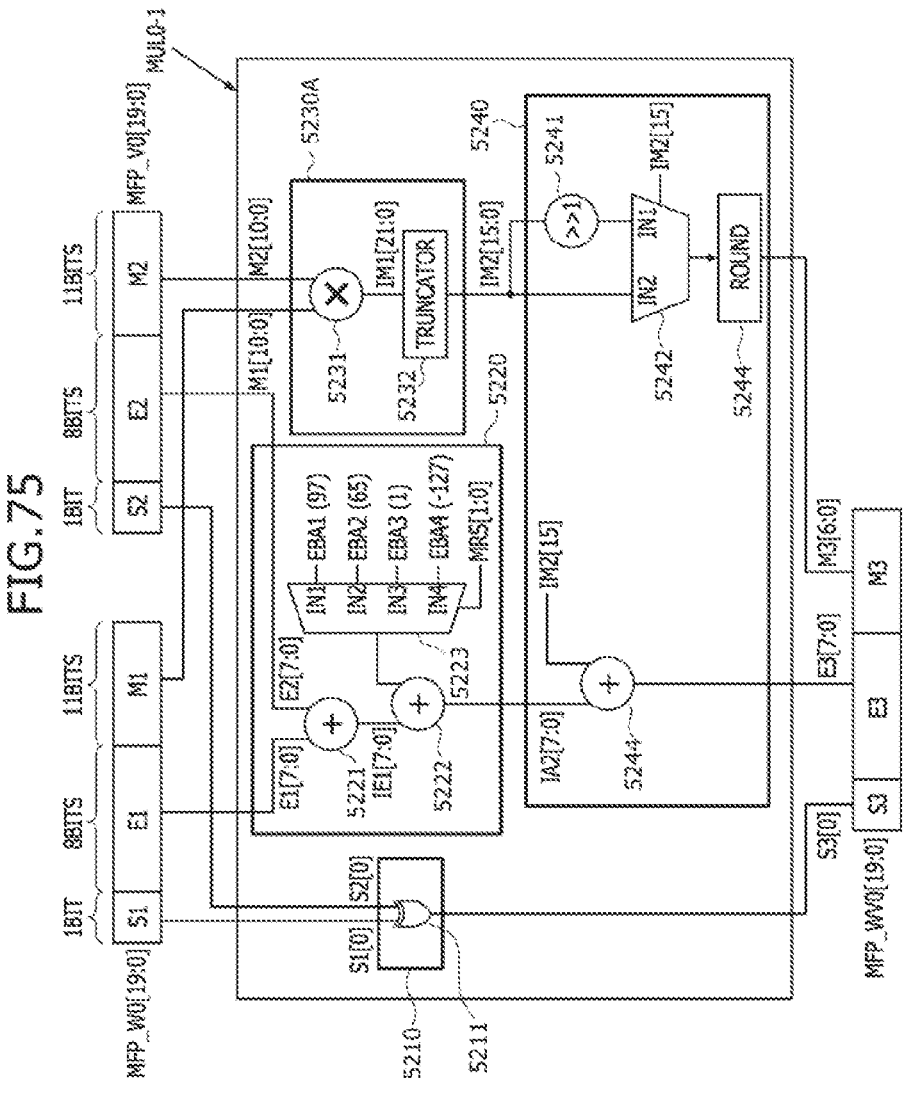
FIG. 75 illustrates another embodiment of the first multiplier of the MAC operators of FIGS. 71 and 72.

FIG. 75 illustrates another embodiment of the first multiplier MUL0 of the MAC operators 5000A and 5000B of FIGS. 71 and 72. In FIG. 75, the same reference numerals as in FIG. 74 denote the same components, and redundant descriptions will be omitted below. Referring to FIG. 75, a first multiplier MUL0-1 according to this embodiment may differ from the first multiplier MUL0 of FIG. 74 in that the mantissa processing circuit 5230A further includes a bit truncator 5232. The bit truncator 5232 may perform an operation of removing the lower bits of the first intermediate multiplication data IM1[21:0] that is output from the mantissa multiplier 5231. In an embodiment, the bit truncator 5322 may truncate the lower 6 bits of the 22-bit first intermediate multiplication data IM1[21:0] to output 16-bit second intermediate multiplication data IN12[15:0]. The 16-bit second intermediate multiplication data IM2[15:0] that is output from the bit truncator 5232 may be transmitted to the floating=point moving unit 5241 and a second input terminal IN2 of the multiplexer 5242 of the normalizer 5240. The data processing process in the normalizer 5240 may be the same as described with reference to FIG. 74.

Figure 76:
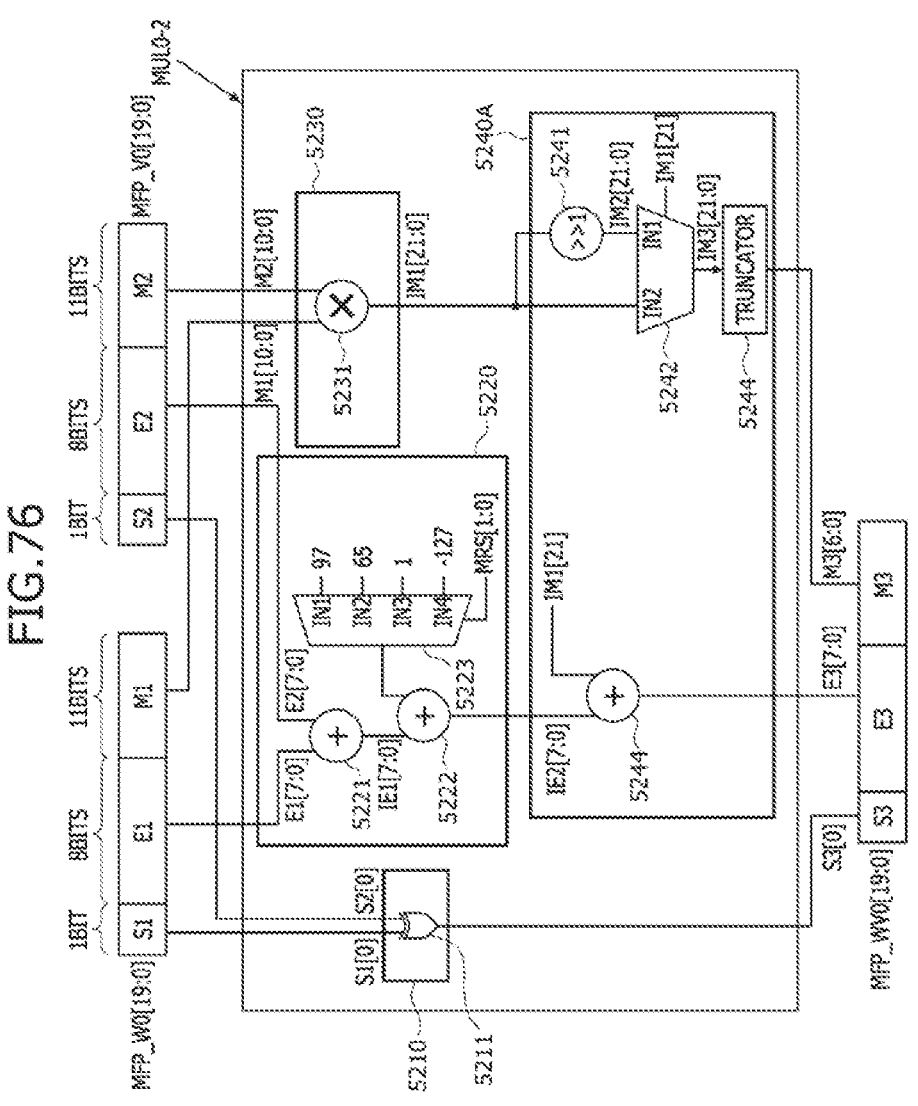
FIG. 76 illustrates yet another embodiment of the first multiplier of the MAC operators of FIGS. 71 and 72.

FIG. 76 illustrates yet another embodiment of a first multiplier MUL0 of the MAC operators 5000A and 5000B of FIGS. 71 and 72. In FIG. 76, the same reference numerals as in FIG. 74 denote the same components, and redundant descriptions will be omitted below. Referring to FIG. 76, the first multiplier MUL0-2 according to the present embodiment may differ from the first multiplier MUL0 of FIG. 74 in that a normalizer 5240A further includes a bit truncator 5244. The bit truncator 5244 may perform an operation of removing lower bits of the third intermediate multiplication data IM3[21:0] that is output from the multiplexer 5242 of the normalizer 5240A. In an embodiment, the bit truncator 5244 may truncate 6 lower bits of the 22-bit third intermediate multiplication data IM3[21:0] to output 11-bit mantissa bits M3[10:0]. The mantissa bits M3[10:0] may constitute a mantissa M3 of the first modulated multiplication data MFP_WV0[19:0].

Figure 77:
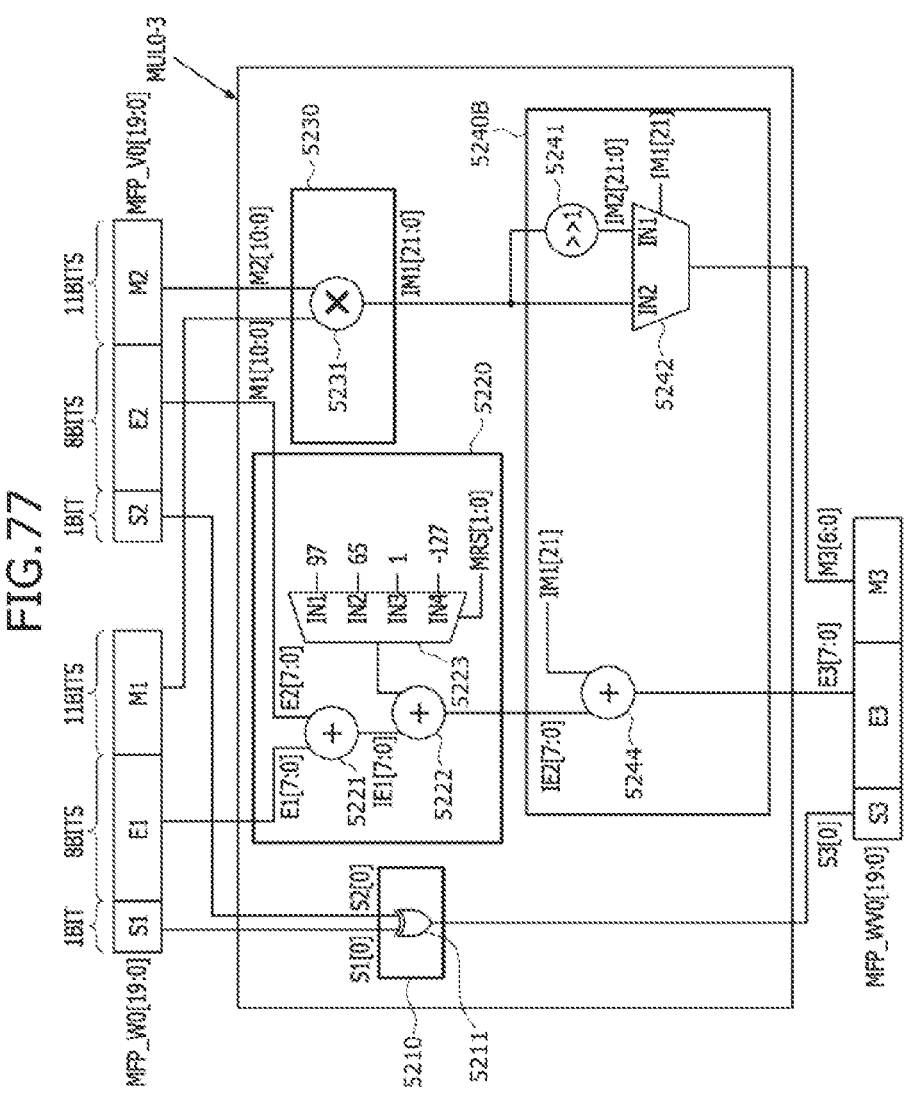
FIG. 77 illustrates yet another embodiment of the first multiplier of the MAC operators of FIGS. 71 and 72.

FIG. 77 illustrates still yet another embodiment of the first multiplier MUL0 of the MAC operators 5000A and 5000B of FIGS. 71 and 72. In FIG. 77, the same reference numerals as in FIG. 74 denote the same components, and redundant descriptions will be omitted below. Referring to FIG. 77, the first multiplier MUL0-3 according to the present embodiment may differ from the first multiplier MUL0 of FIG. 74 in that a normalizer 5240B does not include a round processing unit (5243 of FIG. 74). Accordingly, the 22-bit mantissa bit M3[21:0] that is output from the multiplexer 5242 of the normalizer 5240B may constitute the mantissa M3 of the first modulated multiplication result data MFP_WV0[19:0]. That is, when the first multiplier MUL0-3 according to this embodiment is applied, the 31-bit floating-point format first modulated multiplication result data MFP_WV0[30:0] may be output. In addition, because the mantissa M3 of the first modulated multiplication result data MFP_WV0[19:0] is composed of 22 bits, the adder tree (5400A in FIG. 71, 5400B in FIG. 72) and the accumulator (5500A in FIG. 71, 5500B in FIG. 72) may be required to be composed of adders with increased computational capability.

Figure 78:
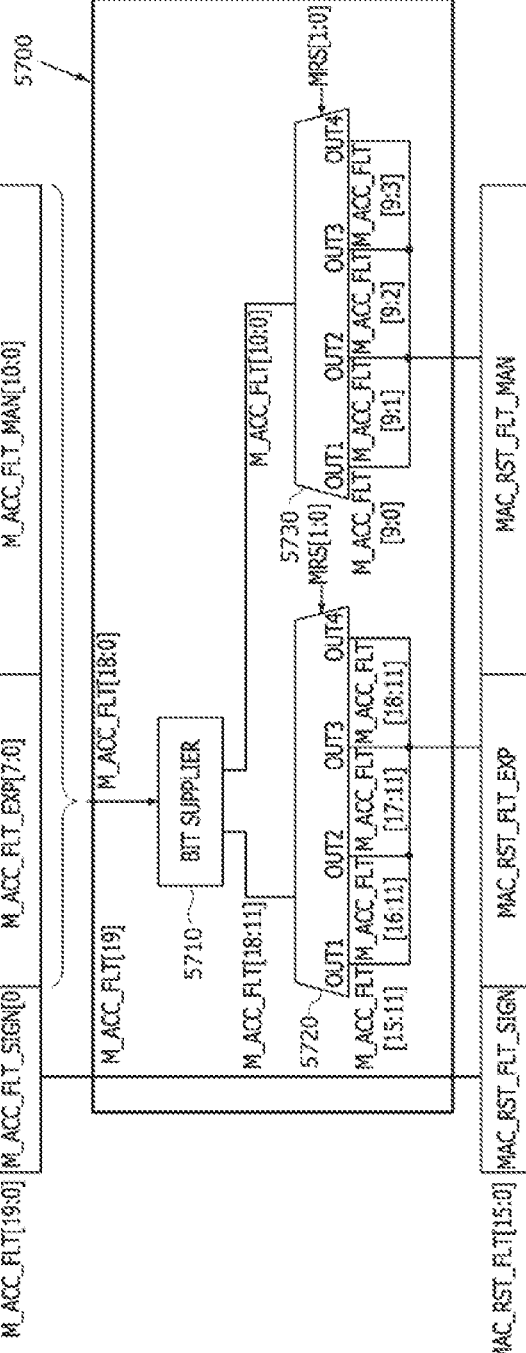
FIG. 78 illustrates an embodiment of a data type deconverter of the MAC operators of FIGS. 71 and 72.

FIG. 78 illustrates an embodiment of a data type deconverter 5700 of the MAC operators 5000A and 5000B of FIGS. 71 and 72. Referring to FIG. 78, the data type deconverter 5700 may perform an operation of restoring a data type of the 20-bit floating-point format multiplication-accumulation data M_ACC_FLT[19:0] transmitted from the fixed-point-to-floating-point converter (5600 of FIGS. 71 and 72) back to the original data type to output 16-bit floating-point format MAC result data MAC_RST_FLT[15:0]. All of the first to fourth data types FP16, OF16-1, OF16-2, and BF16 may include a 1-bit sign bit, and the MAC result data MAC_RST_FLT[15:0] that is output from the data type deconverter 5700 may include 1-bit sign bit M_ACC_FLT_SIGN[0]. Accordingly, an MSB M_ACC_FLT[19], which is a sign bit, in the multiplication-accumulation data MAC_ACC_FLT[19:0] in 20-bit floating-point format transmitted to the data format deconverter 5700 may constitute a sign bit MAC_RST_FLT[0] of the 16-bit MAC result data MAC_RST_FLT[15:0] as it is without deconverting in the data type deconverter 5700.

The data type deconverter 5700 may include a bit supplier 5710, a first 1:4 multiplexer 5720, and a second 1:4 multiplexer 5730. The first 1:4 multiplexer 5720 may have one input terminal and control terminal, and first to fourth output terminals OUT1-OUT4. The second 1:4 multiplexer 5730 may also have one input terminal and control terminal, and first to fourth output terminals OUT1-OUT4. The bit supplier 5710 may receive 19-bit data M_ACC_FLT[18:0] constituting an exponent M_ACC_FLT_EXP[7:0] and a mantissa M_ACC_FLT_MAN[10:0] in the 20-bit floating-point format multiplication-accumulation data MAC_ACC_FLT[19:0]. The bit supplier 5710 may supply the exponent M_ACC_FLT_EXP[7:0] and the mantissa M_ACC_FLT_MAN[10:0] to the first 1:4 multiplexer 5720 and the second 1:4 multiplexer 5730, respectively.

The first 1:4 multiplexer 5720 may output exponent bits M_ACC_FLT[18:11] of the multiplication-accumulation data MAC_ACC_FLT[19:0] inputted to an input terminal through a selected output terminal among the first to fourth output terminals OUT1-OUT4 in response to a mode register setting signal MRS[1:0]. To match the number of bits of the exponent of the original data type before being modulated, the first 1:4 multiplexer 5720 may be configured to remove '0' bits artificially added in a conversion operation for modulation to the exponent bit M_ACC_FLT[18:11] inputted to the input terminal. The second 1:4 multiplexer 5730 may output mantissa bits M_ACC_FLT[10:0] of the multiplication-accumulation data MAC_ACC_FLT[19:0] through a selected output terminal among the first to fourth output terminals OUT1-OUT4 in response to the mode register setting signal MRS[1:0], To match the number of bits of the exponent of the original data type before being modulated, the second 1:4 multiplexer 5730 may be configured to remove bits artificially added in a conversion operation for modulation to the mantissa bit M_ACC_FLT[10:0] inputted to the input terminal.

If the data type before being modulated is the first data type FP1, the first 1:4 multiplexer 5720 may output 5-bit exponent bit M_ACC_FLT[15:11] obtained by removing upper 3 bits M_ACC_FLT[18:16] from the 8-bit exponent bit M_ACC_FLT[18:11], in response to the mode register setting signal MRS[1:0] of '00'. The second 1:4 multiplexer 5730 may output 10-bit mantissa bits M_ACC_FLT[9:0] obtained by removing an implicit bit M_ACC_FLT[10] from the 11-bit mantissa bit M_ACC_FLT[10:0] inputted through the input terminal, in response to the mode register setting signal MRS[1:0] of '00'. The 5 bit exponent bits M_ACC_FLT[15:11] that are output from the first 1:4 multiplexer 5720 and the 10-bit mantissa bits M_ACC_FLT[9:0] that are output from the second 1:4 multiplexer 5730 may constitute 5-bit exponent bits MAC_RST_FLT_EXP and 10-bit mantissa bits MAC_RST_FLT_MAN of the MAC result data MAC_RST_FLT[15:0], respectively.

If the data type before being modulated is the second data type OF16-1, the first 1:4 multiplexer 5720 may output 6-bit exponent bit M_ACC_FLT[16:11] obtained by removing upper 2 bits M_ACC_FLT[18:17] from the 8-bit exponent bit M_ACC_FLT[18:11], in response to the mode register setting signal MRS[1:0] of '01'. The second 1:4 multiplexer 5730 may output 9-bit mantissa bits M_ACC_FLT[9:1] obtained by removing an implicit bit M_ACC_FLT[10] and lower 1 bit M_ACC_FLT[0] from the 11-bit mantissa bit M_ACC_FLT[10:0], in response to the mode register setting signal MRS[1:0] of '01'. The 6-bit exponent bits M_ACC_FLT[16:11] that are output from the first 1:4 multiplexer 5720 and the 9-bit mantissa bits M_ACC_FLT[9:1] that are output from the second 1:4 multiplexer 5730 may constitute 6-bit exponent bits MAC_RST_FLT_EXP and 9-bit mantissa bits MAC_RST_FLT_MAN of the MAC result data MAC_RST_FLT[15:0], respectively.

If the data type before being modulated is the third data type OF16-2, the first 1:4 multiplexer 5720 may output 7-bit exponent bit M_ACC_FLT[17:11] obtained by removing upper 1 bit M_ACC_FLT[18] from the 8-bit exponent bit M_ACC_FLT[18:11], in response to the mode register setting signal MRS[1:0] of '10'. The second 1:4 multiplexer 5730 may output 8-bit mantissa bits M_ACC_FLT[9:2] obtained by removing an implicit bit M_ACC_FLT[10] and lower 2 bits M_ACC_FLT[1:0] from the 11-bit mantissa bit M_ACC_FLT[10:0], in response to the mode register setting signal MRS[1:0] of '10'. The 7-bit exponent bits M_ACC_FLT[17:11] that are output from the first 1:4 multiplexer 5720 and the 8-bit mantissa bits M_ACC_FLT[9:2] that are output from the second 1:4 multiplexer 5730 may constitute 7-bit exponent bits MAC_RST_FLT_EXP and 8-bit mantissa bits MAC_RST_FLT_MAN of the MAC result data MAC_RST_FLT[15:0], respectively.

If the data type before being modulated is the fourth data type BF16, the first 1:4 multiplexer 5720 may output 8-bit exponent bit M_ACC_FLT[18:11] as it is, in response to the mode register setting signal MRS[1:0] of '11'. The second 1:4 multiplexer 5730 may output 7-bit mantissa bits M_ACC_FLT[9:3] obtained by removing an implicit bit M_ACC_FLT[10] and lower 3 bits M_ACC_FLT[2:0] from the 11-bit mantissa bit M_ACC_FLT[10:0], in response to the mode register setting signal MRS[1:0] of '11'. The 8-bit exponent bits M_ACC_FLT[18:11] that are output from the first 1:4 multiplexer 5720 and the 7-bit mantissa bits M_ACC_FLT[9:3] that are output from the second 1:4 multiplexer 5730 may constitute 8-bit exponent bits MAC_RST_FLT_EXP and 7-bit mantissa bits MAC_RST_FLT_MAN of the MAC result data MAC_RST_FLT[15:0], respectively.

If the data type before being modulated is the fourth data type BF16, the first 1:4 multiplexer 5720 may output 8-bit exponent bit M_ACC_FLT[18:11] as it is, in response to the mode register setting signal MRS[1:0] of '11'. The second 1:4 multiplexer 5730 may output 7-bit mantissa bits M_ACC_FLT[9:3] obtained by removing an implicit bit M_ACC_FLT[10] and lower 3 bits M_ACC_FLT[2:0] from the 11-bit mantissa bit M_ACC_FLT[10:0], in response to the mode register setting signal MRS[1:0] of '11'. The 8-bit exponent bits M_ACC_FLT[18:11] that are output from the first 1:4 multiplexer 5720 and the 7-bit mantissa bits M_ACC_FLT[9:3] that are output from the second 1:4 multiplexer 5730 may constitute 8-bit exponent bits MAC_RST_FLT_EXP and 7-bit mantissa bits MAC_RST_FLT_MAN of the MAC result data MAC_RST_FLT[15:0], respectively.

If the data type before being modulated is the fourth data type BF16, the first 1:4 multiplexer 5720 may output 8-bit exponent bit M_ACC_FLT[18:11] as it is, in response to the mode register setting signal MRS[1:0] of '11'. The second 1:4 multiplexer 5730 may output 7-bit mantissa bits M_ACC_FLT[9:3] obtained by removing an implicit bit M_ACC_FLT[10] and lower 3 bits M_ACC_FLT[2:0] from the 11-bit mantissa bit M_ACC_FLT[10:0], in response to the mode register setting signal MRS[1:0] of '11'. The 8-bit exponent bits M_ACC_FLT[18:11] that are output from the first 1:4 multiplexer 5720 and the 7-bit mantissa bits M_ACC_FLT[9:3] that are output from the second 1:4 multiplexer 5730 may constitute 8-bit exponent bits MAC_RST_FLT_EXP and 7-bit mantissa bits MAC_RST_FLT_MAN of the MAC result data MAC_RST_FLT[15:0], respectively.

Figure 79:
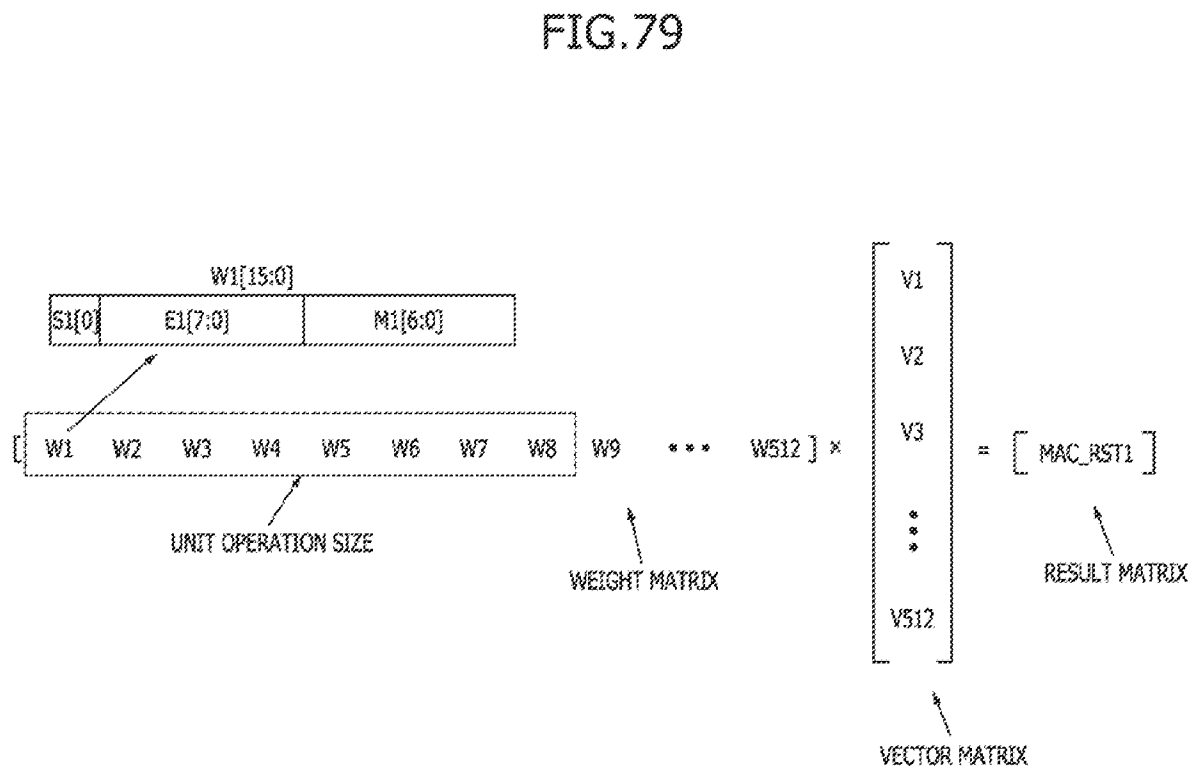

FIG. 79 illustrates an example of matrix multiplication performed in a MAC operator 6000A of FIG. 81 according to another embodiment of the present disclosure and a floating-point format of weight data. Referring to FIG. 79, a MAC operation may be performed by performing matrix multiplication on a weight matrix and a vector matrix to generate a result matrix. The weight matrix may have a plurality of pieces, for example, 512 pieces of weight data W1-W512 as elements. The vector matrix may have a plurality of pieces, for example, 512 pieces of vector data V1-V512 as elements. The result matrix may have MAC result data MAC_RST1 as an element. The weight data W"K" of the "K"$^{th}$ column of the weight matrix ("K" is 1, 2, . . . , 512) may be multiplied by the vector data V"K" of the "K"$^{th}$ row of the vector matrix, and 512 pieces of multiplication data W"K"×V"K" may be generated accordingly. When all 512 pieces of the multiplication data are added, the MAC result data MAC_RST1 may be generated.

Each of the weight data W1-W512 and each of the vector data V1-V512 may be configured in a floating-point format. Hereinafter, it is presupposed that each of the weight data W1-W512 and each of the vector data V1-V512 are in a 16-bit brain floating-point (hereinafter, referred to as "BF16") format. Accordingly, for example, the weight data (first weight data) W1 of the first row and first column of the weight matrix may be composed of 1-bit sign data S1[0], 8-bit first exponent data E1[7:0], and 7-bit first mantissa data M1[6:0]. Although not illustrated in FIG. 79, each of the remaining second to 512$^{th}$ weight data W2-W512 may be equally composed of 1-bit sign data, 8-bit exponent data, and 7-bit mantissa data. In addition, each of the first to 512$^{th}$ vector data V1-V512 of the vector matrix may be equally composed of 1-bit sign data, 8-bit exponent data, and 7-bit mantissa data.

As in the weight matrix of FIG. 79, when the number of pieces of the weight data W1-W512 to be subjected to matrix multiplication exceeds the unit operation size of the MAC operator, the MAC result data MAC_RST1 might not be generated by a single MAC operation. Here, the "unit operation size" may mean the size of the weight data W processed by a single MAC operation. Hereinafter, it is presupposed that the unit operation size of the MAC operator is 128 bits. In this case, because each of the weight data W1-W512 is configured in a 16-bit floating-point format, a single MAC operation may be performed on eight pieces of weight data. Then, the MAC result data MAC_RST1 may be generated by repeatedly performing the MAC operations on eight pieces of weight data 64 times.

Figure 80:
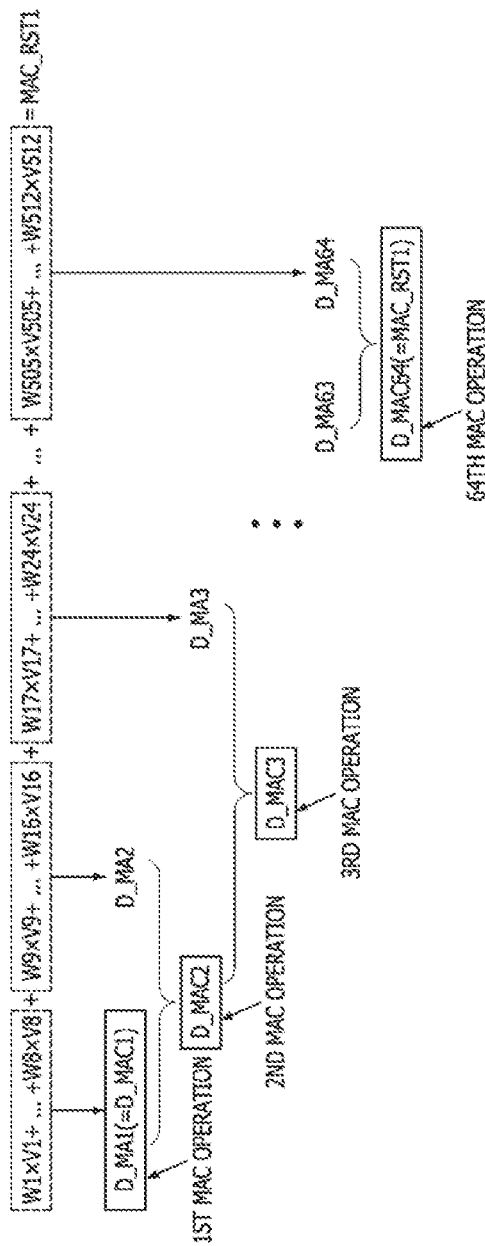
FIG. 80 illustrates a process in which the matrix multiplication of FIG. 79 is performed by the MAC operation of the MAC operator.

FIG. 80 illustrates a process in which the matrix multiplication of FIG. 79 is performed by the MAC operation of the MAC operator 6000A of FIG. 81 according to yet another embodiment of the present disclosure. Referring to FIG. 80, in order to generate the MAC result data MAC_RST1, first to 64$^{th}$ MAC operations may be sequentially performed. Each of the first to 64$^{th}$ MAC operations may be performed on the 8 pieces of weight data and 8 pieces of vector data. Hereinafter, the data generated by the first to 64$^{th}$ MAC operations will be referred to as "first to 64$^{th}$ MAC data D_MAC1-D_MAC64". That is, the first MAC data D_MAC1 may be generated by the first MAC operation. The second MAC data D_MAC2 may be generated by the second MAC operation. Similarly, the 64$^{th}$ MAC data D_MAC64 may be generated by the 64$^{th}$ MAC operation. Each of the first to 64$^{th}$ MAC operations may include a multiplication/addition operation and an accumulation operation. First, in the process of performing the first to 64$^{th}$ MAC operations, first to 64$^{th}$ multiplication accumulation data D_MA1-D_MA64 may be generated through the multiplication/addition operations. Next, the multiplication addition data DMA generated by the multiplication/addition operation and the MAC data D_MAC generated by the previous MAC operation may be accumulated to generate the MAC data D_MAC. The 64$^{th}$ MAC data D_MAC64 generated by the final MAC operation, that is, the accumulation operation of the 64$^{th}$ MAC operation may correspond to the MAC result data MAC_RST1.

Specifically, the first MAC operation may be performed as follows. First, a multiplication/addition operation may be performed on the first to eighth weight data W1-W8 and the first to eighth vector data V1-V8 to generate the first multiplication addition data D_MA1. Next, it is necessary to accumulate the MAC data generated by the previous MAC operation on the first multiplication addition data D_MA1.

However, because there is no MAC data generated by the previous MAC operation, the first multiplication addition data D_MA1 may become to the first MAC data D_MAC1. The second MAC operation may be performed as follows. First, a multiplication/addition operation on the ninth to sixteenth weight data W9-W16 and the ninth to sixteenth vector data V9-V16 may be performed to generate the second multiplication addition data D_MA2. Next, the first MAC data D_MAC1 may be accumulated on the second multiplication addition data D_MA2 to generate the second MAC data D_MAC2. The third MAC operation may be performed as follows. First, a multiplication/addition operation may be performed on the $17^{th}$ to $24^{th}$ weight data W17-W24 and the $17^{th}$ to $24^{th}$ vector data V17-V24 to generate third multiplication addition data D_MA3. Next, the second MAC data D_MAC2 may be accumulated on the third multiplication addition data D_MA3 to generate the third MAC data D_MAC3. The remaining MAC operations may be performed in the same manner. Accordingly, the $64^{th}$ MAC operation may be performed as follows. First, multiplication/addition operations may be performed on the $505^{th}$ to $512^{th}$ weight data W505-W512 and the $505^{th}$ to $512^{th}$ vector data V505-V512 to generate $64^{th}$ multiplication addition data D_MA64. Next, the $63^{rd}$ MAC data D_MAC63 may be accumulated on the $64^{th}$ multiplication addition data D_MA64 to generate the $64^{th}$ MAC data D_MAC64. The $64^{th}$ MAC data D_MAC64 may constitute the MAC result data MAC_RST1.

FIG. 81 is a block diagram illustrating a MAC operator 6000A according to yet another embodiment of the present disclosure. The MAC operator 6000A according to the present embodiment may perform the matrix multiplication of FIG. 79 in the MAC operation method described with reference to FIG. 80. Hereinafter, a case in which the MAC operator 6000A performs the second MAC operation described with reference to FIG. 80 will be shown for example. Because the first MAC operation has already been performed, it is presupposed that the first MAC data D_MAC1 generated by the first MAC operation is latched in an accumulator 6400A of the MAC operator 6000A. Referring to FIG. 81, the MAC operator 6000A according to the present embodiment may include a multiplication circuit 6100, a pre-processing circuit 6200A, an adder tree 6300, an accumulator 6400A, and an output circuit 6500A.

The multiplication circuit 6100 may receive the ninth to sixteenth weight data W9[15:0]-W16[15:0] of the weight matrix and the ninth to sixteenth vector data V9[15:0]-V16[15:0] of the vector matrix. As described with reference to FIG. 79, each of the ninth to sixteenth weight data W9[15:0]-W16[15:0] and each of the ninth to sixteenth vector data V9[15:0]-V16[15:0] may have a BF16 format. The multiplication circuit 6100 may perform multiplication operations on each of the ninth to sixteenth weight data W9[15:0]-W16[15:0] and each of the ninth to sixteenth vector data V9[15:0]-V16[15:0] to output ninth to sixteenth multiplication data WV9[24:0]-WV16[24:0]. In an example, each of the ninth to sixteenth multiplication data WV9[24:0]-WV16[24:0] may have a floating-point format consisting of 1-bit sign data, 8-bit exponent data, and 16-bit mantissa data.

The mantissa data of each of the ninth to sixteenth multiplication data WV9[24:0]-WV16[24:0] may have various numbers of bits according to the configuration of the multiplication circuit 6100. That is, the number of bits of the mantissa data of each of the ninth to sixteenth multiplication data WV9[24:0]-WV16[24:0] may vary depending on whether the multiplication circuit 6100 performs normalization processing. In this embodiment, it is presupposed that normalization processing is not performed in the multiplication circuit 6100. In this case, the mantissa data of each of the ninth to sixteenth multiplication data WV9[24:0]-WV16[24:0] may consist of 16 bits in a form of "11.xxx . . . x" ("x" is a binary value "0" or "1"). Even if the normalization processing is not performed in the multiplication circuit 6100, the number of bits of the mantissa data may be arbitrarily extended in order to increase the accuracy of operation. For example, when the number of bits of the mantissa data is further extended by 6 bits in the multiplication circuit 6100, the mantissa data of each of the ninth to sixteenth multiplication data WV9[24:0]-WV16[24:0] may consist of 22 bits increased by 6 bits from 16 bits. In another embodiment, when the multiplication circuit 6100 is configured to perform normalization processing, the mantissa data of each of the ninth to sixteenth multiplication data WV9[24:0]-WV16[24:0] may consist of 8 bits in the form of "1.xxx . . . x" including an implicit bit.

The pre-processing circuit 6200A may perform pre-processing on the ninth to sixteenth multiplication data WV9[24:0]-WV16[24:0] transmitted from the multiplication circuit 6100 to generate and output ninth to sixteenth pre-processed mantissa data PM_WV9[15:0]-PM_WV16[15:0] and first maximum exponent data E_MAX1[7:0]. Specifically, the pre-processing circuit 6200A may detect exponent data having a greatest value among exponent data of the ninth to sixteenth multiplication data WV9[24:0]-WV16[24:0], and output the detected exponent data as the first maximum exponent data E_MAX1[7:0]. The first maximum exponent data E_MAX1[7:0] output from the pre-processing circuit 6200A may directly transmitted to the accumulator 6400A by skipping the adder tree 6300. The first maximum exponent data E_MAX1[7:0] may constitute exponent data of the second multiplication addition data D_MA2.

In addition, the pre-processing circuit 6200A may perform a shifting operation of shifting the mantissa data of the ninth to sixteenth multiplication data WV9[24:0]-WV16[24:0] by a shift bit of each of the ninth to sixteenth multiplication data WV9[24:0]-WV16[24:0] to generate and output the ninth to sixteenth pre-processed mantissa data PM_WV9[15:0]-PM_WV16[15:0]. In an example, each of the shift bit may be determined by the number of bits such that each of the exponent data of the ninth to sixteenth multiplication data WV9[24:0]-WV16[24:0] has the same value as the first maximum exponent data E_MAX1[7:0], and accordingly, the binary decimal point is shifted in each of the exponent data of the ninth to sixteenth multiplication data WV9[24:0]-WV16[24:0]. The ninth to sixteenth pre-processed mantissa data PM_WV9[15:0]-PM_WV16[15:0] may be transmitted to the adder tree 6300.

The adder tree 6300 may perform an addition operation of summing all of the ninth to sixteenth pre-processed mantissa data PM_WV9[15:0]-PM_WV16[15:0] transmitted from the pre-processing circuit 6200A. The adder tree 6300 may generate and output mantissa data M_MA2[18:0] of the second multiplication addition data D_MA2 in FIG. 80 as a result of the addition operation. In the mantissa data M_MA2[18:0] of the second multiplication addition data D_MA2, the number of bits may be increased during the addition operation in the adder tree 6300. In this example, it is presupposed that the number of bits of the mantissa data M_MA2[18:0] increases by 3 bits during the addition operation in the adder tree 6300. In this case, the mantissa data M_MA2[18:0] may have a size of 19 bits. The mantissa data M_MA2[18:0] of the second multiplication addition data D_MA2 may be transmitted to the accumulator 6400A.

The adder tree 6300 in the MAC operator 6000A according to this example may perform an addition operation on the ninth to sixteenth pre-processed mantissa data PM_WV9[15:0]-PM_WV16[15:0] instead of an addition operation on the floating-point format data. Accordingly, the adder tree 6300 in the MAC operator 6000A according to this example may include integer adders designed for integer operations. In general, in order to configure the adder tree 6300 with integer adders in the MAC operation process for the weight data and vector data of the floating-point format, a floating-point-fixed-point conversion circuit needs to be disposed between the multiplication circuit 6100 and the adder tree 6300. However, in the case of the MAC operator 6000A according to the present embodiment, by arranging the pre-processing circuit 6200A that occupies a relatively small circuit area instead of the floating-point-fixed-point conversion circuit, the adder tree 6300 may be configured with integer adders, and as a result, the total circuit area of the MAC operator 6000A may be reduced.

The accumulator 6400A may receive the first maximum exponent data E_MAX1[7:0], which is the exponent data of the second multiplication addition data D_MA2 transmitted from the pre-processing circuit 6200A. In addition, the accumulator 6400A may receive the mantissa data M_MA2[18:0] of the second multiplication addition data D_MA2 transmitted from the adder tree 6300. The accumulator 6400A may generate and output exponent data E_MAC2[7:0] and mantissa data M_MAC2[6:0] of the second MAC data D_MAC2 of FIG. 80. Specifically, the accumulator 6400A may detect exponent data having a greater absolute value between exponent data of the latch data latched in the accumulator 6400A and the first maximum exponent data E_MAX1[7:0], and perform normalization processing on the detected exponent data to generate normalized accumulative exponent data. The latch data may correspond to the first MAC data D_MAC1 of FIG. 80 generated in the previously performed first MAC operation. The accumulator 6400A may latch the normalized accumulative exponent data. The normalized accumulative exponent data latched in the accumulator 6400A may be used as exponent data of the latch data in the following third MAC operation. The accumulator 6400A may output the exponent data of the latch data as the exponent data E_MAC2[7:0] of the second MAC data D_MAC2.

In addition, the accumulator 6400A may perform shifting processing on one of the mantissa data of the latch data and the mantissa data M_MA2[18:0] of the second multiplication addition data D_MA2 so that the first maximum exponent data E_MAX1[7:0] and the exponent data of the latch data have the same value, and then, perform an accumulative addition operation. The accumulator 6400A may perform normalization processing such that the accumulative mantissa data generated by the accumulative addition operation has a standard format, that is, a 7-bit size without an implicit bit to generate the normalized accumulative mantissa data. The accumulator 6400A may latch the normalized accumulative mantissa data. The normalized accumulative mantissa data latched in the accumulator 6400A may be used as mantissa data of the latch data in the following third MAC operation. The accumulator 6400A may output the normalized accumulative mantissa data as mantissa data M_MAC2[6:0] of the second MAC data D_MAC2. The exponent data E_MAC2[7:0] and mantissa data M_MAC2[6:0] of the second MAC data D_MAC2 output from the accumulator 6400A may be transmitted to the output circuit 6500A.

The output circuit 6500A may receive the MAC result read signal MAC_RD_RST as a control signal. In addition, the output circuit 6500A may output or might not output the exponent data and mantissa data transmitted from the accumulator 6400A as the MAC result data according to the MAC result read signal MAC_RD_RST. As in this embodiment, when the MAC operation is not completed, the MAC result read signal MAC_RD_RST may be provided as, for example, a logic 'low' signal. In this case, the output circuit 6500A might not output the MAC result data MAC_RST1[15:0]. On the other hand, although not shown in FIG. 81, when the 64$^{th}$ MAC operation is performed and the MAC operation is completed, the MAC result read signal MAC_RD_RST of a logic "high" level may be provided to the output circuit 6500A. In this case, the output circuit 6500A may output the MAC result data MAC_RST1[15:0] including exponent data and mantissa data of the 64$^{th}$ MAC data D_MAC64 of FIG. 80.

Figure 82:
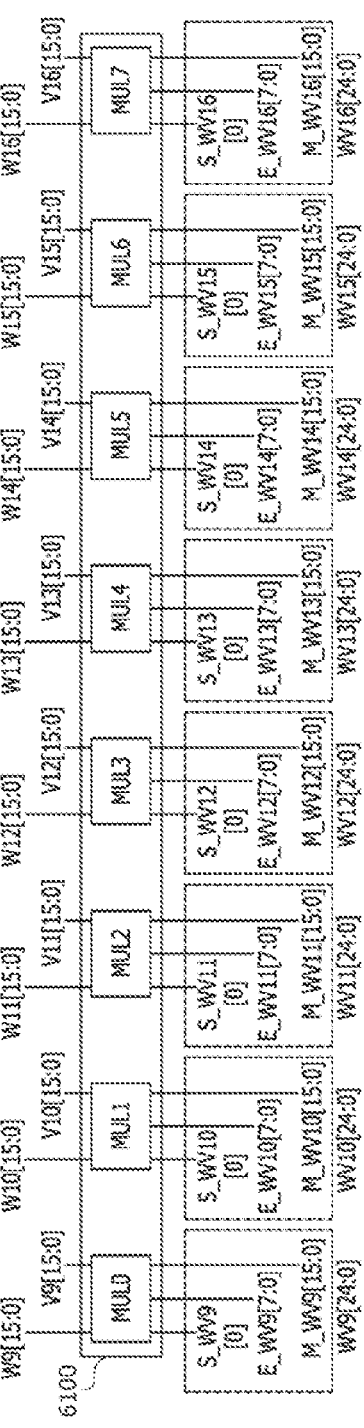
FIG. 82 is a block diagram illustrating an example of a configuration of a multiplication circuit of the MAC operator of FIG. 81.

FIG. 82 is a block diagram illustrating an example of a configuration of the multiplication circuit 6100 of the MAC operator 6000A of FIG. 81. The multiplication circuit 6100 may, as described with reference to FIG. 81, perform multiplication operations on each of the ninth to sixteenth weight data W9[15:0]-W16[15:0] and each of the ninth to sixteenth vector data V9[15:0]-V16[15:0] to output the ninth to sixteenth multiplication data WV9[24:0]-WV16[24:0].

Referring to FIG. 82, the multiplication circuit 6100 may include a plurality of, for example, first to eighth multipliers MUL0-MUL7. Each of the first to eighth multipliers MUL0-MUL7 may have the same configuration as the first multiplier MUL0 in FIG. 33 described with reference to FIG. 33. Specifically, the first multiplier MUL0 may perform a multiplication operation on the ninth weight data W9[15:0] and the ninth vector data V9[15:0] to output 25-bit ninth multiplication data WV9[24:0]. The ninth multiplication data WV9[24:0] may be composed of 1-bit sign data S_WV9[0], 8-bit exponent data E_WV9[7:0], and 16-bit mantissa data M_WV9[15]. Similarly, the second multiplier MUL1 may perform a multiplication operation on the tenth weight data W10[15:0] and the tenth vector data V10[15:0] to output 25-bit tenth multiplication data WV10[24:0]. The tenth multiplication data WV10[24:0] may also be composed of 1-bit sign data S_WV10[0], 8-bit exponent data E_WV10[7:0], and 16-bit mantissa data M_WV10[15:0]. The remaining multipliers MUL2-MUL7 may also perform the same operations, and accordingly, the eighth multiplier MUL7 may perform a multiplication operation on the sixteenth weight data W16[15:0] and the sixteenth vector data V16[15:0] to output 25-bit sixteenth multiplication data WV16[24:0]. The sixteenth multiplication data WV16[24:0] may also be composed of 1-bit sign data S_WV16[0], 8-bit exponent data E_WV16[7:0], and 16-bit mantissa data M_WV16[15:0].

Figure 83:
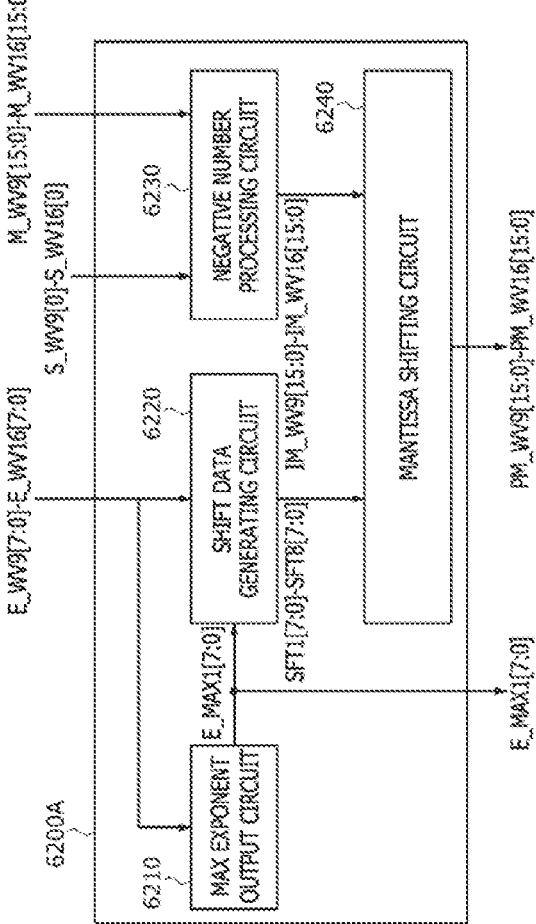
FIG. 83 is a block diagram illustrating an example of a configuration of a pre-processing circuit of the MAC operator of FIG. 81.

FIG. 83 is a block diagram illustrating an example of a configuration of the pre-processing circuit 6200A of the MAC operator 6000A of FIG. 81. FIGS. 84, 85, 86, and 87 are block diagrams illustrating examples of configurations of a maximum exponent output circuit 6210, a shift data generating circuit 6220, a negative number processing circuit 6230, and a mantissa shifting circuit 6240 of the pre-processing circuit 6200 of FIG. 83, respectively. As described above with reference to FIG. 81, the pre-processing circuit 6200A may receive the ninth to sixteenth multiplication data WV9[24:0]-WV16[24:0] from the multiplication circuit 6100 to generate and output the first maximum exponent data E_MAX1[7:0] and ninth to sixteen pre-processed mantissa data PM_WV9[15:0]-PM_WV16[15:0]. Referring to FIG. 83, the pre-processing circuit 6200A may include the maximum exponent output circuit 6210, the shift data generating circuit 6220, the negative number processing circuit 6230, and the mantissa shifting circuit 6240.

Figure 84:
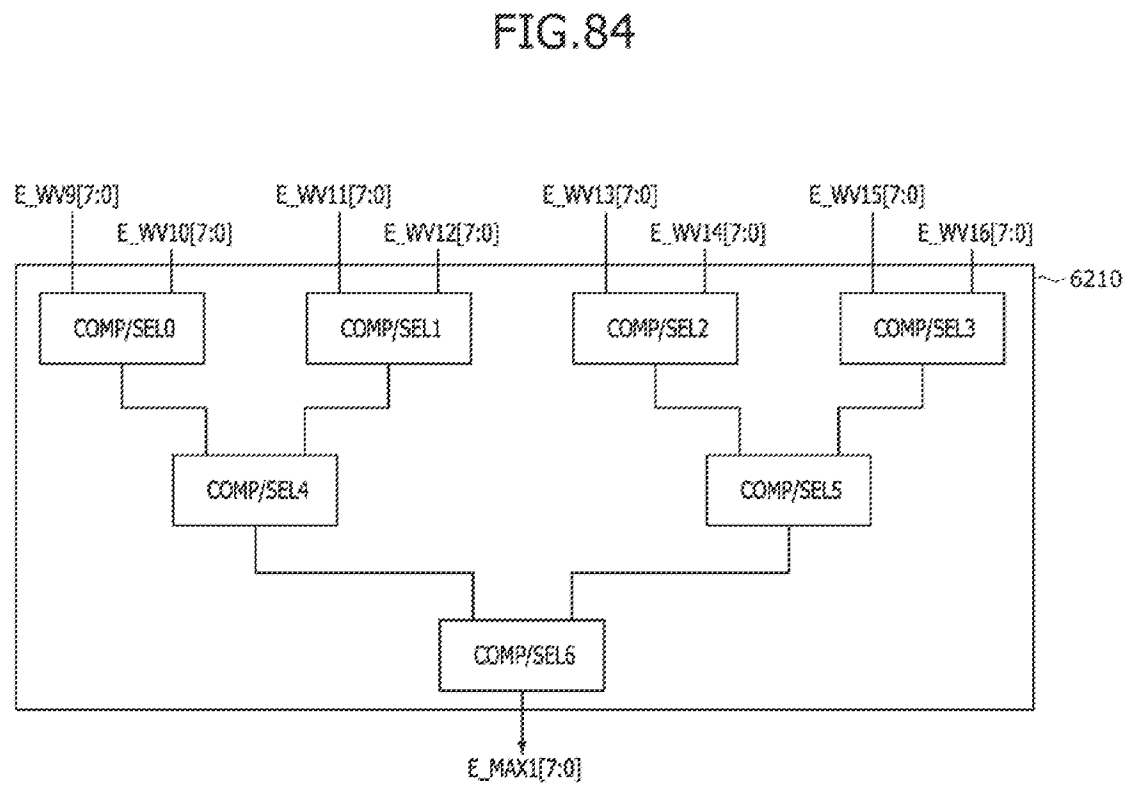

The maximum exponent output circuit 6210 of the preprocessing circuit 6200A may receive the ninth to sixteenth exponent data E_WV9[7:0]-E_WV16[7:0] of the ninth to sixteenth multiplication data WV9[24:0]-WV16[24:0] and output the first maximum exponent data E_MAX1[7:0]. The first maximum exponent data E_MAX1[7:0] may be composed of exponent data having a largest absolute value among the ninth to sixteenth exponent data E_WV9[7:0]-E_WV16[7:0]. The first maximum exponent data E_MAX1 [7:0] may be transmitted to the shift data generating circuit 6220 and the accumulator 6140 of FIG. 81. Specifically, as illustrated in FIG. 84, the maximum exponent output circuit 6210 may include first to seventh comparators/selectors COMP/SEL0-COMP/SEL6. Each of the first to seventh comparators/selectors COMP/SEL0-COMP/SEL6 may include two input terminals and one output terminal. In an example, the first to seventh comparators/selectors COMP/SEL0-COMP/SEL6 may be arranged in a hierarchical structure such as a tree structure. The first to fourth comparators/selectors COMP/SEL0-COMP/SEL3 may be disposed at a beginning stage. The fifth and sixth comparators/selectors COMP/SEL4 and COMP/SEL5 may be disposed at an intermediate stage. The seventh comparator/selector COMP/SEL6 may be disposed at a last stage. Hereinafter, the terms "beginning stage" and "last stage" may be used with the same meaning as "uppermost stage" and "lowermost stage", respectively.

The first comparator/selector COMP/SEL0 may receive the ninth exponent data E_WV9[7:0] of the ninth multiplication data WV9[24:0] and the tenth exponent data E_WV9[7:0] of the tenth multiplication data WV10[24:0] through the two input terminals, respectively. The first comparator/selector COMP/SEL0 may compare the ninth exponent data E_WV9[7:0] and the tenth exponent data E_WV10[7:0] to output the exponent data having a greater value through the output terminal. The second comparator/selector COMP/SEL1 may receive the eleventh exponent data E_WV11[7:0] of the eleventh multiplication data WV11[24:0] and the twelfth exponent data E_WV12[7:0] of the twelfth multiplication data WV12[24:0] through the two input terminals, respectively. The second comparator/selector COMP/SEL1 may compare the eleventh exponent data E_WV11[7:0] and the twelfth exponent data E_WV12[7:0] to output the exponent data having a greater value through the output terminal. The third comparator/selector COMP SEL2 may receive the thirteenth exponent data E_WV13[7:0] of the thirteenth multiplication data WV13[24:0] and the fourteenth exponent data E_WV14[7:0] of the fourteenth multiplication data WV14[24:0] through the two input terminals, respectively. The third comparator/selector COMP/SEL2 may compare the thirteenth exponent data E_WV13[7:0] and the fourteenth exponent data E_WV14[7:0] to output the exponent data having a greater value through the output terminal. The fourth comparator/selector COMP/SEL3 may receive the fifteenth exponent data E_WV15[7:0] of the fifteenth multiplication data WV15[24:0] and the sixteenth exponent data E_WV16[7:0] of the sixteenth multiplication data WV16[24:0] through the two input terminals, respectively. The fourth comparator/selector COMP/SEL3 may compare the fifteenth exponent data E_WV15[7:0] and the sixteenth exponent data E_WV16[7:0] to output the exponent data having a greater value through the output terminal.

The fifth comparator/selector COMP/SEL4 of the intermediate stage may receive the exponent data output from the first and second comparators/selectors COMP/SEL0 and COMP/SEL1 through the two input terminals. The fifth comparator/selector COMP/SEL4 may compare the received exponent data to output the exponent data having a greater value through the output terminal. The sixth comparator/selector COMP/SEL5 may receive the exponent data output from the third and fourth comparators/selectors COMP/SEL2 and COMP/SEL3 through the two input terminals. The sixth comparator/selector COMP/SEL5 may compare the received exponent data to output the exponent data having a greater value through the output terminal. The seventh comparator/selector COMP/SEL6 of the lowermost stage may receive the exponent data output from the fifth and sixth comparators/selectors COMP/SEL4 and COMP/SEL5 through the two input terminals. The seventh comparator/selector COMP/SEL6 may compare the received exponent data to output the exponent data having a greater value as the first maximum exponent data E_MAX1[7:0] through the output terminal. As a result, the exponent data having the greatest absolute value among the ninth to sixteenth exponent data E_WV9[7:0]-E_WV16[7:0] may be output as the first maximum exponent data E_MAX1[7:0] from the maximum exponent output circuit 6210.

Referring back to FIG. 83, the shift data generating circuit 6220 may receive the first maximum exponent data E_MAX1[7:0] from the maximum exponent output circuit 6210. The shift data generating circuit 6220 may receive the ninth to sixteenth exponent data E_WV9[7:0]-E_WV16[7:0] of the ninth to sixteenth multiplication data WV9[24:0]-WV16[24:0] from the multiplication circuit 6100. The shift data generating circuit 6220 may perform subtraction operations on each of the first maximum exponent data E_MAX1[7:0] and the ninth to sixteenth exponent data E_WV9[7:0]-E_WV16[7:0] to generate first to eighth shift data SFT1[7:0]-SFT8[7:0]. Specifically, the shift data generating circuit 6220 may transmit the first to eighth shift data SFT1[7:0]-SFT8[7:0] to the mantissa shifting circuit 6240.

Figure 85:
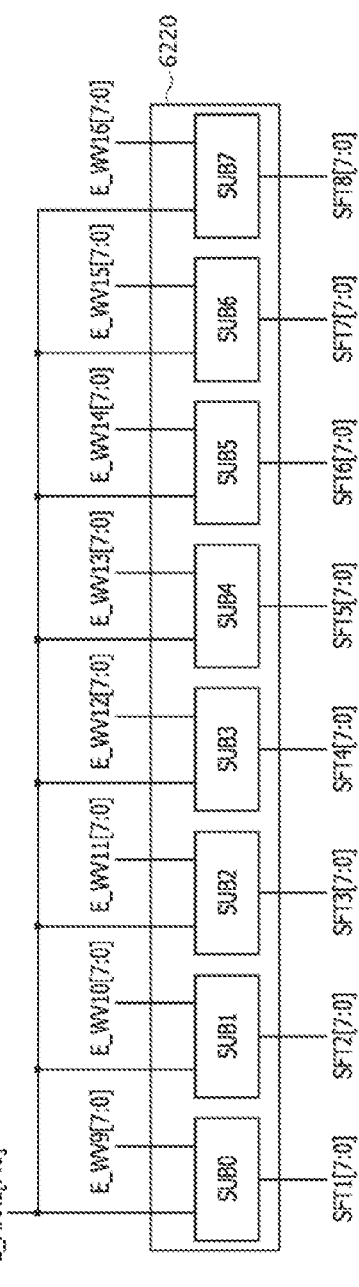
FIG. 85 is a block diagram illustrating an example of a configuration of a shift data generation circuit of the pre-processing circuit of FIG. 83.

As illustrated in FIG. 85, the shift data generating circuit 6220 may include first to eighth subtractors SUB0-SUB7. The number of subtractors constituting the shift data generating circuit 6220 may be the same as the number of multipliers MUL0-MUL7 constituting the multiplication circuit 6100 in FIG. 82. The first to eighth subtractors SUB0-SUB7 may be arranged in parallel in the shift data generating circuit 6220. Accordingly, the first to eighth subtractors SUB0-SUB7 may operate independently of each other. Each of the first to eighth subtractors SUB0-SUB7 may have two input terminals and one output terminal. The first to eighth subtractors SUB0-SUB7 may commonly receive the first maximum exponent data E_MAX1[7:0] through their one input terminal. The first to eighth subtractors SUB0-SUB7 may respectively receive the ninth to sixteenth exponent data E_WV9[7:0]-E_WV16[7:0] through different input terminals from each other. The first to eighth subtractors SUB0-SUB7 may respectively subtract the ninth to sixteenth exponent data E_WV9[7:0]-E_WV16[7:0] from the first maximum exponent data E_MAX1[7:0] to generate and output the shift data SFT1[7:0]-SFT8[7:0].

Specifically, the first subtractor SUB0 may subtract the ninth exponent data E_WV9[7:0] from the first maximum exponent data E_MAX1[7:0] to generate and output the first shift data SFT1[7:0]. When the ninth exponent data E_WV9[7:0] is the first maximum exponent data E_MAX1[7:0], the first shift data SFT1[7:0] may have a binary value of "0". When the ninth exponent data E_WV9[7:0] is not the first maximum exponent data E_MAX1[7:0], the first shift data SFT1[7:0] may correspond to a result of subtracting the ninth exponent data E_WV9[7:0] from the first maximum exponent data E_MAX1[7:0]. The second subtractor SUB1 may subtract the tenth exponent data E_WV10[7:0] from the first maximum exponent data E_MAX1[7:0] to generate and output the second shift data SFT2[7:0]. When the tenth exponent data E_WV10[7:0] is the first maximum exponent data E_MAX1[7:0], the second shift data SFT2[7:0] may have a binary value of "0". When the tenth exponent data E_WV10[7:0] is not the first maximum exponent data E_MAX1[7:0], the second shift data SFT2[7:0] may correspond to a result of subtracting the tenth exponent data E_WV10[7:0] from the first maximum exponent data E_MAX1[7:0]. The remaining third to eighth subtractors SUB2-SUB7 may also generate and output the third to eighth shift data SFT3[7:0]-SFT8[7:0], respectively, in the same manner.

Referring back to FIG. 83, the negative number processing circuit 6230 may receive ninth to sixteenth sign data S_WV9[0]-S_WV16[0] and ninth to sixteenth mantissa data M_WV9[15:0]-M_WV16[15:0] from the ninth to sixteenth multiplication data WV9[24:0]-WV16[24:0] output from the multiplication circuit 6100. The negative number processing circuit 6230 may output the ninth to sixteenth mantissa data WV16[15:0] or may output 2's complements of the ninth to sixteenth mantissa data M_WV9[15:0]-M_WV16[15:0] according to the values of the ninth to sixteenth sign data S_WV9[0]-S_WV16[0]. Hereinafter, data output from the negative number processing circuit 6230 will be referred to as "ninth to sixteenth intermediate mantissa data IM_WV9[15:0]-IM_WV16[15:0]". The ninth to sixteenth intermediate mantissa data IM_WV9[15:0]-IM_WV16[15:0] may be transmitted to the mantissa shifting circuit 6240.

Figure 86:
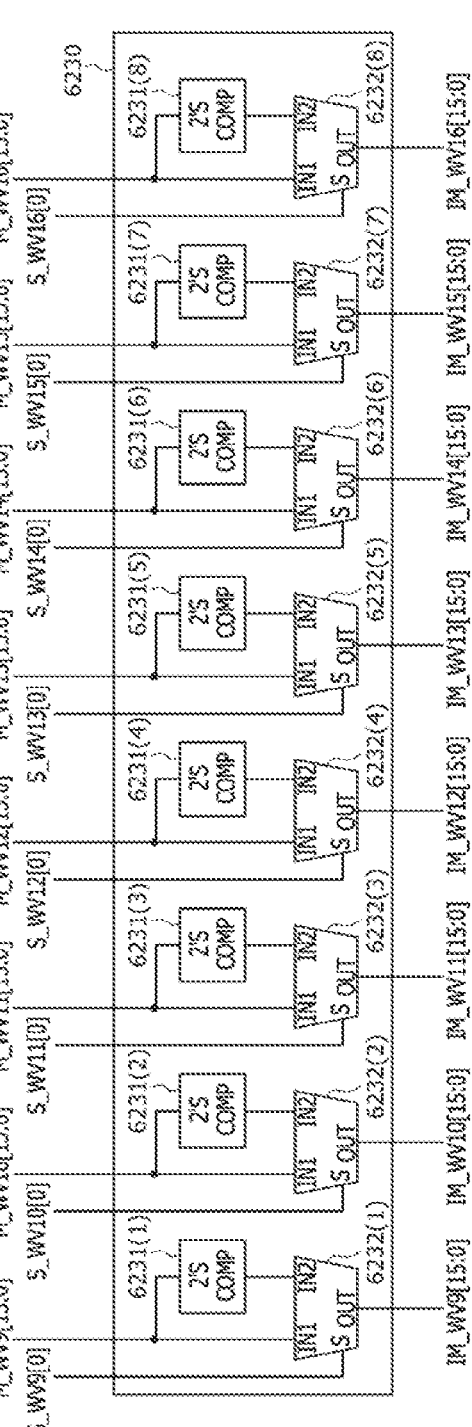
FIG. 86 is a block diagram illustrating an example of a configuration of a negative number processing circuit of the pre-processing circuit of FIG. 83.

Specifically, as illustrated in FIG. 86, the negative number processing circuit 6230 may include first to eighth 2's complement circuits (2'S COMP) 6231(1)-6231(8), and first to eighth 2:1 multiplexers 6232(1)-6232(8). The number of two's complement circuits 6231(1)-6231(8) and the number of multiplexers 6232(1)-6232(8) constituting the negative number processing circuit 6230 may be equal to or greater than the number of multipliers MUL0-MUL7 constituting the multiplication circuit 6100 in FIG. 82. Each of the first to eighth 2's complement circuits 6231(1)-6231(8) may receive the ninth to sixteenth mantissa data M_WV9[15:0]-M_WV16[15:0] of the ninth to sixteenth multiplication data WV9[24:0]-WV16[24:0], respectively, and generate and output the 2's complement of the ninth to sixteenth mantissa data M_WV9[15:0]-11 WV16[15:0], respectively. Specifically, the first 2's complement circuit 6231(1) may receive the ninth mantissa data M_WV9[15:0] and generate a 2's complement of the ninth mantissa data M_WV9[15:0] to transmit the generated 2's complement of the ninth mantissa data M_WV9[15:0] to a second input terminal IN2 of the first 2:1 multiplexer 6232(1). The second first 2's complement circuit 6231(2) may receive the tenth mantissa data M_WV10[15:0] and generate a 2's complement of the tenth mantissa data M_WV10[15:0] to transmit the generated 2's complement of the tenth mantissa data M_WV10[15:0] to a second input terminal IN2 of the second 2:1 multiplexer 6232(2). The third 2's complement circuit 6231(3) may receive the eleventh mantissa data M_WV11[15:0] and generate a 2's complement of the eleventh mantissa data M_WV11[15:0] to transmit the generated 2's complement of the eleventh mantissa data M_WV11[15:0] to a second input terminal IN2 of the third 2:1 multiplexer 6232(3). The remaining fourth to eighth 2's complement circuits 6231(4)-6231(8) may also generate a 2's complement of each of the twelfth to sixteenth mantissa data M_WV12[15:0]-M_WV16[15:0] to transmit the generated 2's complement of each of the twelfth to sixteenth mantissa data M_WV12[15:0]-M_WV16[15:0] to a second input terminal IN2 of each of the fourth to eighth 2:1 multiplexers 6232(4)-6232(8).

Each of the first to eighth 2:1 multiplexers 6232(1)-6232(8) may include a first input terminal IN1, the second input terminal IN2, a selection terminal S, and an output terminal OUT. The first to eighth 2:1 multiplexers 6232(1)-6232(8) may receive the ninth to sixteenth mantissa data M_WV9[15:0]-M_WV16[15:0] of the ninth to sixteenth multiplication data WV9[24:0]-WV16[24:0], respectively, through the first input terminals IN1. The first to eighth 2:1 multiplexers 6232(1)-6232(8) may receive the 2's complements of the ninth to sixteenth mantissa data M_WV9[15:0]-M_WV16[15:0], respectively, through the second input terminals IN2. The first to eighth 2:1 multiplexers 6232(1)-6232(8) may receive the ninth to sixteenth sign data S_WV9[0]-S_WV16[0] of the ninth to sixteenth multiplication data WV9[24:0]-WV16[24:0], respectively, through the selection terminals S. Each of the first to eighth 2:1 multiplexers 6232(1)-6232(8) may output mantissa data or a 2's complement of the mantissa data as the intermediate mantissa data through the output terminal OUT according to the value of each of the sign data.

For example, the first 2:1 multiplexer 6232(1) may receive the ninth mantissa data M_WV9[15:0] through the first input terminal IN1, and receive the 2's complement of the ninth mantissa data M_WV9[15:0] transmitted from the first 2's complement circuit 6231(1) through the second input terminal IN2. When the ninth sign data S_WV9[0] received through the selection terminal S is "0" indicating a positive number, the first 2:1 multiplexer 6232(1) may output the ninth mantissa data M_WV9[15:0] input through the first input terminal IN1 as the ninth intermediate mantissa data IM_WV9[15:0]. On the other hand, when the ninth sign data S_WV9[0] received through the selection terminal S is "1" indicating a negative number, the first 2:1 multiplexer 6232(1) may output the 2's complement of the ninth mantissa data M_WV9[15:0] input through the second input terminal IN2 as the first intermediate mantissa data IM_WV1[15:0]. The second 2:1 multiplexer 6232(2) may receive the tenth mantissa data M_WV10[15:0] through the first input terminal IN1, and receive the 2's complement of the tenth mantissa data M_WV10[15:0] transmitted from the second 2's complement circuit 6231(2) through the second input terminal IN2. When the tenth sign data S_WV10[0] received through the selection terminal S is "0" indicating a positive number, the second 2:1 multiplexer 6232(2) may output the tenth mantissa data M_WV10[15:0] input through the first input terminal IN1 as the tenth intermediate mantissa data IM_WV10[15:0]. On the other hand, when the tenth sign data S_WV10[0] received through the selection terminal S is "1" indicating a negative number, the second 2:1 multiplexer 6232(2) may output the 2's complement of the tenth mantissa data M_WV10[15:0] input through the second input terminal IN2 as the tenth intermediate mantissa data IM_WV10[15:0]. The remaining third to eighth 2:1 multiplexers 6232(3)-6232(8) may also output the eleventh to sixteenth intermediate mantissa data IM_WV11[15:0]-IN_WV16[15:0], respectively, in the same manner.

Referring back to FIG. 83, the mantissa shifting circuit 6240 may receive the first to eighth shift data SFT1[7:0]-SFT8[7:0] from the shift data generating circuit 6220 and receive the ninth to sixteenth intermediate mantissa data IM_WV9[15:0]-IM_WV16[15:0] from the negative number processing circuit 6230. The mantissa shifting circuit 6240 may perform shifting operations on each of the ninth to sixteenth intermediate mantissa data IN1_WV9[15:0]-IM_WV16[15:0] by the number of bits of an absolute value of each of the first to eighth shift data SFT1[7:0]-SFT8[7:0] to generate the ninth to sixteenth pre-processed mantissa data PM_WV9[15:0]-PM_WV16[15:0]. The ninth to sixteenth pre-processed mantissa data PM_WV9[15:0]-PM_WV16[15:0] may be transmitted to the adder tree (6300 of FIG. 81).

Figure 87:
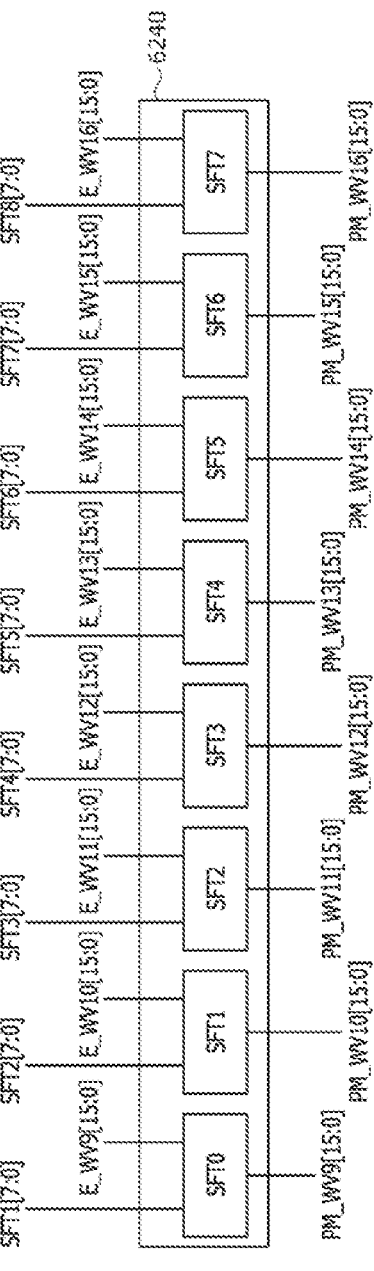
FIG. 87 is a block diagram illustrating an example of a configuration of a mantissa shifting circuit of the pre-processing circuit of FIG. 83.

Specifically, as illustrated in FIG. 87, the mantissa shifting circuit 6240 may include first to eighth shifters SFT0-SFT7. The number of shifters constituting the mantissa shifting circuit 6240 may be equal to or greater than the number of multipliers MUL0-MUL7 of the multiplication circuit 6100 of FIG. 82. The first to eighth shifters SFT0-SFT7 may be arranged in parallel in the mantissa shifting circuit 6240. Accordingly, the first to eighth shifters SFT0-SFT7 may operate independently of each other. Each of the first to eighth shifters SFT0-SFT7 may have two input terminals and one output terminal. The first to eighth shifters SFT0-SFT7 may receive the first to eighth shift data SFT1[7:0]-SFT8[7:0], respectively, through first input terminals. The first to eighth shifters SFT0-SFT7 may receive the ninth to sixteen intermediate mantissa data IM_WV9[15:0]-IM_WV16[15:0], respectively, through second input terminals. Each of the first to eighth shifters SFT0-SFT7 may shift the intermediate mantissa data input through the second input terminal by the number of bits corresponding to an absolute value of the shift data input through the first input terminal to generate and output the pre-processed mantissa data.

Specifically, the first shifter SFT0 may shift the ninth intermediate mantissa data IM_WV9[15:0] input through the second input terminal by the number of bits corresponding to an absolute value of the first shift data SFT1[7:0] input through the first input terminal to generate and output the first pre-processed mantissa data PM_WV1[15:0]. The second shifter SFT1 may shift the tenth intermediate mantissa data IM_WV10[15:0] input through the second input terminal by the number of bits corresponding to an absolute value of the second shift data SFT2[7:0] input through the first input terminal to generate and output the tenth pre-processed mantissa data PM_WV10[15:0]. The remaining third to eighth shifters SFT2-SFT7 may also generate and output the eleventh to sixteenth pre-processed mantissa data PM_WV11[15:0]-PM_WV16[15:0], respectively, in the same manner.

Figure 88:
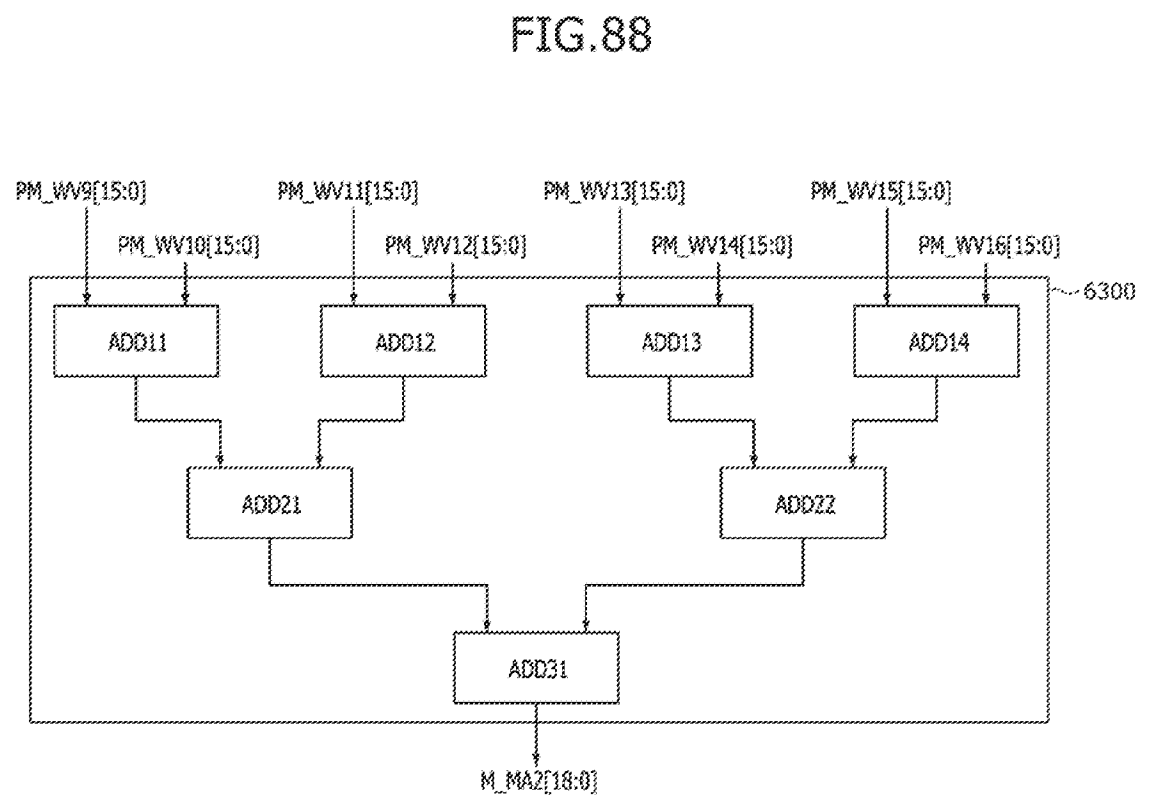

FIG. 88 is a block diagram illustrating an example of a configuration of the adder tree 6300 of the MAC operator 6000A of FIG. 81. Referring to FIG. 88, the adder tree 6300 may receive the ninth to sixteenth pre-processed mantissa data PM_WV9[15:0]-PM_WV16[15:0] from the pre-processing circuit 6200A. The adder tree 6300 may add all of the ninth to sixteenth pre-processed mantissa data PM_WV9[15:0]-PM_WV16[15:0] to generate and output the mantissa data M_MA2[18:0] of the second multiplication addition data D_MA2 of FIG. 80. The adder tree 6300 may include a plurality of, for example, first to seventh adders ADD11-ADD31. Each of the first to seventh adders ADD11-ADD31 may include two input terminals and one output terminal. In an example, the first to seventh adders ADD11-ADD31 may be arranged in a hierarchical structure such as a tree structure. The first to fourth adders ADD11-ADD14 may be arranged at a beginning stage. The fifth and sixth adders ADD21 and ADD22 may be arranged at an intermediate stage. The seventh adder ADD31 may be arranged at a last stage.

The first adder ADD11 may receive the ninth pre-processed mantissa data PM_WV9[15:0] and the tenth pre-processed mantissa data PM_WV10[15:0] through a first input terminal and a second input terminal, respectively. The first adder ADD11 may perform an addition operation on the ninth pre-processed mantissa data PM_WV9[15:0] and the tenth pre-processed mantissa data PM_WV10[15:0] and output mantissa data generated as result data of the addition operation. The second adder ADD12 may receive the eleventh pre-processed mantissa data PM_WV11[15:0] and the twelfth pre-processed mantissa data PM_WV12[15:0] through a first input terminal and a second input terminal, respectively. The second adder ADD12 may perform an addition operation on the eleventh pre-processed mantissa data PM_WV11[15:0] and the twelfth pre-processed mantissa data PM_WV12[15:0] and output mantissa data generated as result data of the addition operation. The third adder ADD13 may receive the thirteenth pre-processed mantissa data PM_WV13[15:0] and the fourteenth pre-processed mantissa data PM_WV14[15:0] through a first input terminal and a second input terminal, respectively. The third adder ADD13 may perform an addition operation on the thirteenth pre-processed mantissa data PM_WV13[15:0] and the fourteenth pre-processed mantissa data PM_WV14[15:0] and output mantissa data generated as result data of the addition operation. The fourth adder ADD14 may receive the fifteenth pre-processed mantissa data PM_WV15[15:0] and the sixteenth pre-processed mantissa data PM_WV16[15:0] through a first input terminal and a second input terminal, respectively. The fourth adder ADD14 may perform an addition operation on the fifteenth pre-processed mantissa data PM_WV15[5:0] and the sixteenth pre-processed mantissa data PM_WV16[15:0] and output mantissa data generated as result data of the addition operation.

The fifth adder ADD21 of the intermediate stage may receive the mantissa data output from the first adder ADD11 and the mantissa data output from the second adder ADD12 through a first input terminal and a second input terminal, respectively. The fifth adder ADD21 may perform an addition operation on the received mantissa data and output mantissa data generated as result data of the addition operation. The sixth adder ADD22 of the intermediate stage may receive the mantissa data output from the third adder ADD13 and the mantissa data output from the fourth adder ADD14 through a first input terminal and a second input terminal, respectively. The sixth adder ADD22 may perform an addition operation on the received mantissa data and output mantissa data generated as result data of the addition operation. The seventh adder ADD31 of the lowermost stage may receive the mantissa data output from the fifth adder ADD21 and the mantissa data output from the sixth adder ADD22 through a first input terminal and a second input terminal, respectively. The seventh adder ADD31 may perform an addition operation on the received mantissa data and output mantissa data generated as result data of the addition operation as the mantissa data M_MA2[18:0] of the second multiplication data D_MA2. Whenever the addition operation in each stage in the adder tree 6300 is performed, the addition result data may have the number of bits increased by one bit as a carry bit. Accordingly, the mantissa data M_MA2[18:0] of the second multiplication data D_MA2 may be composed of 19 bits, which is 3 bits more than the number of bits of each of the ninth to sixteenth pre-processed mantissa data PM_WV9[15:0]-PM_WV16[15:0].

Figure 89:
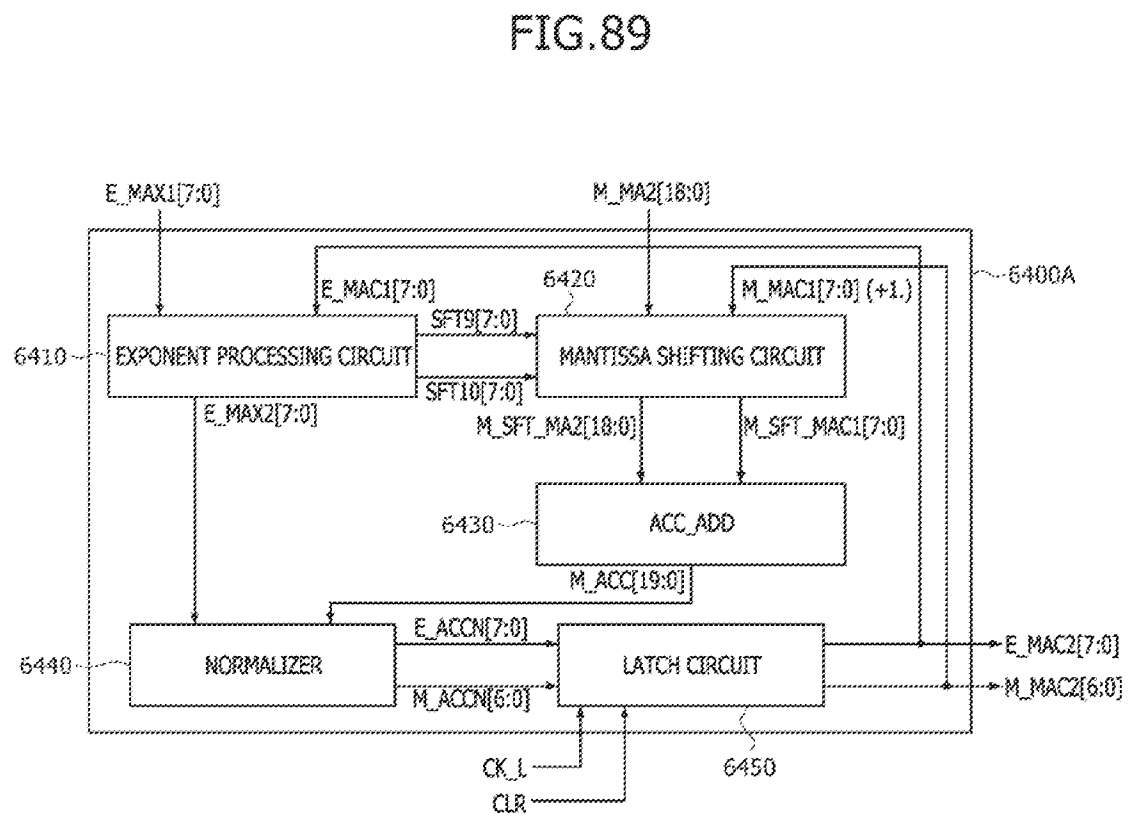
Figure 91:
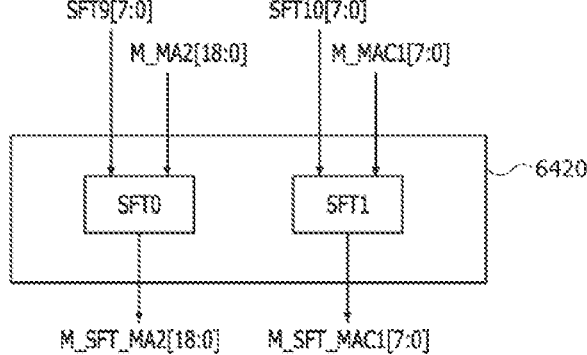
FIG. 91 is a block diagram illustrating an example of a configuration of a mantissa shifting circuit of the accumulator of FIG. 89.
Figure 92:
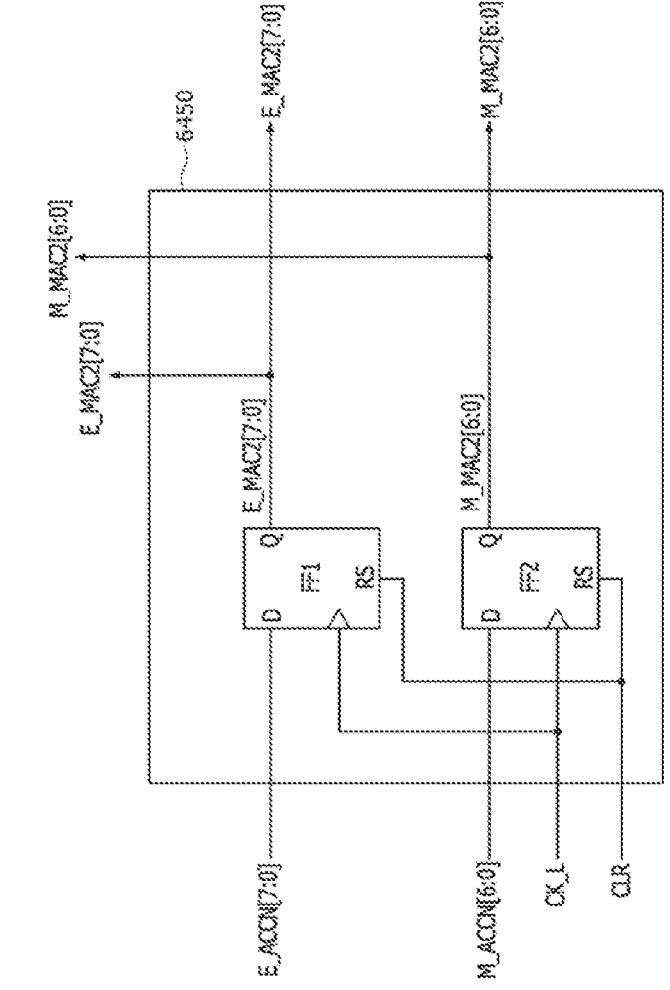
FIG. 92 is a circuit diagram illustrating an example of a configuration of a latch circuit of the accumulator of FIG. 89.
Figure 93:
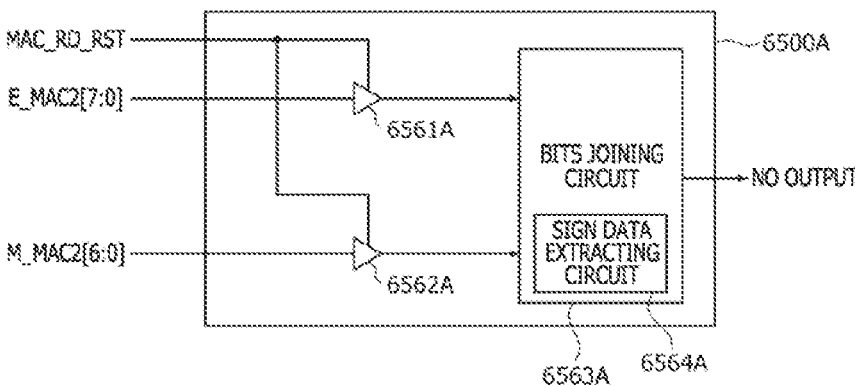
FIG. 93 is a circuit diagram illustrating an example of a configuration of an output circuit of the MAC operator of FIG. 81.

FIG. 89 is a circuit diagram illustrating an example of a configuration of the accumulator 6400A of the MAC operator 6000A of FIG. 81, FIGS. 90, 91, and 92 are diagrams illustrating examples of the configurations of the exponent processing circuit 6410, the mantissa shifting circuit 6420, and the latch circuit 6450 of the accumulator 6400A of FIG. 89, respectively, and FIG. 93 is a diagram illustrating an example of the configuration of the output circuit 6500A of the MAC operator 6000A of FIG. 81. As described above with reference to FIG. 81, the accumulator 6400A may receive the first maximum exponent data E_MAX1[7:0] from the pre-processing circuit 6200A of FIG. 81, and may receive the mantissa data M_MA2[18:0] of the second multiplication addition data D_MA2 from the adder tree 6300 of FIG. 81. The accumulator 6400A may receive a latch clock signal CK_L and a clear signal CLR as control signals necessary for a latch operation. The accumulator 6400A may generate and output the exponent data E_MAC2 [7:0] and the mantissa data M_MAC2[6:0] of the second MAC data D_MAC2. Referring to FIG. 89, the accumulator 6400A may include the exponent processing circuit 6410, the mantissa shifting circuit 6420, the accumulative adder (ACC_ADD) 6430, a normalizer 6440, and the latch circuit 6450.

The exponent processing circuit 6410 of the accumulator 6400A may receive the exponent data of the latch data fed back from the latch circuit 6450 and the first maximum exponent data E_MAX1[7:0] transmitted from the pre-processing circuit 6200A in FIG. 81. The latch data may be composed of the first MAC data D_MAC1 latched in the latch circuit 6450 by the previous MAC operation, that is, the first MAC operation. Accordingly, the exponent data E_MAC1[7:0] of the first MAC data D_MAC1 may be fed back to the exponent processing circuit 6410 as the exponent data of the latch data. The exponent processing circuit 6410 may output exponent data having a greater value between the exponent data E_MAC1[7:0] of the latch data and the first maximum exponent data E_MAX1[7:0] as second maximum exponent data E_MAX2 [7:0]. When the value of the exponent data E_MAC1[7:0] of the latch data is greater than the value of the first maximum exponent data E_MAX1 [7:0], the exponent processing circuit 6410 may output the exponent data E_MAC1[7:0] of the latch data as the second maximum exponent data E_MAX2[7:0]. When the value of the first maximum exponent data E_MAX1[7:0] is greater than the value of the exponent data E_MAC1[7:0] of the latch data, the exponent processing circuit 6410 may output the first maximum exponent data E_MAX1[7:0] as the second maximum exponent data E_MAX2[7:0]. The second maximum exponent data E_MAX2[7:0] may be transmitted to the normalizer 6440. When the second maximum exponent data E_MAX2[7:0] is generated, the exponent processing circuit 6410 may subtract the first maximum exponent data E_MAX1[7:0] and the exponent data E_MAC1[7:0] of the latch data from the second maximum exponent data E_MAX2[7:0] to generate and output the ninth shift data SFT9[7:0] and the tenth shift data SFT10[7:0], respectively. The ninth shift data SFT9[7:0] and the tenth shift data SFT10[7:0] may be transmitted to the mantissa shifting circuit 6420 of the accumulator 6400A.

Figure 90:
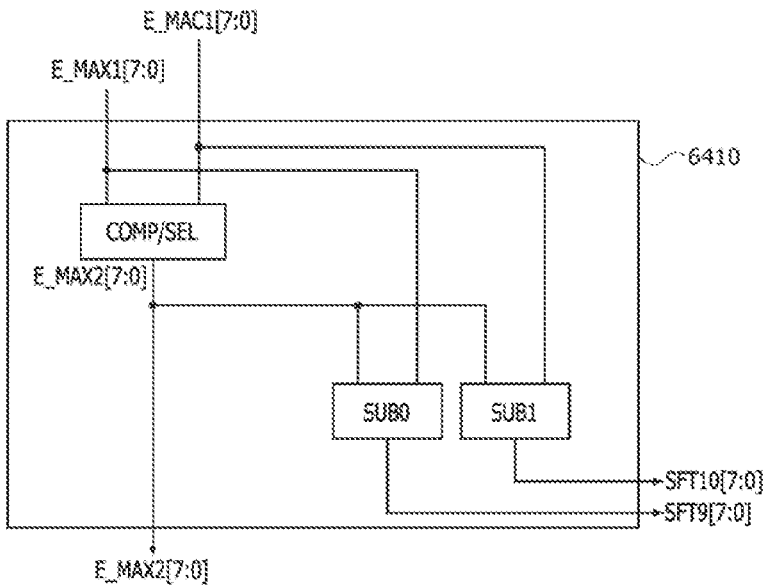
FIG. 90 is a block diagram illustrating an example of a configuration of an exponent processing circuit of the accumulator of FIG. 89.

In an example, as illustrated in FIG. 90, the exponent processing circuit 6410 may include a comparator/selector COMP/SEL, a first subtractor SUB0, and a second subtractor SUB1. The comparator/selector COMP/SEL may include a comparator and a multiplexer. The comparator/selector COMP/SEL may compare the first maximum exponent data E_MAX1[7:0] of the second multiplication addition data D_MA2 and the exponent data E_MAC1[7:0] of the latch data and output the exponent data having a greater value as the second maximum exponent data E_MAX2[7:0]. The second maximum exponent data E_MAX2[7:0] may be transmitted from the exponent processing circuit 6410 to the normalizer 6440 in FIG. 89 and may be transmitted to the first subtractor SUB0 and the second subtractor SUB1. The first subtractor SUB0 may perform an operation of subtracting the first maximum exponent data E_MAX1[7:0] from the second maximum exponent data E_MAX2[7:0] to generate and output the ninth shift data SFT9[7:0]. The second subtractor SUB1 may perform an operation of subtracting the exponent data E_MAC1[7:0] of the latch data from the second maximum exponent data E_MAX2[7:0] to generate and output the tenth shift data SFT10[7:0].

In an example, when the second maximum exponent data E_MAX2[7:0] is the same as the first maximum exponent data E_MAX1[7:0], the ninth shift data SFT9[7:0] may have a value of "0", and the tenth shift data SFT10[7:0] may have a value corresponding to a difference between the second maximum exponent data E_MAX2[7:0] and the exponent data E_MAC1[7:0] of the latch data. In this case, the tenth shift data SFT10[7:0] may provide the number of bits by which the mantissa data M_MAC1[7:0] of the latch data need to be shifted. The tenth shift data SFT10[7:0] may have a value corresponding to the number of bits by which the mantissa data M_MA2[18:0] of the second multiplication addition data D_MA2 to be shifted. In another example, when the second maximum exponent data E_MAX2[7:0] is the same as the exponent data E_MAC1[7:0] of the latch data, the ninth shift data SFT9[7:0] may have a value corresponding to a difference between the second maximum exponent data E_MAX2[7:0] and the first maximum exponent data E_MAX1[7:0], and the tenth shift data SFT10[7:0] may have a value of "0". In this case, the ninth shift data SFT9[7:0] may have a value corresponding to the number of bits by which the mantissa data M_MA2[18:0] of the second multiplication addition data D_MA2 to be shifted.

Referring back to FIG. 89, the mantissa shifting circuit 6420 may receive the ninth shift data SFT9[7:0] and the tenth shift data SFT10[7:0] from the exponent processing circuit 6410. In addition, the mantissa shifting circuit 6420 may receive the mantissa data M_MA2[18:0] of the second multiplication addition data D_MA2 and the mantissa data M_MAC1[7:0] of the latch data. In an example, the mantissa data M_MAC1[7:0] of the latch data may have a size of 8 bits by adding a 1-bit implicit bit "1" to the mantissa data of the first MAC data D_MAC1. The mantissa shifting circuit 6420 may shift the mantissa data M_MA2[18:0] of the second multiplication addition data D_MA2 by the number of bits corresponding to the value of the ninth shift data SFT9[7:0] to generate and output the shifted mantissa data M_SFT_MA2[18:0] of the second multiplication addition data D_MA2. In addition, the mantissa shifting circuit 6420 may shift the mantissa data M_MA2[18:0] of the latch data by the number of bits corresponding to the value of the tenth shift data SFT10[7:0] to generate and output the shifted mantissa data M_SFT_MA1[18:0] of the latch data. The shifted mantissa data M_SFT_MA2[18:0] of the second multiplication addition data D_MA2 and the shifted mantissa data M_SFT_MAC1[7:0] of the latch data output from the mantissa shifting circuit 6420 may be transmitted to the accumulative adder 6430.

In an example, as illustrated in FIG. 91, the mantissa shifting circuit 6420 of the accumulator 6400A may include a first shifter SFT0 and a second shifter SFT1. The first shifter SFT0 may receive the ninth shift data SFT9[7:0]

from the exponent processing circuit 6410 and may receive the mantissa data M_MA2[18:0] of the second multiplication addition data D_MA2 from the pre-processing circuit 6200A of FIG. 81. The first shifter SFT0 may shift the mantissa data M_MA2[18:0] of the second multiplication addition data D_MA2 by the number of bits corresponding to the value of the ninth shift data SFT9[7:0] to generate and output the shifted exponent data M_SFT_MA2[18:0] of the second multiplication addition data D_MA2. The second shifter SFT1 may receive the tenth shift data SFT10[7:0] from the exponent processing circuit 6410 and may receive the mantissa data M_MAC1[7:0] of the latch data from the pre-processing circuit 6200A of FIG. 81. The second shifter SFT1 may shift the mantissa data M_MAC1[7:0] of the latch data by the number of bits corresponding to the value of the tenth shift data SFT10[7:0] to generate and output the shifted exponent data M_MAC1[7:0] of the latch data.

Referring back to FIG. 89, the accumulative adder 6430 of the accumulator 6400A may perform an addition operation on the shifted mantissa data M_SFT_MA2[18:0] of the second multiplication addition data D_MA2 and the shifted mantissa data M_SFT_MAC1[7:0] of the latch data transmitted from the mantissa shifting circuit 6420 to generate and output accumulative mantissa data M_ACC[19:0]. In an example, 1-bit carry bit may be added during the accumulative addition operation in the accumulative adder 6420, and accordingly, the accumulative mantissa data M_ACC [19:0] may have a size of 20 bits. The accumulative mantissa data M_ACC[19:0] output from the accumulative adder 6430 may be transmitted to the normalizer 6440.

The normalizer 6440 may receive the second maximum exponent data E_MAX2[7:0] and the accumulative mantissa data M_ACC[19:0] from the exponent processing circuit 6410 and the accumulative adder 6430, respectively. In an example, the normalizer 6440 may perform normalization processing of moving the binary decimal point and adjusting the number of bits of the accumulative mantissa data M_ACC[19:0] such that the accumulative mantissa data M_ACC[19:0] has a standard format with an implicit bit, that is, a format of "1.M_ACCN[6:0]". The normalizer 6440 may remove the implicit bit/binary decimal point (1.) from the format of "1.M_ACCN[6:0]" to generate and output 7-bit normalized accumulative mantissa data M_ACCN[6:0] conforming to the BF16 format. In addition, the normalizer 6440 may add a binary value corresponding to the number of bits (decimal) by which the binary point is shifted in the accumulative mantissa data M_ACC[19:0] to the second maximum exponent data E_MAX2[7:0] to generate and output 8-bit normalized accumulative exponent data E_ACCN[7:0] conforming to the BF16 format. The normalized accumulative exponent data E_ACCN[7:0] and the normalized accumulative mantissa data M_ACCN[6:0] may be transmitted to the latch circuit 6450.

The latch circuit 6450 may latch the normalized accumulative exponent data E_ACCN[7:0] and the normalized accumulative mantissa data M_ACCN[6:0] transmitted from the normalizer 6440. In an example, the latch operation of the latch circuit 6450 may be performed in response to the latch clock signal CK_L of a logic "high" level. In addition, the latch circuit 6450 may output the latched normalized accumulative exponent data E_ACCN[7:0] and normalized accumulative mantissa data M_ACCN[6:0] as the exponent data and mantissa data of the latch data, respectively. The exponent data and the mantissa data of the latch data output from the latch circuit 6450 may be transmitted to the exponent processing circuit 6410 and the mantissa shifting circuit 6420, respectively, in the next MAC operation, that is, the third MAC operation. In addition, the exponent data and the mantissa data of the latch data output from the latch circuit 6450 may be output from the accumulator 6400A as the exponent data E_MAC2[7:0] and mantissa data M_MAC2[6:0] of the second MAC data D_MAC2, respectively. The level of the clear signal CLR input to the latch circuit 6450 may be changed from a logic "low" level to a logic "high" level after the MAC operation is completed, that is, after the $64^{th}$ MAC operation described with reference to FIG. 80 is performed, and the latch circuit 6450 may be reset.

In an example, as illustrated in FIG. 92, the latch circuit 6450 of the accumulator 6400A may include a first flip-flop FF1 and a second flip-flop FF2. The first flip-flop FF1 may receive the normalized accumulative exponent data E_ACCN[7:0] from the normalizer 6440 through an input terminal D. The second flip-flop FF2 may receive the normalized accumulative mantissa data M_ACCN[6:0] from the normalizer 6440 through an input terminal D. A clock terminal of the first flip-flop FF1 and a clock terminal of the second flip-flop FF2 may be interconnected. A reset terminal RS of the first flip-flop FF1 and a reset terminal RS of the second flip-flop FF2 may also be interconnected. Accordingly, the first flip-flop FF1 and the second flip-flop FF2 may commonly receive the clock latch signal CK_L through the clock terminals and may commonly receive the clear signal CLR through the reset terminals. Accordingly, the first flip-flop FF1 and the second flip-flop FF2 may simultaneously perform latch operations and output operations in response to the clock latch signal CK_L. In addition, the first flip-flop FF1 and the second flip-flop FF2 may be reset together in response to the clear signal CLR.

The first flip-flop FF1 may latch the normalized accumulative exponent data E_ACCN[7:0] in response to the latch clock signal CK_L of a "high" level input through the clock terminal. The normalized accumulative exponent data E_ACCN[7:0] latched by the first flip-flop FF1 may be fed back to the exponent processing circuit 6410 in FIG. 89 as the exponent data E_MAC2[7:0] of the latch data through an output terminal Q to be used as the exponent data of the latch data in the next third MAC operation. In addition, the normalized accumulative exponent data E_ACCN[7:0] latched by the first flip-flop FF1 may be transmitted to the output circuit 6500A in FIG. 81 as the exponential data E_MAC2[7:0] of the second MAC data D_MAC2 through the output terminal Q. That is, all of the normalized accumulative exponential data E_ACCN[7:0] transmitted from the normalizer 6440 in FIG. 89, the exponent data E_MAC2 [7:0] of the latch data used for the next MAC operation, and the exponent data E_MAC2[7:0] of the second MAC data D_MAC2 may be the same.

The second flip-flop FF2 may latch the normalized accumulative mantissa data M_ACCN[6:0] in response to the latch clock signal CK_L of a "high" level input through the clock terminal. The normalized accumulative mantissa data M_ACCN[6:0] latched by the second flip-flop FF2 may be fed back to the mantissa shifting circuit 6420 in FIG. 89 as the mantissa data M_MAC2[6:0] of the latch data through the output terminal Q to be used as the mantissa data of the latch data in the next third MAC operation. In addition, the normalized accumulative mantissa data M_ACCN[6:0] latched by the second flip-flop FF2 may be transmitted to the output circuit 6500A in FIG. 81 as the mantissa data M_MAC2[6:0] of the second MAC data D_MAC2 through the output terminal Q. That is, all of the normalized accumulative mantissa data M_ACCN[6:0] transmitted from the normalizer 6440 in FIG. 89, the mantissa data M_MAC2[6:

0] of the latch data used for the next MAC operation, and the mantissa data M_MAC2[6:0] of the second MAC data D_MAC2 may be the same.

FIG. 93 is a circuit diagram illustrating an example of a configuration of the output circuit 6500A of the MAC operator 6000A of FIG. 81. Referring to FIG. 93, the output circuit 6500A of the MAC operator 6000A may include a first buffer 6561A, a second buffer 6562A, and a bit joining circuit 6563A. The bit joining circuit 6563A may include a sign data extracting circuit 6564A for extracting a sign bit. In an example, the sign data extracting circuit 6564A may extract the most significant bit MSB from the mantissa data M_MAC2[6:0] of the second MAC data D_MAC2 transmitted from the second buffer 6562A as a sign bit. For example, when the most significant bit MSB of the mantissa data M_MAC2[6:0] of the second MAC data D_MAC2 is "1", the sign data extracting circuit 6564A may output "1" (representing a negative number) as the sign bit. When the most significant bit MSB of the mantissa data M_MAC2[6:0] of the second MAC data D_MAC2 is "0", the sign data extracting circuit 6564A may output "0" (representing a positive number) as the sign bit.

The first buffer 6561A may receive the exponent data E_MAC2[7:0] of the second MAC data D_MAC2 from the latch circuit 6400A in FIG. 89 through an input terminal. The second buffer 6562A may receive the mantissa data M_MAC2[6:0] of the second MAC data D_MAC2 from the latch circuit 6400A in FIG. 89 through an input terminal. The first buffer 6561A and the second buffer 6562A may commonly receive a MAC result read signal MAC_RD_RST through control terminals. When all MAC operations are not completed as in this example, the MAC result read signal MAC_RD_RST may be provided at a logic "low" level. The first buffer 6561A and the second buffer 6562A might not output the exponent data E_MAC2[7:0] and the mantissa data M_MAC2[6:0] of the second MAC data D_MAC2, respectively, in response to the MAC result read signal MAC_RD_RST of a logic "low" level. Accordingly, the bit joining circuit 6563A might not output the MAC result data.

Meanwhile, when the MAC operations are completed, that is, when the 64$^{th}$ MAC operation is performed as described above with reference to FIG. 80, the MAC result read signal MAC_RD_RST of a logic "high" level may be provided to the first buffer 6561A and the second buffer 6562A. In this case, the first buffer 6561A and the second buffer 6562A may transmit the exponent data E_MAC2[7:0] and the mantissa data M_MAC2[6:0] of the second MAC data D_MAC2 to the bit joining circuit 6563A in response to the MAC result read signal MAC_RD_RST of a logic "high" level. The sign data extracting circuit 6564A of the bit joining circuit 6563A may extract the sign bit of the MAC result data. The bit joining circuit 6563A may join the sign bit generated by the sign data extracting circuit 6564A, the exponent data E_MAC2[7:0] of the second MAC data D_MAC2 transmitted from the first buffer 6561A, and the mantissa data M_MAC2[6:0] of the second MAC data D_MAC2 transmitted from the second buffer 6562A to generate and output the MAC result data of the BF16 format.

Figure 94:
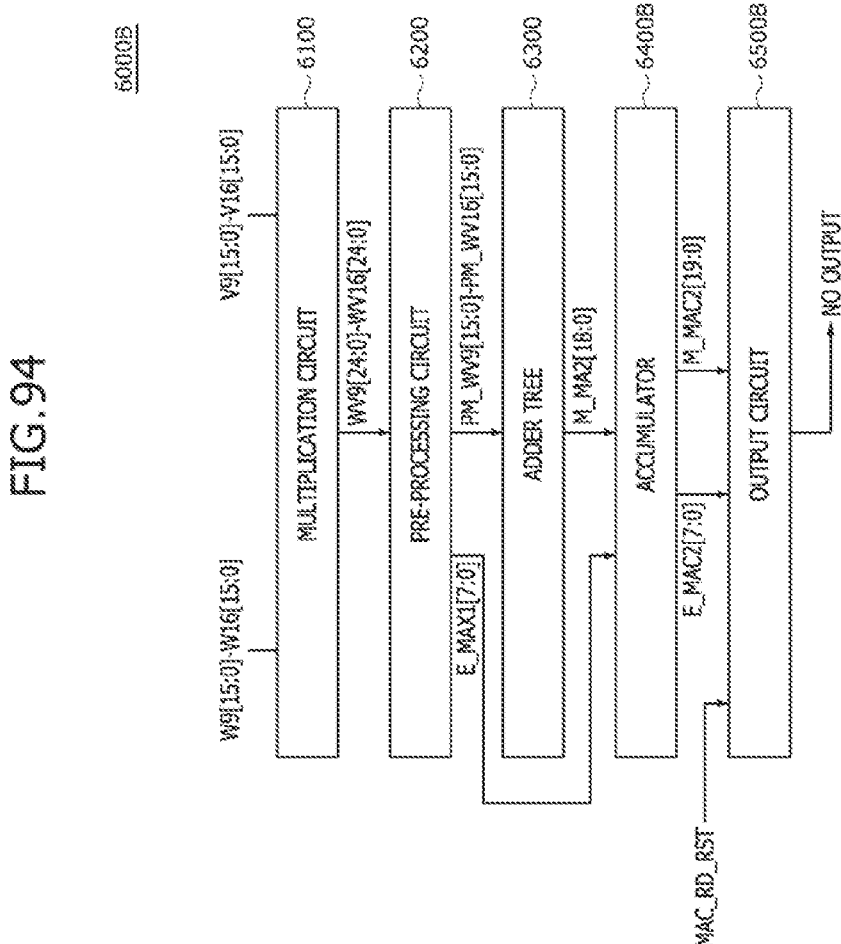
FIG. 94 is a block diagram illustrating a MAC operator according to yet another embodiment of the present disclosure.

FIG. 94 is a block diagram illustrating a MAC operator 6000B according to yet another embodiment of the present disclosure. Referring to FIG. 94, the MAC operator 6000B may include a multiplication circuit 6100, a pre-processing circuit 6200, an adder tree 6300, an accumulator 6400B, and an output circuit 6500B. The multiplication circuit 6100, the pre-processing circuit 6200, and the adder tree 6300 of the MAC operator 6000B may be substantially the same as the multiplication circuit, the pre-processing circuit, and the adder tree of the MAC operator 6000A described with reference to FIG. 81, and hereinafter, overlapping descriptions will be omitted.

The accumulator 6400B of the MAC operator 6000B according to the present embodiment may receive the first maximum exponent data E_MAX1[7:0] and the mantissa data M_MA2[18:0] of the second multiplication addition data D_MA2 from the pre-processing circuit 6200A and the adder tree 6300, respectively. The accumulator 6400B may detect exponent data having a greater absolute value between the first maximum exponent data E_MAX1[7:0] and the exponent data of the latch data latched in the accumulator 6400B through the previous MAC operation, that is, the first MAC operation process. The accumulator 6400B may perform normalization processing on the detected exponent data to generate normalized accumulative exponent data. The accumulator 6400B may latch the normalized accumulative exponent data to update the exponent data of the latch data in the accumulator 6400B to the normalized accumulative exponent data, and may output the exponent data of the updated latch data as the exponent data E_MAC2[7:0] of the second MAC data D_MAC2.

In addition, the accumulator 6400B may perform shifting processing on one of the mantissa data of the latch data in the accumulator 6400B and the mantissa data M_MA2[18:0] of the second multiplication addition data D_MA2 and then perform an accumulative addition operation to generate the accumulative mantissa data so that the first maximum exponent data E_MAX1[7:0] and the exponent data of the latch data have the same value. In an example, due to the carry bit generated during the accumulative addition operation, the number of bits of the accumulative mantissa data may become "19" in which "1" is added to the number of bits "18" of the mantissa data M_MA2[18:0] of the second multiplication addition data D_MA2. The accumulator 6400B may perform first normalization processing on the accumulative mantissa data generated by the accumulative addition operation to generate the first normalized accumulative mantissa data. In this case, the first normalization processing may be performed such that the floating point is positioned at the position following the most significant bit having a value of "1" in the accumulative mantissa data but the number of bits of the accumulative mantissa data is not changed. The accumulator 6400B may latch the normalized accumulative mantissa data to update the mantissa data of the latch data to normalized accumulative mantissa data, and may output the updated mantissa data of the latch data as the mantissa data M_MAC2[19:0] of the second MAC data D_MAC2. The exponent data E_MAC2[7:0] and mantissa data M_MAC2[19:0] of the second MAC data D_MAC2 output from the accumulator 6400B may be transmitted to the output circuit 6500B.

The output circuit 6500B may perform second normalization processing on the mantissa data M_MAC2[19:0] of the second MAC data D_MAC2 transmitted from the accumulator 6400B to generate second normalized mantissa data. In an example, the second normalization processing on the mantissa data M_MAC2[19:0] of the second MAC data D_MAC2 may include rounding processing and/or bit truncation processing for the mantissa data M_MAC2[19:0]. The output circuit 6500B may receive the MAC result read signal MAC_RD_RST as a control signal. The output circuit 65008 may output or might not output the exponent data and the second normalized mantissa data transmitted from the accumulator 6400B as MAC result data according to the MAC result read signal MAC_RD_RST. As in this embodiment, when the MAC operation is not completed, the MAC result read signal MAC_RD_RST may be provided as, for example, a logic 'low' signal. In this case, the output circuit 6500B might not output the MAC result data. On the other hand, although not illustrated in FIG. 94, when the $64^{th}$ MAC operation is performed and the MAC operation is completed, the MAC result read signal MAC_RD_RST of a logic "high" level may be provided to the output circuit 6500B. In this case, the output circuit 6500B may extract a sign bit of the MAC result data, and then, may join the sign bit, the exponent data of the $64^{th}$ MAC data D_MAC64, and the second normalized mantissa data to generate and output the MAC result data.

Figure 95:
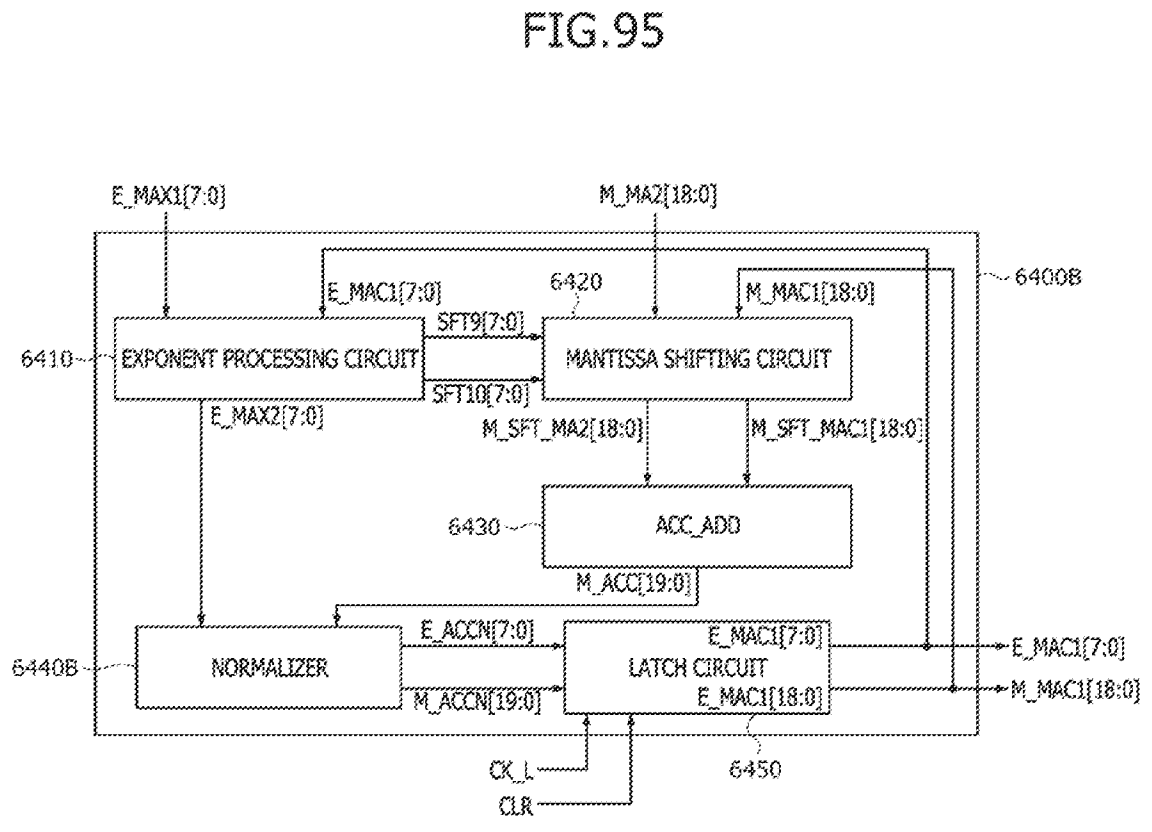
Figure 96:
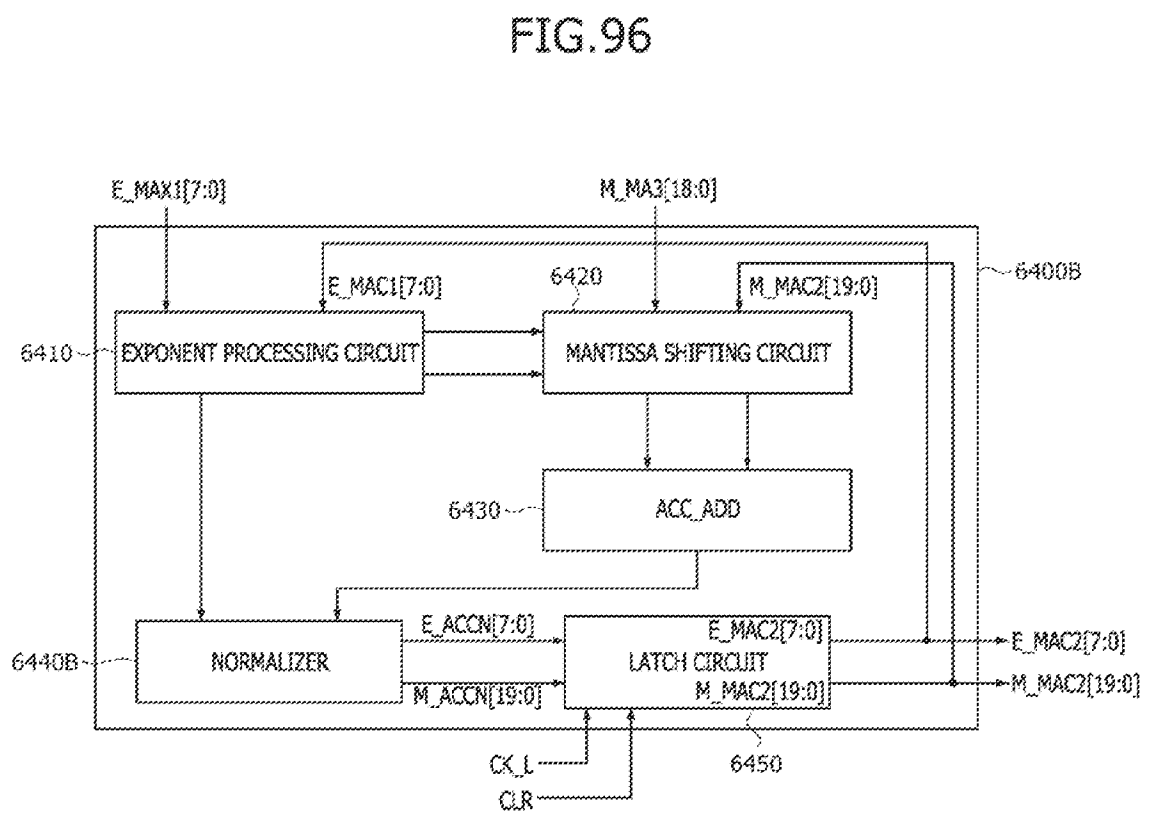

FIGS. 95 and 96 are block diagrams illustrating examples of configuration and operation of the accumulator 6400B of the MAC operator 6000B of FIG. 94. FIG. 95 illustrates a process in which the first normalization processing according to the second MAC operation is performed in a state in which the exponent data E_MAC1[7:0] and the mantissa data M_MAC1[18:0] of the first MAC data D_MAC1 are latched in the latch circuit 6450 of the accumulator 6400B by the previous MAC operation. FIG. 96 illustrates a state in which a latch operation according to the second MAC operation is performed. In FIGS. 95 and 96, the same reference numerals as in FIG. 89 denote the same components.

As illustrated in FIGS. 95 and 96, the accumulator 6400B of the MAC operator 6000B according to this example may include an exponent processing circuit 6410, a mantissa shifting circuit 6420, an accumulative adder 6430, a first normalizer 6440B, and a latch circuit 6450. The accumulator 6400B may have a configuration similar to the configuration of the accumulator 6400A of FIG. 89 except that the normalizer 6440 of the accumulator 6400A of FIG. 89 is replaced with the first normalizer 6440B. The first normalizer 6440B of the accumulator 6400B may perform first normalization processing on the input exponent data and mantissa data. In this process, the number of bits of the first normalized mantissa data may be the same as the number of bits of the input mantissa data. That is, in the first normalization process, the process of standardizing the mantissa data to have a 7-bit size of BF16 format data may be omitted. Accordingly, when the mantissa data input from the accumulative adder 6430 to the first normalizer 6440B consists of "N" bits ("N" is a natural number), the first normalized mantissa data generated from the accumulator 6400B may also have a size of "N" bits.

First, referring to FIG. 95, the exponent data E_MAC1[7:0] and mantissa data M_MAC1[18:0] of the first MAC data D_MAC1 generated in the previous first MAC operation are latched in the latch circuit 6450. At a point in time when the first maximum exponent data E_MAC1[7:0] and the mantissa data M_MA2[18:0] of the second multiplication addition data D_MA2 are input to the accumulator 6400B, the first MAC data D_MAC1 latched in the latch circuit 6450, that is, the exponent data E_MAC1[7:0] and mantissa data M_MAC1[18:0] of the latch data may be transmitted to the exponent processing circuit 6410 and the mantissa shifting circuit 6420, respectively. Because the first normalized mantissa data generated in the first normalizer 6440B is latched in the latch circuit 6450 while including an implicit bit, the implicit bit might not be added during the mantissa data M_MAC1[18:0] of the latch data is fed back from the latch circuit 6450 to the mantissa shifting circuit 6420.

The exponent processing circuit 6410 of the accumulator 6400B may output the exponent data having a greater value between the exponent data E_MAC1[7:0] of the latch data fed back from the latch circuit 6450 and the first maximum exponent data E_MAX1[7:0] transmitted from the pre-processing circuit 6200A in FIG. 94 as the second maximum exponent data E_MAX2[7:0]. The second maximum exponent data E_MAX2[7:0] may be transmitted to the first normalizer 6440B. In addition, the exponent processing circuit 6410 may generate the ninth shift data SFT9[7:0] and the tenth shift data SFT10[7:0] to transmit the ninth shift data SFT9[7:0] and the tenth shift data SFT10[7:0] to the mantissa shifting circuit 6420. The operation of generating the ninth shift data SFT9[7:0] and the tenth shift data SFT10[7:0] in the exponent processing circuit 6410 may be the same as that described with reference to FIG. 90, so that the overlapping description will be omitted.

The mantissa shifting circuit 6420 may receive the mantissa data M_MA2[18:0] of the second multiplication addition data D_MA2 from the adder tree 6300 of FIG. 94. In addition, the mantissa shifting circuit 6420 may receive the mantissa data M_MAC1[18:0] of the latch data from the latch circuit 6450 of the accumulator 6400B. The mantissa shifting circuit 6420 may shift the mantissa data M_MA2 [18:0] of the second multiplication addition data D_MA2 by the number of bits corresponding to a value of the ninth shift data SFT9[7:0] to generate and output the shifted mantissa data M_SFT_MA2[18:0] of the second multiplication addition data D_MA2. In addition, the mantissa shifting circuit 6420 may shift the mantissa data M_MAC1[18:0] of the latch data by the number of bits corresponding to a value of the tenth shift data SFT10[7:0] to generate and output the shifted mantissa data M_SFT_MAC1[18:0] of the latch data.

The accumulative adder 6430 may perform an addition operation on the shifted mantissa data M_SFT_MA2[18:0] of the second multiplication addition data D_MA2 and the shifted mantissa data M_SFT_MAC1[18:0] of the latch data output from the mantissa shifting circuit 6420 to generate and output the accumulative mantissa data M_ACC[19:0]. In an example, by the generation of the carry bit in the accumulative addition operation in the accumulative adder 6420, the accumulative mantissa data M_ACC[19:0] may have a size of 20 bits added by 1 bit.

The first normalizer 6440E may receive the second maximum exponent data E_MAX2[7:0] and the accumulative mantissa data M_ACC[19:0] from the exponent processing circuit 6410 and the accumulative adder 6430, respectively. The first normalizer 6440E may shift the floating point in the accumulative mantissa data M_ACC[19:0] so that the floating point is positioned after the most significant bit among bits having a value of "1" to generate and output the first normalized accumulative mantissa data M_ACCN[19:0]. As such, because the first normalized accumulative mantissa data M_ACCN[19:0] is in a state in which only the floating point has been shifted with respect to the accumulative mantissa data M_ACC[19:0], the first normalized accumulative mantissa data M_ACCN[19:0] may have the same size of 20 bits as the accumulative mantissa data M_ACC [19:0]. The first normalizer 6440 may add the number of bits corresponding to the value (decimal) corresponding to the number of shifted bits of the floating-point in the accumulative mantissa data M_ACC[19:0] to the second maximum exponent data E_MAX2[7:0] to generate and output the first normalized accumulative exponent data E_ACCN[7:0]. The first normalized accumulative exponent data E_ACCN[7:0] and the first normalized accumulative mantissa data M_ACCN[19:0] may be transmitted to the latch circuit 6450.

Next, referring to FIG. 96, the latch circuit 6450 may latch the first normalized accumulative exponent data E_ACCN[7:0] and the first normalized accumulative mantissa data M_ACCN[19:0] transmitted from the first normalizer 6440B as the exponent data E_MAC2[7:0] and the mantissa data M_MAC2[19:0] of the second MAC data D_MAC2 in the latch circuit 6450. Such a latch operation of the latch circuit 6450 may be performed in response to a logic "high" level of the dock latch signal CK_L. The exponent data E_MAC2[7:0] and the mantissa data M_MAC2[19:0] of the second MAC data D_MAC2 latched in the latch circuit 6450 may be output from the accumulator 6400B. In addition, the exponent data E_MAC2[7:0] and the mantissa data M_MAC2[19:0] of the second MAC data D_MAC2 latched in the latch circuit 6450 may be fed back to the exponent processing circuit 6410 and the mantissa shifting circuit 6420, respectively, to be used as exponent data and mantissa data of the latch data in the next third MAC operation. That is, in the third MAC operation, the exponent shifting circuit 6410 of the accumulator 6400B may receive the exponent data M_MAC2[19:0] of the latch data and the first maximum exponent data E_MAX1[7:0] constituting the exponent of the third multiplication addition data D_MA3. In addition, in the third MAC operation, the mantissa shifting circuit 6420 of the accumulator 6400B may receive the mantissa data M_MAC2[19:0] of the latch data and the mantissa data M_MAC3[18:0] of the third multiplication addition D_MA3. The operation of the accumulator 6400B in the subsequent third MAC operation may be performed in the same manner as the accumulation operation in the second MAC operation.

As described above with reference to FIGS. 95 and 96, in the accumulator 6400B of the MAC operator 6000B according to the present embodiment, when the mantissa data M_MAC[(K−1):0] of the latch data of "K" bits ("K" is a natural number) is latched in the latch circuit 6450 as a result of the previous MAC operation, the accumulative adder 6430 in the current MAC operation may generate and output accumulative mantissa data M_ACC[K:0] of "K+1" bits. Because the normalized accumulative mantissa data M_ACCN generated as a result of normalization in the first normalizer 6440B has the same number of bits as the accumulative mantissa data M_ACC, the mantissa data M_MAC[K:0] of the MAC data of "K+1" bits may be latched in the latch circuit 6450 in the current MAC operation. The mantissa data M_MAC[K:0] may be fed back to the mantissa shifting circuit 6420 for the next MAC operation. Through the same process as the current MAC operation, the mantissa data M_AC[(K+1):0] of the MAC data of "K+2" bits may be latched in the latch circuit 6450 in the next MAC operation. Each time the MAC operation is performed in this manner, the number of bits of the mantissa data may be increased by "1". That is, in the case of the MAC operator 6000B according to the present embodiment, reduction in calculation accuracy due to adjustment of the number of bits of mantissa data in the first normalization processing in the accumulator 6400B may be suppressed.

Figure 97:
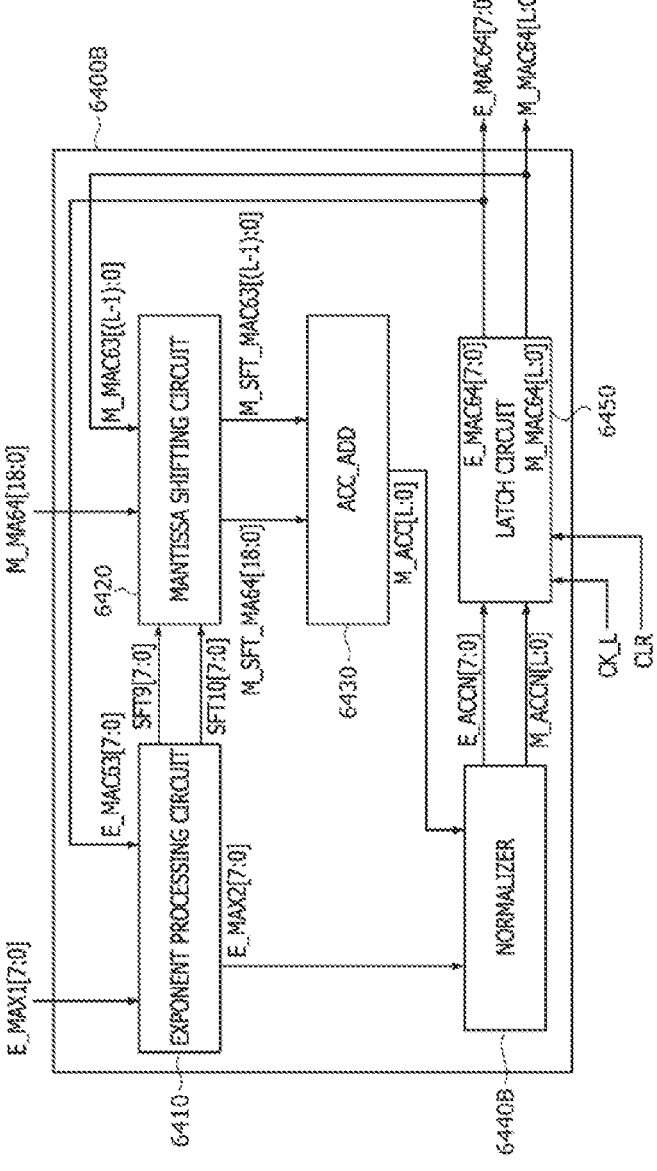
FIG. 97 illustrates a final MAC operation process in the accumulator of the MAC operator of FIG. 94.

FIG. 97 is a diagram illustrating a final MAC operation process, that is, the $64^{th}$ MAC operation in the accumulator 6400B of the MAC operator 6000B of FIG. 94. In FIG. 97, the same reference numerals as in FIGS. 89, 95, and 96 denote the same components. In this embodiment, it is presupposed that mantissa data M_MAC63[(L−1):0] of "L" bits ("L" is a natural number) of the latch data is latched in the latch circuit 6450 as a result of the $63^{rd}$ MAC operation. Here, "L" may be arbitrarily set in consideration of calculation accuracy, circuit area, or the like. Referring to FIG. 97, the mantissa data M_MAC63[(L−1):0]) of "L" bits and the mantissa data M_MA64[18:0] of the $64^{th}$ multiplication addition data D_MA64 may be input to the mantissa shifting circuit 6420. The mantissa shifting circuit 6420 may shift the mantissa data M_MA64[18:0] and the mantissa data M_MAC63[(L−1):0]) of "L" bits by the number of bits corresponding to a value of the ninth shift data SFT9[7:0] and the number of bits corresponding to a value of the tenth shift data SFT10[7:0], respectively, to generate and output shifted mantissa data M_SFT_MA64[18:0] of 19 bits of the $64^{th}$ multiplication addition data D_MA64 and shifted mantissa data M_SFT_MAC63[(L−1):0] of "L" bits of the latch data.

The accumulative adder 6430 may perform an addition operation on the shifted mantissa data M_SFT_MA64[18:0] of the $64^{th}$ multiplication addition data D_MA64 and the shifted mantissa data M_SFT_MAC63[(L−1):0] of the latch data to generate and output accumulative mantissa data M_ACC[Y:0] of "IL+1" bits. The first normalizer 6440B may perform first normalization processing on the accumulative mantissa data M_ACC[Y:0] of "L+1" bits to generate and output first normalized accumulative mantissa data M_ACCN[Z:0] of "L+1" bits. Meanwhile, the first normalizer 6440B may perform the first normalization processing on the second maximum exponent data E_MAX2[7:0] transmitted from the exponent processing circuit 6410 to generate and output first normalized accumulative exponent data E_ACCN[7:0] of 8 bits. The latch circuit 6450 may latch the first normalized accumulative exponent data E_ACCN[7:0] and the first normalized accumulative mantissa data M_ACCN[Z:0], and then, may output the latched first normalized accumulative exponent data E_ACCN[7:0] and first normalized accumulative mantissa data M_ACCN[Z:0] as the exponent data E_MAC64[7:0] and mantissa data M_MAC2[L:0] of the $64^{th}$ MAC data D_MAC64, respectively.

Figure 98:
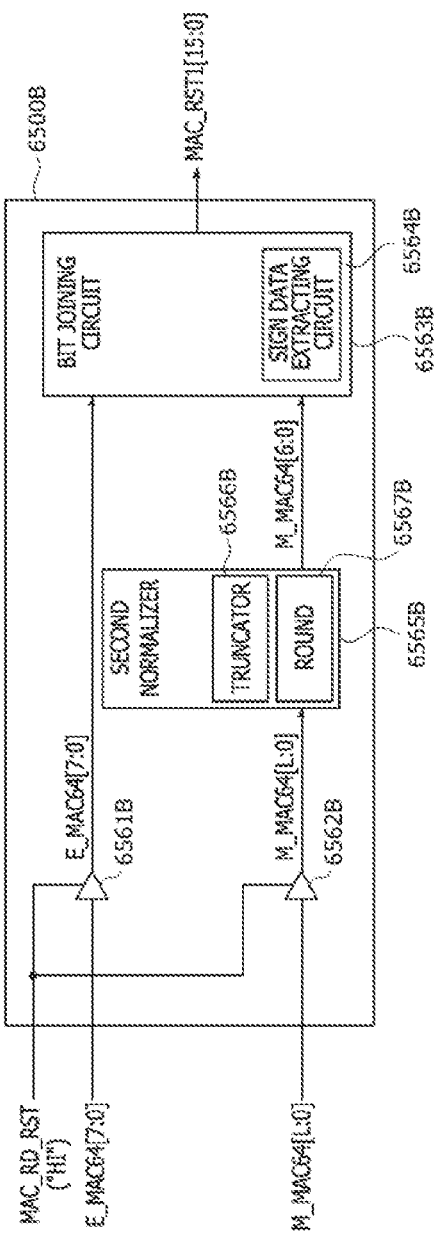
FIG. 98 is a circuit diagram illustrating an example of a configuration of an output circuit of the MAC operator of FIG. 94.

FIG. 98 is a block diagram illustrating an example of a configuration of the output circuit 6500B of the MAC operator 6000B of FIG. 94. In this example, as described above with reference to FIG. 97, a case in which the accumulator 6400B outputs the exponent data E_MAC64[7:0] and mantissa data M_MAC2[L:0] of the $64^{th}$ MAC data D_MAC64 may be exemplified. In FIG. 98, the same reference numerals as those of FIG. 93 indicate the same components. Referring to FIG. 98, the output circuit 6500B may include a first buffer 6561B, a second buffer 6562B, a second normalizer 6565B, and a bit joining circuit 6563B. The bit joining circuit 6563B may include a sign data extracting circuit 65643 for generating sign data.

The first buffer 6561B may receive the exponent data E_MAC64[7:0] of the $64^{th}$ MAC data D_MAC64 from the latch circuit 6400B of FIG. 97 through an input terminal. The second buffer 6562B may receive the mantissa data M_MAC64[L:0] of the $64^{th}$ MAC data D_MAC64 from the latch circuit 6400B of FIG. 97 through an input terminal. As described above with reference to FIG. 80, as the $64^{th}$ MAC operation is completed, the $64^{th}$ MAC data D_MAC64 may be output as a MAC result signal MAC_RST1 from the output circuit 6500B. That is, the MAC result read signal MAC_RD_RST of a logic "high" (HI) level may be provided to the first buffer 6561B and the second buffer 6562B, and accordingly, the first buffer 6561B may transmit the exponent data E_MAC64[7:0] of the $64^{th}$ MAC data D_MAC64 to the bit joining circuit 6563B. The second buffer 6562B may transmit the mantissa data M_MAC64[L:0] of the $64^{th}$ MAC data D_MAC64 to the second normalizer 6565B.

The second normalizer 6565B may include a bit truncator 6566B and a round processing unit 6567B. The bit truncator 6566B may perform the same operation as the bit truncators 5232 in FIGS. 75 and 5244 in FIG. 76 described with reference to FIGS. 75 and 76. The round processing unit 6567E may perform the same operation as the round processing unit 5243 of FIGS. 74 and 75 described with reference to FIGS. 74 and 75. Accordingly, the bit truncator 6566B may remove an implicit bit and lower bits for the mantissa data M_MAC64[L:0] of "L+1" bits provided from the second buffer 6562B to generate 7-bit mantissa data M_MAC64[6:0] conforming to the BF16 format. The bit truncator 6566B may transmit a round bit and a sticky bit for the round processing to the round processing unit 6567B in the process of removing the lower bits for the mantissa data M_MAC64[L:0]. The round processing unit 6567B may perform round processing using the round bit and sticky bit transmitted from the bit truncator 6566B. In the round processing, a "+1" addition operation according to round up or round down may be performed. The second normalizer 6565B may transmit the mantissa data M_MAC64[6:0] of the 64$^{th}$ MAC data D_MAC64 to the bit joining circuit 6563B.

The sign data extracting circuit 6564B of the bit joining circuit 6563B may generate sign data of the MAC result data MAC_RST1[15:0]. The sign data extracting circuit 6564B may operate in the same manner as the sign data extracting circuit 6564A in FIG. 93 described with reference to FIG. 93. The bit joining circuit 6563B may join the sign data generated by the sign data extracting circuit 6564B, the exponent data E_MAC64[7:0] of the 64$^{th}$ MAC data D_MAC64 transmitted from the first buffer 6561B, and the mantissa data M_MAC64[6:0] of the 64$^{th}$ MAC data D_MAC64 transmitted from the second normalizer 6565B to generate and output the MAC result data MAC_RST1 [15:0] of the BF16 format.

Figure 99:
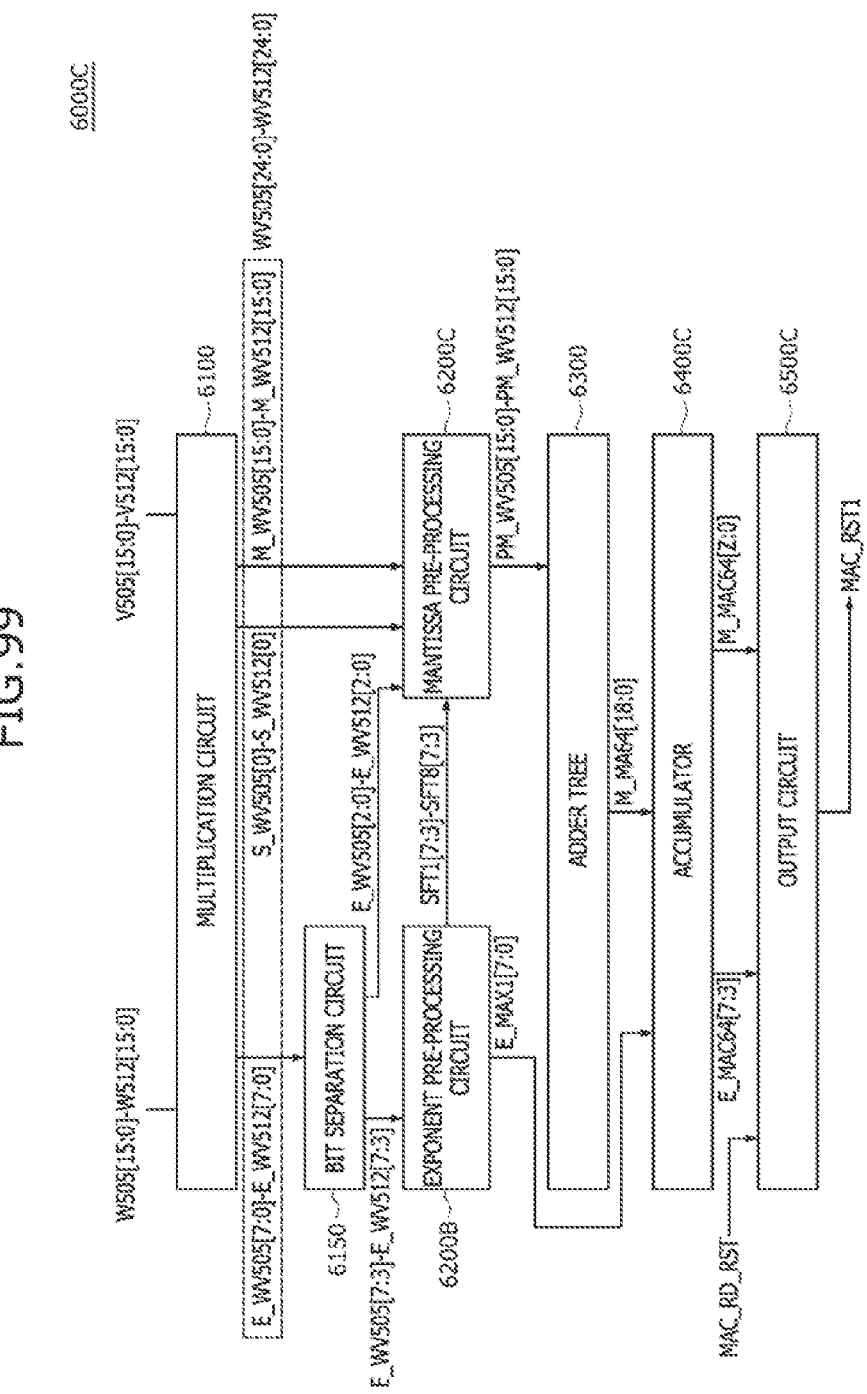
FIG. 99 is a block diagram illustrating a MAC operator according to yet another embodiment of the present disclosure.

FIG. 99 is a block diagram illustrating a MAC operator 6000C according to yet another embodiment of the present disclosure. Referring to FIG. 99, the MAC operator 6000C may include a multiplication circuit 6100, a bit separation circuit 6150, an exponent pre-processing circuit 6200B, a mantissa pre-processing circuit 6200C, an adder tree 6300, an accumulator 6400C, and an output circuit 6500C. The multiplication circuit 6100 and the adder tree 6300 of the MAC operator 6000C may be substantially the same as the multiplication circuit and adder tree of the MAC operator 6000A described above with reference to FIG. 81, and hereinafter, overlapping descriptions will be omitted. For the description of the operation of the MAC operator 6000C according to the present embodiment, among the MAC operations described with reference to FIG. 80, a case in which the 64$^{th}$ MAC operation is performed will be provided for an example. Accordingly, it is presupposed that the 63$^{rd}$ MAC data D_MAC63 of FIG. 80 is latched in the accumulator 6400B of the MAC operator 6000C.

The multiplication circuit 6100 may perform a multiplication operation on 505$^{th}$ to 512$^{th}$ weight data W505[15:0]-W512[15:0] and 505$^{th}$ to 512$^{th}$ vector data V505[15:0]-V512[15:0] in the same manner as described with reference to FIG. 82 to output 505$^{th}$ to 512$^{th}$ sign data S_WV505[0]-S_WV512[0], 505$^{th}$ to 512$^{th}$ exponent data E_WV505[7:0]-E_WV512[7:0], and 505$^{th}$ to 512$^{th}$ mantissa data M_WV505[15:0]-M_WV512[15:0] of the 505$^{th}$ to 512$^{th}$ multiplication data WV505[24:0]-WV512[24:0]. The 505$^{th}$ to 512$^{th}$ exponent data E_WV505[7:0]-E_WV512[7:0] may be transmitted to the bit separation circuit 6150. The 505$^{th}$ to 512$^{th}$ sign data S_WV505[0]-S_WV512[0] and the 505$^{th}$ to 512$^{th}$ mantissa data M_WV505[15:0]-M_WV512[15:0] may be transmitted to the mantissa pre-processing circuit 6200C.

When "F" is a natural number less than 7, the bit separation circuit 6150 may separate the exponent data of the multiplication data into upper "8–F" bits including the MSB and lower "F" bits including the LSB to output the upper "8–F" bits and the lower "F" bits. Hereinafter, a case in which "F" is "3" will be described as an example. In this case, the bit separation circuit 6150 may separate the 505$^{th}$ to 512$^{th}$ exponent data E_WV505[7:0]-E_WV512[7:0] into upper 5 bits and lower 3 bits to output 505$^{th}$ to 512$^{th}$ upper bits E_WV505[7:1]-E_WV512[7:3] and 505$^{th}$ to 512$^{th}$ lower bits E_WV505[2:0]-E_WV512[2:0]. That is, each of the 505$^{th}$ to 512$^{th}$ upper bits E_WV505[7:3]-E_WV512[7:3] output from the bit separation circuit 6150 may be composed of upper 5 bits of each of the 505$^{th}$ to 512$^{th}$ exponent data E_WV505[7:0]-E_WV512[7:0]. In addition, each of the 505$^{th}$ to 512$^{th}$ lower bits E_WV505[2:0]-E_WV512[2:0] output from the bit separation circuit 6150 may be composed of lower 3 bits of each of the 505$^{th}$ to 512$^{th}$ exponent data E_WV505[7:0]-E_WV512[7:0]. The 505$^{th}$ to 512$^{th}$ upper bits E_WV505[7:3]-E_WV512[7:3] output from the bit separation circuit 6150 may be transmitted to the exponent pre-processing circuit 6200B, and the 505$^{th}$ to 512$^{th}$ lower bits E_WV505[2:0]-E_WV512[2:0] may be transmitted to the mantissa pre-processing circuit 6200C.

Figure 100:
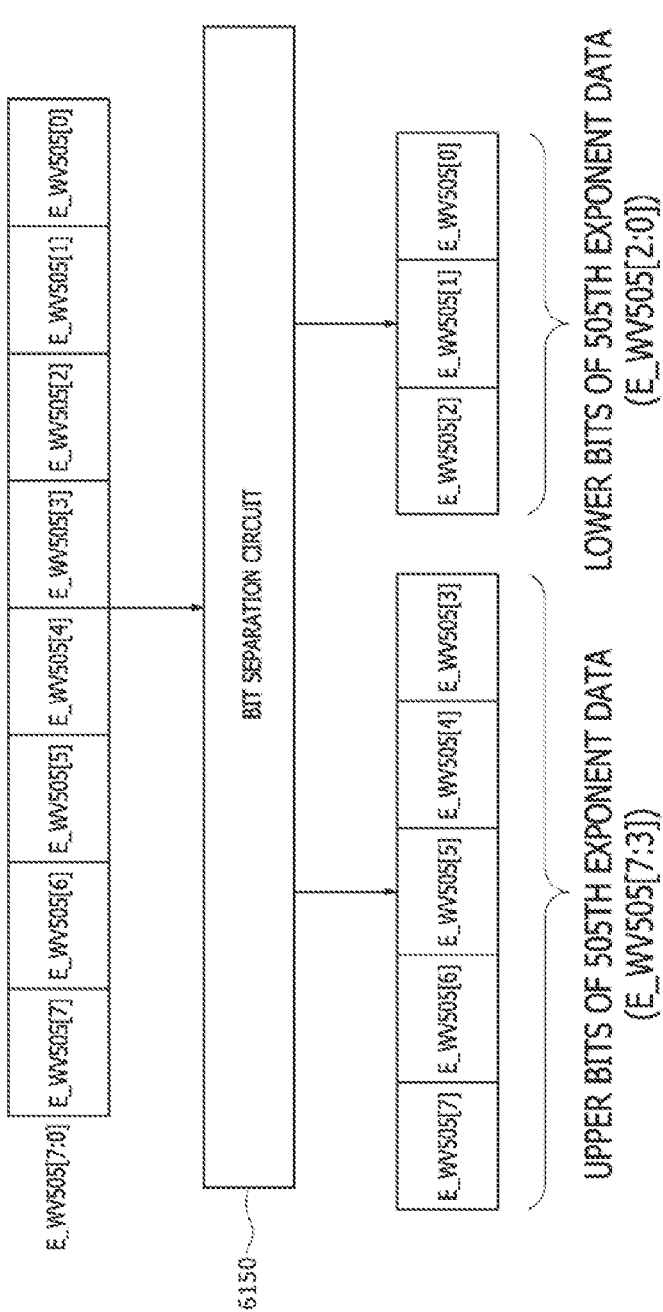
FIG. 100 illustrates an example of input/output data of a bit separation circuit of the MAC operator of FIG. 99.

FIG. 100 illustrates an example of input/output data of the bit separation circuit 6150 of the MAC operator 6000C of FIG. 99. Referring to FIG. 100, in this example, a case in which the 505$^{th}$ exponent data E_WV505[7:0] among the 505$^{th}$ to 512$^{th}$ exponent data E_WV505[7:0]-E_WV512[7:0] is separated by the bit separation circuit 6150 will be provided for an example. When the 505$^{th}$ exponent data E_WV505[7:0] is transmitted to the bit separation circuit 6150, the bit separation circuit 6150 may separate the bits of the 505$^{th}$ exponent data E_WV505[7:0] into upper 5 bits and lower 3 bits. The bit separation circuit 6150 may output the separated upper 5 bits and lower 3 bits as 505$^{th}$ upper bits E_WV505[7:3] and 505$^{th}$ lower bits E_WV505[2:0] of the 505$^{th}$ exponent data E_WV505[7:0]. The 505$^{th}$ upper bits E_WV505[7:3] and the 505$^{th}$ lower bits E_WV505[2:0] output from the bit separation circuit 6150 may be transmitted to the exponent pre-processing circuit 6200B and the mantissa pre-processing circuit 6200C, respectively. The bit separation circuit 6150 may perform bit separation processing for each of the remaining 506$^{th}$ to 512$^{th}$ exponent data E_WV506[7:0]-E_WV512[7:0] in the same manner as the 505$^{th}$ exponent data E_WV505[7:0].

Referring back to FIG. 99, the exponent pre-processing circuit 6200B may perform exponent pre-processing for the 505$^{th}$ to 512$^{th}$ upper bits E_WV505[7:3]-E_WV512[7:3]. The exponent pre-processing may be performed through an addition operation of adding a binary value "1" to the 505$^{th}$ to 512$^{th}$ upper bits E_WV505[7:3]-E_WV512[7:3] and a process of generating and outputting first maximum exponent upper data E_MAX1[7:3] and first to eighth shift data SFT1[7:3]-SFT8[7:3] using the data generated as a result of the addition operation. The first maximum exponent upper data E_MAX1[7:3] output from the exponent pre-processing circuit 6200B may be transmitted to the accumulator 6400B. The first to eighth shift data SFT1[7:3]-SFT8[7:3] output from the exponent pre-processing circuit 6200B may be transmitted to the mantissa pre-processing circuit 6200C.

Figure 101:
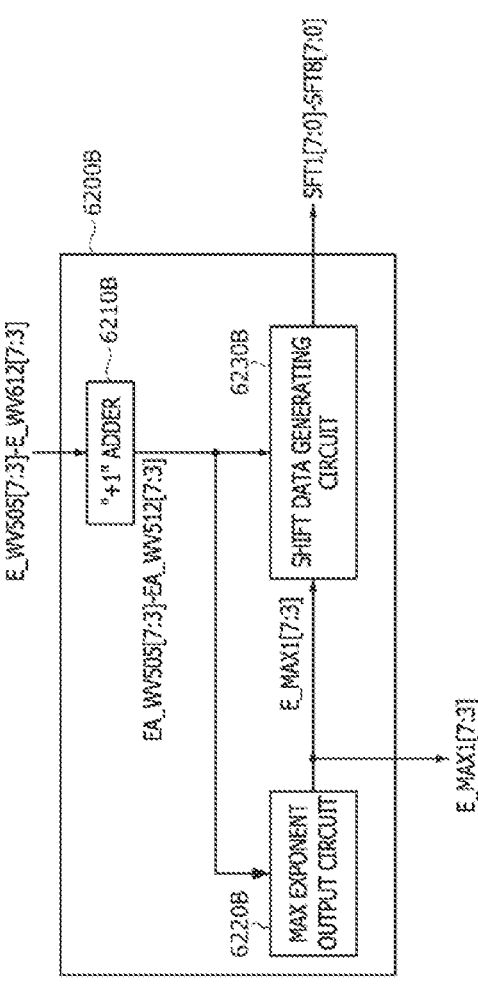
FIG. 101 illustrates an example of a configuration of an exponent pre-processing circuit of the MAC operator of FIG. 99.

FIG. 101 illustrates an example of a configuration of the exponent pre-processing circuit 6200B of the MAC operator 6000C of FIG. 99. Referring to FIG. 101, the exponent pre-processing circuit 6200B may include a "+1" adder 6210B, a maximum exponent output circuit 6220B, and a shift data generating circuit 6230B. The "+1" adder 6210B may perform "+1" operations for the $505^{th}$ to $512^{th}$ upper bits E_WV505[7:3]-E_WV512[7:3] to output the operation results as $505^{th}$ to $512^{th}$ added upper bits EA_WV505[7:3]- EA_WV512[7:3]. For example, when the $505^{th}$ upper bit E_WV505[7:3] is "00101", the $505^{th}$ added upper bit EA_WV505[7:3] may be "00110". The "+1" addition operation by the "+1" adder 6210B is an operation for making the $505^{th}$ to $512^{th}$ lower bits E_WV505[2:0]-E_WV512[2:0] have the "maximum value +1", for example, a decimal number "8" (a binary number "1000"), and this will be described in more detail below. The $505^{th}$ to $512^{th}$ added upper bits EA_WV505[7:3]-EA_WV512[7:3] may be transmitted to the maximum exponent output circuit 6220B and the shift data generating circuit 6230B of the exponent pre-processing circuit 6200B. The maximum exponent output circuit 6220B may output the added upper bit having the greatest value among the $505^{th}$ to $512^{th}$ added upper bits EA_WV505[7:3]-EA_WV512[7:3] transmitted from the "+1" adder 6210B as the first maximum exponent upper data E_MAX1[7:3].

Figure 102:
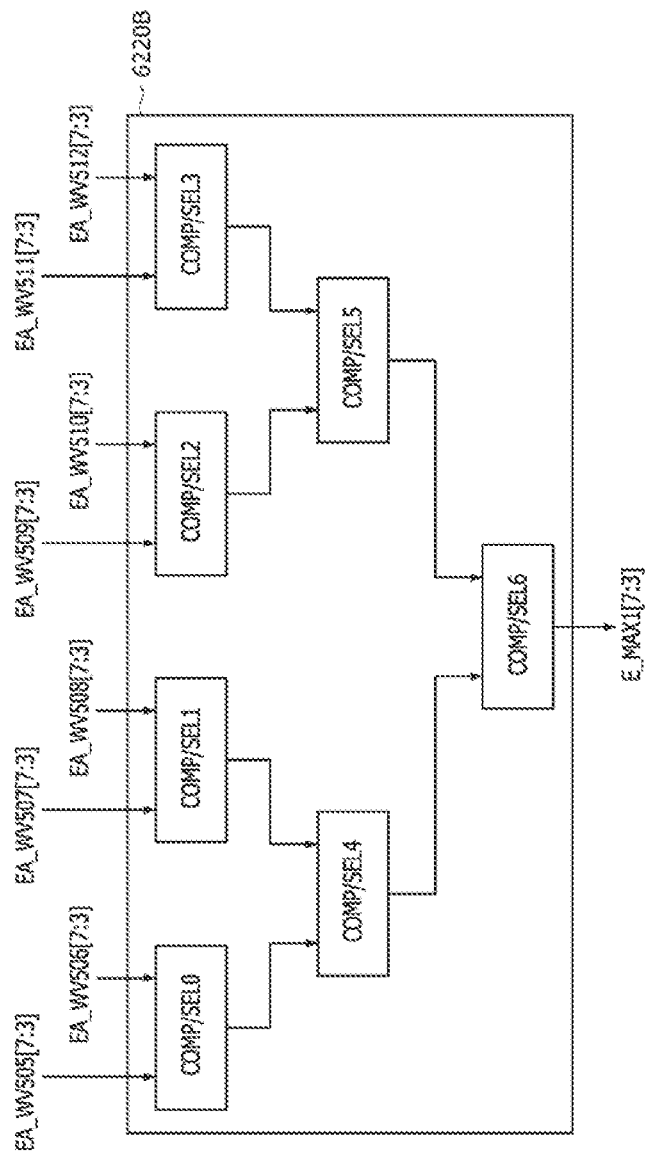
FIG. 102 illustrates an example of a configuration of a maximum exponent output circuit of the exponent pre-processing circuit of FIG. 101.

FIG. 102 illustrates an example of a configuration of the maximum exponent output circuit 6220B of the exponent pre-processing circuit 6200B of FIG. 101. Referring to FIG. 102, the maximum exponent output circuit 6220B may include first to seventh comparators/selectors COMP/SEL0- COMP/SEL6. Each of the first to seventh comparators/ selectors COMP/SEL0-COMP/SEL6 may include two input terminals and one output terminal. In an example, the first to seventh comparators/selectors COMP/SEL0-COMP/SEL6 may be arranged in a hierarchical structure such as a tree structure. The first to fourth comparators/selectors COMP/ SEL0-COMP/SEL3 may be disposed at a beginning stage. The fifth and sixth comparators/selectors COMP/SEL4 and COMP/SEL5 may be disposed at an intermediate stage. The seventh comparator/selector COMP/SEL6 may be disposed at a last stage.

The first comparator/selector COMP/SEL0 may compare the $505^{th}$ added upper bit EA_WV505[7:3] and the $506^{th}$ added upper bit EA_WV506[7:3] to output the added upper bit having a greater value through the output terminal. The second comparator/selector COMP/SEL1 may compare the $507^{th}$ added upper bit EA_WV507[7:3] and the $508^{th}$ added upper bit EA_WV508[7:3] to output the added upper bit having a greater value through the output terminal. The third comparator/selector COMP/SEL2 may compare the $509^{th}$ added upper bit EA_WV509[7:3] and the $510^{th}$ added upper bit EA_WV510[7:3] to output the added upper bit having a greater value through the output terminal. The fourth comparator/selector COMP/SEL3 may compare the $511^{th}$ added upper bit EA_WV511[7:3] and the $512^{th}$ added upper bit EA_WV512[7:3] to output the added upper bit having a greater value through the output terminal.

The fifth comparator/selector COMP/SEL4 of the intermediate stage may compare the added upper bits output from the first and second comparators/selectors COMP/ SEL0 and COMP/SEL1 to output the added upper bit having a greater value through the output terminal. The sixth comparator/selector COMP/SEL5 may compare the added upper bits output from the third and fourth comparators/ selectors COMP/SEL2 and COMP/SEL3 to output the added upper bit having a greater value through the output terminal. The seventh comparator/selector COMP/SEL6 of the lowermost stage may compare the added upper bits output from the fifth and sixth comparators/selectors COMP/ SEL4 and COMP/SEL5 to output the added upper bit having a greater value as the first maximum exponent upper data E_MAX1[7:3] through the output terminal. The first maximum exponent upper data E_MAX1[7:3] may be output to the outside of the exponent pre-processing circuit 6200B, and may also be transmitted to the shift data generating circuit 6230B in the exponent pre-processing circuit 6200B.

Referring back to FIG. 101, the shift data generating circuit 6230B may receive the $505^{th}$ to $512^{th}$ added upper bits EA_WV505[7:3]-E_WV512[7:3] from the "+1" adder 6210B and may receive the first maximum exponent upper data E_MAX1[7:3] from the maximum exponent output circuit 6220B. The shift data generating circuit 6230B may subtract each of the $505^{th}$ to $512^{th}$ added upper bits EA_WV505[7:3]-EA_WV512[7:3] from the first maximum exponent upper data E_MAX1[7:3] to generate and output the first to eighth shift data SFT1[7:3]-SFT8[7:3].

Figure 103:
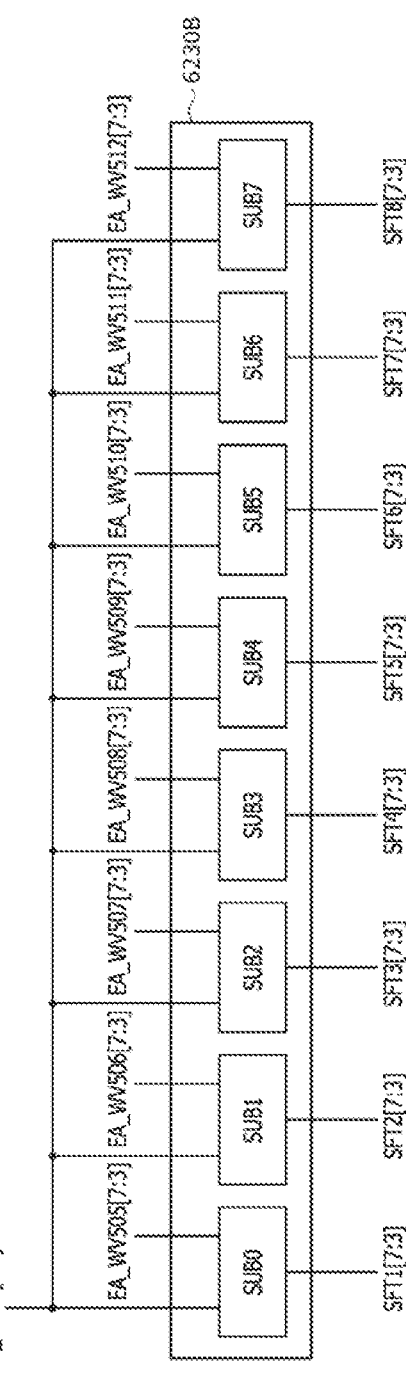
FIG. 103 illustrates an example of a configuration of a shift data generating circuit of the exponent pre-processing circuit of FIG. 101.

FIG. 103 illustrates an example of a configuration of the shift data generating circuit 6230B of the exponent pre-processing circuit 6200B of FIG. 101. Referring to FIG. 103, the shift data generating circuit 6230B may include first to eighth subtractors SUB0-SUB7. Each of the first to eighth subtractors SUB0-SUB7 may have two input terminals and one output terminal. Each of the first to eighth subtractors SUB0-SUB7 may commonly receive the first maximum exponent data E_MAX1[7:0] through an input terminal. The first to eighth subtractors SUB0-SUB7 may receive the $505^{th}$ to $512^{th}$ added upper bits EA_WV505[7:3]-EA_WV512[7:3] through different input terminals. The first to eighth subtractors SUB0-SUB7 may subtract the $505^{th}$ to $512^{th}$ added upper bits EA_WV505[7:3]-EA_WV512[7:3] from the first maximum exponent data E_MAX1[7:0] to generate and output the first to eighth shift data SFT1[7:3]-SFT8[7:3].

Specifically, the first subtractors SUB0 may subtract the $505^{th}$ added upper bit EA_WV505[7:3] from the first maximum exponent upper data E_MAX1[7:3] to generate and output the first shift data SFT1[7:3]. When the $505^{th}$ added upper bit EA_WV505[7:3] is the first maximum exponent upper data E_MAX1[7:3], the first shift data SFT1[7:3] may have a binary value of "0". When the $505^{th}$ added upper bit EA_WV505[7:3] is not the first maximum exponent upper data E_MAX1[7:3], the first shift data SFT1[7:3] may correspond to a result of subtracting the $505^{th}$ added upper bit EA_WV505[7:3] from the first maximum exponent upper data E_MAX1[7:3]. The remaining second to eighth subtractors SUB1-SUB7 may also generate and output the second to eighth shift data SFT2[7:3]-SFT8[7:3], respectively, in the same manner.

Referring again to FIG. 99, the mantissa pre-processing circuit 6200C may receive the $505^{th}$ to $512^{th}$ sign data S_WV505[0]-S_WV512[0] and the $505^{th}$ to $512^{th}$ mantissa data M_WV505[15:0]-M_WV512[15:0] transmitted from the multiplication circuit 6100. The mantissa pre-processing circuit 6200C may receive the $505^{th}$ to $512^{th}$ lower bits E_WV505[2:0]-E_WV512[2:0] transmitted from the bit separation circuit 6150. In addition, the mantissa pre-processing circuit 6200C may receive the first to eighth shift data SFT1[7:3]-SFT8[7:3] transmitted from the exponent pre-processing circuit 6200B. The mantissa pre-processing circuit 6200C may perform mantissa pre-processing for the $505^{th}$ to $512^{th}$ mantissa data M_WV505[15:0]-M_WV512 [15:0] to generate and output the $505^{th}$ to $512^{th}$ pre-processed mantissa data PM_WV505[15:0]-PM_WV512[15: 0]. The $505^{th}$ to $512^{th}$ pre-processed mantissa data PM_WV505[15:0]-PM_WV512[ 5:0] may be transmitted to the adder tree 6300.

Figure 104:
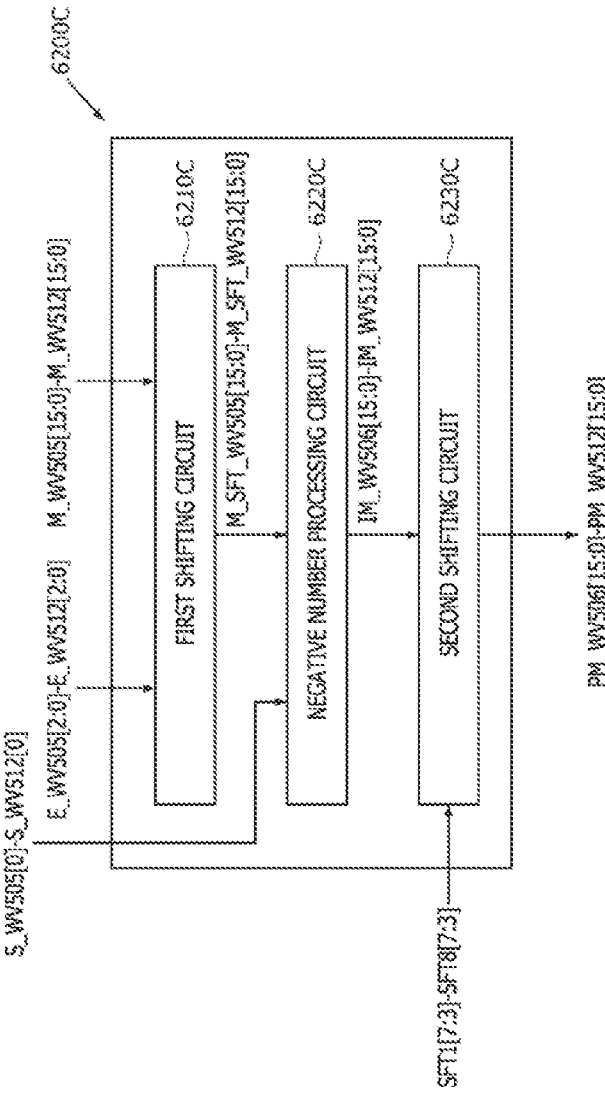
FIG. 104 illustrates an example of a configuration of a mantissa pre-processing circuit of the MAC operator of FIG. 99.

FIG. 104 illustrates an example of a configuration of the mantissa pre-processing circuit 6200C of the MAC operator 6000C of FIG. 99. Referring to FIG. 104, the mantissa pre-processing circuit 6200C may include a first shifting circuit 6210C, a negative number processing circuit 6220C, and a second shifting circuit 62300. The first shifting circuit 6210C may perform first shifting for each of the 505$^{th}$ to 512$^{th}$ mantissa data M_WV505[15:0]-M_WV512[15:0] by the value of each of the 505$^{th}$ to 512$^{th}$ lower bits E_WV505 [2:0]-E_WV512[2:0] and output the data generated as a result of the first shifting as 505$^{th}$ to 512$^{th}$ shifted mantissa data M_SFT_WV505[15:0]-M_SFT_WV512[15:0].

Figure 105:
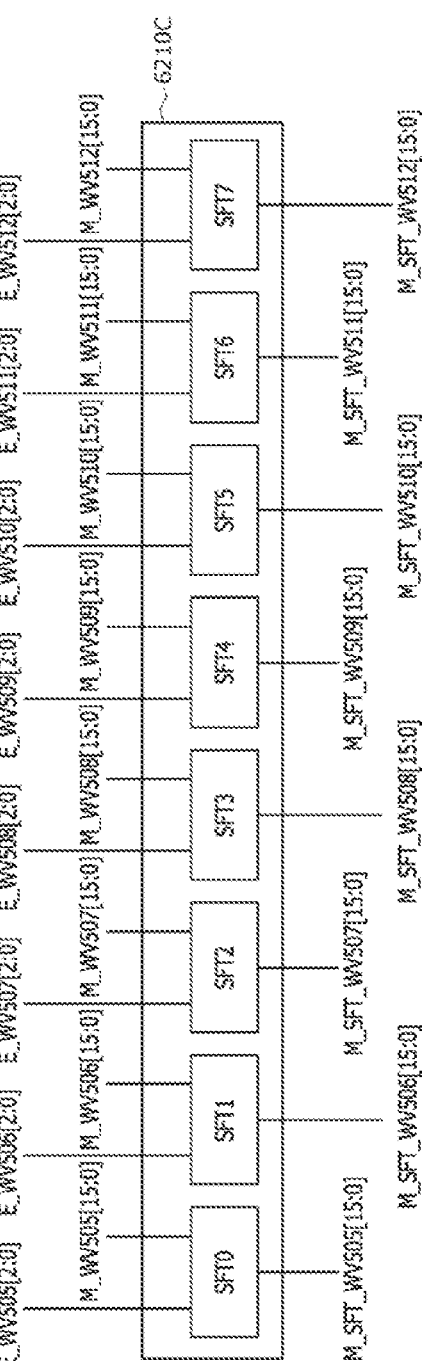
FIG. 105 illustrates an example of a configuration of a first shifting circuit of the mantissa pre-processing circuit of FIG. 104.

FIG. 105 illustrates an example of a configuration of the first shifting circuit 6210C of the mantissa pre-processing circuit 6200C of FIG. 104. Referring to FIG. 105, the first shifting circuit 6210C may include first to eighth shifters SFT0-SFT7. Each of the first to eighth shifters SFT0-SFT7 may have two input terminals and one output terminal. The first to eighth shifters SFT0-SFT7 may receive the 505$^{th}$ to 512$^{th}$ lower bits E_WV505[2:0]-E_WV512[2:0], respectively, through first input terminals. The first to eighth shifters SFT0-SFT7 may receive the 505$^{th}$ to 512$^{th}$ mantissa data M_WV505[15:0]-M_WV512[15:0], respectively, through second input terminals. The first to eighth shifters SFT0-SFT7 may shift the 505$^{th}$ to 512$^{th}$ mantissa data M_WV505[15:0]-M_WV512[15:0], respectively, such that each of the 505$^{th}$ to 512$^{th}$ lower bits E_WV505[2:0]-E_WV512[2:0] have a value of "maximum value +1", that is, a binary value "1000", and may output the result of the shifting as the 505$^{th}$ to 512$^{th}$ shifted mantissa data M_SFT_WV505[15:0]-M_SFT_WV512[15:0], respectively.

Figure 106:
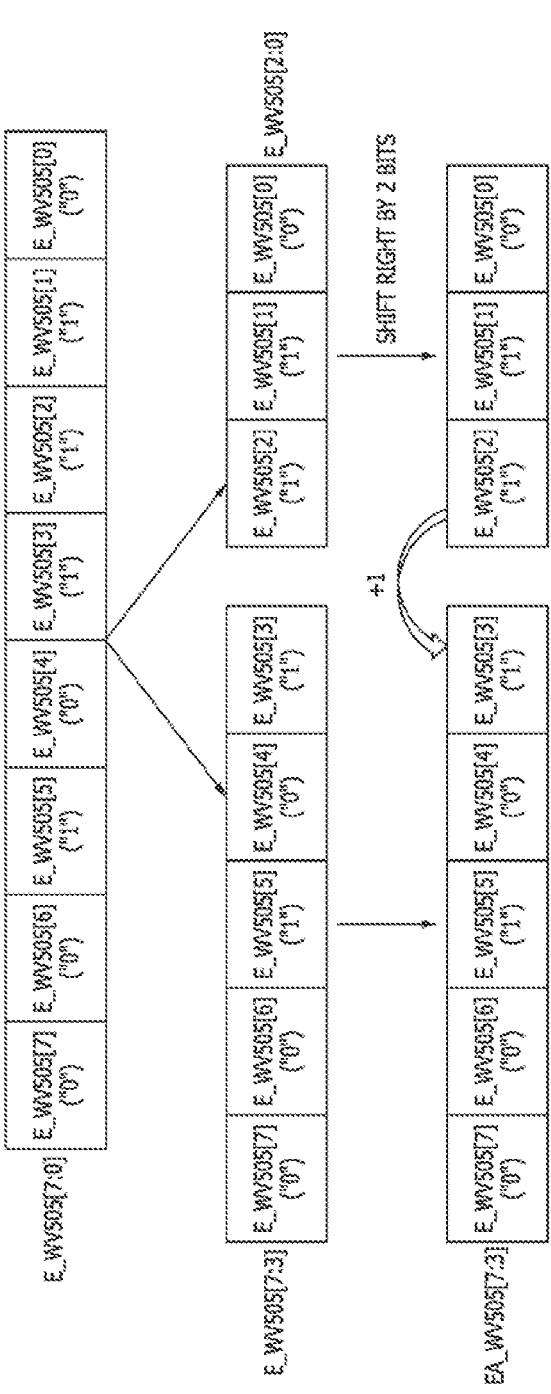
FIG. 106 illustrates a process in which the number of shift bits is determined by $505^{th}$ exponent lower data in a first shifter of the first shifting circuit of FIG. 105.
Figure 108:
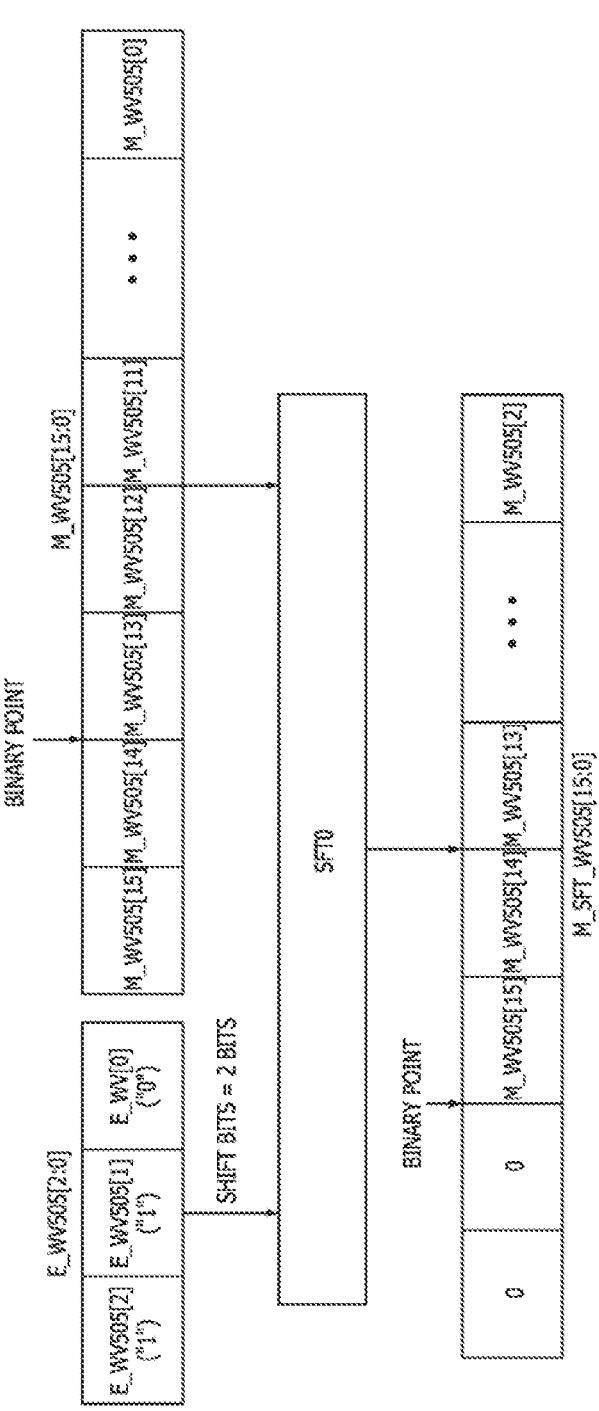
FIG. 108 illustrates a first shifting operation in the first shifter of the first shifting circuit of FIG. 105.

FIG. 106 illustrates a process in which the number of shifting bits is determined by the 505$^{th}$ lower bit E_WV505 [2:0] in the first shifter SFT0 of the first shifting circuit 6210C of FIG. 105. FIG. 107 is a table illustrating the number of shifting bits according to the value of the lower bit in the first shifting circuit 6210C of FIG. 105. FIG. 108 illustrates a first shifting operation in the first shifter SFT0 of the first shifting circuit 6210C. The following description may be equally applied to a process in which the number of shifting bits is determined by each of the 506$^{th}$ to 512$^{th}$ lower bits E_WV506[2:0]-E_WV512[2:0] in each of the remaining second to eighth shifters SFT1-SFT7. In the present example, the case in which the 505$^{th}$ exponent data E_WV505[7:0] is "00101110" will be taken as an example.

First, as illustrated in FIG. 106, the 505$^{th}$ exponent data E_WV505[7:0] may be separated into 505$^{th}$ upper bits E_WV505[7:3] of upper 5 bits and 505$^{th}$ lower bits E_WV505[2:0] of lower 3 bits by the bit separation circuit 6150 of FIG. 99. Accordingly, the 505$^{th}$ upper bits E_WV505[7:3] may be composed of "00101" and the 505$^{th}$ lower bits E_WV505[2:0] may be composed of "110". In the first shifter SFT0 of FIG. 105, "110", which is the 505$^{th}$ lower bit E_WV505[2:0], may be changed to "1000", which corresponds to "maximum value+1". The MSB "1" of the "1000" may be added to the 505$^{th}$ upper bits E_WV505[7:3] as described with reference to FIG. 101, and accordingly, the 505$^{th}$ added upper bits EA_WV505[7:3] composed of the binary stream of "00110" may be generated. As the 505$^{th}$ lower bits E_WV505[2:0] are changed from "110" into "1000", in order to reflect the exponent change in the mantissa data, right shifting needs to be performed on the 505$^{th}$ mantissa data M_WV505[15:0] by the number of bits of a value corresponding to the difference, that is, by 2 bits.

As illustrated in FIG. 107, the number of bits by which the mantissa data is right-shifted in the first shifting circuit

6210B may be determined as a decimal value of data generated by subtracting the lower bits E_WV[2:0] from "1000". That is, when the lower bits E_WV[2:0] are "000", right shifting may be performed on the mantissa data by the bits corresponding to a decimal value of "1000" generated as a result of "1000-000", that is, 8 bits. When the lower bits E_WV[2:0] are "001", the right shifting may be performed on the mantissa data by the bits corresponding to a decimal value of "0111" generated as a result of "1000-001", that is, 7 bits. When the lower bits E_WV[2:0] are "010", the right shifting may be performed on the mantissa data by the bits corresponding to a decimal value of "0110" generated as a result of "1000-010", that is, 6 bits. In the same manner, when the lower bits E_WV[2:0] are "011," "100," "101," "110," and "111", the right shifting may be performed on the mantissa data by "5 bits," "4 bits," "3 bits," "2 bits," and "1 bit", respectively.

As illustrated in FIG. 108, because the 505$^{th}$ lower bits E_WV505[2:0] are "110", the first shifter SFT0 may perform the right shifting for the 505$^{th}$ mantissa data M_WV505[15:0] by 2 bits and output data generated as a result of the right shifting as the 505$^{th}$ shifted mantissa data M_SFT_WV505[15:0]. Because the 505$^{th}$ mantissa data M_WV505[15:0] transmitted to the first shifter SFT0 has a format of "M_WV505[15:14].M_WV505[13:0]", the 505$^{th}$ shifted mantissa data M_SFT_WV505[15:0], which is right shifted by 2 bits and output from the first shifter SFT0, may have a format of "00.M_SFT_WV505[15:2]". In the first shifting process, the lower bits may be removed as much as the number of bits shifted. That is, in this example in which a 2-bit right shifting is performed, the lower 2 bits M_WV505[1:0] of the 505$^{th}$ mantissa data M_WV505[15:0] may be removed in the first shifting process. In an example, rounding processing may be performed in the process of removing the lower 2 bits M_WV505[1:0].

Referring again to FIG. 104, the negative number processing circuit 6220C may receive the sign data S_WV505 [0]-S_WV512[0] from the multiplication circuit 6100 of FIG. 99, and receive the 505$^{th}$ to 512$^{th}$ shifted mantissa data M_SFT_WV505[15:0]-M_SFT_WV512[15:0] from the first shifting circuit 6210C of the mantissa pre-processing circuit 6200C. The negative number processing circuit 6220C may output each of the 505$^{th}$ to 512$^{th}$ shifted mantissa data M_SFT_WV505[15:0]-M_SFT_WV512[15:0] or may output a 2's complement of each of the 505$^{th}$ to 512$^{th}$ shifted mantissa data M_SFT_WV505[15:0]-M_SFT_WV512[15: 0] according to a value of each of the sign data S_WV505 [0]-S_WV512[0]. Hereinafter, data output from the negative number processing circuit 6220C will be referred to as "505$^{th}$ to 512$^{th}$ intermediate mantissa data IM_WV505[15: 0]-IM_WV512[15:0]".

Figure 109:
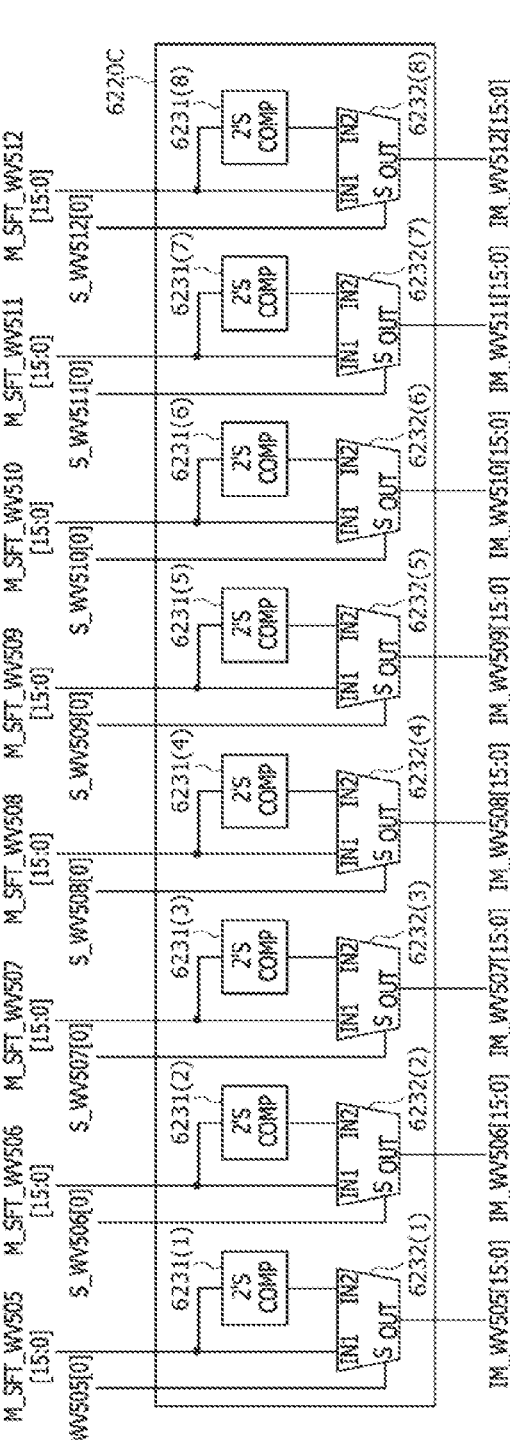
FIG. 109 illustrates an example of a configuration of a negative number processing circuit of the mantissa pre-processing circuit of FIG. 104.

FIG. 109 illustrates an example of a configuration of the negative number processing circuit 6220C of the mantissa pre-processing circuit 6200C of FIG. 105. The negative number processing circuit 6220C according to this example may have substantially the same configuration as the negative number processing circuit 6230 of FIG. 86 described with reference to FIG. 86. Accordingly, in FIG. 109, the same reference numerals as in FIG. 86 denote the same components. Referring to FIG. 109, the negative number processing circuit 6220C may include first to eighth 2's complement circuits (2's comp) 6231(1)-6231(8) and first to eighth 2:1 multiplexers 6232(1)-6232(8) each having a first input terminal IN1, a second input terminal IN2, a selection terminal S, and an output terminal OUT. The first to eighth 2's complement circuit 6231(1)-6231(8) may receive the 505$^{th}$ to 512$^{th}$ shifted mantissa data M_SFT_WV505[15:0]-

M_SFT_WV512[15:0], respectively, and generate and output 2's complements of each of the $505^{th}$ to $512^{th}$ shifted mantissa data M_SFT_WV505[15:0]-M_SFT_WV512[15:0]. Each of the 2's complements of the $505^{th}$ to shifted mantissa data M_SFT_WV505[15:0]-M_SFT_WV512[15:0] may be transmitted to the second input terminal IN2 of the first to eighth 2:1 multiplexers 6232(1)-6232(8), respectively.

Each of the first to eighth 2:1 multiplexers 6232(1)-6232(8) may receive the $505^{th}$ to $512^{th}$ shifted mantissa data M_SFT_WV505[15:0]-M_SFT_WV512[15:0], respectively, through the first input terminal IN1. Each of the first to eighth 2:1 multiplexers 6232(1)-6232(8) may receive the 2's complement of each of the $505^{th}$ to $512^{th}$ shifted mantissa data M_SFT_WV505[15:0]-M_SFT_WV512[15:0], respectively, through the second input terminal IN2. Each of the first to eighth 2:1 multiplexers 6232(1)-6232(8) may receive the $505^{th}$ to $512^{th}$ sign data S_WV505[0]-S_WV512[0], respectively, through the selection terminal S. Each of the first to eighth 2:1 multiplexers 6232(1)-6232(8) may output the mantissa data or 2's complement of the mantissa data according to a value of each of the sign data as the intermediate mantissa data through the output terminal OUT.

For example, the first 2:1 multiplexer 6232(1) may receive the $505^{th}$ shifted mantissa data M_SFT_WV505[15:0] through the first input terminal IN1, and may receive the 2's complement of the $505^{th}$ shifted mantissa data M_SFT_WV505[15:0] transmitted from the first 2's complement circuit 6231(1) through the second input terminal IN2. When the $505^{th}$ sign data S_WV505[0] received through the selection terminal S is "0" indicating a positive number, the first 2:1 multiplexer 6232(1) may output the $505^{th}$ shifted mantissa data M_SFT_WV505[15:0] input through the first input terminal IN1 as the $505^{th}$ intermediate mantissa data IM_WV505[15:0]. On the other hand, when the $505^{th}$ sign data S_WV505[0] received through the selection terminal S is "1" indicating a negative number, the first 2:1 multiplexer 6232(1) may output the 2's complement of the $505^{th}$ shifted mantissa data M_SFT_WV505[15:0] input through the second input terminal IN2 as the $505^{th}$ intermediate mantissa data IM_WV505[15:0]. The remaining second to eighth 2:1 multiplexers 6232(2)-6232(8) may also output the $506^{th}$ to $512^{th}$ intermediate mantissa data IM_WV506[15:0]-WV512[15:0], respectively, in the same manner.

Referring to FIG. 104 again, the second shifting circuit 6230C may receive the $505^{th}$ to $512^{th}$ intermediate mantissa data IM_WV505[15:0]-IN_WV512[15:0] from the negative number processing circuit 6220C, and may receive the first to eighth shift data SFT1[7:3]-SFT8[7:3] from the exponent pre-processing circuit 6200B. The second shifting circuit 6230C may perform second shifting for each of the $505^{th}$ to $512^{th}$ intermediate mantissa data IM_WV505[15:0]-IM_WV512[15:0] by a value of each of the first to eighth shift data SFT1[7:3]-SFT8[7:3] to output data generated as a result of the second shifting as the $505^{th}$ to $512^{th}$ pre-processed mantissa data PM_WV505[15:0]-PM_WV512[15:0].

Figure 110:
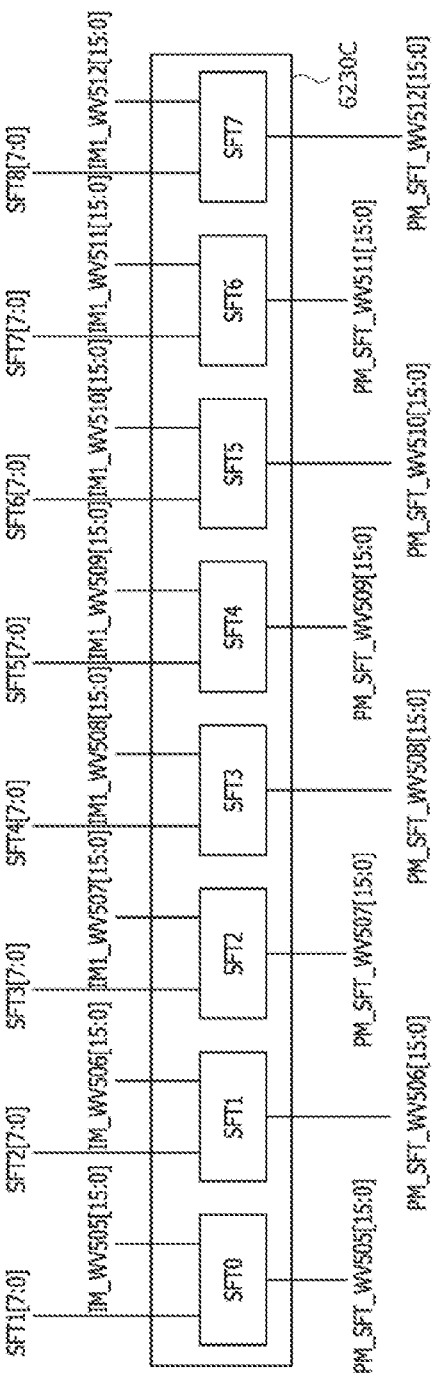
FIG. 110 illustrates an example of a configuration of a second shifting circuit of the mantissa pre-processing circuit of FIG. 104.

FIG. 110 illustrates an example of a configuration of the second shifting circuit 6230C of FIG. 104. Referring to FIG. 110, the second shifting circuit 6230C may include first to eighth shifters SFT0-SFT7. Each of the first to eighth shifters SFT0-SFT7 may have two input terminals and one output terminal. Each of the first to eighth shifters SFT0-SFT7 may receive the SFT1[7:0]-SFT8[7:0], respectively, through a first input terminal. Each of the first to eighth shifters SFT0-SFT7 may receive the $505^{th}$ to $512^{th}$ intermediate mantissa data IM_WV505[15:0]-IM_WV512[15:0], respectively, through a second input terminal. Each of the first to eighth shifters SFT0-SFT7 may shift the intermediate mantissa data input through the second input terminal by the number of bits corresponding to a decimal value of each of the shift data input through the first input terminal to generate and output the $505^{th}$ to $512^{th}$ pre-processed mantissa data PM_WV505[15:0]-PM_WV512[15:0].

Specifically, the first shifter SFT0 may shift the $505^{th}$ intermediate mantissa data IM_WV505[15:0] input through the second input terminal by the number of bits corresponding to a decimal value of the first shift data SFT1[7:0] input through the first input terminal to generate and output the $505^{th}$ pre-processed mantissa data PM_WV505[15:0]. The second shifter SFT1 may shift the $505^{th}$ intermediate mantissa data IM_WV506[15:0] input through the second input terminal by the number of bits corresponding to a decimal value of the second shift data SFT2[7:0] input through the first input terminal to generate and output the $506^{th}$ pre-processed mantissa data PM_WV506[15:0]. The remaining third to eighth shifters SFT2-SFT7 may also generate and output the $507^{th}$ to $512^{th}$ pre-processed mantissa data PM_WV507[15:0]-PM_WV512[15:0], respectively, in the same manner.

Referring back to FIG. 99, as a result of performing the exponent pre-processing for the $505^{th}$ to $512^{th}$ exponent data E_WV505[7:0]-E_WV512[7:0] and the mantissa pre-processing for the $505^{th}$ to $512^{th}$ mantissa data M_WV505[15:0]-M_WV512[15:0], the $505^{th}$ to $512^{th}$ pre-processed mantissa data PM_WV505[15:0]-PM_WV512[15:0] may be transmitted to the adder tree 6300 and the first maximum exponent upper data E_MAX1[7:3] may be transmitted to the accumulator 6400B. As described with reference to FIG. 88, the adder tree 6300 may add all of the $505^{th}$ to $512^{th}$ pre-processed mantissa data PM_WV505[15:0]-PM_WV512[15:0] to generate and output the mantissa data M_MA64[18:0]. The mantissa data M_MA64[18:0] output from the adder tree 6300 may constitute the mantissa data of the $64^{th}$ multiplication addition data D_MA64 in FIG. 80. The mantissa data M_MA64[18:0] of the $64^{th}$ multiplication addition data D_MA64 in FIG. 80 may be transmitted to the accumulator 6400C.

The accumulator 6400C may perform an accumulative addition operation on the $64^{th}$ multiplication addition data D_MA64 in FIG. 80 and the latch data. Here, the latch data may correspond to data latched in the previous MAC operation, that is, in the $63^{rd}$ MAC operation. The $64^{th}$ multiplication addition data D_MA64 may include the first maximum exponent upper data E_MAX1[7:3] transmitted from the exponent pre-processing circuit 6200B and the mantissa data M_MA64[18:0] transmitted from the adder tree 6300. The accumulator 6400C may generate and output the exponent upper data E_MAC64[7:3] and mantissa data M_MAC64[Z:0] of the $64^{th}$ MAC data D_MAC64 as an accumulation result. The exponent upper data E_MAC64[7:3] and the mantissa data M_MAC64[Z:0] of the $64^{th}$ MAC data D_MAC64 may be transmitted to the output circuit 6500C.

Figure 111:
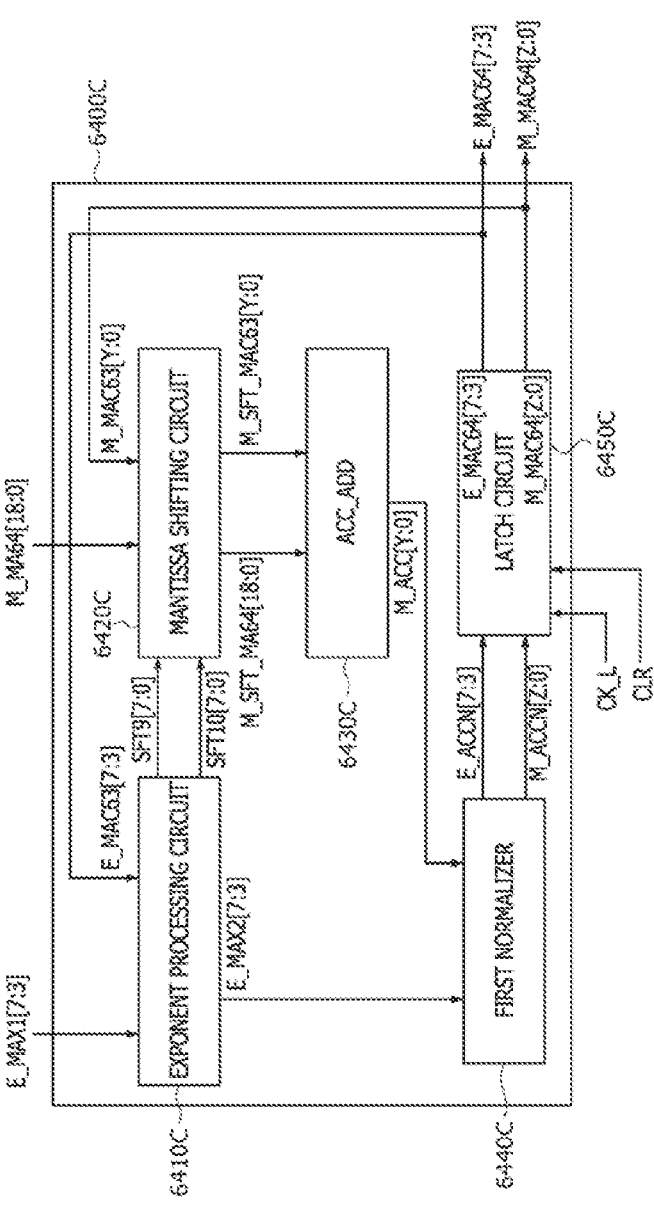
FIG. 111 illustrates an example of a configuration of an accumulator of the MAC operator of FIG. 99.

FIG. 111 illustrates an example of a configuration of the accumulator 6400C of the MAC operator 6000C of FIG. 99. Referring to FIG. 111, the accumulator 6400C may include an exponent processing circuit 6410C, a mantissa shifting circuit 6420C, an accumulative adder 6430C, a first normalizer 6440C, and a latch circuit 6450C. The exponent processing circuit 6410C of the accumulator 6400C may receive the first maximum exponent upper data E_MAX1

[7:3] from the exponent pre-processing circuit 6200B of FIG. 99. In addition, the exponent processing circuit 6410C may receive the exponent upper data of the latch data, that is, the exponent upper data E_MAC63[7:3] of the 63$^{rd}$ MAC data D_MAC63 from the latch circuit 6450C. The exponent processing circuit 6410C may generate and output the second maximum exponent upper data E_MAX2[7:3] and the ninth and tenth shift data SFT9[7:0] and SFT10[7:0].

The mantissa shifting circuit 6420C may receive the mantissa data M_MA64[18:0] of the 64$^{th}$ multiplication addition data D_MA64 from the adder tree 6300 of FIG. 99. The mantissa shifting circuit 6420C may receive the mantissa data of the latch data, that is, the mantissa data M_MAC63[Y:0] of the 63$^{rd}$ MAC data D_MAC63 from the latch circuit 6450C. Here, "Y" may represent a natural number equal to or greater than the number of bits of the mantissa data M_MA64[18:0]. In addition, the mantissa shifting circuit 6420C may receive the ninth and tenth shift data SFT9[7:0] and SFT10[7:0] from the exponent processing circuit 64100. The mantissa shifting circuit 6420C may generate and output the shifted mantissa data M_SFT_MA64[18:0] of the 64$^{th}$ multiplication addition data D_MA64 and the shifted mantissa data M_SFT_MAC63[Y:0] of the 63$^{rd}$ MAC data D_MAC63.

The accumulative adder 6430C may receive the shifted mantissa data M_SFT_MA64[18:0] of the 64$^{th}$ multiplication addition data D_MA64 and the shifted mantissa data M_SFT_MAC63[Y:0] of the 63$^{rd}$ MAC data D_MAC63 from the mantissa shifting circuit 6420C. The accumulative adder 6430C may generate and output the accumulative mantissa data M_ACC[Y:0].

The first normalizer 6440C may receive the second maximum exponent upper data E_MAX2[7:3] from the exponent processing circuit 6410C and may receive the accumulative mantissa data M_ACC[Y:0] from the accumulative adder 6430C. The first normalizer 6440C may perform first normalization processing for the second maximum exponent upper data E_MAX2[7:3] and the accumulative mantissa data M_ACC[Y:0] to generate and output the normalized accumulative exponent upper data E_ACCN[7:3] and the first normalized accumulative mantissa data M_ACCN[Z:0]. The first normalized accumulative mantissa data M_ACCN[Z:0] output from the first normalizer 6440C may have the number of bits equal to the number of bits of the accumulative mantissa data M_ACC[Y:0] transmitted from the accumulative adder 6430C to the first normalizer 6440C or may have the number of bits in which "8" is added to the number of bits of the accumulative mantissa data M_ACC [Y:0].

The first normalization processing performed by the first normalizer 6440C may be performed for the second maximum exponent upper data E_MAX2[7:3] and the accumulative mantissa data M_ACC[Y:0]. The first normalization processing may be performed in a different way depending on the cases in which the bit having the value "1" in the accumulative mantissa data M_ACC[Y:0] exists in upper 8 bits or higher from the binary point and does not exist. In an example, when the bit having the value of "1" in the accumulative mantissa data M_ACC[Y:0] exists in upper 8 bits or higher from the binary point, the first normalizer 6440C may perform an "+1" addition operation for the second maximum exponent upper data E_MAX2[7:3] and output the result of the "+1" addition operation as normalized accumulative exponent upper data E_ACCN[7:3]. In addition, the first normalizer 6440C may perform an 8-bit shifting operation in the right direction for the accumulated mantissa data M_ACC[Y:0] and output the result of the 8-bit shifting operation as the first normalized accumulative mantissa data M_ACCN[Z:0]. In another example, when the bit having the value of "1" in the accumulative mantissa data M_ACC[Y:0] does not exist in upper 8 bits or higher from the binary point, the first normalizer 6440C may output the second maximum exponent upper data E_MAX2[7:3] and the accumulative mantissa data M_ACC [Y:0] as the normalized accumulative exponent upper data E_ACCN[7:3] and the first normalized accumulative mantissa data M_ACCN[Z:0] as they are, respectively.

The latch circuit 6450C may receive the normalized accumulative exponent upper data E_ACCN[7:3] and the first normalized accumulative mantissa data M_ACCN[Z:0] from the first normalizer 6440C. The latch circuit 6450C may latch the normalized accumulative exponent upper data E_ACCN[7:3] and the first normalized accumulative mantissa data M_ACCN[Z:0] as exponent upper data E_MAC64 [7:3] and mantissa data M_MAC64[Z:0] of the 64$^{th}$ MAC data D_MAC64 in response to a clock latch signal CK_L of a logic "high" level. Because the 64$^{th}$ MAC operation is the last MAC operation, the exponent upper data E_MAC64[7: 3] and mantissa data M_MAC64[Z:0] of the 64$^{th}$ MAC data D_MAC64 may be no longer used as the latch data. The latch circuit 6450C may output the exponent upper data E_MAC64[7:3] and mantissa data M_MAC64[Z:0] of the 64$^{th}$ MAC data D_MAC64 from the accumulator 6400C. As all MAC operations are completed, the latch circuit 6450C may be reset in response to a clear signal CLR of a logic "high" level.

Figure 112:
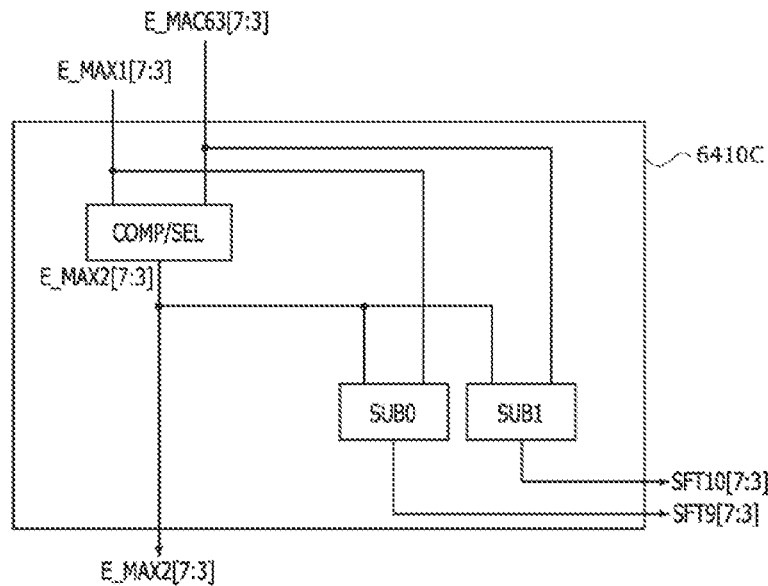
FIG. 112 illustrates an example of a configuration of an exponent processing circuit of the accumulator of FIG. 111.

FIG. 112 illustrates an example of a configuration of the exponent processing circuit 6410C of the accumulator 6400C of FIG. 111. Referring to FIG. 112, the exponent processing circuit 6410C may include a comparator/selector COMP/SEL, a first subtractor SUB0, and a second subtractor SUB1. The comparator/selector COMP/SEL may include a comparator and a selection output unit. The comparator/ selector COMP/SEL may compare the first maximum exponent upper data E_MAX1[7:3] and the exponent data of the latch data, that is, the exponent upper data E_MAC63[7:3] of the 63$^{rd}$ MAC data D_MAC63 to output the exponent data having a greater value as the second maximum exponent upper data E_MAX2[7:3]. The second maximum exponent upper data E_MAX2[7:3] may be transmitted from the exponent processing circuit 6410C to the first normalizer 6440C of FIG. 111 and may also be transmitted to the first subtractor SUB0 and the second subtractor SUB1. The first subtractor SUB0 may perform a subtraction operation for the second maximum exponent upper data E_MAX2[7:3] and the first maximum exponent upper data E_MAX1[7:3] to generate and output the ninth shift data SFT9[7:3]. The second subtractor SUB1 may perform a subtraction operation for the second maximum exponent upper data E_MAX2 [7:3] and the exponent upper data E_MAC63[7:3] of the 63$^{rd}$ MAC data D_MAC63 to generate and output the tenth shift data SFT10[7:3].

Figure 113:
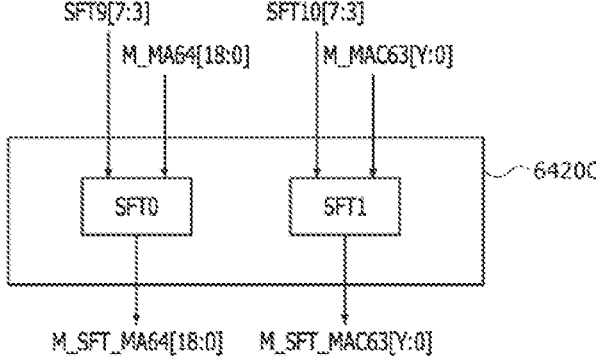
FIG. 113 illustrates an example of a configuration of a mantissa shifting circuit of the accumulator of FIG. 111.

FIG. 113 illustrates an example of a configuration of the mantissa shifting circuit 6420C of the accumulator 6400C of FIG. 111. Referring to FIG. 113, the mantissa shifting circuit 6420C may include a first shifter SFT0 and a second shifter SFT1. The first shifter SFT0 may receive the ninth shift data SFT9[7:3] and the mantissa data M_MA64[18:0] of the 64$^{th}$ multiplication addition data D_MA64 from the exponent processing circuit 6410C and the adder tree 6300 of FIG. 99, respectively. The first shifter SFT0 may shift the mantissa data M_MA64[18:0] by the number of bits corresponding to the decimal value of the ninth shift data SFT9[7:3] to generate and output the shifted mantissa data M_SFT_MA64[18:0] of the 64$^{th}$ multiplication addition data D_MA64. The second shifter SFT1 may receive the tenth shift data SFT10[7:3] and the mantissa data M_MAC63[Y:0] of the 63$^{rd}$ MAC data D_MAC63 from the exponent processing circuit 6410C and the latch circuit 6450C of FIG. 111, respectively. The second shifter SFT1 may shift the mantissa data M_MAC63[Y:0] by the number of bits corresponding to the value of the tenth shift data SFT10[7:3] to generate and output the shifted mantissa data M_SFT_MAC63[Y:0] of the 63$^{rd}$ MAC data D_MAC63.

Figure 114:
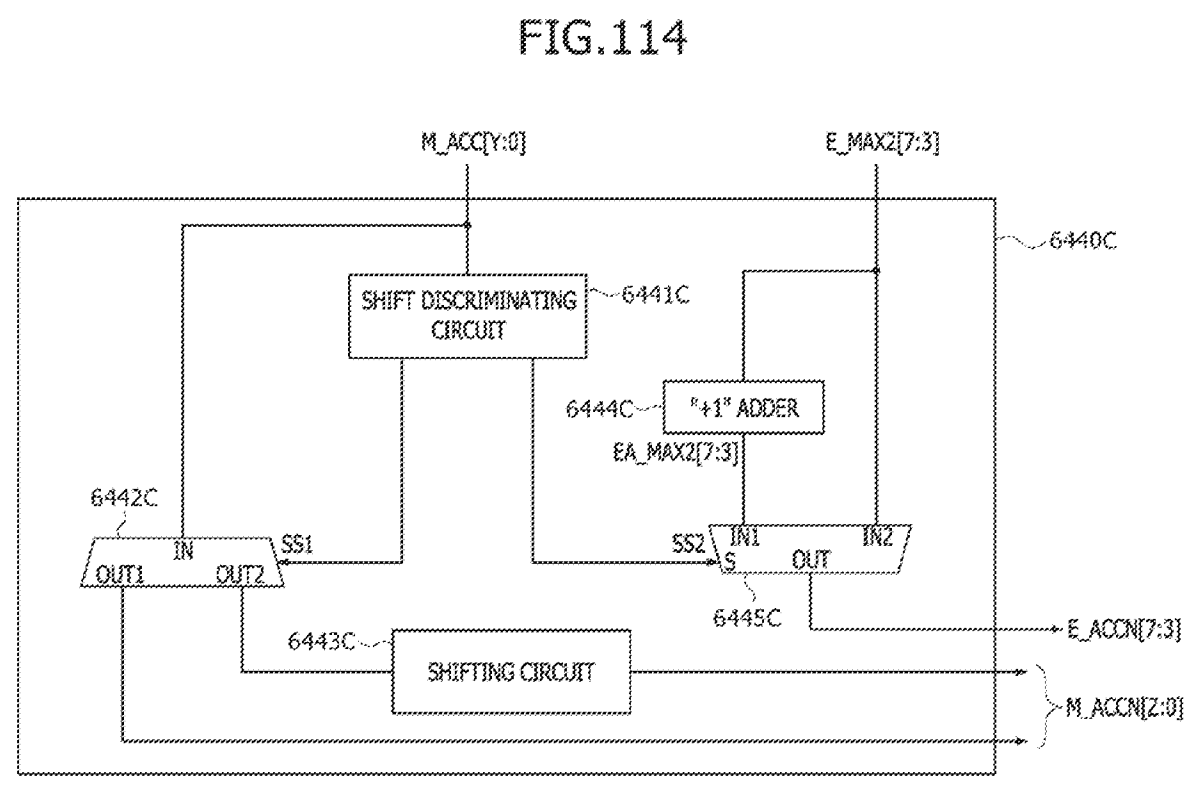
Figure 115:
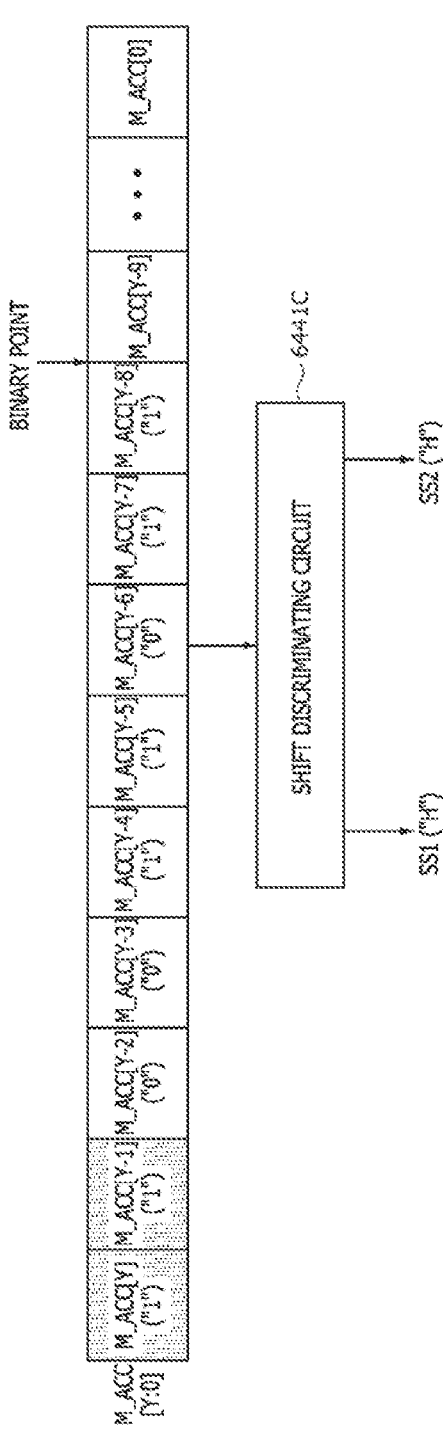
FIG. 115 illustrates an example in which a shifting operation and a "+1" operation are performed in the first normalizer of FIG. 114.
Figure 116:
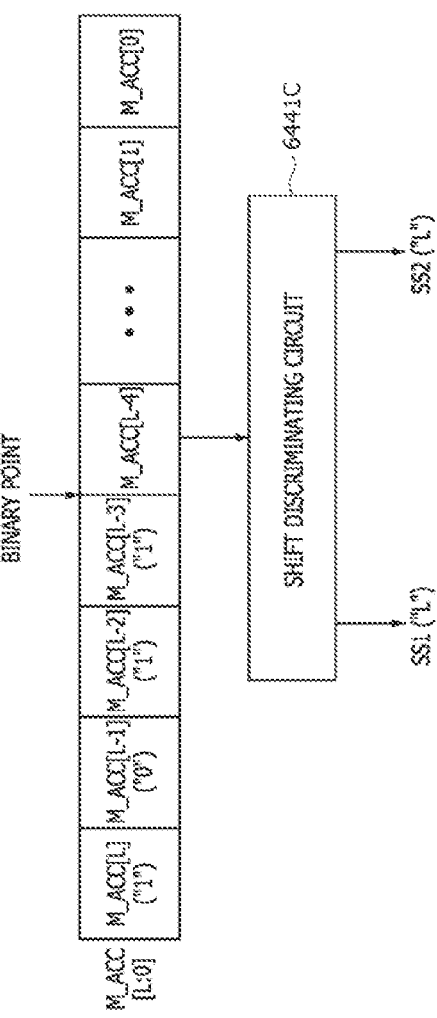
FIG. 116 illustrates an example in which a shifting operation and a "+1" operation are not performed in the first normalizer of FIG. 114.
Figure 117:
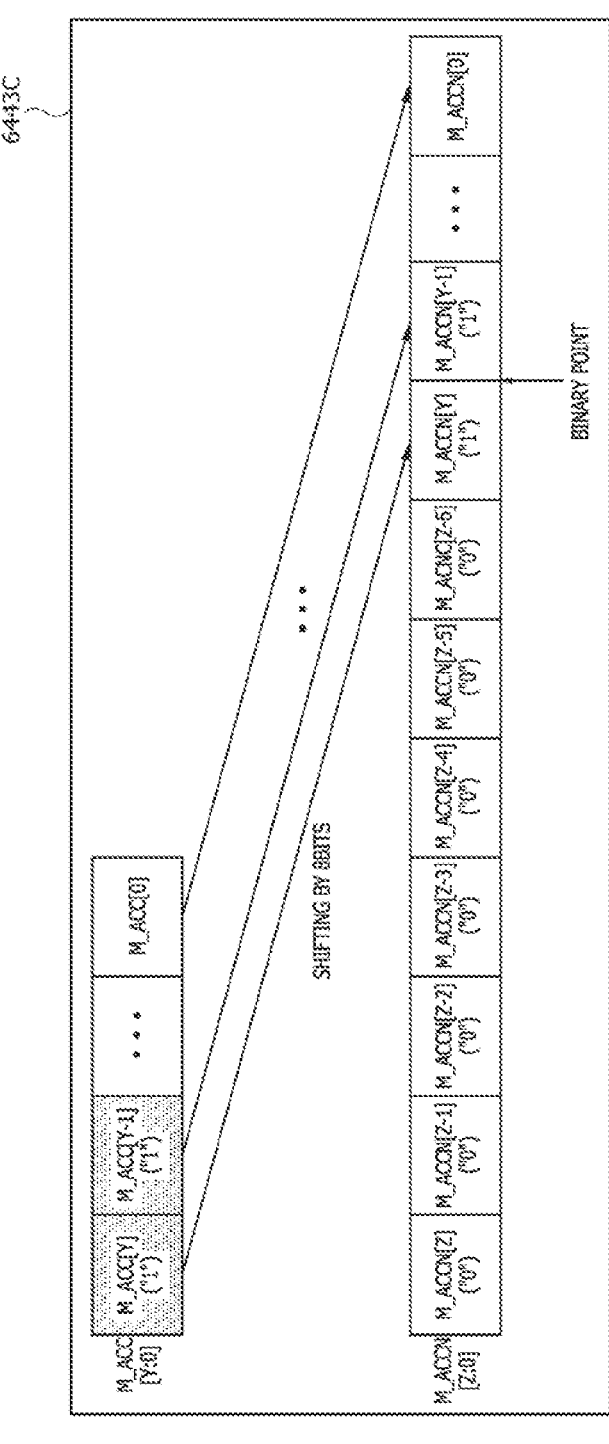
FIG. 117 illustrates an example of a shifting operation in the first normalizer of FIG. 114.

FIG. 114 illustrates an example of a configuration of the first normalizer 6440C of the accumulator 6400C of FIG. 111. FIG. 115 illustrates an example in which a shifting operation and a "+1" operation are performed in the first normalizer 6440C of FIG. 114. FIG. 116 illustrates an example in which a shifting operation and a "+1" operation are not performed in the first normalizer 6440C of FIG. 114. In addition, FIG. 117 illustrates an example of a shifting operation in the first normalizer 6440C of FIG. 114.

First, referring to FIG. 114, the first normalizer 6440C may include a shift discriminating circuit 6441C, a demultiplexer 6442C, a shifting circuit 6443C, a "+1" adder 6444C, and a multiplexer 6445C. The shift discriminating circuit 6441C may receive the accumulative mantissa data M_ACC[Y:0] from the accumulative adder 6430C of FIG. 111. The shift discriminating circuit 6441C may discriminate whether the bit having a value of "1" in the accumulative mantissa data M_ACC[Y:0] is positioned in the upper 8 bits or higher from the binary decimal point. The shift discriminating circuit 6441C may generate and output a first selection signal SS1 and a second selection signal SS2, based on the discrimination result.

Specifically, as illustrated in FIG. 115, a case in which the binary point is positioned between "Y−7"$^{th}$ bit M_ACC[Y−8] and "Y−8"$^{th}$ bit M_ACC[Y−9] in the accumulative mantissa data M_ACC[Y:0], and the upper bits M_ACC[Y:(Y−8)] from the binary decimal point are composed of a 9-bit binary stream of "110011011" will be provided for an example. When such accumulative mantissa data M_ACC[Y:0] is transmitted, the shift determining circuit 6441C may discriminate whether "1" exists in the upper 8 bits or higher from the binary decimal point. In this example, the "Y+1"$^{th}$ bit M_ACC[Y], which is the MSB, and the "Y"$^{th}$ bit M_ACC[Y−1] exist in the upper 8 bits or higher from the binary decimal point. Because both the "Y+1"$^{th}$ bit M_ACC[Y] and the "Y"$^{th}$ bit M_ACC[Y−1] are "1", the shift discriminating circuit 6441C may output the first selection signal SS1 and the second selection signal SS2 of logic high level "H".

As illustrated in FIG. 116, a case in which the binary point is located between the "Y−2"$^{th}$ bit M_ACC[Y−3] and the "Y−3"$^{th}$ bit M_ACC[Y−4] in the accumulative mantissa data M_ACC[Y:0] and the bits M_ACC[Y:(Y−3)] upper the binary decimal point are composed of a 4-bit binary stream of "1011" will be exemplified. When such accumulative mantissa data M_ACC[Y:0] is transmitted, the shift discriminating circuit 6441C may determine whether "1" exists in the upper 8 bits or higher from the binary decimal point. In this example, because the "Y+1"$^{th}$ bit M_ACC[Y], which is the MSB, is located in the fourth bit upper the binary decimal point, there is no bit having a value of "1" in the upper 8 bits or higher from the binary point. In this case, the shift discriminating circuit 6441C may output the first selection signal SS1 and the second selection signal SS2 of logic "low" level "L".

Referring again to FIG. 114, the demultiplexer 6442C may include an input terminal IN, a selection terminal S, a first output terminal OUT1, and a second output terminal OUT2. The demultiplexer 6442C may receive the accumulative mantissa data M_ACC[Y:0] through the input terminal IN. The demultiplexer 6442C may receive the first selection signal SS1 transmitted from the shift discriminating circuit 6441C through the selection terminal S. When a signal of a logic "low" level "L" is input as the first selection signal SS1, the demultiplexer 6442C may output the accumulative mantissa data M_ACC[Y:0] through the first output terminal OUT1. The accumulative mantissa data M_ACC[Y:0] output through the first output terminal OUT1 of the demultiplexer 6442C may be output as the first normalized accumulative mantissa data M_ACCN[Z:0] from the first normalizer 6440C. In this case, the number of bits "Z+1" of the first normalized accumulative mantissa data M_ACCN[Z:0] may be the same as the number of bits "Y+1" of the accumulative mantissa data M_ACC[Y:0]. When a signal of a logic "high" level "H" is input as the first selection signal SS1, the demultiplexer 6442C may transmit the accumulative mantissa data M_ACC[Y:0] to the shifting circuit 6443C.

When the accumulative mantissa data M_ACC[Y:0] is received from the demultiplexer 6442C, the shifting circuit 6443C may perform a shifting operation on the accumulative mantissa data M_ACC[Y:0] and output a result of the shifting operation as the first normalized accumulative mantissa data M_ACCN[Z:0]. The shifting bits in the shifting circuit 6442C may be determined as a decimal value of a least significant bit of the exponent upper data generated by the bit separation circuit 6150 in FIG. 99 of the MAC operator 6000C. In this example, because the least significant bit of the exponent upper data generated by the bit separation circuit 6150 in FIG. 99 is the fourth bit, the shifting circuit 6442C may be configured as an 8 (=2$^3$)-bit right shifter.

As illustrated in FIG. 117, the shifting circuit 6443C may perform a right 8-bit shifting operation on the accumulative mantissa data M_ACC[Y:0] to generate and output the first normalized accumulative mantissa data M_ACCN[Z:0]. In this example, as described with reference to FIG. 115, in the accumulative mantissa data M_ACC[Y:0], the binary point may be located between the "Y−7"$^{th}$ bit M_ACC[Y−8] and the "Y−8"$^{th}$ bit M_ACC[Y−9] and the upper bits M_ACC[Y:(Y−8)] from the binary point may be composed of a 9-bit binary stream of "110011011". As the right 8-bit shifting operation is performed, the binary point in the first normalized accumulative mantissa data M_ACCN[Z:0] may be located between the "Y+1"$^{th}$ bit M_ACCN[Y] and the "Y"$^{th}$ bit M_ACCN[Y−1]. In addition, seven bits M_ACCM-M_ACC[Z−6] each having a value of "0" may be added to the upper bit positions. The number of bits "Z+1" of the first normalized accumulative mantissa data M_ACCN[Z:0] may be the same as "Y+8" in which "7" is added to the number of bits "Y+1" of the accumulative mantissa data M_ACC[Y:0].

Referring again to FIG. 114, the "+1" adder 6444C may receive the second maximum exponent upper data E_MAX2[7:3] from the exponent processing circuit 6410C of FIG. 111. The "+1" adder 6444C may add "1" to the second maximum exponent upper data E_MAX2[7:3] to output added second maximum exponent upper data EA_MAX2[7:3]. The added second maximum exponent upper data EA_MAX2[7:3] output from the "+1" adder 6444C may be transmitted to a first input terminal IN1 of the multiplexer 6445C. The multiplexer 6445C may have the first input terminal IN1, a second input terminal IN2, a selection terminal S, and an output terminal OUT. The multiplexer 6445C may receive the added second maximum exponent upper data EA_MAX2[7:3] through the first input terminal IN1. The multiplexer 6445C may receive the second maximum exponent upper data E_MAX2[7:3] through the second input terminal IN2. The multiplexer 6445C may receive the second selection signal SS2 transmitted from the shift discriminating circuit 6441C through the selection terminal S. When a signal of a logic "low" level "L" is input as the second selection signal SS2, the multiplexer 6445C may output the second maximum exponent upper data E_MAX2[7:3] input through the second input terminal IN2 through the output terminal OUT. When a signal of a logic "high" level "H" is input as the second selection signal SS2, the multiplexer 6445C may output the added second maximum exponent upper data EA_MAX2[7:3] input through the first input terminal IN1 through the output terminal OUT. The second maximum exponent upper data E_MAX2[7:3] or the added second maximum exponent upper data EA_MAX2[7:3] output from the multiplexer 6445C may be output from the first normalizer 6440C as the normalized accumulative exponent upper data E_ACCN[7:3].

Referring again to FIG. 111, the latch circuit 6450C may latch the normalized accumulative exponent upper data E_ACCN[7:3] and the first normalized accumulative mantissa data M_ACCN[Z:0] transmitted from the first normalizer 6440C. The normalized accumulative exponent upper data E_ACCN[7:3] and the first normalized accumulative mantissa data M_ACCN[Z:0] may constitute the exponent upper data E_MAC64[7:3] and mantissa data M_MAC64[Z:0] of the $64^{th}$ MAC data D_MAC64. The latch operation of the latch circuit 6450C may be performed in response to a logic "high" level of the dock latch signal CK_L. The exponent upper data E_MAC64[7:3] and mantissa data M_MAC64[Z:0] of the $64^{th}$ MAC data D_MAC64 latched in the latch circuit 6450C may be output from the accumulator 6400C. In addition, the exponent upper data E_MAC64[7:3] and mantissa data M_MAC64[Z:0] of the $64^{th}$ MAC data D_MAC64 latched in the latch circuit 6450C may be fed back to the exponent processing circuit 6410C and mantissa shifting circuit 6420C of the accumulator 6400C, respectively. In this example, because the $64^{th}$ MAC operation is the last operation, the exponent upper data E_MAC64[7:3] and mantissa data M_MAC64[Z:0] of the $64^{th}$ MAC data D_MAC64 might not be used as the latch data.

Figure 118:
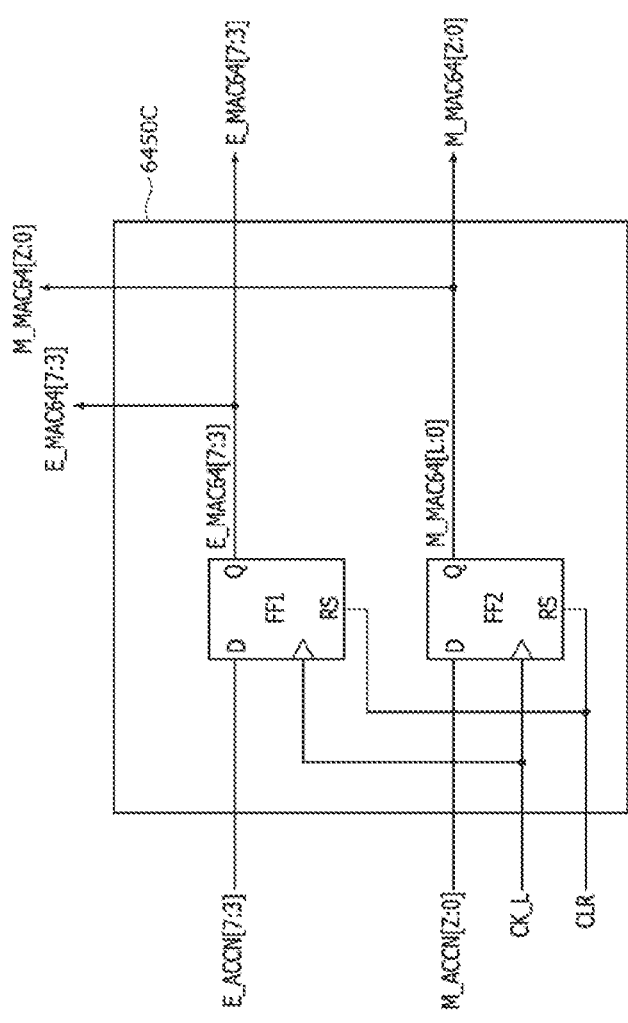
FIG. 118 illustrates an example of a configuration of a latch circuit of the accumulator of FIG. 111.

FIG. 118 illustrates an example of a configuration of the latch circuit 6450C of the accumulator 6400C of FIG. 111. Referring to FIG. 118, the latch circuit 6450C may include a first flip-flop FF1 and a second flip-flop FF2. The first flip-flop FF1 may receive the normalized accumulative exponent upper data E_ACCN[7:3] from the first normalizer 6440C through an input terminal D. The second flip-flop FF2 may receive the first normalized accumulative mantissa data M_ACCN[Z:0] from the first normalizer 6440C through an input terminal D. A clock terminal of the first flip-flop FF1 and a clock terminal of the second flip-flop FF2 may be interconnected. A reset terminal RS of the first flip-flop FF1 and a reset terminal RST of the second flip-flop FF2 may also be interconnected. Accordingly, the first flip-flop FF1 and the second flip-flop FF2 may commonly receive the dock latch signal CK_L through the dock terminals and may commonly receive the clear signal CLR through the reset terminals RS. Accordingly, the first flip-flop FF1 and the second flip-flop FF2 may perform latch operations and output operations together in response to the dock latch signal CK_L. In addition, the first flip-flop FF1 and the second flip-flop FF2 may be reset together in response to the clear signal CLR.

The first flip-flop FF1 may latch the normalized accumulative exponent upper data E_ACCN[7:3] as the exponent upper data E_MAC64[7:3] of the $64^{th}$ MAC data D_MAC64 in response to the latch clock signal CK_L of a logic "high" level input through the clock terminal. The exponent upper data E_MAC64[7:3] of the $64^{th}$ MAC data D_MAC64 latched by the first flip-flop FF1 may be fed back to the exponent processing circuit 6410C of FIG. 111 through an output terminal Q. In addition, the exponent upper data E_MAC64[7:3] of the $64^{th}$ MAC data D_MAC64 latched by the first flip-flop FF1 may be transmitted to the output circuit 6500C of FIG. 99 through the output terminal Q. The second flip-flop FF2 may latch the first normalized accumulative mantissa data M_ACCN[Z:0] as the mantissa data M_MAC64[Z:0] of the $64^{th}$ MAC data D_MAC64 in response to the latch clock signal CK_L of a logic "high" level input through the clock terminal. The mantissa data M_MAC64[Z:0] of the $64^{th}$ MAC data D_MAC64 latched by the second flip-flop FF2 may be fed back to the mantissa shifting circuit 6420C of FIG. 111 of the accumulator 6400C of FIG. 111 through the output terminal Q. In addition, the mantissa data M_MAC64[Z:0] of the $64^{th}$ MAC data D_MAC64 latched by the second flip-flop FF2 may be transmitted to the output circuit 6500C of FIG. 99 through the output terminal Q.

Referring again to FIG. 99, the output circuit 6500C may receive the exponent upper data E_MAC64[7:3] and the mantissa data M_MAC64[Z:0] of the $64^{th}$ MAC data D_MAC64 from the accumulator 6400C. The output circuit 6500C may perform a shifting operation on the mantissa data M_MAC64[Z:0] according to the position where the MSB "1" exists and perform bit number adjustment processing such as rounding on a result of the shifting operation to generate 7-bit mantissa data M_MAC64[6:0] of the $64^{th}$ MAC data D_MAC64. In addition, the output circuit 6500C may extract exponent lower data E_MAC64[2:0] and sign data S_MAC64[0] using the mantissa data M_MAC64[Z:0]. The output circuit 6500C may join the exponent upper data E_MAC64[7:3] and the exponent lower data E_MAC64[2:0] to generate 8-bit exponent data E_MAC64[7:0] of the $64^{th}$ MAC data D_MAC64. In addition, the output circuit 6500C may join the 1-bit sign data S_MAC64[0], the 8-bit exponent data E_MAC64[7:0], and the 7-bit mantissa data M_MAC64[6:0] to generate final 16-bit MAC result data MAC_RST[15:0].

Figure 119:
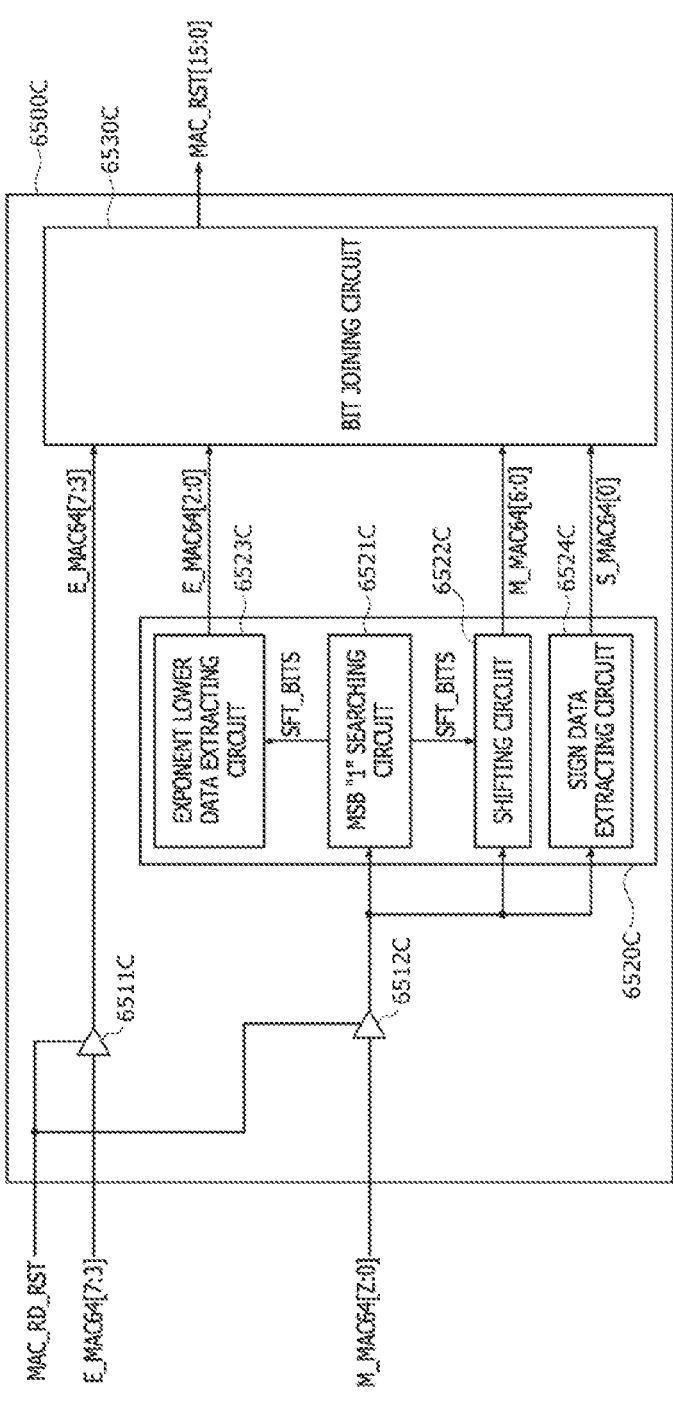
FIG. 119 illustrates an example of a configuration of an output circuit of the MAC operator of FIG. 99.

FIG. 119 illustrates an example of a configuration of the output circuit 6500C of the MAC operator 6000C of FIG. 99. Referring to FIG. 119, the output circuit 6500C may include a first buffer 6511C, a second buffer 6512C, a second normalizer 6520C, and a bit joining circuit 6530C.

The first buffer 6511C may receive the exponent upper data E_MAC64[7:3] of the $64^{th}$ MAC data D_MAC64 from the latch circuit 6450C of FIG. 111 of the accumulator 6400C of FIG. 111 through an input terminal. When a MAC result read signal MAC_RD_RST of a logic "high" level is input, the first buffer 6511C may output the exponent upper data E_MAC64[7:3] of the $64^{th}$ MAC data D_MAC64 through an output terminal. The exponent upper data E_MAC64[7:3] of the $64^{th}$ MAC data D_MAC64 output from the first buffer 6511C may be transmitted to the bit joining circuit 6530C. When a MAC result read signal MAC_RD_RST of a logic "low" level is input, the first buffer 6511C might not output the exponent upper data E_MAC64[7:3] of the $64^{th}$ MAC data D_MAC64.

The second buffer 6512C may receive the mantissa data M_MAC64[Z:0] of the $64^{th}$ MAC data D_MAC64 from the latch circuit 6450C of FIG. 111 of the accumulator 6400C of FIG. 111 through an input terminal. When a MAC result read signal MAC_RD_RST of a logic "high" level is input, the second buffer 6512C may output the mantissa data M_MAC64[Z:0] of the 64$^{th}$ MAC data D_MAC64 through an output terminal. The mantissa data M_MAC64[Z:0] of the 64$^{th}$ MAC data D_MAC64 output from the second buffer 6512C may be transmitted to the second normalizer 6520C. When a MAC result read signal MAC_RD_RST of a logic "low" level is input, the second buffer 6512C might not output the mantissa data M_MAC64[Z:0] of the 64$^{th}$ MAC data D_MAC64.

As described above with reference to FIG. 80, as the 64$^{th}$ MAC operation is completed, the output circuit 6500C may output the MAC result data MAC_RST[15:0]. That is, the MAC result read data MAC_RD_RST of a logic "high" level may be provided to the first buffer 6511C and the second buffer 65120. Accordingly, the bit joining circuit 6530C may receive the exponent upper data E_MAC64[7:3] of the 64$^{th}$ MAC data D_MAC64 output from the first buffer 65110. In addition, the second normalizer 6520C may receive the mantissa data M_MAC64[Z:0] of the 64$^{th}$ MAC data D_MAC64 output from the second buffer 6512C.

The second normalizer 6520C may include an MSB "1" searching circuit 6521C, a shifting circuit 6522C, an exponent lower data extracting circuit 6523C, and a sign data extracting circuit 65240. Although not illustrated in FIG. 119, the second normalizer 6520C may include the round processing circuit 5243 of FIGS. 74 and 75 described with reference to FIGS. 74 and 75 and the bit truncator 5232 of FIG. 75, 5244 of FIG. 76 described with reference FIGS. 75 and 76.

The MSB searching circuit 6521C may receive the mantissa data M_MAC64[Z:0] of the 64$^{th}$ MAC data D_MAC64 output from the second buffer 6512C. The MSB "1" searching circuit 65210 may search a position of the MSB "1" in the mantissa data M_MAC64[Z:0]. The MSB "1" searching circuit 6521C may output shift bits SFT_BITS, based on the search result. The shift bits SFT_BITS output from the MSB "1" searching circuit 6521C may be transmitted to the shifting circuit 6520C and the exponent lower data extracting circuit 6523C.

Figure 120:
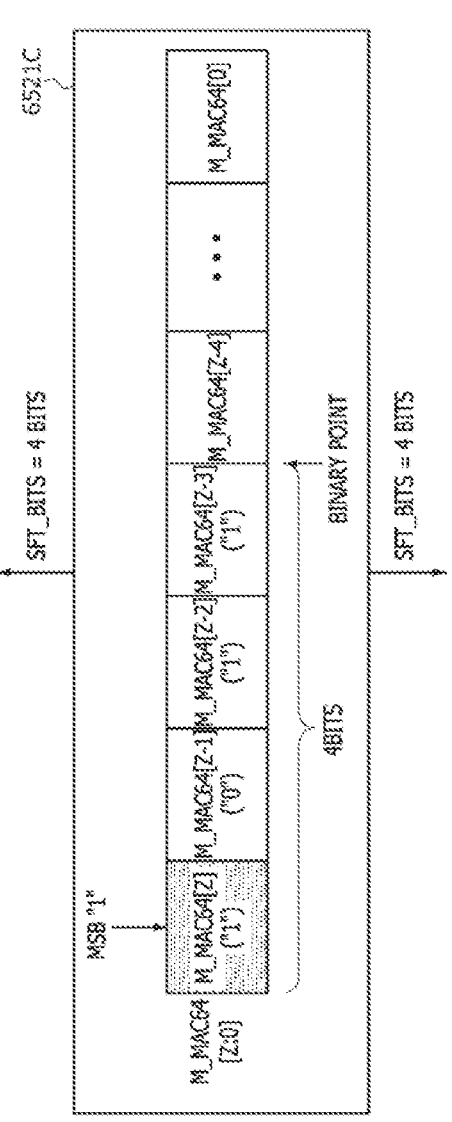
FIG. 120 illustrates a process of determining a shift bit in an MSB "1" searching circuit of FIG. 119.

FIG. 120 illustrates a process of determining the shift bits SFT_BITS in the MSB "1" searching circuit 6521C of FIG. 119. In this example, it may be presupposed that the mantissa data M_MAC64[Z:0] of the 64$^{th}$ MAC data D_MAC64 input to the MSB "1" searching circuit 6521C is configured as "1011.M_MAC64[(Z−4):0]". Referring to FIG. 120, the MSB "1" searching circuit 6521C may discriminate how many upper bits the MSB "1" is positioned from the binary decimal point in the mantissa data M_MAC64[Z:0] of the 64$^{th}$ MAC data D_MAC64. In this example, the MSB "1" may be positioned in the upper 4 bits from the binary decimal point. The MSB "1" searching circuit 6521C may output the 4 bits in which the MSB "1" is positioned as the shift bits SFT_BITS.

Referring to FIG. 119 again, the shifting circuit 6522C may receive the mantissa data M_MAC64[Z:0] of the 64$^{th}$ MAC data D_MAC64 output from the second buffer 6512C. In addition, the shifting circuit 6522C may receive the shift bits SFT_BITS from the MSB "1" searching circuit 6521C. The shifting circuit 6522C may perform a right shifting operation for the mantissa data M_MAC64[Z:0] by a value of the shift bits SFT_BITS. As a result of the shifting operation, the mantissa data M_MAC64[Z:0] may have a format of "0.M_MAC64[Z:0]". The shifting circuit 6522C may perform bit truncating to delete "0," and remove lower bits from the mantissa data M_MAC64[Z:0] to generate and output the mantissa data of the standard format, that is, 7-bit mantissa data M_MAC64[6:0]. The 7-bit mantissa data M_MAC64[6:0] output from the shifting circuit 6522C may be transmitted to the bit joining circuit 6530C.

The sign data extracting circuit 6524C may receive the mantissa data M_MAC64[Z:0] of the 64$^{th}$ MAC data D_MAC64 output from the second buffer 6512C. The sign data extracting circuit 6524C may extract sign data S_MAC64[0] from the mantissa data M_MAC64[Z:0] to transmit the extracted sign data S_MAC64[0] to the bit joining circuit 6530C. In an example, the sign data extracting circuit 6524C may extract the most significant bit MSB as the sign bit from the mantissa data M_MAC64[Z:0] transmitted from the second buffer 6512C. For example, when the most significant bit MSB of the mantissa data M_MAC64[Z:0] is "1", the sign data extracting circuit 6524C may output "1" (representing a negative number) as the sign data S_MAC64[0]. When the most significant bit MSB of the mantissa data M_MAC64[Z:0] is "0", the sign data extracting circuit 6524C may output "0" (representing a positive number) as the sign data S_MAC64[0].

The exponent lower data extracting circuit 6523C may receive the shift bits SFT_BITS from the MSB "1" searching circuit 6521C. The exponent lower data extracting circuit 6523C may output a binary stream corresponding to a value of the shift bits SFT_BITS as the exponent lower data E_MAC64[2:0]. For example, as described above with reference to FIG. 120, when "4" is transmitted as the shift bits SFT_BITS, the exponent lower data extracting circuit 6523C may output a binary stream corresponding to "4", that is, "100" as the exponent lower data E_MAC64[2:0]. The exponent lower data E_MAC64[2:0] output from the exponent lower data extracting circuit 6523C may be transmitted to the bit joining circuit 6530C.

The bit joining circuit 6530C may join the exponent upper data E_MAC64[7:3] transmitted from the first buffer 6511C and the exponent lower data E_MAC64[2:0] transmitted from the exponent lower data extracting circuit 6523C to generate the exponent data E_MAC64[7:0]. The bit joining circuit 6530C may join the sign data S_MAC64[0] transmitted from the sign data extracting circuit 6524C, the exponent data E_MAC64[7:0], and the mantissa data M_MAC64[6:0] transmitted from the shifting circuit 6522C to generate and output the MAC result data MAC_RST[15:0] of the BF16 format.

Figure 121:
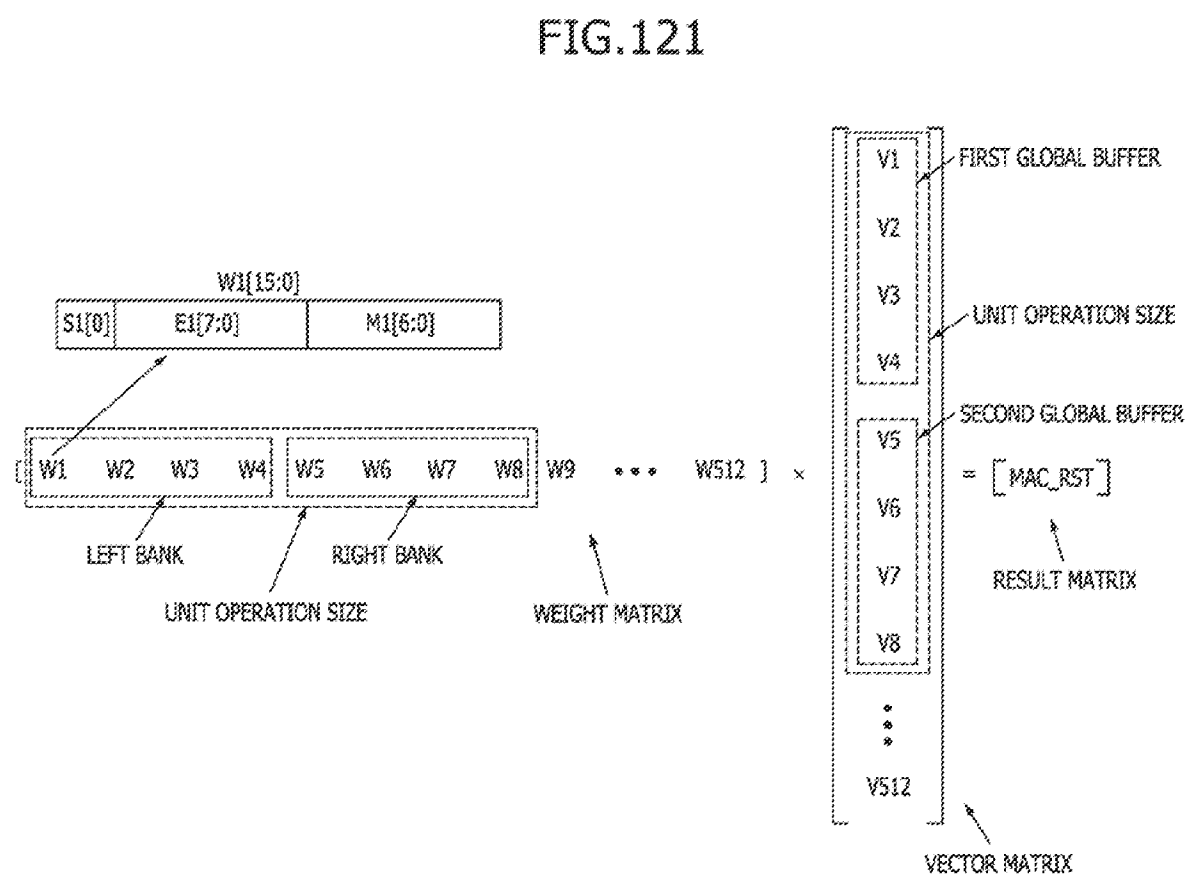

FIG. 121 illustrates an example of a matrix multiplication operation performed by a MAC operation of a MAC operator separated into a left MAC operator and a right MAC operator according to yet another embodiment of the present disclosure and a floating-point format of weight data. Referring to FIG. 121, the MAC operation according to the present embodiment may also be performed as a process of generating a result matrix by performing matrix multiplication on a weight matrix and a vector matrix, as described above with reference to FIG. 79. In this embodiment, it may be presupposed that the weight matrix has a plurality of, for example, 512 pieces of weight data W1-W512 as elements, and the vector matrix has a plurality of, for example, 512 pieces of vector data V1-V512 as elements. In this case, the result matrix generated as a result of the matrix multiplication may have the MAC result data MAC_RST as an element. The weight data W"K" of a "K"$^{th}$ column of the weight matrix ("K" is 1, 2, 512) may be multiplied by the vector data V"K" of a "K"$^{th}$ row of the vector matrix, and accordingly, 512 pieces of multiplication data W"K"×V"K"

may be generated. When all 512 pieces of multiplication data are added, the MAC result data MAC_RST may be generated.

Each of the weight data W1-W512 and each of the vector data V1-V512 may be configured in a floating-point format. Hereinafter, it is presupposed that each of the weight data W1-W512 and each of the vector data V1-V512 have a 16-bit brain floating-point (BF16) format. Accordingly, for example, the weight data (first weight data) W1 of a first row and a first column of the weight matrix may be composed of 1-bit first sign data S1[0], 8-bit first exponent data E1[7:0], and 7-bit first mantissa data M1[6:0]. Although not illustrated in FIG. 121, each of the remaining second to 512$^{th}$ weight data W2-W512 may be equally composed of 1-bit sign data, 8-bit exponent data, and 7-bit mantissa data. In addition, each of the first to 512$^{th}$ vector data V1-V512 may be equally composed of 1-bit sign data, 8-bit exponent data, and 7-bit mantissa data.

The MAC operation according to this embodiment may include a left MAC operation and a right MAC operation. To this end, the memory bank may include a left memory bank and a right memory bank, and the global buffer may include a first global buffer and a second global buffer. The weight data W1-W512 may be divided and stored in the left memory bank and the right memory bank. The vector data V1-V512 may be divided and stored in the first global buffer and the second global buffer. Specifically, when a unit operation size of the MAC operator is 128 bits, that is, 8 pieces of weight data, the weight data W1-W4 of the first to fourth columns of the weight matrix may be stored in the left memory bank, and the weight data W5-W8 of the fifth to eighth columns of the weight matrix may be stored in the right memory bank. Although not illustrated in FIG. 121, the weight data of the ninth to twelfth columns of the weight matrix and the weight data of the thirteenth to sixteenth columns of the weight matrix may be stored in the left memory bank and the right memory bank, respectively, in the same manner. Similarly, the vector data V1-V4 of the first to fourth rows of the vector matrix may be stored in the first global buffer, and the vector data V5-V8 of the fifth to eighth rows of the vector matrix may be stored in the second global buffer. Although not illustrated in FIG. 121, the vector data in the ninth to twelfth rows of the vector matrix and the vector data in the thirteenth to sixteenth rows of the vector matrix may be stored in the first global buffer and the second global buffer, respectively, in the same manner.

Even in this example, when the number of pieces of the weight data W1-W512 to be subjected to matrix multiplication exceeds the unit operation size of the MAC operator, the MAC result data MAC_RST might not be generated by one MAC operation. When the unit operation size of the MAC operator is 128 bits, because each of the weight data W1-W512 is configured in the 16-bit floating-point format, one MAC operation may be performed on 8 pieces of weight data. The 8 pieces of weight data may be divided into 4 pieces of weight data and 4 pieces of weight data, and used for left MAC operation and right MAC operation, respectively. The MAC data may be generated by performing addition and accumulation operations on the result data generated by the left MAC operation and the right MAC operation. The final MAC result data MAC_RST may be generated by repeating the MAC data generation process 64 times. Except that the MAC operation according to this embodiment is performed as a process of a left MAC operation, a right MAC operation, a total addition and accumulation, the MAC operation according to this embodiment may be performed in the same manner as the process described with reference to FIG. 80.

Figure 122:
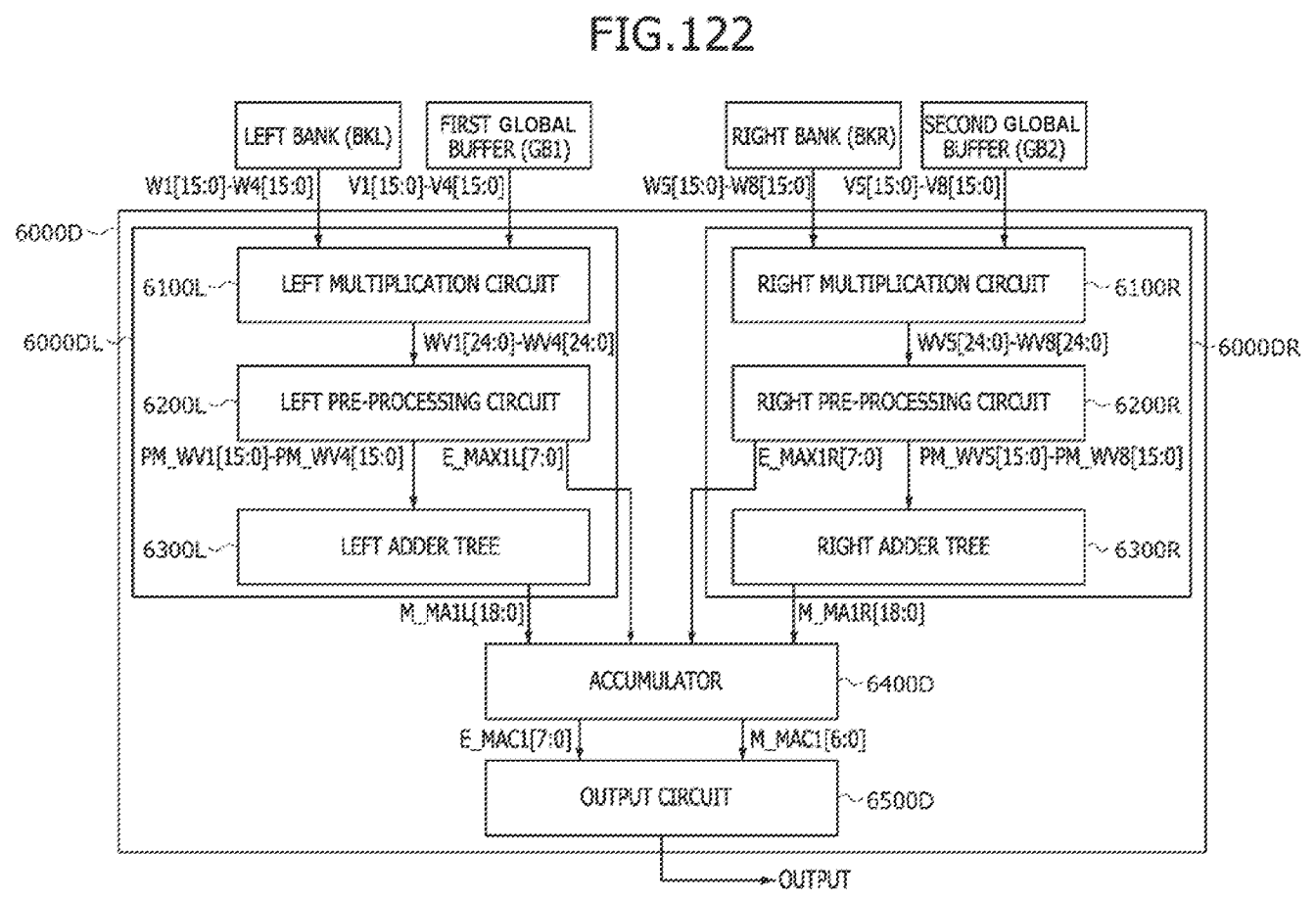

FIG. 122 illustrates an example of a configuration of a MAC operator 6000D for performing matrix multiplication of FIG. 121. Referring to FIG. 122, the MAC operator 6000D according to this example may include a left multiplication addition circuit 6000DL, a right multiplication addition circuit 6000DR, an accumulator 6400D, and an output circuit 6500D.

The left multiplication addition circuit 6000DL may receive left weight data of a weight matrix, for example, weight data W1[15:0]-W4[15:0] of first column to fourth column and left vector data of a vector matrix, for example, vector data V1[15:0]-V4[15:0] of first row to fourth row from a left memory bank BLK and a first global buffer GB1, respectively. The left multiplication addition circuit 6000DL may perform a multiplication operation, a pre-processing operation, and an addition operation or the weight data W1[15:0]-W4[15:0] of the first column to fourth column and the vector data V1[15:0]-V4[15:0] of the first row to fourth row to generate and output first left maximum exponent data E_MAX1L[7:0] and mantissa data M_MA1L[18:0] of first left multiplication addition data. The first left maximum exponent data E_MAX1L[7:0] and the mantissa data M_MA1L[18:0] of the first left multiplication addition data output from the left multiplication addition circuit 6000DL may be transmitted to the accumulator 6400D.

The left multiplication addition circuit 6000DL may include a left multiplication circuit 6100L, a left pre-processing circuit 6200L, and a left adder tree 6300L. The left multiplication circuit 6100L may perform a multiplication operation on the weight data W1[15:0]-W4[15:0] of the first column to fourth column of the weight matrix and the vector data V1[15:0]-V4[15:0] of the first row to fourth row of the vector matrix to generate and output first to fourth multiplication data WV1[24:0]-WV4[24:0]. The left pre-processing circuit 6200L may perform pre-processing for the first to fourth multiplication data WV1[24:0]-WV4[24:0] received from the left multiplication circuit 6100L to generate and output first left maximum exponent data E_MAX1L[7:0] and first to fourth pre-processed mantissa data PM_WV1[15:0]-PM_WV4[15:0]. The left adder tree 6300L may perform an addition operation on the first to fourth pre-processed mantissa data PM_WV1[15:0]-PM_WV4[15:0] transmitted from the left pre-processing circuit 6200L to generate and output mantissa data M_MA1L[18:0] of the first left multiplication addition data. A configuration of the left multiplication circuit 6100L may be the same as that of the multiplication circuit 6100 described above with reference to FIG. 82, except that the number of multipliers is reduced to four. The left pre-processing circuit 6200L may be configured substantially the same as the pre-processing circuit 6200A described above with reference to FIG. 83. In an example, the left adder tree 6300L may have the same configuration as the adder tree 6300 described above with reference to FIG. 88, except that the number of adders is different. In another example, the left adder tree 6300L may include a plurality of pre-adders, each having three inputs and two outputs. In this case, the adder of a lowermost stage of the left adder tree 6300L may be configured with a carry-ripple adder. When a carry-ripple adder is used, it may be possible to reduce the latency of the addition operation by using a carry look ahead.

The right multiplication addition circuit 6000DR may receive the weight data W5[15:0]-W8[1.5:0] of the fifth column to eighth column of the weight matrix and the vector data V5[15:0]-V8[15:0] of the fifth row to eighth row of the vector matrix from the right memory bank BIER and the second global buffer GB2, respectively. The right multiplication addition circuit 6000DR may perform a multiplication operation, a pre-processing operation, and an addition operation on the weight data W5[15:0]-W8[15:0] of the fifth column to eighth column and the vector data V5[15:0]-V8[15:0] of the fifth row to eighth row to generate and output first right maximum exponent data E_MAX1R[7:0] and mantissa data M_MA1R[18:0] of first right multiplication addition data. The first right maximum exponent data E_MAX1R[7:0] and the mantissa data M_MA1R[18:0] of the first right multiplication addition data output from the right multiplication addition circuit 6000DR may be transmitted to the accumulator 6400D.

The right multiplication addition circuit 6000DR may include a right multiplication circuit 6100R, a right pre-processing circuit 6200R, and a right adder tree 6300R. The right multiplication circuit 6100R may perform a multiplication operation on the weight data W5[15:0]-W8[15:0] of the fifth column to eighth column of the weight matrix and the vector data V5[15:0]-V8[15:0] of the fifth row to eighth row to generate and output fifth to eighth multiplication data WV5[24:0]-WV8[24:0]. The right pre-processing circuit 6200R may perform pre-processing for the fifth to eighth multiplication data WV5[24:0]-WV8[24:0] transmitted from the right multiplication circuit 6100R to generate and output first right maximum exponent data E_MAX1R[7:0] and fifth to eighth pre-processed mantissa data PM_WV5[15:0]-PM_WV8[15:0]. The right adder tree 6300R may perform an addition operation on the fifth to eighth pre-processed mantissa data PM_WV5[15:0]-PM_WV8[15:0] transmitted from the right pre-processing circuit 6200R to generate and output mantissa data M_MA1R[18:0] of the first right multiplication addition data. A configuration of the right multiplication circuit 6100R may be the same as that of the multiplication circuit 6100 described above with reference to FIG. 83 except that the number of multipliers is reduced to four. The right pre-processing circuit 6200R may be configured substantially the same as the pre-processing circuit 6200A described above with reference to FIG. 83. In an example, the right adder tree 6300R may have the same configuration as the adder tree 6300 described above with reference to FIG. 88 except that the number of adders is different. In another example, the right adder tree 6300R may be composed of a plurality of pre-adders, each having three inputs and two outputs. In this case, the adder of a lowermost stage of the right adder tree 6300R may be configured with a carry-ripple adder. When a carry-ripple adder is used, it is possible to reduce the latency of an addition operation by using a carry look ahead.

The accumulator 6400D may receive the first left maximum exponent data E_MAX1l[7:0] and the mantissa data M_MA1L[18:0] of the left multiplication addition data from the left pre-processing circuit 6200L and the left adder tree 6300L of the left multiplication addition circuit 6000DL, respectively. In addition, the accumulator 6400D may receive the first right maximum exponent data E_MAX1R[7:0] and the mantissa data M_MA1R[18:0] of the right multiplication addition data from the right pre-processing circuit 6200R and the right adder tree 6300R of the right multiplication addition circuit 6100DR, respectively. The accumulator 6400D may generate and output first exponent data E_MAC1[7:0] and first mantissa data M_MAC1[6:0] of the first MAC data D_MAC1. The configuration and operation of the accumulator 6400D will be described below.

The output circuit 6500D may receive the first exponent data E_MAC1[7:0] and first mantissa data M_MAC1[6:0] of the first MAC data D_MAC1 from the accumulator 6400D. When the exponent data and mantissa data of the last MAC data, that is, the $64^{th}$ MAC data D_MAC64 are received, the output circuit 6500D may extract sign data from the mantissa data, join the sign data, exponent data, and mantissa data, and output the resultant data as the MAC result data MAC_RST. When one of the first to $63^{rd}$ MAC data D_MAC1-D_MAC63 is received as in this example, the output circuit 6500D might not output the MAC result data MAC_RST. The output circuit 6500D may have the same configuration as the output circuit 6500A described above with reference to FIG. 93.

Figure 123:
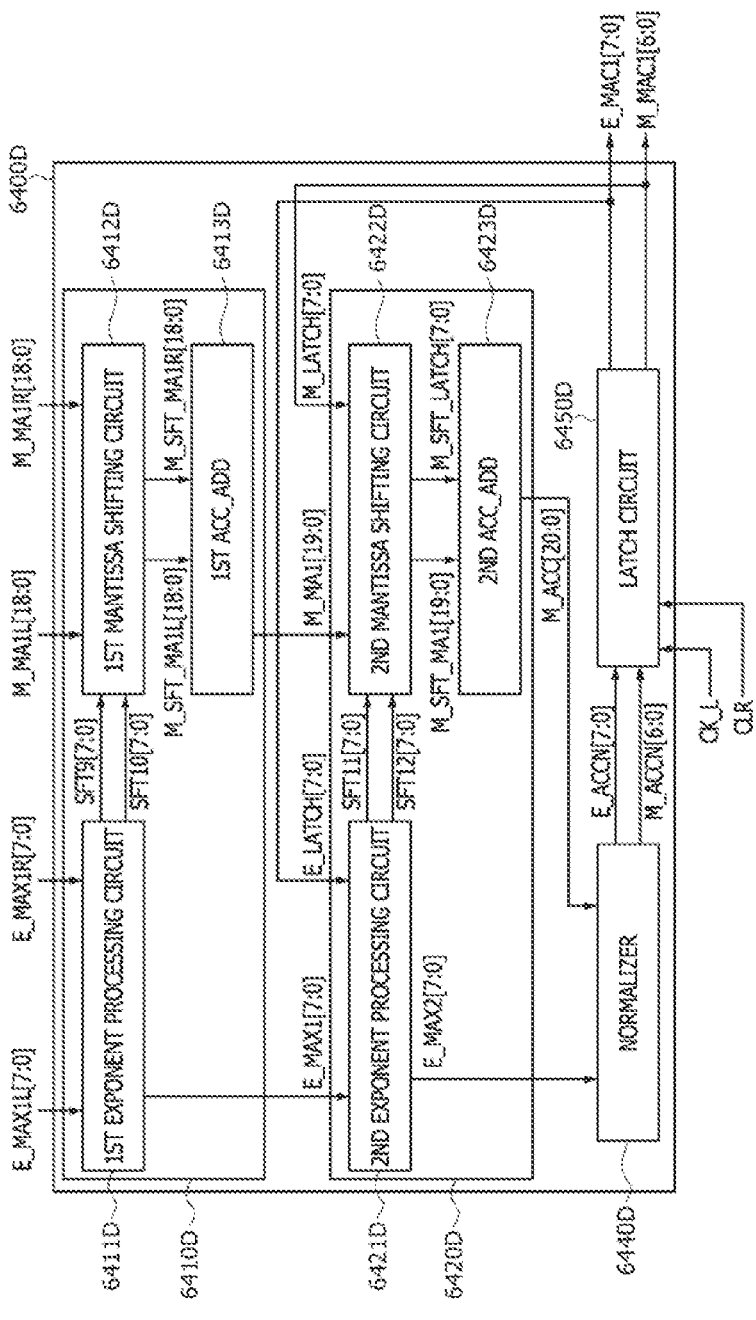
FIG. 123 illustrates an example of a configuration of an accumulator of the MAC operator of FIG. 122.

FIG. 123 illustrates an example of a configuration of the accumulator 6400D of the MAC operator 6000D of FIG. 122. Referring to FIG. 123, the accumulator 6400D may include a first accumulative addition circuit 6410D, a second accumulative addition circuit 6420D, a normalizer 6440D, and a latch circuit 6450D. The first accumulative addition circuit 6410D may include a first exponent processing circuit 6411D, a first mantissa shifting circuit 6412D, and a first accumulative adder 6413D. The second accumulative addition circuit 6420D may include a second exponent processing circuit 6421D, a second mantissa shifting circuit 6422D, and a second accumulative adder 6423D.

The first exponent processing circuit 6411D of the first accumulative addition circuit 6410D may receive the first left maximum exponent data E_MAX1l[7:0] and the first right maximum exponent data E_MAX1R[7:0] from the left pre-processing circuit 6200L and the right pre-processing circuit 6200R, respectively. The first exponent processing circuit 6411D may detect the exponent data having a greater value between the first left maximum exponent data E_MAX1l[7:0] and the first right maximum exponent data E_MAX1R[7:0] and output the detected exponent data as the first maximum exponent data E_MAX1[7:0]. The first exponent processing circuit 6411D may perform a subtraction operation on the first maximum exponent data E_MAX1[7:0] and the first left maximum exponent data E_MAX1l[7:0] to output the resultant data as left shift data, for example, the ninth shift data SFT9[7:0]. The first exponent processing circuit 6411D may perform a subtraction operation on the first maximum exponent data E_MAX1[7:0] and the first right maximum exponent data E_MAX1R[7:0] to output the resultant data as right shift data, for example, the tenth shift data SFT10[7:0]. The first exponent processing circuit 6411D may have substantially the same configuration as the exponent processing circuit 6410 described with reference to FIG. 90.

The first mantissa shifting circuit 6412D of the first accumulative addition circuit 6410D may receive the ninth shift data SFT9[7:0] and the tenth shift data SFT10[7:0] from the first exponent processing circuit 6411D. In addition, the first mantissa shifting circuit 6412D may receive the mantissa data M_MA1L[18:0] of the first left multiplication addition data and the mantissa data M_MA1R[18:0] of the first right multiplication addition data from the left adder tree 6300L of FIG. 122 and the right adder tree 6300R of FIG. 122, respectively. The first mantissa shifting circuit 6412D may shift the mantissa data M_MA1L[18:0] of the first left multiplication addition data by the number of bits corresponding to a value of the ninth shift data SFT9[7:0] to generate and output shifted mantissa data M_SFT_MA1L[18:0] of the first left multiplication addition data. In addition, the first mantissa shifting circuit 6412D may shift the mantissa data M_MA1R[18:0] of the first right multiplication addition data by the number of bits corresponding to a value of the tenth shift data SFT10[7:0] to generate and output shifted mantissa data M_SFT_MA1R[18:0] of the first right multiplication addition data. The first mantissa shifting circuit 6412D may have the same configuration as the mantissa shifting circuit 6420 described above with reference to FIG. 91.

The first accumulative adder 6413D of the first accumulative addition circuit 6410D may perform an addition operation on the shifted mantissa data M_SFT_MA1L[18:0] of the first left multiplication addition data and the shifted mantissa data M_SFT_MA1R[18:0] of the first right multiplication addition data transmitted from the first mantissa shifting circuit 6412D to generate and output the mantissa data M_MA1[19:0] of the first multiplication addition data D_MA1. In an example, one carry bit may be added during the accumulative addition operation in the first accumulative adder 6413D, and accordingly, the mantissa data M_MA1[19:0] of the first multiplication addition data D_MA1 may have a size of 20 bits. In an example, the first accumulative adder 6413D may be configured with a carry-ripple adder. In this case, the latency of the addition operation may be reduced by using a carry look ahead.

The second exponent processing circuit 6421D of the second accumulative addition circuit 6420D may receive the first maximum exponent data E_MAX1[7:0] and the exponent data E_LATCH[7:0] of the latch data from the first exponent processing circuit 6411D and the latch circuit 6450D, respectively. The second exponent processing circuit 6421D may detect the exponent data having a greater value between the first maximum exponent data E_MAX1[7:0] and the exponent data E_LATCH[7:0] of the latch data and output the detected exponent data as second maximum exponent data E_MAX2[7:0]. The second exponent processing circuit 6421D may perform a subtraction operation on the second maximum exponent data E_MAX2[7:0] and the first maximum exponent data E_MAX1[7:0] to generate and output eleventh shift data SFT11[7:0]. The second exponent processing circuit 6421D may perform a subtraction operation on the second maximum exponent data E_MAX2[7:0] and the exponent data E_LATCH[7:0] of the latch data to generate and output twelfth shift data SFT12[7:0]. Because the MAC operation according to this example is the first MAC operation, the latch circuit 6450D may be in a reset state. Therefore, the exponent data E_LATCH[7:0] of the latch data may have a value of "0". The second exponent processing circuit 6421D may have the same configuration as the exponent processing circuit 6410 described above with reference to FIG. 90.

The second mantissa shifting circuit 6422D of the second accumulation addition circuit 6420D may receive the eleventh shift data SFT11[7:0] and the twelfth shift data SFT12[7:0] from the second exponent processing circuit 6421D. In addition, the second mantissa shifting circuit 6422D may receive the mantissa data M_MA1[19:0] of the first multiplication addition data D_MA1 and the mantissa data M_LATCH[7:0] of the latch data from the first accumulative adder 6413D and the latch circuit 6450D. The second mantissa shifting circuit 6422D may shift the mantissa data M_MA1[19:0] of the first multiplication addition data D_MA1 by the number of bits corresponding to a value of the eleventh shift data SFT11[7:0] to generate and output shifted mantissa data M_SFT_MA1[19:0] of the first multiplication addition data D_MA1. In addition, the second mantissa shifting circuit 6422D may shift the mantissa data M_LATCH[7:0] of the latch data by the number of bits corresponding to a value of the twelfth shift data SFT12[7:0] to generate and output shifted mantissa data M_SFT-_LATCH[7:0] of the latch data. The second mantissa shifting circuit 6422D may have the same configuration as the mantissa shifting circuit 6420 described above with reference to FIG. 91.

The second accumulative adder 6423D of the second accumulative addition circuit 6420D may perform an addition operation on the shifted mantissa data M_SFT_MA1[19:0] of the first multiplication addition data D_MA1 and the shifted mantissa data M_SFT_LATCH[7:0] of the latch data transmitted from the second mantissa shifting circuit 6422D to generate and output accumulative mantissa data M_ACC[20:0]. In an example, one carry bit may be added during the accumulative addition operation in the second accumulative adder 6423D, and accordingly, the accumulative mantissa data M_ACC[20:0] may have a size of 21 bits. In an example, the second accumulative adder 6423D may be configured with a carry-ripple adder. In this case, the latency of the addition operation may be reduced by using a carry look ahead.

The normalizer 6440D may receive the second maximum exponent data E_MAX2[7:0] and the accumulative mantissa data M_ACC[20:0] from the second exponent processing circuit 6421D and the second accumulative adder 6423D, respectively. In an example, the normalizer 6440D may perform normalization processing of shifting the binary decimal point of the accumulative mantissa data M_ACC [20:0] and adjusting the number of bits such that the accumulative mantissa data has the standard format with an implicit bit, that is, the format of "1.M_ACCN[6:0]". The normalizer 6440D may remove the implicit bit/binary decimal point (1.) from the format of "1.M_ACCN[6:0]" to generate and output 7-bit normalized accumulative mantissa data M_ACCN[6:0] conforming to the BF16 format. In addition, the normalizer 6440D may add a binary value corresponding to the number of bits (decimal number) by which the binary decimal point is shifted in the accumulative mantissa data M_ACC[20:0] to the second maximum exponent data E_MAX2[7:0] to generate and output 8-bit normalized accumulative exponent data E_ACCN[7:0] conforming to the BF16 format. The normalized accumulative exponent data E_ACCN[7:0] and the normalized accumulative mantissa data M_ACCN[6:0] may be transmitted to the latch circuit 6450D.

The latch circuit 6450D may latch the normalized accumulative exponent data E_ACCN[7:0] and the normalized accumulative mantissa data M_ACCN[6:0] transmitted from the normalizer 6440D. In an example, the latch operation of the latch circuit 6450D may be performed in response to a latch dock signal CK_L of a logic "high" level. In addition, the latch circuit 6450D may output the latched normalized accumulative exponent data E_ACCN[7:0] and normalized accumulative mantissa data M_ACCN[6:0] as the exponent data and mantissa data of the latch data, respectively. The exponent data and mantissa data of the latch data output from the latch circuit 6450D may be transmitted to the second exponent processing circuit 6421D and the second mantissa shifting circuit 6422D, respectively, in the next MAC operation, that is, the second MAC operation. In addition, the exponent data and mantissa data of the latch data output from the latch circuit 6450D may be output from the accumulator 6400D as the exponent data E_MAC1[7:0] and mantissa data M_MAC1[6:0] of the first MAC data D_MAC1, respectively. A logic level of the clear signal CLR input to the latch circuit 6450D may be changed from a logic "low" level to a logic "high" level after the MAC operation is completed, that is, after the 64$^{th}$ MAC operation described with reference to FIG. 80 is performed, and the latch circuit 6450D may be reset.

Figure 124:
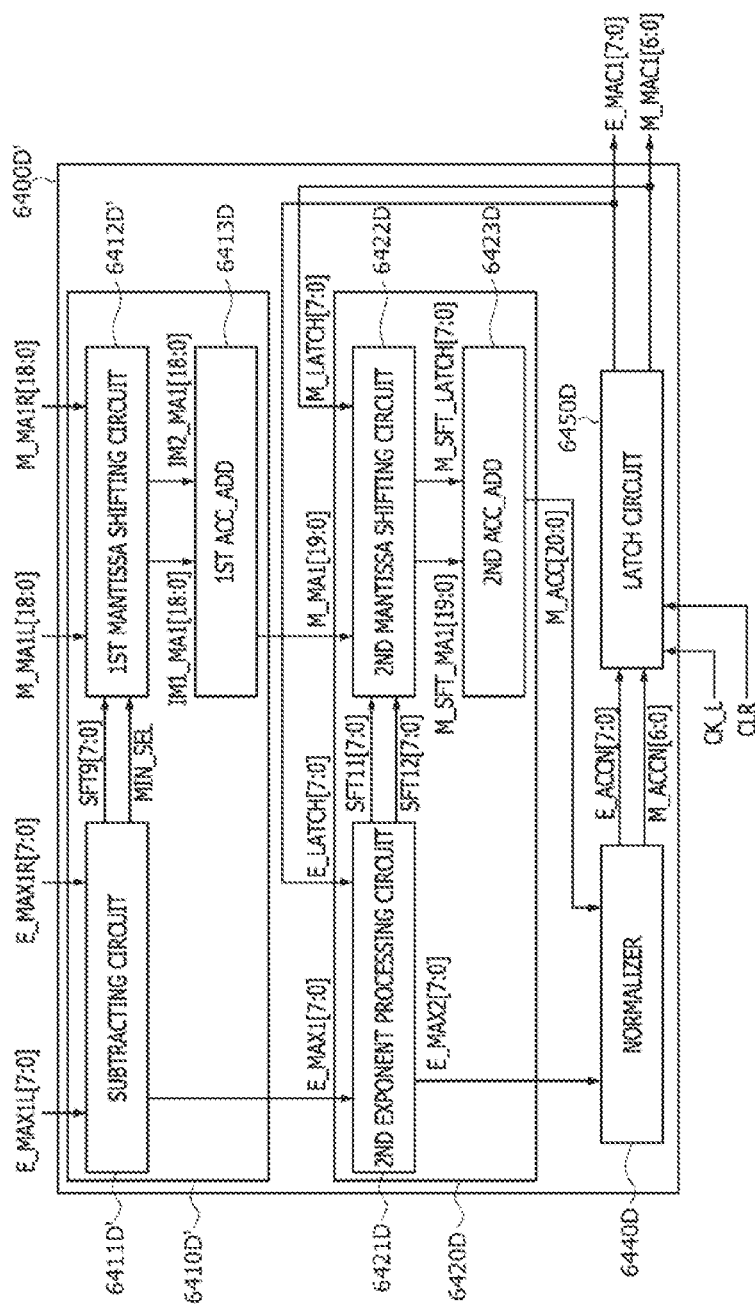
FIG. 124 illustrates another example of a configuration of the accumulator of the MAC operator of FIG. 122.
Figure 125:
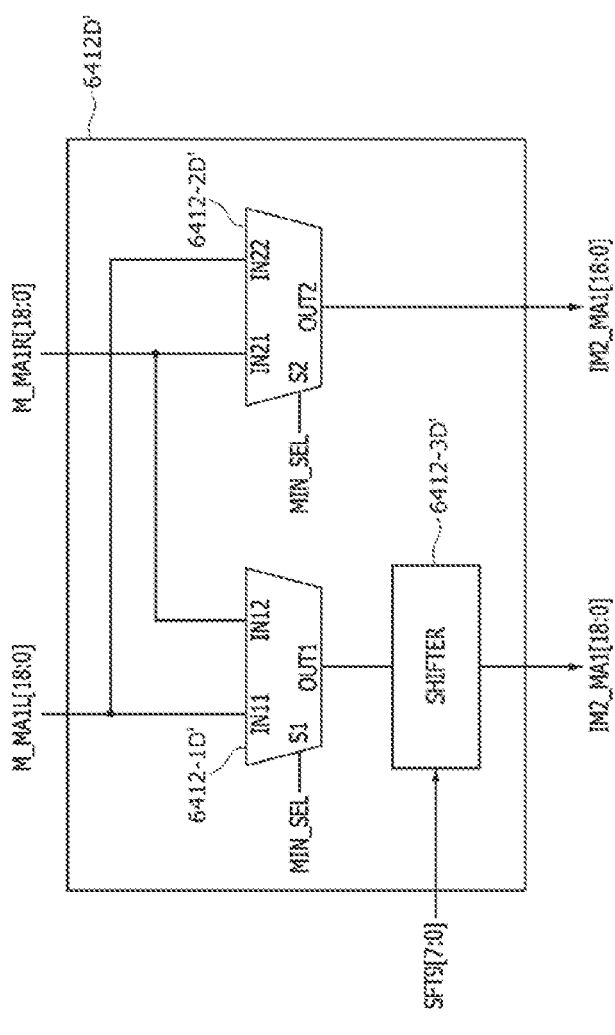
FIG. 125 illustrates an example of a configuration of a first mantissa shifting circuit of the accumulator of FIG. 124.

FIG. 124 illustrates another example of a configuration of the accumulator 6400D' of the MAC operator 6000D of FIG. 122. FIG. 125 illustrates an example of a configuration of the first mantissa shifting circuit 6412D' of the accumulator 6400D' of FIG. 124. Referring to FIG. 124, the accumulator 6400D' may include a first accumulative addition circuit 6410D', a second accumulative addition circuit 6420D', a normalizer 6440D, and a latch circuit 6450D. In the accumulator 6400D' according to this example, the remaining components excluding the first accumulative addition circuit 6410D', that is, the second accumulative addition circuit 6420D, the normalizer 6440D, and the latch circuit 6450D may be the same as those described with reference to FIG. 123, and accordingly, overlapping descriptions will be omitted below.

The first accumulative addition circuit 6410D' of the accumulator 6400D' according to this example may include a subtracting circuit 6411D', a first mantissa shifting circuit 6412D', and a first accumulative adder 6413D. The subtracting circuit 6411D' may receive the first left maximum exponent data E_MAX1L[7:0] and the first right maximum exponent data E_MAX1R[7:0] from the left pre-processing circuit 6200L of FIG. 122 and the right pre-processing circuit 6200R of FIG. 122, respectively. The subtracting circuit 6411D' may detect the exponent data having a greater value between the first left maximum exponent data E_MAXIL[7:0] and the first right maximum exponent data E_MAX1R[7:0] and output the detected exponent data as the first maximum exponent data E_MAX1[7:0]. In addition, the subtracting circuit 6411D' may perform a subtraction operation on the first left maximum exponent data E_MAX1L[7:0] and the first right maximum exponent data E_MAX1R[7:0] to generate and output the ninth shift data SFT9[7:0] and a minimum value selection signal MIN_SEL. The ninth shift data SFT9[7:0] may be composed of a binary stream corresponding to an absolute value of a resultant data obtained by subtracting the first right maximum exponent data E_MAX1R[7:0] from the first left maximum exponent data E_MAX1L[7:0]. When the first left maximum exponent data E_MAX1L[7:0] has a relatively small value, the minimum value selection signal MIN_SEL may be composed of a first logic level signal, for example, a logic "high" signal. On the other hand, when the first right maximum exponent data E_MAX1R[7:0] has a relatively small value, the minimum value selection signal MIN_SEL may be composed of a second logic level signal, for example, a logic "low" signal.

The first mantissa shifting circuit 6412D' may receive the ninth shift data SFT9[7:0] and the minimum value selection signal MIN_SEL from the subtracting circuit 6411D'. In addition, the first mantissa shifting circuit 6412D' may receive the mantissa data M_MA1L[18:0] of the first left multiplication addition data and the mantissa data M_MA1R [18:0] of the first right multiplication addition data from the left adder tree 6300L of FIG. 122 and the right adder tree 6300R of FIG. 122, respectively. The first mantissa shifting circuit 6412D' may generate and output first intermediate mantissa data IM1_MA1[18:0] and second intermediate mantissa data IM2_MA1[18:0].

In an example, as illustrated in FIG. 125, the first mantissa shifting circuit 6412D' may include a first multiplexer 6412-1D', a second multiplexer 6412-2D', and a shifter 6412-3D'. The first multiplexer 6412-1D' may receive the mantissa data M_MA1L[18:0] of the first left multiplication addition data through a first input terminal IN11 and receive the mantissa data M_MA1R[18:0] of the first right multiplication addition data through a second input terminal IN12. The first multiplexer 6412-1D' may receive the minimum value selection signal MIN_SEL through a selection control terminal S1. The first multiplexer 6412-1D' may output one of the mantissa data M_MA1L[18:0] of the first left multiplication addition data and the mantissa data M_MA1R[18:0] of the first right multiplication addition data through an output terminal OUT1 according to a logic level of the minimum value selection signal MIN_SEL. The second multiplexer 6412-2D' may receive the mantissa data M_MA1L[18:0] of the first left multiplication addition data through a first input terminal IN21 and receive the mantissa data M_MA1R[18:0] of the first right multiplication addition data through a second input terminal IN22. The second multiplexer 6412-2D' may receive the minimum value selection signal MIN_SEL through a selection control terminal S2. The second multiplexer 6412-2D' may output one of the mantissa data M_MA1L[18:0] of the first left multiplication addition data and the mantissa data M_MA1R[18:0] of the first right multiplication addition data through an output terminal OUT2 according to a logic level of the minimum value selection signal MIN_SEL. The data output through the output terminal OUT1 of the first multiplexer 6412-1D' may be transmitted to the shifter 6412-3D', while the data output through the output terminal OUT2 of the second multiplexer 6412-2D' may be output from the first mantissa shifting circuit 6412D' as the second intermediate mantissa data IM2_MA1[18:0].

More specifically, when a first logic level signal, that is, a logic "high" signal is transmitted as the minimum value selection signal MIN_SEL (that is, when the first left maximum exponent data E_MAX1L[7:0] is relatively small), the first multiplexer 6412-1D' may output the data received through the first input terminal IN11. In this case, the second multiplexer 6412-2D' may also output the data received through the first input terminal IN21. That is, in this case, the first multiplexer 6412-1D° and the second multiplexer 6412-2D' may output the mantissa data M_MA1L[18:0] of the first left multiplication addition data and the mantissa data M_MA1R[18:0] of the first right multiplication addition data, respectively. Accordingly, in this case, a shifting operation may be performed on the mantissa data M_MA1L[18:0] of the first left multiplication addition data. On the other hand, when a second logic level signal, for example, a logic "low" signal is transmitted as the minimum value selection signal MIN_SEL (that is, when the first right maximum exponent data E_MAX1R[7:0] is relatively small), the first multiplexer 6412-1D' may output the data received through the second input terminal IN12. In this case, the second multiplexer 6412-2D' may also output the data received through the second input terminal IN22. That is, in this case, the first multiplexer 6412-1D' and the second multiplexer 6412-2D' may output the mantissa data M_MA1R[18:0] of the first right multiplication addition data and the mantissa data M_MA1L[18:0] of the first left multiplication addition data, respectively. Accordingly, in this case, a shifting operation may be performed on the mantissa data M_MA1R[18:0] of the first right multiplication addition data.

The shifter 6412-3D' may receive the data output from the first multiplexer 6412-1D', that is, the mantissa data M_MA1L[18:0] of the first left multiplication addition data or the mantissa data M_MA1R[18:0] of the first right multiplication addition data. The shifter 6412-3D' may receive the ninth shift data SFT9[7:0] from the subtracting circuit 6411D'. The shifter 6412-3D' may perform a shifting operation on the data transmitted from the first multiplexer 6412-1D' by the number of bits corresponding to a value of the ninth shift data SFT9[7:0] and output the resultant data as the first intermediate mantissa data IM1_MA1[18:0]. The first intermediate mantissa data IM1_MA1[18:0] output from the shifter 6412-3D' and the second intermediate mantissa data IM2_MA1[18:0] output from the second multiplexer 6412-2D' may be added by the first accumulative adder 6413D of FIG. 124 and the resultant data may be output as the mantissa data M_MA1[19:0] of the first multiplication addition data from the first accumulative adder 6413D.

Referring back to FIG. 122, the output circuit 6500D of the MAC operator 6000D may receive the exponent data E_MAC1[7:0] and mantissa data M_MAC1[6:0] of the first MAC data D_MAC1 from the accumulator 6400D. When the last MAC data, that is, the exponent data and mantissa data of the 64$^{th}$ MAC data D_MAC64 are received, the output circuit 6500D may extract sign data from the mantissa data, join the sign data, exponent data, and mantissa data, and output the resultant data as the MAC result data MAC_RST. As in this example, when one of the first to 63$^{rd}$ MAC data D_MAC1-DMAC63 is received, the output circuit 6500D might not output the MAC result data MAC_RST. The output circuit 6500D may have the same configuration as the output circuit 6500A described above with reference to FIG. 93.

Figure 126:
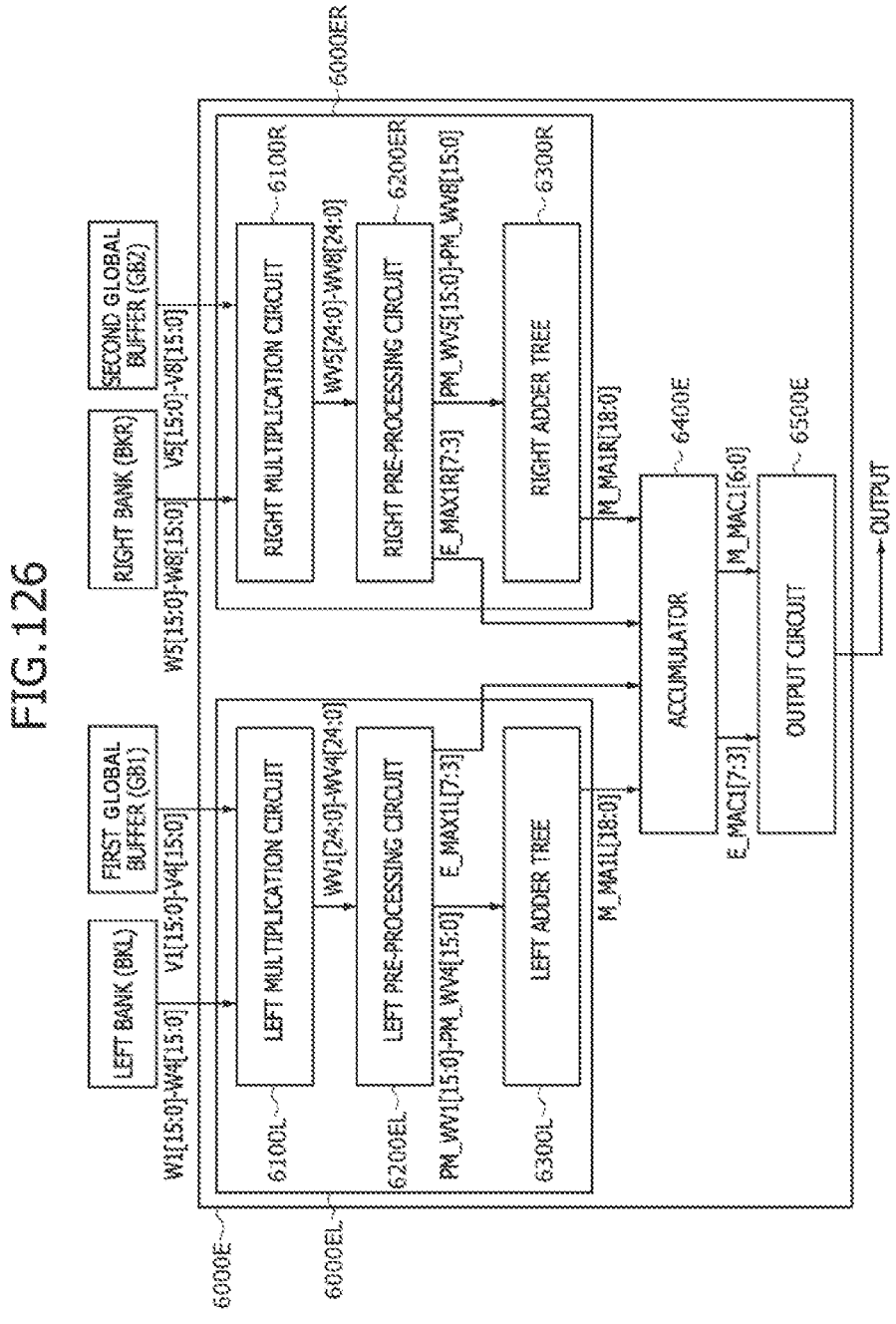
FIG. 126 illustrates another example of a MAC operator for performing matrix multiplication of FIG. 121.

FIG. 126 illustrates another example of a MAC operator 6000E for performing the matrix multiplication of FIG. 121. Referring to FIG. 126, the MAC operator 6000E according to the present embodiment may include a left multiplication addition circuit 6000EL, a right multiplication addition circuit 6000ER, an accumulator 6400E, and an output circuit 6500E. Hereinafter, the weight data and vector data processed in the left multiplication addition circuit 6000EL may be classified into terms of "left weight data" and "left vector data", respectively. Also, the weight data and vector data processed in the right multiplication addition circuit 6000EL may be classified into terms of "right weight data" and "right vector data", respectively.

The left multiplication addition circuit 6000EL may receive the weight data W1[15:0]-W4[15:0] of the first column to fourth column of the weight matrix and the vector data V1[15:0]-V4[15:0] of the first row to fourth row of the vector matrix from the left memory bank BKL and the first global buffer GB1. The left multiplication addition circuit 6000EL may perform a multiplication operation, pre-processing, and an addition operation on the weight data W1[15:0]-W4[15:0] of the first column to fourth column and the vector data V1[15:0]-V4[15:0] of the first row to fourth row to generate and output the first left maximum exponent upper data E_MAX1L[7:3] and the mantissa data M_MA1L[18:0] of the first left multiplication addition data. The first left maximum exponent upper data E_MAX1L[7:3] and the mantissa data M_MA1L[18:0] of the first left multiplication addition data output from the left multiplication addition circuit 6000EL may be transmitted to the accumulator 6400E.

The left multiplication addition circuit 6000EL may include a left multiplication circuit 6100L, a left pre-processing circuit 6200EL, and a left adder tree 6300L. The left multiplication circuit 6100L may perform a multiplication operation on the weight data W1[15:0]-W4[15:0] of the first column to fourth column of the weight matrix and the vector data V1[15:0]-V4[15:0] of the first row to fourth row of the vector matrix to generate and output first to fourth multiplication data WV1[24:0]-WV4[24:0]. The left pre-processing circuit 6200EL may receive the first to fourth multiplication data WV1[24:0]-WV4[24:0] from the left multiplication circuit 6100L. The left pre-processing circuit 6200EL may perform pre-processing on the first to fourth multiplication data WV1[24:0]-WV4[24:0] to generate and output the first left maximum exponent upper data E_MAX1L[7:3] and the first to fourth pre-processed mantissa data PM_WV1[15:0]-PM_WV4[15:0]. The first left maximum exponent upper data E_MAX1L[7:3] and the first to fourth pre-processed mantissa data PM_WV1[15:0]-PM_WV4[15:0] output from the left pre-processing circuit 6200EL may be transmitted to the accumulator 6400E and the left adder tree 6300L, respectively. The configuration and operation of the left pre-processing circuit 6200EL will be described below. The left adder tree 6300L may perform an addition operation on the first to fourth pre-processed mantissa data PM_WV1[15:0]-PM_WV4[15:0] transmitted from the left pre-processing circuit 6200EL to generate and output the mantissa data M_MA1L[18:0] of the first left multiplication addition data. The left adder tree 6300L may have the same configuration as the adder tree 6300 of FIG. 88 described with reference to FIG. 88, except that the number of adders is different that of the adder tree 6300 of FIG. 88. The mantissa data M_MA1L[18:0] of the first left multiplication addition data output from the left adder tree 6300L may be transmitted to the accumulator 6400E.

The right multiplication addition circuit 6000ER may receive the weight data W5[15:0]-W8[15:0] of the fifth column to eighth column of the weight matrix and the vector data V5[15:0]-V8[15:0] of the fifth row to eighth row of the vector matrix from the right memory bank BKR and the second global buffer GB2. The right multiplication addition circuit 6000ER may perform a multiplication operation, pre-processing, and an addition operation on the weight data W5[15:0]-W8[15:0] of the fifth column to eighth column and the vector data V5[15:0]-V8[15:0] of the fifth row to eighth row to generate and output the first right maximum exponent upper data E_MAX1R[7:3] and the mantissa data M_MA1R[18:0] of the first right multiplication addition data. The first right maximum exponent upper data E_MAX1R[7:3] and the mantissa data M_MA1R[18:0] of the first right multiplication addition data output from the right multiplication addition circuit 6000ER may be transmitted to the accumulator 6400E.

The right multiplication addition circuit 6000ER may include a right multiplication circuit 6100R, a right pre-processing circuit 6200ER, and a right adder tree 6300R. The right multiplication circuit 6100R may perform a multiplication operation on the weight data W5[15:0]-W8[15:0] of the fifth column to eighth column of the weight matrix and the vector data V5[15:0]-V8[15:0] of the fifth row to eighth row of the vector matrix to generate and output fifth to eighth multiplication data WV5[24:0]-WV8[24:0]. The right pre-processing circuit 6200ER may receive the fifth to eighth multiplication data WV5[24:0]-WV8[24:0] from the right multiplication circuit 6100R. The right pre-processing circuit 6200ER may perform pre-processing on the fifth to eighth multiplication data WV5[24:0]-WV8[24:0] to generate and output first right maximum exponent upper data E_MAX1R[7:3] and fifth to eighth pre-processed mantissa data PM_WV5[15:0]-PM_WV8[15:0]. The first right maximum exponent upper data E_MAX1R[7:3] and the fifth to eighth pre-processed mantissa data PM_WV5[15:0]-PM_WV8[15:0] output from the right pre-processing circuit 6200ER may be transmitted to the accumulator 6400E and the right adder tree 6300R, respectively. The configuration and operation of the right pre-processing circuit 6200ER will be described in more detail below. The right adder tree 6300R may perform an addition operation on the fifth to eighth pre-processed mantissa data PM_WV5[15:0]-

PM_WV8[15:0] transmitted from the right pre-processing circuit 6200ER to generate and output mantissa data M_MA1R[18:0] of first the right multiplication addition data. The right adder tree 6300R may have the same configuration as the adder tree 6300 of FIG. 88 described with reference to FIG. 88, except that the number of adders is different from that of the adder tree 6300 of FIG. 88. The mantissa data M_MA1R[18:0] of the first right multiplication addition data output from the right adder tree 6300R may be transmitted to the accumulator 6400E.

The accumulator 6400E may receive the first left maximum exponent upper data E_MAX1L[7:3] and the mantissa data M_MA1L[18:0] of the first left multiplication addition data from the left pre-processing circuit 6200EL and the left adder tree 6300L of the left multiplication addition circuit 6000EL, respectively. In addition, the accumulator 6400E may receive the first right maximum exponent upper data E_MAX1R[7:3] and the mantissa data M_MA1R[18:0] of the first right multiplication addition data from the right pre-processing circuit 6200ER and the right adder tree 6300R of the right multiplication addition circuit 6000ER, respectively. The accumulator 6400E may have the same configuration as the accumulator 6400D of FIG. 123 described with reference to FIG. 123 or the accumulator 6400D' of FIG. 124 described with reference to FIG. 124. However, in this case, the normalizer 6440D may be replaced with the first normalizer 6440C of FIG. 114 described with reference to FIG. 114. Accordingly, the accumulator 6400E may generate and output the first exponent upper data E_MAC1[7:3] and the mantissa data M_MAC1[6:0] of the first MAC data D_MAC1.

The output circuit 6500E my receive the first exponent upper data E_MAC1[7:3] and the mantissa data M_MAC1 [6:0] of the first MAC data D_MAC1 from the accumulator 6400E. When the exponent upper data and mantissa data of the last MAC data, that is, the $64^{th}$ MAC data D_MAC64 are received, the output circuit 6500E my extract exponent lower data and sign data and join the signal data, exponent data, and mantissa data to output resultant data as the MAC result data MAC_RST. As in this example, when one of the first to $63^{rd}$ MAC data D_MAC1-D_MAC63 is received, the output circuit 6500E might not output the MAC result data MAC_RST. The output circuit 6500E may have the same configuration as the output circuit 6500C of FIG. 119 described above with reference to FIG. 119.

Figure 127:
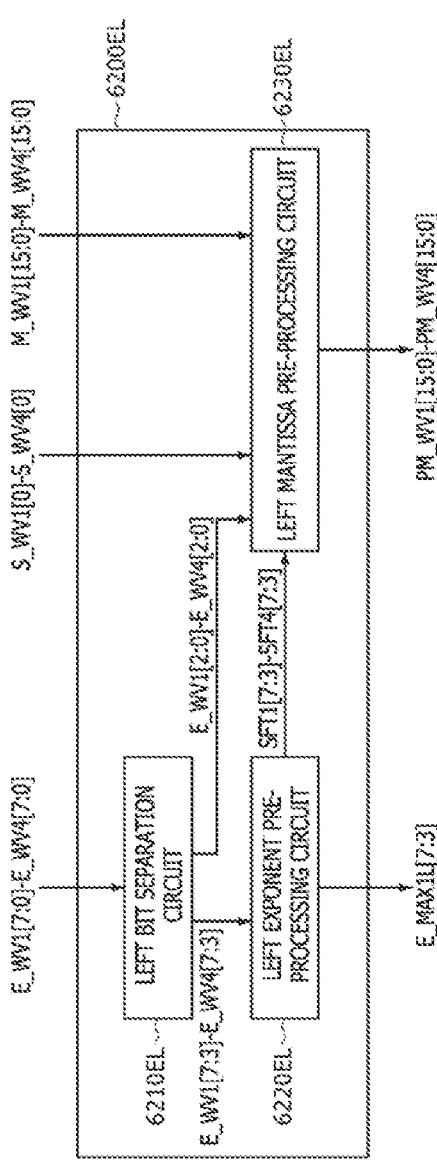
FIG. 127 illustrates an example of a configuration of a left pre-processing circuit of the MAC operator of FIG. 126.
Figure 128:
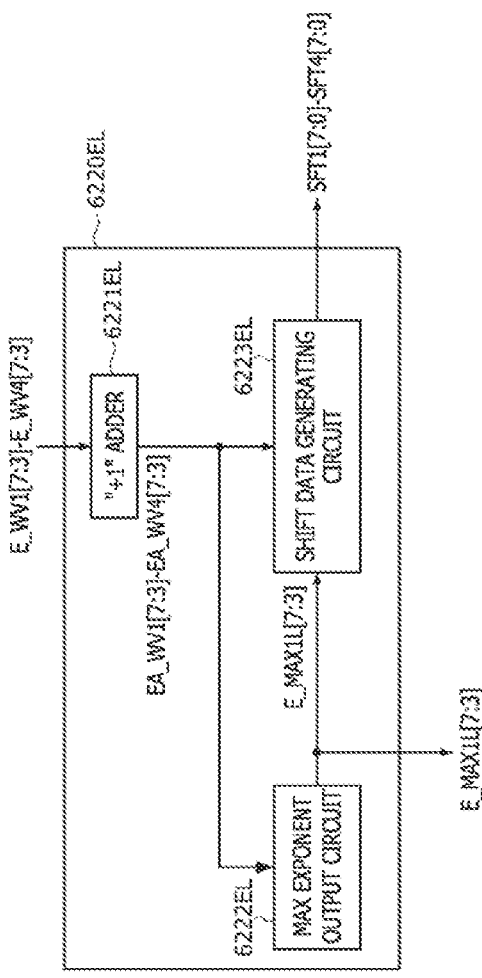
FIG. 128 illustrates an example of a configuration of an exponent pre-processing circuit of the left pre-processing circuit of FIG. 127.
Figure 129:
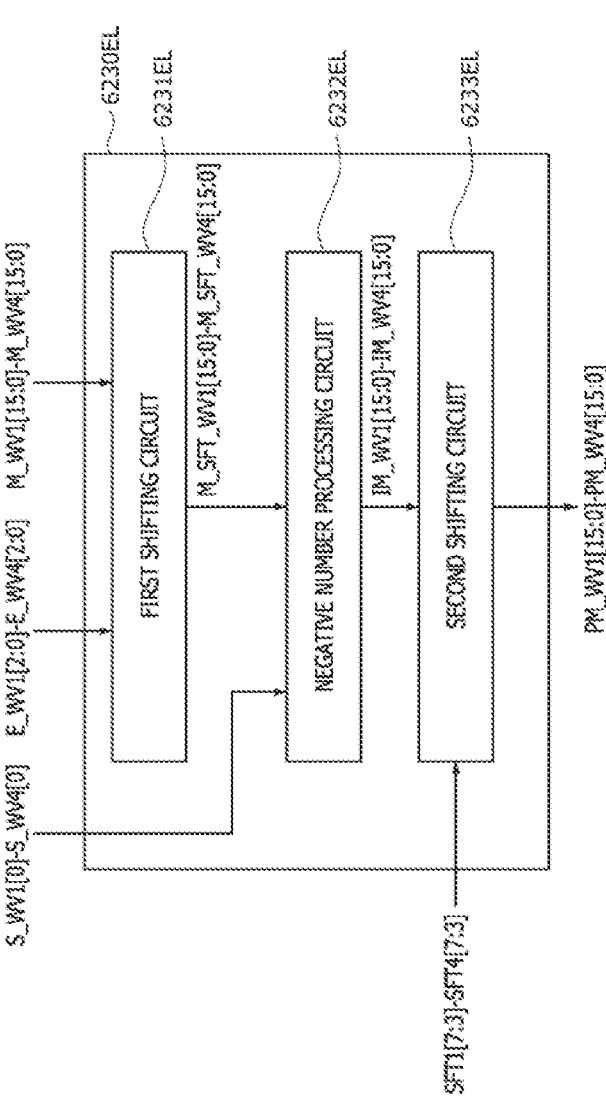
FIG. 129 illustrates an example of a configuration of a mantissa pre-processing circuit of the left pre-processing circuit of FIG. 127.

FIG. 127 illustrates an example of a configuration of the left pre-processing circuit 6200EL of the MAC operator 6000E of FIG. 126. FIG. 128 illustrates an example of a configuration of a left exponent pre-processing circuit 6220EL of the left pre-processing circuit 6200EL of FIG. 127. FIG. 129 illustrates an example of a configuration of a left mantissa pre-processing circuit 6230EL of the left pre-processing circuit 6200EL of FIG. 127.

Referring to FIG. 127, the left pre-processing circuit 6200EL may include a left bit separation circuit 6210EL, the left exponent pre-processing circuit 6220EL, and the left mantissa pre-processing circuit 6230EL. The left bit separation circuit 6210EL may receive the first to fourth exponent data E_WV1[7:0]-E_WV4[7:0] from the left multiplication circuit 6100L of FIG. 126. When "F" is a natural number less than 7, the left bit separation circuit 6210EL may separate the exponent data of the multiplication data into upper "8-F" bits including an MSB and lower "F" bits including an LSB, and output the upper "8-F" bits and the lower "F" bits. Hereinafter, a case in which "F" is "3" will be described as an example. In this case, the left bit separation circuit 6210EL may separate each of the first to fourth exponent data E_WV1[7:0]-E_WV4[7:0] into upper 5-bits and lower 3-bits to output first to fourth exponent upper bits E_WV1[7:3]-E_WV4[7:3] and first to fourth exponent lower bits E_WV1[2:0]-E_WV4[2:0]. Each of the first to fourth exponent upper bits E_WV1[7:3]-E_WV4[7: 3] output from the left bit separation circuit 6210EL may be composed of upper 5 bits of each of the first to fourth exponent data E_WV1[7:0]-E_WV4[7:0]. Each of the first to fourth exponent lower bits E_WV1[2:0]-E_WV4[2:0] output from the left bit separation circuit 6210EL may be composed of lower 3 bits of each of the first to fourth exponent data E_WV1[7:0]-E_WV4[7:0]. The first to fourth exponent upper bits E_WV1[7:3]-E_WV4[7:3] output from the left bit separation circuit 6210EL may be transmitted to the left exponent pre-processing circuit 6220EL, and the first to fourth exponent lower bits E_WV1[2:0]-E_WV4[2:0] may be transmitted to the left mantissa pre-processing circuit 6230EL.

The left exponent pre-processing circuit 6220EL may perform exponent pre-processing on the first to fourth exponent upper bits E_WV1[7:3]-E_WV4[7:3]. The exponent pre-processing may include an addition operation of adding a binary value "1" to each of the first to fourth exponent upper bits E_WV1[7:3]-E_WV4[7:3] and an operation of generating and outputting first left maximum exponent upper data E_MAX1L[7:3] and first to fourth shift data SFT1[7:3]-SFT4[7:3] using the data generated as a result of the addition operation. The first left maximum exponent upper data E_MAX1L[7:3] output from the left exponent pre-processing circuit 6220EL may be transmitted to the accumulator 6400E of FIG. 126. The first to fourth shift data SFT1[7:3]-SFT4[7:3] output from the left exponent pre-processing circuit 6220EL may be transmitted to the left mantissa pre-processing circuit 6230EL.

Referring to FIG. 128, the left exponent pre-processing circuit 6220EL may include a "+1" adder 6221EL, a maximum exponent output circuit 6222EL, and a shift data generating circuit 6223EL. The "+1" adder 6221EL may perform a "+1" operation on each of the first to fourth exponent upper bits E_WV1[7:3]-E_WV4[7:3] to output a resultant data as first to fourth added exponent upper bits EA_WV1[7:3]-EA_WV4[7:3]. For example, when the first exponent upper hits E_WV1[7:3] are "00101", the first added exponent upper bits E3_WV1[7:3] may be composed of "00110". The "+1" operation by the "+1" adder 6221EL may be performed such that the first to fourth exponent lower bits E_WV1[2:0]-E_WV4[2:0] have a value of "maximum+1", for example, decimal number "8" (binary number "1000"). The first to fourth added exponent upper bits EA_WV1[7:3]-EA_WV4[7:3] may be transmitted to the maximum exponent output circuit 6222EL and the shift data generating circuit 6223EL of the left exponent pre-processing circuit 6220EL.

The maximum exponent output circuit 6222EL may output the added exponent upper hit having the greatest value among the first to fourth added exponent upper bits EA_WV1[7:3]-WV4[7:3] transmitted from the "+1" adder 6221EL as the first left maximum exponent upper data E_MAX1L[7:3]. The maximum exponent output circuit 6222EL may have the same configuration as the maximum exponent output circuit 6220B of FIG. 102 described with reference to FIG. 102.

The shift data generating circuit 6223EL may receive the first to fourth added exponent upper bits EA_WV1[7:3]- WV4[7:3] from the "+1" adder 6221EL and receive the first left maximum exponent upper data E_MAX1L[7:3] from the maximum exponent output circuit 6222EL. The shift data generating circuit 6223EL may subtract each of the first to fourth added exponent upper bits EA_WV1[7:3]-EA_WV4[7:3] from the first left maximum exponent upper data E_MAX1L[7:3] to generate and output the first to fourth shift data SFT1[7:3]-SFT4[7:3]. The shift data generating circuit 6223EL may have the same configuration as the shift data generating circuit 6230B of FIG. 103 described above with reference to FIG. 103.

Referring to FIG. 127 again, the left mantissa pre-processing circuit 6230EL may receive the first to fourth sign data S_WV1[0]-S_WV4[0] and the first to fourth mantissa data M_WV1[15:0]-M_WV4[15:0] from the left multiplication circuit 6100L of FIG. 126. The left mantissa pre-processing circuit 6230EL may receive the first to fourth exponent lower bits E_WV1[2:0]-E_WV4[2:0] from the left bit separation circuit 6210EL. In addition, the left mantissa pre-processing circuit 6230EL may receive the first to fourth shift data SFT1[7:3]-SFT4[7:3] from the left exponent pre-processing circuit 6220EL. The left mantissa pre-processing circuit 6230EL may perform mantissa pre-processing on the first to fourth mantissa data M_WV1[15:0]-M_WV4[15:0] to generate and output the first to fourth pre-processed mantissa data PM_WV1[15:0]-PM_WV4[15:0]. The first to fourth pre-processed mantissa data PM_WV1[15:0]-PM_WV4[15:0] may be transmitted to the left adder tree 6300L of FIG. 126.

Referring to FIG. 129, the left mantissa pre-processing circuit 6230EL may include a first shifting circuit 6231EL, a negative number processing circuit 6232EL, and a second shifting circuit 6233EL. The first shifting circuit 6231EL may perform first shifting for each of the first to fourth mantissa data M_WV1[15:0]-M_WV4[15:0] by a value of each of the first to fourth exponent lower bits E_WV1[2:0]-E_WV4[2:0]. The first shifting circuit 6231EL may output data generated as a result of the first shifting as the first to fourth shifted mantissa data M_SFT_WV1[15:0]-M_SFT_WV4[15:0]. The first shifting circuit 6231EL may be configured similarly to the first shifting circuit 62106 of FIG. 105 described with reference to FIG. 105. Accordingly, the first shifting circuit 6231EL may include first to fourth shifters. A process of determining the number of shifting bits by the exponent lower bits in the first shifting circuit 6231EL and the result of the process may be the same as described with reference to FIGS. 107 and 108.

The negative number processing circuit 6232EL may receive the first to fourth sign data S_WV1[0]-S_WV4[0] from the left multiplication circuit 6100L of FIG. 126 and receive the first to fourth shifted mantissa data M_SFT_WV1[15:0]-M_SFT_WV4[15:0] from the first shifting circuit 6231EL of the left mantissa pre-processing circuit 6230EL. The negative number processing circuit 6232EL may output the first to fourth shifted mantissa data M_SFT_WV1[15:0]-M_SFT_WV4[15:0] or output a 2's complement of each of the first to fourth shifted mantissa data M_SFT_WV1[15:0]-M_SFT_WV4[15:0] according to a value of each of the first to fourth sign data S_WV1[0]-S_WV4[0]. Hereinafter, data output from the negative number processing circuit 6232EL will be referred to as "first to fourth intermediate mantissa data IM_WV1[15:0]-IM_WV4[15:0]". The negative number processing circuit 6232EL may be configured similarly to the negative number processing circuit 6220C of FIG. 109 described with reference to FIG. 109. Accordingly, the negative number processing circuit 6232EL may include first to fourth 2's complement circuits and first to fourth 2:1 multiplexers.

The second shifting circuit 6233EL may receive the first to fourth intermediate mantissa data IM_WV1[15:0]-

Figure 130:
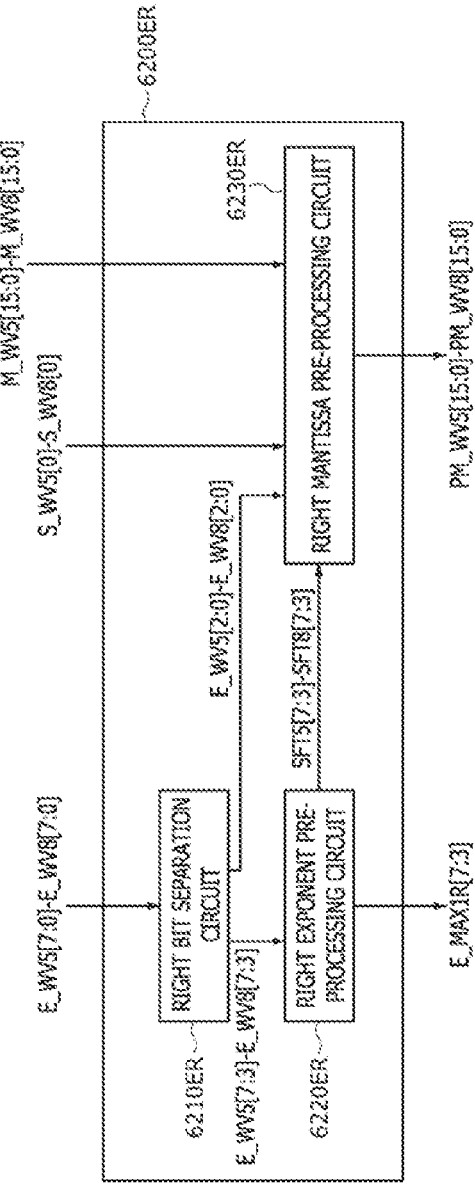
FIG. 130 illustrates an example of a configuration of a right pre-processing circuit of the MAC operator of FIG. 126.
Figure 131:
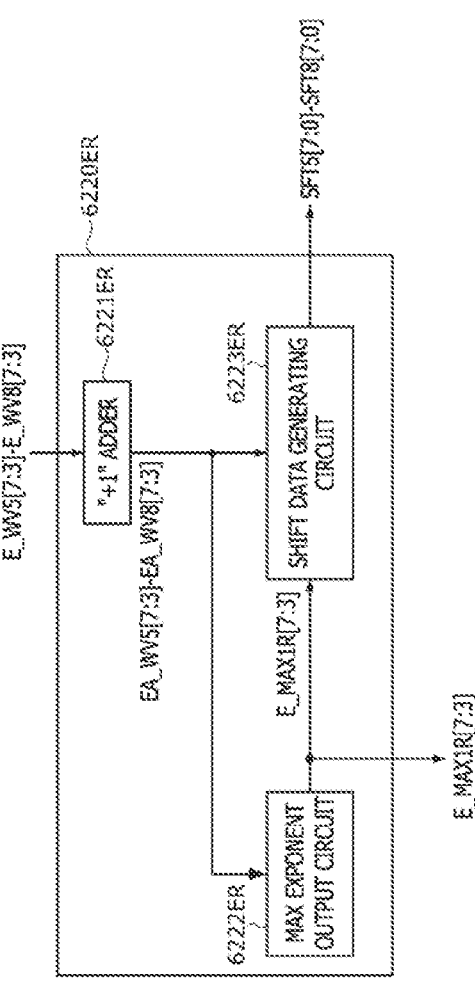
FIG. 131 illustrates an example of a configuration of an exponent pre-processing circuit of the right pre-processing circuit of FIG. 130.
Figure 132:
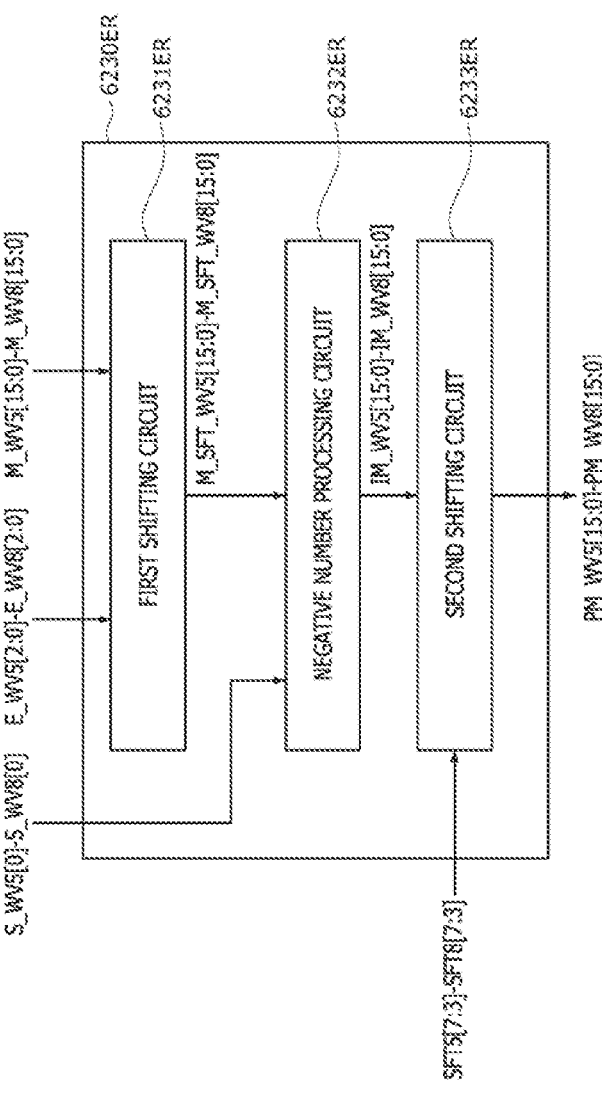
FIG. 132 illustrates an example of a configuration of a mantissa pre-processing circuit of the right pre-processing circuit of FIG. 131.

IM_WV4[15:0] from the negative number processing circuit 6232EL and receive the first to fourth shift data SFT1[7:3]-SFT4[7:3] from the left exponent pre-processing circuit 6220EL of FIG. 126. The second shifting circuit 6233EL may perform second shifting for each of the first to fourth intermediate mantissa data IM_WV1[15:0]-IM_WV4[15:0] by a value of each of the first to fourth shift data SFT1[7:3]-SFT4[7:3] and output data generated as a result of the second shifting as the first to fourth pre-processed mantissa data PM_WV1[15:0]-PM_WV4[15:0]. The second shifting circuit 6233EL may be configured similarly to the second shifting circuit 6230C of FIG. 110 described with reference to FIG. 110. Accordingly, the second shifting circuit 6233EL may include first to fourth shifters, FIG. 130 illustrates an example of a configuration of the right pre-processing circuit 6200ER of the MAC operator 6000E of FIG. 126. FIG. 131 illustrates an example of a configuration of a right exponent pre-processing circuit 6220ER of the right pre-processing circuit 6200ER of FIG. 130. FIG. 132 illustrates an example of a configuration of a right mantissa pre-processing circuit 6230ER of the right pre-processing circuit 6200ER of FIG. 131.

Referring to FIG. 130, the right pre-processing circuit 6200ER may include a right bit separation circuit 6210ER, the right exponent pre-processing circuit 6220ER, and the right mantissa pre-processing circuit 6230ER. The right bit separation circuit 6210ER may receive the fifth to eighth exponent data E_WV5[7:0]-E_WV8[7:0] from the right multiplication circuit 6100R of FIG. 126. When "F" is a natural number less than 7, the right bit separation circuit 6210ER may separate the exponent data of the multiplication data into upper "8-F" bits including an MSB and lower "F" bits including an LSB and output the upper "8-F" bits and the lower "F" bits. When "F" is "3", the right bit separation circuit 6210ER may separate each of the fifth to eighth exponent data E_WV5[7:0]-E_WV8[7:0] into upper 5 bits and lower 3 bits to output fifth to eighth exponent upper bits E_WV5[7:3]-E_WV8[7:3] and fifth to eighth exponent lower bits E_WV5[2:0]-E_WV8[2:0]. The fifth to eighth exponent upper bits E_WV5[7:3]-E_WV8[7:3] output from the right bit separation circuit 6210ER may be composed of upper 5 bits of the fifth to eighth exponent data E_WV5[7:0]-E_WV8[7:0], respectively. The fifth to eighth exponent lower bits E_WV5[2:0]-E_WV8[2:0] output from the right bit separation circuit 6210ER may be composed of lower 3 bits of the fifth to eighth exponent data E_WV5[7:0]-E_WV8[7:0], respectively. The fifth to eighth exponent upper bits E_WV5[7:3]-E_WV8[7:3] output from the right bit separation circuit 6210ER may be transmitted to the right exponent pre-processing circuit 6220ER, and the fifth to eighth exponent lower bits E_WV5[2:0]-E_WV8[2:0] output from the right bit separation circuit 6210ER may be transmitted to the right mantissa pre-processing circuit 6230ER.

The right exponent pre-processing circuit 6220ER may perform exponent pre-processing on the fifth to eighth exponent upper bits E_WV5[7:3]-E_WV8[7:3]. The exponent pre-processing may be performed through an addition operation of adding a binary value "1" to each of the fifth to eighth exponent upper bits E_WV5[7:3]-E_WV8[7:3] and a process of generating and outputting the first right maximum exponent data E_MAX1R[7:3] and the fifth to eighth shift data SFT8[7:3]-SFT8[7:3] using the data generated by the addition operation. The first right maximum exponent data E_MAX1R[7:3] output from the right exponent pre-processing circuit 6220ER may be transmitted to the accumulator 6400E of FIG. 126. The fifth to eighth shift data SFT5[7:

3]-SFT8[7:3] output from the right exponent pre-processing circuit 6220ER may be transmitted to the right mantissa pre-processing circuit 6230ER.

Referring to FIG. 131, the right exponent pre-processing circuit 6220ER may include a "+1" adder 6221ER, a maximum exponent output circuit 6222ER, and a shift data generating circuit 6223ER. The "+1" adder 6221ER may perform a "+1" addition operation on each of the fifth to eighth exponent upper bits E_WV5[7:3]-E_WV8[7:3] and output a result of the addition operation as fifth to eighth added exponent upper bits EA_WV5[7:3]-EA_WV8[7:3]. The fifth to eighth added exponent upper bits EA_WV5[7:3]-EA_WV8[7:3] may be transmitted to the maximum exponent output circuit 6222ER and the shift data generating circuit 6223ER of the right exponent pre-processing circuit 6220ER.

The maximum exponent output circuit 6222ER may output the added exponent upper bit having a greatest value among the fifth to eighth added exponent upper bits EA_WV5[7:3]-EA_WV8[7:3] as the first right maximum exponent upper data E_MAX1R[7:3]. The maximum exponent output circuit 6222ER may have the same configuration as the maximum exponent output circuit 6220B of FIG. 102 described above with reference to FIG. 102.

The shift data generating circuit 6223ER may receive the fifth to eighth added exponent upper bits EA_WV5[7:3]-EA_WV8[7:3] from the "+1" adder 6221ER and receive the first right maximum exponent upper data E_MAX1R[7:3] from the maximum exponent output circuit 6222ER. The shift data generating circuit 6223ER may subtract each of the fifth to eighth added exponent upper bits EA_WV5[7:3]-EA_WV8[7:3] from the first right maximum exponent upper data E_MAX1R[7:3] to generate and output the fifth to eighth shift data SFT5[7:3]-SFT8[7:3]. The shift data generating circuit 6223ER may have the same configuration as the shift data generating circuit 6230B of FIG. 103 described above with reference to FIG. 103.

Referring again to FIG. 130, the right mantissa pre-processing circuit 6230ER may receive the fifth to eighth sign data S_WV5[0]-S_WV8[0] and the fifth to eighth mantissa data M_WV5[15:0]-M_WV8[15:0] from the right multiplication circuit 6100R of FIG. 126. The right mantissa pre-processing circuit 6230ER may receive the fifth to eighth exponent lower bits E_WV5[2:0]-E_WV8[2:0] from the right bit separation circuit 6210ER. In addition, the right mantissa pre-processing circuit 6230ER may receive the fifth to eighth shift data SFT5[7:3]-SFT8[7:3] from the right exponent pre-processing circuit 6220ER. The right mantissa pre-processing circuit 6230ER may perform mantissa pre-processing on the fifth to eighth mantissa data M_WV5[15:0]-M_WV8[15:0] to generate and output the fifth to eighth pre-processed mantissa data PM_WV5[15:0]-PM_WV8[15:0]. The fifth to eighth pre-processed mantissa data PM_WV5[15:0]-PM_WV8[15:0] may be transmitted to the right adder tree 6300R of FIG. 126.

Referring to FIG. 132, the right mantissa pre-processing circuit 6230ER may include a first shifting circuit 6231ER, a negative number processing circuit 6232ER, and a second shifting circuit 6233ER. The first shifting circuit 6231ER may perform first shifting on each of the fifth to eighth mantissa data M_WV5[15:0]-M_WV8[15:0] by a value of each of the fifth to eighth exponent lower bits E_WV5[2:0]-E_WV8[2:0], respectively. The first shifting circuit 6231ER may output data generated as a result of the first shifting as the fifth to eighth shifted mantissa data M_SFT_WV5[15:0]-M_SFT_WV8[15:0]. The first shifting circuit 6231ER may be configured similarly to the first shifting circuit 6210B of FIG. 105 described above with reference to FIG. 105. Accordingly, the first shifting circuit 6231ER may be composed of four shifters. The process of determining the number of shifting bits by the exponent lower bits in the first shifting circuit 6231ER and the result thereof may be the same as described above with reference to FIGS. 107 and 108.

The negative number processing circuit 6232ER may receive the fifth to eighth sign data S_WV5[0]-S_WV8[0] from the right multiplication circuit 6100R of FIG. 126 and receive the fifth to eighth shifted mantissa data M_SFT_WV5[15:0]-M_SFT_WV8[15:0] from the first shifting circuit 6231ER of the right mantissa pre-processing circuit 6230ER. The negative number processing circuit 6232ER may output the fifth to eighth shifted mantissa data M_SFT_WV5[15:0]-M_SFT_WV8[15:0] or output a 2's complement of each of the fifth to eighth shifted mantissa data M_SFT_WV5[15:0]-M_SFT_WV8[15:0] according to a value of each of the received fifth to eighth sign data S_WV5[0]-S_WV8[0]. Hereinafter, data output from the negative number processing circuit 6232ER will be referred to as "fifth to eighth intermediate mantissa data IM_WV5[15:0]-IM_WV8[15:0]". The negative number processing circuit 6232ER may be configured similarly to the negative number processing circuit 6220C of FIG. 109 described above with reference to FIG. 109. Accordingly, the negative number processing circuit 6232ER may be composed of four 2's complement circuits and four 2:1 multiplexers.

The second shifting circuit 6233ER may receive the fifth to eighth intermediate mantissa data IM_WV5[15:0]-IM_WV8[15:0] from the negative number processing circuit 6232ER and receive the fifth to eighth shift data SFT5[7:3]-SFTB[7:3] from the right exponent pre-processing circuit 6220ER of FIG. 126. The second shifting circuit 6233ER may perform second shifting on each of the fifth to eighth intermediate mantissa data IM_WV5[15:0]-IM_WV8[15:0] by a value of each of the fifth to eighth shift data SFT5[7:3]-SFT8[7:3] and output data generated as a result of the second shifting as the fifth to eighth pre-processed mantissa data PM_WV5[15:0]-PM_WV8[15:0]. The second shifting circuit 6233ER may be configured similarly to the second shifting circuit 6230C of FIG. 110 described above with reference to FIG. 110. Accordingly, the second shifting circuit 6233ER may be composed of four shifters.

Figure 133:
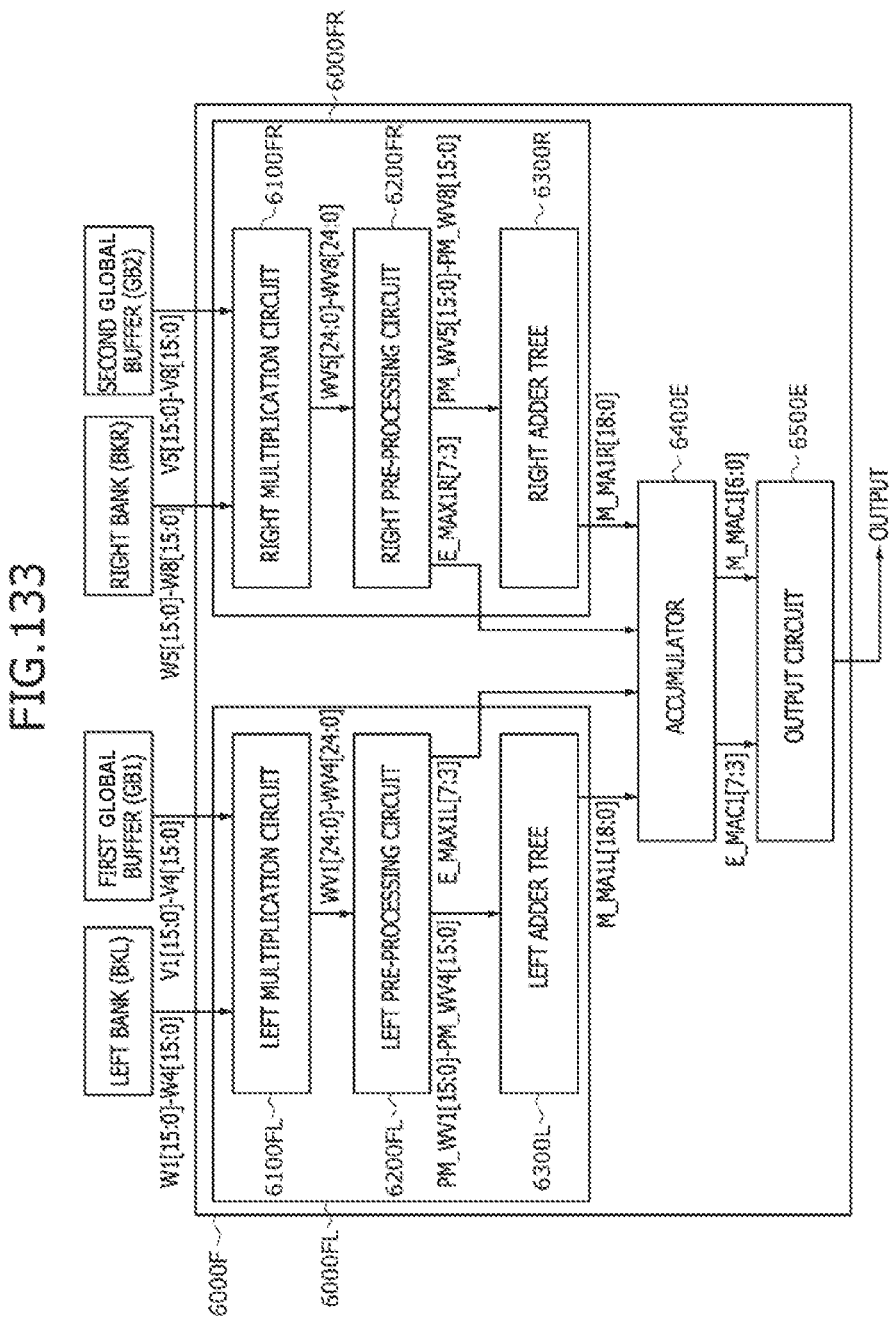
Figure 134:
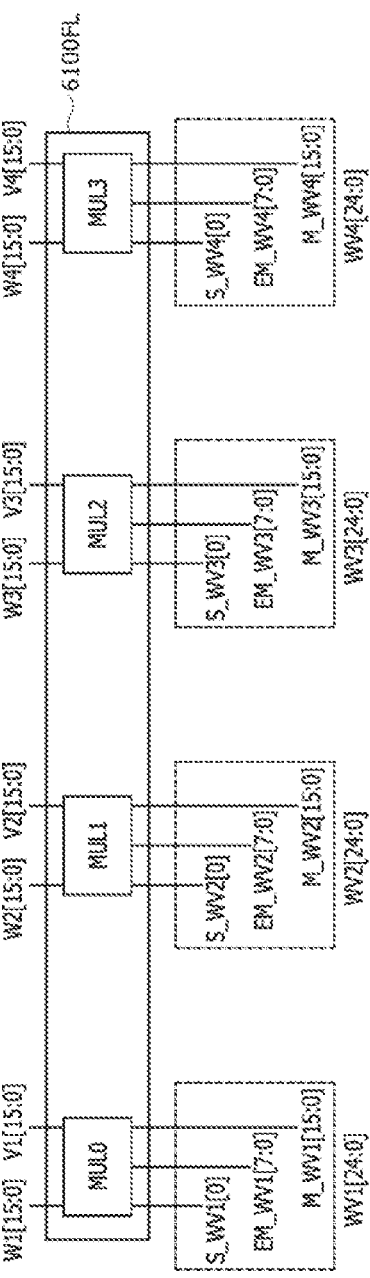
Figure 135:
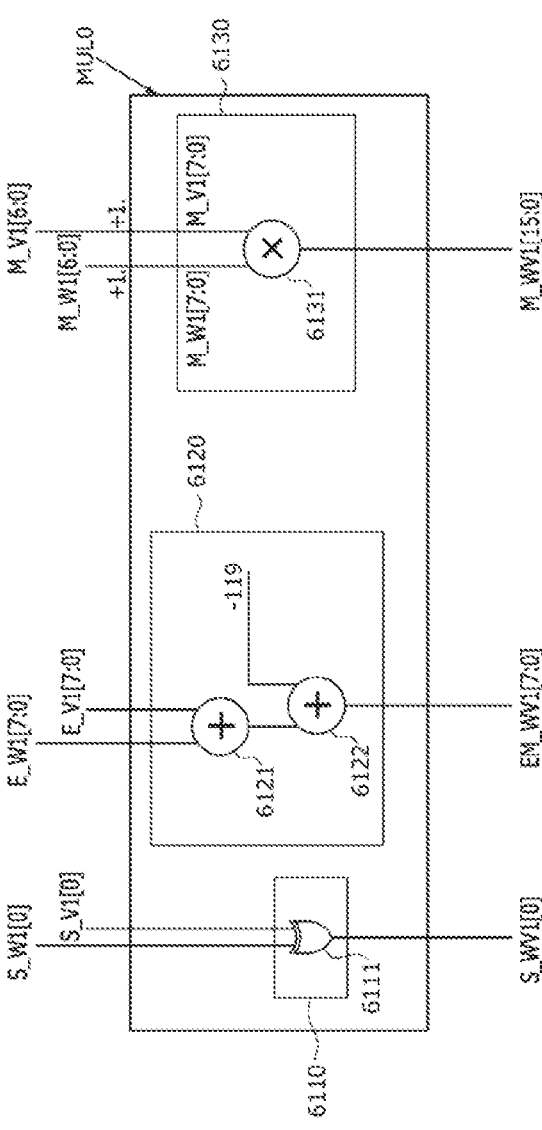
Figure 136:
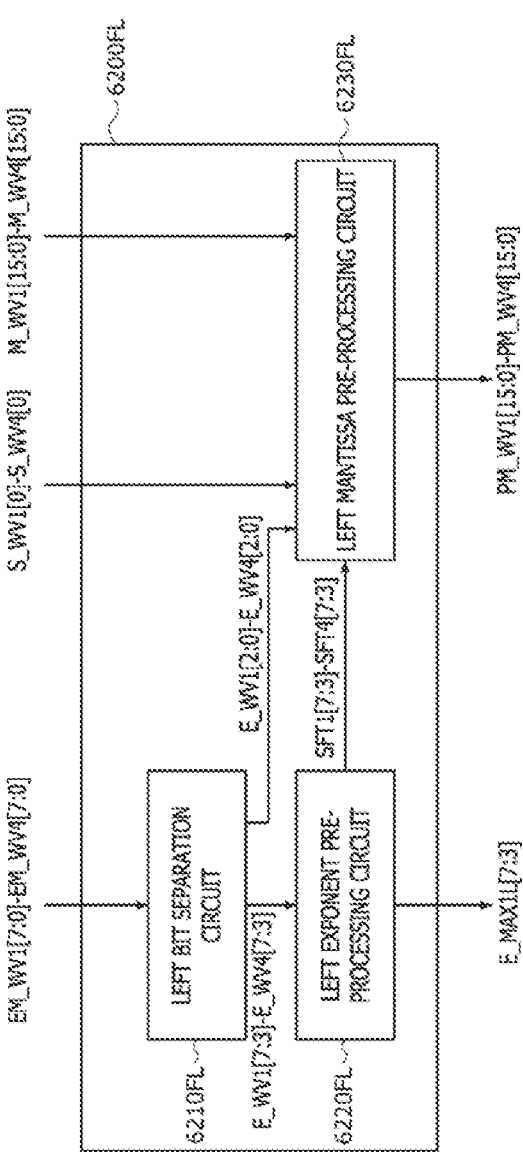
Figure 137:
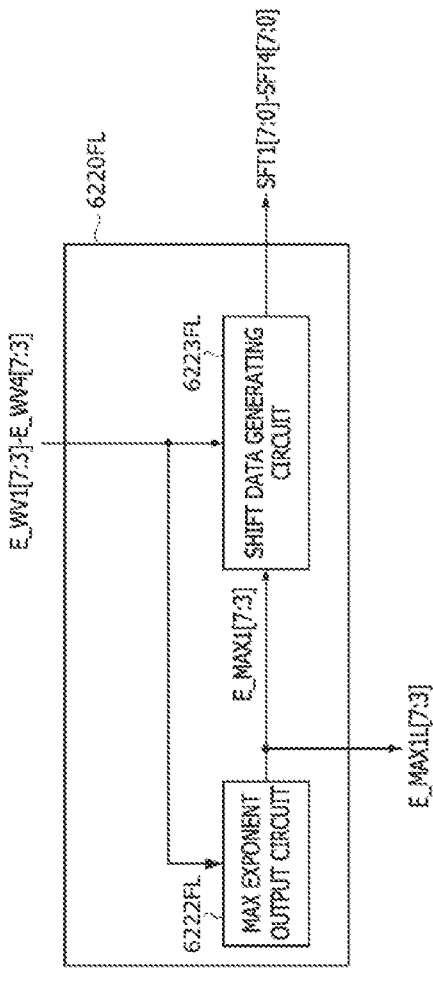

FIG. 133 illustrates yet another embodiment of a MAC operator 6000F for performing matrix multiplication of FIG. 121. FIG. 134 illustrates an example of a configuration of a left multiplication circuit 6100FL of the MAC operator 6000F of FIG. 133. FIG. 135 illustrates an example of a configuration of a first multiplier MUL0 of the left multiplication circuit 6100FL of FIG. 134. FIG. 136 illustrates an example of a configuration of a left pre-processing circuit 6200FL of the MAC operator 6000F of FIG. 133. FIG. 137 illustrates an example of a configuration of an exponent pre-processing circuit 6220FL of the left pre-processing circuit 6200FL of FIG. 136.

Referring to FIG. 133, the MAC operator 6000F according to the present embodiment may include a left multiplication addition circuit 6000FL, a right multiplication addition circuit 6000FR, an accumulator 6400E, and an output circuit 6500E. The left multiplication addition circuit 6000FL may include the left multiplication circuit 6100FL, the left pre-processing circuit 6200FL, and a left adder tree 6300L. The right multiplication addition circuit 6000FR may include a right multiplication circuit 6100FR, a right pre-processing circuit 6200FR, and a right adder tree 63008. The left adder tree 6300L of the left multiplication addition circuit 6000FL and the right adder tree 6300R of the right multiplication addition circuit 6000FR may have the same configurations as the left adder tree and the right adder tree described above with reference to FIG. 126, respectively. In addition, the accumulator 6400E and the output circuit 6500E may have the same configurations as the accumulator and output circuit described above with reference to FIG. 126, respectively. Accordingly, in FIG. 133, the same reference numerals as in FIG. 126 may indicate the same components, and the overlapping description will be omitted below.

Referring to FIG. 134, the left multiplication circuit 6100FL in the MAC operator 6000F according to the present example may include a plurality of multipliers, for example, first to fourth multipliers MUL0-MUL4. The description for the left multiplication circuit 6100FL below may be equally applied to the right multiplication circuit 6100FR of FIG. 133. The first multiplier MUL0 may perform a multiplication operation on first weight data W1[15:0] and first vector data V1[15:0] to output 25-bit first multiplication data WV1[24:0]. The first multiplication data WV1[24:0] may be composed of 1-bit sign data S_WV1[0], 8-bit modified exponent data EM_WV1[7:0], and 16-bit mantissa data M_WV1[15:0]. The second multiplier MUL1 may perform a multiplication operation on second weight data W2[15:0] and second vector data V2[15:0] to output 25-bit second multiplication data WV2[24:0]. The second multiplication data WV2[24:0] may also be composed of 1-bit sign data S_WV2[0], 8-bit modified exponent data EM_WV2[7:0], and 16-bit mantissa data M_WV2[15:0]. The third multiplier MUL2 may perform a multiplication operation on third weight data W3[15:0] and third vector data V3[15:0] to output 25-bit third multiplication data WV3[24:0]. The third multiplication data WV3[24:0] may also be composed of 1-bit sign data S_WV3[0], 8-bit modified exponent data EM_WV3[7:0], and 16-bit mantissa data M_WV3[15:0]. In addition, the fourth multiplier MUL3 may perform a multiplication operation on fourth weight data W4[15:0] and fourth vector data V4[15:0] to output 25-bit fourth multiplication data WV4[24:0]. The fourth multiplication data WV4[24:0] may also be composed of 1-bit sign data S_WV4[0], 8-bit modified exponent data EM_WV4[7:0], and 16-bit mantissa data M_WV4[15:0].

Referring to FIG. 135, the first multiplier MUL0 may include a sign processing circuit 6110, an exponent processing circuit 6120, and a mantissa processing circuit 6130. The description for the first multiplier MUL0 below may be equally applied to each of the remaining second to fourth multipliers MUL1-MUL4 constituting the left multiplication circuit 6100FL. The sign processing circuit 6110 may include an XOR gate 6111. The XOR gate 6111 may receive the sign data S_W1[0] of the first weight data W1 and the sign data S_V1[0] of the first vector data V1. When only one of the sign data S_W1[0] of the first weight data W1 and the sign data S_V1[0] of the first vector data V1 represents "1" representing a negative number, the XOR gate 6111 may output "1" representing a positive number. On the other hand, when both the sign data S_W1[0] of the first weight data W1 and the sign data S_V1[0] of the first vector data V1 represent "0" representing a positive number, or both represent "1", the XOR gate 6111 may output "0" representing a negative number. The 1-bit output data output from the XOR gate 6111 may constitute the sign data S_WV1[0] of the first multiplication result data in the floating-point format.

The exponent processing circuit 6120 may include a first exponent adder 6121 and a second exponent adder 6122.

The first exponent adder 6121 may receive the exponent data E_W1[7:0] of the first weight data W1 and the exponent data E_V1[7:0] of the first vector data V1. The first exponent adder 6121 may add the exponent data E_W1[7:0] of the first weight data W1 and the exponent data E_V1[7:0] of the first vector data V1 and output addition result data. The exponent data E_W1[7:0] of the first weight data W1 and the exponent data E_V1[7:0] of the first vector data V1 may each be in a state in which an exponent bias value, for example, 127 is added. That is, the exponent data output from the first exponent adder 6121 may be in a state in which $127 \times 2 = 254$ is added as the exponent bias value. Accordingly, it is common that, in order to obtain an exponent including the exponent bias value of 127, the second exponent adder 6122 performs an operation of subtracting an exponent bias value, for example, 127 from the addition result data output from the first exponent adder 6121, that is, performs an addition operation on the addition result data and (−127). However, in this example, a (−119) addition operation may be performed instead of the (−127) addition operation. Accordingly, the modified exponent data EM_WV1[7:0] in which the decimal value "8", that is, the binary value "1000" is added to the least significant bit may be output from the second exponent adder 6122.

The mantissa processing circuit 6130 may include a mantissa multiplier 6131. The mantissa multiplier 6131 may receive the mantissa data M_W1[7:0] of the first weight data W1 and the mantissa data M_V1[7:0] of the first vector data V1. The mantissa data M_W1[7:0] of the first weight data W1 may include an implicit bit ("1") and be input in the form of "1.M1", that is, as 8-bit mantissa data M_W1[7:0] to the mantissa multiplier 6131. Similarly, the mantissa data M_V1[6:0] of the first vector data V1 may also include an implicit bit ("1") and be input in the form of "1.M1", that is, as 8-bit mantissa data M_V1[7:0)] to the mantissa multiplier 6131. The mantissa multiplier 6131 may perform a multiplication operation on the mantissa data M_W1[7:0] of the first weight data W1 and the mantissa data M_V1[7:0] of the first vector data V1. The mantissa multiplier 6131 may output 16-bit mantissa data M_WV1[15:0] as multiplication result data. The 16-bit mantissa data M_WV1[15:0] output from the mantissa multiplier 6131 may constitute the mantissa data M_WV1[15:0] of the first multiplication result data in the floating-point format.

Referring to FIG. 136, the left pre-processing circuit 6200FL constituting the left multiplication addition circuit 6000FL of the MAC operator 6000F of FIG. 133 may include a left bit separation circuit 6210FL, a left exponent pre-processing circuit 6220FL, and a left mantissa pre-processing circuit 6230FL. The description below may be equally applied to the right pre-processing circuit 6200FR constituting the right multiplication addition circuit 6000FR of FIG. 133 of the MAC operator 6000F in FIG. 133. In addition, the left mantissa pre-processing circuit 6230FL may have the same configuration as the left mantissa pre-processing circuit described above with reference to FIG. 127, and thus an overlapping description will be omitted.

The left bit separation circuit 6210FL of the left pre-processing circuit 6200FL may receive the first to fourth modified exponent data EM_WV1[7:0]-EM_WV4[7:0] from the left multiplication circuit 6100FL of FIG. 133. When "F" is a natural number less than 7, the left bit separation circuit 6210FL may separate the exponent data of the multiplication data into upper "8-F" bits including an MSB and lower "F" bits including an LSB and output the upper "8-F" bits and the lower "F" bits. When "F" is "3", the left bit separation circuit 6210FL may separate each of the first to fourth modified exponent data EM_WV1[7:0]-EM_WV4[7:0] into upper 5 bits and lower 3 bits to output first to fourth exponent upper bits E_WV1[7:3]-E_WV4[7:3] and first to fourth exponent lower bits E_WV1[2:0]-E_WV4[2:0]. The first to fourth exponent upper bits E_WV1[7:3]-E_WV4[7:3] output from the left bit separation circuit 6210FL may be composed of upper 5 bits of the first to fourth exponent data E_WV1[7:0]-E_WV4[7:0], respectively. The first to fourth exponent lower bits E_WV1[2:0]-E_WV4[2:0] output from the left bit separation circuit 6210FL may be composed of lower 3 bits of the first to fourth exponent data E_WV1[7:0]-E_WV4[7:0], respectively. The first to fourth exponent upper bits E_WV1[7:3]-E_WV4[7:3] output from the left bit separation circuit 6210FL may be transmitted to the left exponent pre-processing circuit 6220FL, and the first to fourth exponent lower bits E_WV1[2:0]-E_WV4[2:0] output from the left bit separation circuit 6210FL may be transmitted to the left mantissa pre-processing circuit 6230FL.

Referring to FIG. 137, the left exponent pre-processing circuit 6220FL of the left pre-processing circuit 6200FL may include a maximum exponent output circuit 6222FL and a shift data generating circuit 6223FL. The left exponent pre-processing circuit 6220FL according to the present example may differ from the left exponent pre-processing circuit 6220EL of FIG. 128 in that the left exponent pre-processing circuit 6220FL according to the present example does not include a "+1" adder. That is, as described with reference to FIG. 135, because the binary value "000" has already been added in the process of adjusting the exponent bias value in the multiplier, the "+1" addition operation for the exponent upper data E_WV1[7:3]-E_WV4[7:3] of the first to fourth multiplication data has already been reflected in the left exponent pre-processing circuit 6220FL. Accordingly, the exponent upper data E_WV1[7:3]-E_WV4[7:3] of the first to fourth multiplication data output from the left bit separation circuit 6210FL of FIG. 136 may be transmitted to the maximum exponent output circuit 6222FL and the shift data generating circuit 6223FL. The maximum exponent output circuit 6222FL and the shift data generating circuit 6223FL may have the same configurations as the maximum exponent output circuit and the shift data generating circuit described above with reference to FIG. 128, and thus overlapping descriptions will be omitted.

A limited number of possible embodiments for the present teachings have been presented above for illustrative purposes. Those of ordinary skill in the art will appreciate that various modifications, additions, and substitutions are possible. While this patent document contains many specifics, these should not be construed as limitations on the scope of the present teachings or of what may be claimed, but rather as descriptions of features that may be specific to particular embodiments. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A multiplication-accumulation (MAC) operator comprising:
   a multiplication circuit configured to perform a multiplication operation on weight data and vector data each having a floating-point format to output multiplication data;
   a pre-processing circuit configured to perform a shifting operation of shifting mantissa data of the multiplication data by a difference between first maximum exponent data having a greatest value among exponent data of the multiplication data and each of the exponent data of the multiplication data to output pre-processed mantissa data; and
   an adder tree configured to add the pre-processed mantissa data to output mantissa data of multiplication addition data,
   wherein each of the weight data and each of the vector data include mantissa data of "M" bits, and the multiplication circuit includes multipliers,
   wherein the multiplication data output from each of the multipliers includes mantissa data having a most significant bit (MSB) of a "2×(M+1)"th bit, and a floating point in the mantissa data is positioned between a "2×M"th bit and the "(2×M)+1"th bit, and
   wherein "M" is a natural number.

2. The MAC operator of claim 1, further comprising an accumulator configured to perform an accumulation operation on the multiplication addition data and latch data.

3. The MAC operator of claim 2,
   wherein the pre-processing circuit transmits the pre-processed mantissa data to the adder tree and transmits the first maximum exponent data to the accumulator.

4. The MAC operator of claim 3, wherein the pre-processing circuit includes:
   a maximum exponent output circuit configured to receive the exponent data of the multiplication data to generate and output the first maximum exponent data;
   a shift data generating circuit configured to receive the exponent data of the multiplication data and the first maximum exponent data to generate and output shift data;
   a negative number processing circuit configured to receive sign data and mantissa data of the multiplication data to output the mantissa data or 2's complement of each of the mantissa data as each of intermediate mantissa data according to a value of each of the sign data; and
   a mantissa shifting circuit configured to perform shifting on each of the intermediate mantissa data by the number of bits corresponding to a value of each of the shift data to generate and output the pre-processed mantissa data.

5. The MAC operator of claim 4, wherein the maximum exponent output circuit includes:
   comparators/selectors of a beginning stage that receive two different pieces of exponent data among the exponent data of the multiplication data to output exponent data having a greater value;
   comparators/selectors of an intermediate stage that receive the exponent data output from two different comparators/selectors among the comparators/selectors of the beginning stage to output exponent data having a greater value; and
   a comparator/selector of a last stage that receives the exponent data output from the two comparators/selectors of the intermediate stage to output exponent data having a greater value as the first maximum exponent data.

6. The MAC operator of claim 4, wherein the shift data generating circuit includes subtractors each having a first input terminal, a second input terminal, and an output terminal, and wherein each of the subtractors is configured to:

receive the first maximum exponent data through the first input terminal, receive the exponent data of the multiplication data through the second input terminal, and output a result generated by subtracting the exponent data of the multiplication data from the first maximum exponent data as each of the shifting data through the output terminal.

7. The MAC operator of claim 4, wherein the negative number processing circuit includes:

a plurality of two's complement circuits each configured to output 2's complement for each of the mantissa data of the multiplication data; and a plurality of multiplexers each configured to receive mantissa data of the multiplication data through a first input terminal, receive a 2's complement of the mantissa data of the multiplication data through a second input terminal, and receive sign data of the multiplication data through a selection control terminal, and wherein each of the plurality of multiplexers is configured to:

output each of the mantissa data of the multiplication data as the intermediate mantissa data through an output terminal when each of the sign data of the multiplication data represents a positive number, and output a 2's complement of each of the mantissa data of the multiplication data as the intermediate mantissa data through the output terminal when each of the sign data of the multiplication data represents a negative number.

8. The MAC operator of claim 4, wherein the mantissa shifting circuit includes shifters each having a first input terminal, a second input terminal, and an output terminal, and wherein each of the shifters is configured to:

receive the shift data through the first input terminal, receive the intermediate mantissa data through the second input terminal, and shift each of the intermediate mantissa data by the number of bits corresponding to a value of each of the shift data and output each of the pre-processed mantissa data through the output terminal.

9. The MAC operator of claim 3, wherein the accumulator includes:

an exponent processing circuit that receives the first maximum exponent data and exponent data of latch data to generate and output second maximum exponent data and first and second shift data;

a mantissa shifting circuit that receives the first and second shift data, the mantissa data of the multiplication addition data, and the mantissa data of the latch data to generate and output shifted mantissa data of the multiplication addition data and shifted mantissa data of the latch data;

an accumulative adder that adds the shifted mantissa data of the multiplication addition data and the shifted mantissa data of the latch data to generate and output accumulative mantissa data;

a normalizer that performs normalization on the second maximum exponent data and the accumulative mantissa data to generate and output normalized accumulative exponent data and normalized accumulative mantissa data; and a latch circuit that latches the normalized accumulative exponent data and the normalized accumulative mantissa data to output exponent data and mantissa data of the latch data, respectively.

10. The MAC operator of claim 9, wherein the exponent processing circuit includes:

a comparator/selector that compares the first maximum exponent data and the exponent data of the latch data to output the exponent data having a greater value as the second maximum exponent data;

a first subtractor that subtracts the first maximum exponent data from the second maximum exponent data to output the first shift data; and a second subtractor that subtracts the exponent data of the latch data from the second maximum exponent data to output subtraction result data as the second shift data.

11. The MAC operator of claim 9, wherein the mantissa shifting circuit includes:

a first shifter that shifts the mantissa data of the multiplication addition data by the number of bits corresponding to a value of the first shift data and outputs the shifted data as shifted mantissa data of the multiplication addition data; and a second shifter that shifts the mantissa data of the latch data by the number of bits corresponding to a value of the second shift data and outputs the shifted data as shifted mantissa data of the latch data.

12. The MAC operator of claim 9, wherein the latch circuit includes:

a first flip-flop that latches the normalized exponent data in response to a clock latch signal to output the latched data as the exponent data of the latch data; and a second flip-flop that latches the normalized mantissa data in response to the clock latch signal to output the latched data as the mantissa data of the latch data.

13. The MAC operator of claim 12, wherein each of the first flip-flop and the second flip-flop includes a clock terminal for receiving the clock latch signal, and wherein the clock terminal of the first flip-flop and the clock terminal of the second flip-flop are interconnected.

14. The MAC operator of claim 12, wherein each of the first flip-flop and the second flip-flop includes a reset terminal for receiving a clear signal, and wherein the reset terminal of the first flip-flop and the reset terminal of the second flip-flop are interconnected.

15. The MAC operator of claim 9, wherein the latch circuit outputs the latched normalized exponent data and normalized mantissa data as exponent data and mantissa data of MAC data, respectively.

16. The MAC operator of claim 15, further comprising an output circuit configured to receive the exponent data and mantissa data of the MAC data and outputs MAC result data of a floating-point format in response to a MAC read signal of a first logic level.

17. The MAC operator of claim 16, wherein the output circuit includes:

a first buffer that receives the exponent data of the MAC data and outputs the exponent data of the MAC data in response to the MAC read signal of the first logic level;

a second buffer that receives the mantissa data of the MAC data and outputs the mantissa data of the MAC data in response to the MAC read signal of the first logic level; and a bit joining circuit that extracts sign data when the exponent data and mantissa data of the MAC data are transmitted from the first buffer and the second buffer, respectively, and joins the sign data and the exponent data and mantissa data of the MAC data to output the joined data as the MAC result data.

18. The MAC operator of claim 3, wherein the accumulator includes:

an exponent processing circuit that receives the first maximum exponent data and exponent data of the latch data to generate and output the second maximum exponent data and first and second shift data;

a mantissa shifting circuit that receives the first and second shift data, the mantissa data of the multiplication addition data, and the mantissa data of the latch data to generate and output shifted mantissa data of the multiplication addition data and shifted mantissa data of the latch data;

an accumulative adder that adds the shifted mantissa data of the multiplication addition data and the shifted mantissa data of the latch data to generate and output accumulative mantissa data;

a first normalizer that performs first normalization on the second maximum exponent data and the accumulative mantissa data to generate and output first normalized exponent data and first normalized mantissa data, the number of bits of the first normalized mantissa data being maintained equal to the number of bits of the accumulative mantissa data; and a latch circuit that latches the first normalized exponent data and the first normalized mantissa data to output the latched data as the exponent data and mantissa data of the latch data.

19. The MAC operator of claim 18, wherein the exponent processing circuit includes:

a comparator/selector that compares the first maximum exponent data and the exponent data of the latch data to output the exponent data having a greater value as the second maximum exponent data;

a first subtractor that subtracts the first maximum exponent data from the second maximum exponent data and outputs subtraction result data as the first shift data; and a second subtractor that subtracts the exponent data of the latch data from the second maximum exponent data and outputs subtraction result data as the second shift data.

20. The MAC operator of claim 18, wherein the mantissa shifting circuit includes:

a first shifter that shifts the mantissa data of the multiplication addition data by the number of bits corresponding to a value of the first shift data to generate and output the shifted mantissa data of the multiplication addition data; and a second shifter that shifts the mantissa data of the latch data by the number of bits corresponding to a value of the second shift data to generate and output the shifted mantissa data of the latch data.

21. The MAC operator of claim 18, wherein the latch circuit includes:

a first flip-flop that latches the first normalized exponent data in response to a clock latch signal and outputs the latched first normalized exponent data as the exponent data of the latch data; and a second flip-flop that latches the first normalized mantissa data in response to the clock latch signal and outputs the latched first normalized mantissa data as the mantissa data of the latch data.

22. The MAC operator of claim 18, wherein the latch circuit outputs the latched first normalized exponent data and the latched first normalized mantissa data as the exponent data and mantissa data of the MAC data, respectively.

23. The MAC operator of claim 22, further comprising an output circuit that receives the exponent data and mantissa data of the MAC data, and outputs the MAC result data of the floating-point format in response to the MAC read signal of the first logic level.

24. The MAC operator of claim 23, wherein the output circuit includes:

a first buffer that receives the exponent data of the MAC data and outputs the exponent data of the MAC data in response to the MAC read signal of the first logic level;

a second buffer that receives the mantissa data of the MAC data and outputs the mantissa data of the MAC data in response to the MAC read signal of the first logic level;

a second normalizer that performs second normalization processing on the mantissa data of the MAC data to have the number of bits in a standardized floating-point format and outputs a result of the second normalization processing as the second normalized mantissa data of the MAC data when the mantissa data of the MAC data is transmitted from the second buffer; and a bit joining circuit that receives the exponent data and second normalized mantissa data of the MAC data from the first buffer and the second normalizer, respectively, extracts sign data, and joins the sign data, and the exponent data and second normalized mantissa data of the MAC data to output the joined data as the MAC result data.

* * * * *